US010177701B2

(12) United States Patent
White et al.

(10) Patent No.: US 10,177,701 B2
(45) Date of Patent: Jan. 8, 2019

(54) CORDLESS POWER TOOL SYSTEM

(71) Applicant: Black & Decker Inc., New Britain, CT (US)

(72) Inventors: Daniel J. White, Baltimore, MD (US); Matthew J. Velderman, Baltimore, MD (US); Andrew E Seman, Jr., Pylesville, MD (US)

(73) Assignee: Black & Decker, Inc., New Britain, CT (US)

(*) Notice: Subject to any disclaimer, the term of this patent is extended or adjusted under 35 U.S.C. 154(b) by 0 days.

(21) Appl. No.: 15/970,382

(22) Filed: May 3, 2018

(65) Prior Publication Data

US 2018/0262151 A1 Sep. 13, 2018

Related U.S. Application Data

(60) Continuation of application No. 15/818,001, filed on Nov. 20, 2017, which is a division of application No.
(Continued)

(51) Int. Cl.
*H02P 25/14* (2006.01)
*H02P 29/032* (2016.01)
(Continued)

(52) U.S. Cl.
CPC ........ *H02P 29/032* (2016.02); *H01M 2/1022* (2013.01); *H01M 2/34* (2013.01); *H02J 7/0013* (2013.01); *H02J 7/0045* (2013.01); *H02P 25/14* (2013.01); *H02P 27/08* (2013.01); *H01M 2220/30* (2013.01)

(58) Field of Classification Search
CPC combination set(s) only.
See application file for complete search history.

(56) References Cited

U.S. PATENT DOCUMENTS

| | | | |
|---|---|---|---|
| 2,559,521 | A | 7/1951 | Smith, Jr. et al. |
| 2,590,805 | A | 3/1952 | Vitale |

(Continued)

FOREIGN PATENT DOCUMENTS

| | | |
|---|---|---|
| CA | 1304464 | 6/1992 |
| CA | 1315335 | 3/1993 |

(Continued)

OTHER PUBLICATIONS

ThunderVolt System Catalog 1990.

(Continued)

*Primary Examiner* — Bentsu Ro
(74) *Attorney, Agent, or Firm* — Michael Aronoff

(57) ABSTRACT

A power tool system including a multi-voltage battery pack for use with a first power tool, wherein the first power tool comprises a first battery pack interface and is configured to operate at a first operating voltage and a second power tool configured for use with the multi-voltage battery pack such that the system includes both the multi-voltage battery pack and the second power tool, wherein the second power tool comprises a second battery pack interface and is configured to operate at a second operating voltage, wherein the second operating voltage is higher than the first operating voltage.

29 Claims, 213 Drawing Sheets

Related U.S. Application Data

15/414,720, filed on Jan. 25, 2017, now Pat. No. 9,871,484, which is a continuation of application No. 14/992,484, filed on Jan. 11, 2016, now Pat. No. 9,583,793, which is a continuation of application No. 14/715,258, filed on May 18, 2015, now Pat. No. 9,406,915.

(60) Provisional application No. 61/994,953, filed on May 18, 2014, provisional application No. 62/000,112, filed on May 19, 2014, provisional application No. 62/046,546, filed on Sep. 5, 2014, provisional application No. 62/118,917, filed on Feb. 20, 2015, provisional application No. 62/091,134, filed on Dec. 12, 2014, provisional application No. 62/114,645, filed on Feb. 11, 2015, provisional application No. 62/000,307, filed on May 19, 2014, provisional application No. 62/093,513, filed on Dec. 18, 2014.

(51) Int. Cl.

*H01M 2/10* (2006.01)
*H01M 2/34* (2006.01)
*H02P 27/08* (2006.01)
*H02J 7/00* (2006.01)

(56) References Cited

U.S. PATENT DOCUMENTS 3,214,670 A 10/1965 Schaf et al.
3,344,899 A 10/1967 Wang et al.
3,453,518 A 7/1969 Rose et al.
3,456,119 A 7/1969 Schneider
3,525,912 A 8/1970 Wallin
3,757,194 A 9/1973 Weber et al.
3,936,710 A 2/1976 Tanikoshi et al.
3,970,912 A 7/1976 Hoffman
4,175,249 A 11/1979 Gruber et al.
4,240,015 A 12/1980 White et al.
4,267,914 A 5/1981 Saar et al.
4,285,112 A 8/1981 Eshghy et al.
4,292,571 A 9/1981 Cuneo et al.
4,315,162 A 2/1982 Ferguson et al.
4,581,570 A 4/1986 Mejia
4,737,661 A 4/1988 Lessign, III et al.
4,834,192 A 5/1989 Hansson et al.
4,835,409 A 5/1989 Walter et al.
4,835,410 A 5/1989 Bhagwat et al.
4,835,448 A 5/1989 Dishner et al.
4,847,513 A 7/1989 Katz et al.
4,879,503 A 11/1989 Aoki et al.
5,028,858 A 7/1991 Schnizler et al.
5,095,259 A 3/1992 Bailey et al.
5,121,046 A 6/1992 McCullough et al.
5,180,641 A 1/1993 Burns et al.
5,217,395 A 6/1993 Bailey et al.
5,229,693 A 7/1993 Futami et al.
5,235,232 A 8/1993 Conley et al.
5,285,112 A 2/1994 Mann
5,298,821 A 3/1994 Michel et al.
5,298,839 A 3/1994 Takeda
5,354,215 A 10/1994 Viracola et al.
5,418,433 A 5/1995 Nilssen
5,461,264 A 10/1995 Yang et al.
5,506,456 A 3/1996 Yang et al.
5,573,074 A 11/1996 Thames et al.
5,628,054 A 5/1997 Osaka
5,687,129 A 11/1997 Kim et al.
5,715,156 A 2/1998 Yilmaz et al.
5,734,025 A 2/1998 Komai et al.
5,739,651 A 3/1998 Miyazawa et al.
5,804,939 A 9/1998 Yamai et al.
5,821,722 A 10/1998 Forbes et al.
5,897,454 A 4/1999 Cannaliato et al.
6,034,494 A 3/2000 Kitamine et al.
6,057,608 A 5/2000 Bailey, Jr. et al.
6,081,087 A 6/2000 Iijima et al.
6,104,162 A 8/2000 Sainsbury et al.
6,172,437 B1 1/2001 Du et al.
6,172,860 B1 1/2001 Yoshimizu et al.
6,243,276 B1 6/2001 Neumann et al.
6,268,711 B1 7/2001 Bearfield et al.
6,296,065 B1 10/2001 Carrier et al.
6,308,059 B1 10/2001 Domes
6,346,793 B1 2/2002 Shibata et al.
6,400,107 B1 6/2002 Nakatani et al.
6,430,692 B1 8/2002 Kimble et al.
6,431,289 B1 8/2002 Potter et al.
6,448,732 B1 9/2002 Block et al.
6,460,626 B2 10/2002 Carrier et al.
6,495,932 B1 12/2002 Nakagawa et al.
6,522,902 B2 2/2003 Nishihara et al.
6,536,536 B1 3/2003 Gass et al.
6,566,843 B2 5/2003 Takano et al.
6,573,621 B2 6/2003 Neumann et al.
6,577,097 B2 6/2003 Krefta et al.
6,580,235 B2 6/2003 Laurent et al.
6,581,696 B2 6/2003 Giardino et al.
6,624,535 B2 9/2003 Morrow et al.
6,674,180 B2 1/2004 Gale et al.
6,675,912 B2 1/2004 Carrier et al.
6,683,396 B2 1/2004 Ishida et al.
6,713,988 B2 3/2004 Dubac et al.
6,727,679 B2 4/2004 Kovarik et al.
6,731,022 B2 5/2004 Silverman et al.
6,753,673 B2 6/2004 Shiue et al.
6,761,229 B2 7/2004 Cripe et al.
6,765,317 B2 7/2004 Chu
6,860,341 B2 3/2005 Spielmann et al.
6,971,951 B2 12/2005 Boyer et al.
6,978,846 B2 12/2005 Kawai et al.
6,982,541 B2 1/2006 Zick et al.
6,983,810 B2 1/2006 Hara et al.
7,007,762 B2 3/2006 Yamamoto et al.
7,064,519 B2 6/2006 Ito et al.
7,085,123 B2 8/2006 Shiue et al.
7,090,030 B2 8/2006 Miller et al.
7,102,306 B2 9/2006 Hamaoka et al.
7,121,361 B2 10/2006 Hara et al.
7,157,870 B2 1/2007 Nakawa et al.
7,157,882 B2 1/2007 Johnson et al.
7,176,656 B2 2/2007 Feldmann et al.
7,193,385 B2 3/2007 Emadi et al.
7,196,911 B2 3/2007 Takano et al.
7,202,622 B2 4/2007 Eskritt et al.
7,210,541 B2 5/2007 Miller et al.
7,292,009 B2 11/2007 Kawakami et al.
7,327,120 B2 2/2008 Lin et al.
7,332,889 B2 2/2008 Glasgow et al.
7,385,366 B2 7/2008 Yukitake et al.
7,397,219 B2 7/2008 Phillips et al.
7,443,134 B2 10/2008 Phillips et al.
7,463,007 B2 12/2008 Phillips et al.
7,486,047 B2 2/2009 Phillips et al.
7,494,035 B2 2/2009 Weaver et al.
7,516,726 B2 4/2009 Esaka et al.
7,551,411 B2 6/2009 Woods et al.
7,621,652 B2 11/2009 Zick et al.
7,653,963 B2 2/2010 Cochran et al.
7,659,696 B2 2/2010 Zeiler et al.
7,696,721 B2 4/2010 Young et al.
7,723,954 B2 5/2010 Frucht
7,750,594 B2 7/2010 Clothier et al.
7,752,760 B2 7/2010 Baskar et al.
7,755,308 B2 7/2010 Kayikci et al.
7,821,217 B2 10/2010 Abolhassani et al.
8,025,418 B2 9/2011 Zick et al.
8,040,090 B2 10/2011 Kitagawa et al.
8,076,873 B1 12/2011 Lucas et al.

(56) References Cited

U.S. PATENT DOCUMENTS

| | | | |
|---|---|---|---|
| 8,136,254 | B2 | 3/2012 | Riddell et al. |
| 8,159,194 | B2 | 4/2012 | Mori et al. |
| 8,198,835 | B2 | 6/2012 | Yokoyama et al. |
| 8,212,504 | B2 | 7/2012 | Ogahara et al. |
| 8,222,863 | B2 | 7/2012 | Sakakibara |
| 8,241,235 | B2 | 8/2012 | Kahler et al. |
| 8,310,177 | B2 | 11/2012 | Naumann et al. |
| 8,376,667 | B2 | 2/2013 | Wilbert et al. |
| 8,378,632 | B2 | 2/2013 | Bourilkov et al. |
| 8,381,829 | B2 | 2/2013 | Hanawa et al. |
| 8,395,337 | B2 | 3/2013 | Onishi et al. |
| 8,410,756 | B2 | 4/2013 | Matsunaga |
| 8,424,213 | B2 | 4/2013 | Fukinuki et al. |
| 8,490,732 | B2 | 7/2013 | Sugimoto et al. |
| 8,564,236 | B2 | 10/2013 | Hirabayashi et al. |
| 8,587,230 | B2 | 11/2013 | Pant et al. |
| 8,601,640 | B2 | 12/2013 | Bertram et al. |
| 8,643,319 | B2 | 2/2014 | Celik et al. |
| 8,723,480 | B2 | 5/2014 | Lim et al. |
| 8,732,896 | B2 | 5/2014 | Lucas et al. |
| 8,733,470 | B2 | 5/2014 | Matthias et al. |
| 8,797,004 | B2 | 8/2014 | Skinner et al. |
| 8,813,866 | B2 | 8/2014 | Suzuki et al. |
| 8,847,532 | B2 | 9/2014 | Kawai et al. |
| 8,876,540 | B2 | 11/2014 | Lavender |
| 8,994,331 | B2 | 3/2015 | Kerfoot, Jr. et al. |
| 8,994,336 | B2 | 3/2015 | Brotto et al. |
| 9,041,322 | B2 | 5/2015 | Shimizu et al. |
| 9,112,360 | B2 | 8/2015 | Goto et al. |
| RE45,897 | E | 2/2016 | Naumann et al. |
| 9,406,915 | B2 * | 8/2016 | White .................. H02J 7/0024 |
| 10,056,582 | B2 * | 8/2018 | White ................ H01M 2/1022 |
| 2001/0017531 | A1 | 8/2001 | Sakakibara et al. |
| 2003/0090227 | A1 | 5/2003 | Ito et al. |
| 2003/0235060 | A1 | 12/2003 | Matsubara et al. |
| 2004/0140781 | A1 | 7/2004 | Craven et al. |
| 2004/0257038 | A1 | 12/2004 | Johnson et al. |
| 2005/0017686 | A1 | 1/2005 | Sakakibara et al. |
| 2005/0110458 | A1 | 5/2005 | Seman et al. |
| 2005/0156566 | A1 | 7/2005 | Thorsoe et al. |
| 2005/0193538 | A1 | 9/2005 | Quinn et al. |
| 2005/0200339 | A1 | 9/2005 | Phillips et al. |
| 2005/0247459 | A1 | 11/2005 | Voigt et al. |
| 2005/0263305 | A1 | 12/2005 | Shimizu et al. |
| 2005/0280393 | A1 | 12/2005 | Feldmann et al. |
| 2006/0157262 | A1 | 7/2006 | Chen et al. |
| 2006/0164032 | A1 | 7/2006 | Johnson et al. |
| 2006/0218768 | A1 | 10/2006 | Makimae et al. |
| 2006/0222930 | A1 | 10/2006 | Aradachi et al. |
| 2006/0225904 | A1 | 10/2006 | Chen et al. |
| 2006/0268504 | A1 | 11/2006 | Shimizu et al. |
| 2007/0034394 | A1 | 2/2007 | Gass et al. |
| 2007/0090796 | A1 | 4/2007 | Norris et al. |
| 2007/0152624 | A1 | 7/2007 | Hamaoka et al. |
| 2007/0159007 | A1 | 7/2007 | King et al. |
| 2008/0079319 | A1 | 4/2008 | Okada et al. |
| 2008/0182143 | A1 | 7/2008 | Dong et al. |
| 2008/0193832 | A1 | 8/2008 | Doffin et al. |
| 2008/0218917 | A1 | 9/2008 | Archer et al. |
| 2008/0266913 | A1 | 10/2008 | Brotto et al. |
| 2008/0284363 | A1 | 11/2008 | Lucas et al. |
| 2009/0108806 | A1 | 4/2009 | Takano et al. |
| 2009/0121550 | A1 | 5/2009 | Riviera et al. |
| 2010/0032468 | A1 | 2/2010 | Gross et al. |
| 2010/0181966 | A1 | 7/2010 | Sakakibara et al. |
| 2010/0244769 | A1 | 9/2010 | Sakakibara |
| 2010/0320969 | A1 | 12/2010 | Sakakibara et al. |
| 2011/0001456 | A1 | 1/2011 | Wang et al. |
| 2011/0012560 | A1 | 1/2011 | Sakakibara |
| 2011/0037423 | A1 | 2/2011 | Koda et al. |
| 2011/0043143 | A1 | 2/2011 | Alter et al. |
| 2011/0090726 | A1 | 4/2011 | Brotto et al. |
| 2011/0121782 | A1 | 5/2011 | Marsh et al. |
| 2011/0147031 | A1 | 7/2011 | Matthias et al. |
| 2011/0162219 | A1 | 7/2011 | Okouchi et al. |
| 2011/0250484 | A1 | 10/2011 | Meng et al. |
| 2011/0279070 | A1 | 11/2011 | Tanaka et al. |
| 2011/0279090 | A1 | 11/2011 | Bauer |
| 2011/0285352 | A1 | 11/2011 | Lim et al. |
| 2011/0291617 | A1 | 12/2011 | Rosenbecker et al. |
| 2012/0037385 | A1 | 2/2012 | Suzuki et al. |
| 2012/0048588 | A1 | 3/2012 | Iyoda et al. |
| 2012/0205984 | A1 | 8/2012 | Goto et al. |
| 2012/0239957 | A1 | 9/2012 | Hsiao et al. |
| 2012/0287691 | A1 | 11/2012 | Breuner et al. |
| 2012/0293128 | A1 | 11/2012 | Kim et al. |
| 2012/0321912 | A1 | 12/2012 | Hachisuka et al. |
| 2013/0002175 | A1 | 1/2013 | Shimizu et al. |
| 2013/0025893 | A1 | 1/2013 | Ota et al. |
| 2013/0044002 | A1 | 2/2013 | Schneider et al. |
| 2013/0082627 | A1 | 4/2013 | Ichikawa et al. |
| 2013/0106355 | A1 | 5/2013 | Kim et al. |
| 2013/0134787 | A1 | 5/2013 | Sakakibara |
| 2013/0162045 | A1 | 6/2013 | Weissenborn et al. |
| 2013/0164589 | A1 | 6/2013 | Ota et al. |
| 2013/0187461 | A1 | 7/2013 | Goto et al. |
| 2013/0293197 | A1 | 11/2013 | Sakakibara et al. |
| 2013/0314007 | A1 | 11/2013 | Yanagihara et al. |
| 2013/0320926 | A1 | 12/2013 | Kerfoot, Jr. et al. |
| 2013/0335012 | A1 | 12/2013 | Meyer et al. |
| 2014/0077605 | A1 | 3/2014 | Bulur et al. |
| 2014/0190017 | A1 | 7/2014 | Máynez et al. |
| 2014/0210379 | A1 | 7/2014 | Kato et al. |
| 2014/0361740 | A1 | 12/2014 | Suzuki et al. |
| 2015/0015205 | A1 | 1/2015 | Suzuki et al. |
| 2015/0137717 | A1 | 5/2015 | Ishikawa et al. |

FOREIGN PATENT DOCUMENTS

| | | |
|---|---|---|
| DE | 1175352 | 8/1964 |
| DE | 2412143 | 9/1975 |
| DE | 2838996 | 3/1980 |
| DE | 3844093 | 7/1990 |
| DE | 19747139 | 11/1998 |
| DE | 19907369 | 8/2000 |
| DE | 19963450 | 11/2000 |
| DE | 102006003454 | 8/2007 |
| DE | 102009046565 | 5/2011 |
| DE | 202012001853 | 5/2012 |
| DE | 202013102567 | 9/2013 |
| DE | 102012210662 | 12/2013 |
| DE | 202011110568 | 10/2014 |
| EP | 0024268 | 2/1981 |
| EP | 0170833 | 2/1986 |
| EP | 0310717 | 4/1989 |
| EP | 0310718 | 4/1989 |
| EP | 0372823 | 7/1990 |
| EP | 0609101 | 8/1994 |
| EP | 1266725 | 12/2002 |
| EP | 1381131 | 1/2004 |
| EP | 1469583 | 10/2004 |
| EP | 1898508 | 3/2008 |
| EP | 1903657 | 3/2008 |
| EP | 2200145 | 6/2010 |
| EP | 2246157 | 11/2010 |
| EP | 2397277 | 12/2011 |
| EP | 2132000 | 4/2012 |
| EP | 2495843 | 5/2012 |
| EP | 2554334 | 2/2013 |
| EP | 2554335 | 2/2013 |
| EP | 2704287 | 3/2014 |
| EP | 2747235 | 6/2014 |
| EP | 2913158 | 2/2015 |
| GB | 2399148 | 9/2004 |
| GB | 1403971.3 | 9/2015 |
| GB | PCT/GB2015/050651 | 9/2015 |
| JP | 4-183253 | 6/1992 |
| JP | 05236608 | 9/1993 |
| JP | 7337067 | 12/1995 |
| JP | 2000308268 | 11/2000 |
| JP | 2002315381 | 10/2002 |
| JP | 2012231655 | 11/2012 |
| WO | 9748922 | 12/1997 |
| WO | 9828831 | 7/1998 |

(56) References Cited

FOREIGN PATENT DOCUMENTS

| | | |
|---|---|---|
| WO | 9967869 | 12/1999 |
| WO | 2005099043 | 10/2005 |
| WO | 2007116239 | 10/2007 |
| WO | 2008155209 | 12/2008 |
| WO | 2009055360 | 4/2009 |
| WO | 2011099348 | 8/2011 |
| WO | 2011105794 | 9/2011 |
| WO | 2012039418 | 3/2012 |
| WO | 2013027772 | 2/2013 |
| WO | 2013187837 | 12/2013 |
| WO | 2014075285 | 5/2014 |
| WO | 2014119126 | 8/2014 |
| WO | 2014119128 | 8/2014 |
| WO | 2014119135 | 8/2014 |
| WO | 2014119188 | 8/2014 |
| WO | 2014119203 | 8/2014 |
| WO | 2014192372 | 12/2014 |
| WO | 2015132606 | 9/2015 |

OTHER PUBLICATIONS

ThunderVolt System Instruction Manual 1988.
PCT International Search Report, dated Aug. 7, 2015.
Thundervolt 12 & 24 Volt System Instruction Manual.
ThunderVolt Circular Saw Instruction Manual 1988.
Thunder Volt System VSR Dual Range Drill, VSR Dual Range Hammer Drill, VSR Scrudrill Instruction Manual 1989.
Notice of Allowance of U.S. Appl. No. 14/715,258 dated Jun. 9, 2016.
Notice of Allowance of U.S. Appl. No. 14/992,484 dated Oct. 19, 2016.
Notice of Allowance of U.S. Appl. No. 15/180,748 dated Oct. 24, 2016.
Non Final Office Action of U.S. Appl. No. 15/414,720 dated Apr. 11, 2017.
Notice of Allowance of U.S. Appl. No. 15/414,720 dated Nov. 2, 2017.
Extended EP Search Report dated Dec. 7, 2017 issued in corresponding EP application No. 17189460.3.

* cited by examiner low rated voltage configuration medium rated voltage configuration medium rated voltage configuration low rated voltage configuration

| | Power Connections | | | | Signal Connections | | | |
|---|---|---|---|---|---|---|---|---|
| **Converter element Travel between 1st configuration and 2nd configuration** | S1,S2 | S3, S4 | S5 | S6 | S7, S8 | S9, S10 | S11, S12 | S13, S14 |
| **0.0mm** | Closed | Closed | Open | Open | Closed | Closed | Closed | Closed |
| **2.5mm** | Closed | Closed | Open | Open | Closed | Closed | Closed | Closed |
| **3.0mm** | Open | Open | Open | Open | Closed | Closed | Closed | Closed |
| **3.5mm** | Open | Open | Open | Open | Open | Closed | Closed | Open |
| **4.0mm** | Open | Open | Open | Open | Open | Open | Open | Open |
| **5.5mm** | Open | Open | Open | Open | Open | Open | Open | Open |
| **6.0mm** | Open | Open | Closed | Closed | Open | Open | Open | Open |
| **8.0mm** | Open | Open | Closed | Closed | Open | Open | Open | Open |

FIG. 47

Low rated voltage:
SW1, SW2, SW3, SW4 closed
SW5, SW6, SW7 opened

Medium rated voltage:
SW1, SW2, SW3, SW4 opened
SW5, SW6, SW7 closed
TT1-TT3 present between
BT3 and BT1

MEDIUM RATED VOLTAGE MODE

LOW RATED VOLTAGE MODE

SUPPORT BOARD 761 - MANUFACTURING STEPS

STEP 2: BEND METAL POWER TRACES 790 IN PROGRESSIVE STAMPING DIE

SUPPORT BOARD 761 - MANUFACTURING STEPS

STEP 3: PLACE METAL POWER TRACES 790 INTO INJECTION MOLD, BY HAND

SUPPORT BOARD 761 - MANUFACTURING STEPS

STEP 4: INJECT PLASTIC INTO MOLD, E.G., 1.5mm THINCKNESS

TABLE 1
20V MODE
B- = 0V
C1 = 4V
C3 = 12V
C+ = 20V
Q11, Q12 CLOSED, BT1 CONNECTED TO C1
Q21, Q22 CLOSED, BT3 CONNECTED TO C3
60V MODE
B- = 20V
C1 = 4V
C3 = 12V
C+ = 20V
Q11, Q12 OPEN, BT1 ELECTROMECHANICALLY CONNECTED TO A- CONTACT PAD BY SWITCHING CONTACT
Q21, Q22 OPEN, BT3 ELECTROMECHANICALLY CONNECTED TO B+ CONTACT PAD BY SWITCHING CONTACT

723 – front view, housing transparent

734 – front view

723 — rear view, housing transparent

734 — rear view

723 – top view, housing transparent

734 – top view

20A4

20A4

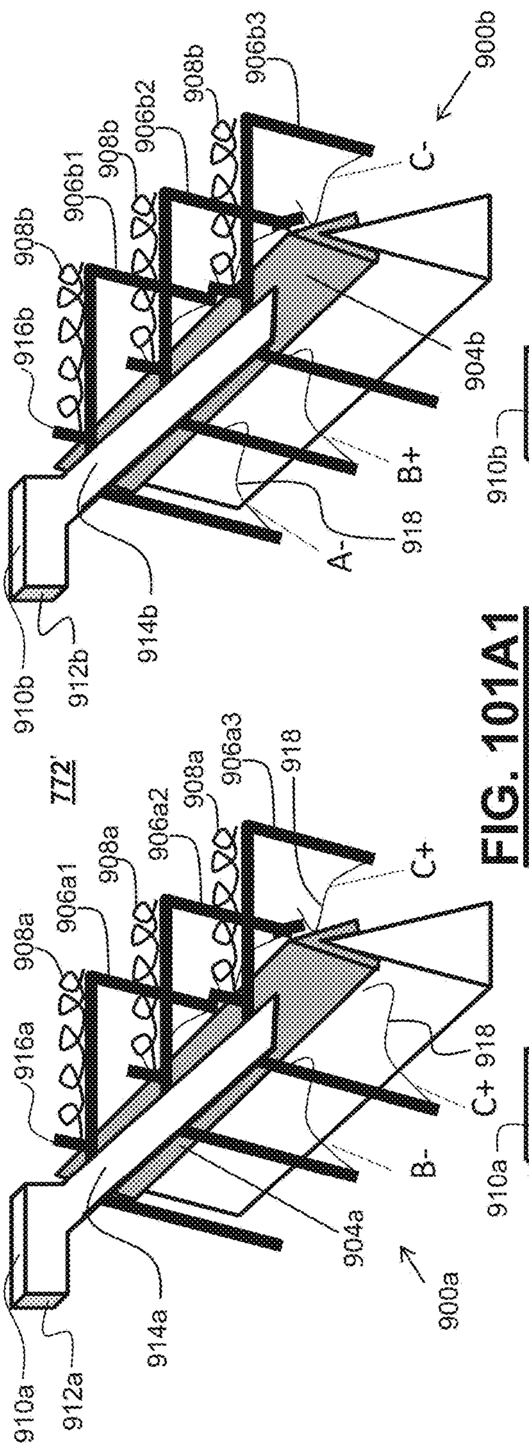
FIG. 101A1
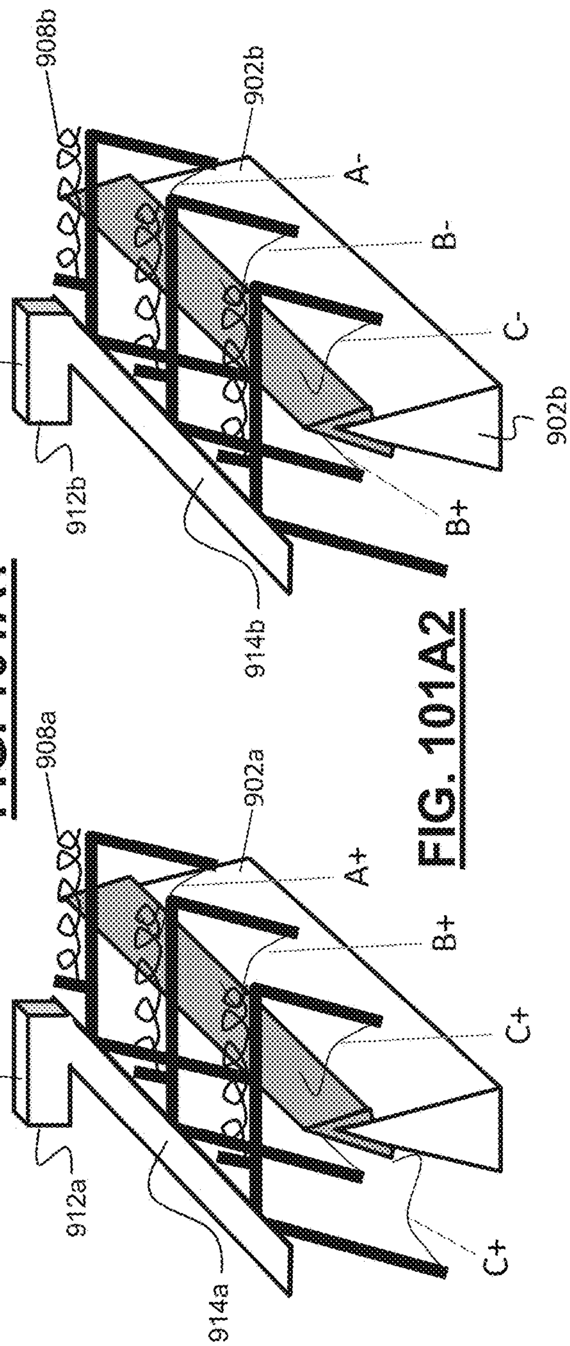
FIG. 101A2

772'
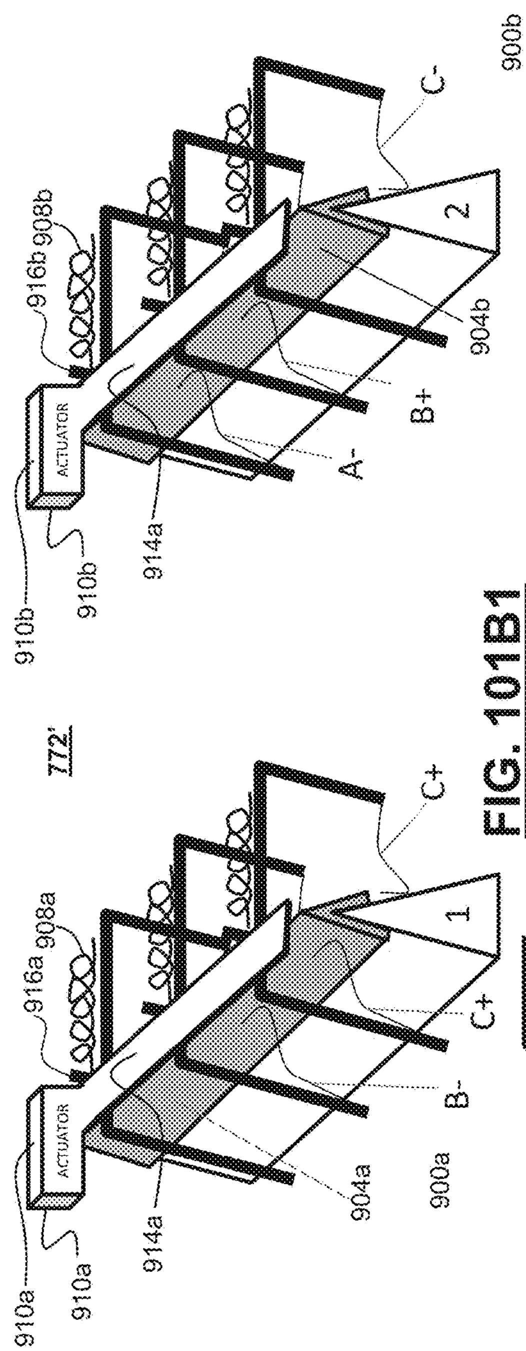
FIG. 101B1
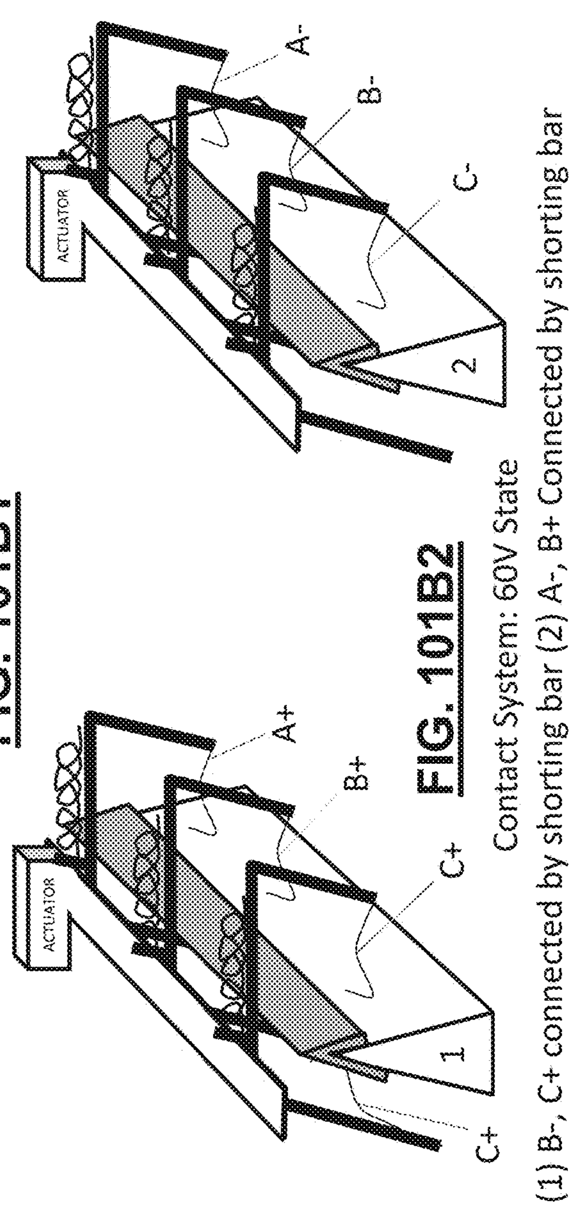
FIG. 101B2
Contact System: 60V State
(1) B-, C+ connected by shorting bar (2) A-, B+ Connected by shorting bar

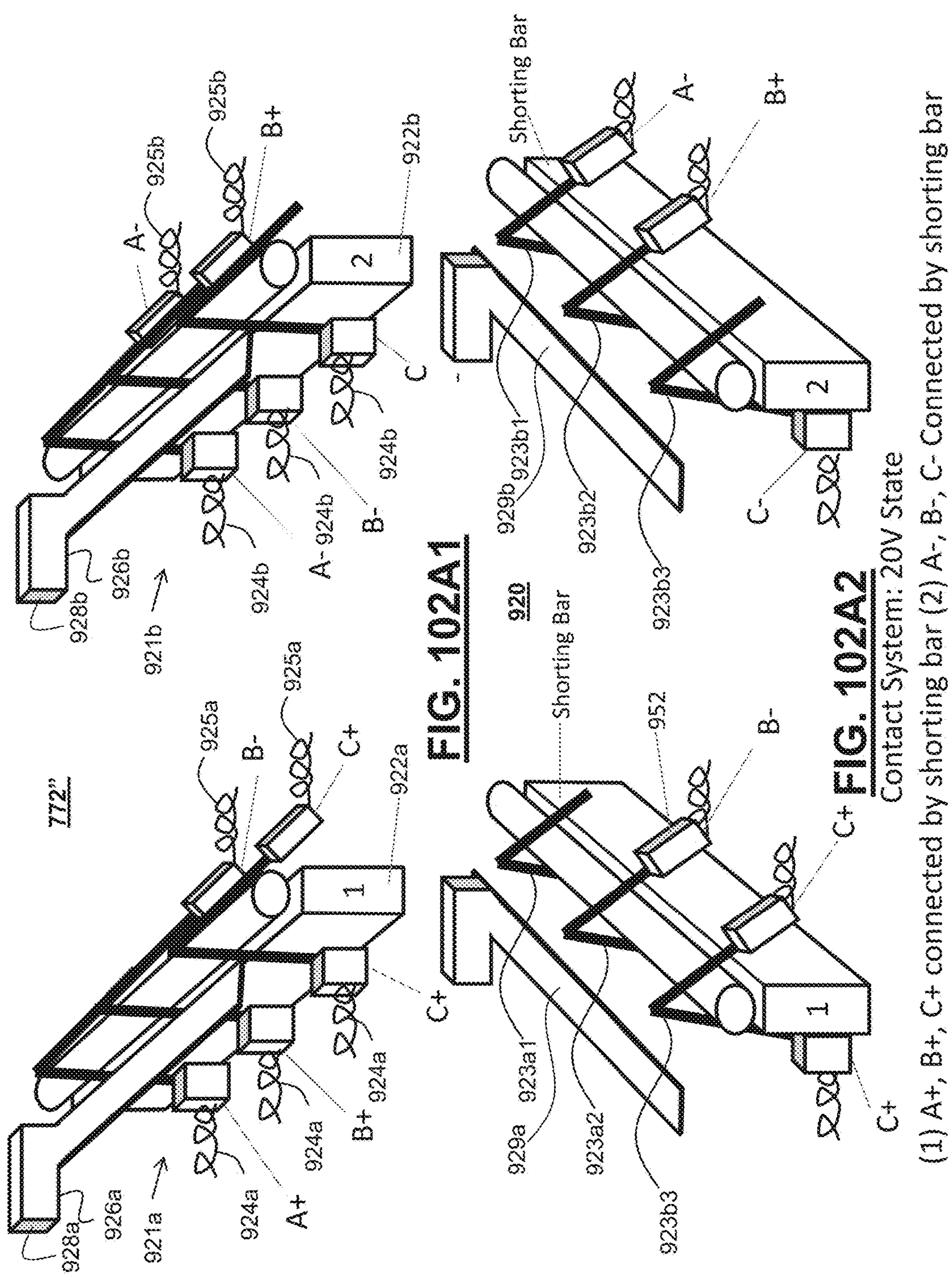
FIG. 102A1
FIG. 102A2
Contact System: 20V State
(1) A+, B+, C+ connected by shorting bar (2) A-, B-, C- Connected by shorting bar

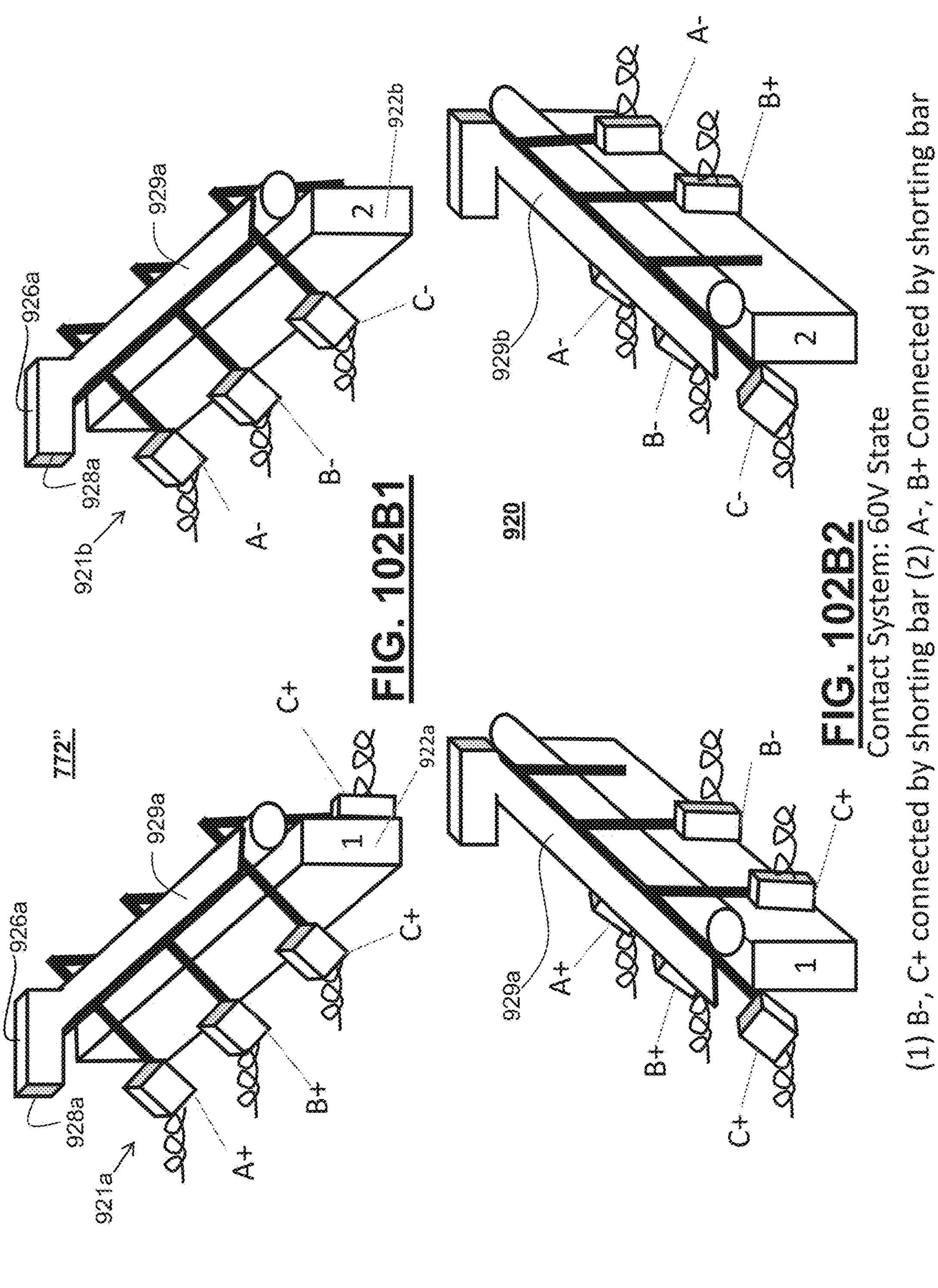
FIG. 102B1
FIG. 102B2
Contact System: 60V State
(1) B-, C+ connected by shorting bar (2) A-, B+ Connected by shorting bar Step 4

Step 5

Step 6

Step 7

CELL SWITCH FOR CONNECTING/DISCONNECTING BATTERY TERMINALS (BT) TO CELL TAPS (C) WHEN CONVERTING PACK BETWEEN LOW RATED VOLTAGE CONFIGURATION AND MEDIUM RATED CONFIGURATION
IN LOW RATED VOLTAGE CONFIGURATION THERE IS AN ELECTRONIC CONNECTION BETWEEN BT1-C1 AND BT3-C3
IN MEDIUM RATED VOLTAGE CONFIGURATION THERE IS A MECHANICAL CONNECTION BETWEEN BT1-B+ AND BT3-A-

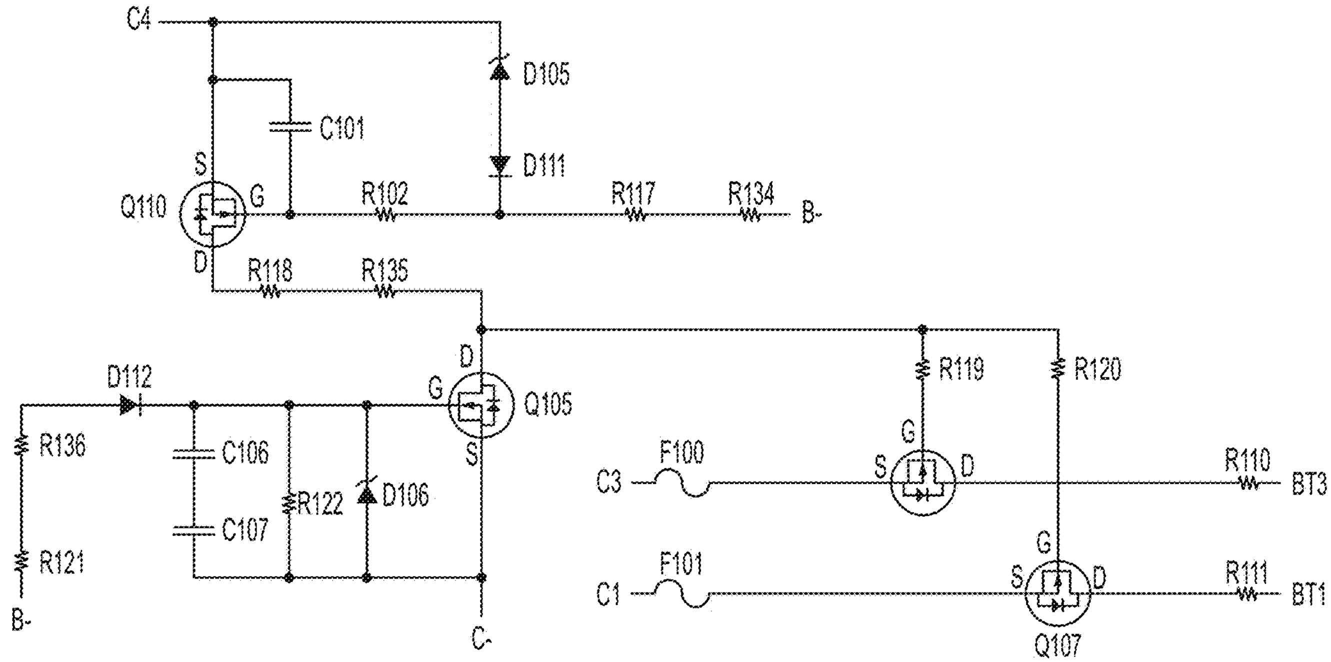

TABLE 2

| 20V | G | S | STATUS | | 60V | G | S | STATUS | |
|---|---|---|---|---|---|---|---|---|---|
| Q105 | B- | C- | OFF | | | B- | C- | ON | |
| Q110 | B- | C4 | ON | | | B- | C4 | OFF | |
| Q106 | C4 | C3 | ON | C3 ⟺ BT3 | | C- | C3 | OFF | C3 NOT CONNECTED TO BT3 |
| Q107 | C4 | C1 | ON | C1 ⟺ BT1 | | C- | C1 | OFF | C1 NOT CONNECTED TO BT1 |

FIG. 124C

ALTERNATE CELL SWITCH FOR CONNECTING/DISCONNECTING BATTERY TERMINALS (BT) TO CELL TAPS (C) WHEN CONVERTING PACK BETWEEN LOW RATED VOLTAGE CONFIGURATION AND MEDIUM RATED VOLTAGE CONFIGURATION.
IN LOW RATED VOLTAGE CONFIGURATION THERE IS AN ELECTRONIC CONNECTION BETWEEN BT1-C1 AND BT3-C3
IN MEDIUM RATED VOLTAGE CONFIGURATION THERE IS A MECHANICAL CONNECTION BETWEEN BT1-B+ AND BT3-A-

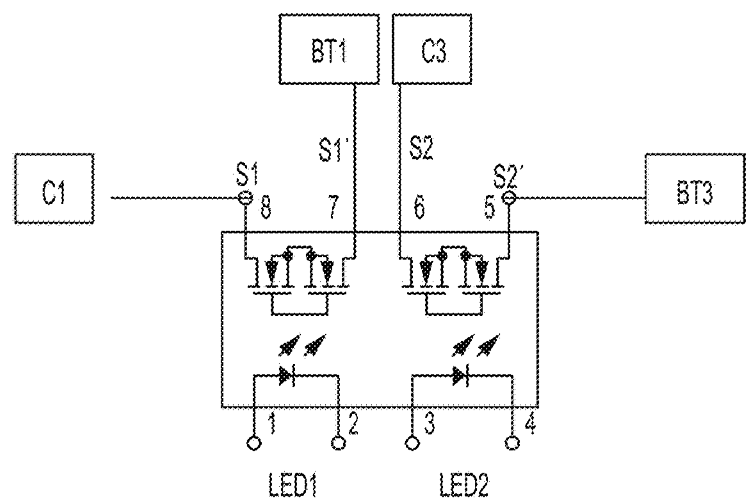

TABLE 3
IF B- = C- (LOW RATED VOLTAGE CONFIGURATION, E.G., 20V) THEN ENABLE LED1 AND LED2 AND CONNECT BT1 TO C1 AND BT3 TO C3
IF B- > C- (MEDIUM RATED VOLTAGE CONFIGURATION, E.G., 60V) THEN DISABLE LED1 AND LED2 AND DISCONNECT BT1 FROM C1 AND BT3 FROM C3

FIG. 125

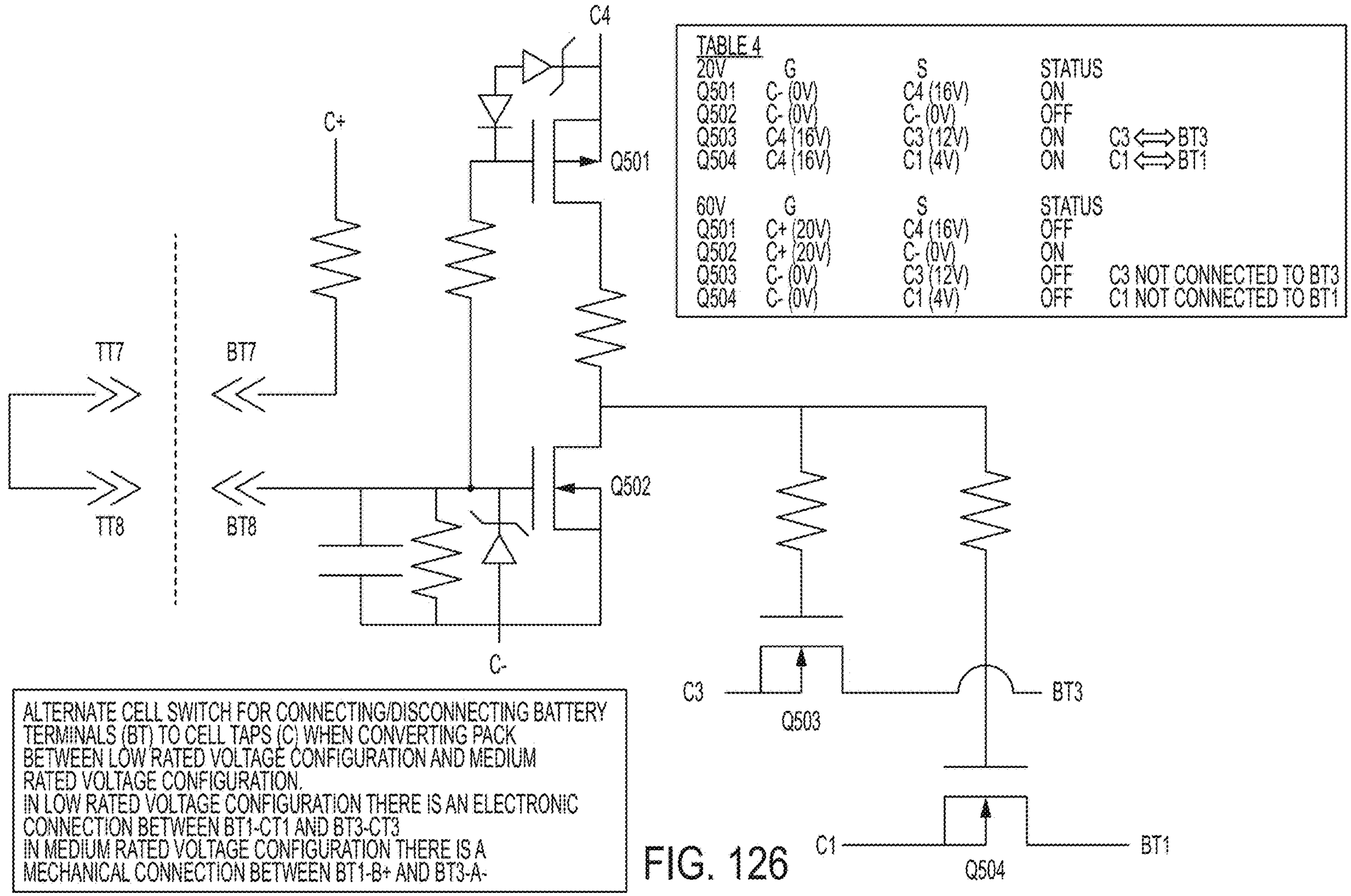

TABLE 4

| 20V | G | S | STATUS | |
|---|---|---|---|---|
| Q501 | C- (0V) | C4 (16V) | ON | |
| Q502 | C- (0V) | C- (0V) | OFF | |
| Q503 | C4 (16V) | C3 (12V) | ON | C3 ⟺ BT3 |
| Q504 | C4 (16V) | C1 (4V) | ON | C1 ⟺ BT1 |
| 60V | G | S | STATUS | |
| Q501 | C+ (20V) | C4 (16V) | OFF | |
| Q502 | C+ (20V) | C- (0V) | ON | |
| Q503 | C- (0V) | C3 (12V) | OFF | C3 NOT CONNECTED TO BT3 |
| Q504 | C- (0V) | C1 (4V) | OFF | C1 NOT CONNECTED TO BT1 |

ALTERNATE CELL SWITCH FOR CONNECTING/DISCONNECTING BATTERY TERMINALS (BT) TO CELL TAPS (C) WHEN CONVERTING PACK BETWEEN LOW RATED VOLTAGE CONFIGURATION AND MEDIUM RATED VOLTAGE CONFIGURATION.
IN LOW RATED VOLTAGE CONFIGURATION THERE IS AN ELECTRONIC CONNECTION BETWEEN BT1-CT1 AND BT3-CT3
IN MEDIUM RATED VOLTAGE CONFIGURATION THERE IS A MECHANICAL CONNECTION BETWEEN BT1-B+ AND BT3-A-

FIG. 126

CHARGING IN 60V - VARIABLE CHARGING TERMINATION CUTOFF VOLTAGE

TABLE 5
IC IN CHARGER CALCULATES: [60V EXAMPLE]
EQ. 1) (C2 - GROUNDED REFERENCE)/2 [2 CELLS = 8V];
EQ. 2) (C4 - GROUNDED REFERENCE)/4 [4 CELLS = 16V];
EQ. 3) (C1 - GROUNDED REFERENCE)/10 [10 CELLS = 40V];
EQ. 4) (CHARGER+ - GROUNDED REFERENCE)/15 [15 CELLS = 60V];

THEN IC CALCULATES :
(2) - (1) = $\Delta$21;
(3) - (1) = $\Delta$31;
(4) - (1) = $\Delta$41;
(3) - (2) = $\Delta$32;
(4) - (2) = $\Delta$42;
(4) - (3) = $\Delta$43;

IF ANY OF THE $\Delta$ ARE $\geq$ A PREDEFINED VALUE, E.G., 0.1V
THEN RESET PRIMARY TERMINATION CUTOFF VOLTAGE, E.G. 4.2V
OF THE CHARGER PRIMARY IC. THE NEW TERMINATION CUTOFF VOLTAGE IS RESET BASED
ON THE $\Delta$ => AS THE $\Delta$ INCREASES THE CUTOFF VOLTAGE DECREASES, E.G.
$\Delta$ = 0.1V THEN CUTOFF VOLTAGE RESET TO 4.1V;
$\Delta$ = 0.2V THEN CUTOFF VOLTAGE RESET TO 4.0V;
$\Delta$ = 0.3V THEN CUTOFF VOLTAGE RESET TO 3.9V;
$\Delta$ = 0.4V THEN CUTOFF VOLTAGE RESET TO 3.8V;

FIG. 128

TOOL TERMINAL BLOCK ENGAGED WITH BATTERY PACK

TOOL TERMINAL BLOCK ENGAGED WITH BATTERY PACK

CORDLESS POWER TOOL SYSTEM

CROSS REFERENCE TO RELATED APPLICATIONS

This is a continuation of U.S. patent application Ser. No. 15/818,001 filed Nov. 20, 2017 which is a divisional of U.S. patent application Ser. No. 15/414,720 filed Jan. 25, 2017, which is a continuation of U.S. patent application Ser. No. 14/992,484 filed Jan. 11, 2016, now U.S. Pat. No. 9,583,793 issued Feb. 28, 2017, which is a continuation of U.S. patent application Ser. No. 14/715,258 filed on May 18, 2015, which claims priority, under 35 U.S.C. § 119(e), to U.S. Provisional Application No. 61/994,953, filed May 18, 2014, titled "Power Tool System," U.S. Provisional Application No. 62/000,112, filed May 19, 2014, titled "Power Tool System," U.S. Provisional Application No. 62/046,546, filed Sep. 5, 2014, titled "Convertible Battery Pack," U.S. Provisional Application No. 62/118,917, filed Feb. 20, 2015, titled "Convertible Battery Pack," U.S. Provisional Application No. 62/091,134, filed Dec. 12, 2014, titled "Convertible Battery Pack," U.S. Provisional Application No. 62/114,645, filed Feb. 11, 2015, titled "Transport System for Convertible Battery Pack," U.S. Provisional Application No. 62/000,307, filed May 19, 2014, titled "Cycle-By-Cycle Current Limit for Power Tools Having a Brushless Motor," and U.S. Provisional Application No. 62/093,513, filed Dec. 18, 2014, titled "Conduction Band Control for Brushless Motors in Power Tools," each of which is incorporated by reference.

TECHNICAL FIELD

This application relates to a power tool system that includes various power tools and other electrical devices that are operable using various AC power supplies and DC power supplies.

BACKGROUND

Various types of electric power tools are commonly used in construction, home improvement, outdoor, and do-it-yourself projects. Power tools generally fall into two categories—AC power tools (often also called corded power tools) that can operate using one or more AC power supply (such as AC mains or a generator), and DC power tools (often also called cordless power tools) that can operate using one or more DC power supplies (such as removable and rechargeable battery packs).

Corded or AC power tools generally are used for heavy duty applications, such as heavy duty sawing, heavy duty drilling and hammering, and heavy duty metal working, that require higher power and/or longer runtimes, as compared to cordless power tool applications. However, as their name implies, corded tools require the use of a cord that can be connected to an AC power supply. In many applications, such as on construction sites, it is not practical to connect to an AC power supply and/or AC power must be generated by a separate AC power generator, e.g., a gasoline powered generator.

Cordless or DC power tools generally are used for lighter duty applications, such as light duty sawing, light duty drilling, fastening, that require lower power and/or shorter runtimes, as compared to corded power tool applications. Because cordless tools may be more limited in their power and/or runtime, they have not generally been accepted by the industry for many of the heavier duty applications. Cordless tools are also limited by weight since the higher voltage and/or capacity batteries tend to have greater weight, creating an ergonomic disadvantage.

AC power tools and DC power tools may also operate using many different types of motors and motor control circuits. For example, corded or AC power tools may operate using an AC brushed motor, a universal brushed motor (that can operate using AC or DC), or a brushless motor. The motor in a corded tool may have its construction optimized or rated to run on an AC voltage source having a rated voltage that is approximately the same as AC mains (e.g., 120V in the United States, 230V in much of Europe). The motors in AC or corded tools generally are controlled using an AC control circuit that may contain an on-off switch (e.g., for tools operating at substantially constant no-load speed) or using a variable speed control circuit such as a triac control circuit (e.g., for motors tools operating at a variable no-load speed). An example of a triac control circuit can be found in U.S. Pat. No. 7,928,673, which is incorporated by reference.

Cordless or DC power tools also may operate using many different types of motors and control circuits. For example, cordless or DC power tools may operate using a DC brushed motor, a universal brushed motor or a brushless motor. Since the batteries of cordless power tools tend to be at a lower rated voltage than the AC mains (e.g., 12V, 20V, 40V, etc.), the motors for cordless or DC power tools generally have their construction optimized or rated for use with a DC power supply having one or more of these lower voltages. Control circuits for cordless or DC power tools may include an on-off switch (e.g., for tools operating at substantially constant no-load speed) or a variable speed control circuit (e.g., for tools operating at a variable no-load speed). A variable speed control circuit may comprise, e.g., an analog voltage regulator or a digital pulse-width-modulation (PWM) control to control power delivery to the motor. An example of a PWM control circuit can be found in U.S. Pat. No. 7,821,217, which is incorporated by reference.

SUMMARY

In an aspect, a power tool system includes a first power tool having a low power tool rated voltage, a second power tool having a medium power tool rated voltage that is higher than the low power tool rated voltage, a third power tool having a high power tool rated voltage that is higher than the medium power tool rated voltage, a first battery pack having a low battery pack rated voltage that corresponds to the low power tool rated voltage, and a convertible battery pack. The convertible battery pack is operable in a first configuration in which the convertible battery pack has a convertible battery pack rated voltage that corresponds to the first power tool rated voltage, and in a second configuration in which the convertible battery pack has a second convertible battery pack rated voltage that corresponds to the second power tool rated voltage. The first battery pack is coupleable to the first power tool to enable operation of the first power tool. The convertible battery pack is coupleable to the first power tool in the first configuration to enable operation of the first power tool. The convertible battery pack is coupleable to the second power tool in the second configuration to enable operation of the second power tool. A plurality of the convertible battery packs are coupleable to the third power tool in their second configuration to enable operation of the third power tool.

Implementations of this aspect may include one or more of the following features. The third power tool may be alternatively coupleable to an AC power supply having a rated voltage that corresponds to a voltage rating of an AC mains power supply to enable operation of the third power tool using either the plurality of convertible battery packs or the AC power supply. The AC mains voltage rating may be approximately 100 volts to 120 volts or approximately 220 volts to 240 volts. The high power tool rated voltage may correspond to the voltage rating of the AC mains power supply. The system may further include a battery pack charger having a low charger rated voltage that corresponds to the low battery pack rated voltage and to the convertible battery pack rated voltage, wherein the battery pack charger is configured to be coupled to the first battery pack to charge the first battery pack, and to be coupled to the convertible battery pack when in the first configuration to charge the convertible battery pack.

The medium power tool rated voltage may be a whole number multiple of the low power tool rated voltage, and the high rated power tool rated voltage may be a whole number multiple of the medium power tool rated voltage. The low power tool rated voltage may be between approximately 17 volts to 20 volts, the medium power tool rated voltage may be between approximately 51 volts to 60 volts, and the high power tool rated voltage may be between approximately 102 volts to 120 volts. The first power tool may have been on sale prior to May 18, 2014, and the second power tool and the third power tool may have not been on sale prior to May 18, 2014. The first power tool may be a DC-only power tool, the second power tool may be a DC-only power tool, and the third power tool may be an AC/DC power tool.

The convertible battery pack may be automatically configured in the first configuration when coupled to the first power tool and may be automatically configured in the second configuration when coupled to the second power tool or the third power tool. The system may include a third battery pack having a medium battery pack rated voltage. The third battery pack may be coupleable to the second power tool to enable operation of the second power tool. A plurality of third battery packs may be coupleable to the third power tool to enable operation of the third power tool. The first battery pack may be incapable of enabling operation of the second power tool or the third power tool.

In another aspect, a power tool system includes a first battery pack having a first battery pack rated voltage and a convertible battery pack operable in a first configuration in which the convertible battery pack has a first battery pack rated voltage and in a second configuration in which the convertible battery pack has a second convertible battery pack rated voltage that is higher than the first convertible battery pack rated voltage. A first power tool has a first motor, a first motor control circuit, and a first power supply interface. The first power tool has a first power tool rated voltage that corresponds to the first battery pack rated voltage and the first convertible battery pack rated voltage. The first power tool is operable using either the first battery pack when the first power supply interface is coupled to the first battery pack or using the convertible battery pack when the first power supply interface is coupled to the convertible battery pack so that the convertible battery pack is in the first configuration. A second power tool has a second motor, a second motor control circuit, and a second power supply interface. The second power tool has a second power tool rated voltage that corresponds to the second convertible battery pack rated voltage. The second power tool is operable using the convertible battery pack when the second power supply interface is coupled to convertible battery pack so that the convertible battery pack is in the second configuration. A third power tool has a third motor, a third motor control circuit, and a third power supply interface. The third power tool has a third rated voltage that is a whole number multiple of the second convertible battery pack rated voltage. The third power tool is operable using a plurality of the convertible battery packs when the third power tool interface is coupled to the plurality of convertible battery packs so that the convertible battery packs each are in the second configuration.

Implementations of this aspect may include one or more of the following features. The third power supply interface of the third power tool may be alternatively coupleable to an AC power supply having a rated voltage that corresponds to a voltage rating of an AC mains power supply to enable operation of the third power tool using either the plurality of convertible battery packs or the AC power supply. The AC mains voltage rating may be approximately 100 volts to 120 volts or approximately 220 volts to 240 volts. The high power tool rated voltage may correspond to the voltage rating of the AC mains power supply.

The system may include a battery pack charger having a first charger rated voltage that corresponds to the first battery pack rated voltage and to the first convertible battery pack rated voltage. The battery pack charger may be configured to be coupled to the first battery pack to charge the first battery pack, and to be coupled to the convertible battery pack when in the first configuration to charge the convertible battery pack. The second power tool rated voltage may be a whole number multiple of the first power tool rated voltage. The first power tool rated voltage may be between approximately 17 volts to 20 volts, the second power tool rated voltage may be between approximately 51 volts to 60 volts, and the third power tool rated voltage is between approximately 100 volts to 120 volts. The first power tool may have been on sale prior to May 18, 2014, and the second power tool and the third power tool may have not been on sale prior to May 18, 2014.

The first power tool may be a DC-only power tool. The second power tool may be a DC-only power tool. The third power tool may be an AC/DC power tool. The convertible battery pack may be automatically configured in the first configuration when coupled to the first power tool and may be automatically configured in the second configuration when coupled to the second power tool or the third power tool. The system may include a third battery pack having a third battery pack rated voltage that corresponds to the second power tool rated voltage. The third battery pack may be coupleable to the second power tool to enable operation of the second power tool and a plurality of third battery packs may be coupleable to the third power tool to enable operation of the third power tool. The first battery pack may be incapable of enabling operation of the second power tool or the third power tool.

In another aspect, a power tool includes a power supply interface, a motor, and a motor control circuit. The power supply interface is configured to receive AC power from an AC power supply having a rated AC voltage that corresponds to an AC mains rated voltage, and to receive DC power from one or more removable battery packs having a total rated DC voltage that also corresponds to the AC mains rated voltage. The motor has a rated voltage that corresponds to the rated AC voltage and to the rated DC voltage. The motor is operable using both the AC power from the AC power supply and the DC power from the DC power supply. The motor control circuit is configured to control operation of the motor using one of the AC power and the DC power, without reducing a magnitude of the rated AC voltage, without reducing the magnitude of the rated DC voltage, and without converting the DC power to AC power.

Implementations of this aspect may include one or more of the following features. The rated AC voltage may be between approximately 100 volts and 120 volts. The DC rated voltage may be between approximately 102 volts and approximately 120 volts. The motor rated voltage is approximately 100 volts and 120 volts. The rated AC voltage may encompass an RMS voltage of 120 VAC and the rated DC voltage may encompass a nominal voltage of 120 volts. The rated AC voltage may encompass an average voltage of approximately 108 volts and the rated DC voltage may encompass a nominal voltage of approximately 108 volts. The AC power supply may include AC mains.

The one or more removable battery packs may include at least two removable battery packs. The at least two battery packs may be connected to each other in series. Each battery pack may have a rated DC voltage that is approximately half of the rated AC voltage. The motor may be a universal motor. The control circuit may be configured to operate the universal motor at a constant no load speed. The control circuit is configured to operate the universal motor at a variable no load speed based upon a user input. The motor may include a brushless motor.

In another aspect, a power tool system includes a DC power supply and a power tool. The DC power supply includes one or more battery packs that together have a rated DC voltage that corresponds to an AC mains rated voltage. The power tool has a power supply interface, a motor, and a motor control circuit. The power supply interface is configured to receive AC power from an AC power supply having the AC mains rated voltage and to receive DC power from the DC power supply. The motor has a rated voltage that corresponds to the AC mains rated voltage and to the rated DC voltage. The motor is operable using both the AC power from the AC mains power supply and the DC power from the DC power supply. The motor control circuit is configured to control operation of the motor using one of the AC power and the DC power, without reducing a magnitude of the rated AC voltage, without reducing the magnitude of the rated DC voltage, and without converting the DC power to AC power.

Implementations of this aspect may include one or more of the following features. The rated AC voltage may be between approximately 100 volts and 120 volts. The DC rated voltage may be between approximately 102 volts and approximately 120 volts. The motor rated voltage is approximately 100 volts and 120 volts. The rated AC voltage may encompass an RMS voltage of 120 VAC and the rated DC voltage may encompass a nominal voltage of 120 volts. The rated AC voltage may encompass an average voltage of approximately 108 volts and the rated DC voltage may encompass a nominal voltage of approximately 108 volts. The AC power supply may include AC mains.

The one or more removable battery packs may include at least two removable battery packs. The at least two battery packs may be connected to each other in series. Each battery pack may have a rated DC voltage that is approximately half of the rated AC voltage. The motor may be a universal motor. The control circuit may be configured to operate the universal motor at a constant no load speed. The control circuit is configured to operate the universal motor at a variable no load speed based upon a user input. The motor may include a brushless motor.

In another aspect, a power tool includes a power supply interface, a motor, and a motor control circuit. The a power supply interface is configured to receive AC power from an AC mains power supply having a rated AC voltage and to receive DC power from a DC power supply comprising one or more battery packs together having a rated DC voltage that is different from the rated AC voltage. The motor has a rated voltage that corresponds to one of the rated AC voltage and the rated DC voltage. The motor is operable using both the AC power from the AC power supply and the DC power from the DC power supply. The motor control circuit is configured to enable operation of the motor using one of the AC power and the DC power, such that the motor substantially the same output speed performance when operating using the AC power supply and the DC power supply.

Implementations of this aspect may include one or more of the following features. The rated DC voltage may be less than the rated AC voltage. The rated AC voltage may be approximately 100 volts to 120 volts and the rated DC voltage may be less than 100 volts. The rated DC voltage may be approximately 51 volts to 60 volts. The rated AC voltage may be less than the rated DC voltage. The one or more battery packs may include two battery packs connected to one another in series, wherein each battery pack has a rated voltage that is approximately half of the rated AC voltage. The motor may be a universal motor. The control circuit may operate the universal motor at a constant no load speed. The control circuit may operate the universal motor at a variable no load speed based upon a user input. The control circuit may optimize a range of pulse-width-modulation according to the rated voltages of the AC power supply and the DC power supply so that the motor substantially the same output speed performance when operating using the AC power supply and the DC power supply. The motor may be a brushless motor. The control circuit may use at least one of cycle-by-cycle current limiting, conduction band control, and advance angle control such that the motor substantially the same output speed performance when operating using the AC power supply and the DC power supply.

In another aspect, a power tool includes a means for receiving AC power from an AC mains power supply having a rated AC voltage and a means for receiving DC power from a DC power supply comprising one or more battery packs together having a rated DC voltage that is different from the rated AC voltage. The power tool also has a motor having a rated voltage that corresponds to the higher of the rated AC voltage and the rated DC voltage. The motor is operable using both the AC power from the AC power supply and the DC power from the DC power supply. The power tool also has means for operating the motor using one of the AC power and the DC power, such that the motor substantially the same output speed performance when operating using the AC power supply and the DC power supply.

Implementations of this aspect may include one or more of the following features. The rated DC voltage may be less than the rated AC voltage. The rated AC voltage may be approximately 100 volts to 120 volts and the rated DC voltage may be less than 100 volts. The rated DC voltage may be approximately 51 volts to 60 volts. The rated AC voltage may be less than the rated DC voltage. The one or more battery packs may include two battery packs connected to one another in series, wherein each battery pack has a rated voltage that is approximately half of the rated AC voltage. The motor may be a universal motor. The means for operating the motor may operate the universal motor at a constant no load speed. The means for operating the motor may operate the universal motor at a variable no load speed based upon a user input. The means for operating the motor may optimize a range of pulse-width-modulation according to the rated voltages of the AC power supply and the DC power supply so that the motor substantially the same output speed performance when operating using the AC power supply and the DC power supply. The motor may be a brushless motor. The means for operating the motor may use at least one of cycle-by-cycle current limiting, conduction band control, and advance angle control such that the motor substantially the same output speed performance when operating using the AC power supply and the DC power supply.

In another aspect, a power tool system includes a first power tool having a first power tool rated voltage, a second power tool having a second power tool rated voltage that is different from the first power tool rated voltage, and a first battery pack coupleable to the first power tool and to the second power tool. The first battery pack is switchable between a first configuration having a first battery pack rated voltage that corresponds to the first power tool rated voltage such that the first battery pack enables operation of the first power tool, and a second configuration having a convertible battery pack rated voltage that corresponds to the second power tool rated voltage such that the battery pack enables operation of the second power tool.

Implementations of this aspect may include one or more of the following features. The system may include a second removable battery pack having the first battery pack rated voltage and configured to be coupled to the first power tool to enable operation of the first power tool, but that does not enable operation of the second power tool. The second power tool rated voltage may be greater than the first power tool rated voltage. The first power tool rated voltage may be a whole number multiple of the second power tool rated voltage. The first power tool rated voltage may be approximately 17 volts to 20 volts and the second power tool rated voltage range may be approximately 51 volts to 60 volts. The first power tool may have been on sale prior to May 18, 2014, and the second power tool may not have been on sale prior to May 18, 2014. The first power tool may be a DC-only power tool and the second power tool may be a DC-only power tool or an AC/DC power tool. The second power may be alternatively coupleable to an AC power supply having a rated voltage that corresponds to a voltage rating of an AC mains power supply to enable operation of the second power tool using either the convertible battery pack or the AC power supply.

According to another aspect of the invention, a power tool is provided comprising: a housing; an electric universal motor having a positive terminal, a negative terminal, and a commutator engaging a pair of brushes coupled to the positive and the negative terminals, the motor being configured to operate within an operating voltage range of approximately 90V to 132V; a power supply interface arranged to receive at least one of AC power from an AC power supply having a first nominal voltage or DC power from a DC power supply having a second nominal voltage, the DC power supply comprising at least one removable battery pack coupled to the power supply interface, the power supply interface configured to output the AC power via an AC power line and the DC power via a DC power line, wherein the first and second nominal voltages fall approximately within the operating voltage range of the motor; and a motor control circuit configured to supply electric power from one of the AC power line or the DC power line via a common node to the motor such that the brushes are electrically coupled to one of the AC or DC power supplies.

In an embodiment, the motor control circuit comprises an ON/OFF switch arranged between the common node of the AC and DC power lines and the motor.

In an embodiment, the motor control circuit comprises a control unit coupled to a power switch arranged on the DC power line. In an embodiment, the control unit is configured to monitor a fault condition associated with the DC power supply and turn the power switch off to cut off a supply of power from the DC power supply to the motor.

In an embodiment, the power tool further comprises a power supply switching unit arranged to isolate the AC power line and the DC power line. In an embodiment, the power supply switching unit comprises a relay switch arranged on the DC power line and activated by a coil coupled to the AC power line. In an embodiment, the power supply switching unit comprises at least one double-pole double-throw switch arranged between the common node of the AC and DC power lines and the power supply interface. In an embodiment, the power supply switching unit comprises at least one single-pole double-throw switch having an output terminal coupled to the common node of the AC and DC power lines.

In an embodiment, the DC power supply comprises a high rated voltage battery pack.

In an embodiment, the DC power supply comprises at least two medium-rated voltage battery packs and the power supply interface is configured to connect two or more of the at least two battery packs in series.

According to another aspect of the invention, the power tool described above is a variable-speed tool, as described herein.

In an embodiment, the power tool further comprises: a DC switch circuit arranged between the DC power line and the motor; an AC switch arranged between the AC power line and the motor; and a control unit configured to control a switching operation of the DC switch circuit or the AC switch to control a speed of the motor enabling variable speed operation of the motor at constant torque.

In an embodiment, the DC switch circuit comprises one or more controllable semiconductor switches configured in at least one of a chopper circuit, a half-bridge circuit, or a full-bridge circuit, and the control unit is configured to control a pulse-width modulation (PWM) duty cycle of the one or more semiconductor switches according to a desired speed of the motor.

In an embodiment, the AC switch comprises a phase controlled switch comprising at least one of a triac, a thyristor, or a SCR switch, and the control unit is configured to control a phase of the AC switch according to a desired speed of the motor.

In an embodiment, the control unit is configured to sense current on one of the AC power line or the DC power line to set a mode of operation to one of an AC mode of operation or a DC mode of operation, and control the switching operation of one or the other of the DC switch circuit or the AC switch based on the mode of operation.

In an alternative embodiment, the power tool further comprises: a power switching unit comprising a diode bridge and a controllable semiconductor switch nested within the diode bridge, wherein the AC and DC power lines of the power supply interface are jointly coupled to a first node of the diode bridge and the motor is coupled to a second node of the diode bridge; and a control unit configured to control a switching operation of the semiconductor switch to control a speed of the motor enabling variable speed operation of the motor at constant torque.

In an embodiment, the control unit is configured to sense current on one of the AC power line or the DC power line to set a mode of operation to one of an AC mode of operation or a DC mode of operation, and control the switching operation of the semiconductor switch according to the mode of operation.

In an embodiment, in the DC mode of operation, the control unit is configured to set a pulse-width modulation (PWM) duty cycle according to a desired speed of the motor and turn the semiconductor switch on and off periodically in accordance with the PWM duty cycle.

In an embodiment, in the AC mode of operation, the control unit is configured to set a conduction band according to a desired speed of the motor and, within each AC line half-cycle, turn the semiconductor switch ON at approximately the beginning of the conduction band and turn the semiconductor switch OFF at approximately a zero crossing of the AC power line.

In an embodiment, the power tool further comprises a second semiconductor switch and a freewheel diode disposed in series with the motor to allow a current path for a motor current during an off-cycle of the semiconductor switch in the DC mode of operation.

In an embodiment, the semiconductor switch comprises one of a field effect transistor (FET) or an insulated gate bipolar transistor (IGBT).

In an embodiment, the diode bridge is arranged to rectify the AC power line through the semiconductor switch, but not through the motor.

In an embodiment, the semiconductor switching unit is arranged between the common node of the AC and DC power lines.

According to another aspect of the invention, a power tool is provided comprising: a housing; a universal motor having a positive terminal, a negative terminal, and a commutator engaging a pair of brushes coupled to the positive and the negative terminals, the motor being configured to operate within an operating voltage range; a power supply interface arranged to receive at least one of AC power from an AC power supply having a first nominal voltage or DC power from a DC power supply having a second nominal voltage, the DC power supply comprising at least one removable battery pack coupled to the power supply interface, the power supply interface configured to output the AC power via an AC power line and the DC power via a DC power line, wherein the second nominal voltage falls approximately within the operating voltage range of the motor, but the first nominal voltage is substantially higher than the operating voltage range of the motor; and a motor control circuit configured to supply electric power from one of the AC power line or the DC power line via a common node to the motor such that the brushes are electrically coupled to one of the AC or DC power supplies, the motor control circuit being configured to reduce a supply of power from the AC power line to the motor to a level corresponding to the operating voltage of the operating voltage range of the motor.

In an embodiment, the motor control circuit comprises an AC switch disposed in series with the AC power line, and a control unit configured to control a phase of the AC power line via the AC switch and set a fixed conduction band of the AC switch to reduce an average voltage amount on the AC line to a level corresponding to the operating voltage range of the motor to a level corresponding to the operating voltage range of the motor.

In an embodiment, the motor control circuit comprises an ON/OFF switch arranged between the common node of the AC and DC power lines and the motor.

In an embodiment, the motor control circuit comprises a control unit coupled to a power switch arranged on the DC power line. In an embodiment, the control unit is configured to monitor a fault condition associated with the DC power supply and turn the power switch off to cut off a supply of power from the DC power supply to the motor.

In an embodiment, the power tool further comprises a power supply switching unit arranged to isolate the AC power line and the DC power line. In an embodiment, the power supply switching unit comprises a relay switch arranged on the DC power line and activated by a coil coupled to the AC power line. In an embodiment, the power supply switching unit comprises at least one double-pole double-throw switch arranged between the common node of the AC and DC power lines and the power supply interface. In an embodiment, the power supply switching unit comprises at least one single-pole double-throw switch having an output terminal coupled to the common node of the AC and DC power lines.

In an embodiment, the DC power supply comprises a high rated voltage battery pack.

In an embodiment, the DC power supply comprises at least two medium-rated voltage battery packs and the power supply interface is configured to connect two or more of the at least two battery packs in series. In an embodiment, the operating voltage range of the motor is approximately within a range of 100V to 120V encompassing the second nominal voltage, and the first nominal voltage is in the range of 220 VAC to 240 VAC. In an embodiment, the control unit is configured to set the fixed conduction band of the AC switch to a value within the range of 100 to 140 degrees.

In an embodiment, the operating voltage range of the motor is approximately within a range of 60V to 90V encompassing the second nominal voltage, and the first nominal voltage is in the range of 100 VAC to 120 VAC. In an embodiment, the control unit is configured to set the fixed conduction band of the AC switch to a value within the range of 70 to 110 degrees.

In an embodiment, the control unit is configured to operate the tool at constant speed at the fixed conduction band.

In an embodiment, the AC switch includes a phase controlled switch comprising one of a triac, a thyristor, or a SCR switch, and the controller is configured to control a phase of the AC switch according to a desired speed of the motor.

According to another aspect of the invention, the power tool described above is a variable-speed power tool, as described herein.

According to an embodiment, the motor control circuit further comprising a DC switch circuit arranged between the DC power line and the motor, wherein the control unit is configured to control a switching operation of the DC switch circuit or the AC switch to control a speed of the motor enabling variable speed operation of the motor at constant load.

According to an embodiment, the DC switch circuit comprises one or more controllable semiconductor switches configured in at least one of a chopper circuit, a half-bridge circuit, or a full-bridge circuit, and the control unit is configured to control a pulse-width modulation (PWM) duty cycle of the one or more semiconductor switches according to a desired speed of the motor.

According to an embodiment, the control unit is configured to vary a conduction angle of the AC switch from zero up to the fixed conduction band according to a desired speed of the motor.

According to an embodiment, the control unit is configured to sense current on one of the AC power line or the DC power line to set a mode of operation to one of an AC mode of operation or a DC mode of operation, and control the switching operation of one or the other of the DC switch circuit or the AC switch based on the mode of operation.

According to an embodiment, the motor control circuit comprises: a power switching unit including a diode bridge and a controllable semiconductor switch nested within the diode bridge, wherein the AC and DC power lines of the power supply interface are jointly coupled to a first node of the diode bridge and the motor is coupled to a second node of the diode bridge; and a control unit configured to control a switching operation of the semiconductor switch to control a speed of the motor enabling variable speed operation of the motor at constant load, wherein the control unit is configured to control a phase of the AC power line via the semiconductor switch.

In an embodiment, the control unit is configured to sense current on one of the AC power line or the DC power line to set a mode of operation to one of an AC mode of operation or a DC mode of operation, and control the switching operation of the semiconductor switch in one of an AC mode or a DC mode of operation according to the mode of operation.

In an embodiment, in the DC mode of operation, the control unit is configured to set a pulse-width modulation (PWM) duty cycle according to a desired speed of the motor and turn the semiconductor switch on and off periodically in accordance with the PWM duty cycle.

In an embodiment, in the AC mode of operation, the control unit is configured to set a maximum conduction band corresponding to the operating voltage range of the motor.

In an embodiment, the control unit is configured to set a conduction band according to a desired speed of the motor from zero up to the maximum conduction band and in proportion thereto, and within each AC line half-cycle, turn the semiconductor switch ON at approximately the beginning of the conduction band and turn the semiconductor switch OFF at approximately a zero crossing of the AC power line.

In an embodiment, the operating voltage range of the motor is approximately within a range of 100V to 120V encompassing the second nominal voltage, and the first nominal voltage is in the range of 220 VAC to 240 VAC. In an embodiment, the control unit is configured to set the maximum conduction band to a value within the range of 100 to 140 degrees.

In an embodiment, the operating voltage range of the motor is approximately within a range of 60V to 100V encompassing the second nominal voltage, and the first nominal voltage is in the range of 100 VAC to 120 VAC. In an embodiment, the control unit is configured to set the maximum conduction band of the AC switch to a value within the range of 70 to 110 degrees.

In an embodiment, the diode bridge is arranged to rectify the AC power line through the semiconductor switch, but not through the motor.

In an embodiment, the motor control circuit further comprising a second semiconductor switch and a freewheel diode disposed in series with the motor to allow a current path for a motor current during an off-cycle of the semiconductor switch in the DC mode of operation.

In an embodiment, the semiconductor switch comprises one of a field effect transistor (FET) or an insulated gate bipolar transistor (IGBT).

According to another aspect of the invention, a power tool is provided comprising: a housing; an electric universal motor having a positive terminal, a negative terminal, and a commutator engaging a pair of brushes coupled to the positive and the negative terminals; a power supply interface arranged to receive at least one of AC power from an AC power supply or DC power from a DC power supply, and to output the AC power via an AC power line and the DC power via a DC power line; a power switching unit comprising a diode bridge and a controllable semiconductor switch nested within the diode bridge, wherein the AC and DC power lines of the power supply interface are jointly coupled to a first node of the diode bridge and the motor is coupled to a second node of the diode bridge; and a control unit configured to control a switching operation of the semiconductor switch to control a speed of the motor enabling variable speed operation of the motor at constant torque.

In an embodiment, the control unit is configured to sense current on one of the AC power line or the DC power line to set a mode of operation to one of an AC mode of operation or a DC mode of operation, and control the switching operation of the semiconductor switch according to the mode of operation.

In an embodiment, in the DC mode of operation, the control unit is configured to set a pulse-width modulation (PWM) duty cycle according to a desired speed of the motor and turn the semiconductor switch on and off periodically in accordance with the PWM duty cycle.

In an embodiment, in the AC mode of operation, the control unit is configured to set a conduction band according to a desired speed of the motor and, within each AC line half-cycle, turn the semiconductor switch ON at approximately the beginning of the conduction band and turn the semiconductor switch OFF at approximately a zero crossing of the AC power line.

In an embodiment, the power tool further comprises a second semiconductor switch and a freewheel diode disposed in series with the motor to allow a current path for a motor current during an off-cycle of the semiconductor switch in the DC mode of operation.

In an embodiment, the semiconductor switch comprises one of a field effect transistor (FET) or an insulated gate bipolar transistor (IGBT).

In an embodiment, the diode bridge is arranged to rectify the AC power line through the semiconductor switch, but not through the motor.

In an embodiment, the power switching unit is arranged between the common node of the AC and DC power lines.

According to another aspect of the invention, a power tool is provided comprising: a housing; an electric direct-current (DC) motor having a positive terminal, a negative terminal, and a commutator engaging a pair of brushes coupled to the positive and the negative terminals, the motor being configured to operate within an operating voltage range within a range of approximately 90V to 132V; a power supply interface arranged to receive at least one of AC power from an AC power supply having a first nominal voltage or DC power from a DC power supply having a second nominal voltage, the DC power supply comprising at least one removable battery pack coupled to the power supply interface, the power supply interface configured to output the AC power via an AC power line and the DC power via a DC power line, wherein the first and second nominal voltages fall approximately within the operating voltage range of the motor; and a motor control circuit including a rectifier circuit configured to rectify an alternating signal to a rectified signal on the AC power line, the motor control circuit being configured to supply electric power from one of the AC power line or the DC power line via a common node to the motor such that the brushes are electrically coupled to one of the AC or DC power supplies.

In an embodiment, the rectifier circuit includes a full-wave diode bridge rectifier.

In an embodiment, the motor control circuit comprises an ON/OFF switch arranged between the common node of the AC and DC power lines and the motor.

In an embodiment, the motor control circuit comprises a control unit coupled to a power switch arranged on the DC power line. In an embodiment, the control unit is configured to monitor a fault condition associated with the DC power supply and turn the power switch off to cut off a supply of power from the DC power supply to the motor.

In an embodiment, the power tool further comprises a power supply switching unit arranged to isolate the AC power line and the DC power line. In an embodiment, the power supply switching unit comprises a relay switch arranged on the DC power line and activated by a coil coupled to the AC power line. In an embodiment, the power supply switching unit comprises at least one double-pole double-throw switch arranged between the common node of the AC and DC power lines and the power supply interface. In an embodiment, the power supply switching unit comprises at least one single-pole double-throw switch having an output terminal coupled to the common node of the AC and DC power lines.

In an embodiment, the DC power supply comprises a high rated voltage battery pack.

In an embodiment, the DC power supply comprises at least two medium-rated voltage battery packs and the power supply interface is configured to connect two or more of the at least two battery packs in series.

According to another aspect of the invention, the power tool described above is a variable-speed tool, as described herein.

In an embodiment, the power tool further comprises: a switching circuit arranged between the common node of the AC and DC power lines and the motor; and a control unit configured to control a switching operation of the switching circuit to control a speed of the motor enabling variable speed operation of the motor at constant torque.

In an embodiment, the switching circuit comprises one or more controllable semiconductor switches configured in at least one of a chopper circuit, a half-bridge circuit, or a full-bridge circuit, and the control unit is configured to control a pulse-width modulation (PWM) duty cycle of the one or more semiconductor switches according to a desired speed of the motor.

In an embodiment, the motor is a permanent magnet DC motor.

According to another aspect of the invention, a power tool is provided comprising: a housing; an electric direct-current (DC) motor having a positive terminal, a negative terminal, and a commutator engaging a pair of brushes coupled to the positive and the negative terminals, the motor being configured to operate within an operating voltage range; a power supply interface arranged to receive at least one of AC power from an AC power supply having a first nominal voltage or DC power from a DC power supply having a second nominal voltage, the DC power supply comprising at least one removable battery pack coupled to the power supply interface, the power supply interface configured to output the AC power via an AC power line and the DC power via a DC power line, wherein the second nominal voltage falls approximately within the operating voltage range of the motor, but the first nominal voltage is substantially higher than the operating voltage range of the motor; and a motor control circuit including a rectifier circuit configured to rectify an alternating signal to a rectified signal on the AC power line, the motor control circuit being configured to supply electric power from one of the AC power line or the DC power line via a common node to the motor such that the brushes are electrically coupled to one of the AC or DC power supplies, the motor control circuit being configured to reduce a supply of power from the AC power line to the motor to a level corresponding to the operating voltage range of the motor.

In an embodiment, the rectifier circuit includes a half-wave diode bridge circuit arranged to reduce an average voltage amount on the AC power line by approximately half.

In an embodiment, the motor control circuit comprises a power switch arranged between the common node of the AC and DC power lines and a control unit configured to control a pulse-width modulation (PWM) of the power switch, wherein the control unit is configured to set a pulse-width modulation (PWM) duty cycle of the power switch to a fixed value less than 100% to reduce an average voltage amount on the AC line to a level corresponding to the operating voltage range of the motor. In an embodiment, the power switch comprises one of a field effect transistor (FET) or an insulated gate bipolar transistor (IGBT).

In an embodiment, the motor control circuit comprises an AC switch disposed in series with the AC power line between the power supply interface and the rectifier circuit and a control unit configured to control a phase of the AC power line via the AC switch and set a fixed conduction band of the AC switch to reduce an average voltage amount on the AC power line to a level corresponding to the operating voltage range of the motor.

In an embodiment, the AC switch includes a phase controlled switch comprising one of a triac, a thyristor, or a SCR switch, and the controller is configured to control a phase of the AC switch according to a desired speed of the motor.

In an embodiment, the motor control circuit comprises an ON/OFF switch arranged between the common node of the AC and DC power lines and the motor.

In an embodiment, the motor control circuit comprises a control unit coupled to a power switch arranged on the DC power line. In an embodiment, the control unit is configured to monitor a fault condition associated with the DC power supply and turn the power switch off to cut off a supply of power from the DC power supply to the motor.

In an embodiment, the power tool further comprises a power supply switching unit arranged to isolate the AC power line and the DC power line. In an embodiment, the power supply switching unit comprises a relay switch arranged on the DC power line and activated by a coil coupled to the AC power line. In an embodiment, the power supply switching unit comprises at least one double-pole double-throw switch arranged between the common node of the AC and DC power lines and the power supply interface. In an embodiment, the power supply switching unit comprises at least one single-pole double-throw switch having an output terminal coupled to the common node of the AC and DC power lines.

In an embodiment, the DC power supply comprises a high rated voltage battery pack.

In an embodiment, the DC power supply comprises at least two medium-rated voltage battery packs and the power supply interface is configured to connect two or more of the at least two battery packs in series. In another embodiment, the operating voltage range of the motor is approximately within a range of 100V to 120V encompassing the second nominal voltage, and the first nominal voltage is in the range of 220 VAC to 240 VAC. In an embodiment, the control unit is configured to set the fixed conduction band of the AC switch to a value within the range of 100 to 140 degrees.

In an embodiment, the operating voltage range of the motor is approximately within a range of 60V to 90V encompassing the second nominal voltage, and the first nominal voltage is in the range of 100 VAC to 120 VAC. In an embodiment, the control unit is configured to set the fixed conduction band of the AC switch to a value within the range of 70 to 110 degrees.

In an embodiment, the control unit is configured to operate the tool at constant speed at the fixed conduction band.

According to another aspect of the invention, the power tool described above is a variable-speed tool, as described herein.

In an embodiment, the power tool further comprises: a switching circuit arranged between the common node of the AC and DC power lines and the motor; and a control unit configured to control a pulse-width modulation (PWM) switching operation of the switching circuit to control a speed of the motor enabling variable speed operation of the motor at constant torque.

In an embodiment, the switching circuit comprises one or more controllable semiconductor switches configured in at least one of a chopper circuit, a half-bridge circuit, or a full-bridge circuit, and the control unit is configured to control a pulse-width modulation (PWM) duty cycle of the one or more semiconductor switches according to a desired speed of the motor.

According to an embodiment, the control unit is configured to sense current on one of the AC power line or the DC power line to set a mode of operation to one of an AC mode of operation or a DC mode of operation.

In an embodiment, the controller is configured to reduce a supply of power through the switching circuit to a level corresponding to the operating voltage range of the motor in the AC mode of operation.

In an embodiment, the control unit is configured to control the switching operation of the switching circuit within a first duty cycle range in the DC mode of operation, and control the switching operation of the switching circuit within a second duty cycle range in the AC mode of operation, wherein the second duty cycle range is smaller than the first duty cycle range.

In an embodiment, the control unit is configured to control the switching operation of the switching circuit at zero to 100% duty cycle in the DC mode of operation, and control the switching operation of the switching circuit from zero to a threshold value less than 100% in the AC mode of operation.

According to another aspect of the invention, a power tool is provided comprising: a housing; a brushless direct current (BLDC) motor including a rotor and a stator having at least three stator windings corresponding to at least three phases of the motor, the rotor being moveable by the stator when the stator windings are appropriately energized within the corresponding phases, each phase being characterized by a corresponding voltage waveform energizing the corresponding stator winding, the motor being configured to operate within an operating voltage range; a power supply interface arranged to receive at least one of AC power from an AC power supply having a first nominal voltage or DC power from a DC power supply having a second nominal voltage, the DC power supply comprising at least one removable battery pack coupled to the power supply interface, the power supply interface configured to output the AC power via an AC power line and the DC power via a DC power line; and a motor control circuit configured to receive the AC power line and the DC power line and supply electric power to the motor at a level corresponding to the operating voltage range of the motor, the motor control circuit having a rectifier circuit configured to rectify an alternating signal on the AC power line to a rectified voltage signal on a DC bus line, and a power switch circuit configured to regulate a supply of electric power from the DC bus line to the motor.

In an embodiment, the rectifier circuit comprises a diode bridge. In an embodiment, the rectifier circuit further comprises a link capacitor arranged in parallel to the diode bridge on the DC bus line. In an embodiment, the diode bridge comprises a full-wave bridge. In an alternative embodiment, the diode bridge comprises a half-wave bridge.

In an embodiment, the DC power line is connected directly to a node on the DC bus line bypassing the rectifier circuit. In an alternative embodiment, the DC power line and the AC power line are jointly coupled to an input node of the rectifier circuit.

In an embodiment, the power tool further comprises a power supply switching unit arranged to isolate the AC power line and the DC power line. In an embodiment, the switching unit comprises a relay switch arranged on the DC power line and activated by a coil coupled to the AC power line. In an embodiment, the power supply switching unit comprises at least one single-pole double-throw switch having input terminals coupled to the AC and DC power lines and an output terminal coupled to an input node of the rectifier circuit. In an embodiment, the power supply switching unit comprises at least one double-pole double-throw switch having input terminals coupled to the AC and DC power lines, a first output terminal coupled to the input node of the rectifier circuit, and a second output terminal coupled directly to a node on the DC bus line bypassing the rectifier circuit.

In an embodiment, the motor control circuit further comprises a controller arranged to control a switching operation of the power switch circuit. In an embodiment, the controller is a programmable device including a microcontroller, a microprocessor, a computer processor, a signal processor. Alternatively, the controller is an integrated circuit configured and customized to control a switching operation of the power switch unit. In an embodiment, the control unit is further configured to monitor a fault condition associated with the power tool or the DC power supply and deactivate the power switch circuit to cut off a supply of power to the motor. In an embodiment, the control unit is configured to sense current on one of the AC power line or the DC power line to set a mode of operation to one of an AC mode of operation or a DC mode of operation, and control the switching operation of the power switch circuit based on the mode of operation. In an alternative embodiment, the control unit is configured to control the switching operation of the power switch circuit irrespective of an AC or DC mode of operation.

In an embodiment, the power switch circuit comprises a plurality of power switches including three pairs of high-side and low-side power switches configured as a three-phase bridge circuit coupled to the phases of the motor.

In an embodiment, the motor control circuit further comprises a gate driver circuit coupled to the controller and the power switch circuit, and configured to drive gates of the plurality of power switches based on one or more drive signals from the controller.

In an embodiment, the motor control circuit further comprises a power supply regulator including at least one voltage regulator configured to output a voltage signal to power at least one of the gate driver circuit or the controller.

In an embodiment, the motor control circuit further comprises an ON/OFF switch coupled to at least one of an ON/OFF actuator or a trigger switch and arranged to cut off a supply of power from the power supply regulator and the gate driver circuit.

In an embodiment, the power tool further comprises a plurality of position sensors disposed at close proximity to the rotor to provide rotational position signals of the rotor to the control unit. In an embodiment, the controller is configured to control the switching operation of the power switch circuit based on the position signals to appropriately energize the stator windings within the corresponding phases.

According to an embodiment, within each phase of the motor, the controller is configured to activate a drive signal for a corresponding one of the plurality of power switches within a conduction band corresponding to the phase of the motor.

In an embodiment, the controller is configured to set a pulse-width modulation (PWM) duty cycle according to a desired speed of the motor and control the drive signal to turn the corresponding one of the plurality of power switches on and off periodically within the conduction band in accordance with the PWM duty cycle to enable variable speed operation of the motor at constant load.

According to an aspect of the invention, the first and second nominal voltages both fall approximately within the operating voltage range of the motor.

In an embodiment, the operating voltage range of the motor is approximately within a range of 90V to 132V encompassing the second nominal voltage, and the first nominal voltage is in the range of approximately 100 VAC to 120 VAC. In an embodiment, the DC power supply comprises a high-rated voltage battery pack. In an embodiment, the DC power supply comprises at least two medium-rated voltage battery packs and the power supply interface is configured to connect two or more of the at least two battery packs in series.

In an embodiment, the link capacitor has a capacitance value optimized to provide an average voltage of approximately less than or equal to 110V on the DC bus line when the power tool is powered by the AC power supply, where the first nominal voltage is approximately 120 VAC. In an embodiment, the link capacitor has a capacitance value of less than or equal to approximately 50 μF.

In an embodiment, the link capacitor has a capacitance value optimized to provide an average voltage of approximately 120V on the DC bus line when the power tool is powered by the AC power supply, where the first nominal voltage is approximately 120 VAC. In an embodiment, the link capacitor has a capacitance value of less than or equal to approximately 200 to 600 μF. In an embodiment, the DC power supply has a nominal voltage of approximately 120 VDC.

According to an aspect of the invention, at least one of first and second nominal voltages does not approximately correspond to the operating voltage range of the motor.

In an embodiment, the motor control circuit is configured to optimize a supply of power from at least one of the AC power line or the DC power line to the motor at a level corresponding to the operating voltage range of the motor.

In an embodiment, the controller is configured to set a mode of operation to one of an AC mode of operation or a DC mode of operation, and control the switching operation of the power switch circuit based on the mode of operation. In an embodiment, the controller is configured to sense current on one of the AC power line or the DC power line to set the mode of operation. In an embodiment, the controller is configured to receive a signal from the power supply interface indicative of the mode of operation.

In an embodiment, the operating voltage range of the motor encompasses the first nominal voltage, but not the second nominal voltage. In an embodiment, the operating voltage range of the motor is approximately within a range of 100V to 120V encompassing the first nominal voltage, and the second nominal voltage is in a range of approximately 60 VDC to 100 VDC. In an embodiment, the controller may be configured to boost an effective supply of power to the motor in the DC mode of operation to correspond to the operating voltage range of the motor.

In an embodiment, the operating voltage range of the motor encompasses the second nominal voltage, but not the first nominal voltage. In an embodiment, the operating voltage range of the motor is approximately within a range of 60V to 100V encompassing the second nominal voltage, and the first nominal voltage is in a range of approximately 100 VAC to 120 VAC. In an embodiment, the controller may be configured to reduce an effective supply of power to the motor in the AC mode of operation to correspond to the operating voltage range of the motor.

In an embodiment, the operating voltage range of the motor encompasses neither the first nominal voltage nor the first nominal voltage. In an embodiment, the motor control circuit is configured to optimize a supply of power from both the AC power line and the DC power line to the motor at a level corresponding to the operating voltage range of the motor.

In an embodiment, the operating voltage range of the motor is approximately within a range of 150V to 170V, the first nominal voltage is in a range of approximately 100 VAC to 120 VAC, and the second nominal voltage is in a range of approximately 90 VDC to 120 VDC. In an embodiment, the controller may be configured to boost an effective supply of power to the motor in both the AC mode of operation and the DC mode of operation to correspond to the operating voltage range of the motor.

In an embodiment, the operating voltage range of the motor is approximately within a range of 150V to 170V, the first nominal voltage is in a range of approximately 220 VAC to 240 VAC, and the second nominal voltage is in a range of approximately 90 VDC to 120 VDC. In an embodiment, the controller may be configured to boost an effective supply of power to the motor in the DC mode of operation, but reduce an effective supply of power to the motor in the AC mode of operation, to correspond to the operating voltage range of the motor.

In an embodiment, the controller is configured to control the switching operation of the power switch circuit via one or more drive signals at a fixed pulse-width modulation (PWM) duty cycle, the controller setting the fixed PWM duty cycle to a first value in relation to the first nominal voltage when powered by the AC power supply and to a second value different from the first value and in relation to the second nominal voltage when powered by the DC power supply.

In an embodiment, the controller is configured to control the switching operation of the power switch circuit via one or more drive signals at a fixed pulse-width modulation (PWM) duty cycle of less than 100% in the AC mode of operation to reduce an effective supply of power to the motor in the AC mode of operation to correspond to the operating voltage range of the motor.

In an embodiment, the controller is configured to control the switching operation of the power switch circuit via one or more drive signals at a pulse-width modulation (PWM) duty cycle up to a threshold value, the controller setting the threshold value to a first value in relation to the first nominal voltage when powered by the AC power supply and to a second value different from the first value and in relation to the second nominal voltage when powered by the DC power supply.

In an embodiment, the controller is configured to control the switching operation of the power switch circuit within a first duty cycle range in the DC mode of operation, and control the switching operation of the power switch circuit within a second duty cycle range in the AC mode of operation, wherein the second PWM duty cycle range is smaller than the first duty cycle range, in order to reduce an effective supply of power to the motor in the AC mode of operation to correspond to the operating voltage range of the motor.

In an embodiment, the controller is configured to control the switching operation of the power switch circuit at zero to 100% duty cycle in the DC mode of operation, and control the switching operation of the power switch circuit from zero to a threshold value less than 100% in the AC mode of operation, in order to reduce an effective supply of power to the motor in the AC mode of operation to correspond to the operating voltage range of the motor.

In an embodiment, the controller is configured to receive a measure of instantaneous current on the DC bus line and enforce a current limit on current through the power switch circuit by comparing instantaneous current measures to the current limit and, in response to an instantaneous current measure exceeding the current limit, turning off the plurality of power switches for a remainder of a present time interval to interrupt current flowing to the electric motor, where duration of each time interval is fixed as a function of the given frequency at which the electric motor is controlled by the controller.

In an embodiment, the controller turns on select power switches at end of the present time interval and thereby resumes current flow to the motor.

In an embodiment, the duration of each time interval is approximately ten times an inverse of the given frequency at which the motor is controlled by the controller. In an embodiment, the duration of each time interval is on the order to 100 microseconds.

In an embodiment, duration of the each time interval corresponds to a period of pulse-width modulation (PWM) cycle.

In an embodiment, the controller is configured to receive a measure of current on the DC bus line and enforce a current limit on current through the power switch circuit by setting or adjusting a PWM duty cycle of the one or more drive signals. In an embodiment, the controller is configured to monitor the current through the DC bus line and adjust the PWM duty cycle if the current through the DC bus line exceeds the current limit.

In an embodiment, the controller is configured to set the current limit according to a voltage rating of one of the AC or the DC power supplies.

In an embodiment, the controller is configured to set the current limit to a first threshold in the AC mode of operation and to a second threshold in the DC mode of operation, wherein the second threshold is higher than the first threshold, in order to reduce an effective supply of power to the motor in the AC mode of operation to correspond to the operating voltage range of the motor.

According to an embodiment, the controller is configured to activate a drive signal within each phase of the motor for a corresponding one of the plurality of power switches within a conduction band (CB) corresponding to the phase of the motor. According to an embodiment, the CB is set to approximately 120 degrees.

In an embodiment, the controller is configured to shift the CB by an advance angle (AA) such that the CB leads ahead of a back electro-magnetic field (EMF) current of the motor. According to an embodiment, the AA is set to approximately 30 degrees.

In an embodiment, the controller is configured to set at least one of the CB or AA according to a voltage rating of one or more of the AC or DC power supplies. In an embodiment, the controller is configured to set at least one of the CB or AA to a first value in relation to the first nominal voltage when powered by the AC power supply and to a second value different from the first value and in relation to the second nominal voltage when powered by the DC power supply.

In an embodiment, the controller is configured set to the CB to a first CB value during the AC mode of operation and to a second CB value greater than the first CB value during the DC mode of operation. In an embodiment, the second CB value is determined so as to boost an effective supply of power to the motor in the DC mode of operation to correspond to the operating voltage range of the motor. In an embodiment, first CB value is approximately 120 degrees and the second CB value is greater than approximately 130 degrees.

In an embodiment, the controller is configured set to the AA to a first AA value during the AC mode of operation and to a second AA value greater than the first AA value during the DC mode of operation. In an embodiment, the second AA value is determined so as to boost an effective supply of power to the motor in the DC mode of operation to correspond to the operating voltage range of the motor. In an embodiment, first AA value is approximately 30 degrees and the second AA value is greater than approximately 35 degrees.

In an embodiment, the controller is configure to set the CB and AA in tandem according to the voltage rating of the AC or DC power supplies.

In an embodiment, the controller is configured to set at least one of the CB or AA to a base value corresponding to a maximum speed of the motor at approximately no load, and gradually increase the at least one of CB or AA from the base value to a threshold value in relation to an increase in torque to yield a substantially linear speed-torque curve. In an embodiment, the controller is configured to maintain substantially constant speed on the speed-torque curve. In an embodiment, the base value and the threshold value corresponds to a low torque range within which the speed-torque curve is substantially linear. In an embodiment, the controller is configured to maintain the at least one of CB or AA at the torque greater than the low torque range.

According to another aspect of the invention, a power tool is provided comprising: a housing; a brushless direct current (BLDC) motor including a rotor and a stator having at least three stator windings corresponding to at least three phases of the motor, the rotor being moveable by the stator when the stator windings are appropriately energized within the corresponding phases, each phase being characterized by a corresponding voltage waveform energizing the corresponding stator winding, the motor being configured to operate within an operating voltage range; and a motor control circuit configured to receive electric power from a first power supply having a first nominal voltage or a second power supply having a second nominal voltage different from the first nominal voltage, and to provide electric power to the motor at a level corresponding to the operating voltage range of the motor. In an embodiment, the first and second power supplies each comprise an AC power supply or a DC power supply.

In an embodiment, at least one of first and second nominal voltages does not approximately correspond to, is different from, or is outside the operating voltage range of the motor. In an embodiment, the motor control circuit is configured to optimize a supply of power from at least one of the first or second power supplies to the motor at a level corresponding to the operating voltage range of the motor.

In an embodiment, the operating voltage range of the motor encompasses the first nominal voltage, but not the second nominal voltage. In an embodiment, the operating voltage range of the motor is approximately within a range of 100V to 120V encompassing the first nominal voltage, and the second nominal voltage is in a range of approximately 60V to 100V. In an embodiment, the controller may be configured to boost an effective supply of power to the motor to correspond to the operating voltage range of the motor when powered by the second power supply.

In an embodiment, the operating voltage range of the motor encompasses the second nominal voltage, but not the first nominal voltage. In an embodiment, the operating voltage range of the motor is approximately within a range of 60V to 100V encompassing the second nominal voltage, and the first nominal voltage is in a range of approximately 100 VAC to 120 VAC. In an embodiment, the controller may be configured to reduce an effective supply of power to the motor to correspond to the operating voltage range of the motor when powered by the first power supply.

In an embodiment, the operating voltage range of the motor encompasses neither the first nominal voltage nor the first nominal voltage. In an embodiment, the motor control circuit is configured to optimize a supply of power from both the first and the second power supplies to the motor at a level corresponding to the operating voltage range of the motor.

In an embodiment, at least one of the first or second power supplies comprises an AC power supply and the motor control circuit comprises a rectifier circuit including a diode bridge. In an embodiment, the rectifier circuit further comprises a link capacitor arranged in parallel to the diode bridge on the DC bus line. In an embodiment, the diode bridge comprises a full-wave bridge. In an alternative embodiment, the diode bridge comprises a half-wave bridge.

In an embodiment, both the first and the second power supplies comprise DC power supplies having different nominal voltage levels.

In an embodiment, the motor control circuit further comprises a controller arranged to control a switching operation of the power switch circuit. In an embodiment, the controller is a programmable device including a microcontroller, a microprocessor, a computer processor, a signal processor. Alternatively, the controller is an integrated circuit configured and customized to control a switching operation of the power switch unit.

In an embodiment, the power switch circuit comprises a plurality of power switches including three pairs of high-side and low-side power switches configured as a three-phase bridge circuit coupled to the phases of the motor. In an embodiment, the motor control circuit further comprises a gate driver circuit coupled to the controller and the power switch circuit, and configured to drive gates of the plurality of power switches based on one or more drive signals from the controller. In an embodiment, the motor control circuit further comprises a power supply regulator including at least one voltage regulator configured to output a voltage signal to power at least one of the gate driver circuit or the controller. In an embodiment, the motor control circuit further comprises an ON/OFF switch coupled to at least one of an ON/OFF actuator or a trigger switch and arranged to cut off a supply of power from the power supply regulator and the gate driver circuit.

In an embodiment, the power tool further comprises a plurality of position sensors disposed at close proximity to the rotor to provide rotational position signals of the rotor to the control unit. In an embodiment, the controller is configured to control the switching operation of the power switch circuit based on the position signals to appropriately energize the stator windings within the corresponding phases.

According to an embodiment, within each phase of the motor, the controller is configured to activate a drive signal for a corresponding one of the plurality of power switches within a conduction band corresponding to the phase of the motor.

In an embodiment, the controller is configured to set a pulse-width modulation (PWM) duty cycle according to a desired speed of the motor and control the drive signal to turn the corresponding one of the plurality of power switches on and off periodically within the conduction band in accordance with the PWM duty cycle to enable variable speed operation of the motor at constant load.

In an embodiment, the link capacitor has a capacitance value of less than or equal to approximately 50 μF.

In an embodiment, the controller is configured to control the switching operation of the power switch circuit via one or more drive signals at a fixed pulse-width modulation (PWM) duty cycle, the controller setting the fixed PWM duty cycle to a first value in relation to the first nominal voltage when powered by the first power supply and to a second value different from the first value and in relation to the second nominal voltage when powered by the second power supply.

In an embodiment, the controller is configured to control the switching operation of the power switch circuit via one or more drive signals at a pulse-width modulation (PWM) duty cycle up to a threshold value, the controller setting the threshold value to a first value in relation to the first nominal voltage when powered by the first power supply and to a second value different from the first value and in relation to the second nominal voltage when powered by the second power supply.

In an embodiment, the controller is configured to control the switching operation of the power switch circuit within a first duty cycle range when coupled to the first power supply, and control the switching operation of the power switch circuit within a second duty cycle range when coupled to the second power supply, wherein the second PWM duty cycle range is smaller than the first duty cycle range, in order to optimize an effective supply of power to the motor when powered by the either the first or the second power supplies to correspond to the operating voltage range of the motor.

In an embodiment, the controller is configured to receive a measure of instantaneous current on the DC bus line and enforce a current limit on current through the power switch circuit by comparing instantaneous current measures to the current limit and, in response to an instantaneous current measure exceeding the current limit, turning off the plurality of power switches for a remainder of a present time interval to interrupt current flowing to the electric motor, where duration of each time interval is fixed as a function of the given frequency at which the electric motor is controlled by the controller.

In an embodiment, the controller turns on select power switches at end of the present time interval and thereby resumes current flow to the motor.

In an embodiment, the duration of each time interval is approximately ten times an inverse of the given frequency at which the motor is controlled by the controller. In an embodiment, the duration of each time interval is on the order to 100 microseconds.

In an embodiment, duration of the each time interval corresponds to a period of pulse-width modulation (PWM) cycle.

In an embodiment, the controller is configured to receive a measure of current on the DC bus line and enforce a current limit on current through the power switch circuit by setting or adjusting a PWM duty cycle of the one or more drive signals. In an embodiment, the controller is configured to monitor the current through the DC bus line and adjust the PWM duty cycle if the current through the DC bus line exceeds the current limit.

In an embodiment, the controller is configured to set the current limit according to a voltage rating of one of the first or second power supplies.

In an embodiment, the controller is configured to set the current limit to a first threshold when the power tool is powered by the first power supply and to a second threshold when the power tool is powered by the second power supply, wherein the second threshold is higher than the first threshold, in order to optimize an effective supply of power to the motor from either the first or the second power supplies to correspond to the operating voltage range of the motor.

According to an embodiment, the controller is configured to activate a drive signal within each phase of the motor for a corresponding one of the plurality of power switches within a conduction band (CB) corresponding to the phase of the motor. According to an embodiment, the CB is set to approximately 120 degrees.

In an embodiment, the controller is configured to shift the CB by an advance angle (AA) such that the CB leads ahead of a back electro-magnetic field (EMF) current of the motor. According to an embodiment, the AA is set to approximately 30 degrees.

In an embodiment, the controller is configured to set at least one of the CB or AA according to a voltage rating of one or more of the first or the second power supplies.

In an embodiment, the controller is configured to set the CB to a first CB value when the power tool is powered by the first power supply and to a second CB value greater than the first CB value when the power tool is powered by the second power supply. In an embodiment, the second CB value is determined so as to boost or reduce an effective supply of power to the motor when powered by either the first or the second power supplies to correspond to the operating voltage range of the motor. In an embodiment, first CB value is approximately 120 degrees and the second CB value is greater than approximately 130 degrees.

In an embodiment, the controller is configured to the AA to a first AA value when the power tool is powered by the first power supply to a second AA value greater than the first AA value when the power tool is powered by the second power supply. In an embodiment, the second AA value is determined so as to boost or reduce an effective supply of power to the motor when powered by either the first or the second power supplies to correspond to the operating voltage range of the motor. In an embodiment, first AA value is approximately 30 degrees and the second AA value is greater than approximately 35 degrees.

In an embodiment, the controller is configure to set the CB and AA in tandem according to the voltage rating of the first or the second power supplies.

In an embodiment, the controller is configured to set at least one of the CB or AA to a base value corresponding to a maximum speed of the motor at approximately no load, and gradually increase the at least one of CB or AA from the base value to a threshold value in relation to an increase in torque to yield a substantially linear speed-torque curve. In an embodiment, the controller is configured to maintain substantially constant speed on the speed-torque curve. In an embodiment, the base value and the threshold value corresponds to a low torque range within which the speed-torque curve is substantially linear. In an embodiment, the controller is configured to maintain the at least one of CB or AA at the torque greater than the low torque range.

In another aspect, a battery pack is convertible back and forth between a low rated voltage/high capacity configuration and a medium rated voltage/low capacity configuration.

In another aspect, a power tool system includes a battery pack that is convertible back and forth between a low rated voltage/high capacity configuration and a medium rated voltage/low capacity configuration and a power tool that couples with the battery pack, converts the battery pack from the low rated voltage/high capacity configuration to the medium rated voltage/low capacity configuration and operates with the battery pack in its medium rated voltage/low capacity configuration.

In another aspect, a power tool system includes a battery pack that is convertible back and forth between a low rated voltage/high capacity configuration and a medium rated voltage/low capacity configuration, a first power tool that couples with the battery pack, converts the battery pack from the low rated voltage/high capacity configuration to the medium rated voltage/low capacity configuration and operates with the battery pack its medium rated voltage/low capacity configuration and a second power tool that couples with the battery pack and operates with the battery pack in its low rated voltage/high capacity configuration.

In another aspect, a power tool system includes a first battery pack that is convertible back and forth between a low rated voltage/high capacity configuration and a medium rated voltage/low capacity configuration, a second battery pack that is always in a low rated voltage/high capacity configuration and a power tool that couples with the first battery pack and operates with the first battery pack in its low rated voltage/high capacity configuration and couples with the second battery pack and operates with the second battery pack in its low rated voltage/high capacity configuration.

In another aspect, a power tool system includes a first battery pack that is convertible back and forth between a low rated voltage/high capacity configuration and a medium rated voltage/low capacity configuration, a second battery pack that is always in a low rated voltage/high capacity configuration, a first power tool power tool that couples with the first battery pack and operates with the first battery pack in its low rated voltage/high capacity configuration and couples with the second battery pack and operates with the second battery pack in its low rated voltage/high capacity configuration and a second power tool that couples with the first battery pack but not the second battery pack and operates with the first battery pack in its high rated voltage/low capacity configuration.

In another aspect, a power tool system includes a battery pack that is convertible back and forth between a low rated voltage/high capacity configuration and a medium rated voltage/low capacity configuration, a first, medium rated voltage power tool that couples with the battery pack, converts the battery pack from the low rated voltage/high capacity configuration to the medium rated voltage/low capacity configuration and operates with the battery pack in its medium rated voltage/low capacity configuration and a second, high rated voltage power tool that couples with a plurality of the battery packs, converts each battery pack from the low rated voltage/high capacity configuration to the medium rated voltage/low capacity configuration and operates with the battery packs in their medium rated voltage/low capacity configuration.

In another aspect, a power tool system includes a battery pack that is convertible back and forth between a low rated voltage/high capacity configuration and a medium rated voltage/low capacity configuration, a high rated voltage power tool that couples with a plurality of the battery packs, converts each battery pack from the low rated voltage/high capacity configuration to the medium rated voltage/low capacity configuration and/or couples with a high rated voltage alternating current power supply and operates at a high rated voltage with either the battery packs in their medium rated voltage/low capacity configuration and/or the high rated voltage alternating current power supply.

In another aspect, a first battery pack is convertible back and forth between a low rated voltage/high capacity configuration and a medium rated voltage/low capacity configuration a second battery pack that is always in a low rated voltage/high capacity configuration and a battery pack charger is electrically and mechanically connectable to the first battery pack and the second battery pack is able to charger both the first battery pack and the second battery pack.

In another aspect, a battery pack includes a housing and a battery residing in the housing. The battery may include a plurality of rechargeable cells and a switching network coupled to the plurality of rechargeable cells. The switching network may have a first configuration and a second configuration. The switching network may be switchable from the first configuration to the second configuration and from the second configuration to the first configuration. The plurality of rechargeable cells may be in a first configuration when the switching network is in the first configuration and a second configuration when the switching network is in the second configuration. The second configuration is different than the first configuration.

The switching network of the battery pack of this embodiment may have a third configuration wherein the plurality of rechargeable cells is in a third configuration when the switching network is in the third configuration. The switching network of the battery pack of this embodiment may be switched between the first configuration and the second configurations by an external input to the battery pack. The first configuration of the rechargeable cells of the battery pack of this embodiment may be a relatively low voltage and high capacity configuration and the second configuration of the rechargeable cells of the battery pack may be a relatively high voltage and low capacity configuration. The battery pack of this embodiment may include cell configurations in which the first configuration provides a first rated pack voltage and the second configuration provides a second rated pack voltage, wherein the first rated pack voltage is different than the second rated pack voltage. The third configuration of the battery pack of this embodiment may be an open circuit configuration.

The rechargeable cells of the battery pack of the first configuration may enter the third configuration upon converting between the first and second configurations. The battery pack of this embodiment may comprise a terminal block coupled to the plurality of rechargeable cells and the switching network, wherein the terminal block receives a switching element to switch the switching network from the first configuration to the second configuration.

In another aspect, a battery pack comprises a housing and a battery residing in the housing. The battery may include a set P of O rechargeable cells Q where O is a number ≥2. The set P of rechargeable cells Q may include N subsets R of cells Q where N is a number ≥2. Each subset R of cells Q may include M cells Q, where M is a number ≥1, where M×N=O. The battery may include a switching network coupled to the rechargeable cells, wherein the switching network may have a first configuration and a second configuration and may be switchable from the first configuration to the second configuration and from the second configuration to the first configuration. All of the subsets R of rechargeable cells Q may be connected in parallel when the switching network is in the first configuration and disconnected when the switching network is in the second configuration. A first power terminal may be coupled to a positive terminal of cell Q1 and a second power terminal may be coupled to a negative terminal of QO wherein the first and second power terminals provide power out from the battery pack. A negative conversion terminal may be coupled to a negative terminal of each subset R1 through RN-1 and a positive conversion terminal may be coupled to a positive terminal of each subset R2 through RN. The negative conversion terminal and the positive conversion terminal of the battery pack of this embodiment are accessible from outside the battery housing.

In another aspect, a battery pack comprises a housing and a battery residing in the housing. The battery of this embodiment may include a battery residing in the housing. The battery of this embodiment may include a set P of O rechargeable cells Q, where O is a number ≤2. The set P of rechargeable cells Q may include N subsets R of cells Q, where N is a number ≥2. Each subset R of cells Q may include M cells Q where M is a number ≥1, where M×N=0. The battery pack of this embodiment may include a switching network coupled to the rechargeable cells. The switching network may have a first configuration and a second configuration and may be switchable from the first configuration to the second configuration and from the second configuration to the first configuration. All of the subsets R of rechargeable cells Q may be connected in parallel when the switching network is in the first configuration and disconnected when the switching network is in the second configuration. The battery pack may include a first power terminal coupled to a positive terminal of Q1 and a second power terminal coupled to a negative terminal of QO wherein the first and second power terminals provide power out from the battery pack. The battery pack may include a negative conversion terminal coupled to a negative terminal of each subset of cells and a positive conversion terminal coupled to a positive terminal of each subset of cells.

In another aspect, a power tool comprises: a first power supply from an AC input having a rated AC voltage; a second power supply from a plurality of rechargeable battery cells having the rated DC voltage; a motor coupleable to the first power supply and the second power supply; and a control circuit configured to operate the motor with substantially the same output power when operating on the first power supply and the second power supply. The rated DC voltage of the power tool of this embodiment may be approximately equal to the rated AC voltage. The motor of the power tool of this embodiment is a brushed motor. The control circuit of the power tool of this embodiment may operate the brushed motor at a constant no load speed regardless of whether the motor is operating on the first power supply or the second power supply. The control circuit of the power tool of this embodiment may operate the brushed motor at a variable no load speed based upon a user input. The control circuit of the power tool of this embodiment may include an IGBT/MOSFET circuit configured to operate the motor at a variable no load speed using either the first power supply or the second power supply. The motor of the power tool of this embodiment may be a brushless motor. The control circuit of the power tool of this embodiment may comprise a small capacitor and a cycle by cycle current limiter. The rated DC voltage of the power tool of this embodiment may be less than the rated AC voltage. The control circuit of the power tool of this embodiment may comprise a small capacitor and a cycle by cycle current limiter. The control circuit power tool of this embodiment may comprise at least one of advance angle and conduction band controls. The control circuit of the power tool of this embodiment may detect whether the first power supply and the second power supply are activated. The control circuit of the power tool of this embodiment may select the first power supply whenever it is active. The control circuit of the power tool of this embodiment may switch to the second power supply in the event that the first power supply becomes inactive. The control circuit of the power tool of this embodiment may include a boost mode whereby the control circuit operates the power supply at a higher output power using both the first power supply and the second power supply simultaneously. The power supply of the power tool of this embodiment may be provided by a cordset. The first power supply and the second power supply of the power tool of this embodiment may provide power to the motor simultaneously and may provide substantially more power than either the first or the second power supplies could provide individually.

In another aspect, a power tool comprises an input for receiving power from an AC power supply; an input for receiving power from a rechargeable DC power supply; a charger for charging the rechargeable DC power supply with the AC power supply; and a motor configured to be powered by at least one of the AC power supply and the rechargeable DC power supply. The AC power supply of the power tool of this embodiment may be a mains line. The rechargeable DC power supply of the power tool of this embodiment may be a removable battery pack.

In another aspect, a power tool comprises a power tool comprising an input for receiving AC power from an AC power source, the AC power source having a rated AC voltage, the AC power source external to the power tool; an input for receiving DC power from a DC power source, the DC power source having a rated DC voltage, the DC power source being a plurality of rechargeable battery cells, the rated DC voltage approximately equal to the rated AC voltage; and a motor configured to be powered by at least one of the AC power source and the DC power source. The AC power source of the power tool of this embodiment may be a mains line. The rechargeable DC power supply of the power tool of this embodiment may be a battery pack. The AC power supply and the DC power supply of the power tool of this embodiment may have a rated voltage of 120 volts.

In another aspect, a power tool comprises a motor; a first power supply from an AC input line; a second power supply from a rechargeable battery, the second power supply providing power approximately equivalent to the power of the first power supply. The first power supply and the second power supply of the power tool of this embodiment may provide power to the motor simultaneously. The first power supply and the second power supply of the power tool of this embodiment may provide power to the motor alternatively.

In another aspect, a power tool comprises a motor; a first power supply from an AC input line; a second power supply from a rechargeable battery, the second power supply providing power approximately equivalent to the power of the first power supply. The first power supply and the second power supply of the power tool of this embodiment may provide power to the motor simultaneously. The first power supply and the second power supply of the power tool of this embodiment may provide power to the motor alternatively.

In another aspect, a battery pack may include: a housing; a plurality of cells; and a converter element, the converter element moveable between a first position wherein the plurality of cells are configured to provide a first rated voltage and a second position wherein the plurality of cells are configured to provide a second rated voltage different than the first rated voltage.

Implementations of this aspect may include one or more of the following features. The battery pack as described above wherein the converter element comprises a housing and a plurality of contacts. A battery pack as described above wherein the housing forms an interior cavity and the plurality of cells are housed in the interior cavity. A battery pack as described above wherein the housing forms an interior cavity and the converter element is housed in the interior cavity and accessible from outside the housing. A battery pack as described above further comprising a battery comprising the plurality of cells and the converter element and a switching network. A battery pack as described above wherein the housing further comprising an exterior slot, a through hole at a first end of the slot, the through hole extending from an exterior surface of the housing to an interior cavity of the housing. A battery pack as described above wherein the converter element further comprises a projection extending through the through hole and a plurality of contacts. A battery pack as described above wherein the converter element comprises a jumper switch. A battery pack further comprising a battery comprising: the plurality of cells; a plurality of conductive contact pads; a node between adjacent electrically connected cells, each of the plurality of conductive contact pads coupled to a single node; the converter element including a plurality of contacts, and (a) when the converter element is in the first position each of the plurality of converter element contacts is electrically connected to a first set of the plurality of conductive contact pads, each of the plurality of conductive contact pads being in a single first set of the plurality of conductive contact pads and (b) when the converter element is in the second position each of the converter element contacts is electrically connected to a second set of the plurality of conductive contact pads, each second set of the plurality of conductive contact pads being different than every other second set of the plurality of conductive contact pads, and each first set of the plurality of conductive contact pads being different than each second set of the plurality of conductive contact pads. A battery pack as described above further comprising a battery comprising: the plurality of cells; a plurality of conductive contact pads; a node between adjacent electrically connected cells, each of the plurality of conductive contact pads coupled to a single node; wherein when the converter element is in the first position, each of the plurality of converter element contacts is a shunt between the conductive contact pads in the corresponding first set of the plurality of conductive contact pads and when the converter element is in the second position, each of the plurality of converter element contacts is a shunt between the conductive contact pads in the corresponding second set of the plurality of conductive contact pads.

In another aspect, a battery pack includes: a housing; a plurality of cells; and a converter element, the converter element moveable between a first position wherein the plurality of cells are electrically connected in a first cell configuration and a second position wherein the plurality of cells are electrically connected in a second cell configuration, the first cell configuration being different than the second cell configuration.

Implementations of this aspect may include one or more of the following features. A battery pack as described above wherein the converter element comprises a housing and a plurality of contacts. A battery pack as described above wherein the housing forms an interior cavity and the plurality of cells are housed in the interior cavity. A battery pack as described above wherein the housing forms an interior cavity and the converter element is housed in the interior cavity and accessible from outside the housing. A battery pack as described above further comprising a battery comprising the plurality of cells and the converter element and a switching network. A battery pack as described above wherein the housing further comprising an exterior slot, a through hole at a first end of the slot, the through hole extending from an exterior surface of the housing to an interior cavity of the housing. A battery pack as described above wherein the converter element further comprises a projection extending through the through hole and a plurality of contacts. A battery pack as described above wherein the converter element comprises a jumper switch. A battery pack as described above further comprising a battery comprising: the plurality of cells; a plurality of conductive contact pads; a node between adjacent electrically connected cells, each of the plurality of conductive contact pads coupled to a single node; and wherein the converter element includes a plurality of contacts, and (a) when the converter element is in the first position each of the plurality of converter element contacts is electrically connected to a first subset of the plurality of conductive contact pads, and (b) when the converter element is in the second position each of the plurality of converter element contacts is electrically connected to a second subset of the plurality of conductive contact pads, the second subset of the plurality of conductive contact pads being different than the first subset of the plurality of conductive contact pads. A battery pack further comprising a battery comprising: the plurality of cells; a plurality of conductive contact pads; a node between adjacent electrically connected cells, each of the plurality of conductive contact pads coupled to a single node; wherein when the converter element is in the first position, each of the plurality of converter element contacts is a shunt between the conductive contact pads in a first subset of the plurality of conductive contact pads and when the converter element is in the second position, each of the plurality of converter element contacts is a shunt between the conductive contact pads in a second subset of the plurality of conductive contact pads.

In another aspect, a battery pack includes: a housing, a set of cells, the set having at least two cells, two subsets of the set of cells, each cell of the set of cells being in a single subset, each subset of cells being electrically connected in series and having a positive node and a negative; a switching network having a first switch connecting the positive end of the first subset to the positive end of the second subset, a second switch connecting the negative end of the first subset to the negative end of the second subset and a third switch connecting the negative end of the first subset to the positive end of the second subset; a converter element that operates with the switching network to open and close the first, second and third switches to convert the set of cells between a low rated voltage configuration and a medium rated voltage configuration.

In another aspect, a battery pack includes: a housing, a set of cells, the set having at least two cells, two subsets of the set of cells, each cell of the set of cells being in a single subset, each subset of cells being electrically connected in series and having a positive node and a negative; a switching network having a first switch connecting the positive end of the first subset to the positive end of the second subset, a second switch connecting the negative end of the first subset to the negative end of the second subset and a third switch connecting the negative end of the first subset to the positive end of the second subset; a converter element that, upon actuation, operates with the switching network to configure the first, second and third switches in a first state wherein the set of cells are electrically connected in a first cell configuration and a second state wherein the set of cells are electrically connected in a second cell configuration, the first cell configuration being different than the second cell configuration.

Implementations of this aspect may include one or more of the following features. A battery pack as described above wherein the converter element is actuated when the battery pack mates with an electrical device. A battery pack as described above wherein the converter element comprises a set of terminals and the converter element is actuated when the battery pack mates with an electrical device.

In another aspect, a combination of an electrical device and battery pack includes: a battery pack including (1) a housing, the housing including a battery pack interface, (2) a plurality of cells, and (3) a converter element, the converter element moveable between a first position wherein the plurality of cells are configured to provide a first rated voltage and a second position wherein the plurality of cells are configured to provide a second rated voltage different than the first rated voltage; and an electrical device including a housing, the housing including an electrical device interface configured to mate with the battery pack interface for mechanically coupling the electrical device to the battery pack, the electrical device interface including a conversion feature for moving the converter element from the first position to the second position when the electrical device is mechanically coupled to the battery pack.

Implementations of this aspect may include one or more of the following features. A combination wherein the converter element comprises a plurality of battery terminals and the conversion feature comprises a plurality of electrical device terminals. A combination as described above wherein the converter element comprises a housing and a plurality of contacts. A combination as described above wherein the housing forms an interior cavity and the plurality of cells are housed in the interior cavity. A combination as described above wherein the housing forms an interior cavity and the converter element is housed in the interior cavity. A combination as described above further comprising a battery including the plurality of cells. A combination wherein the electrical device is a power tool. A combination wherein as described above the electrical device is a charger. A combination as described above wherein the electrical device is a battery holding tray.

In another aspect, a battery pack includes: a housing; a plurality of cells; a first set of terminals electrically coupled to the plurality of cells, the first set of terminals providing an output power; a second set of terminals electrically coupled to the plurality of cells, the second set of terminals configured to enable conversion of the plurality of cells between a first configuration and a second configuration.

Implementations of this aspect may include one or more of the following features. A battery pack as described above wherein the housing forms a cavity and the plurality of cells, the first set of terminals and the second set of terminals are housed in the internal cavity. A battery pack as described above further comprising a battery comprising the plurality of cells. A battery pack as described above wherein the second set of terminals includes a set of switches. A battery pack as described above wherein the second set of terminals is configured to received a switching device enabling the switches to convert the plurality of cells from the first configuration to the second configuration. A battery pack as described above wherein the second set of terminals is configured to convert the plurality of cells from the first configuration to the second configuration upon receipt of a switching device. A battery pack as described above wherein the plurality of cells converts from the first configuration to the second configuration upon the second set of terminals receiving a switching device. A battery pack as described above wherein the second set of terminals is configured to enable conversion of the plurality of cells to a third configuration. A battery pack as described above wherein the plurality of cells enters the third configuration between switching from the first and second configurations.

In another aspect, a battery pack and electrical device combination comprises: (a) a battery pack comprising: a housing; a plurality of cells; a first set of battery terminals electrically coupled to the plurality of cells, the first set of terminals providing an output power; a second set of battery terminals electrically coupled to the plurality of cells, the second set of terminals configured to allow the plurality of cells to convert from a first configuration to a second configuration; (b) an electrical device comprising: a first set of electrical device terminals configured to electrically couple to the first set of battery terminals; a converter element configured to electrically couple to the second set of battery terminals to enable the conversion of the plurality of cells from the first configuration to the second configuration.

Implementations of this aspect may include one or more of the following features. A battery pack as described above further comprising a battery including the plurality of cells. A battery pack as described above wherein the electrical device is a power tool comprising a motor, the first set of power tool terminals are electrically coupled to the motor and configured to electrically couple to the first set of battery terminals and the first set of tool terminals provide an input power. A battery pack as described above wherein the electrical device is a charger. A battery pack as described above wherein the electrical device is a battery holder.

In another aspect, a battery pack includes: a housing; a plurality of cells; and a set of mating terminals, the mating terminals moveable between a first position wherein the plurality of cells are configured to provide a first rated voltage and a second position wherein the plurality of cells are configured to provide a second rated voltage different than the first rated voltage.

In another aspect, a battery pack includes: a housing; a plurality of cells; and a set of mating terminals, the mating terminals moveable between a first terminal configuration wherein the plurality of cells are electrically connected in a first cell configuration and a second terminal configuration wherein the plurality of cells are electrically connected in a second cell configuration, the first cell configuration being different than the second cell configuration.

In another aspect, a convertible battery pack comprises a housing; a plurality of cells; a set of battery terminals; and a converting subsystem comprising a converter element, the converter element being moveable between a first position wherein the plurality of cells are configured to provide a first rated voltage at the set of battery terminals and a second position wherein the plurality of cells are configured to provide a second rated voltage at the set of battery terminals, the second rated voltage being different than the first rated voltage.

Implementations of this aspect may include one or more of the following features. The battery pack of this exemplary embodiment wherein the converter element comprises a housing and a plurality of contacts and wherein the housing forms an interior cavity and the plurality of cells are housed in the interior cavity. In this exemplary embodiment the converter element is housed in the interior cavity and accessible from outside the housing. In this exemplary embodiment, the battery pack further comprises a battery comprising the plurality of cells and the converting subsystem comprises the converter element and a switching network. In this exemplary embodiment the battery pack further comprises an exterior slot, a through hole at a first end of the slot, the through hole extending from an exterior surface of the housing to an interior cavity of the housing. The battery pack of this exemplary embodiment wherein the converter element further comprises a projection extending through the through hole and a plurality of contacts. The battery pack of this exemplary embodiment wherein the converting subsystem switching network includes switches for sending power current through a second set of battery terminals. In this exemplary embodiment, the set of battery terminals of the battery pack further comprises a first set of battery terminals electrically coupled to the plurality of cells and a second set of battery terminals electrically coupled to the plurality of cells, the first set of battery terminals configured to provide power when the battery pack is in the first rated voltage configuration and in the second rated voltage configuration and the second set of battery terminals configured to provide power only when the battery pack is in the second rated voltage configuration In another aspect, an exemplary embodiment of a convertible battery pack comprises a housing; a plurality of strings of cells; and a converting subsystem, converting subsystem comprising a converter element, wherein the converter element is moveable between a first position wherein the plurality of strings of cells are electrically connected in a first cell configuration and a second position wherein the plurality of strings of cells are electrically connected in a second cell configuration, the first cell configuration being different than the second cell configuration.

Implementations of this aspect may include one or more of the following features. The battery pack of this exemplary embodiment wherein the converter element comprises a housing and a plurality of contacts and the housing forms an interior cavity and the plurality of strings of cells are housed in the interior cavity. The battery pack of this exemplary embodiment wherein the converter element is housed in the interior cavity and accessible from outside the housing. This exemplary battery pack further comprising a battery comprising the plurality of the string of cells and the converter element and a switching network. The battery pack of this exemplary embodiment wherein the housing further comprising an exterior slot, a through hole at a first end of the slot, the through hole extending from an exterior surface of the housing to an interior cavity of the housing. The battery pack of this exemplary embodiment wherein the converter element further comprises a projection extending through the through hole and a plurality of contact pads. The battery pack of this exemplary embodiment wherein the converter element comprises a plurality of switching contacts.

In another aspect, an exemplary embodiment of a convertible battery pack comprises a housing, a set of cells, the set of cells having two strings of cells, each string of cells comprising at least one cell, the cells of each string of cells being electrically connected in series wherein each string of cells has a positive terminal and a negative terminal; a switching network having a first switch connecting the positive terminal of the first string of cells to the positive terminal of the second string of cells, a second switch connecting the negative terminal of the first string of cells to the negative terminal of the second string of cells and a third switch connecting the negative terminal of the first string of cells to the positive terminal of the second string of cells; a converter element that operates with the switching network to open and close the first, second and third switches to convert the set of cells between a low rated voltage configuration and a medium rated voltage configuration.

In another aspect, an exemplary embodiment of a convertible battery pack comprises a housing, a set of cells, the set of cells having two strings of cells, each string of cells comprising at least one cell, the cells of each string of cells being electrically connected in series wherein each string of cells has a positive terminal and a negative terminal; a switching network having a first switch connecting the positive terminal of the first string of cells to the positive terminal of the second string of cells, a second switch connecting the negative terminal of the first string of cells to the negative terminal of the second string of cells and a third switch connecting the negative terminal of the first string of cells to the positive terminal of the second string of cells; a converter element that, upon actuation, operates with the switching network to configure the first, second and third switches in a first state wherein the set of cells are electrically connected in a first cell configuration and a second state wherein the set of cells are electrically connected in a second cell configuration, the first cell configuration being different than the second cell configuration.

Implementations of this aspect may include one or more of the following features. The battery pack of this exemplary embodiment wherein the converter element is actuated when the battery pack mates with an electrical device and comprises a set of switching contacts.

In another aspect, an exemplary embodiment of a combination of an electrical device and a convertible battery pack comprises a battery pack including (1) a housing, the housing including a battery pack interface, (2) a plurality of cells, and (3) a converter element, the converter element moveable between a first position wherein the plurality of cells are configured to provide a first rated voltage and have a first capacity and a second position wherein the plurality of cells are configured to provide a second rated voltage and a second capacity wherein second rated voltage and second capacity are different than the first rated voltage and first capacity; and an electrical device including a housing, the housing including an electrical device interface configured to mate with the battery pack interface for mechanically coupling the electrical device to the battery pack, the electrical device interface including a conversion feature for moving the converter element from the first position to the second position when the electrical device is mechanically coupled to the battery pack.

Implementations of this aspect may include one or more of the following features. This exemplary convertible battery pack further comprising a first set of battery pack terminals for providing power to a load of the electrical device and a second set of battery pack terminals for providing power to the load of the electrical device.

In another aspect, an exemplary embodiment of a convertible battery pack comprises: a housing; a plurality of cells; a first set of battery pack terminals electrically coupled to the plurality of cells, the first set of battery pack terminals providing an output power; a second set of battery pack terminals electrically coupled to the plurality of cells, the second set of battery pack terminals configured to enable conversion of the plurality of cells between a first configuration and a second configuration.

Implementations of this aspect may include one or more of the following features. The battery pack of this exemplary embodiment wherein the second set of battery pack terminals is electrically coupled to a set of switches. The battery pack of this exemplary embodiment wherein when the set of switches is in a first state the second set of battery pack terminals is configured to enable the plurality of cells to convert from the first configuration to the second configuration. The battery pack of this exemplary embodiment wherein upon receipt of a switching device the set of switches is placed in the first state. The battery pack of this exemplary embodiment wherein when the set of switches is in the first state the second set of battery pack terminals is configured to transfer power current from the battery pack to a coupled electrical device. The battery pack of this exemplary embodiment wherein the plurality of cells converts from the first configuration to the second configuration upon the battery pack receiving a conversion element.

In another aspect, an exemplary embodiment of a battery pack and electrical device combination comprises: (a) a battery pack comprising: a housing; a plurality of cells; a first set of battery pack terminals electrically coupled to the plurality of cells and a second set of battery pack terminals electrically coupled to the plurality of cells, the plurality of cells configurable to provide a first rated voltage and a second rated voltage, the first set of battery pack terminals configured to provide power when the battery pack is in the first rated voltage configuration and in the second rated voltage configuration and the second set of battery pack terminals configured to provide power only when the battery pack is in the second rated voltage configuration; and (b) an electrical device comprising: a first set of electrical device terminals configured to electrically couple to the first set of battery pack terminals and a second set of electrical device terminals configured to electrically couple to the second set of battery pack terminals to provide power to a load of the electrical device. In the exemplary combination, the electrical device includes a conversion element to convert the battery pack from the first rated voltage to the second rated voltage.

Implementations of this aspect may include one or more of the following features. In the exemplary combination the electrical device is a power tool comprises a motor, the first set of power tool terminals are electrically coupled to the motor and configured to electrically couple to the first set of battery pack terminals and the first set of tool terminals provides an input power.

In another aspect, an exemplary embodiment of a battery pack and electrical device combination comprises (a) a battery pack comprising: a housing; a plurality of cells; a first set of battery pack terminals electrically coupled to the plurality of cells and a second set of battery pack terminals electrically coupled to the plurality of cells, the plurality of cells configurable to provide a first rated voltage and a second rated voltage, the first set of battery pack terminals configured to provide power when the battery pack is in the first rated voltage configuration and in the second rated voltage configuration and the second set of battery pack terminals configured to provide power only when the battery pack is in the second rated voltage configuration and (b) a charger comprising: a first set of charger terminals configured to electrically couple to the first set of battery pack terminals and a second set of charger terminals configured to electrically couple to the second set of battery pack terminals to provide power from the charger to the plurality of cells. In the exemplary combination, the charger includes a conversion element to convert the battery pack from the first rated voltage to the second rated voltage.

Advantages may include one or more of the following. The power tool system may enable a fully compatible power tool system that includes low power, medium power, and high power cordless power tools and high power AC/DC power tools. The convertible battery packs may enable backwards compatibility of the system with preexisting power tools. The system may include powering tools with a DC rated voltage that corresponds to an AC mains rated voltage for high power operations of power tools using battery pack power. These and other advantages and features will be apparent from the description, the drawings, and the claims.

FIG. *19a* is a partial cutaway perspective view of a battery receptacle of an exemplary low rated voltage power tool and FIG. *19b* is a partial cutaway perspective view of a battery receptacle an exemplary medium rated voltage power tool.

Figure 20A:
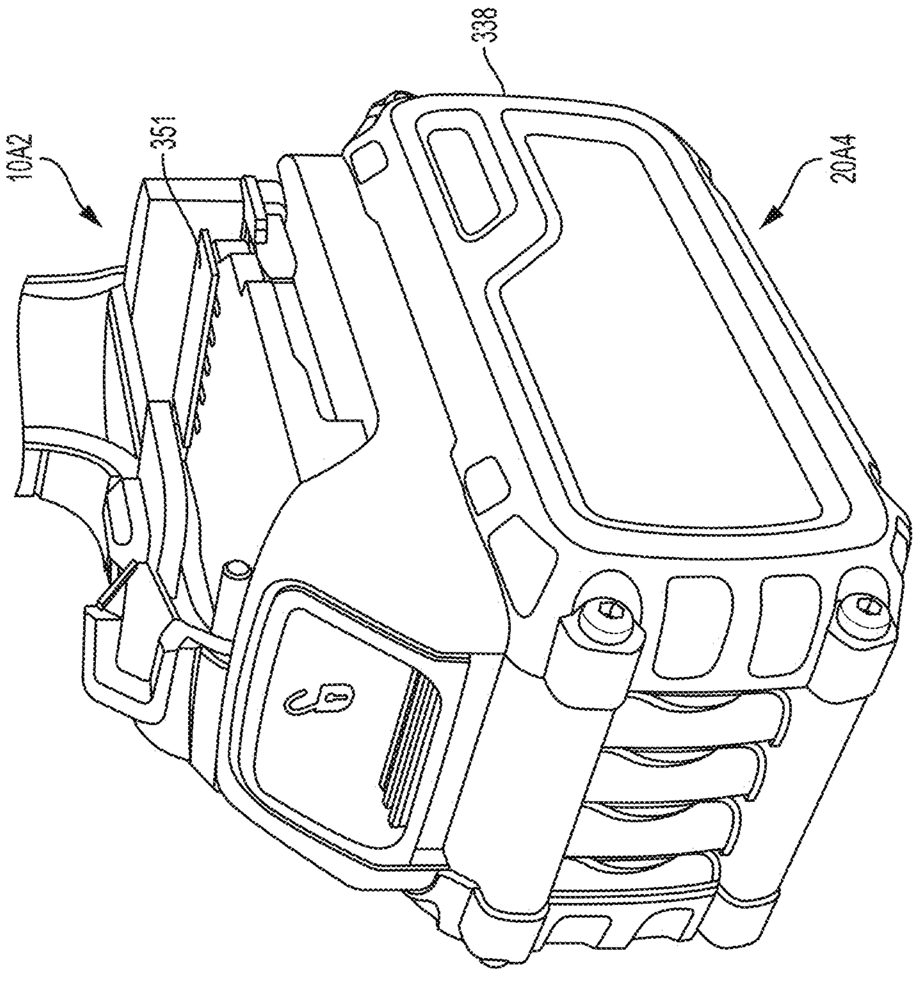
Figure 20B:
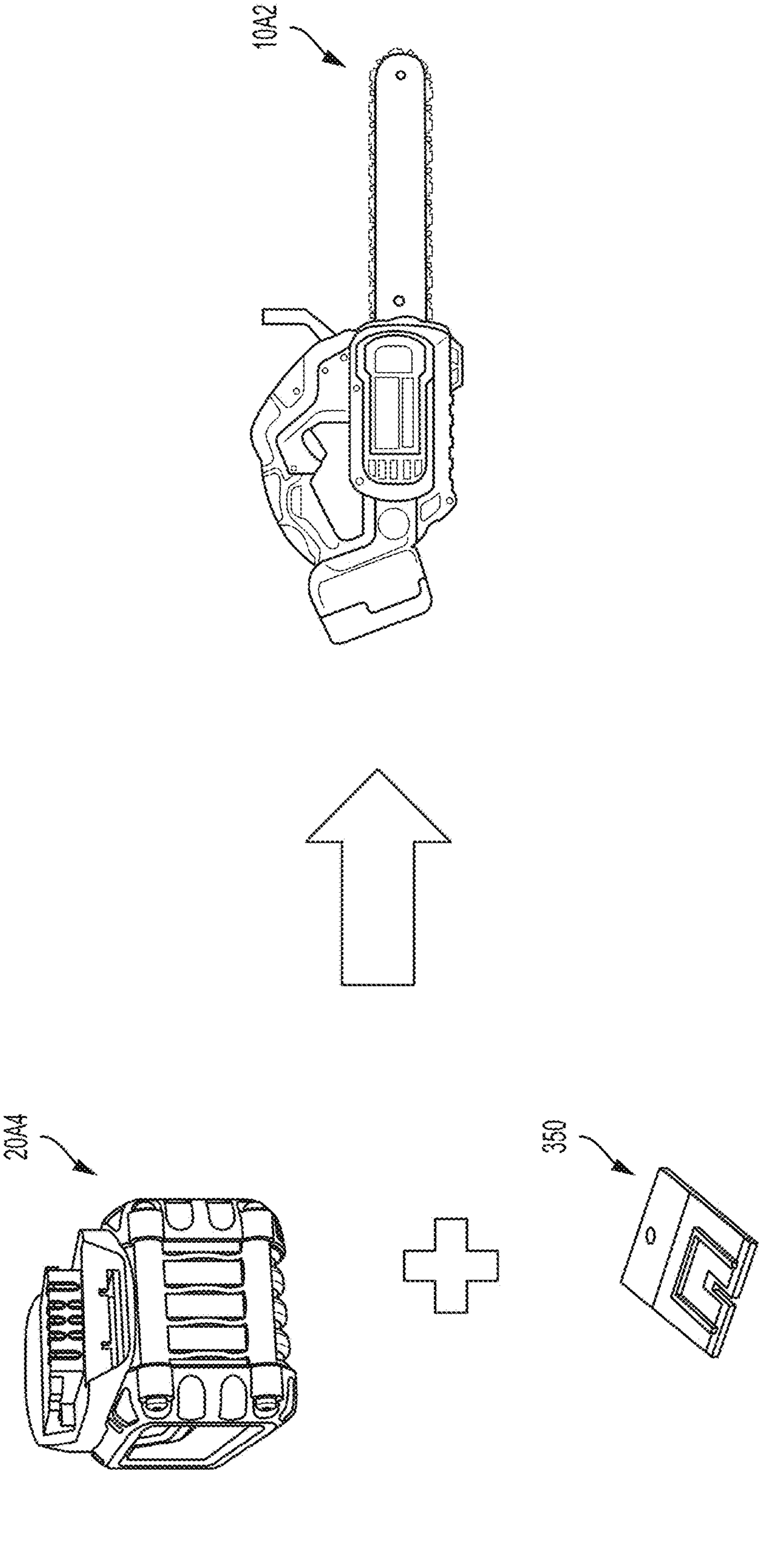
Figure 20C:
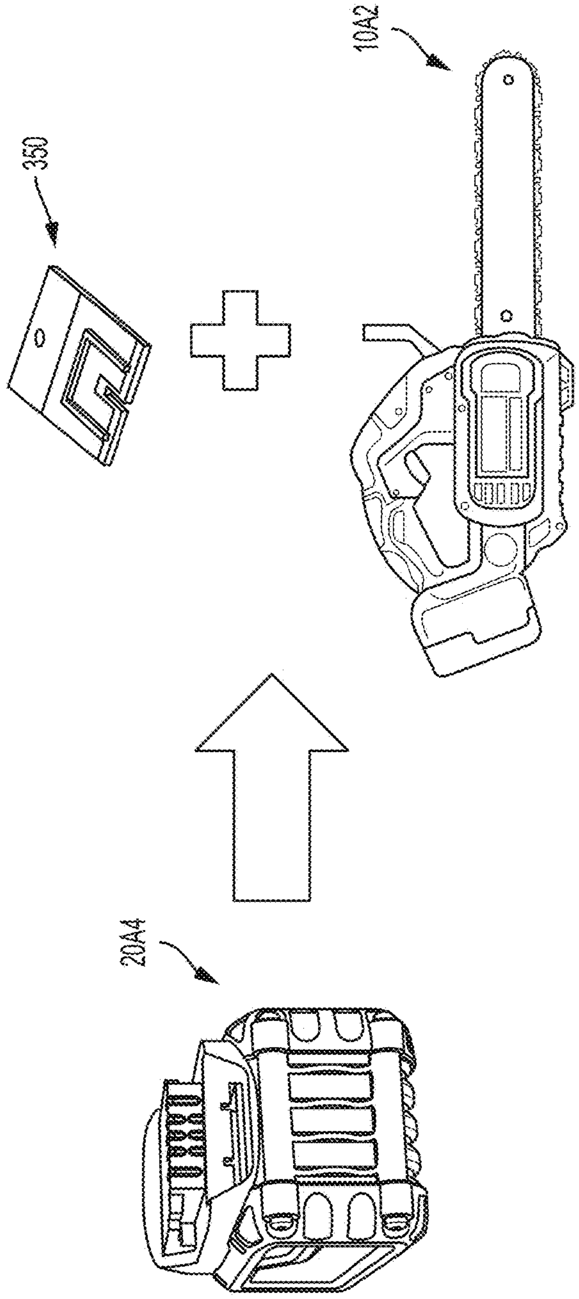
Figure 20D:
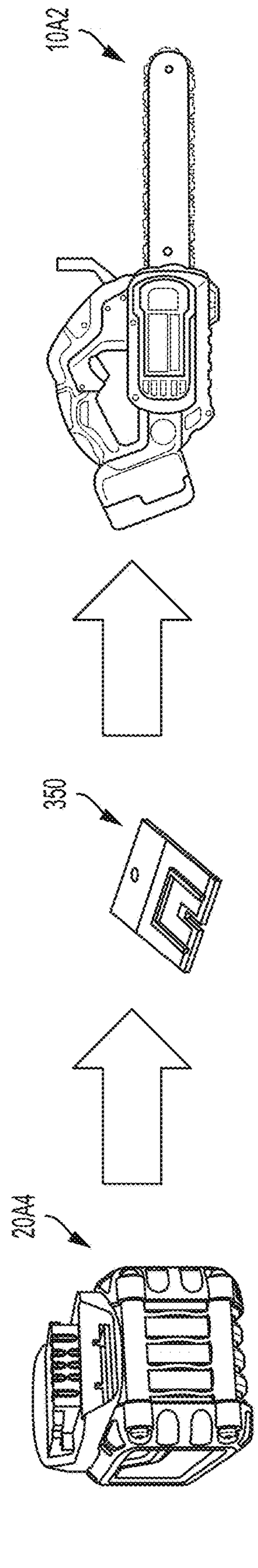

FIG. *20a* is a partial cutaway perspective view of an exemplary medium rated voltage power tool connected to an exemplary convertible battery pack, FIG. *20b* is an exemplary embodiment of a convertible battery pack, a converter element and a power tool, FIG. 20C is another exemplary embodiment of a convertible battery pack, a converter element and a power tool, and FIG. 20D is another exemplary embodiment of a convertible battery pack, a converter element and a power tool.

FIG. *21a* is an exemplary simplified circuit diagram of a first convertible battery in a low voltage/high capacity cell configuration and a medium voltage/low capacity cell configuration.

Figure 21A:
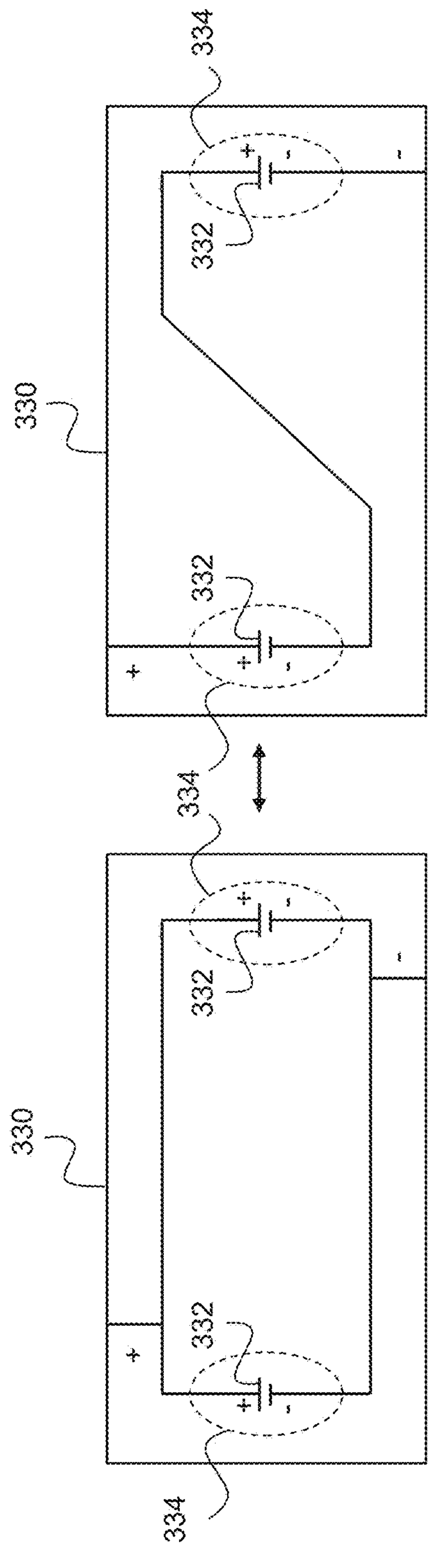
Figure 21B:
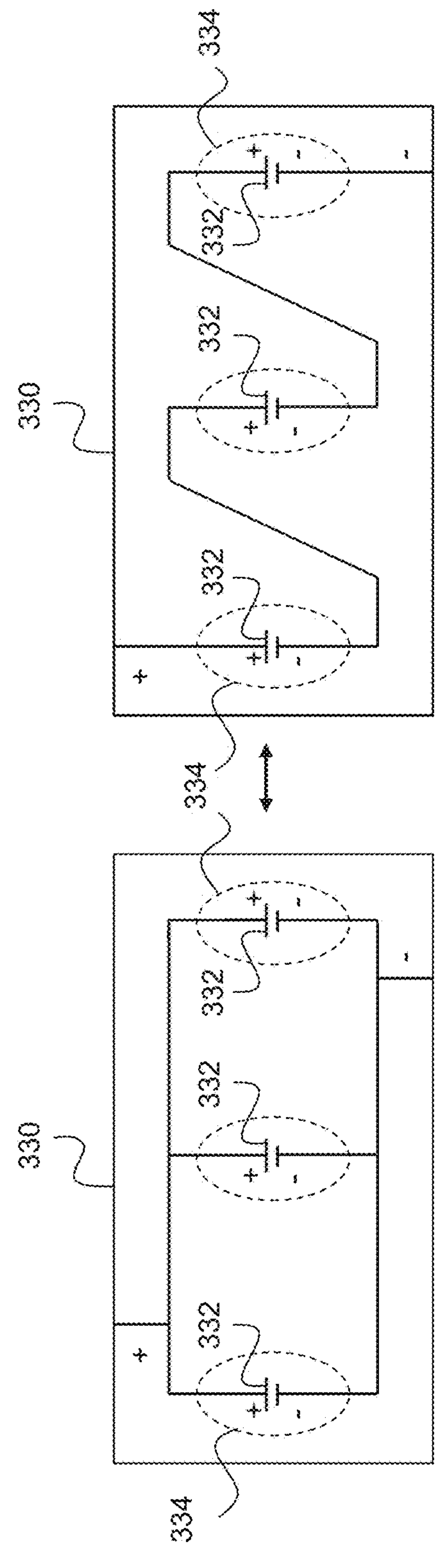

FIG. 21*b* is an exemplary simplified circuit diagram of a second convertible battery in a low voltage/high capacity cell configuration and a medium voltage/low capacity cell configuration.

Figure 21C:
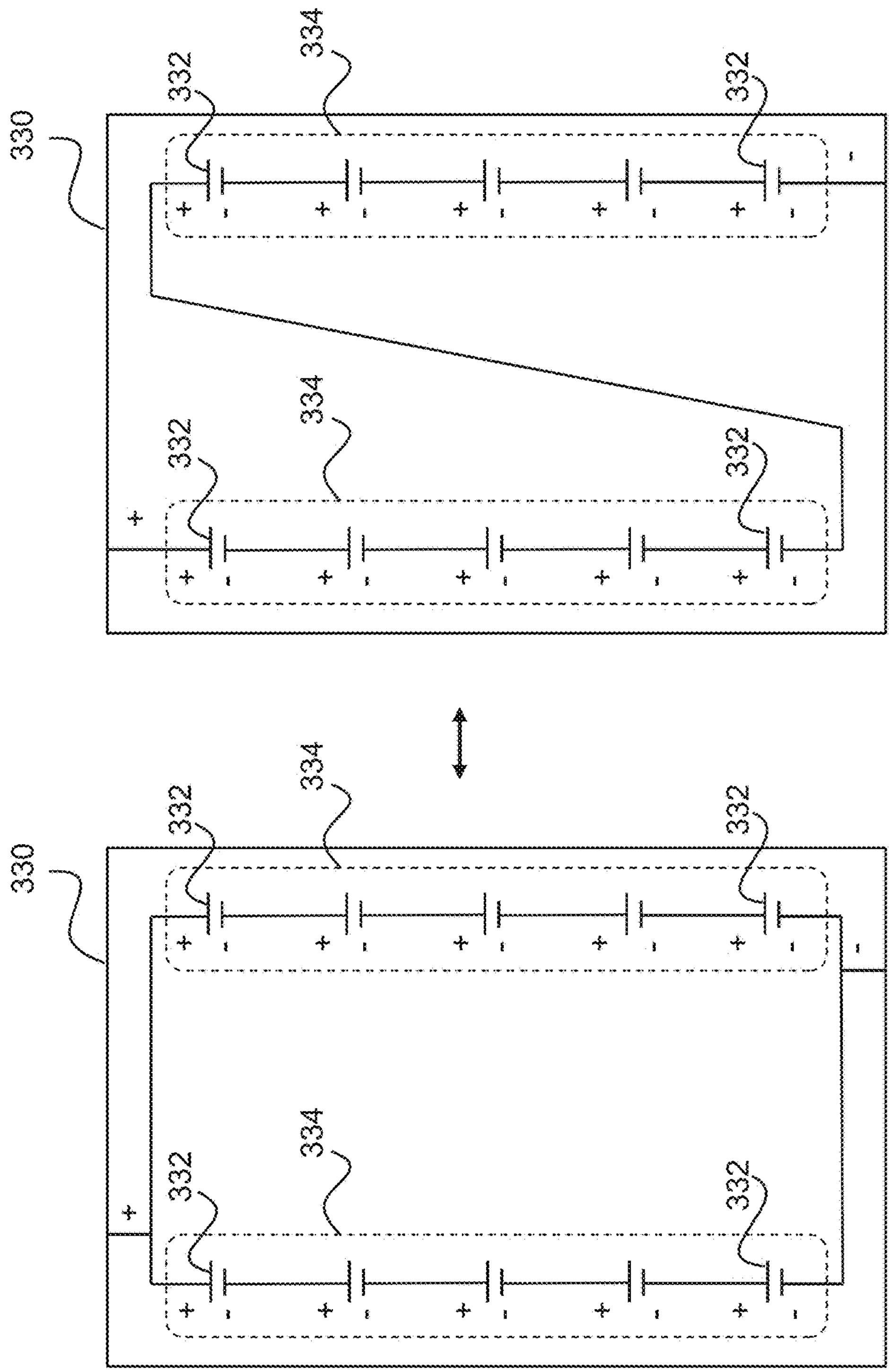

FIG. 21*c* is an exemplary simplified circuit diagram of a third convertible battery in a low voltage/high capacity cell configuration and a medium voltage/low capacity cell configuration.

Figure 21D:
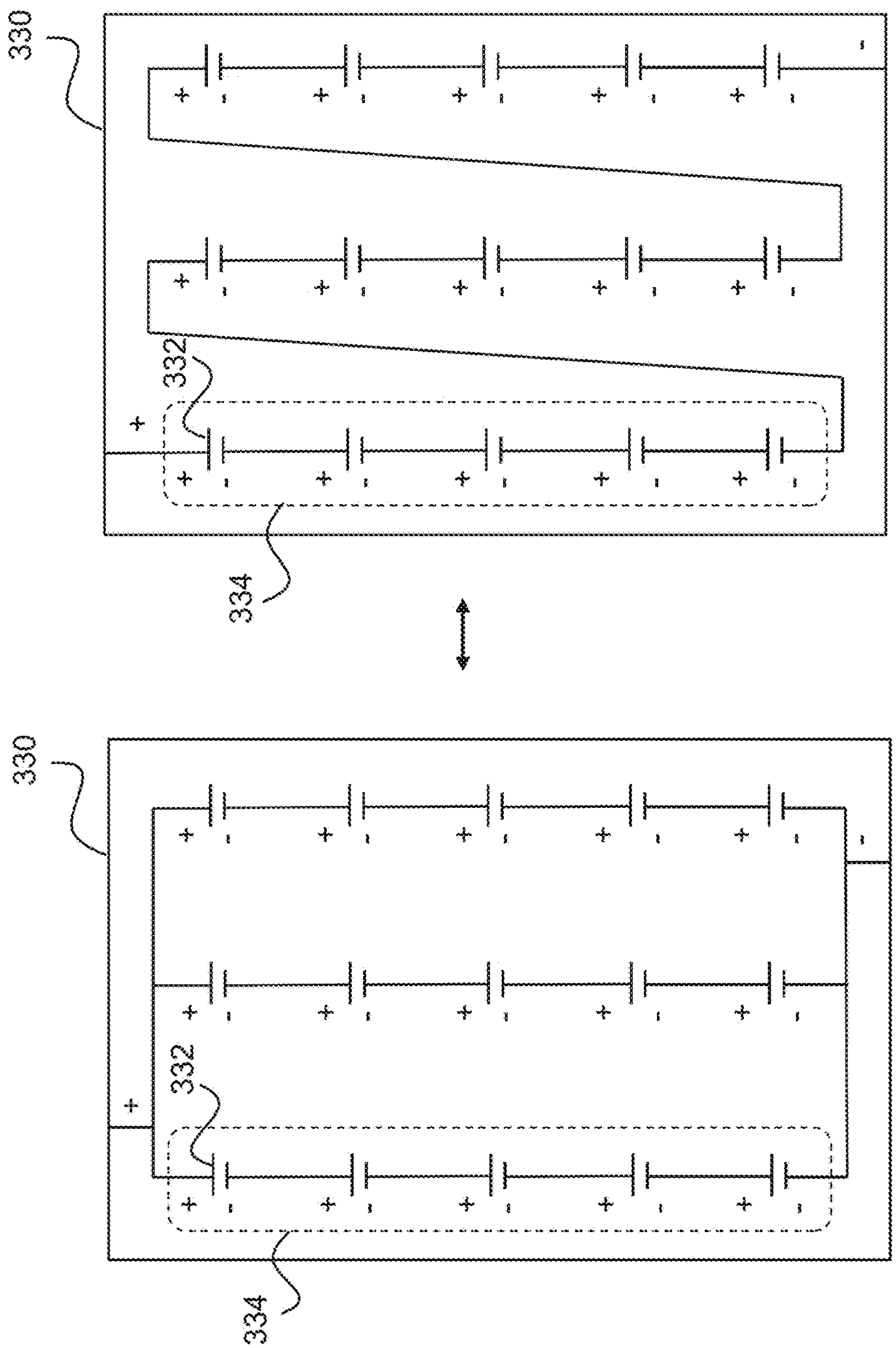

FIG. 21*d* is an exemplary simplified circuit diagram of a fourth convertible battery in a low voltage/high capacity cell configuration and a medium rated voltage/low capacity cell configuration.

Figure 21E:
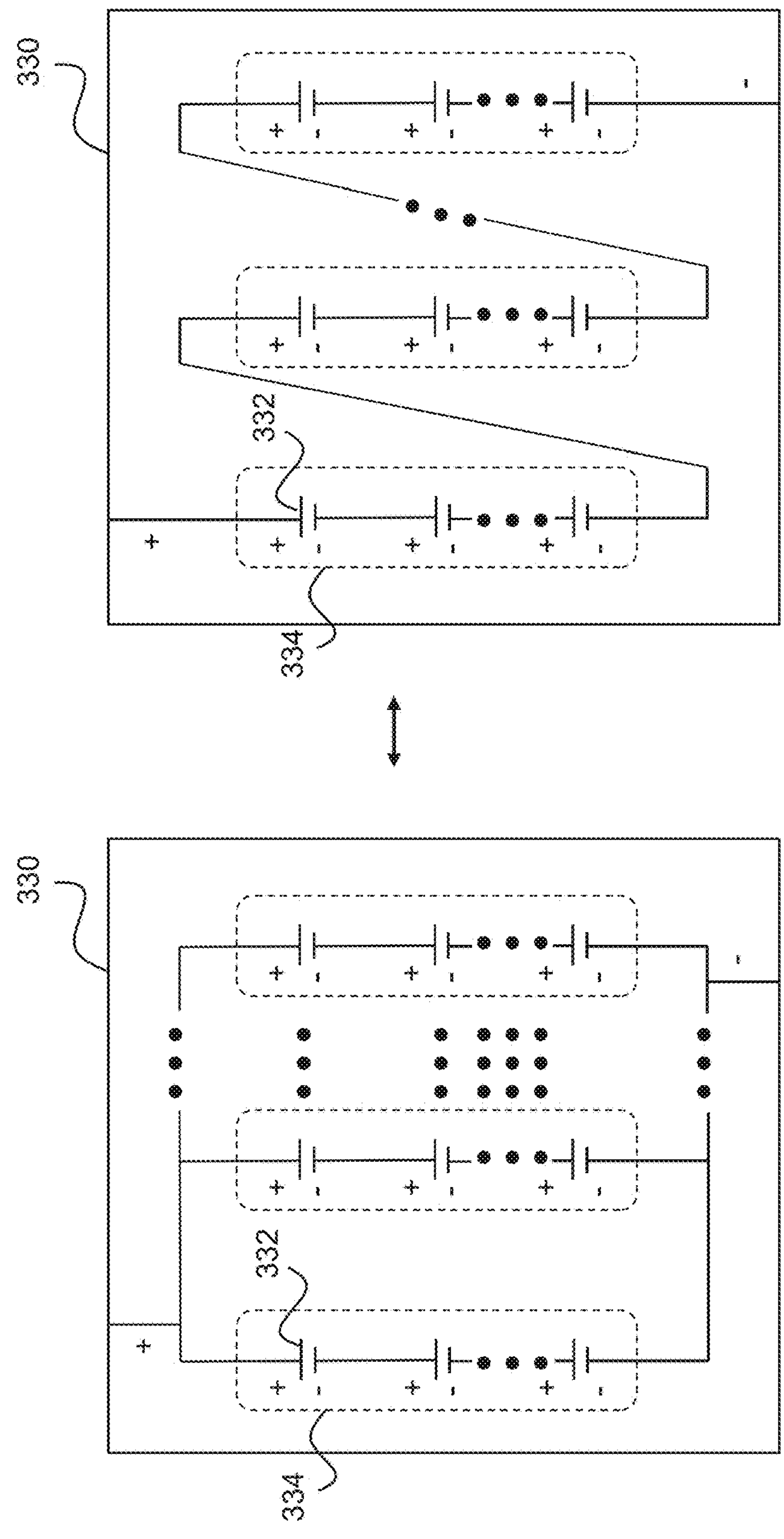

FIG. 21*e* is an exemplary simplified generic circuit diagram of a convertible battery in a low voltage/high capacity cell configuration and a medium rated voltage/high capacity cell configuration.

Figure 22A:
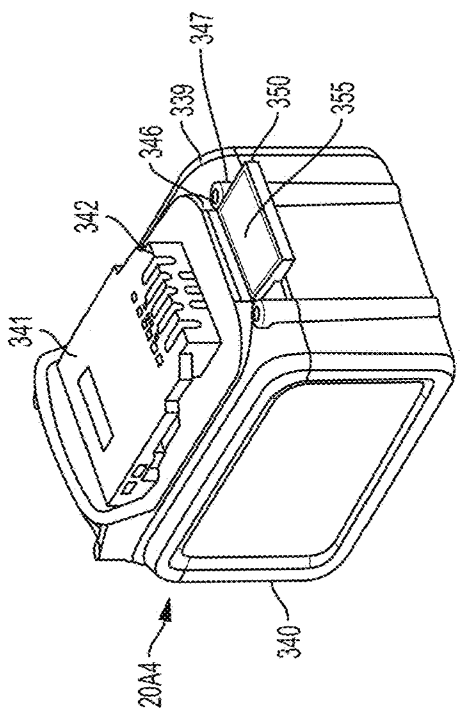
Figure 22B:
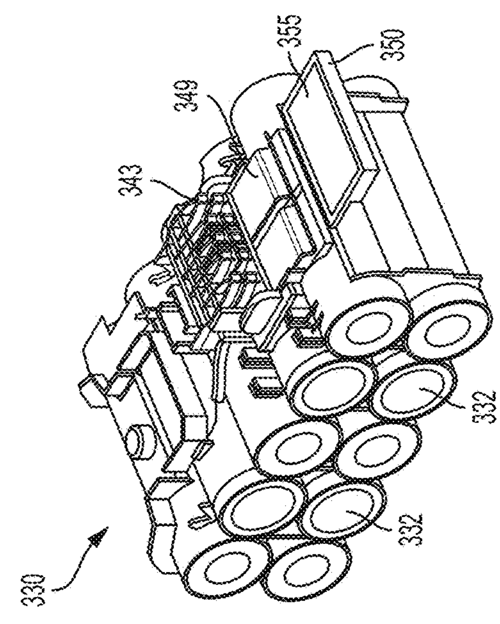
Figure 22C:
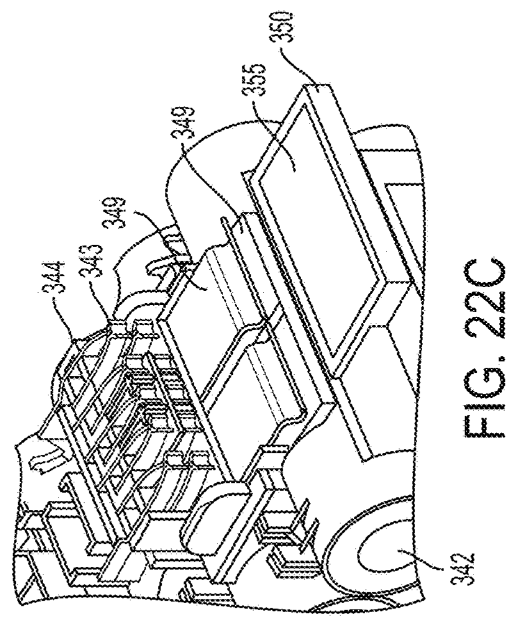

FIG. 22*a* is a perspective view of an exemplary convertible battery pack and an exemplary converter element; FIG. 22*b* is a perspective view of an exemplary convertible battery; and FIG. 22*c* is a magnified view of FIG. 22*b*.

Figure 23B:
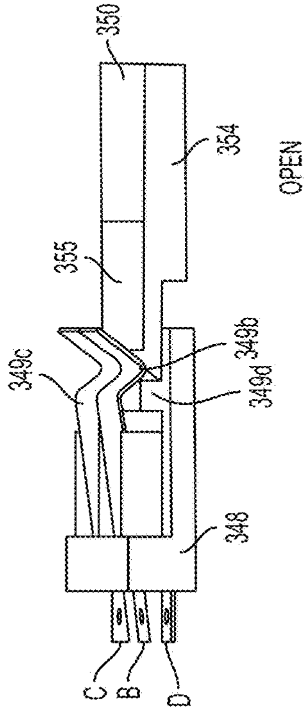
Figure 23A:
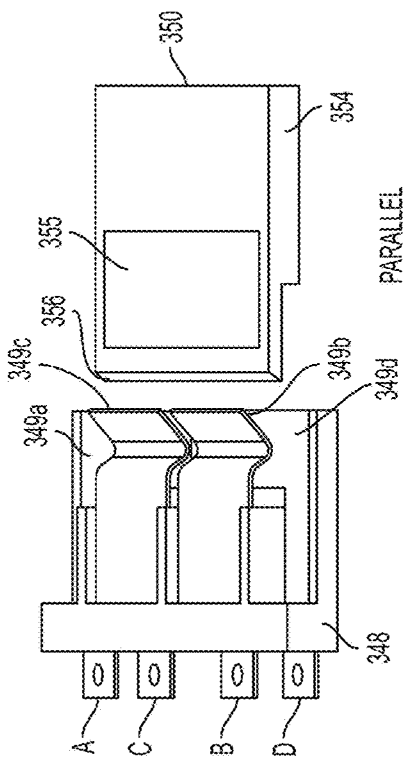
Figure 23C:
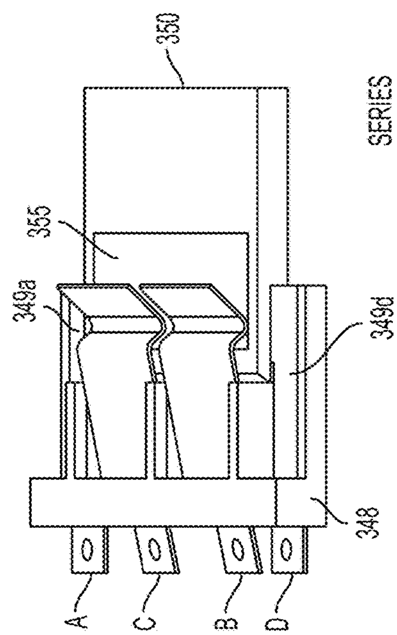

FIG. 23*a* is a perspective view of an exemplary convertible battery second terminal block and an exemplary converter element in a first configuration; FIG. 23*b* is a perspective view of the exemplary convertible battery second terminal block and the exemplary converter element in a second configuration; and FIG. 23*c* is a perspective view of the exemplary convertible battery second terminal block and the exemplary converter element in a third configuration.

Figure 24B:
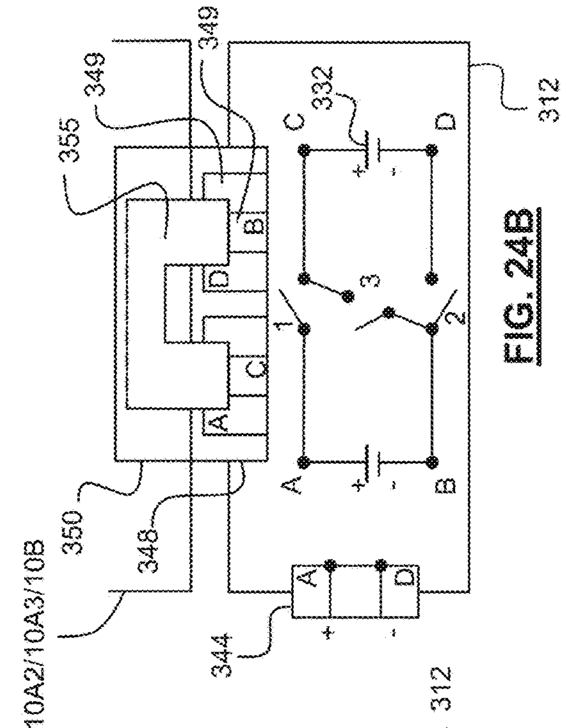
Figure 24A:
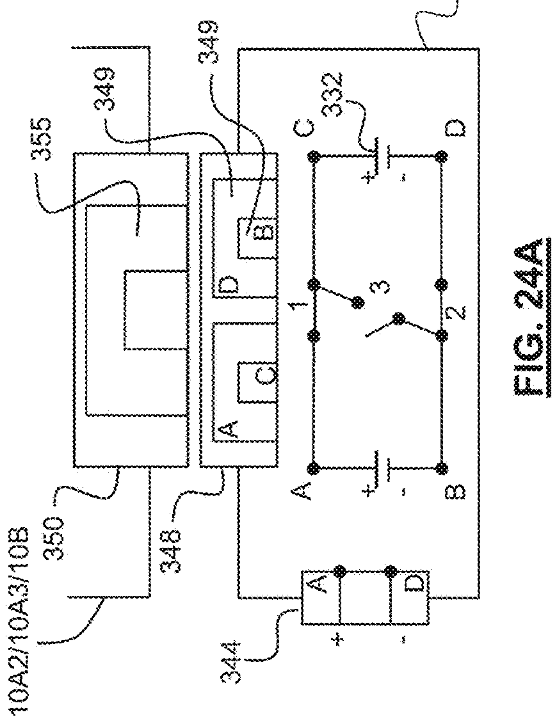
Figure 24C:
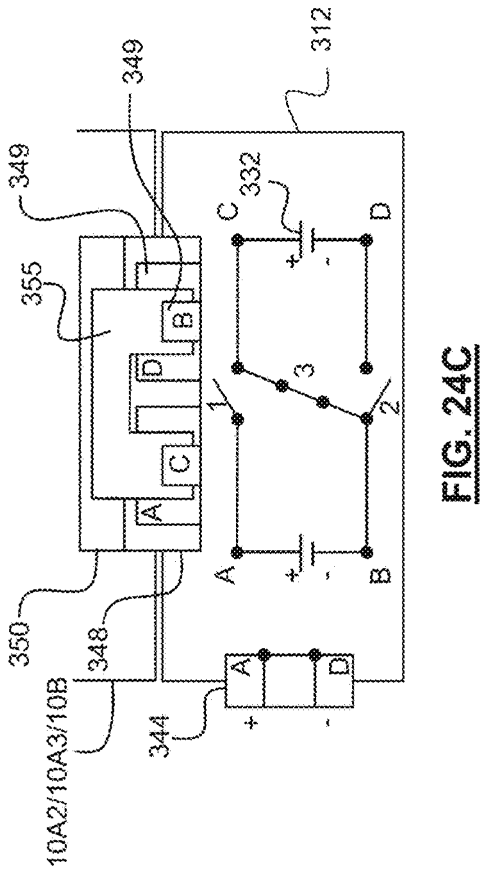

FIG. 24*a* is a partial circuit diagram/partial block diagram of an exemplary convertible battery pack and an exemplary medium rated voltage or high rated voltage or very high rated voltage power tool corresponding to FIG. 23*a*; FIG. 24*b* is a partial circuit diagram/partial block diagram of the exemplary convertible battery pack and the exemplary medium rated voltage or high rated voltage or very high rated voltage power tool corresponding to FIG. 23*b*; and FIG. 24*c* is a partial circuit diagram/partial block diagram of the exemplary convertible battery pack and the exemplary medium rated voltage or high rated voltage or very high rated voltage power tool corresponding to FIG. 23*c*.

Figure 25A:
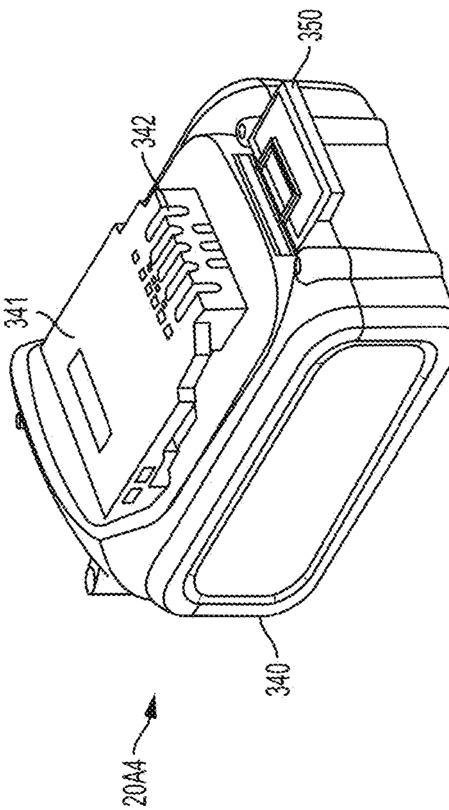
Figure 25B:
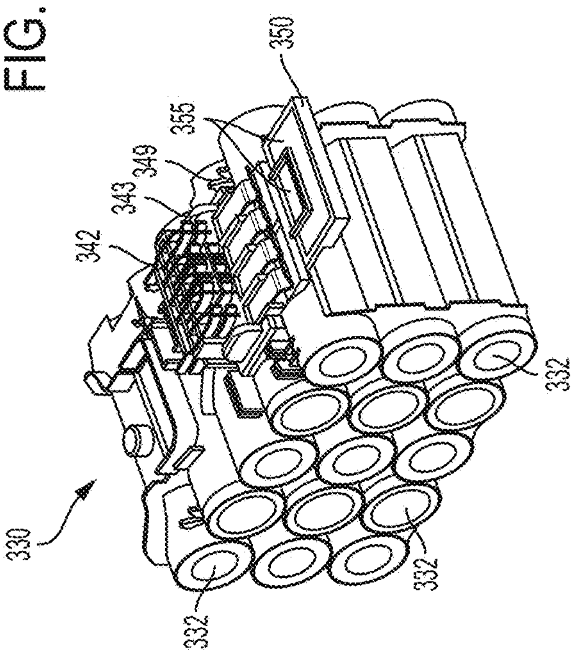
Figure 25C:
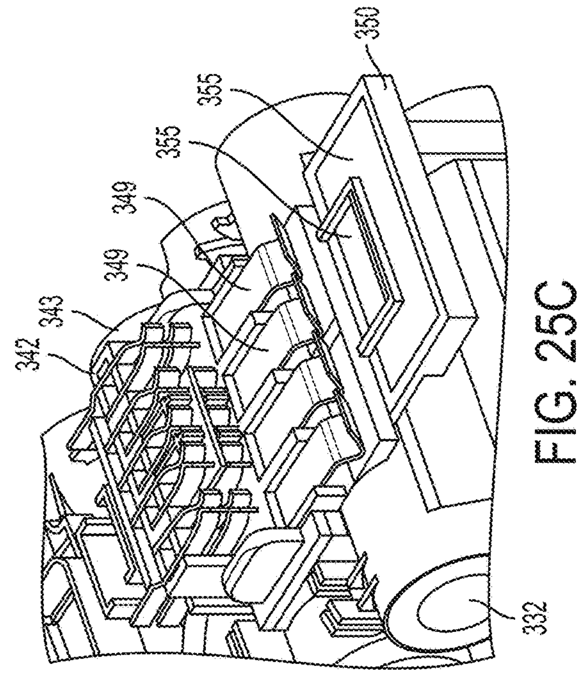

FIG. 25*a* is a perspective view of an exemplary convertible battery pack and an exemplary converter element; FIG. 25*b* is a perspective view of an exemplary convertible battery; and FIG. 25*c* is a magnified view of FIG. 25*b*.

Figure 26B:
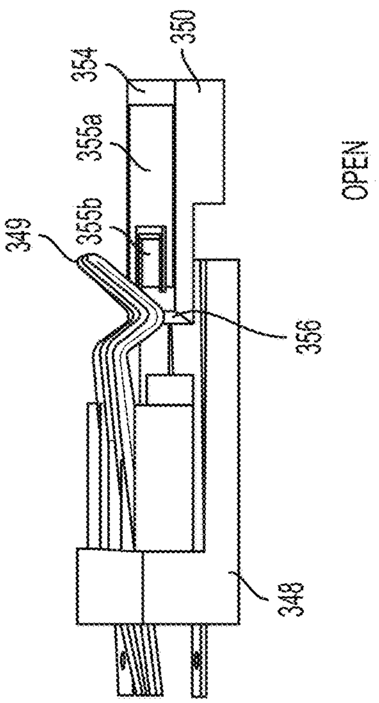
Figure 26A:
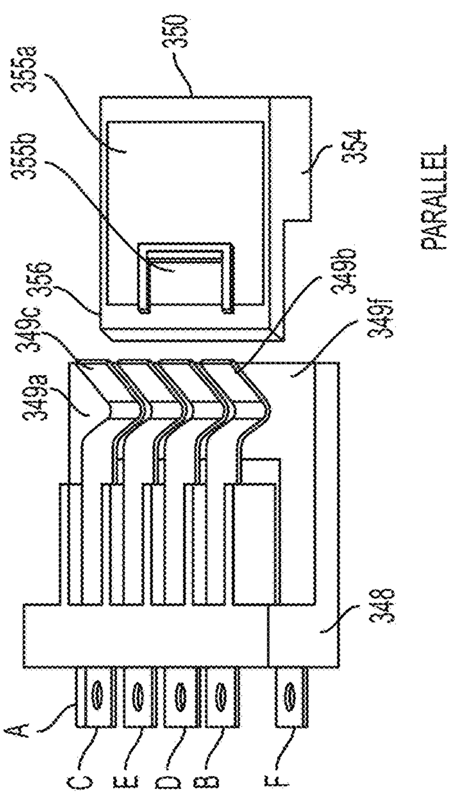
Figure 26C:
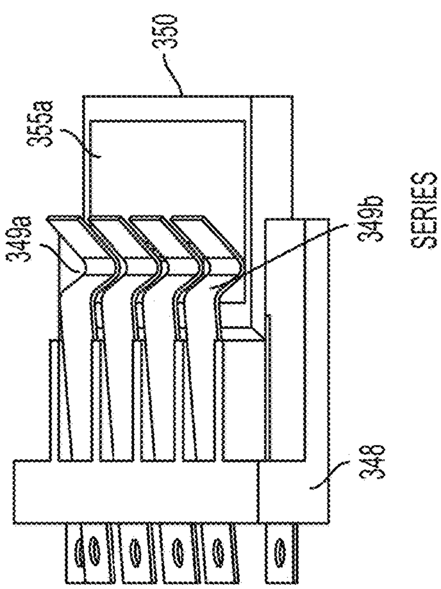

FIG. 26*a* is a perspective view of an exemplary convertible battery second terminal block and an exemplary converter element in a first configuration; FIG. 26*b* is a perspective view of the exemplary convertible battery second terminal block and the exemplary converter element in a second configuration; and FIG. 26*c* is a perspective view of the exemplary convertible battery second terminal block and the exemplary converter element in a third configuration.

Figure 27B:
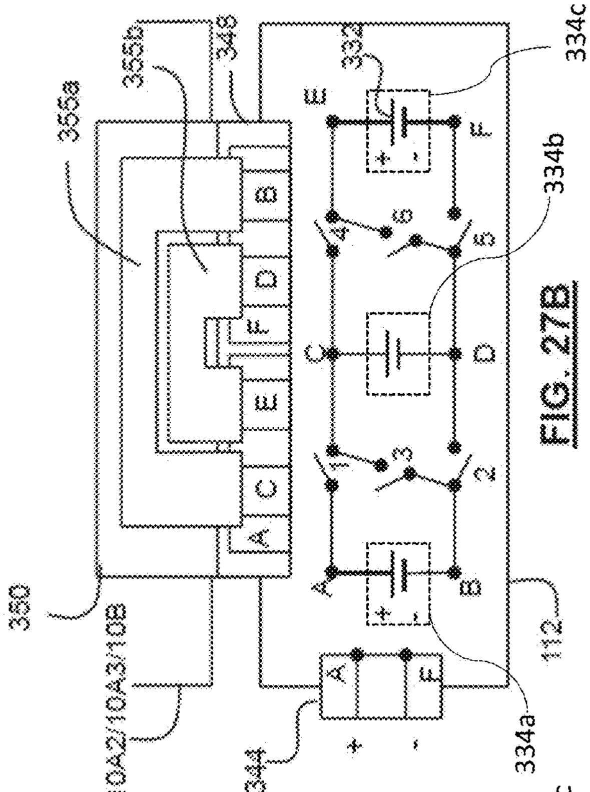
Figure 27A:
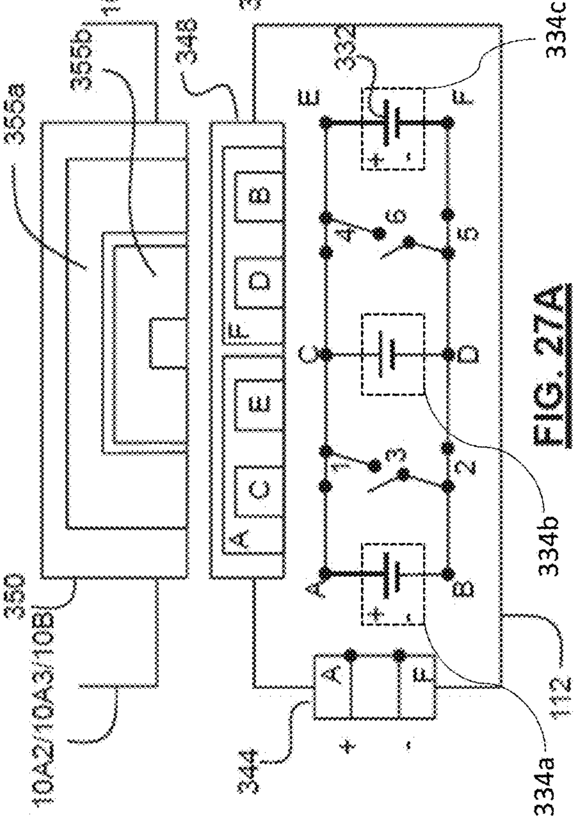
Figure 27C:
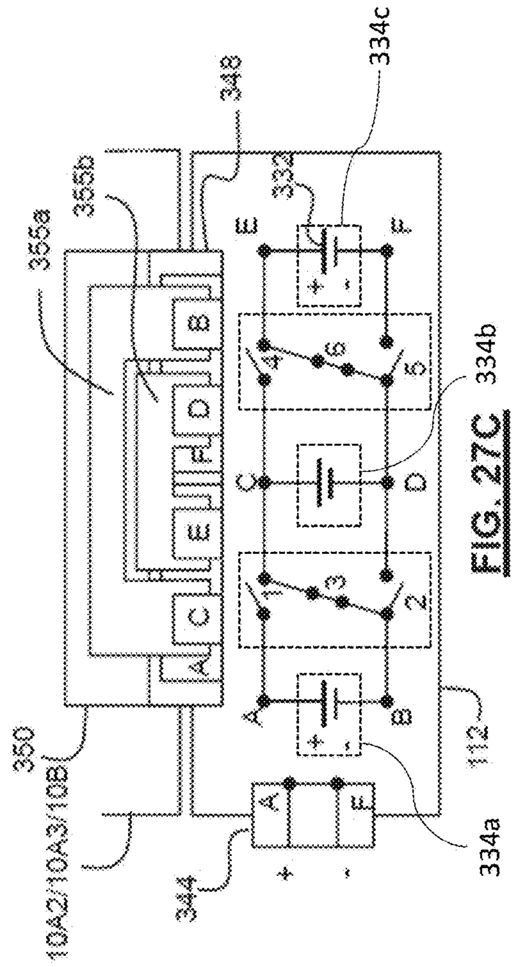

FIG. 27*a* is a partial circuit diagram/partial block diagram of an exemplary convertible battery pack and an exemplary medium rated voltage or high rated voltage or very high rated voltage power tool corresponding to FIG. 27*a*; FIG. 27*b* is a partial circuit diagram/partial block diagram of the exemplary convertible battery pack and the exemplary medium rated voltage or high rated voltage or very high rated voltage power tool corresponding to FIG. 26*b*; and FIG. 27*c* is a partial circuit diagram/partial block diagram of the exemplary convertible battery pack and the exemplary medium rated voltage or high rated voltage or very high rated voltage power tool corresponding to FIG. 26*c*.

Figure 28B:
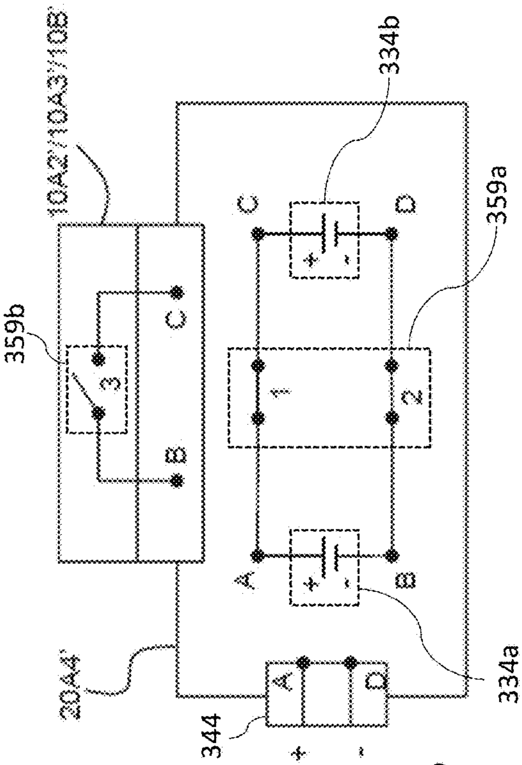
Figure 28A:
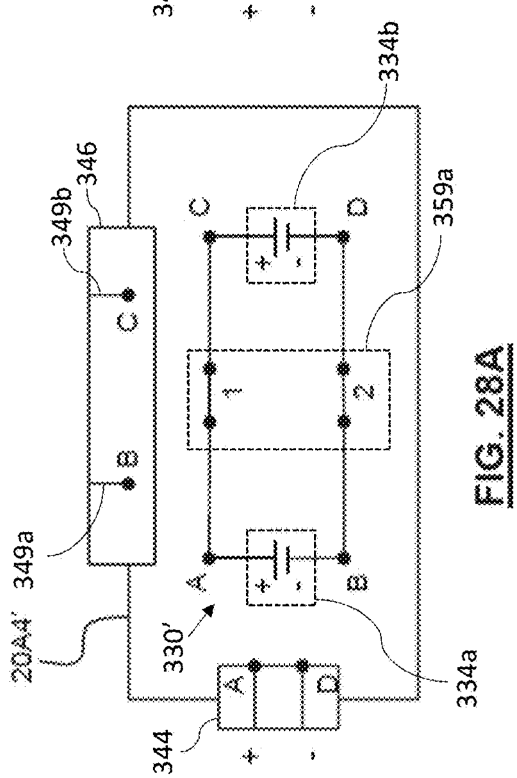
Figure 28C:
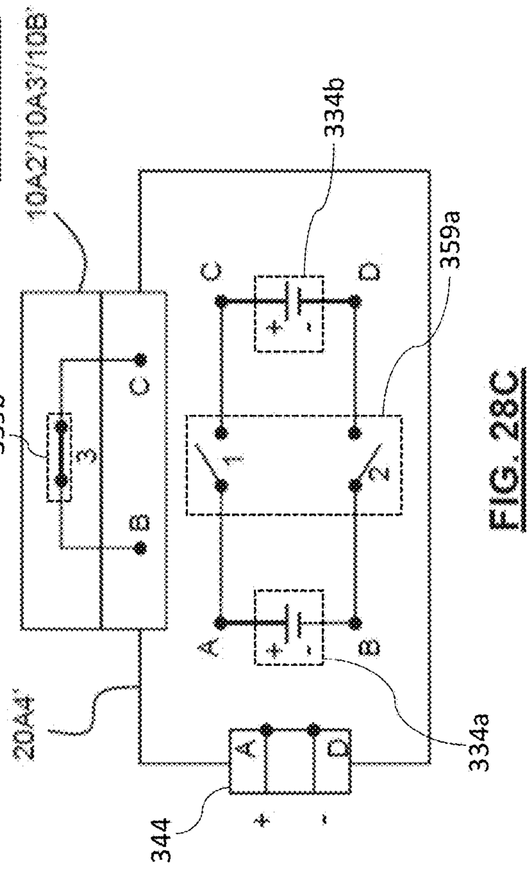

FIGS. 28*a*-28*c* illustrate a partial circuit diagram/partial block diagram of an alternate exemplary embodiment of a convertible battery pack and an exemplary medium rated voltage or high rated voltage or very high rated voltage power tool.

Figure 29B:
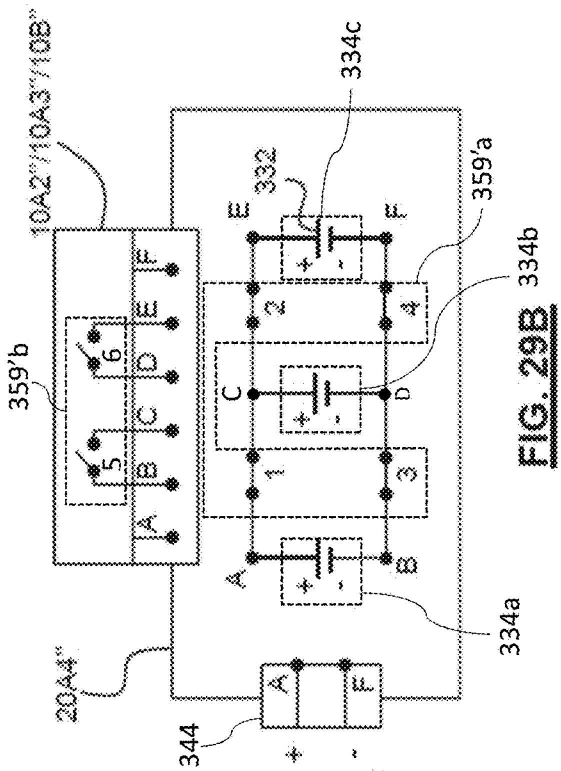
Figure 29A:
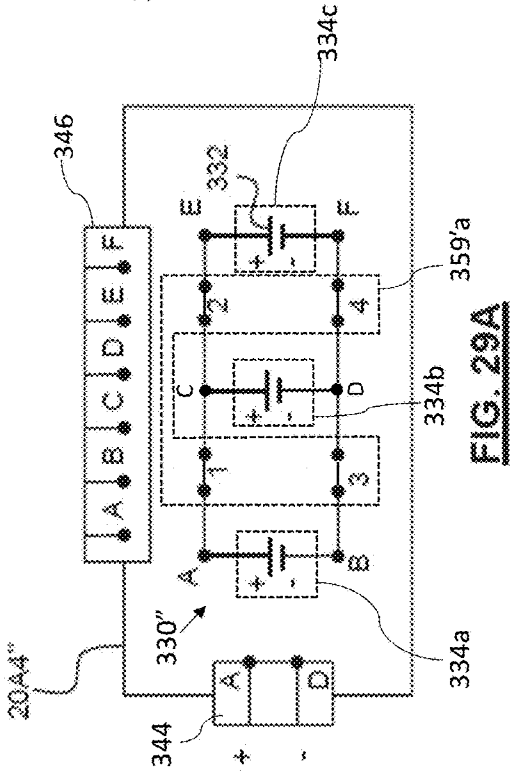
Figure 29C:
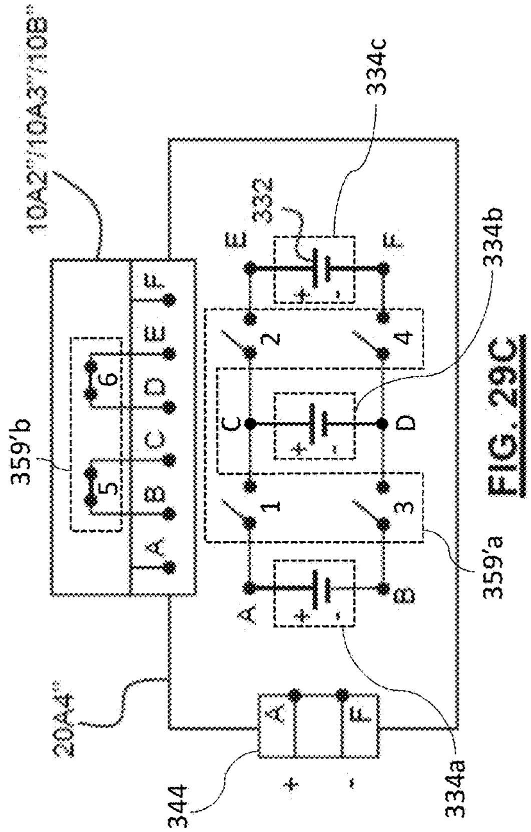

FIGS. 29*a*-29*c* illustrate a partial circuit diagram/partial block diagram of an alternate exemplary embodiment of a convertible battery pack and an exemplary medium rated voltage or high rated voltage or very high rated voltage power tool.

Figure 30:
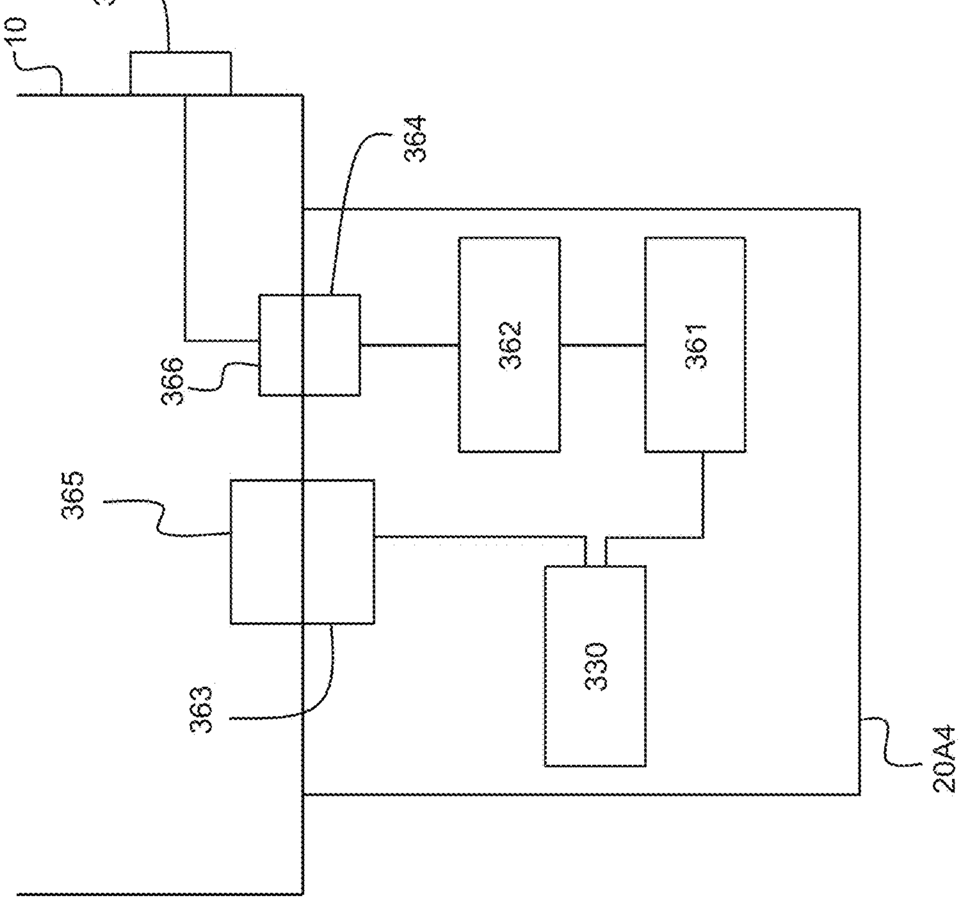

FIG. 30 illustrates a block diagram of an alternate exemplary embodiment of a convertible battery pack and an exemplary medium rated voltage or high rated voltage or very high rated voltage power tool.

Figure 31:
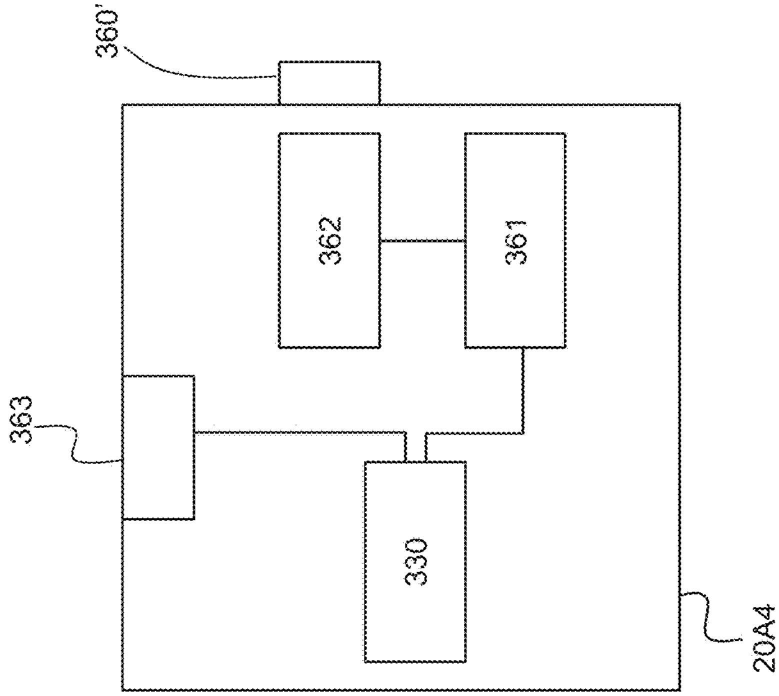

FIG. 31 illustrates a block diagram of an alternate exemplary embodiment of a convertible battery pack.

Figure 32A:
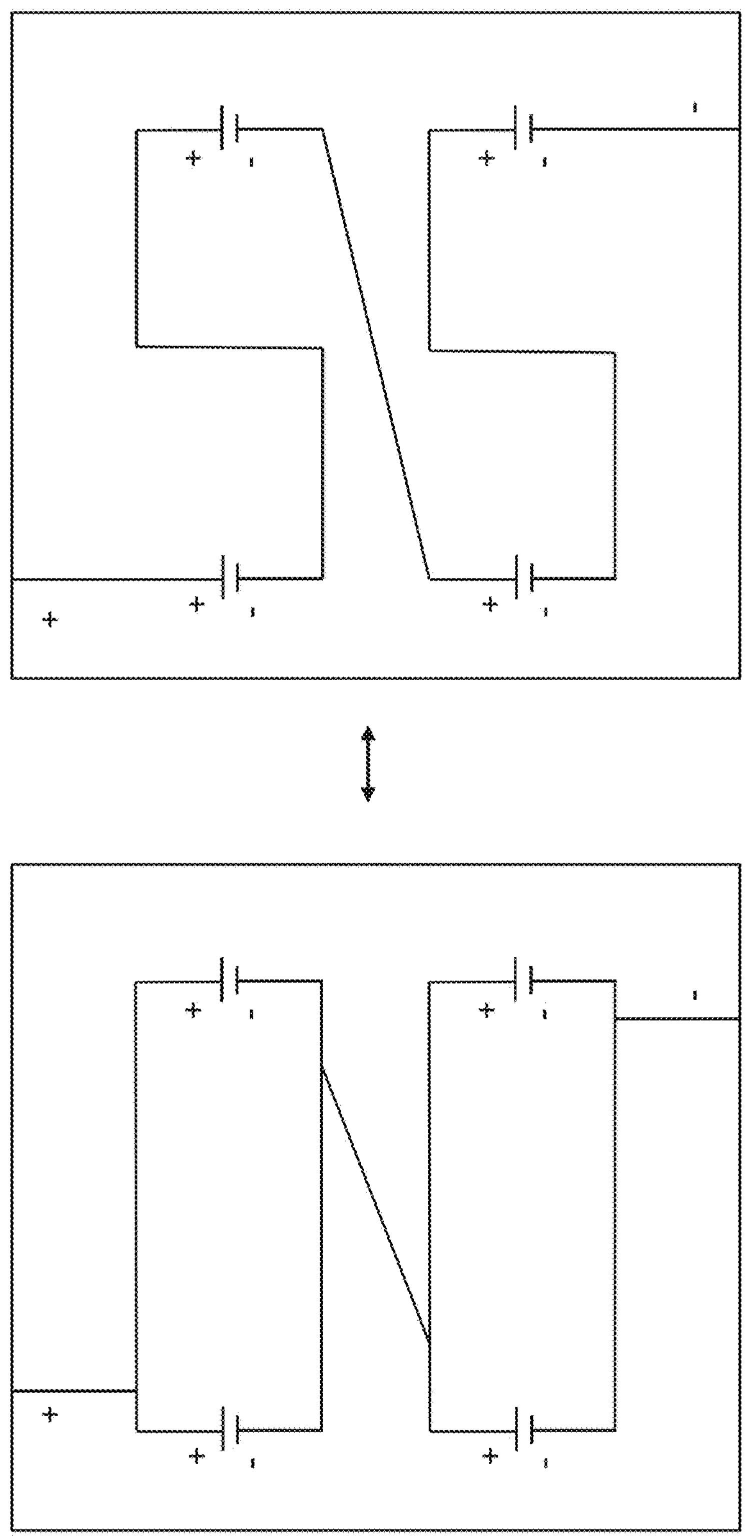
Figure 32B:
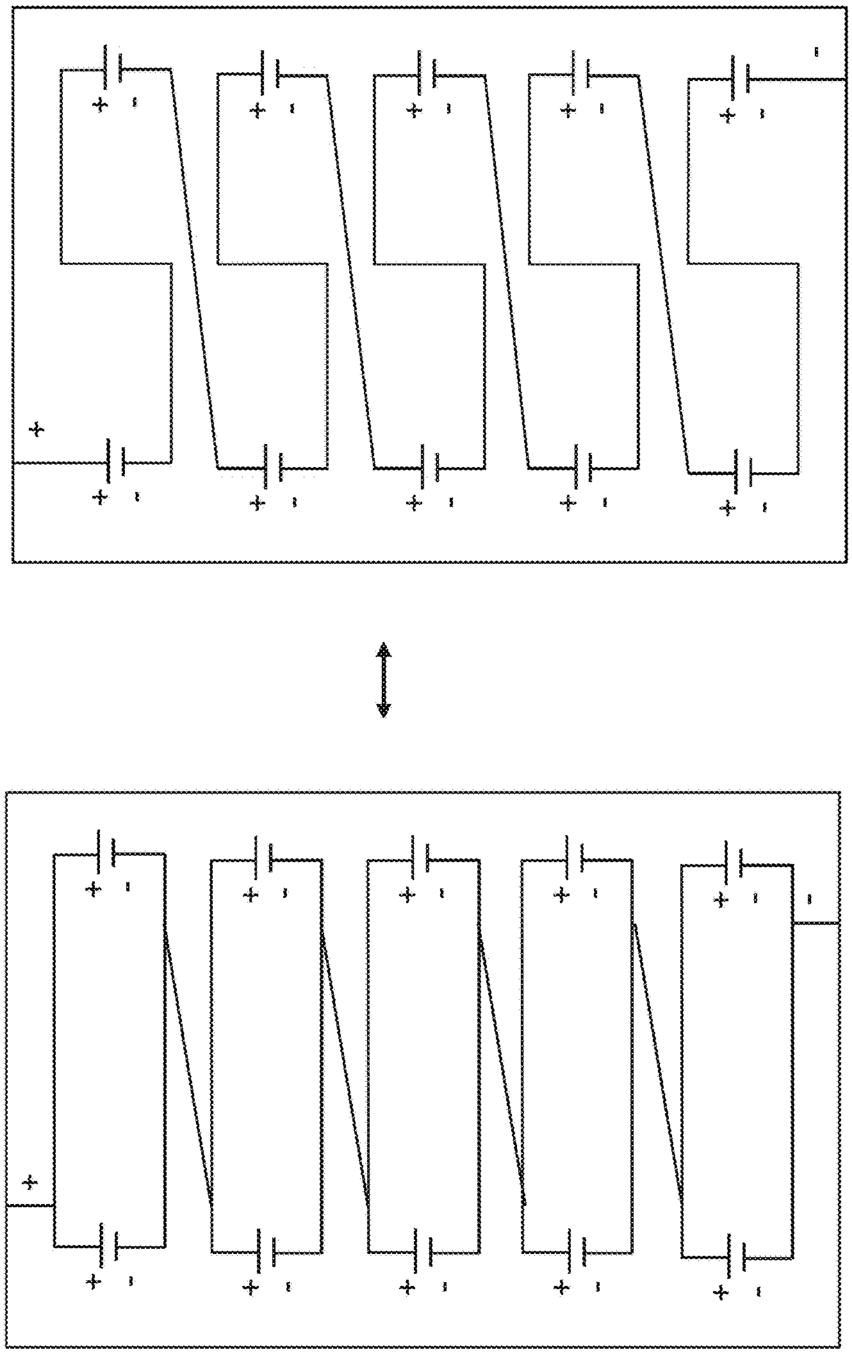

FIG. 32*a* illustrates an exemplary simplified circuit diagram of a convertible battery in a low voltage/high capacity cell configuration and a medium voltage/low capacity cell configuration FIG. 32*b* illustrates an exemplary simplified circuit diagram of a convertible battery in a low voltage/high capacity cell configuration and a medium voltage/low capacity cell configuration.

Figure 32C:
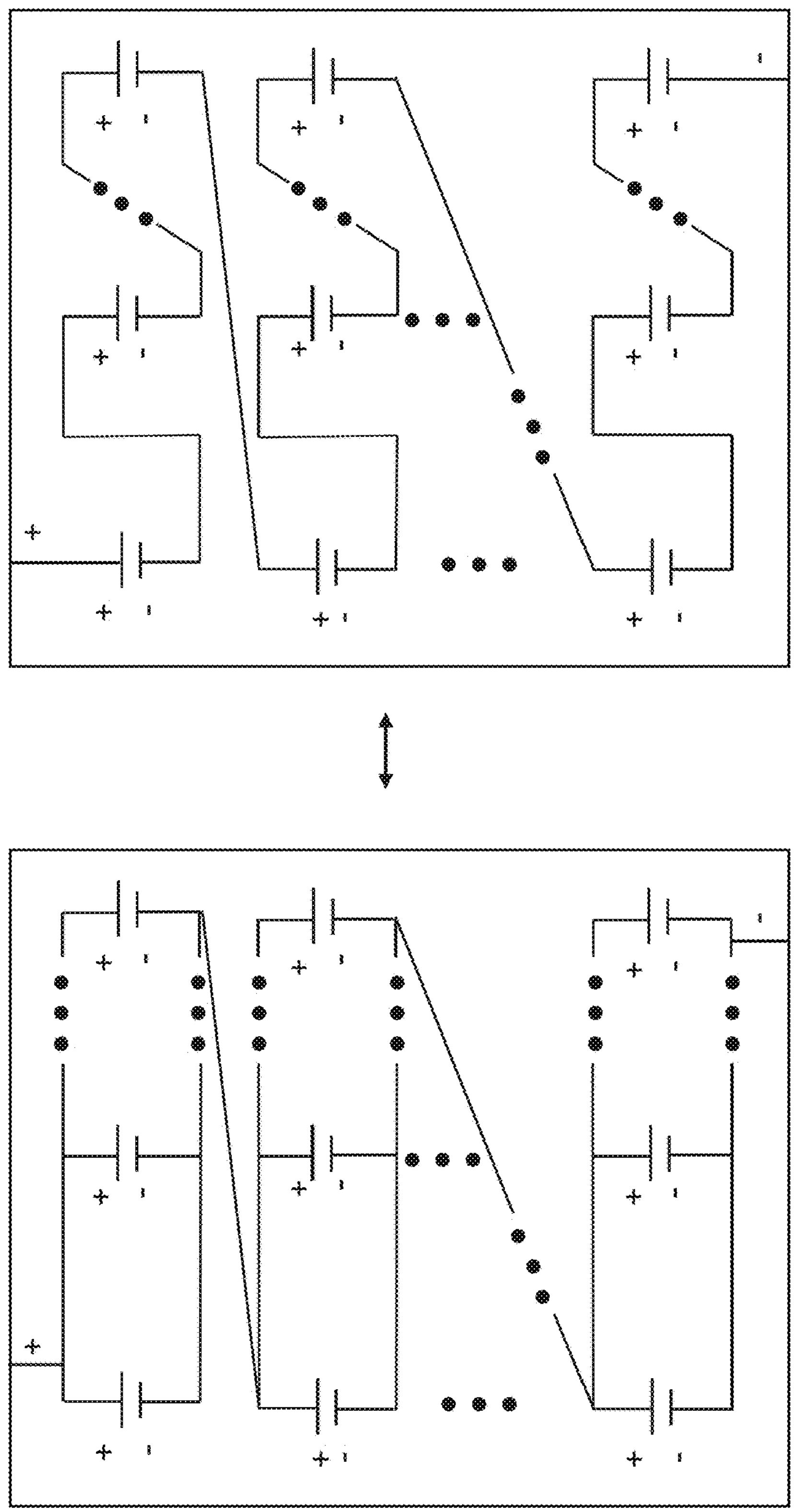

FIG. 32*c* illustrates an exemplary simplified generic circuit diagram of a convertible battery in a low voltage/high capacity cell configuration and a medium rated voltage/high capacity cell configuration.

Figure 33:
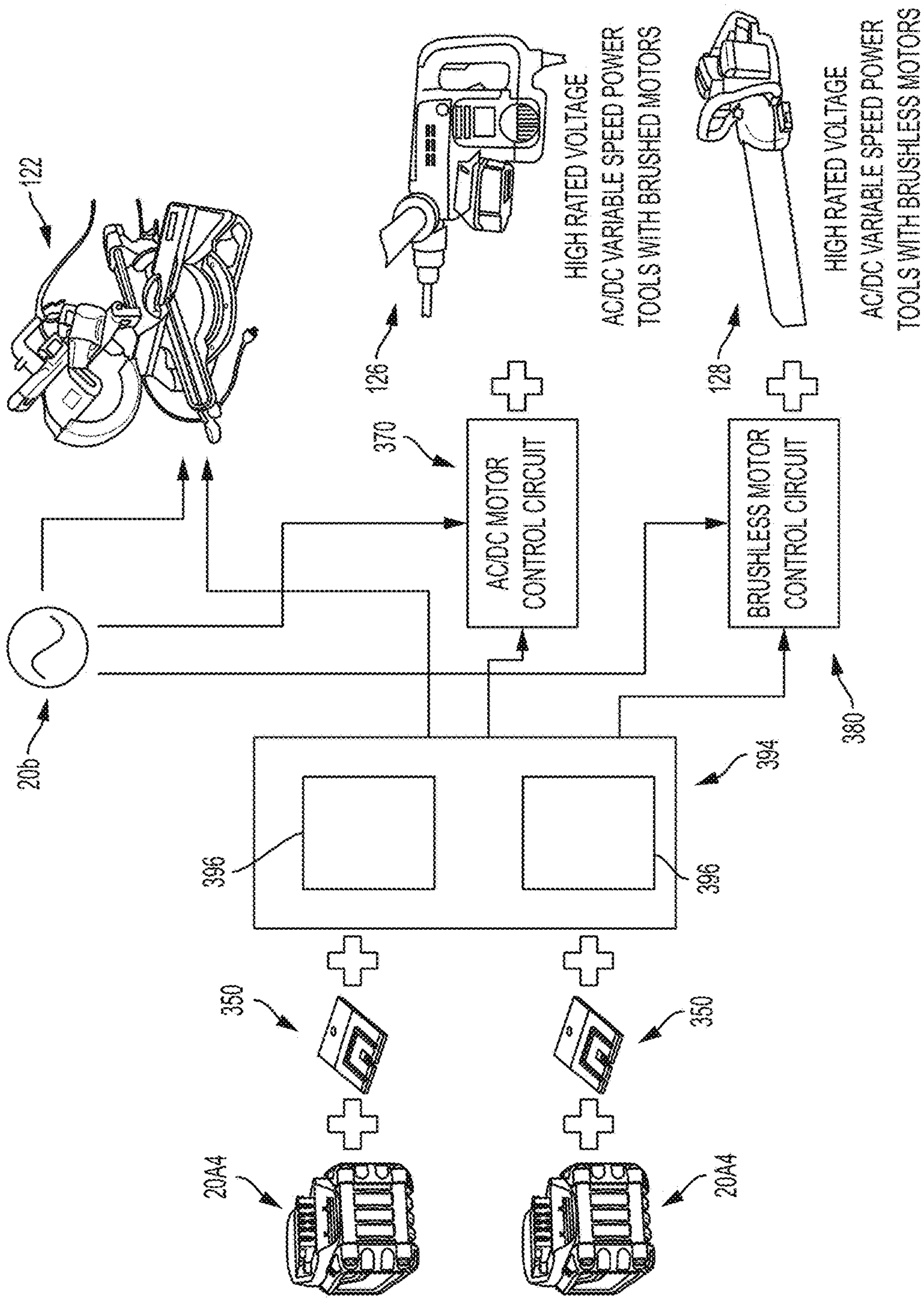

FIG. 33 illustrates an exemplary alternate embodiment of a power tool system utilizing a converter box for generating a high voltage DC output.

Figure 34:
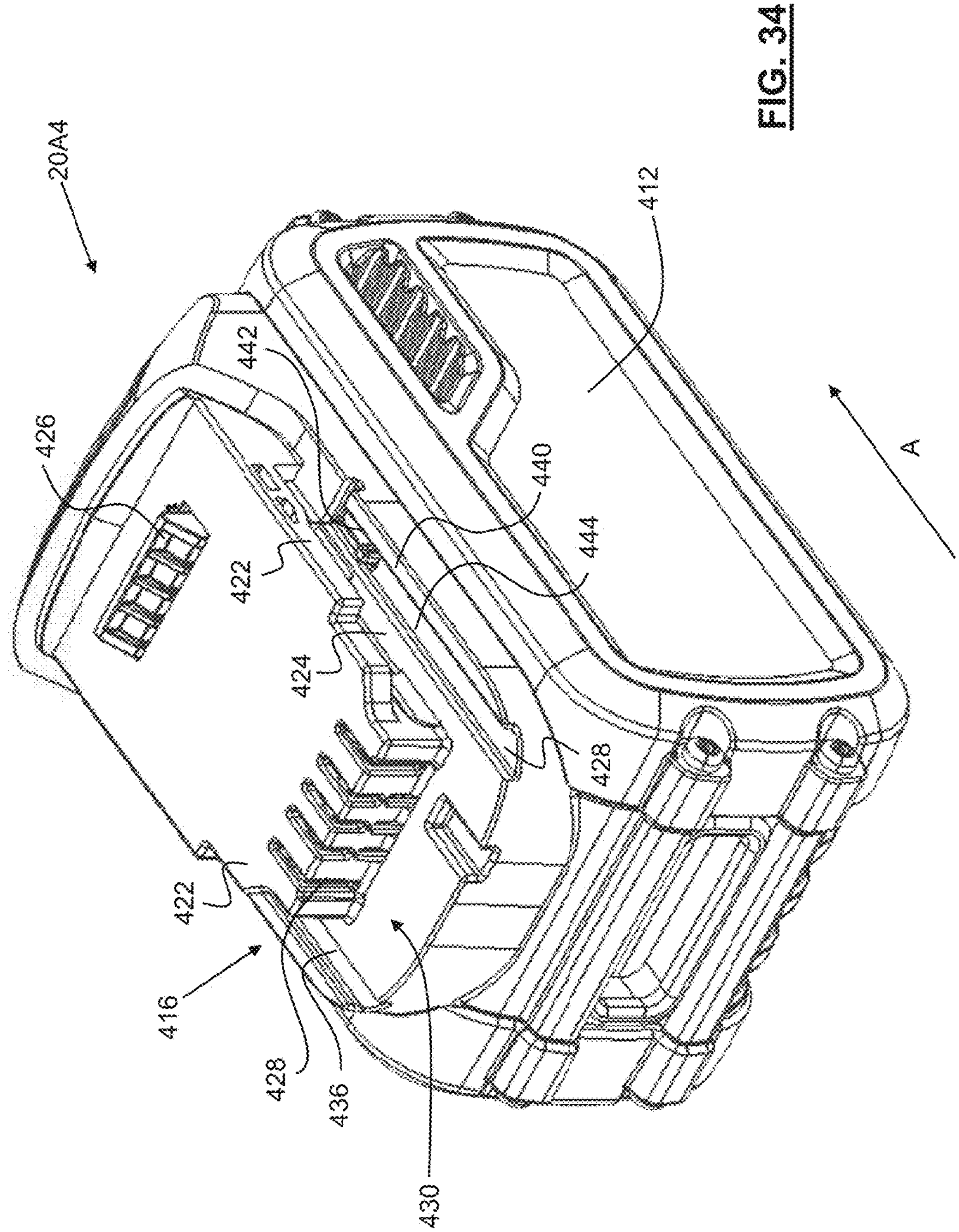

FIG. 34 is a view of an exemplary embodiment a convertible battery pack.

Figure 35:
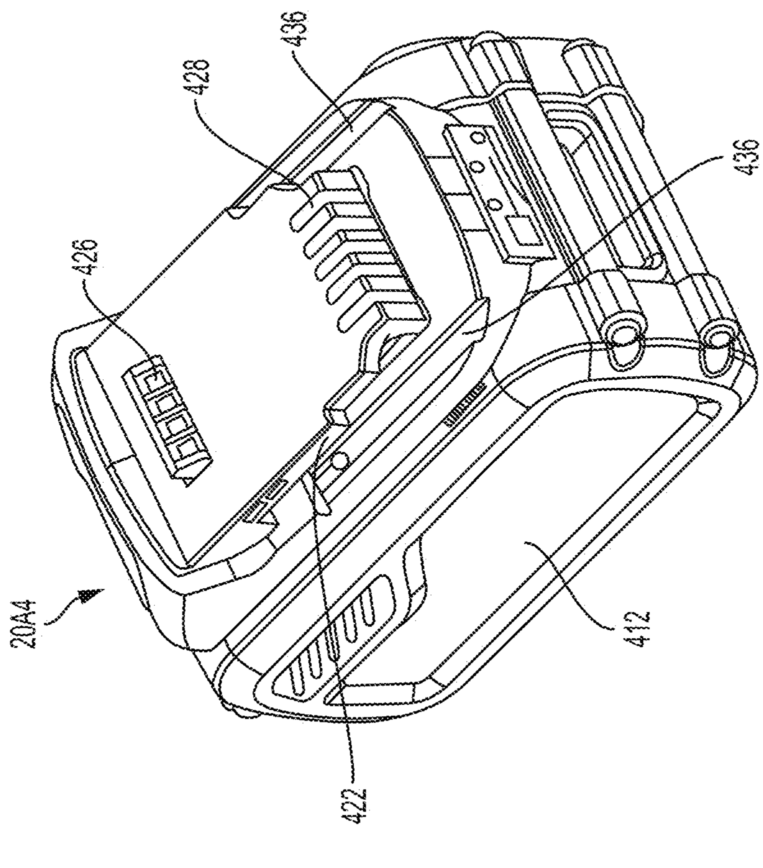

FIG. 35 is another view of the exemplary embodiment of FIG. 34.

Figure 36B:
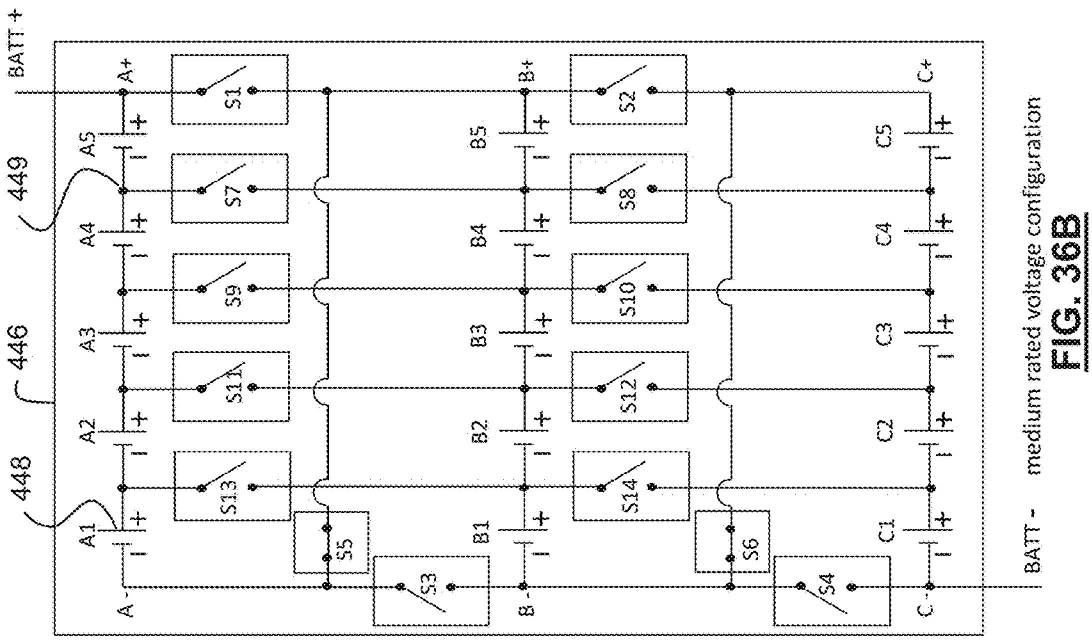
Figure 36A:
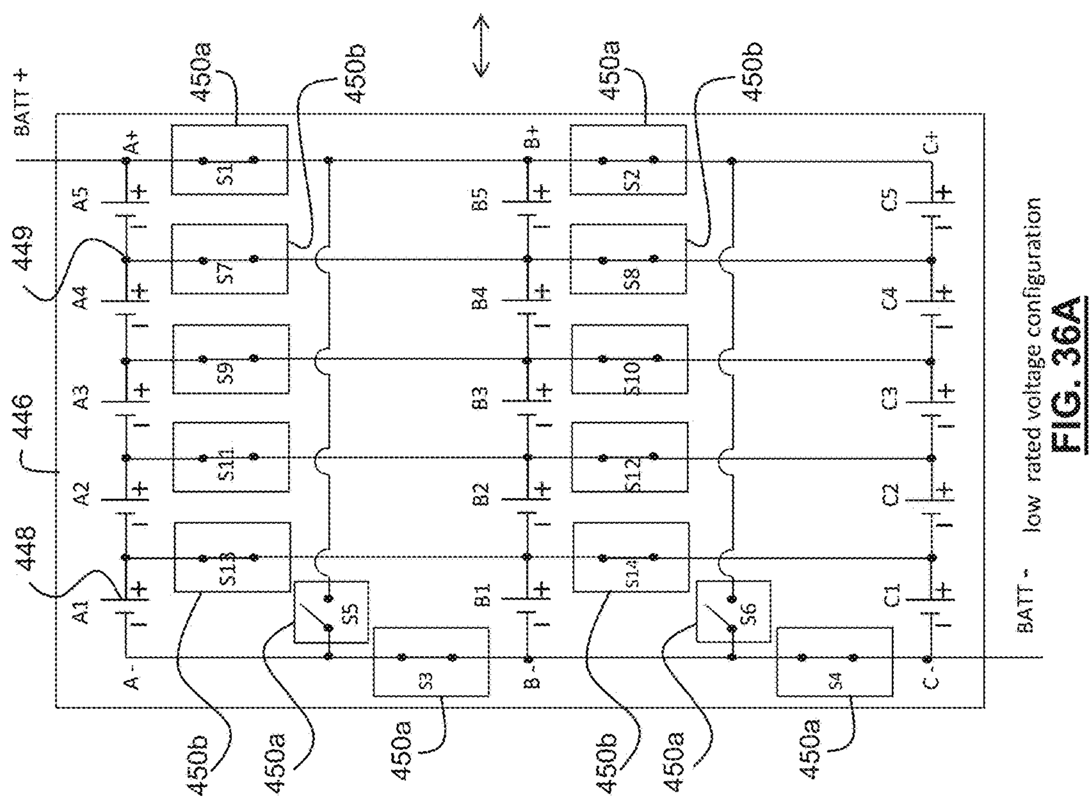

FIGS. 36*a* and 36*b* are circuit diagrams of an exemplary embodiment of a convertible battery in a first cell configuration and a second cell configuration.

Figures 37A, 37B:
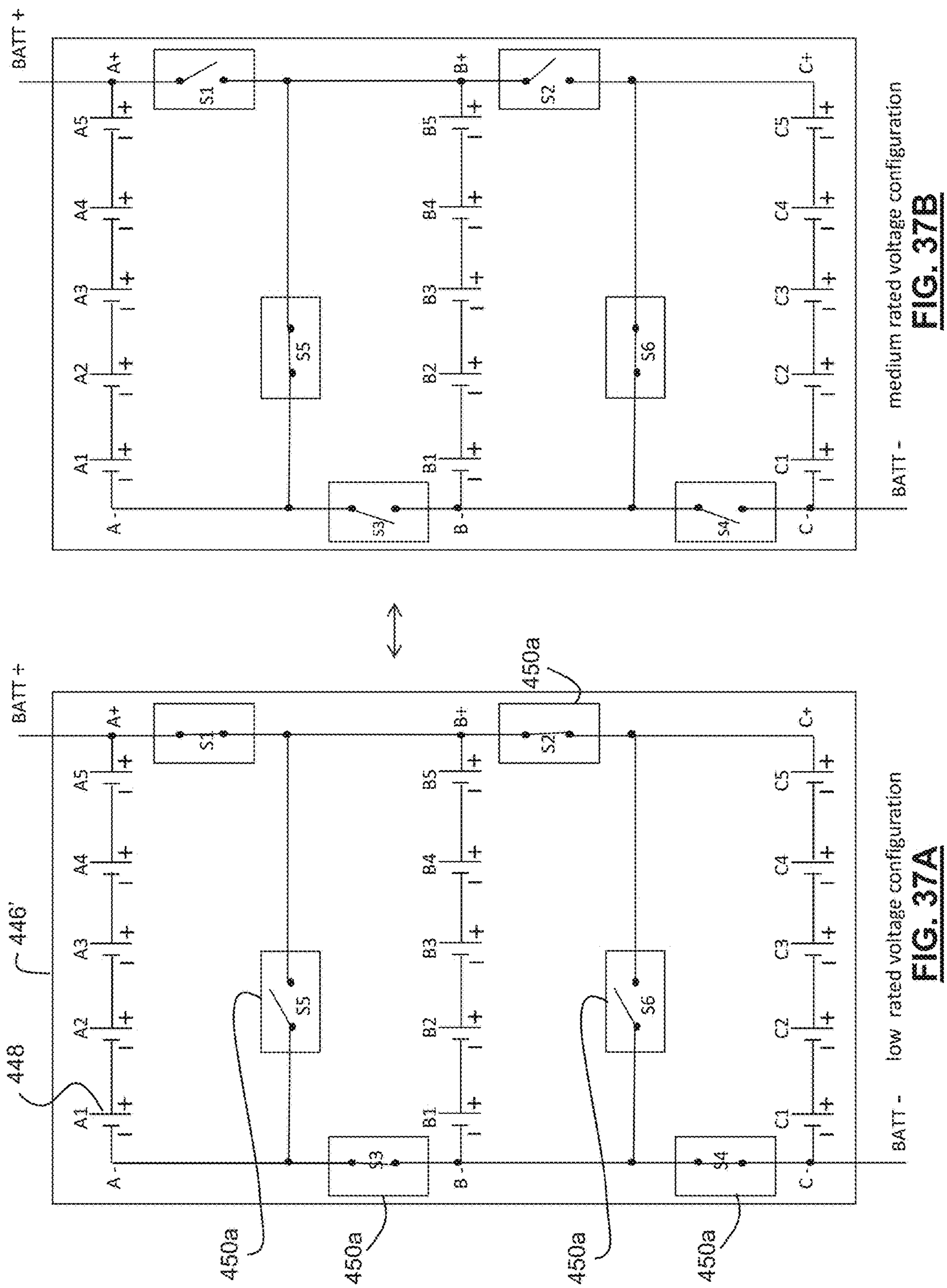

FIGS. 37*a* and 37*b* are circuit diagrams of another exemplary embodiment of a convertible battery in a first cell configuration and a second cell configuration.

Figure 38:
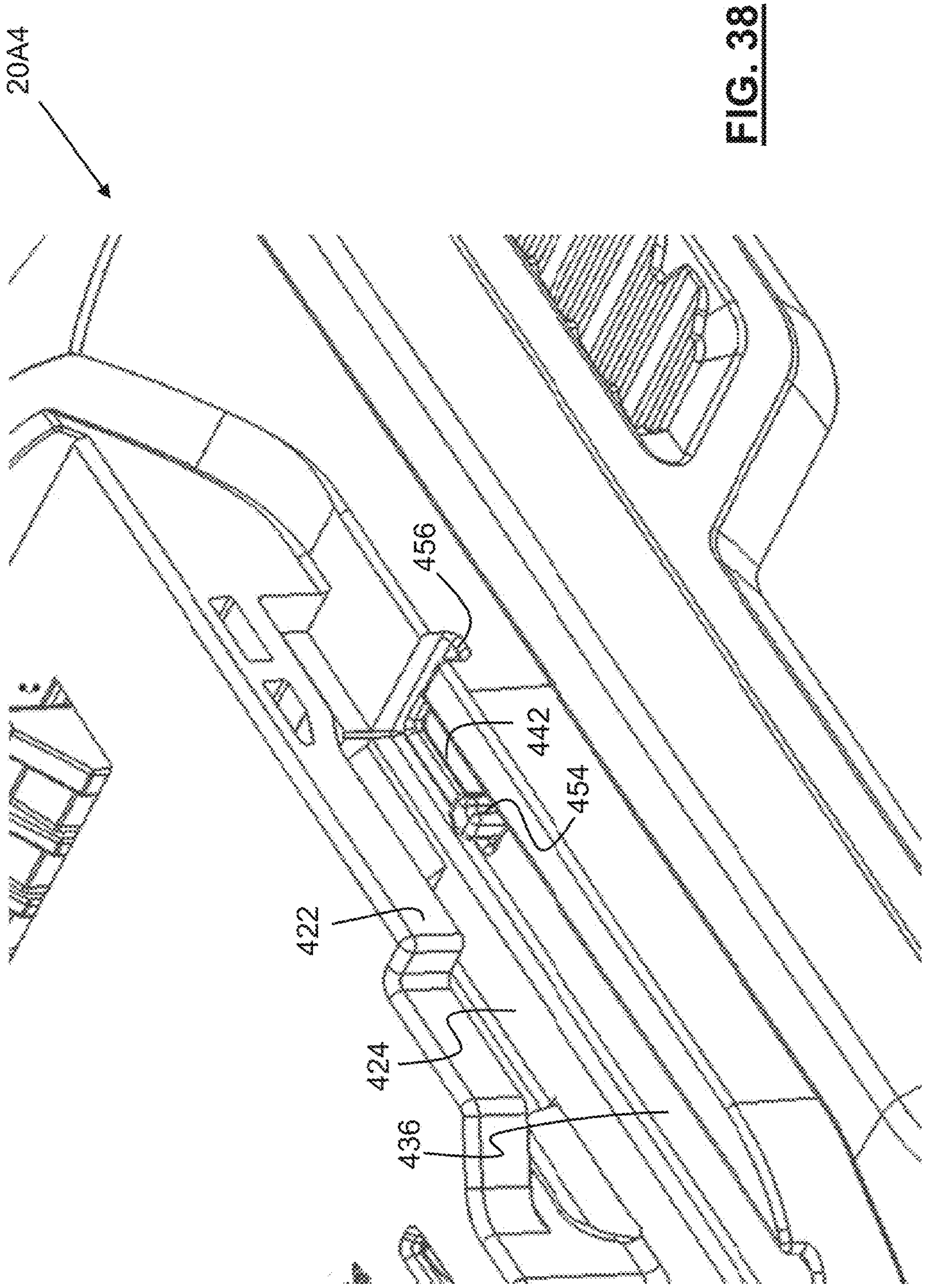

FIG. 38 is a detail, partial view of the exemplary embodiment of FIG. 34.

Figure 39B:
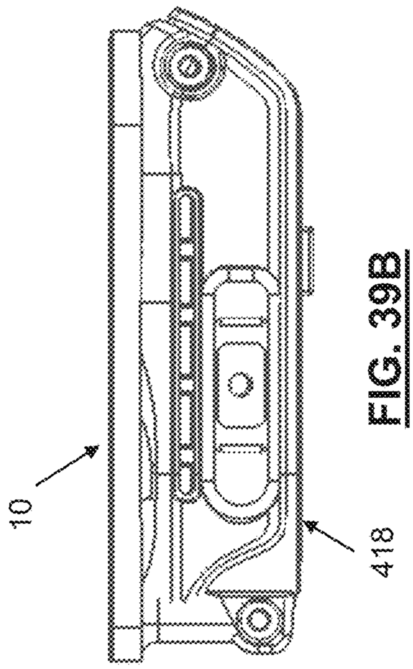
Figure 39A:
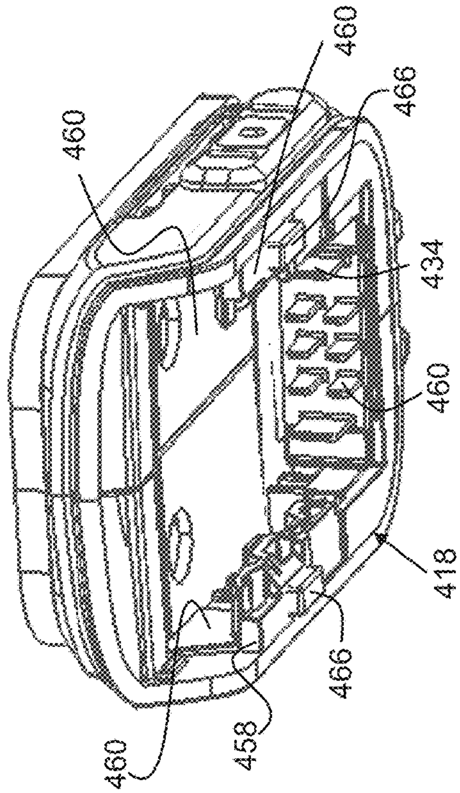
Figure 39C:
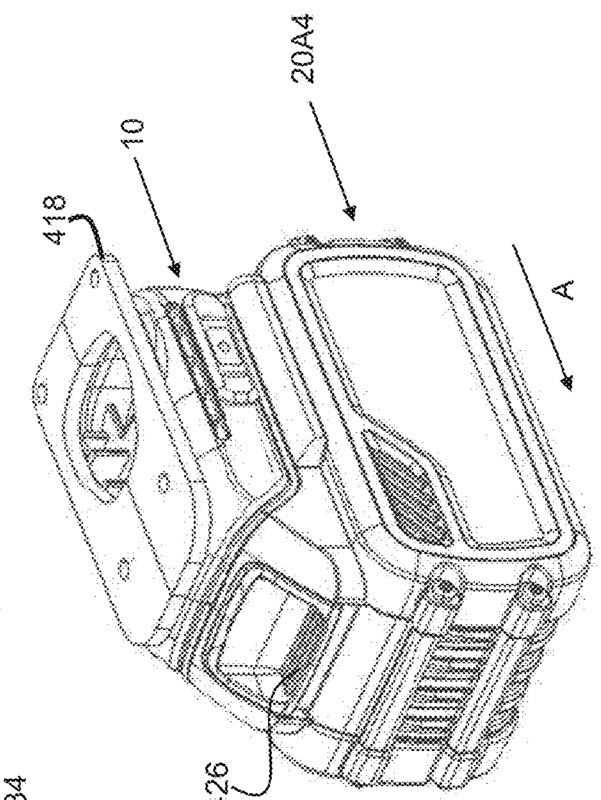

FIGS. 39*a*, 39*b* and 39*c* are views of a portion of an exemplary electrical device that may mate with a convertible battery pack.

Figure 40:
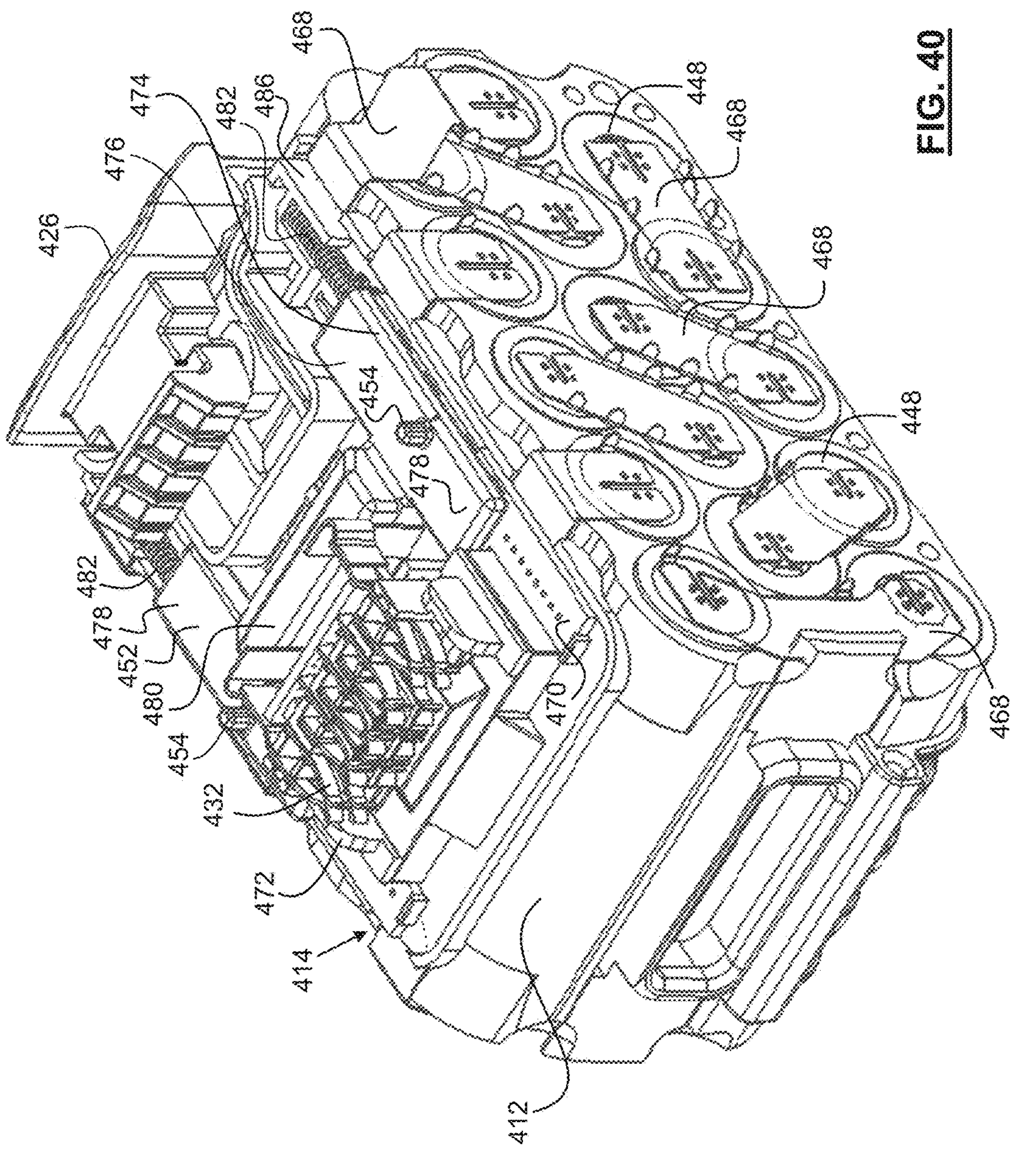

FIG. 40 is a view of an exemplary embodiment of a convertible battery pack with part of a housing removed.

Figures 41A, 41B:
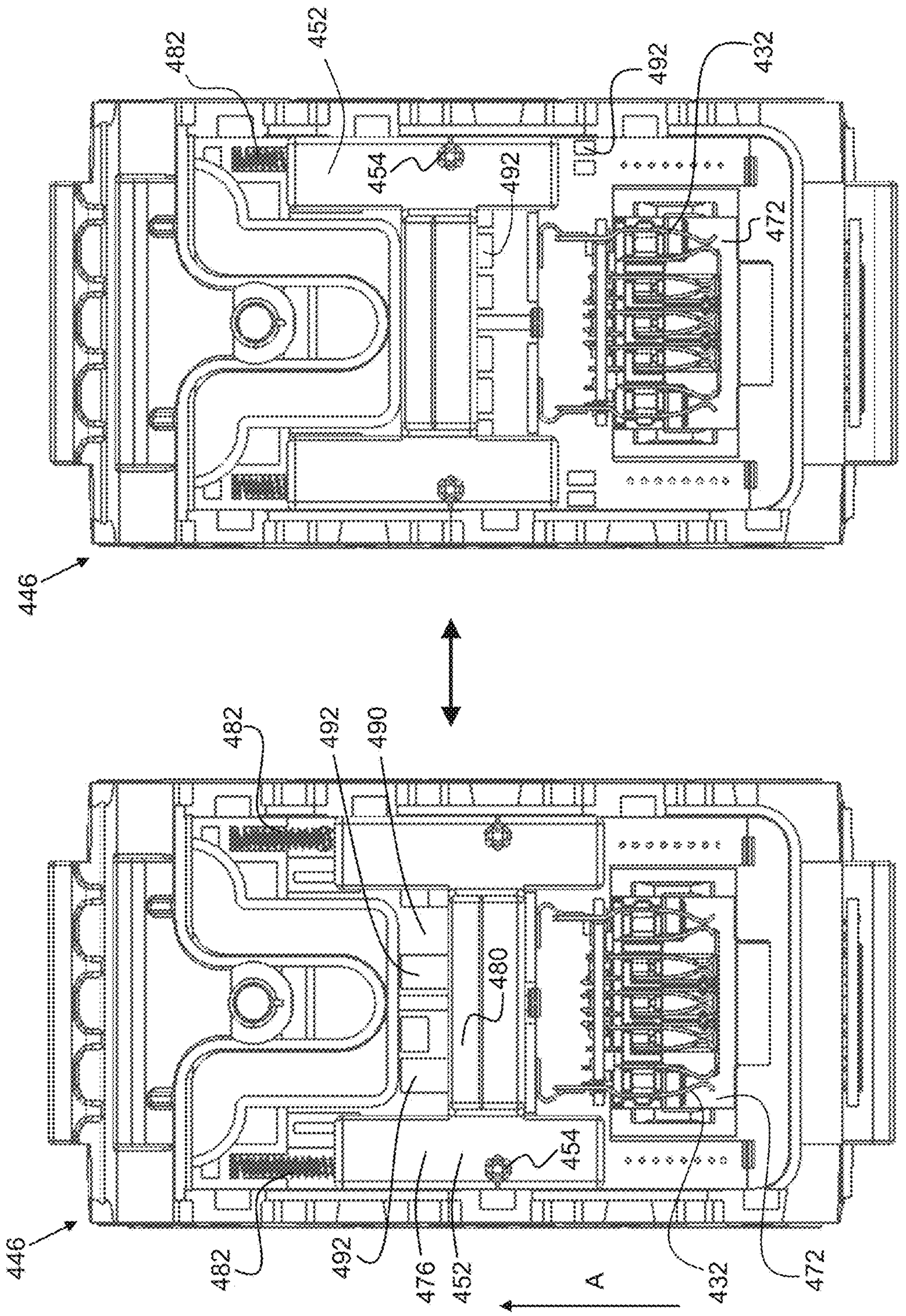

FIGS. 41*a* and 41*b* are views of the exemplary embodiment of FIG. 40 illustrating a first configuration of a convertible battery pack and a second configuration of a convertible battery pack.

Figure 42:
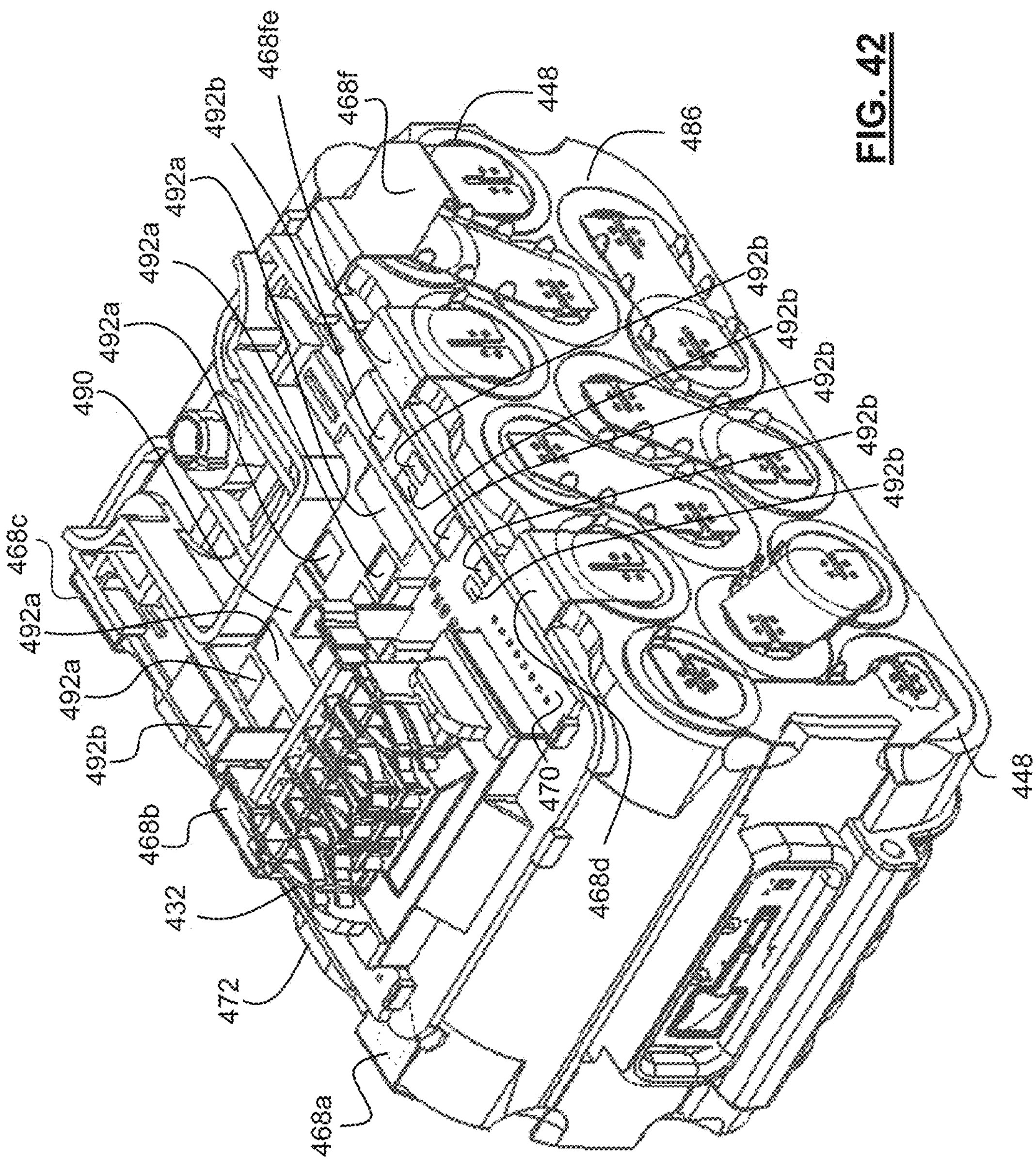

FIG. 42 is a view of the exemplary embodiment of FIG. 40 with a converter element removed.

Figure 43B:
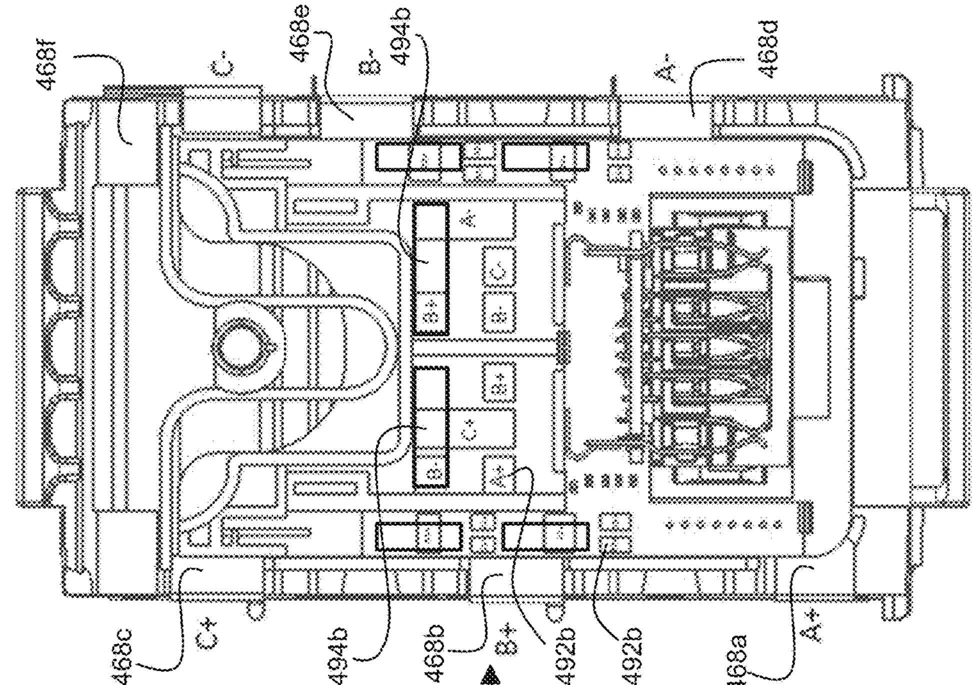
Figure 43A:
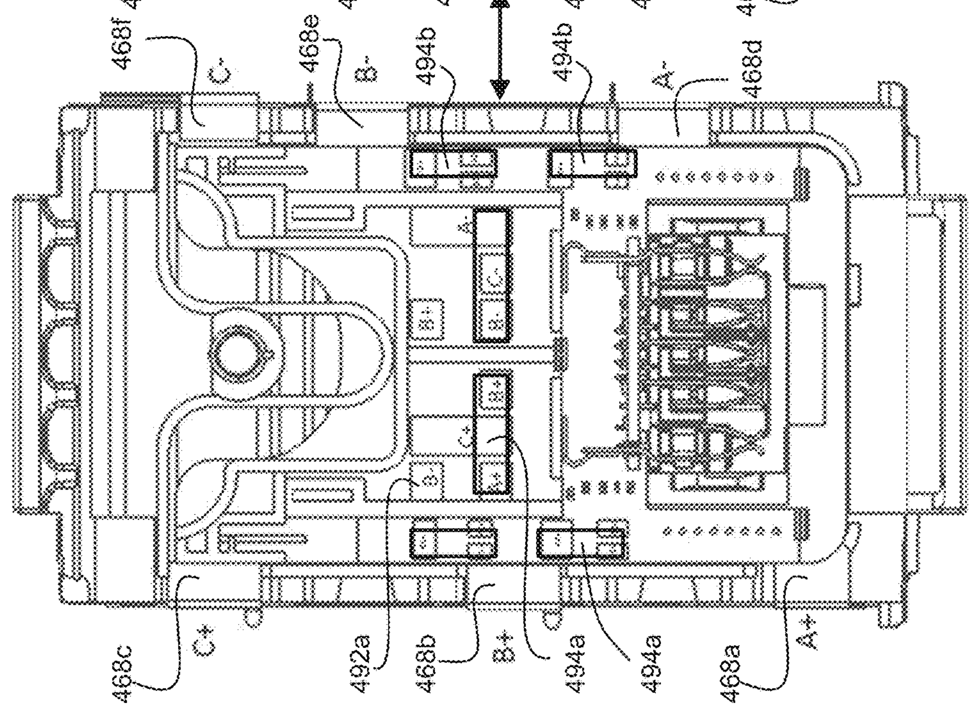

FIGS. 43*a* and 43*b* are views of the exemplary embodiment of FIG. 42 illustrating the first configuration of the battery pack and the second configuration of the battery pack.

Figure 44A:
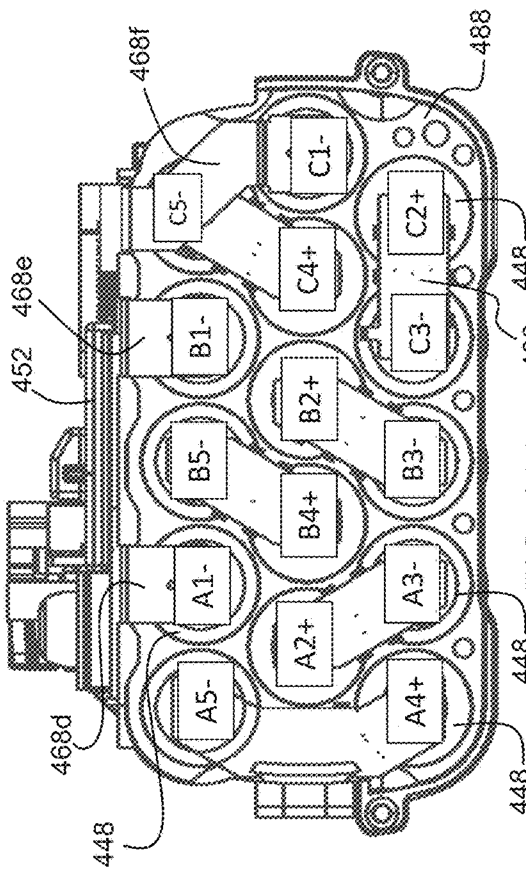
Figure 44B:
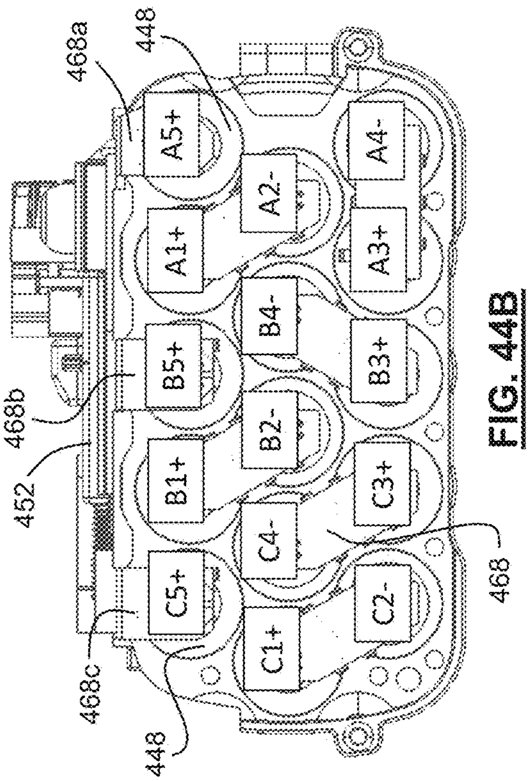

FIGS. 44*a* and 44*b* are side views of an exemplary embodiment of a convertible battery.

FIGS. 45*a*, 45*b*, 45*c*, and 45*d* are views of an exemplary embodiment of a converter element.

FIGS. 46*a*, 46*b*, 46*c*, 46*d*, and 46*e* are an exemplary embodiment of a terminal block and terminals, a contact pad layout and contacts of an exemplary convertible battery pack in five exemplary stages of a conversion process of the exemplary convertible battery pack.

FIG. 47 is a table of an exemplary connection table for a switching network of an exemplary convertible battery pack.

Figure 48A:
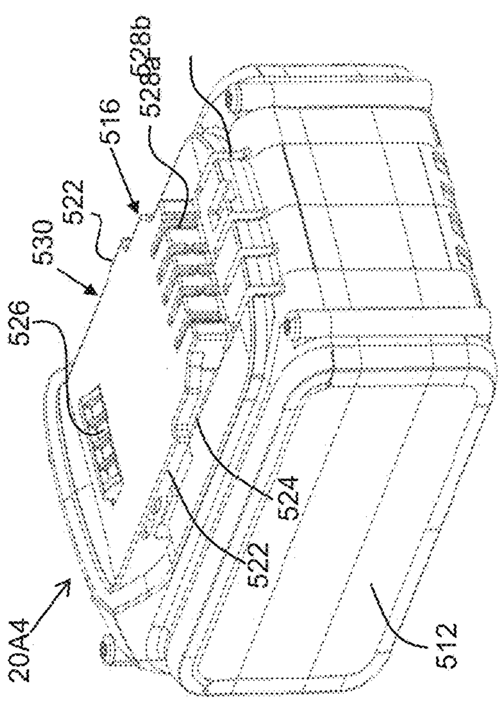
Figure 48B:
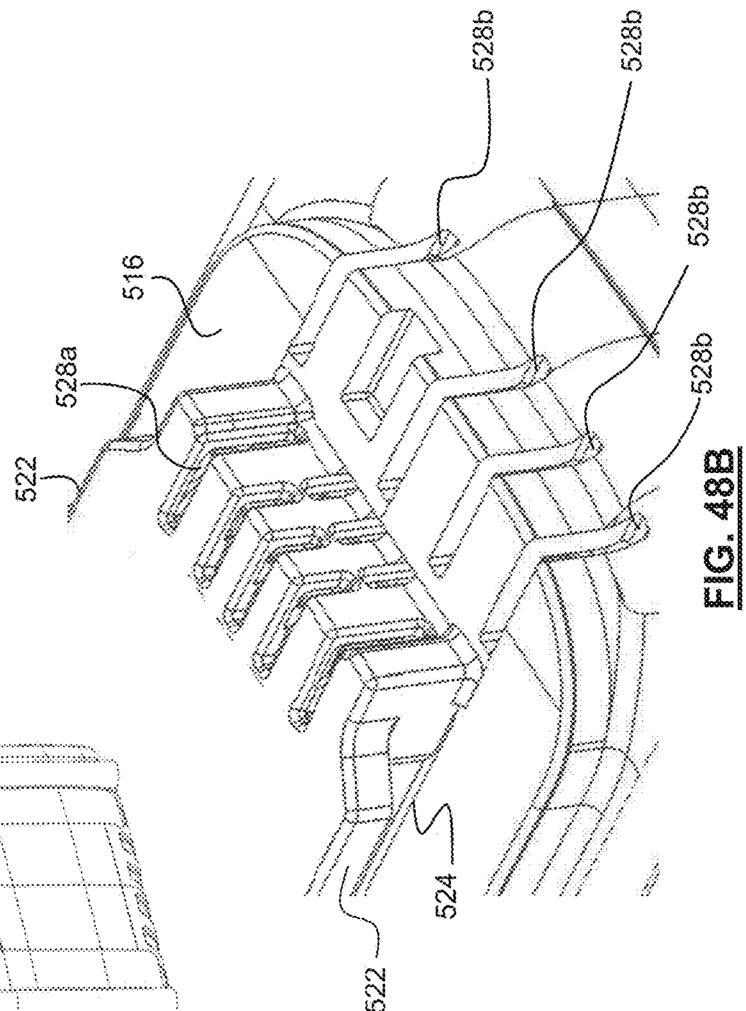

FIGS. 48*a* and 48*b* are views of an alternate exemplary embodiment of a convertible battery pack.

FIGS. 49*a*, 49*b*, 49*c* and 49*d* are views of a portion of an electrical device that may mate with a convertible battery pack.

Figure 50C:
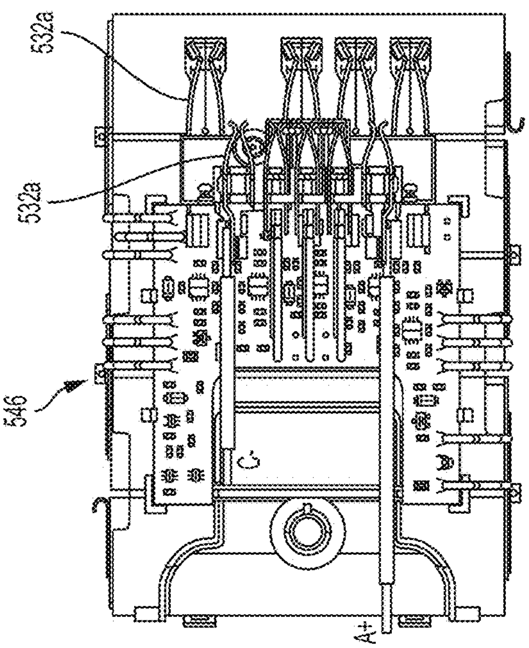
Figure 50B:
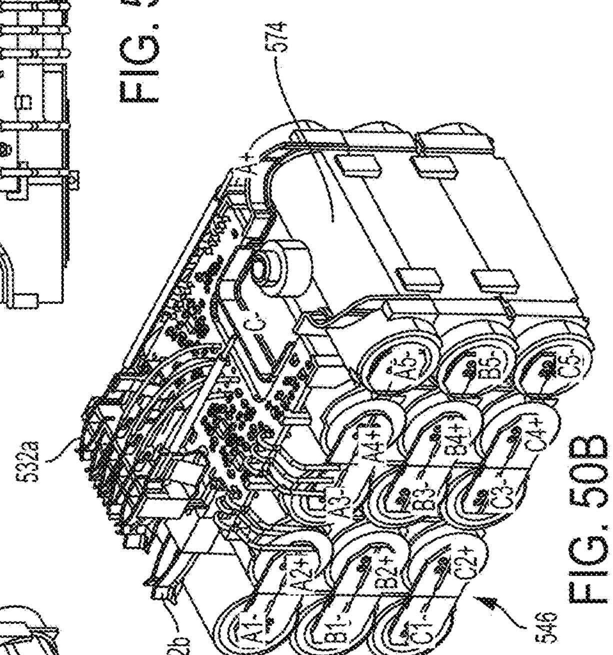
Figure 50A:
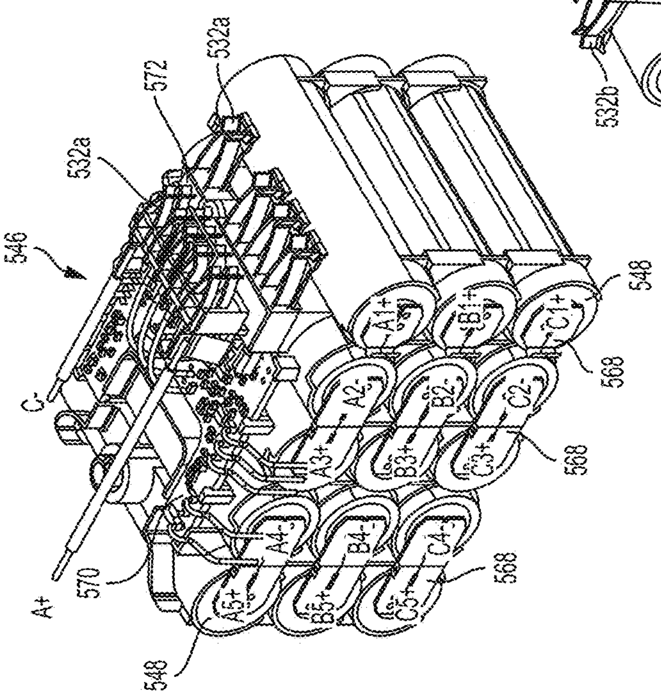

FIGS. 50*a*, 50*b* and 50*c* are views of an exemplary embodiment of a convertible battery pack with a battery pack housing removed.

Figure 51:
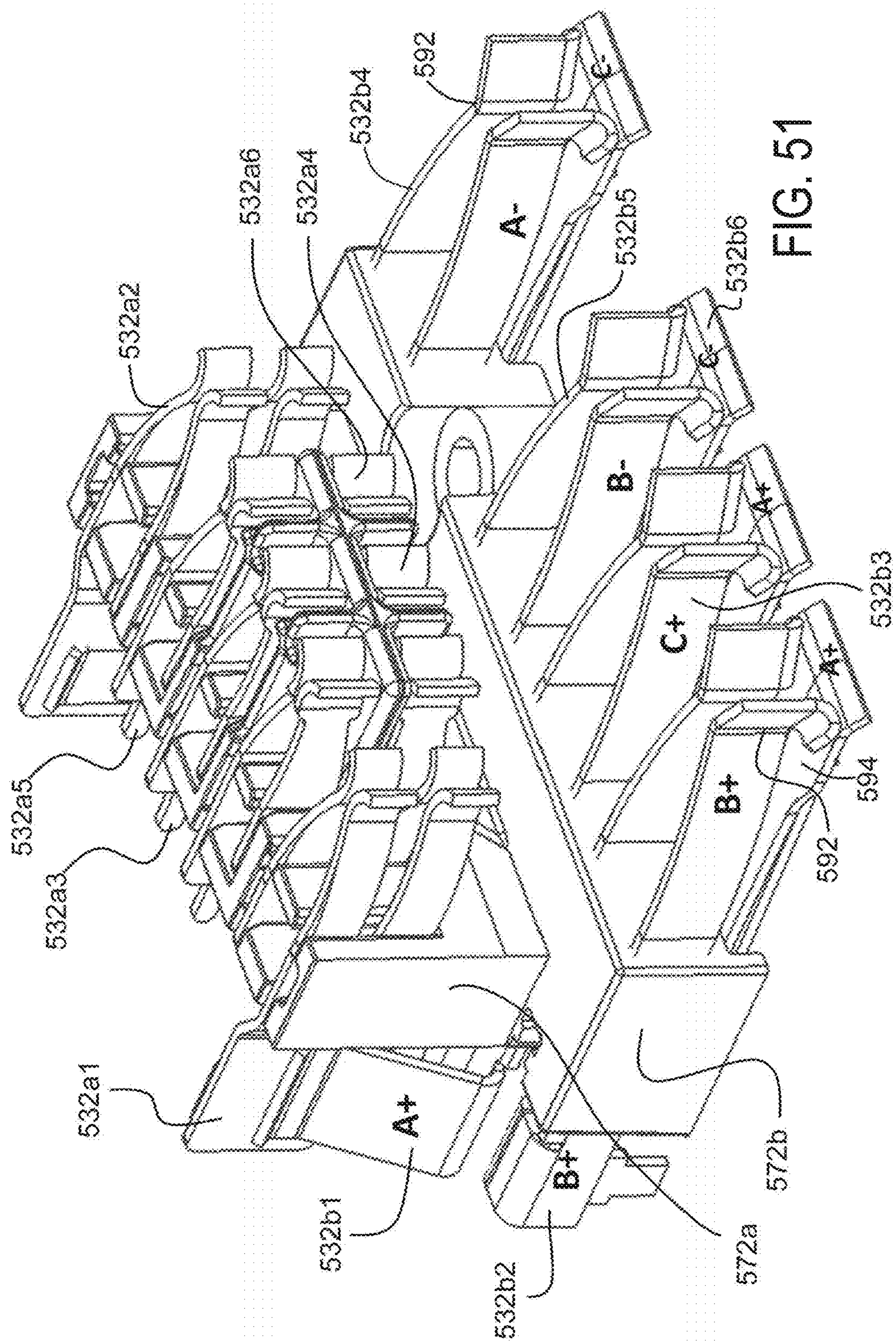

FIG. 51 is a view of an exemplary terminal block and terminals of a convertible battery pack.

Figure 52A:
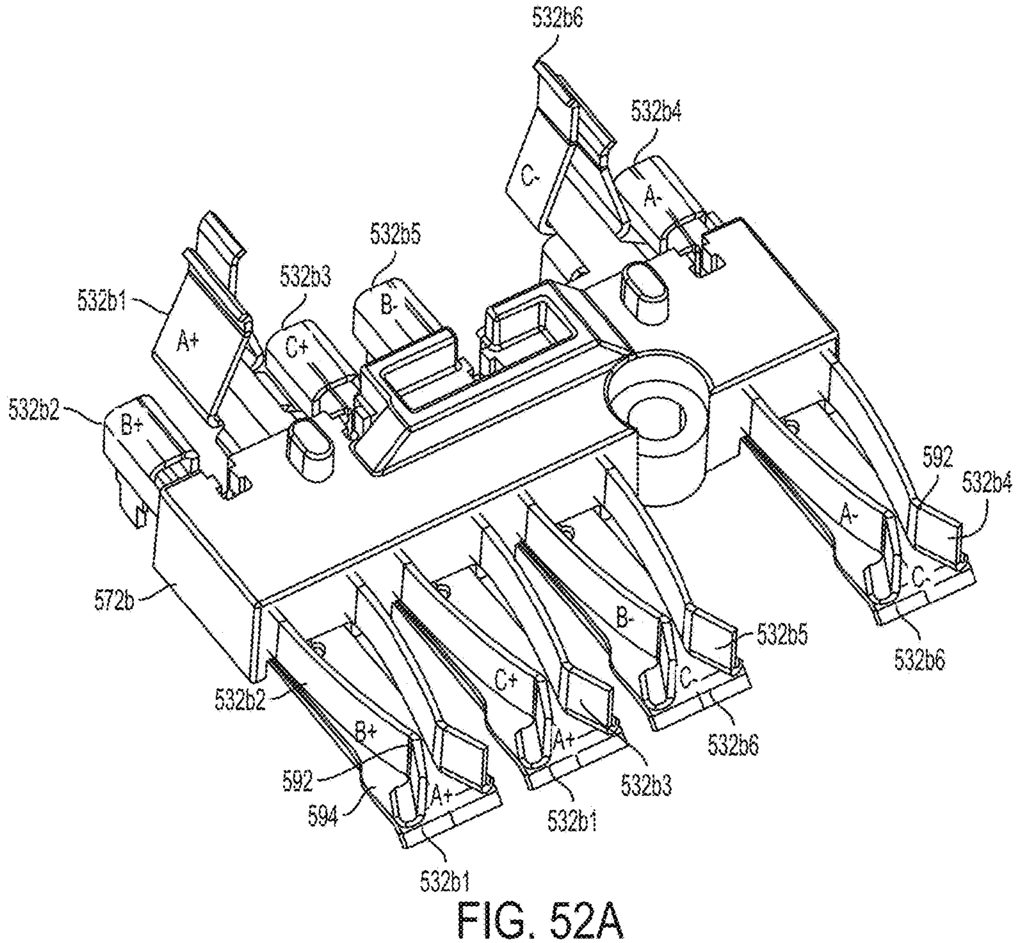
Figure 52B:
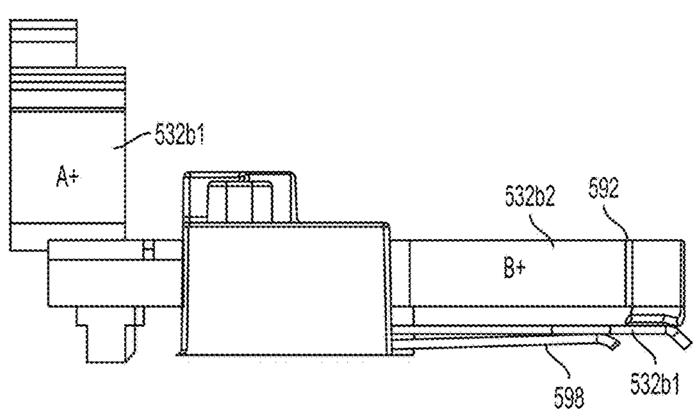
Figure 53B:
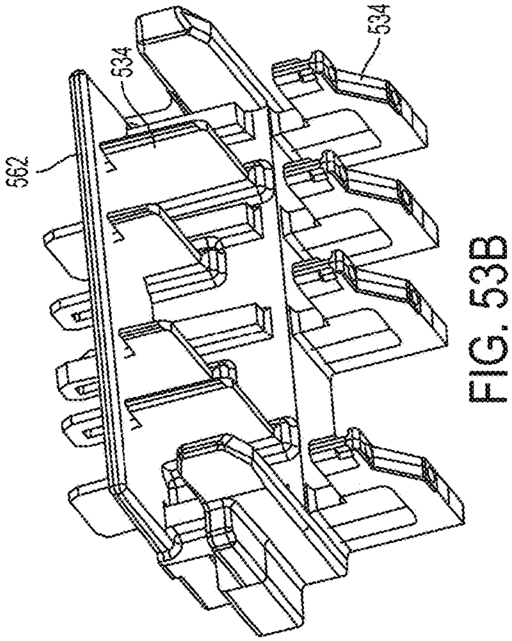
Figure 53D:
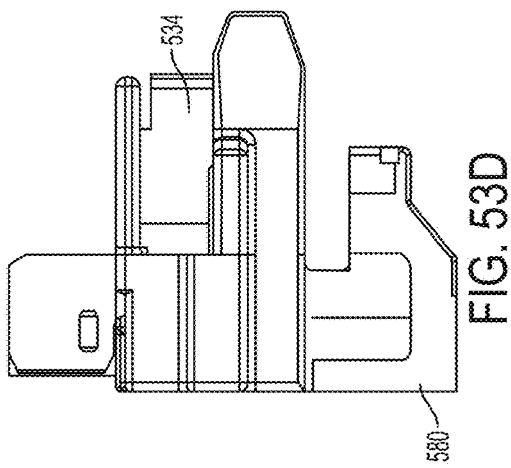
Figure 53A:
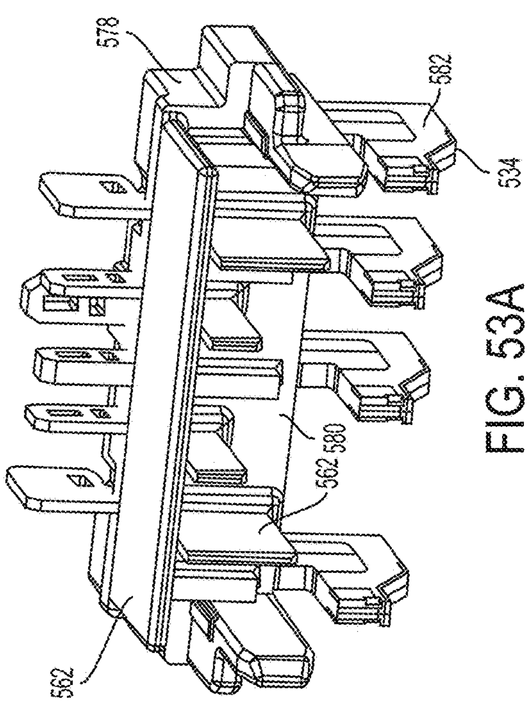
Figure 53C:
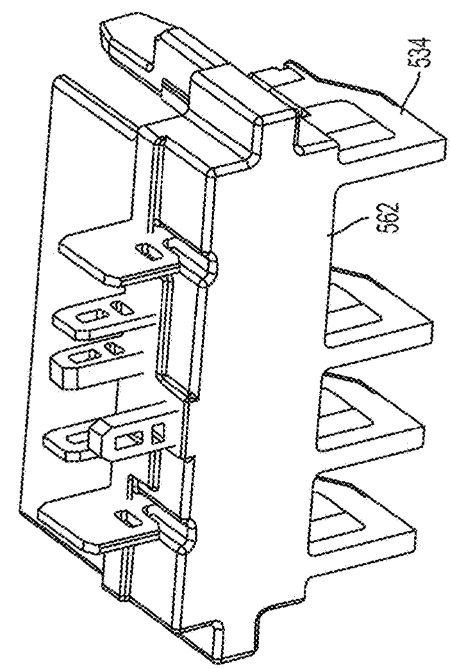

FIGS. 52*a* and 52*b* are views of a portion of the terminal block and a subset of terminals of the exemplary terminal block and terminals of FIG. 51.

FIGS. 53*a*, 53*b*, 53*c*, and 53*d* are exemplary terminal block and terminals of an electrical device that may mate with a terminal block of a convertible battery pack.

Figure 54A:
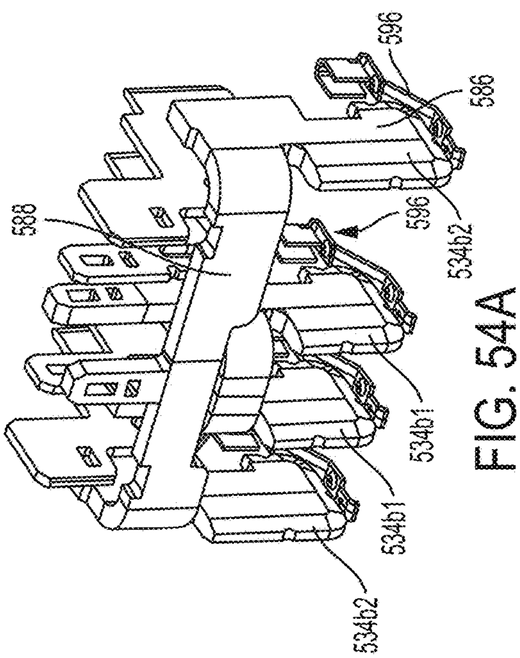
Figure 54B:
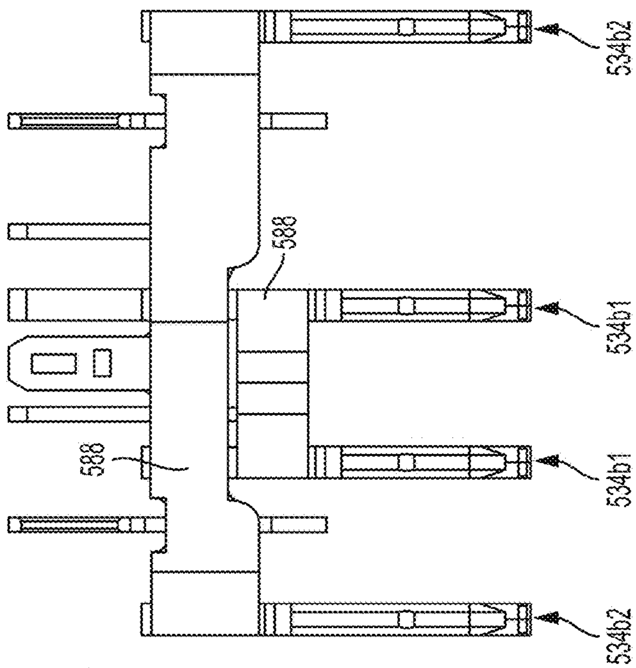
Figure 54C:
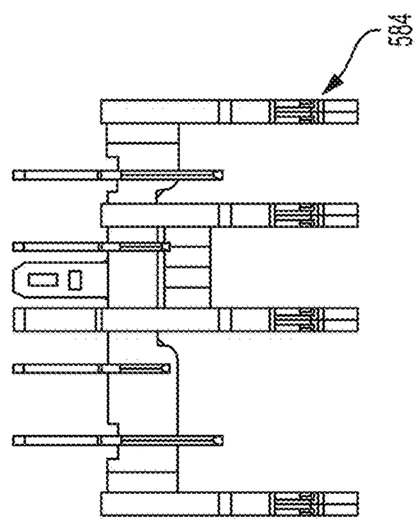

FIGS. 54*a*, 54*b*, and 54*c* are an exemplary set of terminals of FIG. 53.

FIGS. 55*a*, 55*b*, 55*c*, and 55*d* are alternate views of the exemplary terminals of FIG. 54.

Figure 56B:
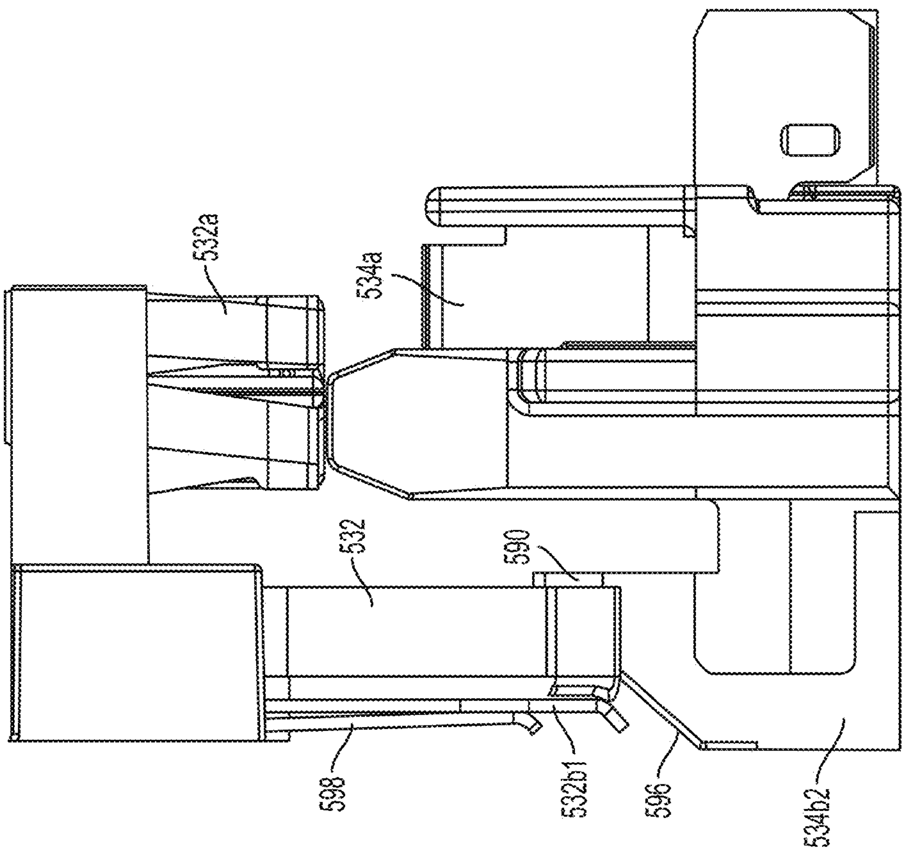
Figure 56A:
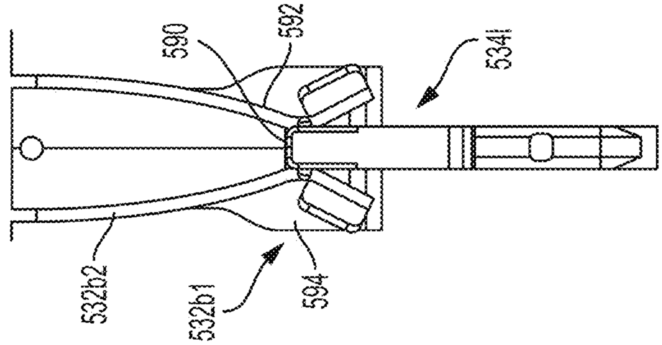

FIGS. 56*a* and 56*b* are views of an exemplary battery terminal of a convertible battery pack and an exemplary terminal of an electrical device in a first engaged position.

Figure 57B:
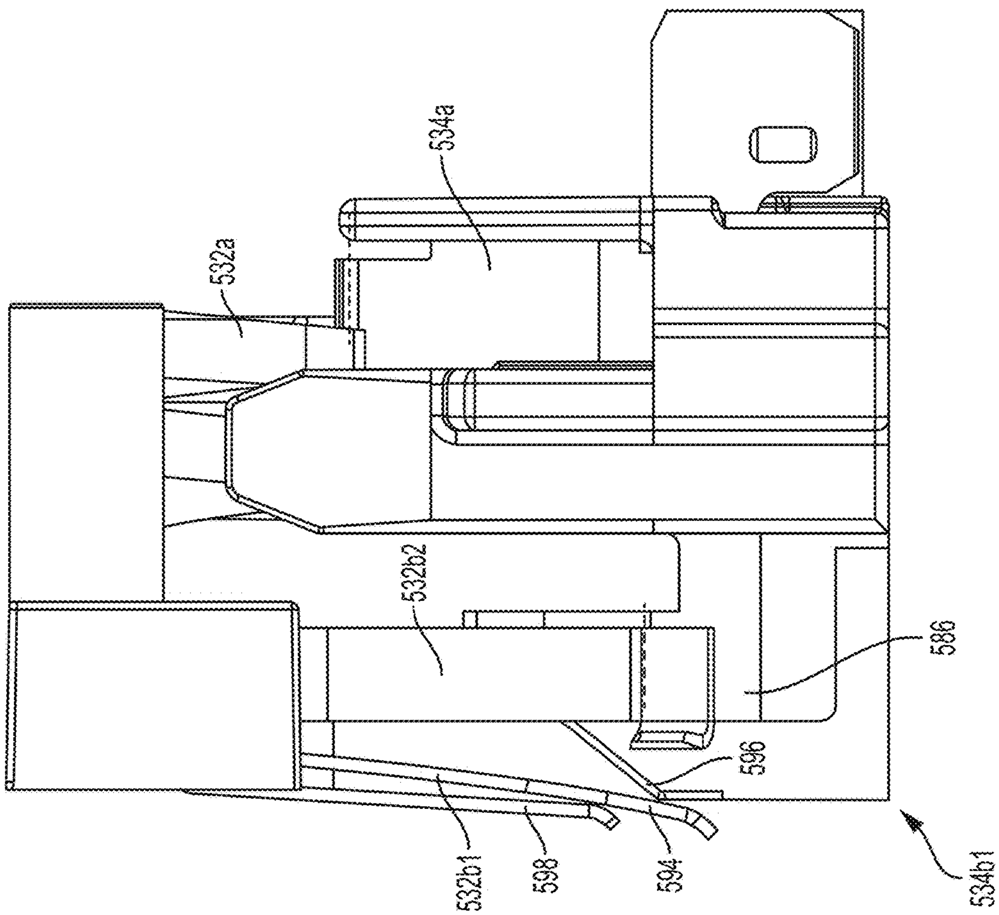
Figure 57A:
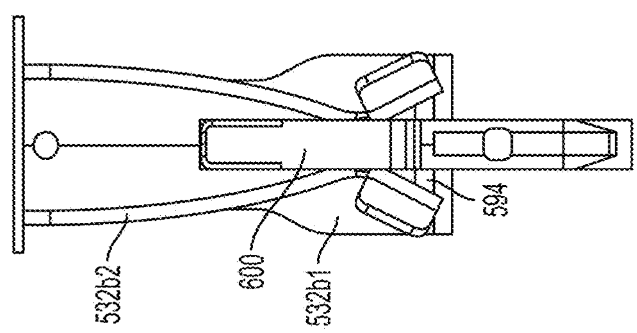

FIGS. 57*a* and 57*b* are views of the exemplary battery terminal and the exemplary electrical device terminal of FIG. 56 in a second engaged position.

Figure 58B:
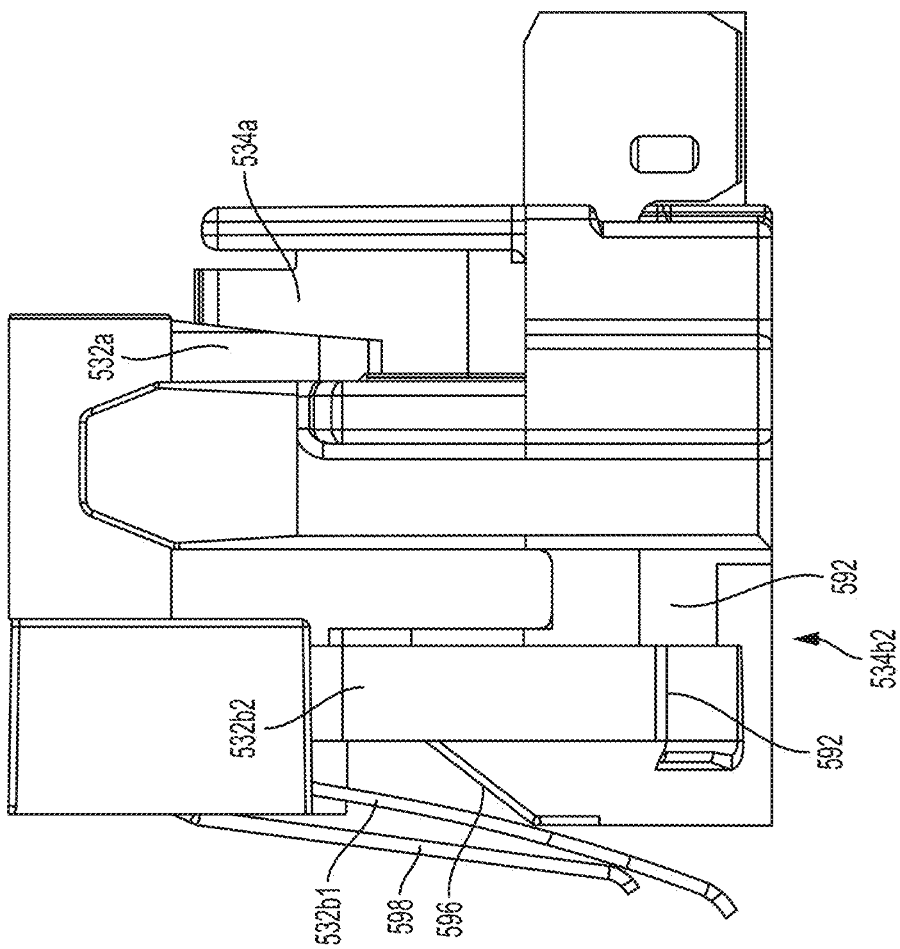
Figure 58A:
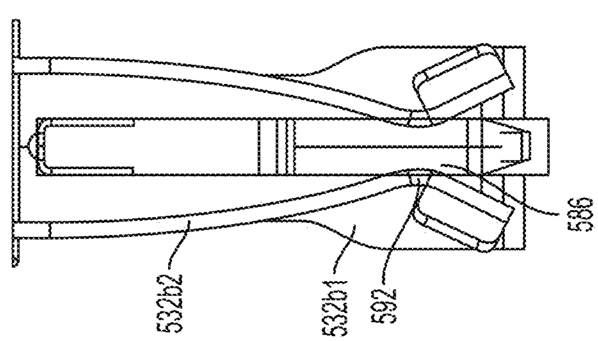

FIGS. 58*a* and 58*b* are views of the exemplary battery terminal and the exemplary electrical device terminal of FIG. 56 in a third engaged position.

Figure 59C:
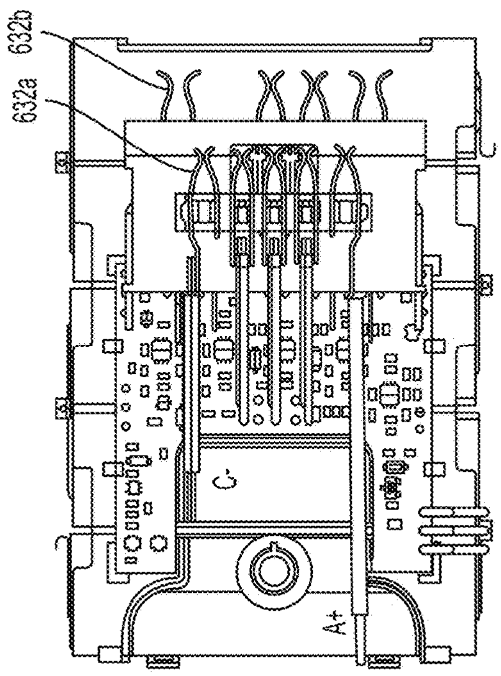
Figure 59B:
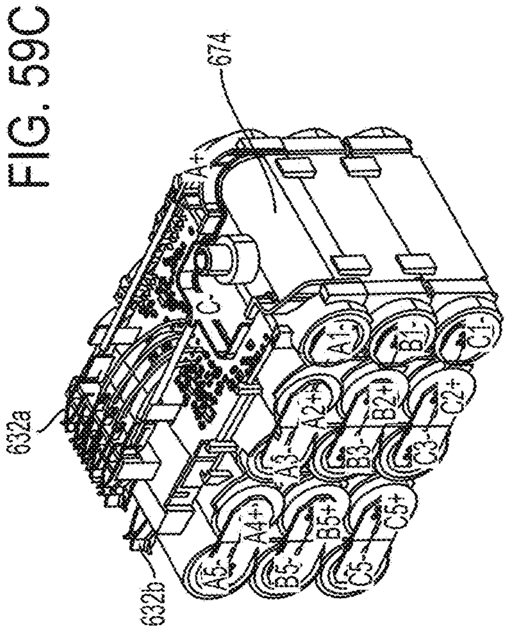
Figure 59A:
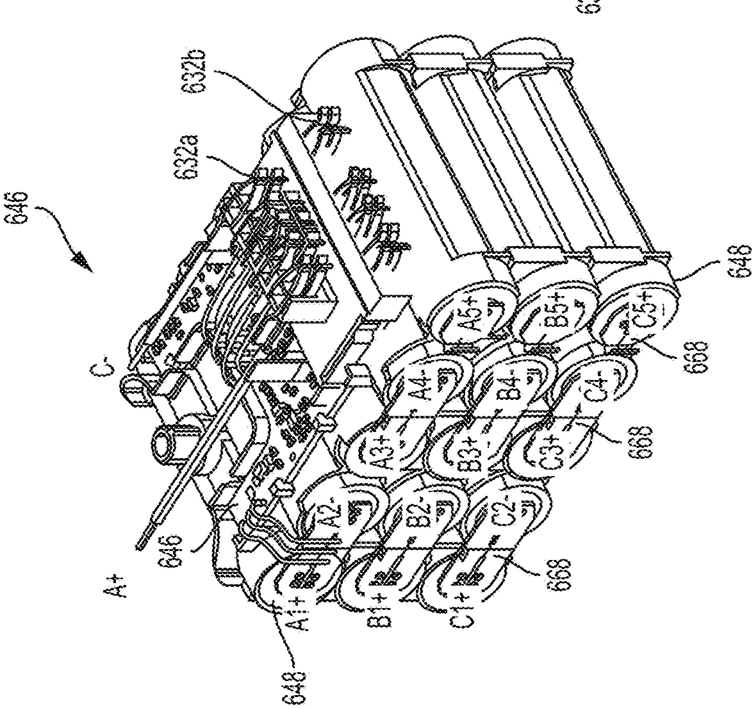

FIGS. 59*a*, 59*b*, and 59*c* are views of an alternate exemplary embodiment of a convertible battery pack with a battery pack housing removed.

Figure 60:
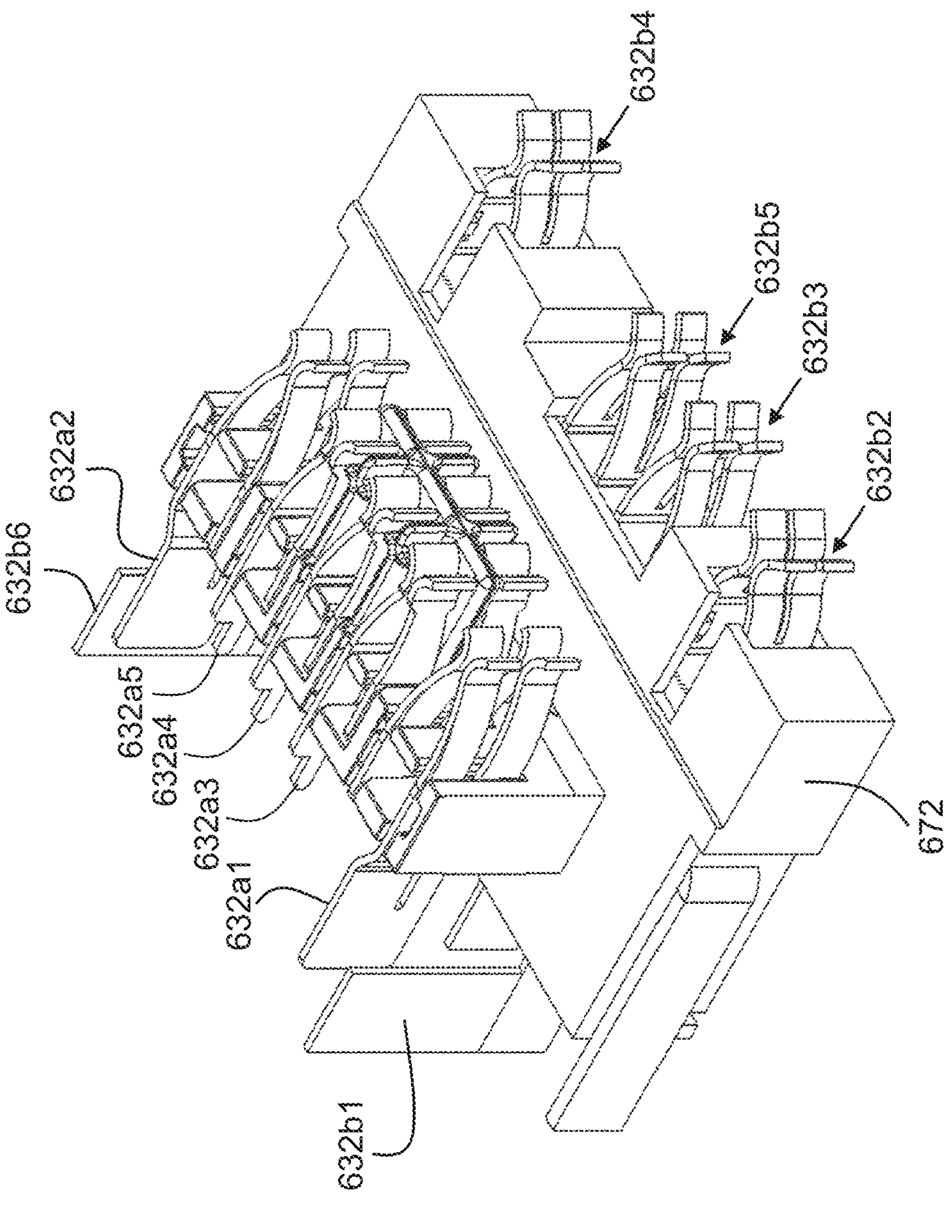

FIG. 60 is a perspective view of an exemplary terminal block and terminals of a convertible battery pack.

Figure 61B:
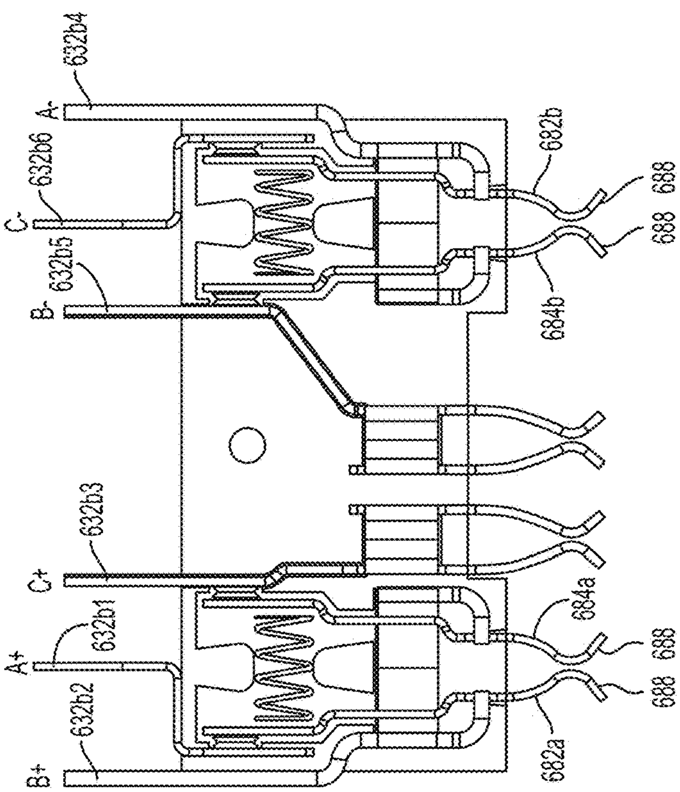
Figure 61A:
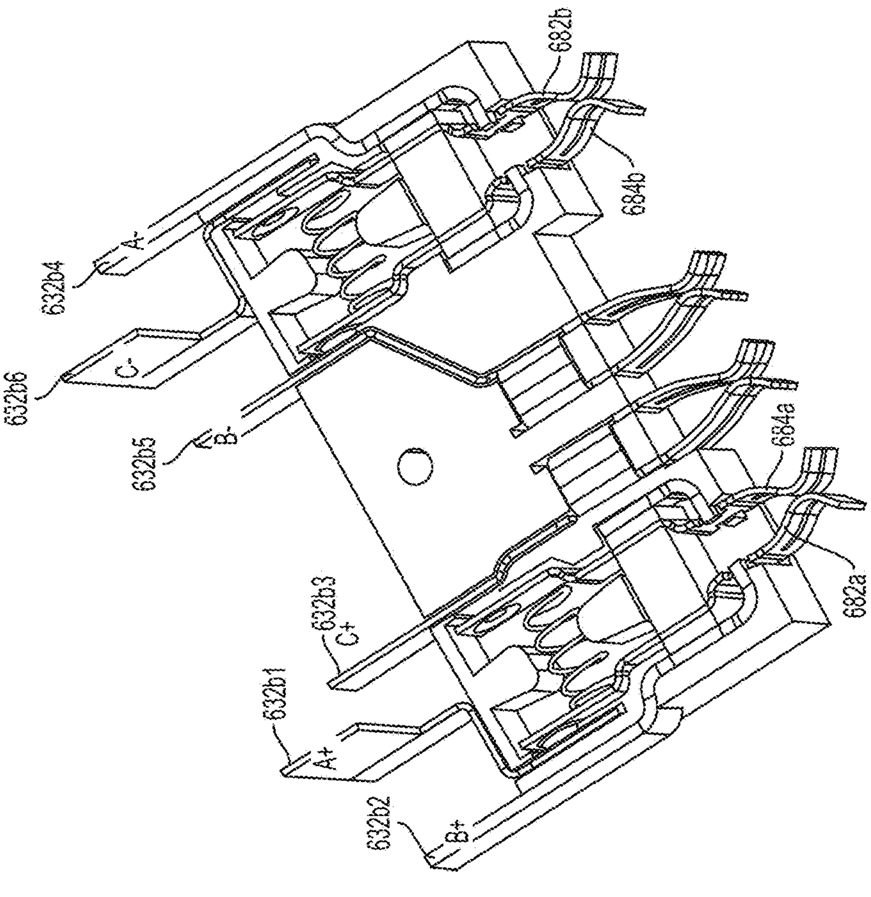
Figure 62B:
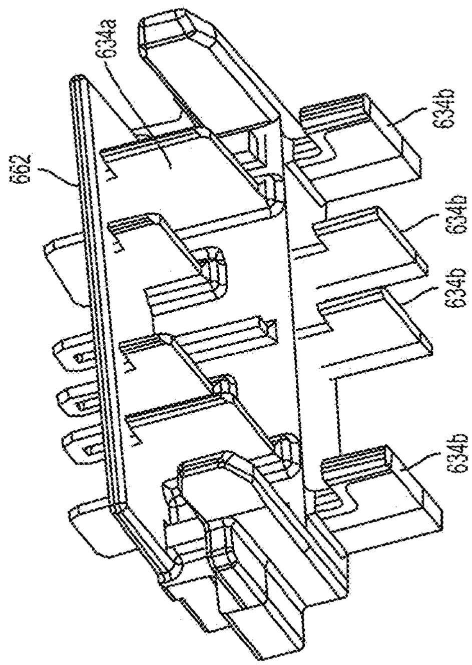
Figure 62D:
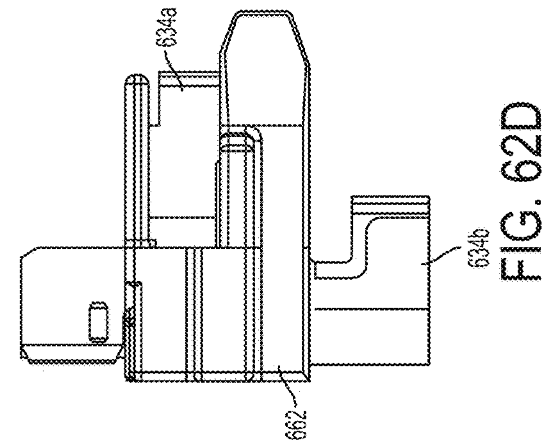
Figure 62A:
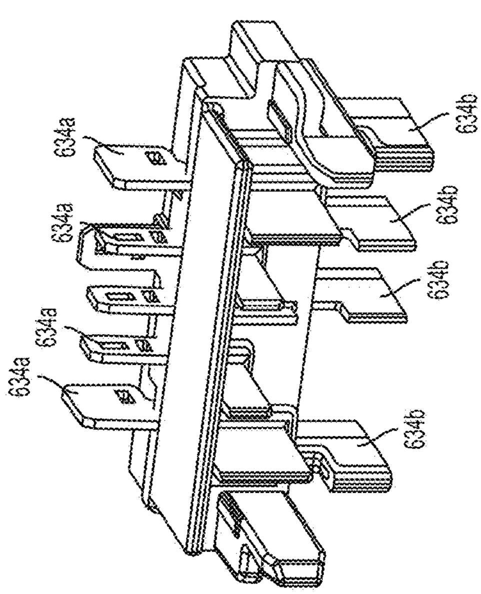
Figure 62C:
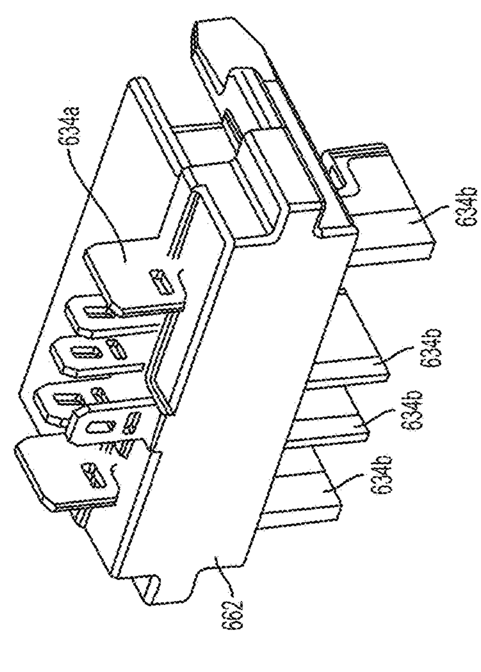

FIGS. 61*a* and 61*b* are views of a portion of the terminal block and a subset of terminals of the exemplary terminal block and terminals of FIG. 60.

FIGS. 62*a*, 62*b*, 62*c*, and 62*d* are exemplary terminal block and terminals of an electrical device that may mate with a terminal block a convertible battery pack.

Figure 63B:
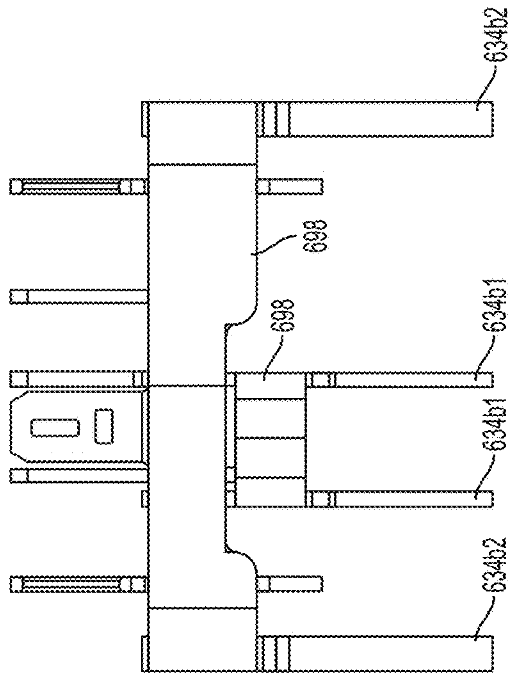
Figure 63C:
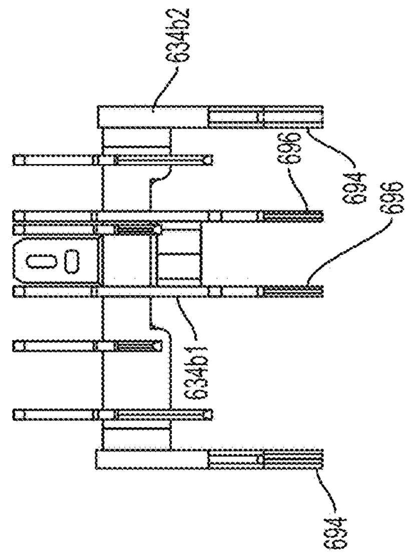
Figure 63A:
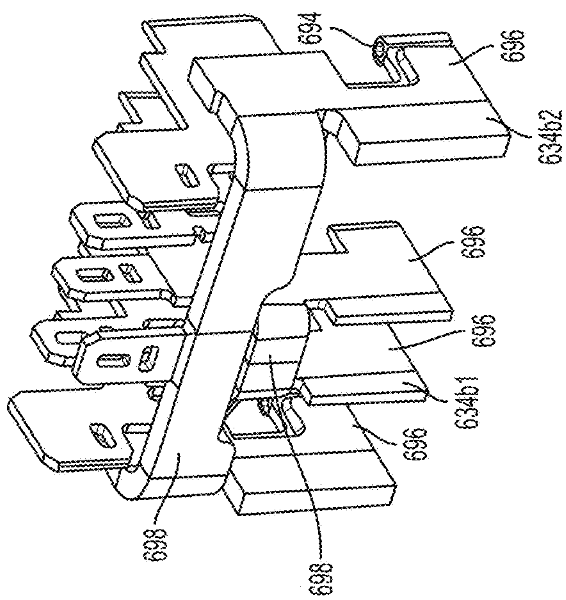
Figure 64A:
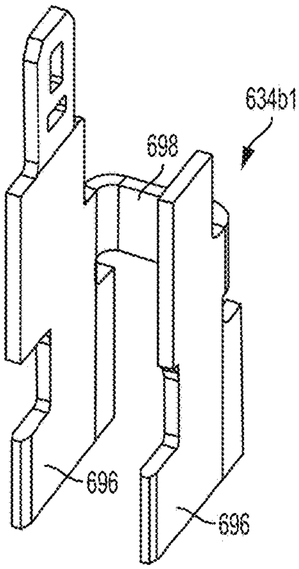
Figure 64B:
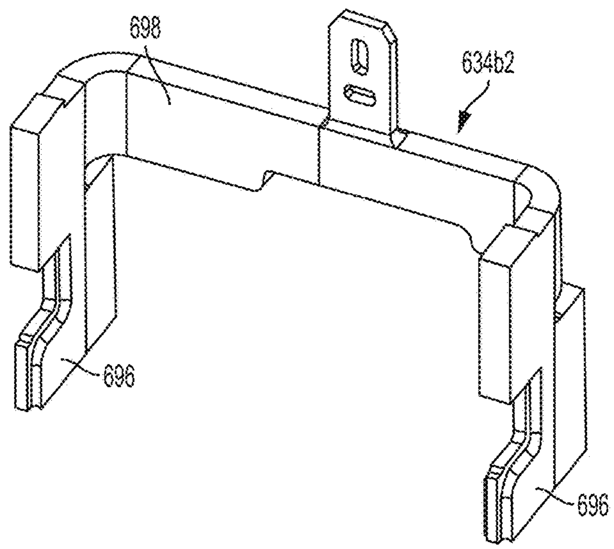
Figure 64C:
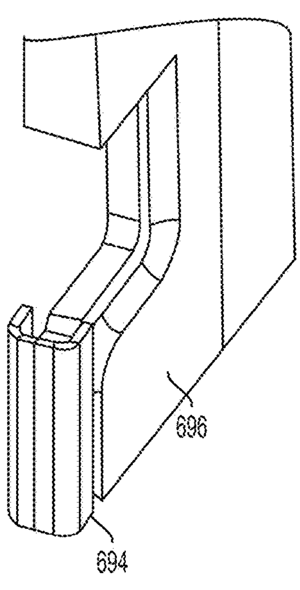
Figure 64D:
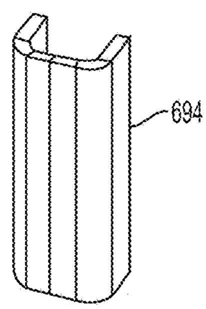

FIGS. 63*a*, 63*b*, and 63*c* are an exemplary set of terminals of FIG. 62.

FIGS. 64*a*, 64*b*, 64*c* and 64*d* are alternate views of the exemplary terminals of FIG. 63.

Figure 65:
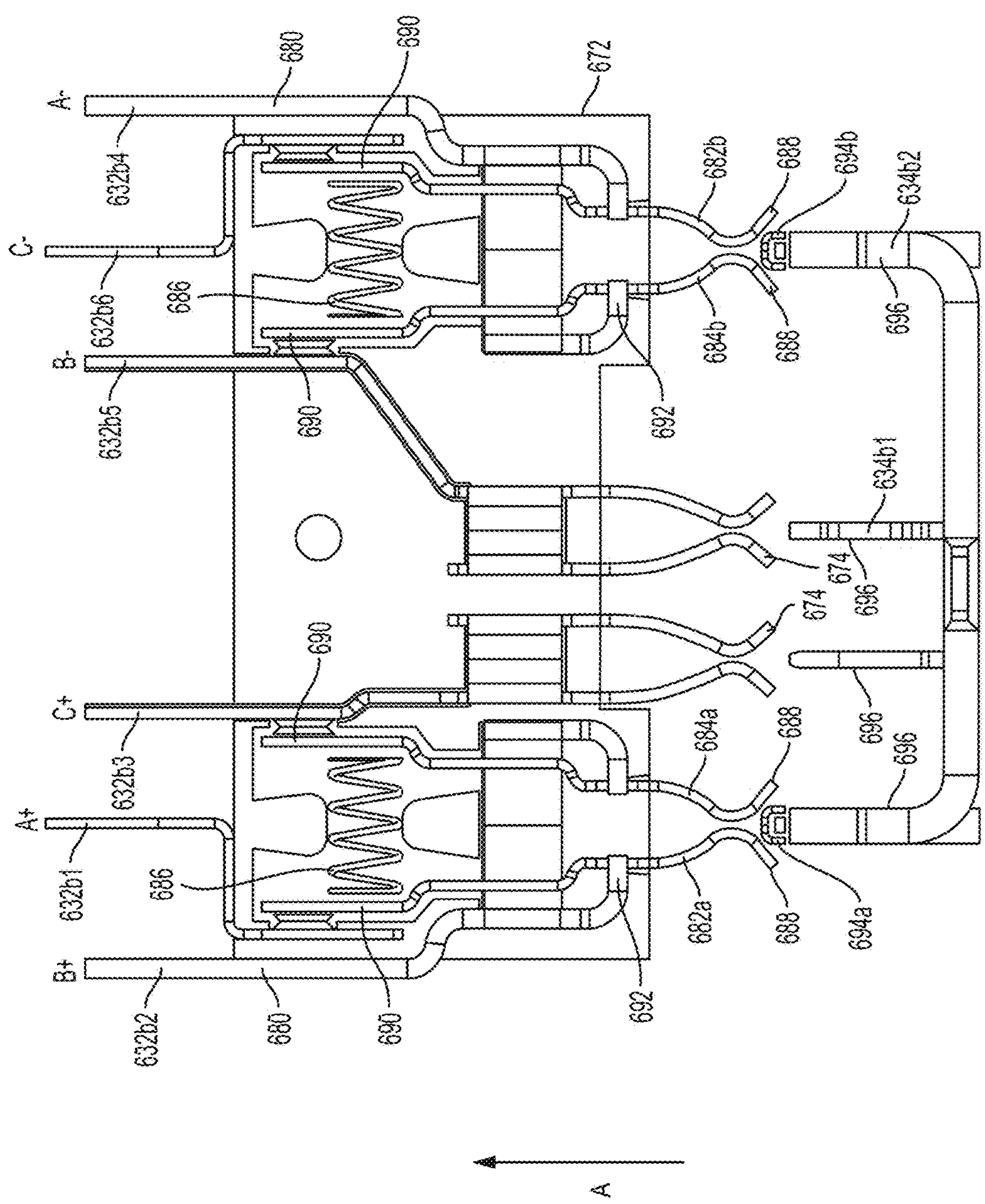

FIG. 65 is a view of an exemplary set of battery terminals a convertible battery pack and an exemplary set of terminals of an electrical device prior to engagement.

Figure 66:
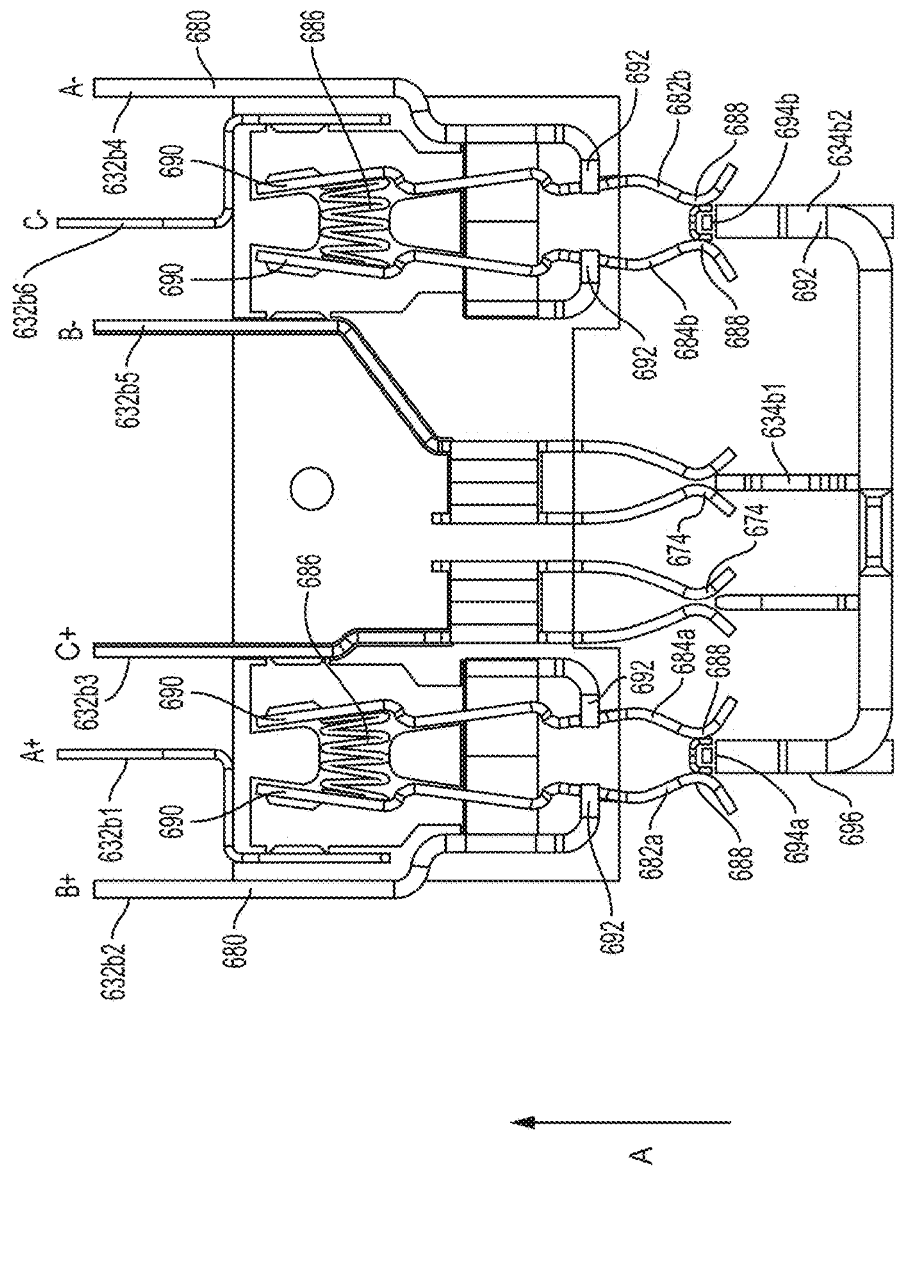

FIG. 66 is a view of the exemplary set of battery terminals and the exemplary set of electrical device terminals of FIG. 65 in a first engaged position.

Figure 67:
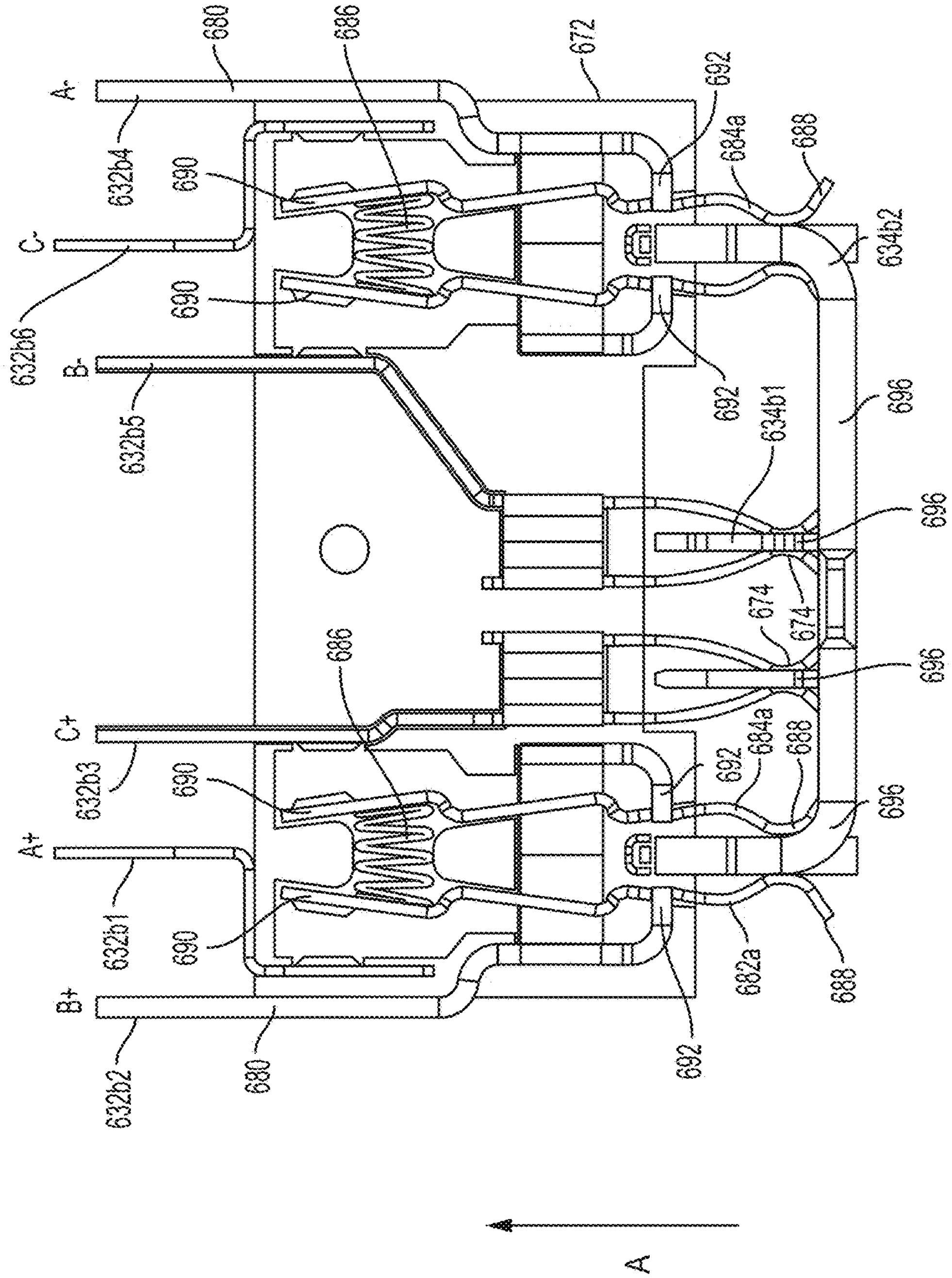

FIG. 67 is a view of the exemplary set of battery terminals and the exemplary set of electrical device terminals of FIG. 65 in a second engaged position.

Figure 68:
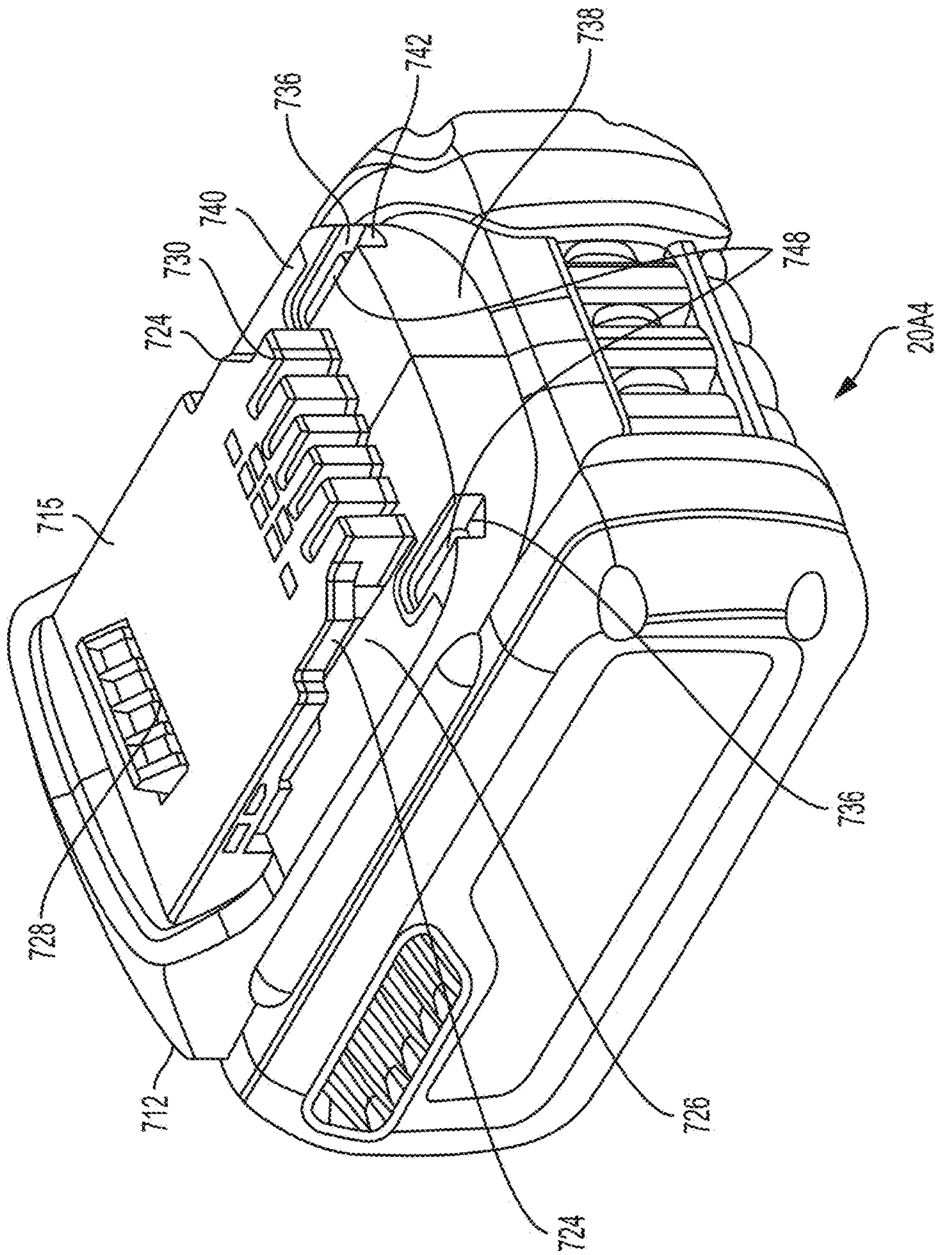

FIG. 68 is a view of an exemplary embodiment a convertible battery pack.

Figure 69A:
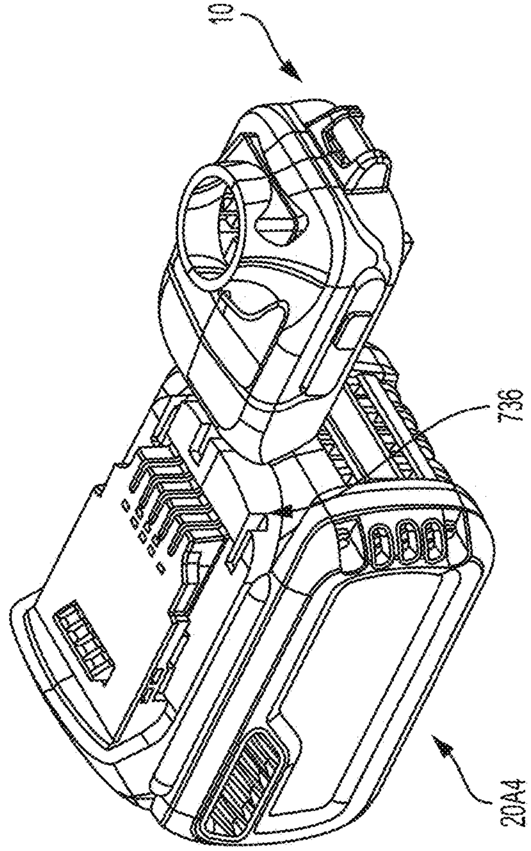
Figure 69B:
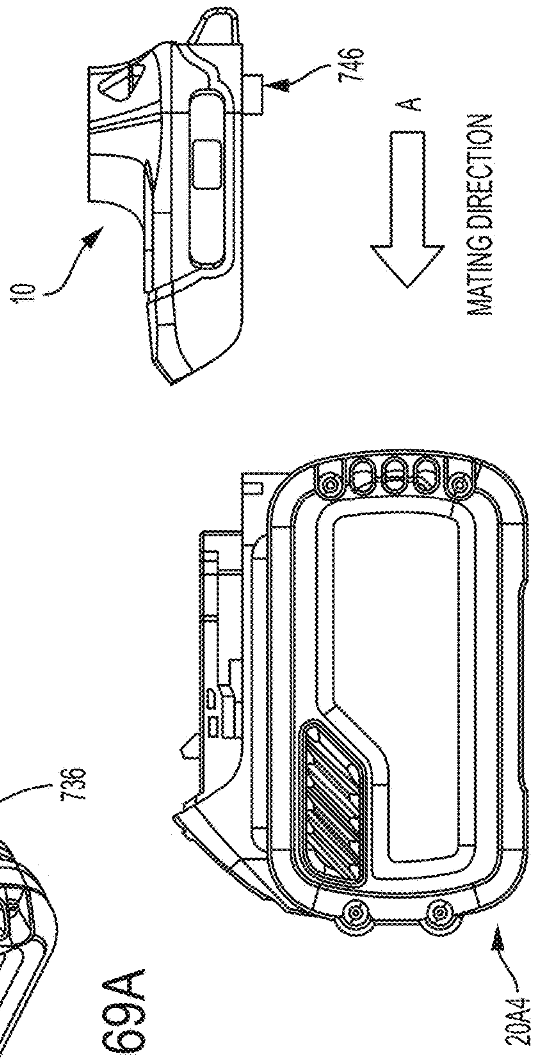

FIGS. 69*a* and 69*b* are views of the exemplary battery pack of FIG. 68 and a tool foot of an exemplary medium rated voltage power tool.

Figure 70:
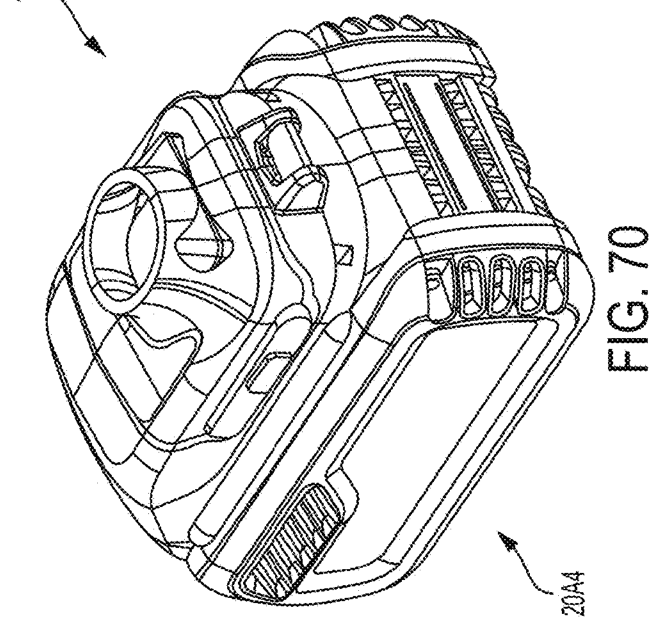

FIG. 70 is a view of the exemplary battery pack and tool foot of FIG. 69 in a mated position.

Figure 71A:
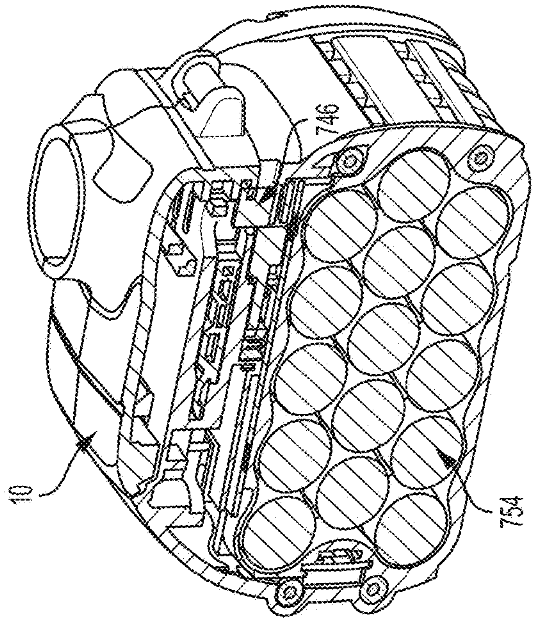
Figure 71B:
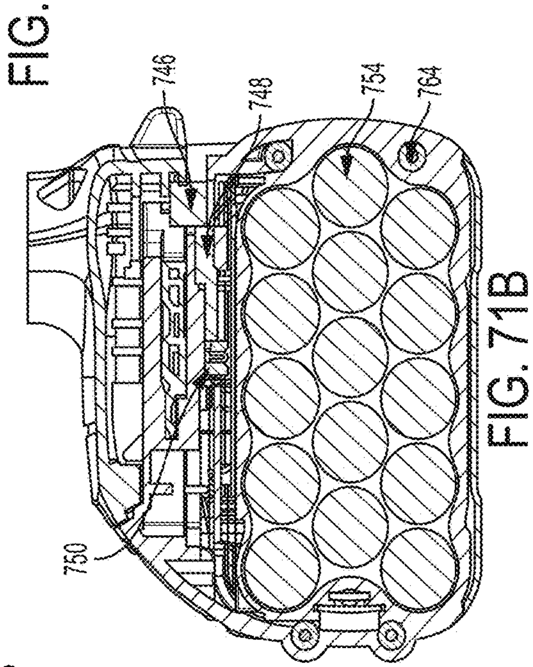

FIGS. 71*a* and 71*b* are section views of the exemplary battery pack and tool foot of FIG. 70.

Figure 72:
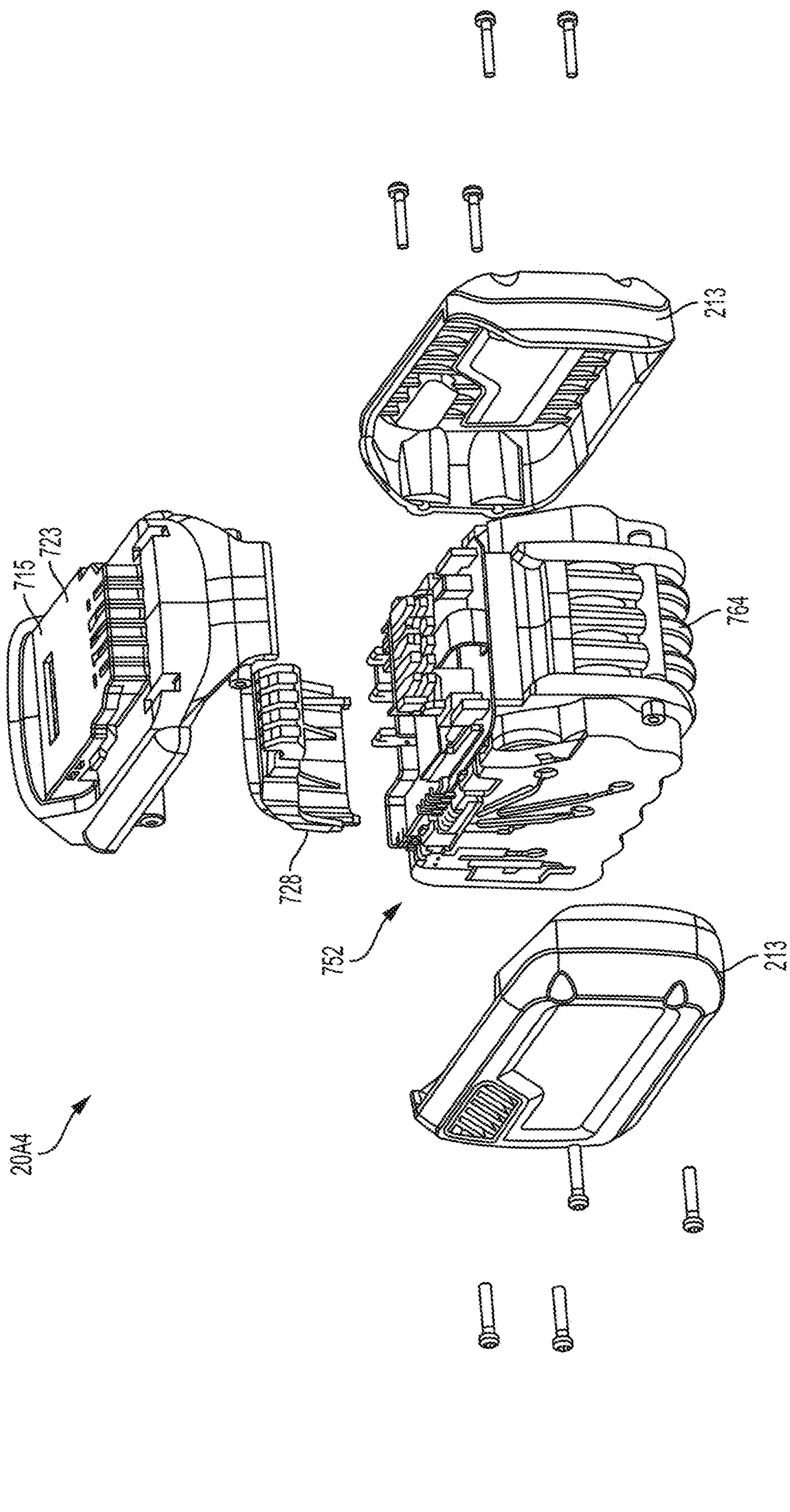

FIG. 72 is an exploded view of the exemplary convertible battery pack of FIG. 68.

Figure 73:
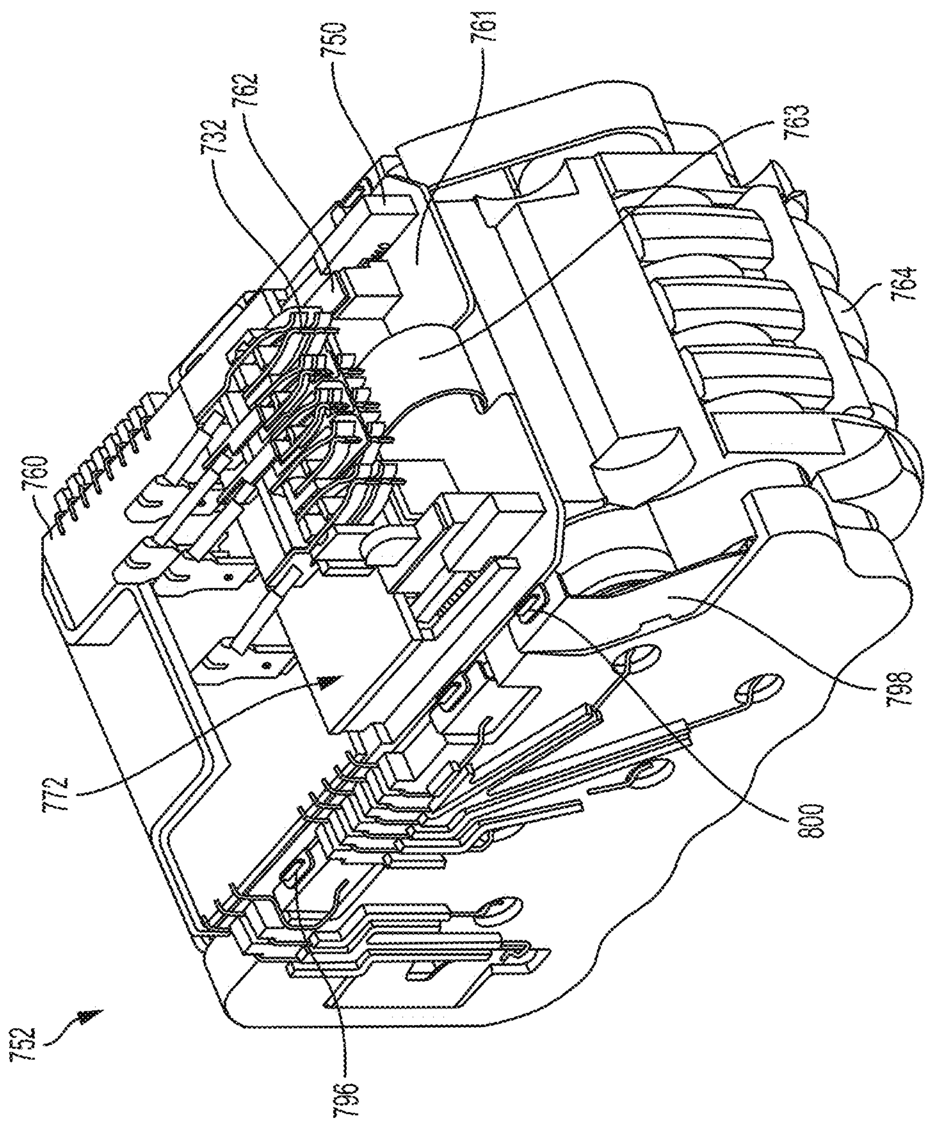

FIG. 73 is a view of an exemplary embodiment of a battery of the exemplary convertible battery pack of FIG. 68.

Figure 74:
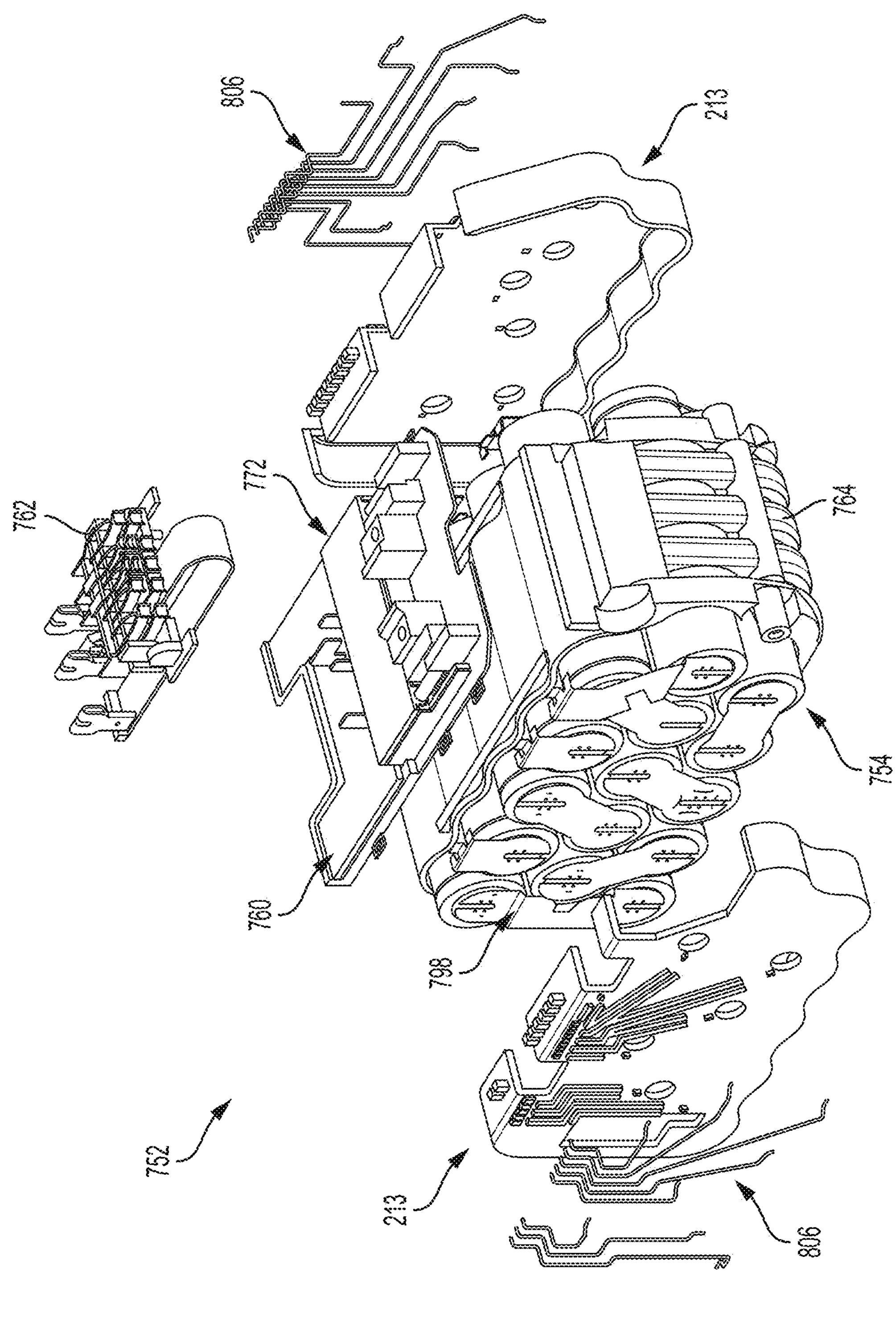

FIG. 74 is an exploded view of the exemplary battery of FIG. 73.

Figure 75A:
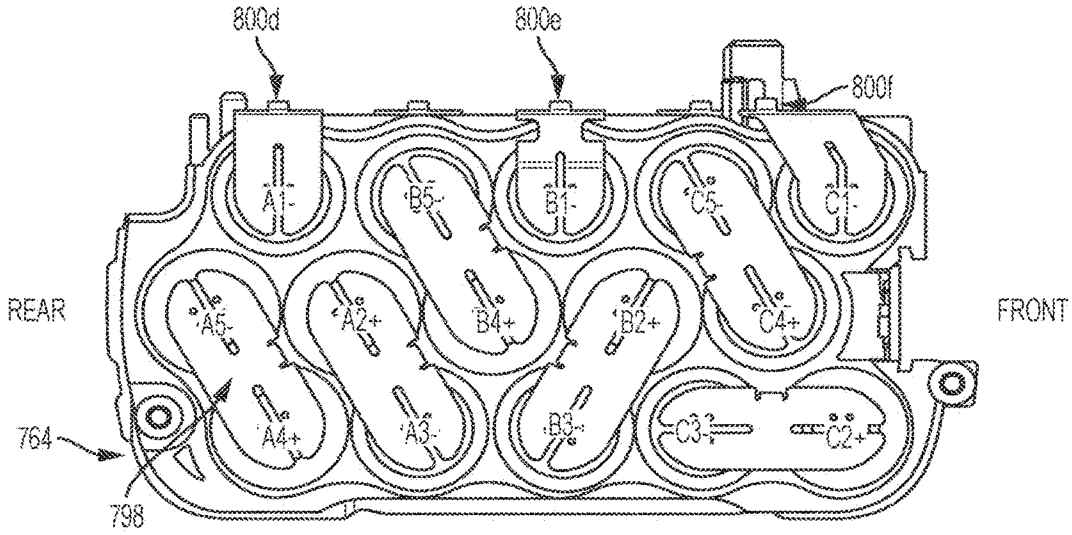
Figure 75B:
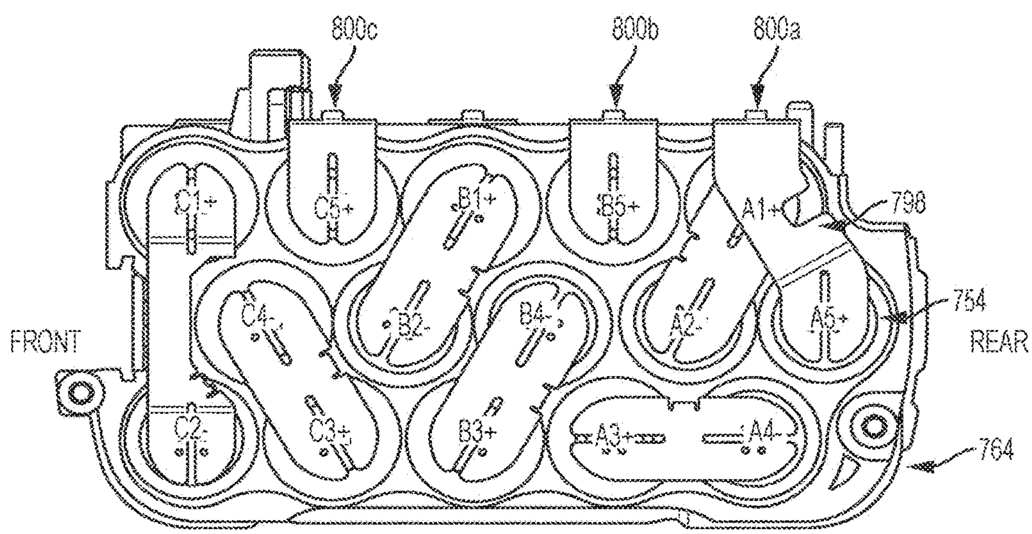

FIGS. 75*a* and 75*b* are side views of a cell holder and battery cells of the exemplary battery of FIG. 73.

Figure 76A:
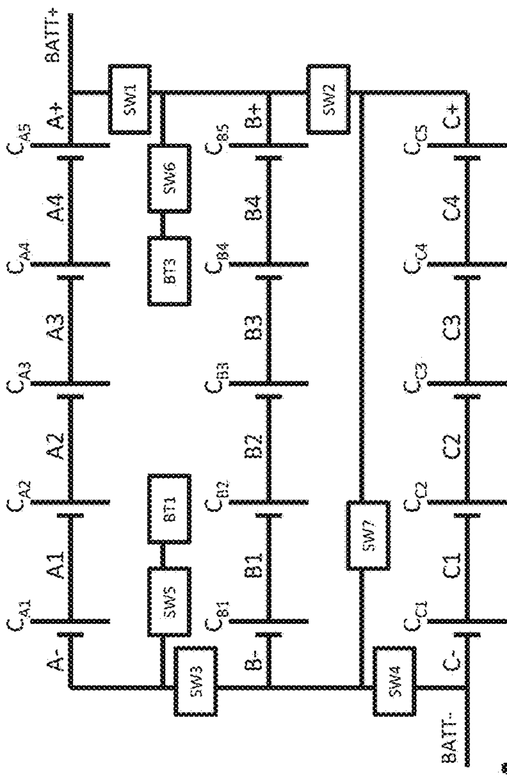
Figure 76B:
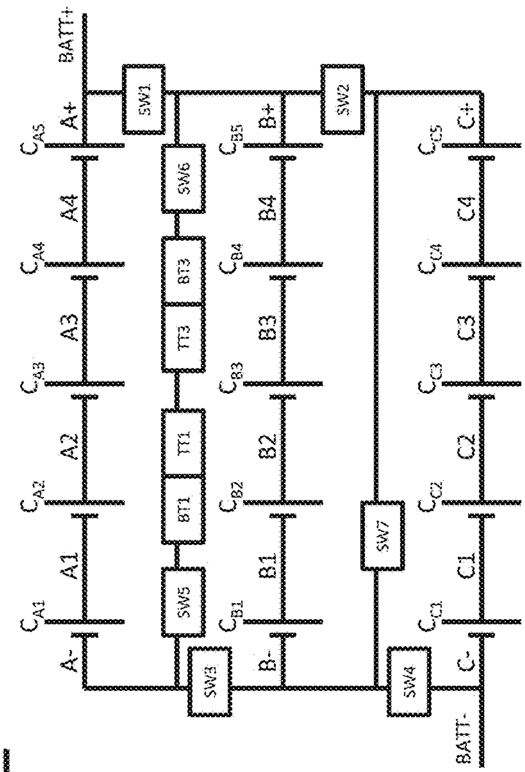

FIGS. 76*a* and 76*b* are simple circuit diagrams of an exemplary battery of the present disclosure in a low rated voltage configuration and in a medium rated voltage configuration, respectively.

Figure 77B:
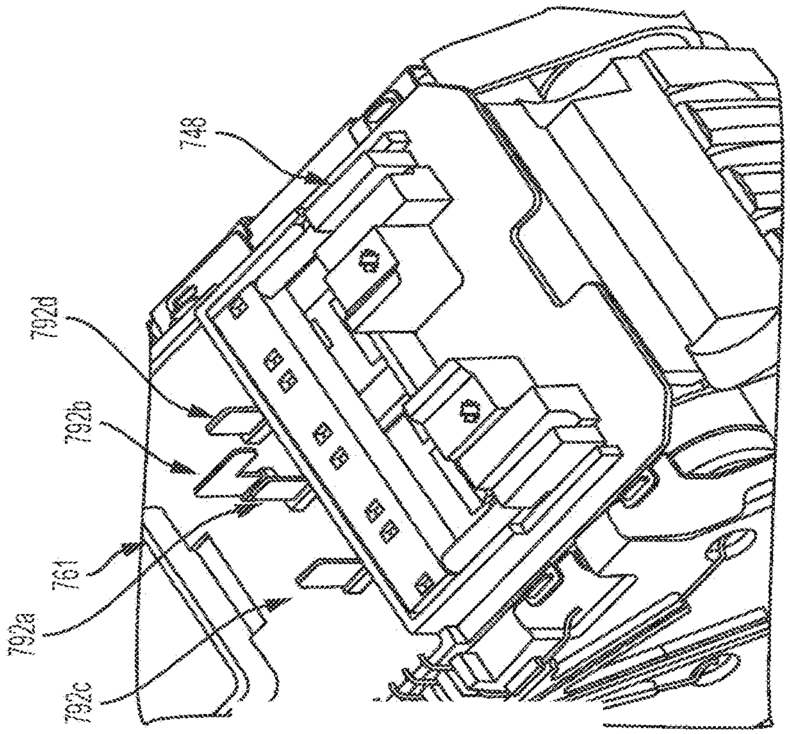
Figure 77A:
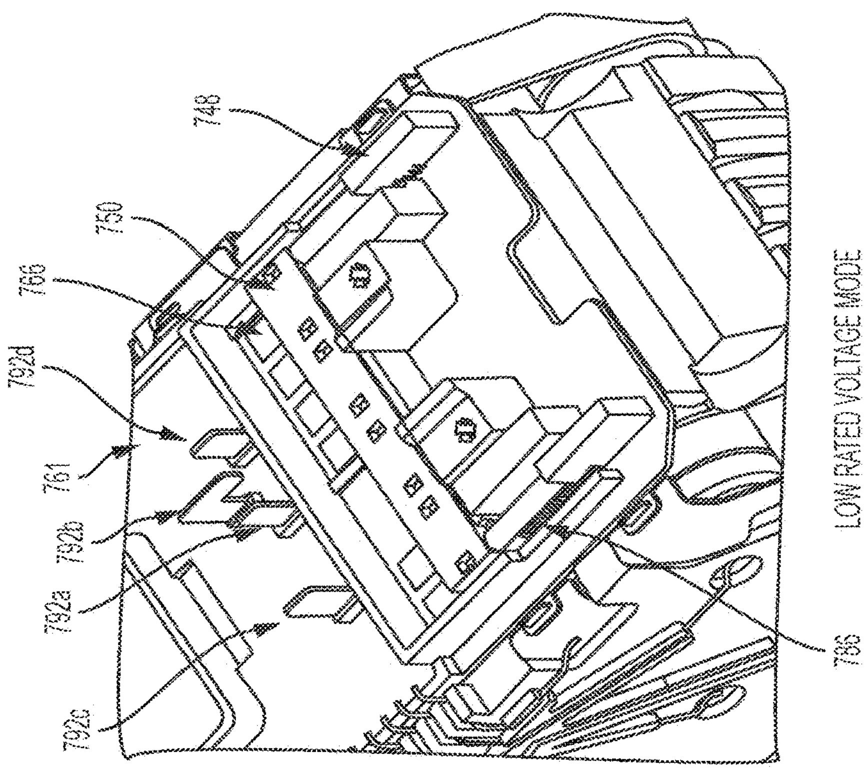

FIGS. 77*a* and 77*b* are detail views of the converting mechanism of the exemplary battery of FIG. 73 in the low rated voltage configuration and the medium rated voltage configuration, respectively.

Figure 78:
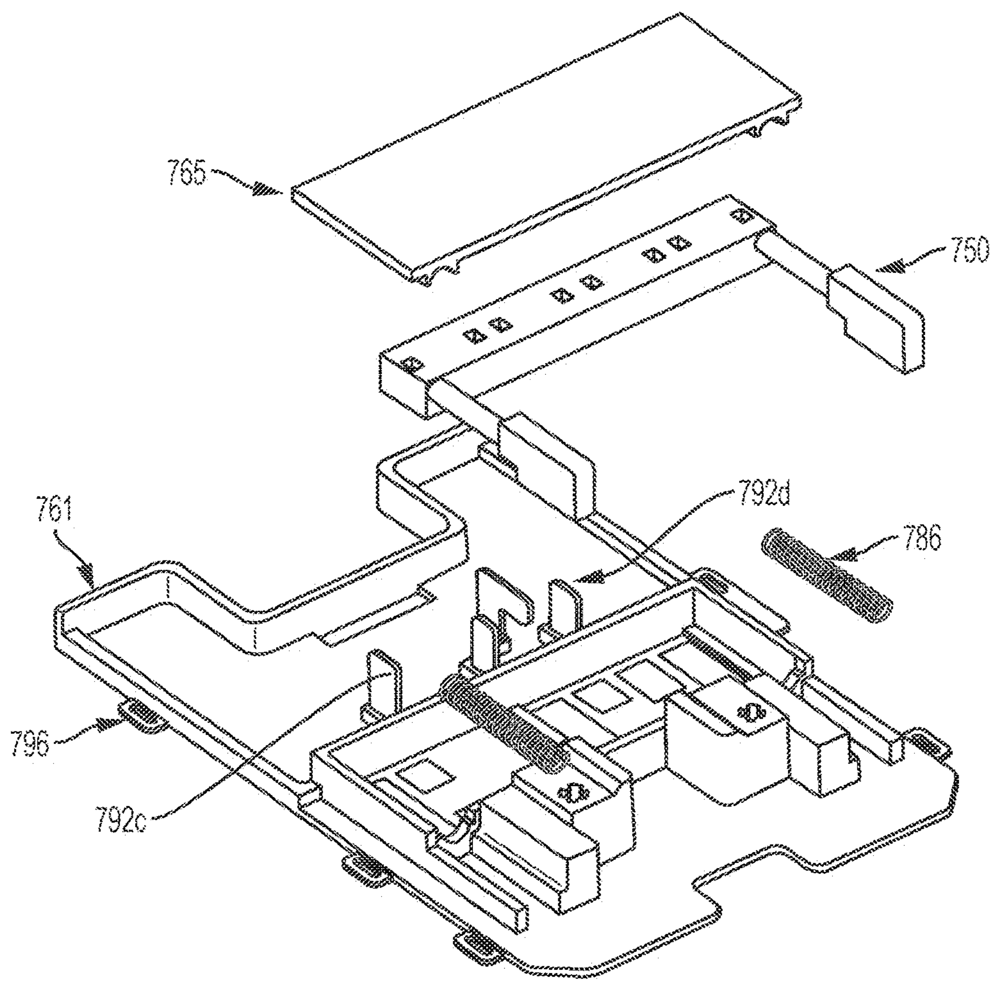

FIG. 78 is an exploded view of the converting subsystem of the exemplary battery of FIG. 73.

FIGS. 79*a*, 79*b*, 79*c*, 79*d*, 79*e* are views of the converter element and switching contact of the converter element of FIG. 78.

FIGS. 80*a*, 80*b*, 80*c* and 80*d* are views of the support board of the converting subsystem of FIG. 78.

FIGS. 81*a*, 81*b*, 81*c*, and 81*d* illustrate the manufacturing steps of the support board of the converting subsystem of FIG. 78.

Figure 82:
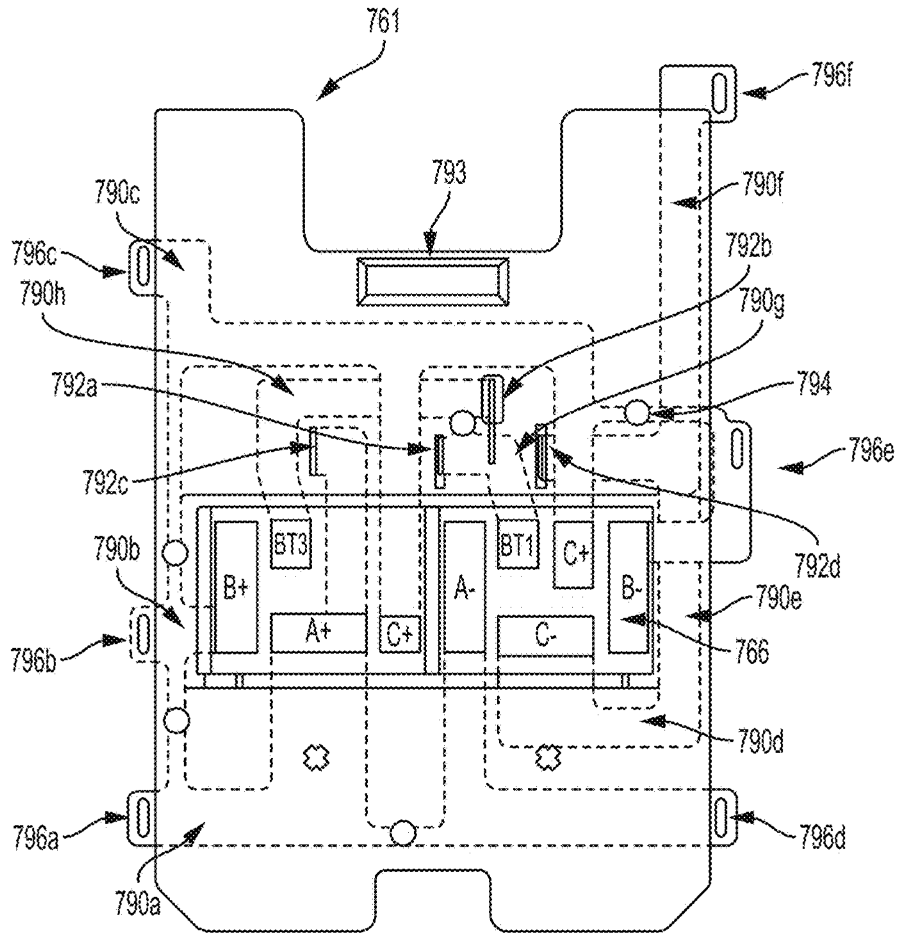

FIG. 82 is a plan view of the support board of the converting subsystem of FIG. 74.

Figure 83:
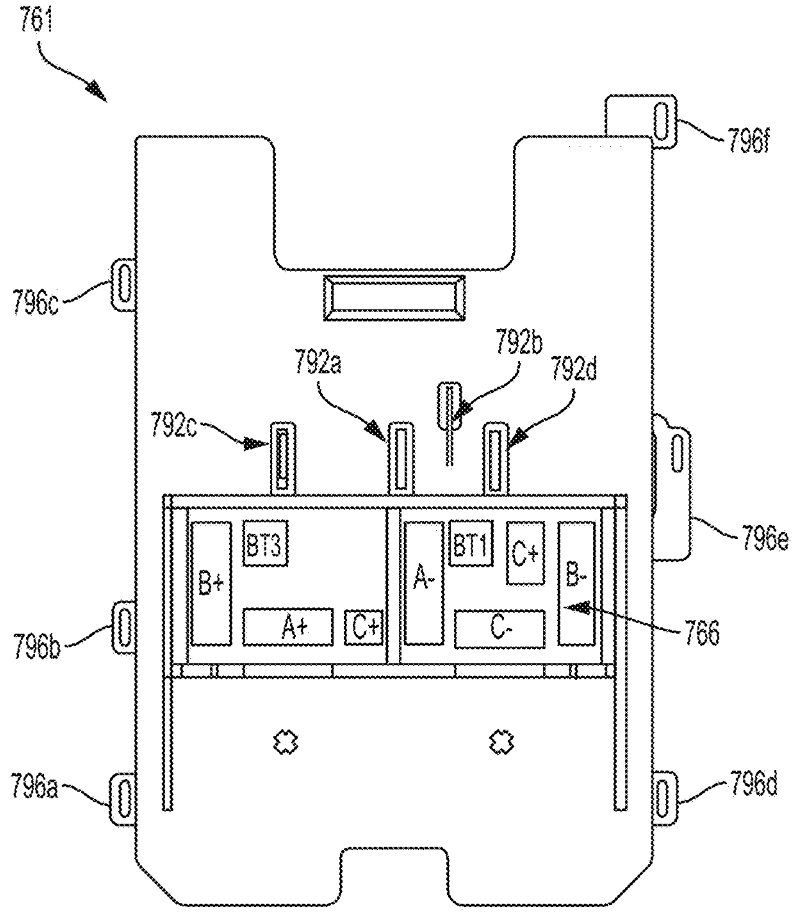

FIG. 83 is an alternate plan view of the support board of the converting subsystem of FIG. 74.

Figure 84A:
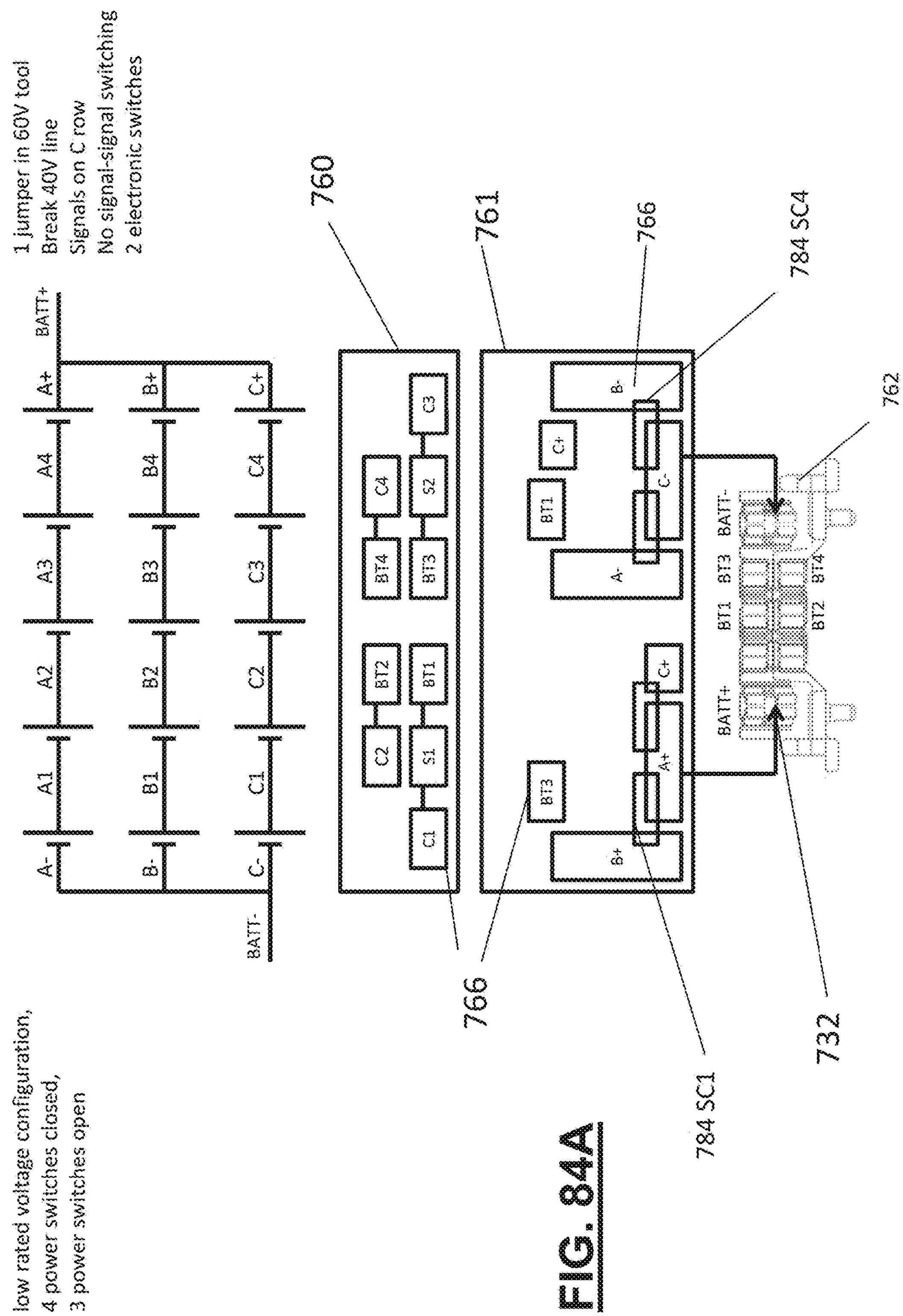
Figure 84B:
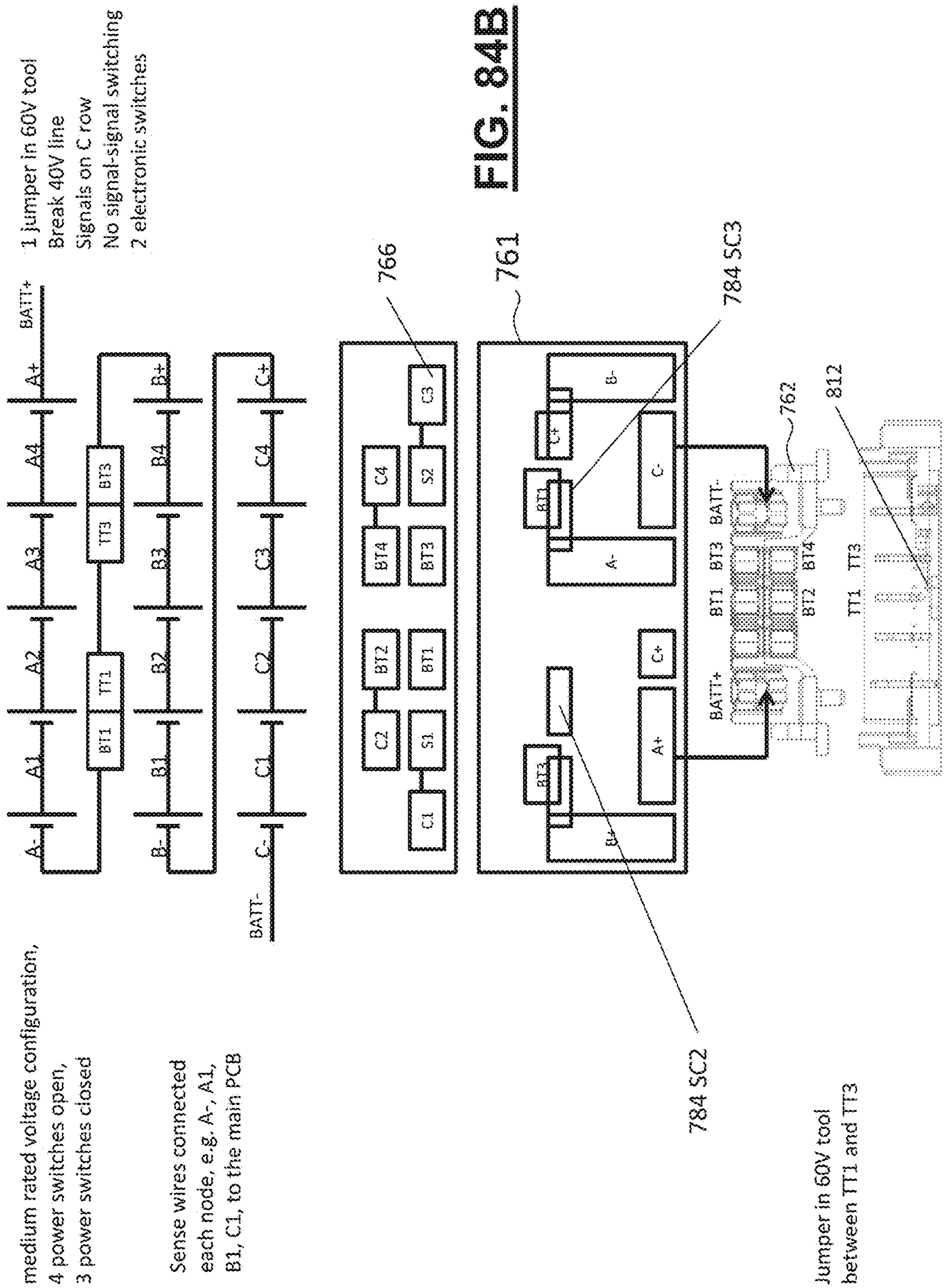
Figure 84C:
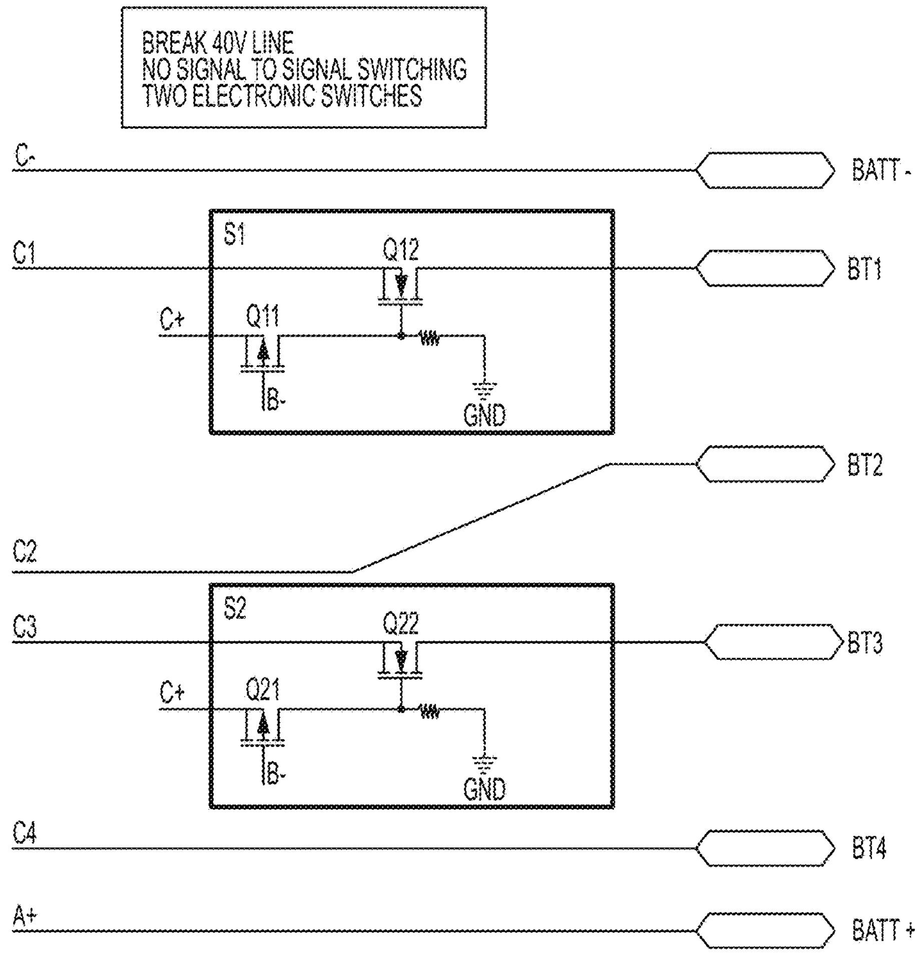

FIGS. 84*a*, 84*b* and 84*c* are simplified circuit diagrams and block diagrams of the exemplary battery pack of FIG. 68.

FIGS. 85*a*-85*f* illustrate the status of the converting mechanism of the exemplary battery pack of FIG. 68 as it converts from the low rated voltage configuration to the medium rated voltage configuration.

Figure 86A:
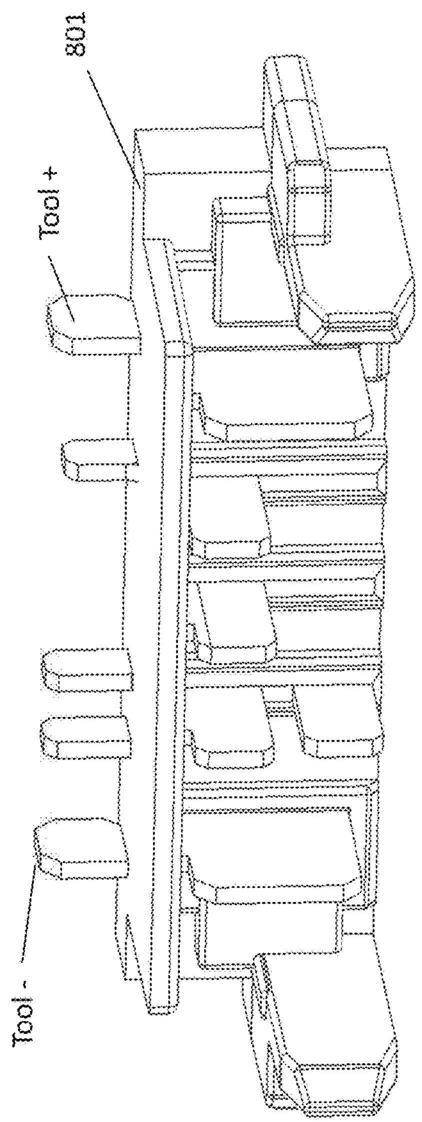
Figure 86B:
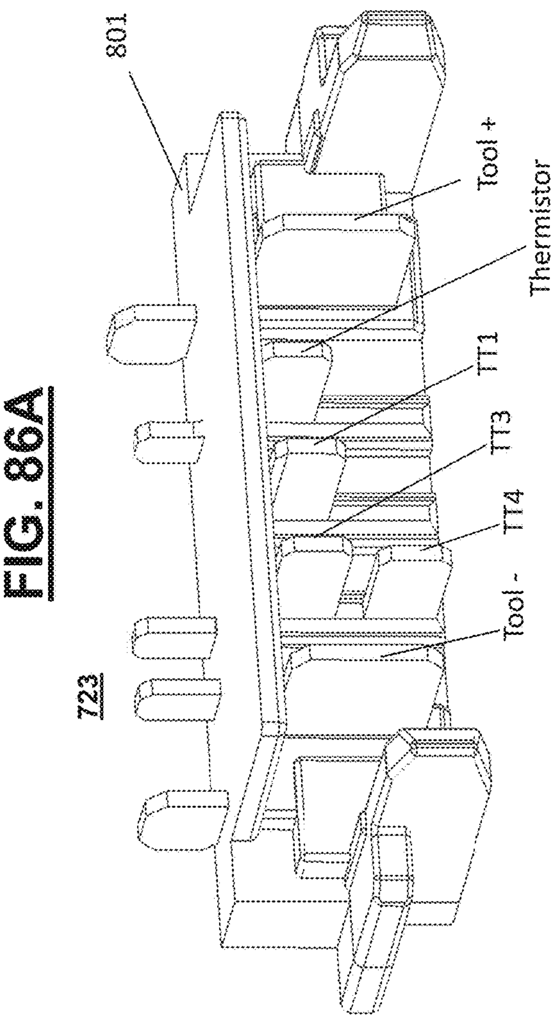

FIGS. 86*a* and 86*b* illustrated perspective views of an exemplary terminal block of the exemplary medium rated voltage tool of FIG. 69.

Figure 87A:
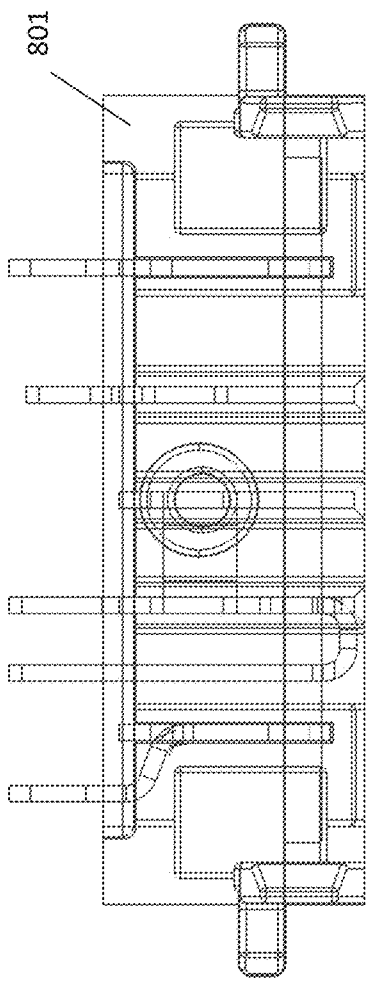
Figure 87B:
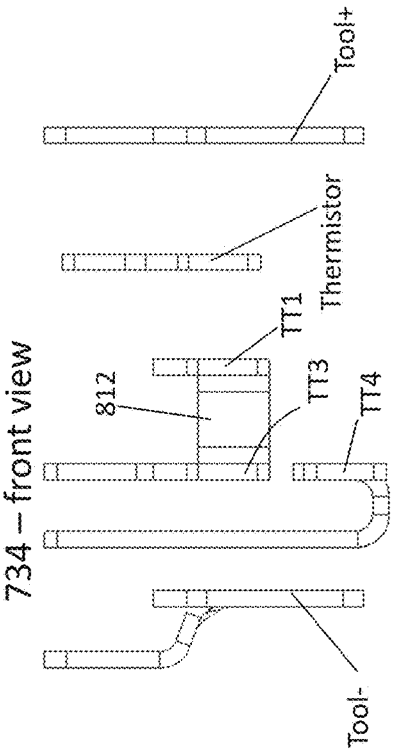

FIGS. 87*a* and 87*b* are front views of the terminals and terminal block of FIG. 96.

Figure 88A:
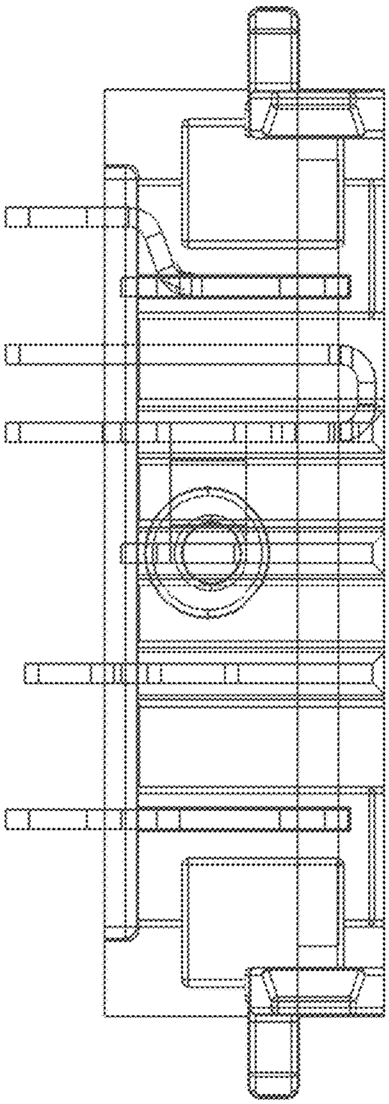
Figure 88B:
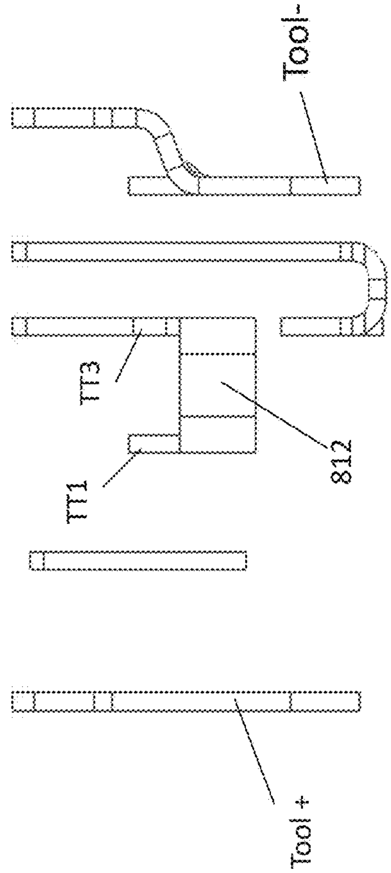

FIGS. 88*a* and 88*b* are rear views of the terminals and terminal block of FIG. 96.

Figure 89A:
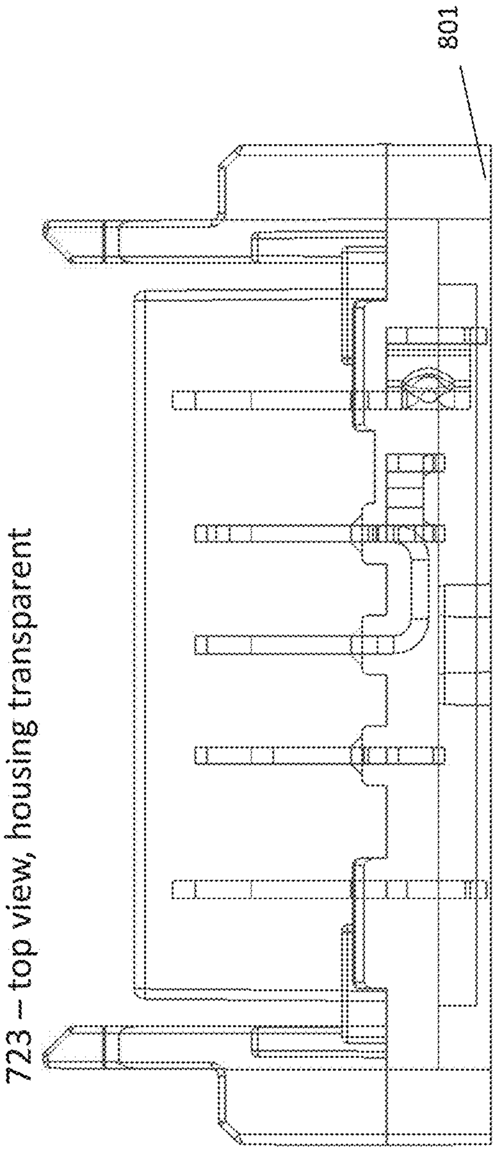
Figure 89B:
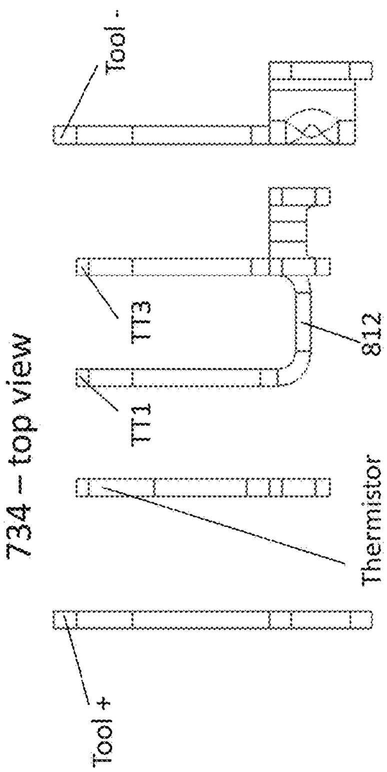

FIGS. 89*a* and 89*b* are top views of the terminals and terminal block of FIG. 96.

Figure 90A:
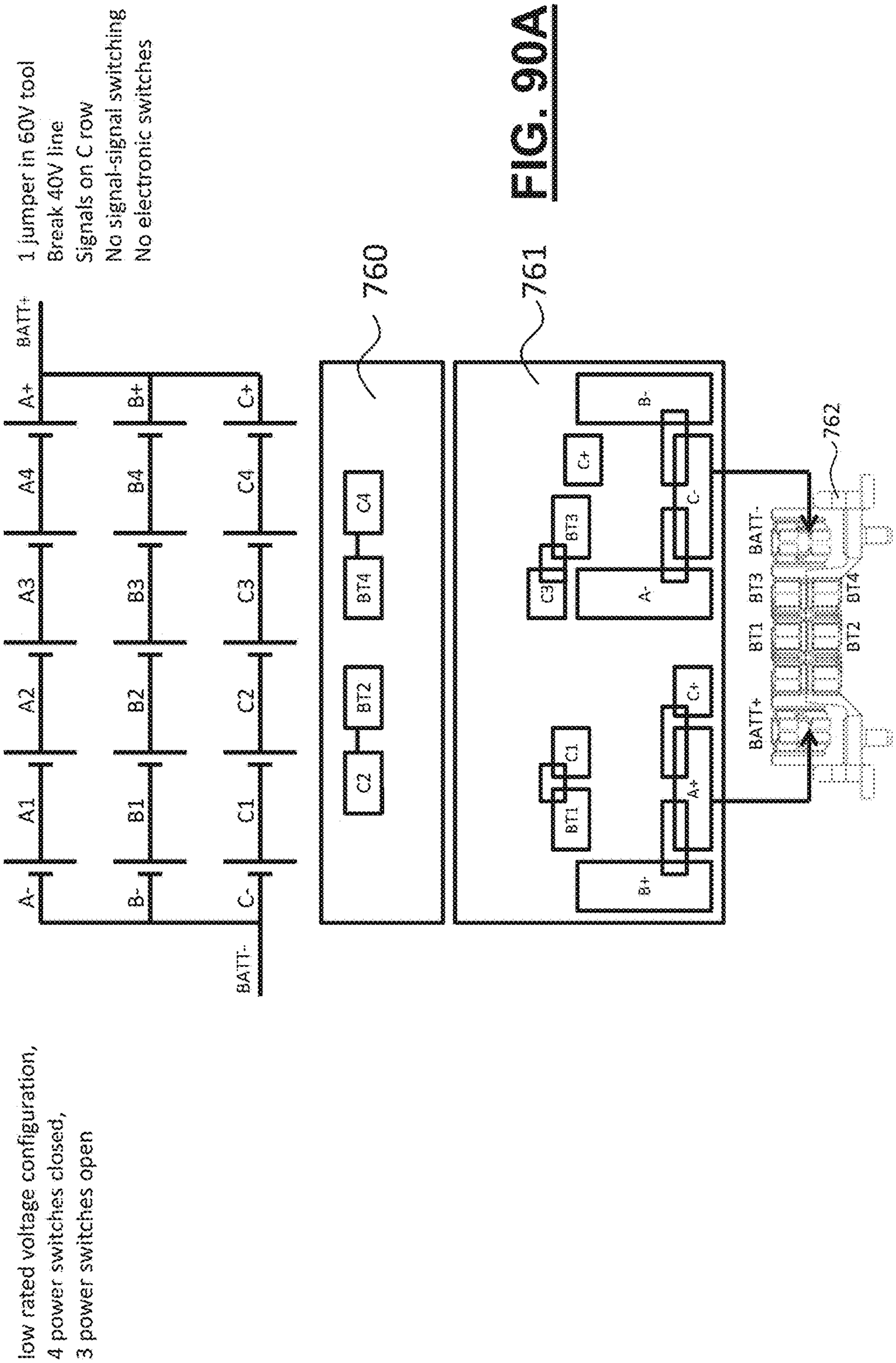
Figure 90B:
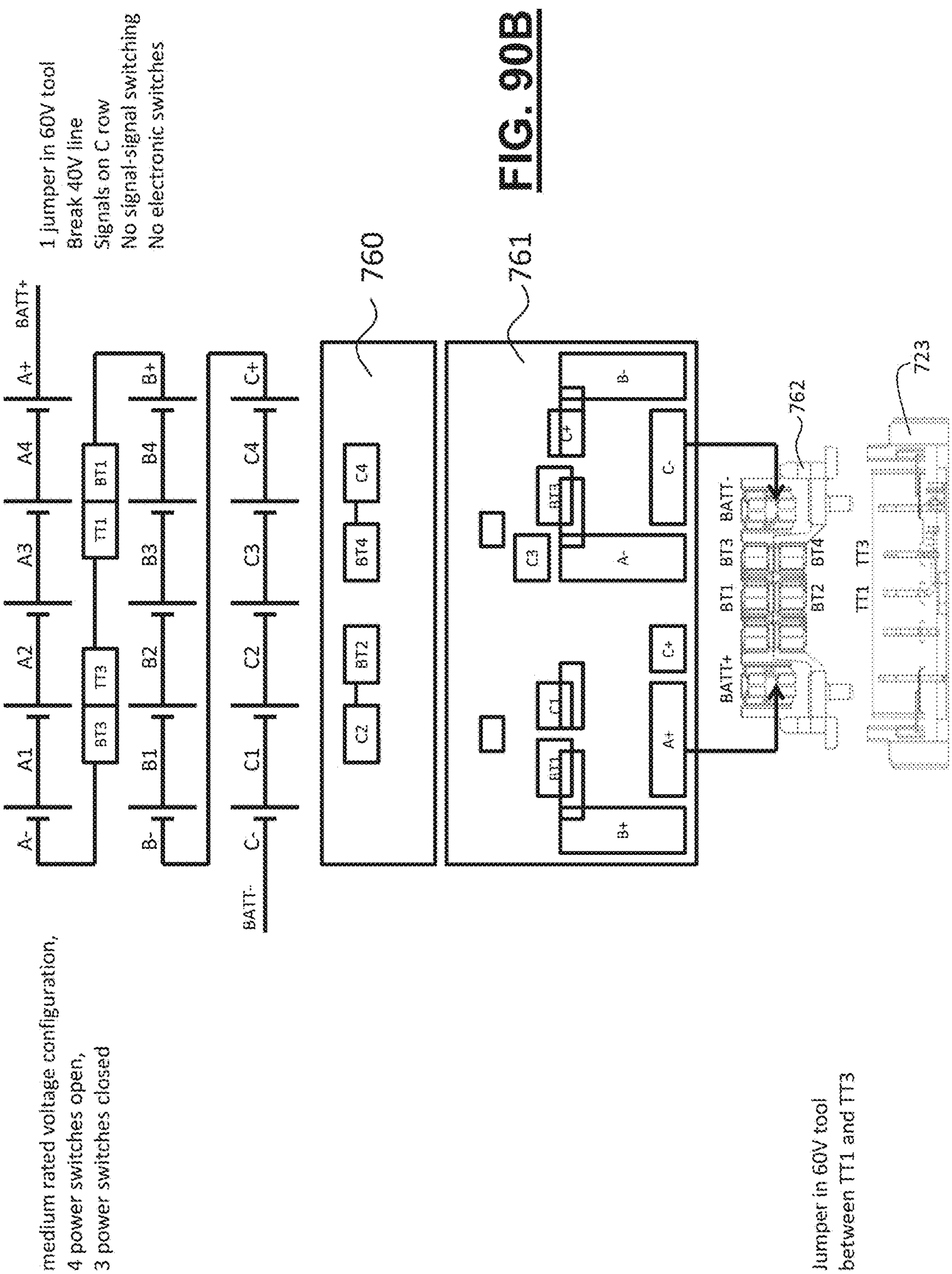

FIGS. 90*a* and 90*b* are simplified circuit diagrams and block diagrams of the exemplary battery of FIG. 73 having an alternate exemplary converting subsystem.

Figure 91A:
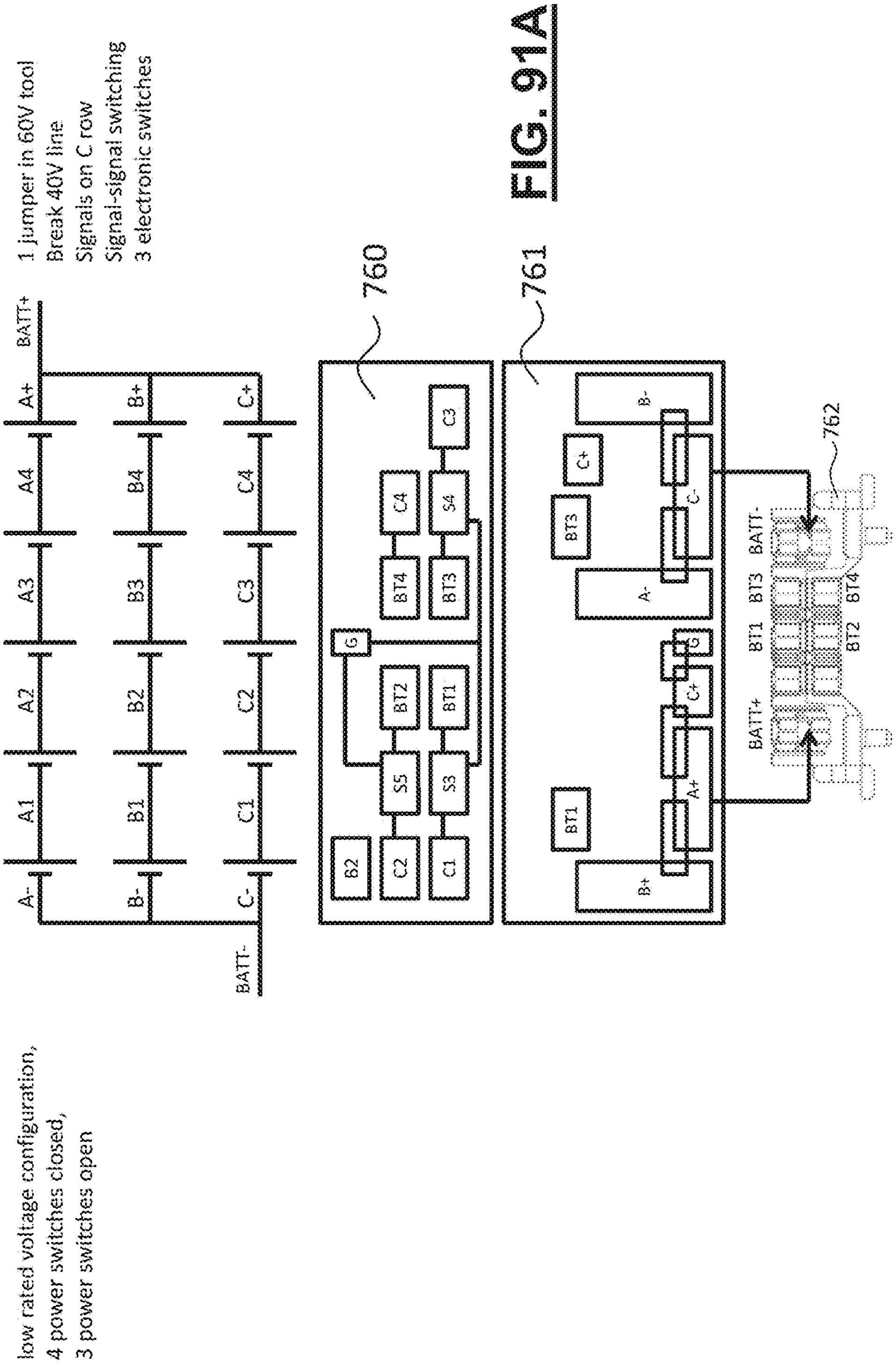
Figure 91B:
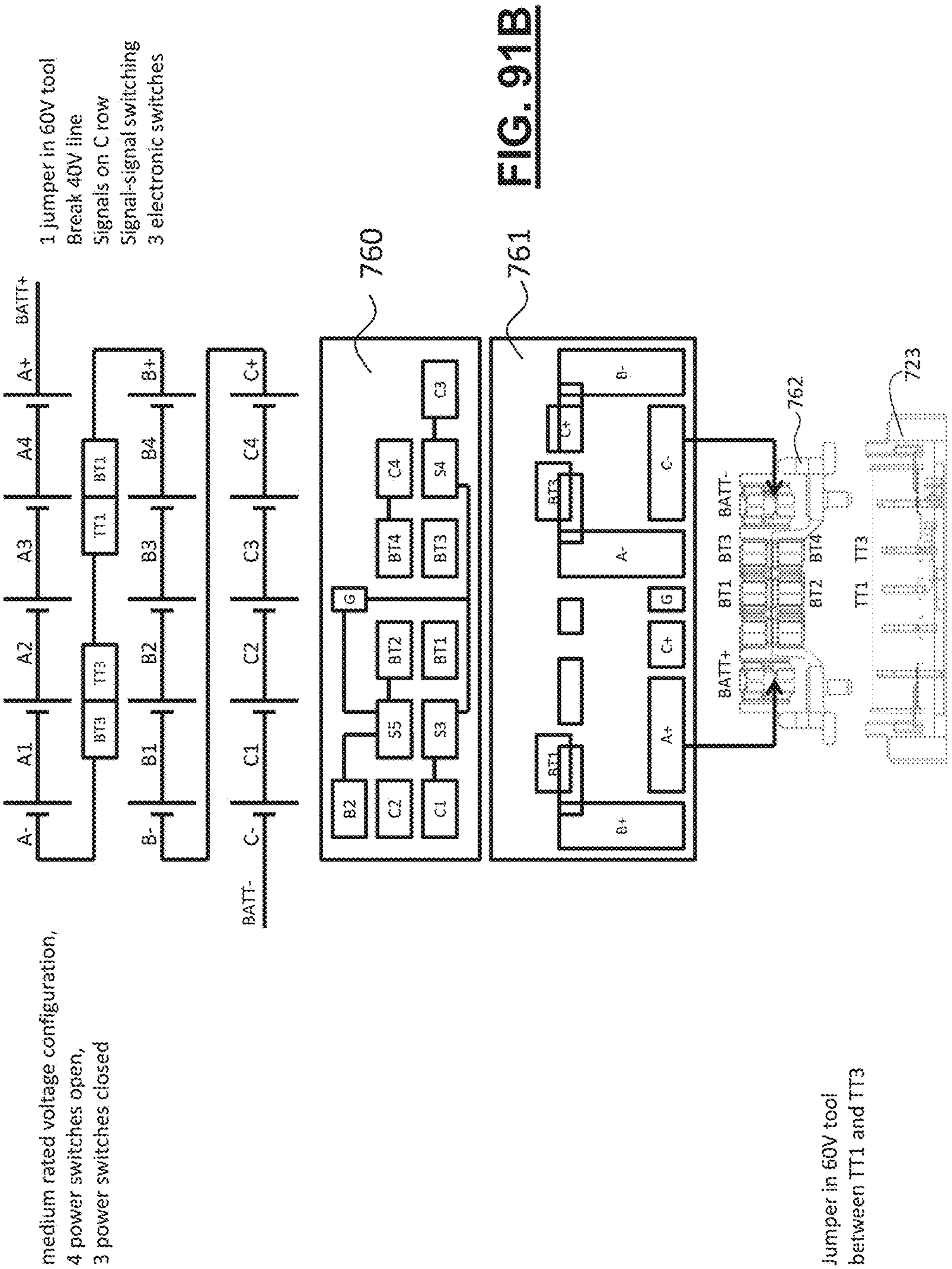
Figure 91C:
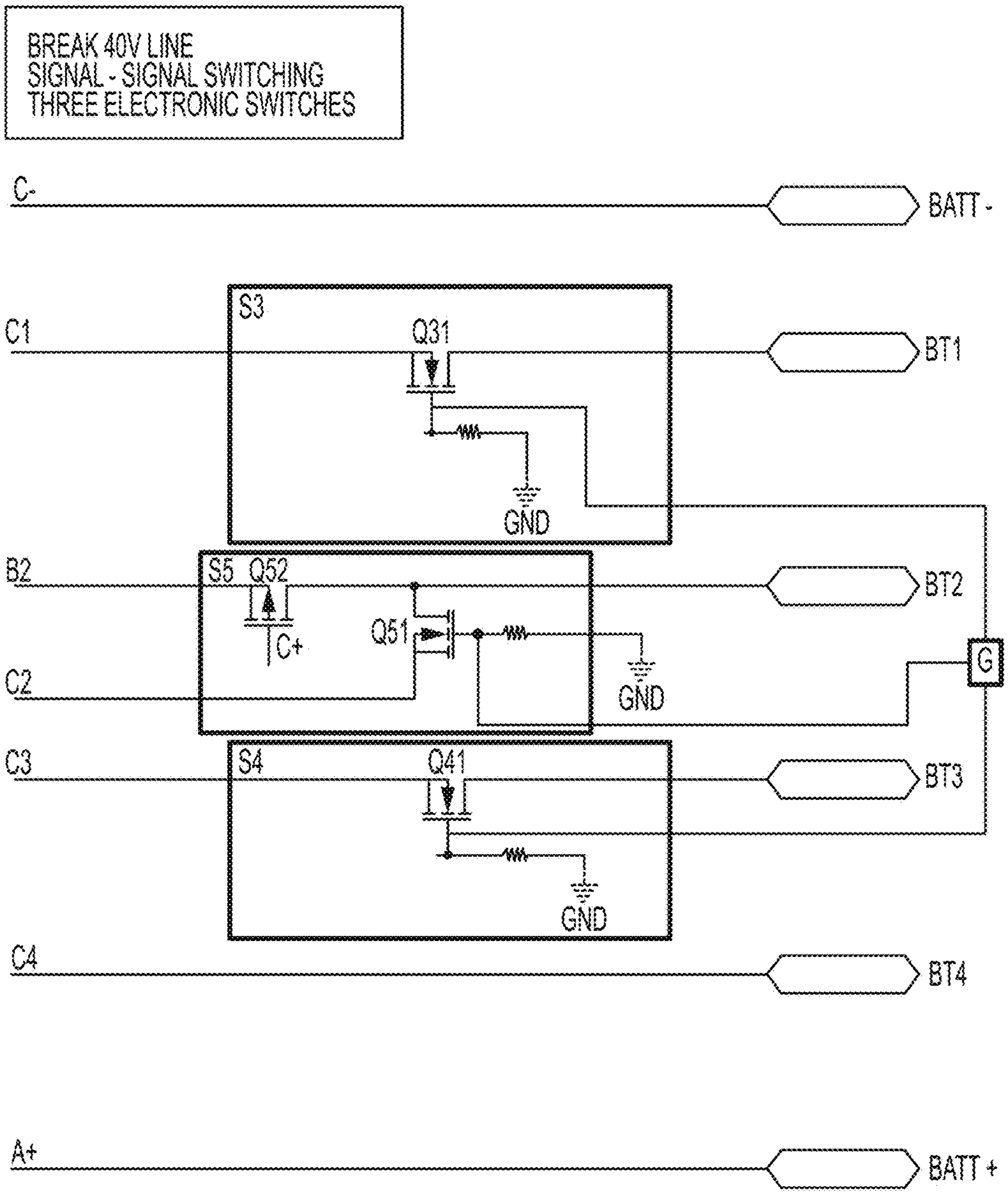

FIGS. 91*a*, 91*b*, and 91*c* are simplified circuit diagrams and block diagrams of the exemplary battery of FIG. 73 having an alternate exemplary converting subsystem.

Figure 92A:
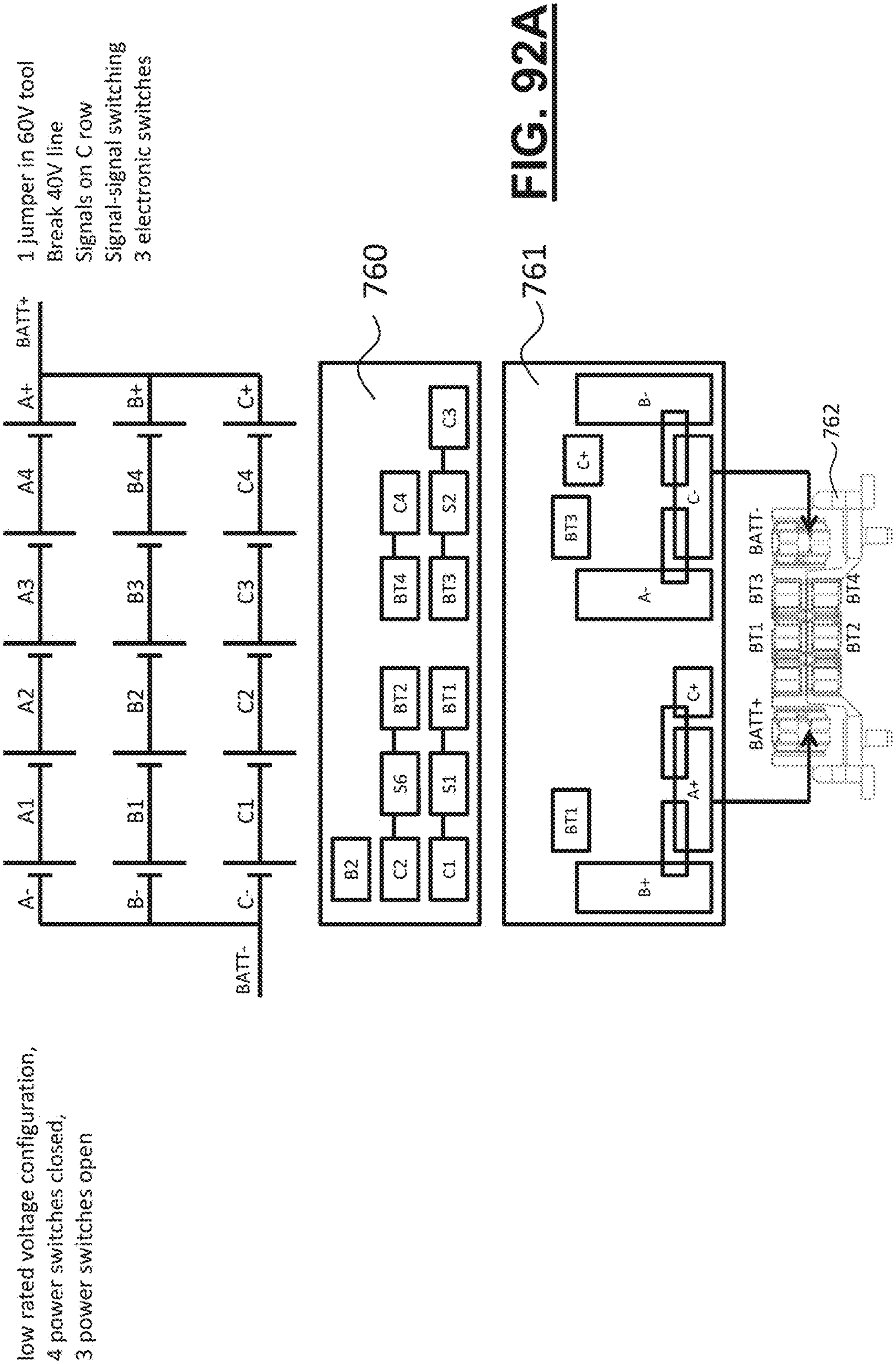
Figure 92B:
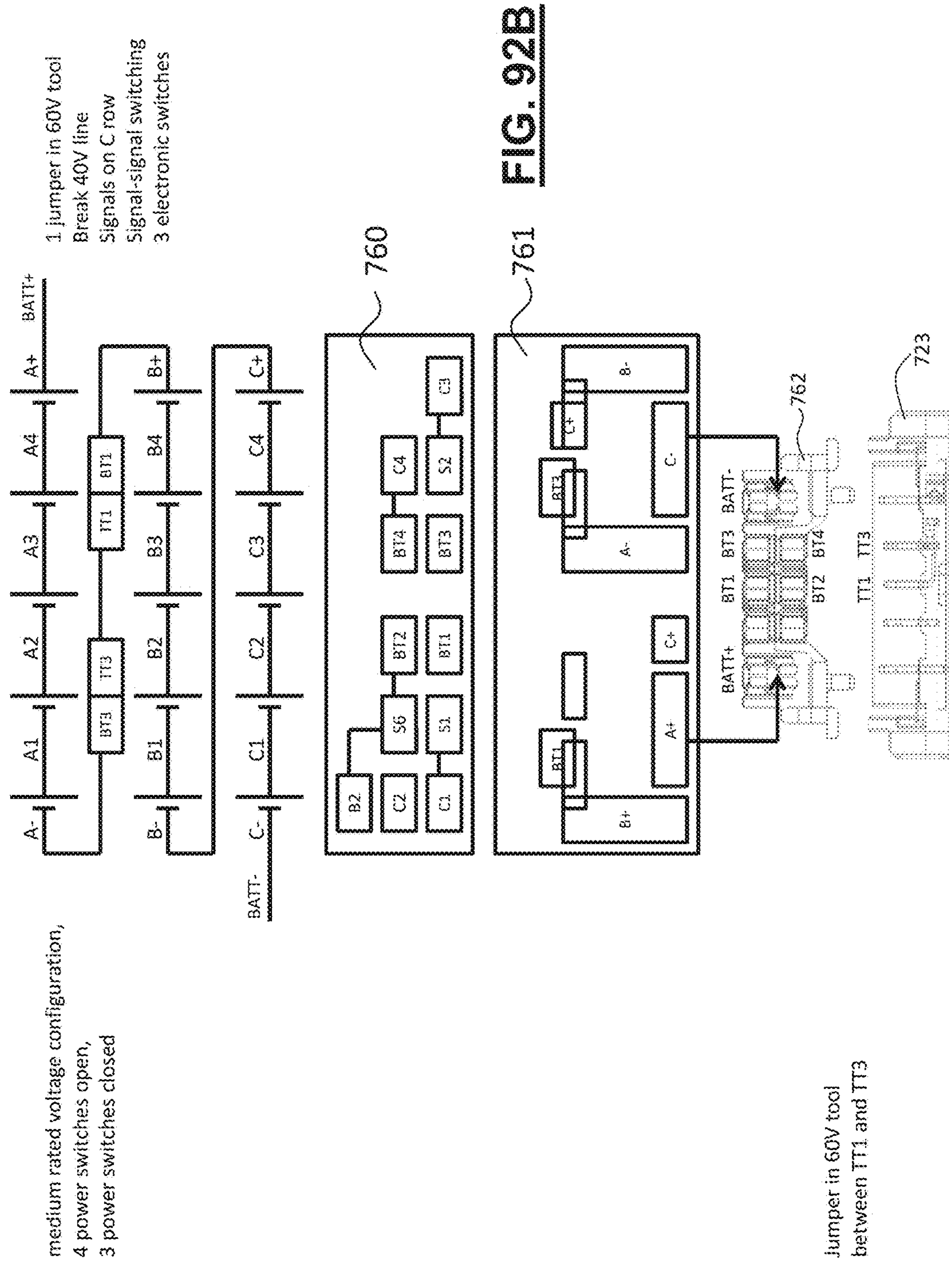
Figure 92C:
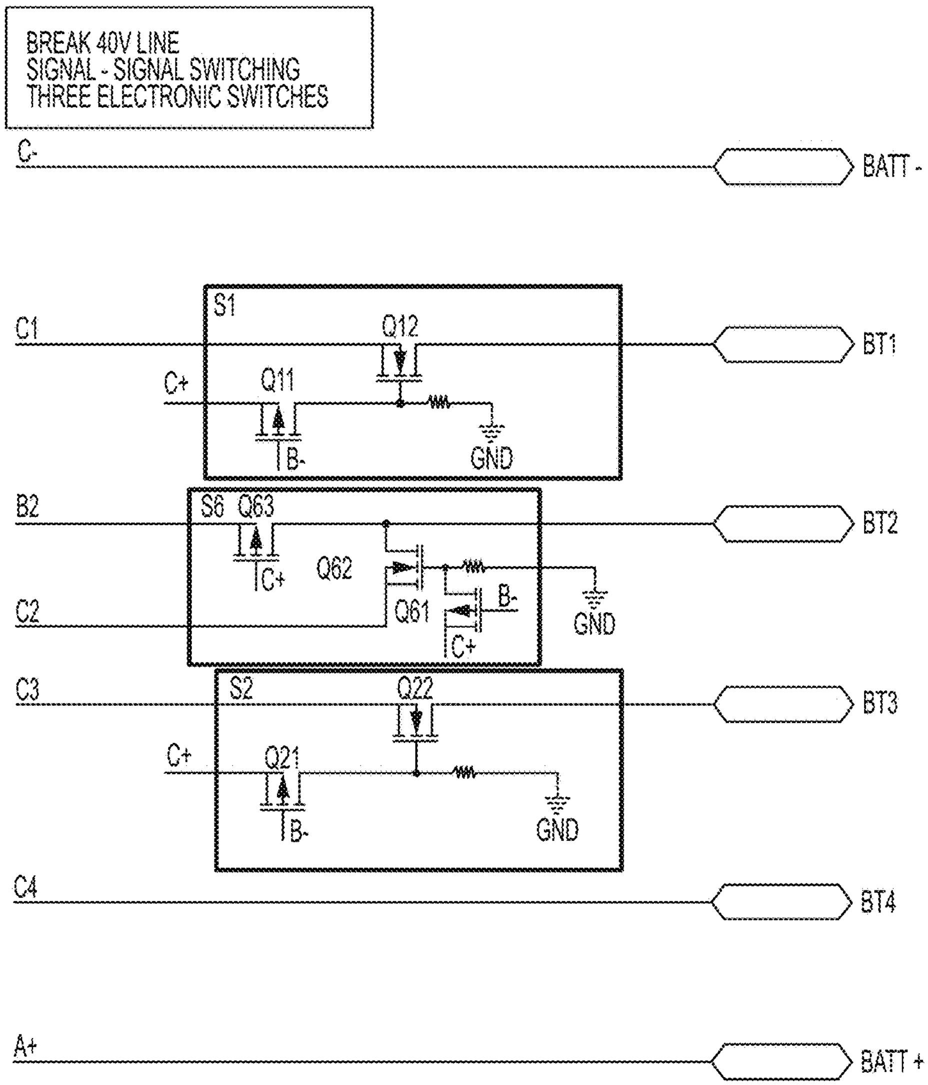

FIGS. 92*a*, 92*b*, and 92*c* are simplified circuit diagrams and block diagrams of the exemplary battery of FIG. 73 having an alternate exemplary converting subsystem.

Figure 93A:
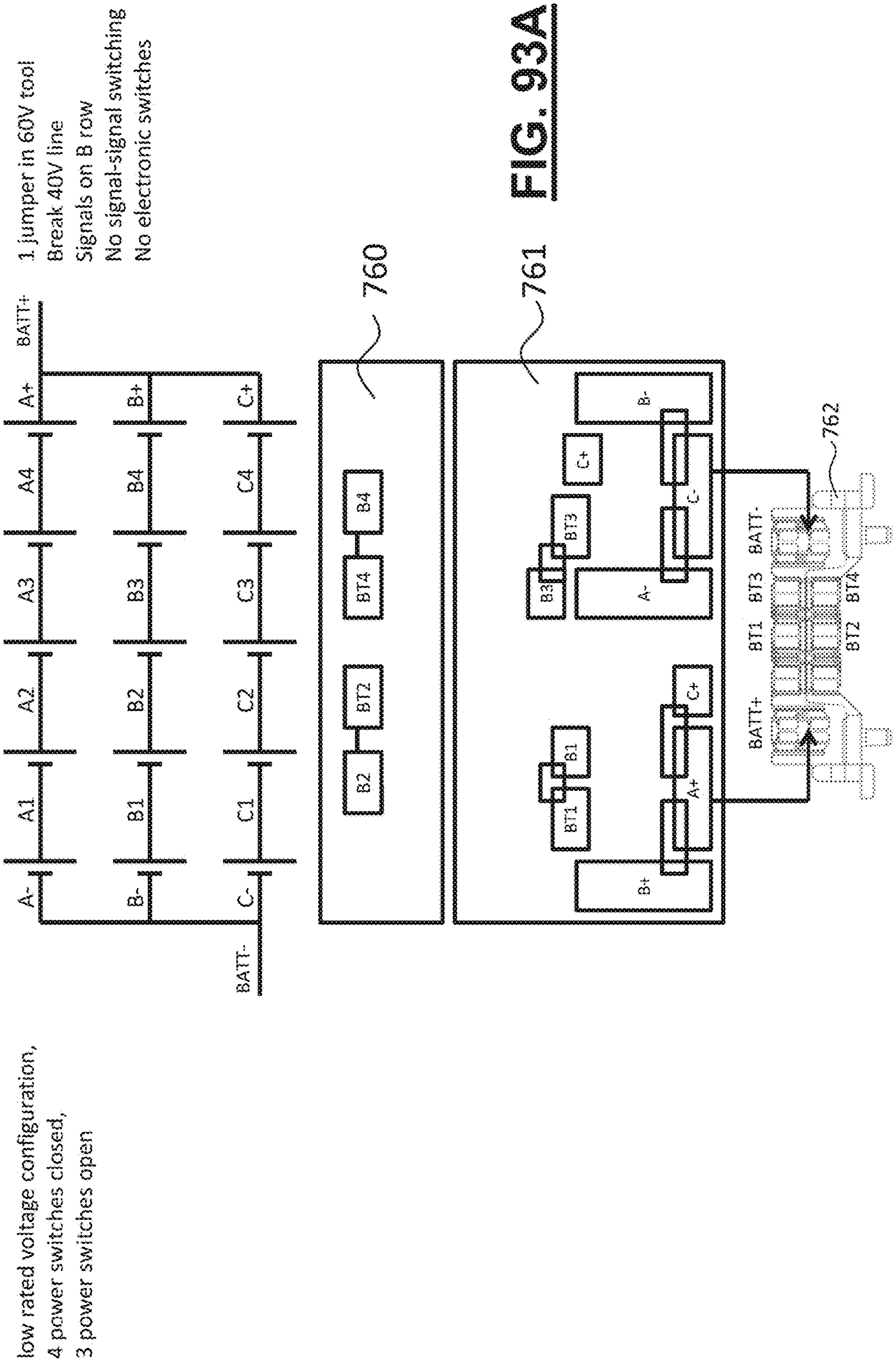
Figure 93B:
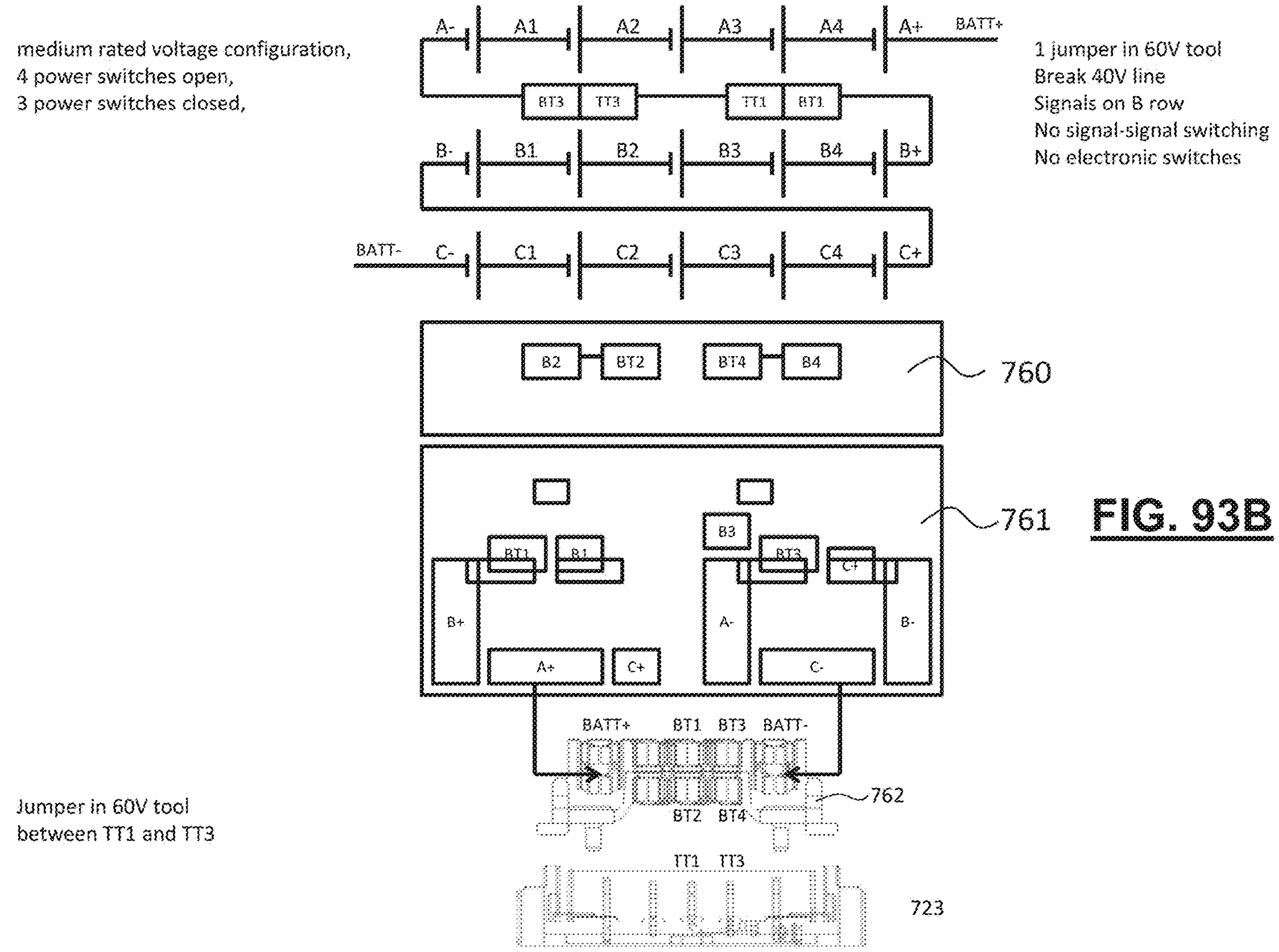

FIGS. 93*a* and 93*b* are simplified circuit diagrams and block diagrams of the exemplary battery of FIG. 73 having an alternate exemplary converting subsystem.

Figure 94A:
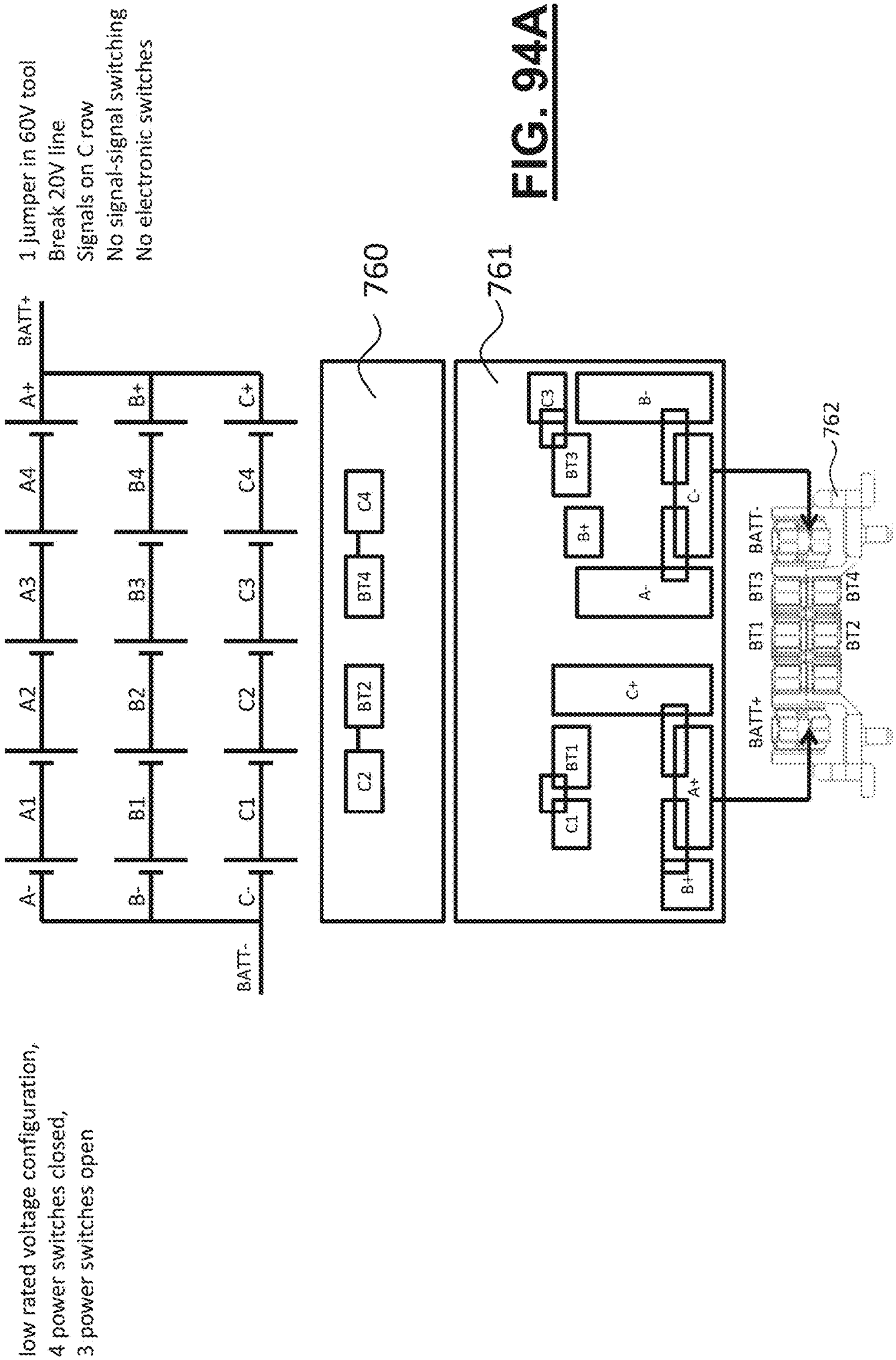
Figure 94B:
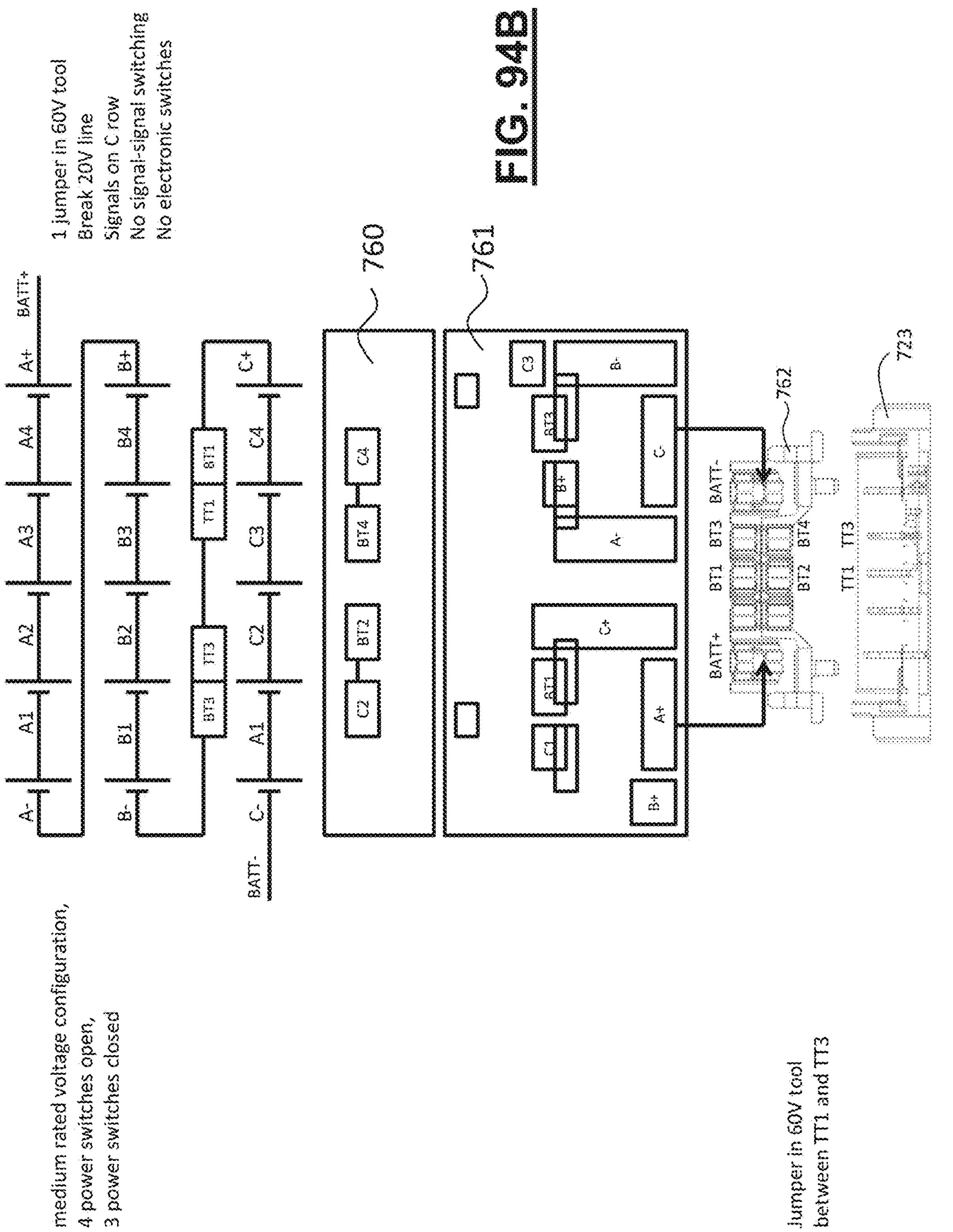

FIGS. 94*a* and 94*b* are simplified circuit diagrams and block diagrams of the exemplary battery of FIG. 73 having an alternate exemplary converting subsystem.

Figure 95A:
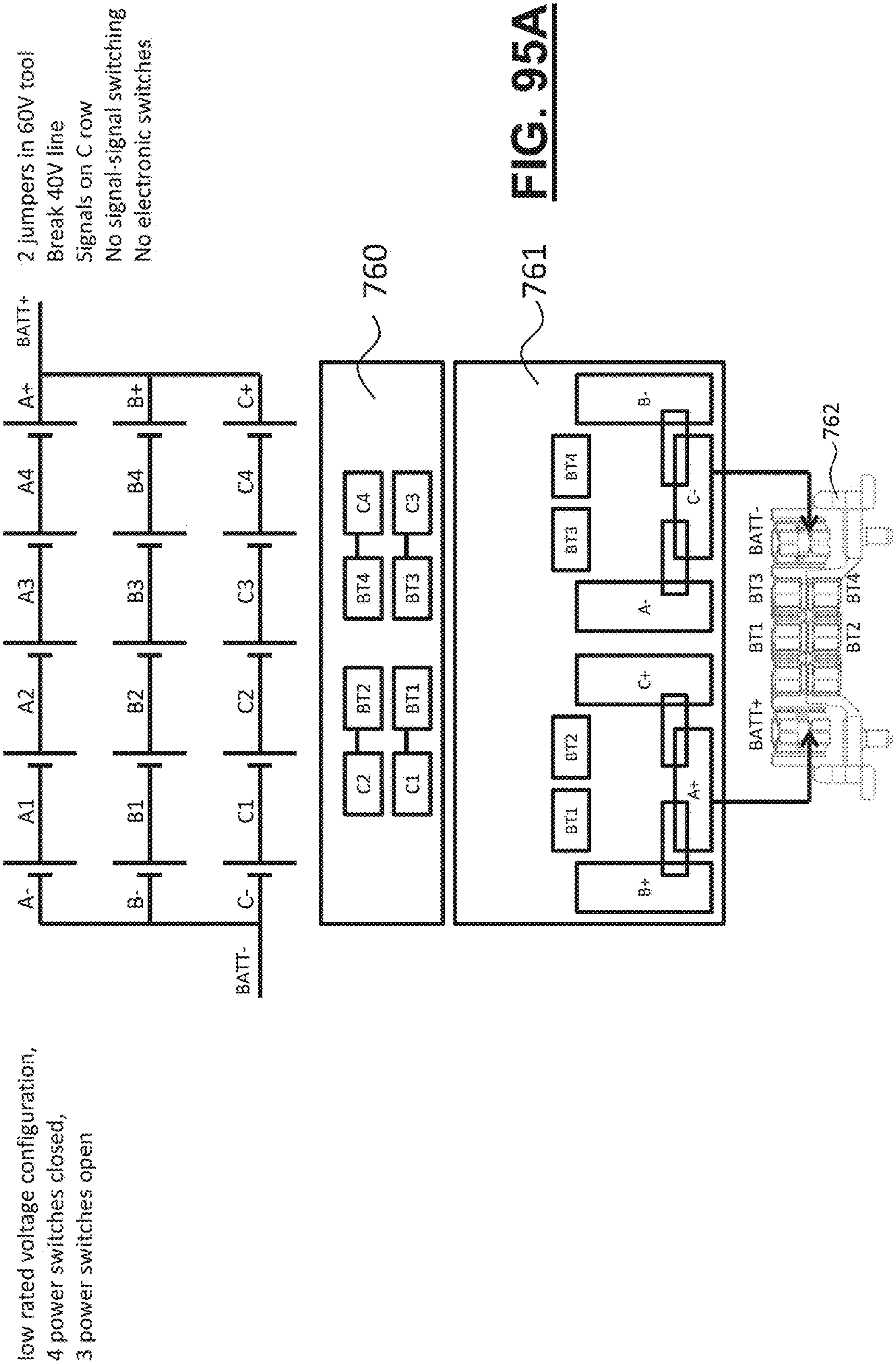
Figure 95B:
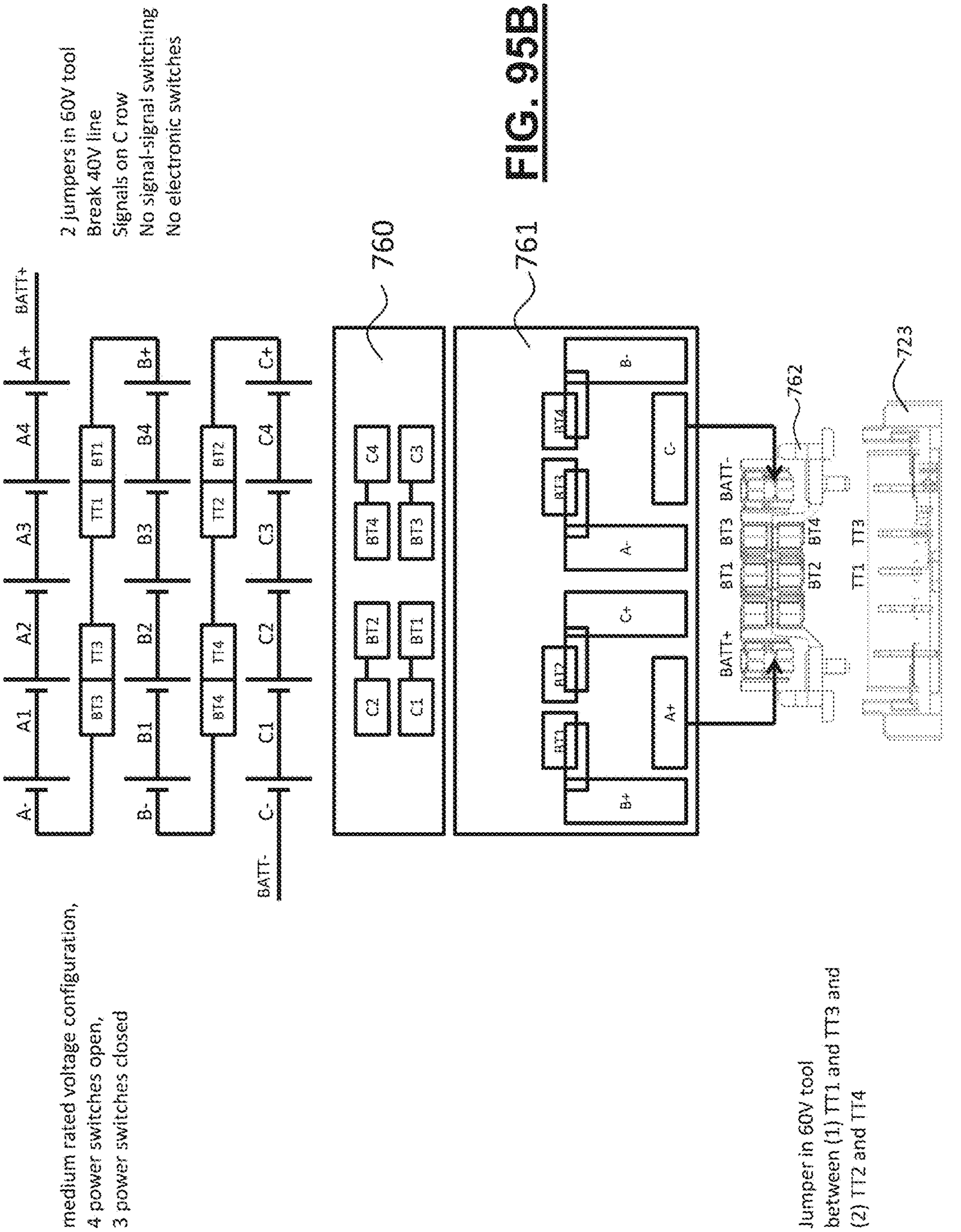

FIGS. 95*a* and 95*b* are simplified circuit diagrams and block diagrams of the exemplary battery of FIG. 73 having an alternate exemplary converting subsystem.

Figure 96B:
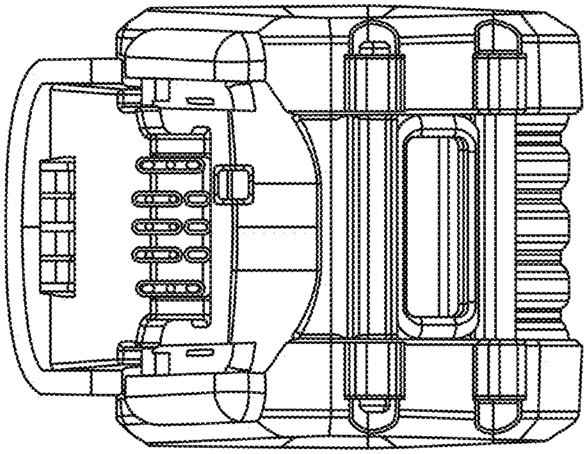
Figure 96A:
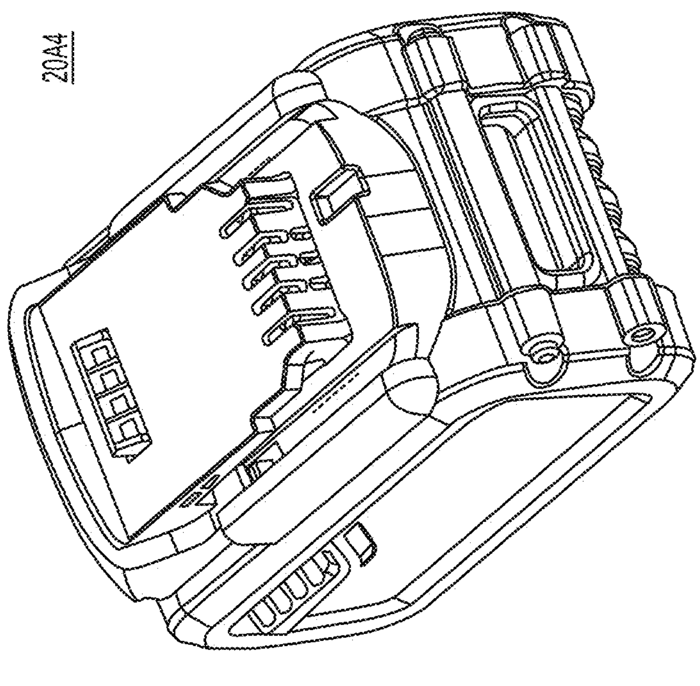

FIGS. 96*a* and 96*b* are an alternate exemplary convertible battery pack.

FIGS. 97*a*-97*g* illustrated an exemplary converting subsystem of the battery pack of FIG. 96.

Figure 98A:
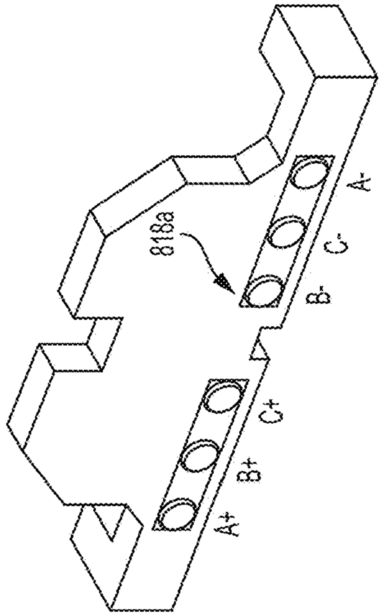
Figure 98B:
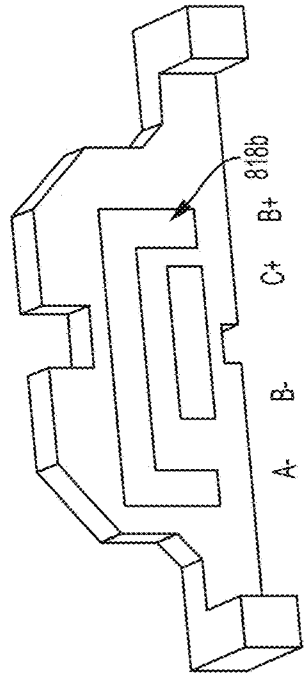
Figure 97G:
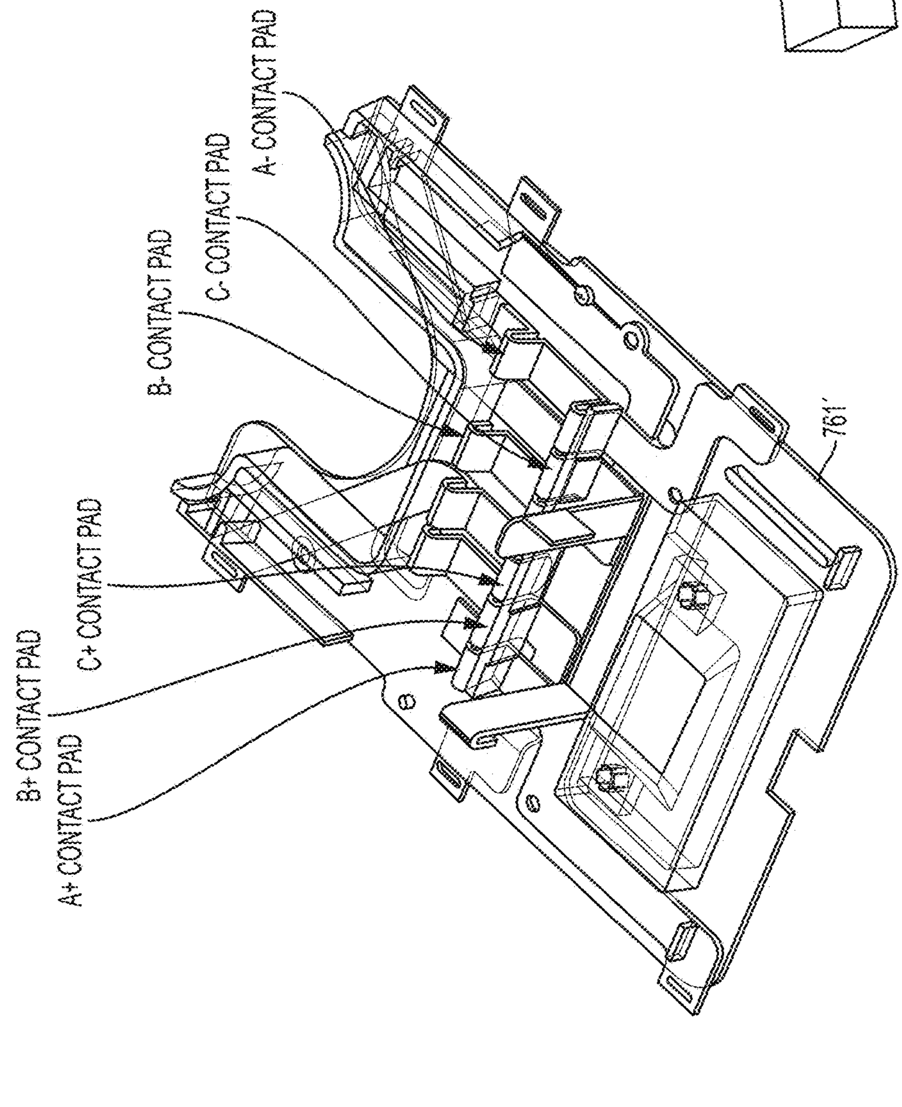

FIGS. 98*a* and 98*b* illustrate an exemplary converter element of the converting subsystem of FIG. 30.

FIGS. 99*a*, 99*b*, 99*c*, and 99*d* illustrate an alternate exemplary converting subsystem.

FIGS. 100*a*, 100*b*, 100*c*, and 100*d* illustrate an alternate exemplary converting subsystem.

FIGS. 101*a*1, 101*a*2, 101*b*1, and 101*b*2 illustrate an alternate exemplary converting subsystem.

FIGS. 102*a*1, 102*a*2, 102*b*1, and 102*b*2 illustrate an alternate exemplary converting subsystem.

Figures 103A, 103B, 103C:
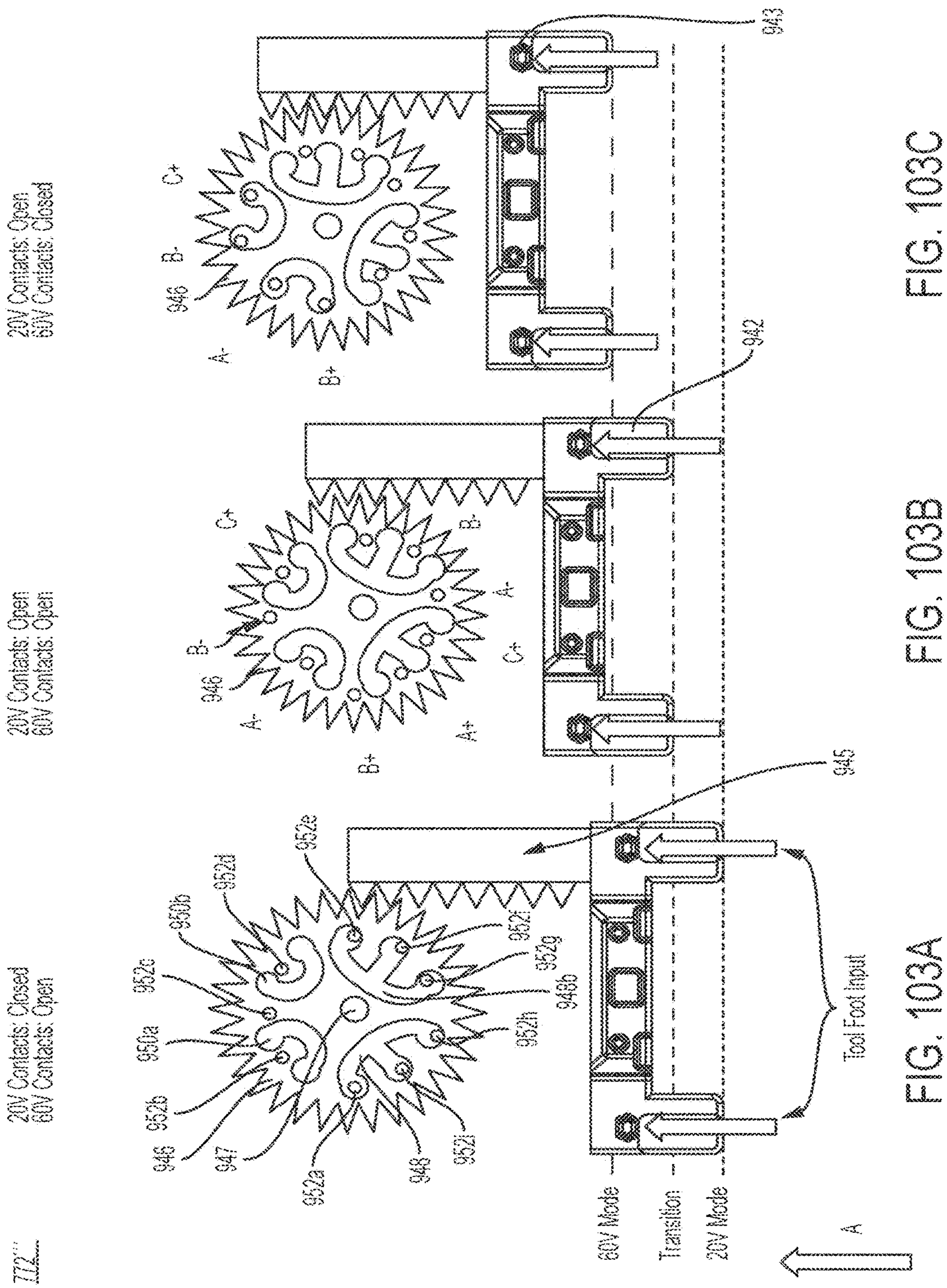

FIGS. 103*a*, 103*b*, and 103*c* illustrate an alternate exemplary converting subsystem.

Figure 104A:
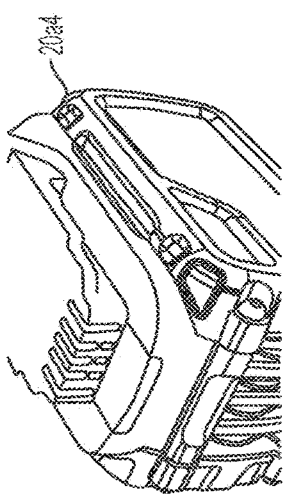
Figure 104B:
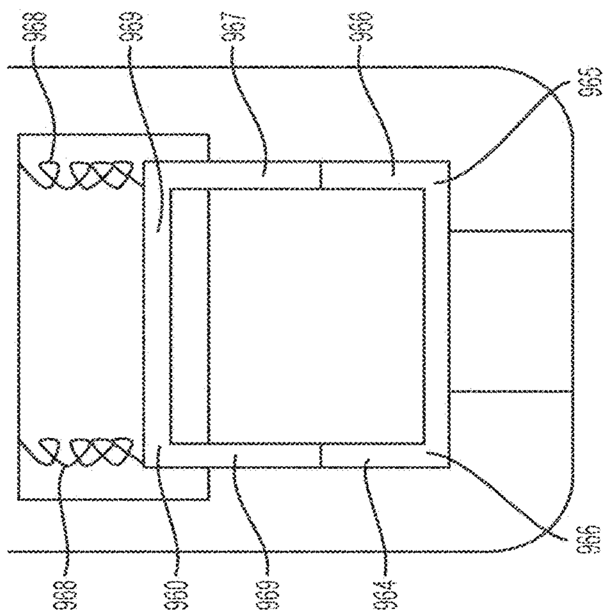

FIGS. 104*a* and 104*b* illustrate an alternate exemplary conversion system in a low rated voltage configuration.

Figure 105A:
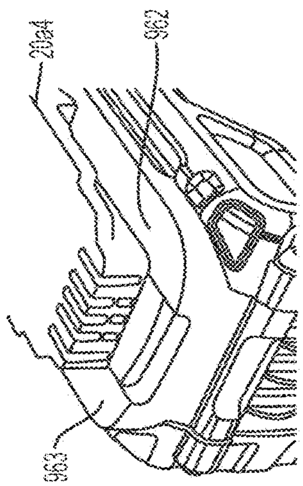
Figure 105B:
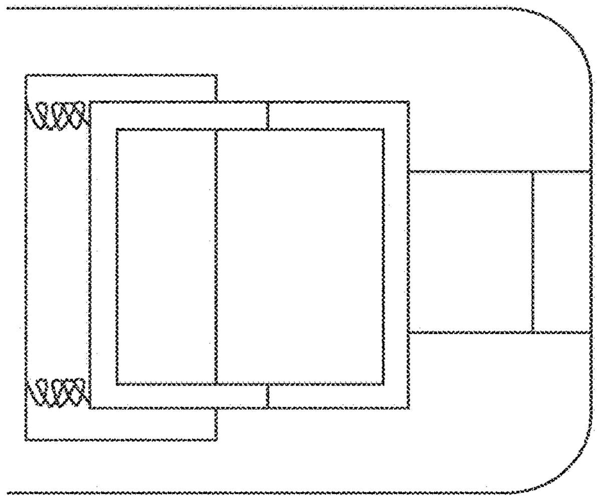

FIGS. 105*a* and 105*b* illustrate the alternate exemplary conversion system of FIG. 104 in a medium rated voltage configuration.

FIGS. 106*a*-106*g* illustrate a system for converting a convertible battery pack.

Figure 107:
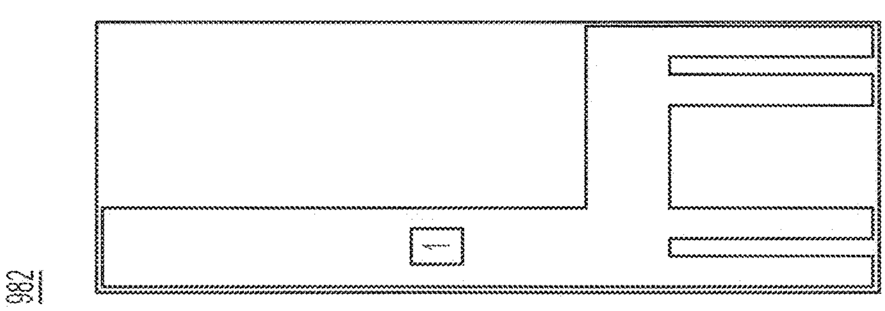

FIG. 107 illustrates a conventional contact stamping.

Figure 108:
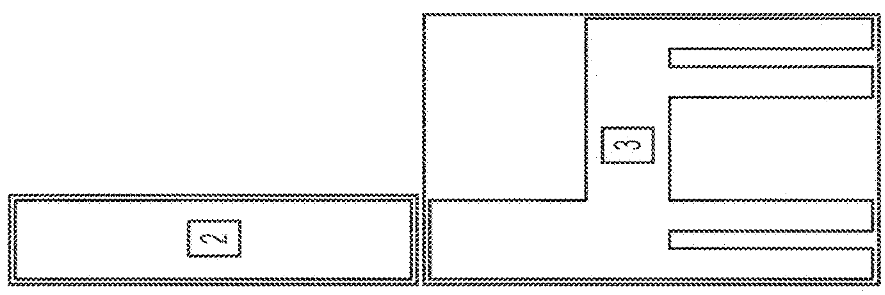

FIG. 108 illustrates a contact stamping of the present disclosure.

Figure 109:
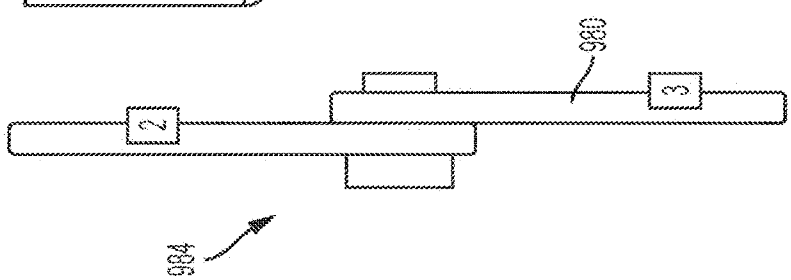

FIG. 109 illustrates the contact stamping of FIG. 108 in an assembled state.

Figure 110:
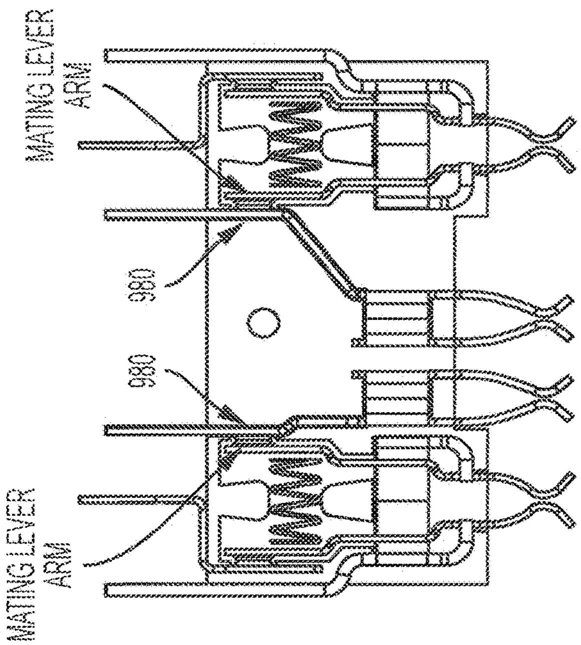

FIG. 110 illustrates the contact stamping of FIG. 109 in an article of manufacture.

Figure 111:
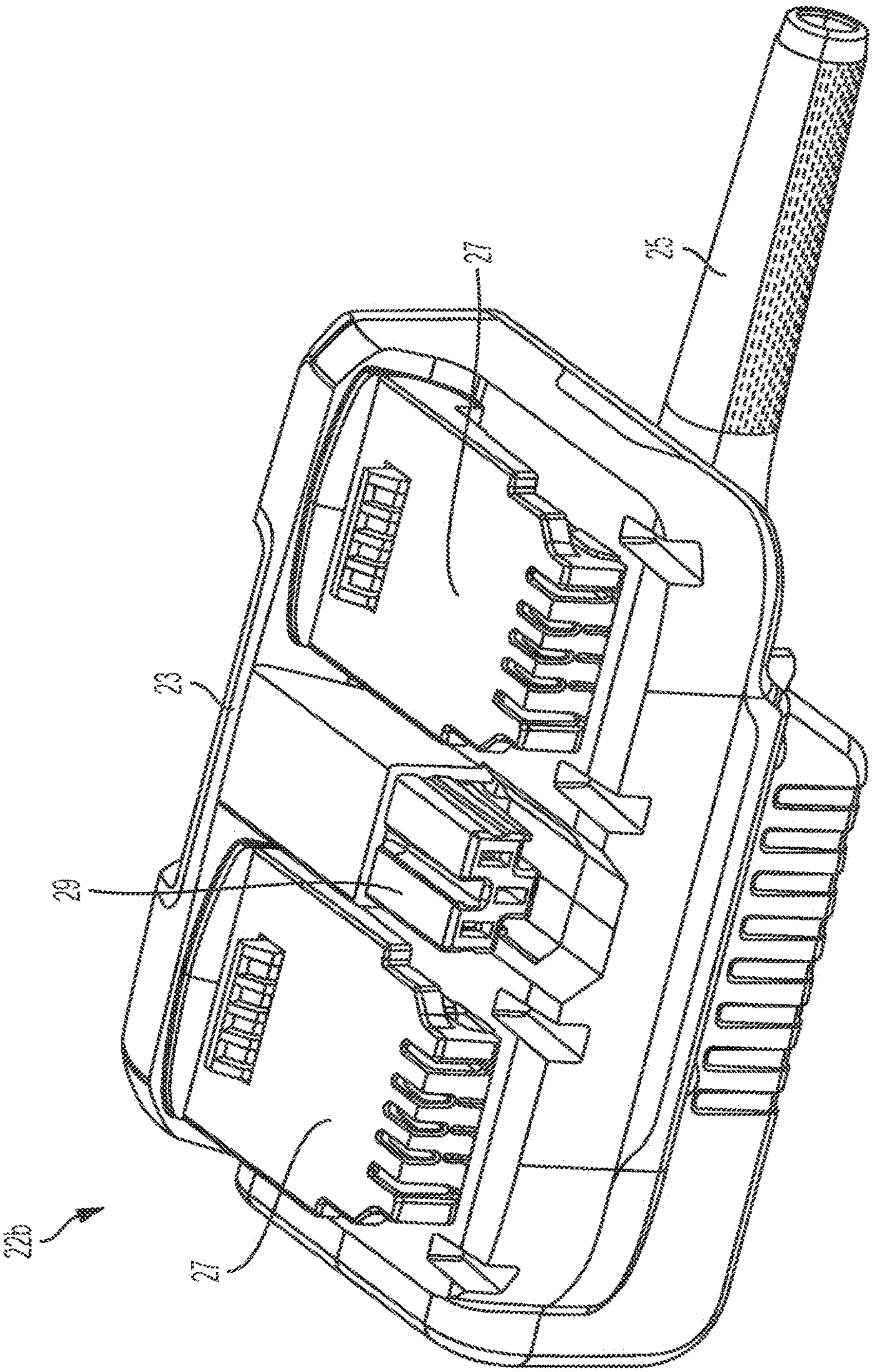

FIG. 111 illustrates an exemplary embodiment of an AC/DC power tool interface for coupling an AC/DC power supply to an AC/DC power tool.

Figure 112:
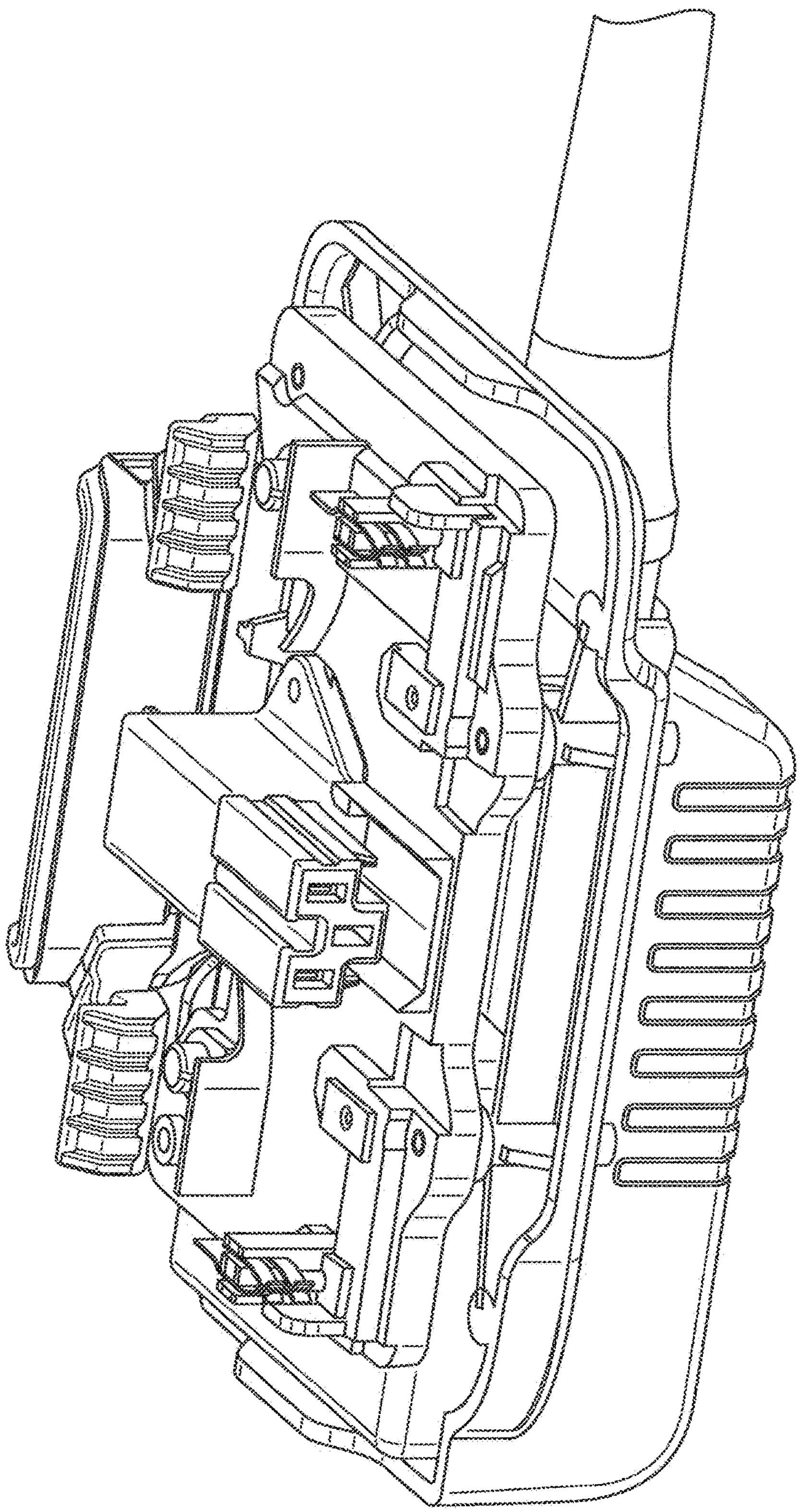

FIG. 112 illustrates an interior view of the AC/DC power tool interface of FIG. 111.

Figure 113:
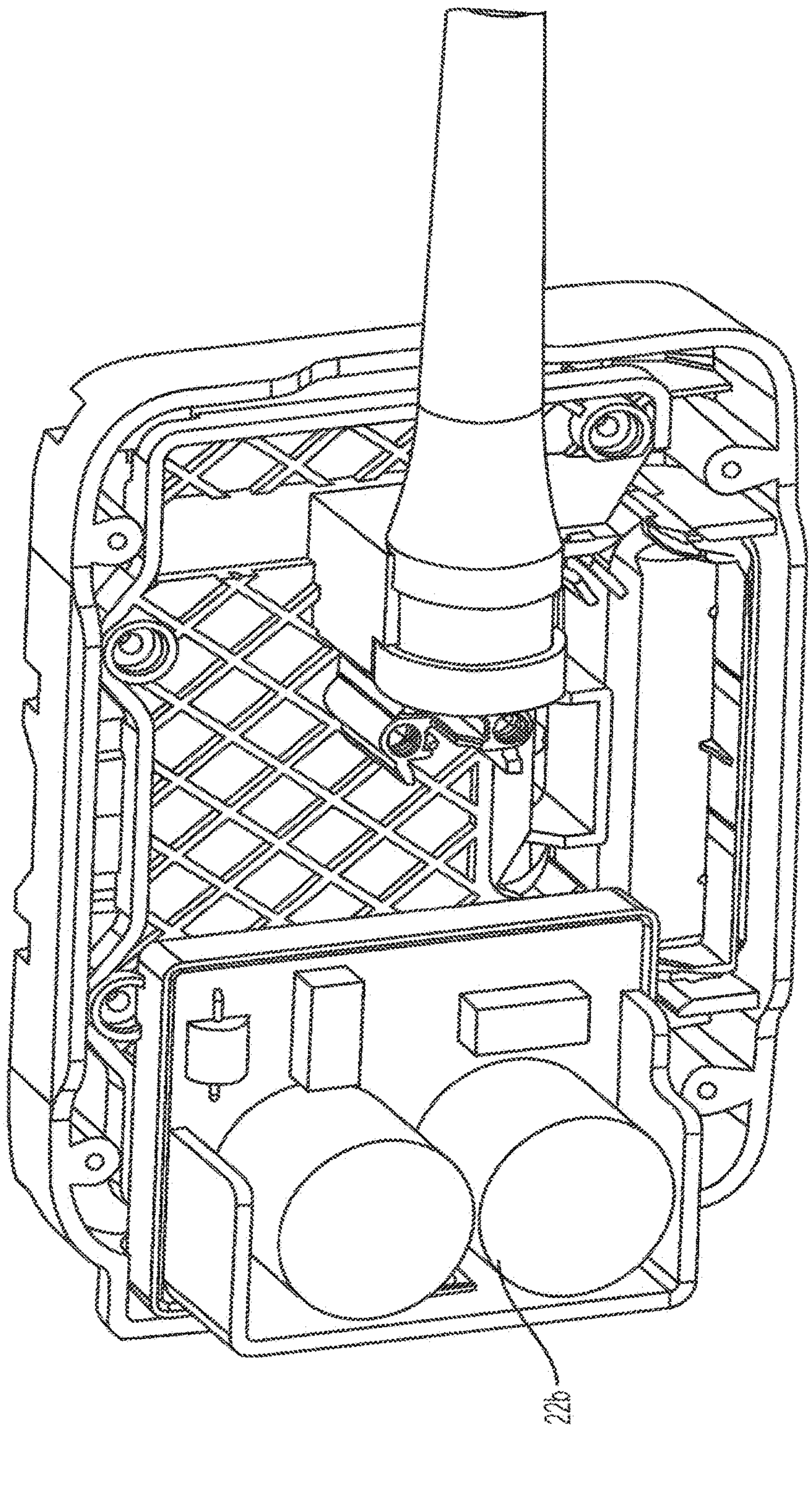

FIG. 113 illustrates an alternate interview view of the AC/DC power tool interface of FIG.

Figure 114:
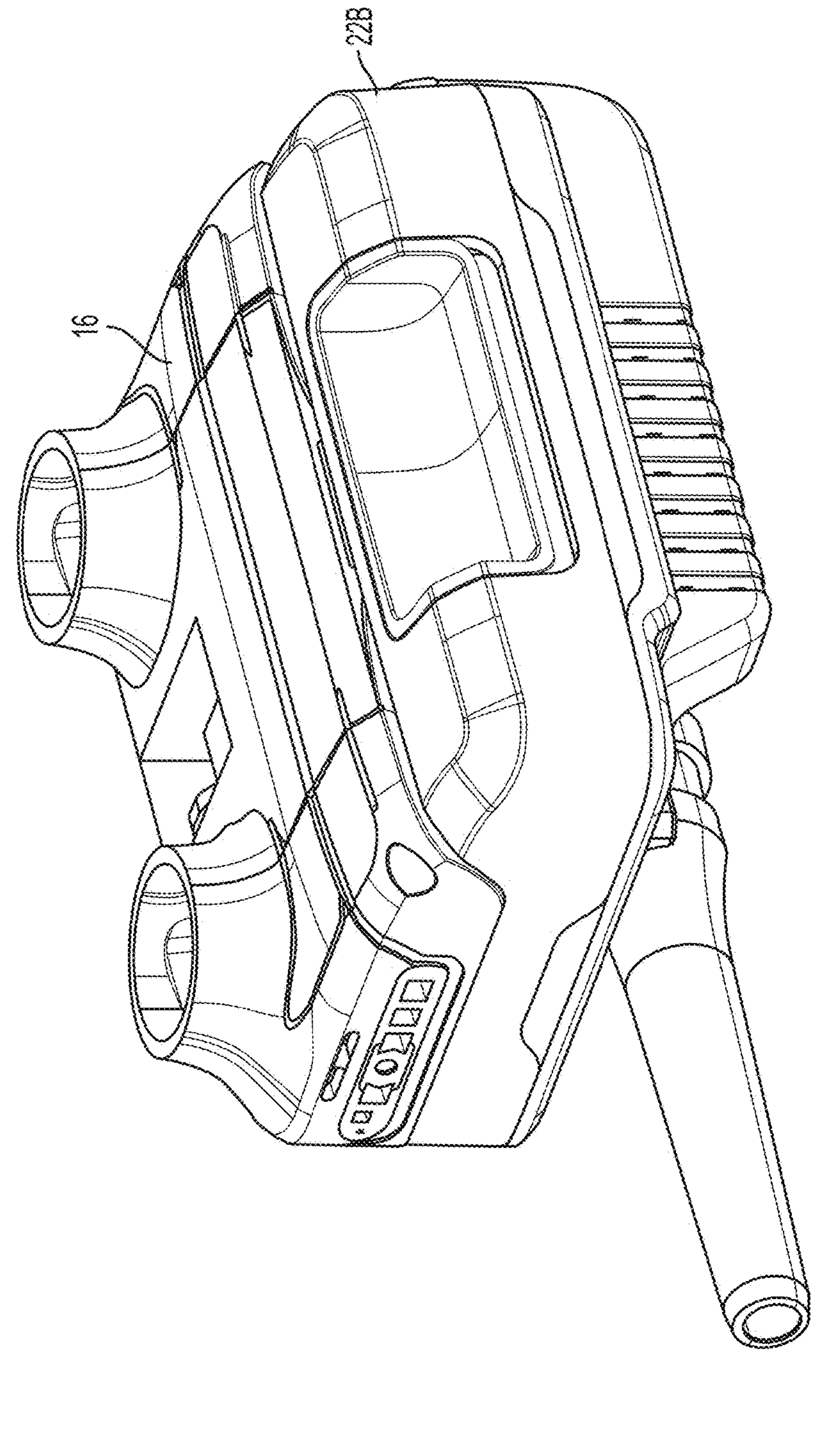

FIG. 114 illustrates the AC/DC power tool interface of FIG. 111 coupled to an exemplary embodiment of an AC/DC power tool.

Figure 115:
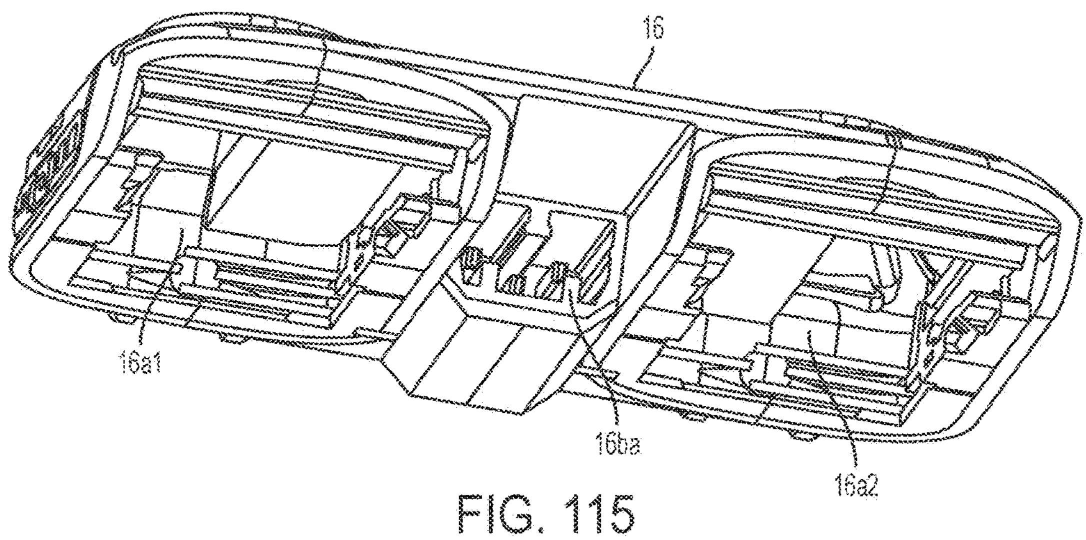

FIG. 115 illustrates an exemplary embodiment of a power supply interface for coupling an AC/DC power tool to an AC power supply and/or a DC battery pack power supply.

Figure 116:
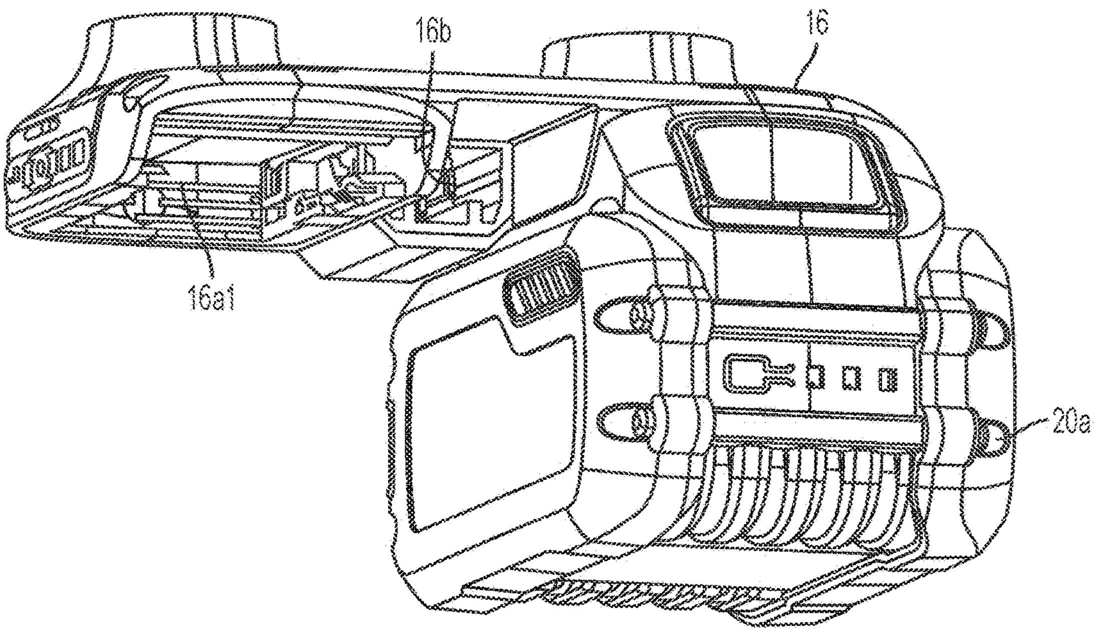

FIG. 116 illustrates the power supply interface of FIG. 115 coupled to an exemplary embodiment of a DC battery pack power supply.

Figure 117:
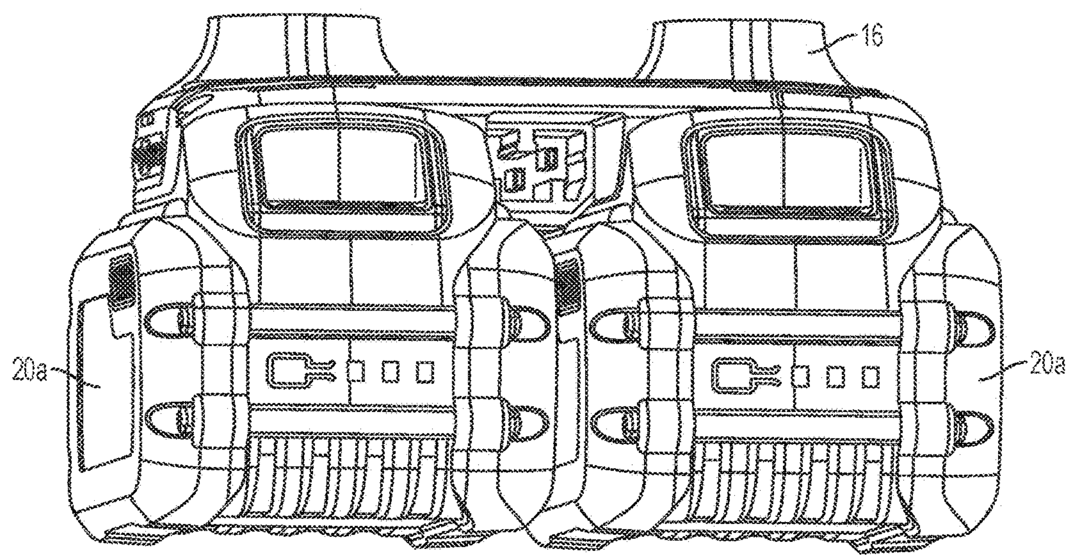

FIG. 117 illustrates the power supply interface of FIG. 115 coupled to two exemplary embodiments of a DC battery pack power supply.

Figure 118C:
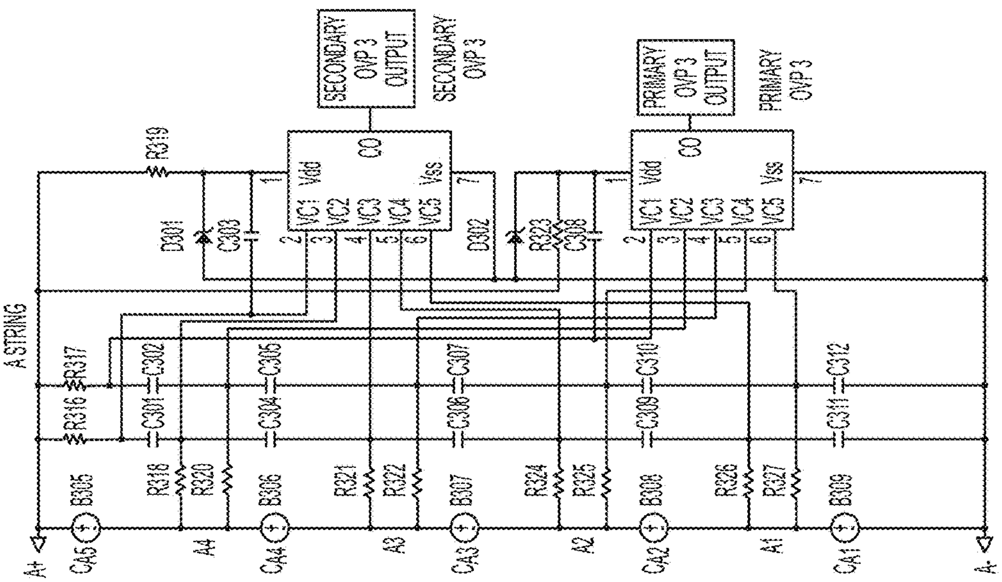
Figure 118B:
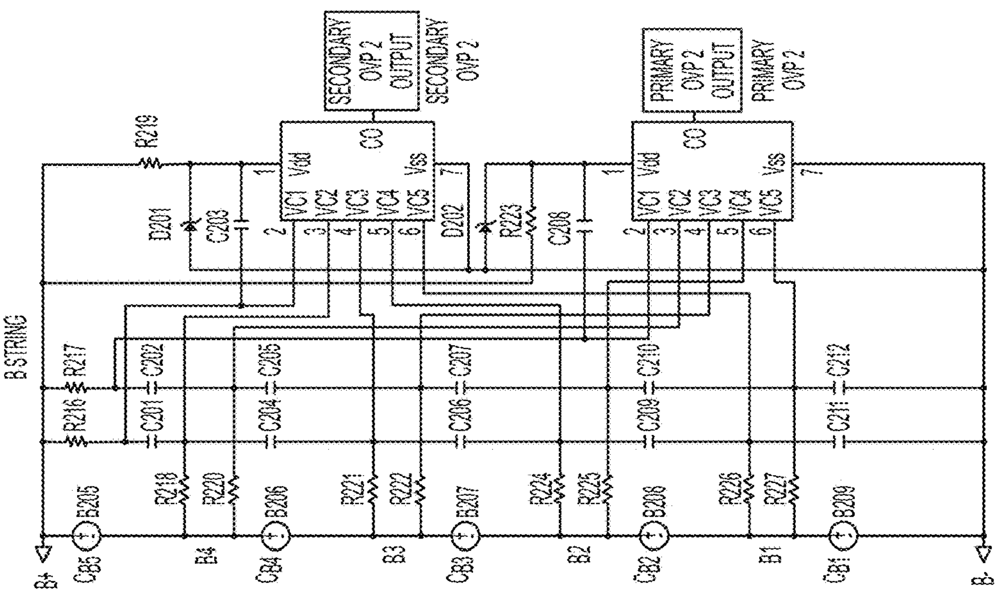
Figure 118A:
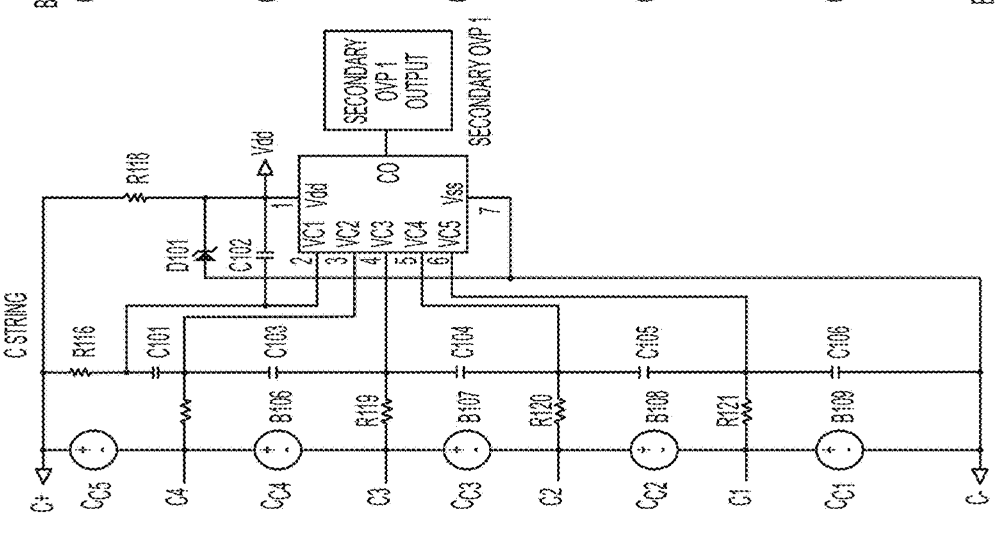

FIGS. 118*a-c* illustrate a partial circuit diagram of an electronics module of an exemplary embodiment of a convertible battery of a convertible battery pack.

Figure 119:
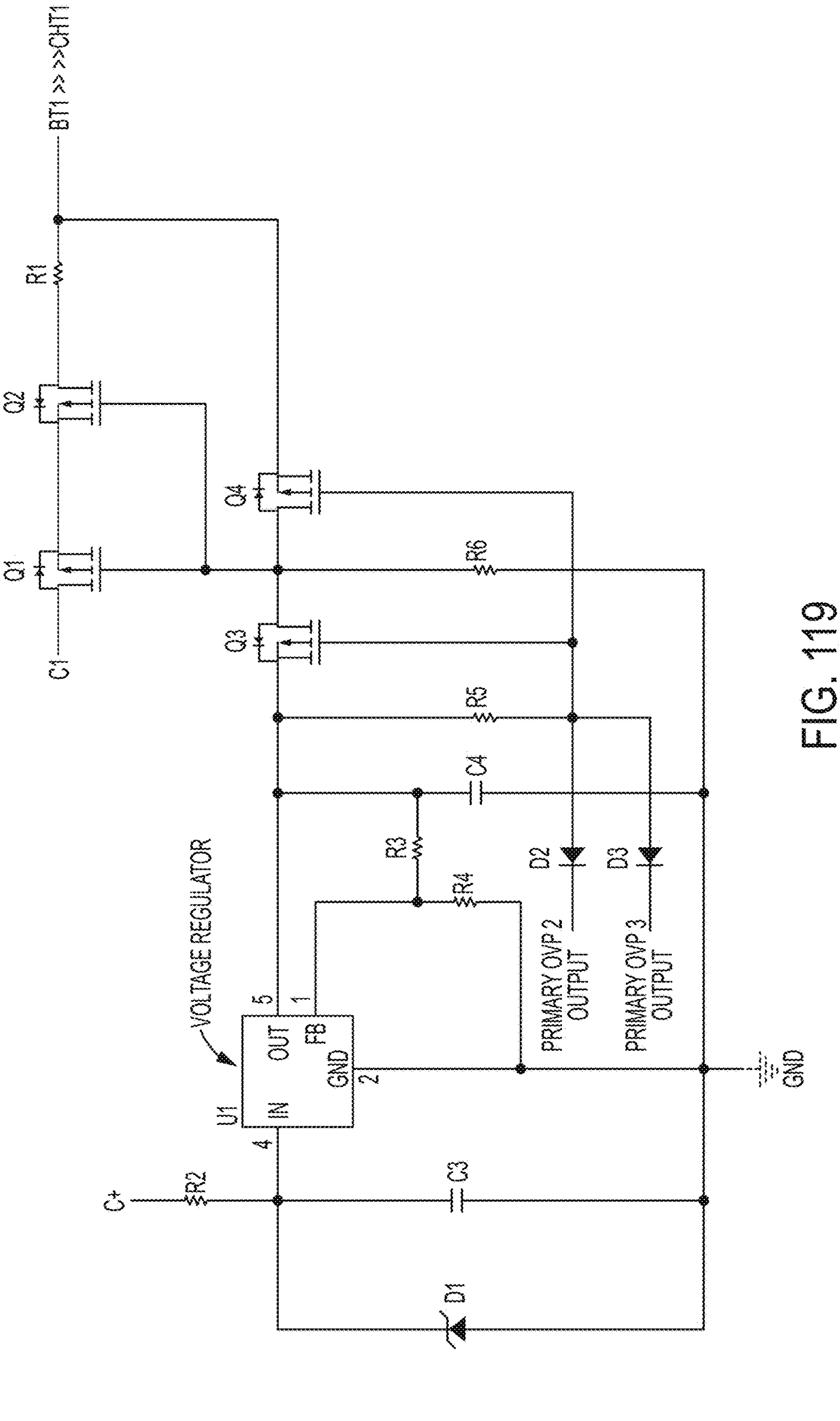

FIG. 119 illustrates a partial circuit diagram of an exemplary embodiment of a monitoring circuit of the electronics module of the convertible battery of FIG. 118.

Figure 120:
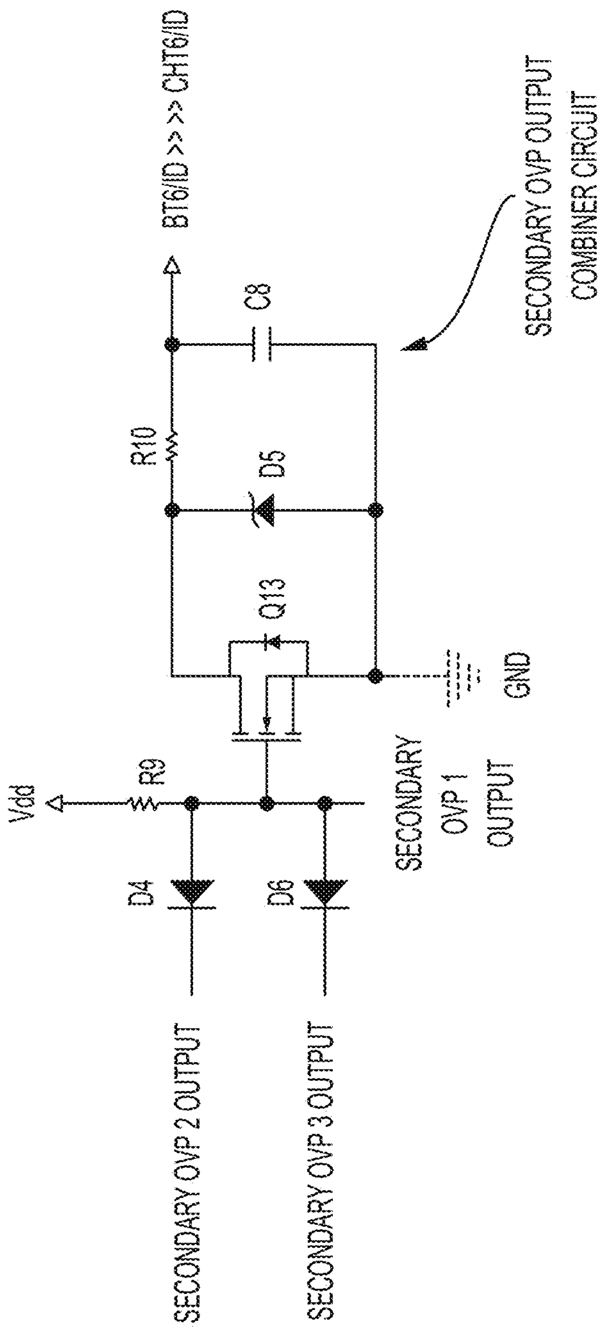

FIG. 120 illustrates a partial circuit diagram of an alternate embodiment of a monitoring circuit of the electronics module of the convertible battery of FIG. 118.

Figure 121A:
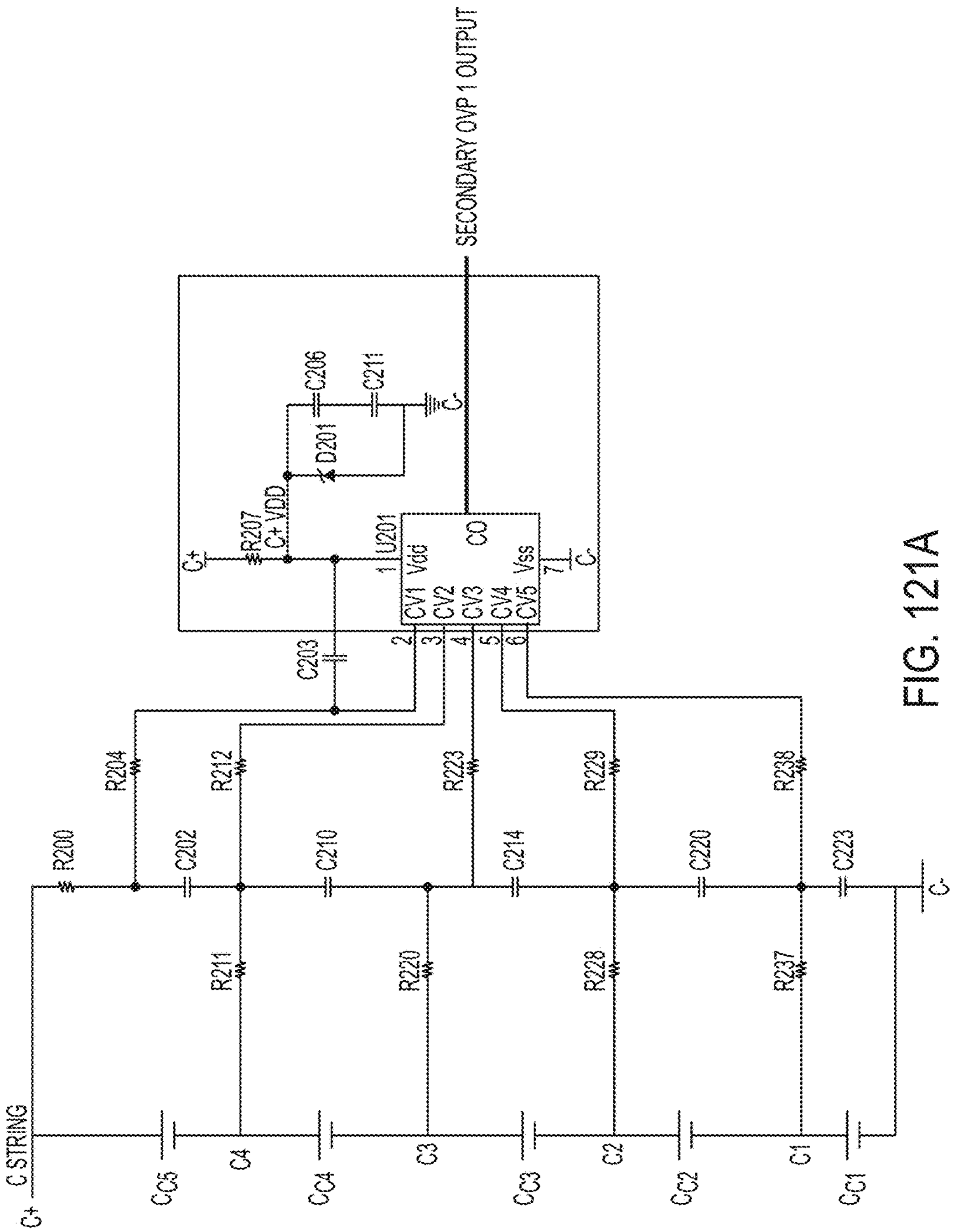
Figure 121B:
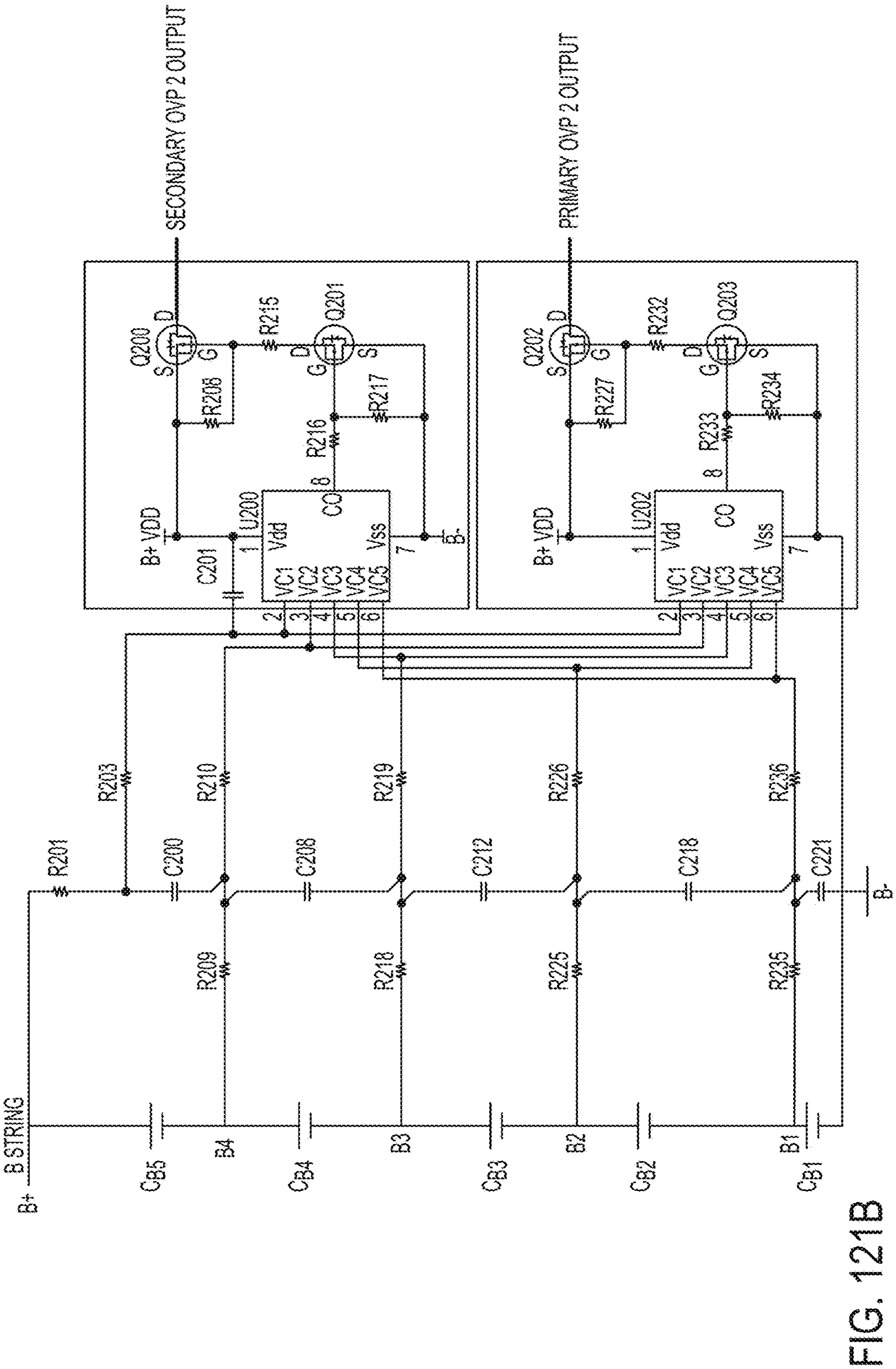
Figure 121C:
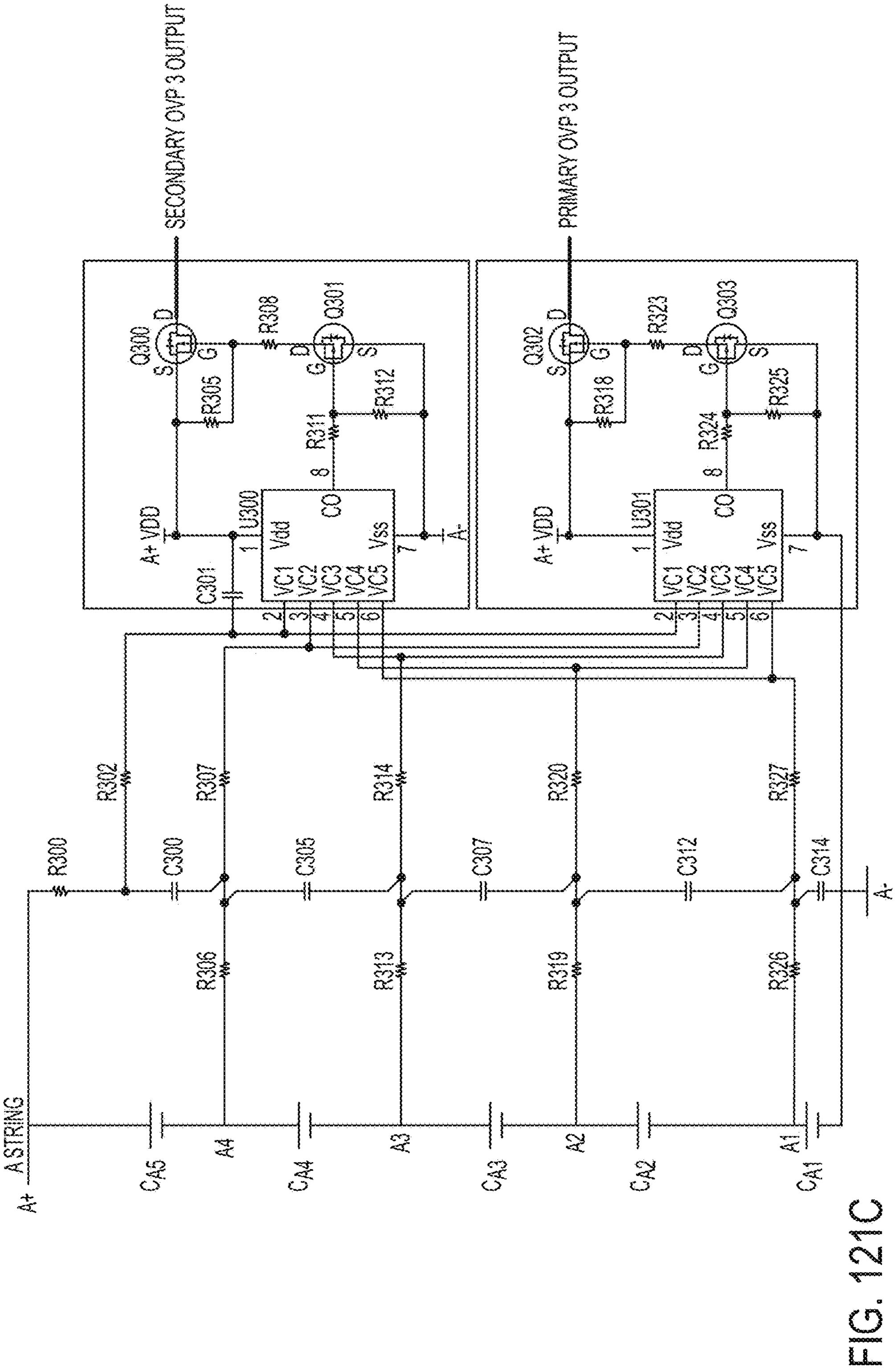

FIGS. 121*a-c* illustrate a partial circuit diagram of an electronics module of an alternate exemplary embodiment of a convertible battery of a convertible battery pack.

Figure 122:
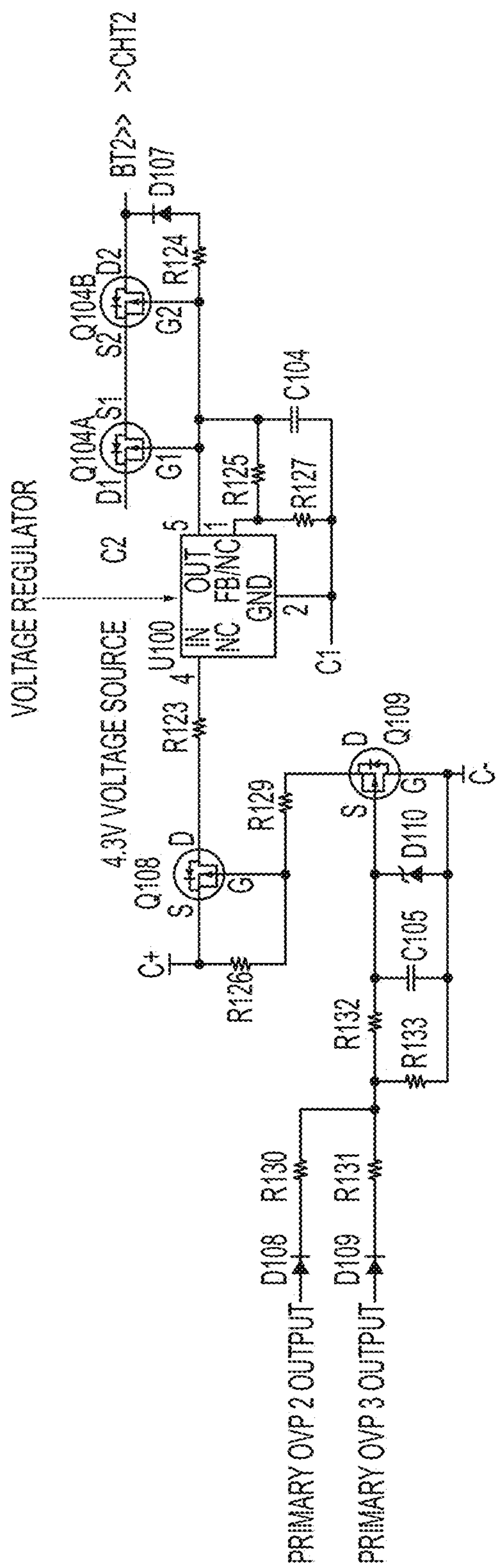

FIG. 122 illustrates a partial circuit diagram of an exemplary embodiment of a monitoring circuit of the electronics module of the convertible battery of FIG. 121.

Figure 123:
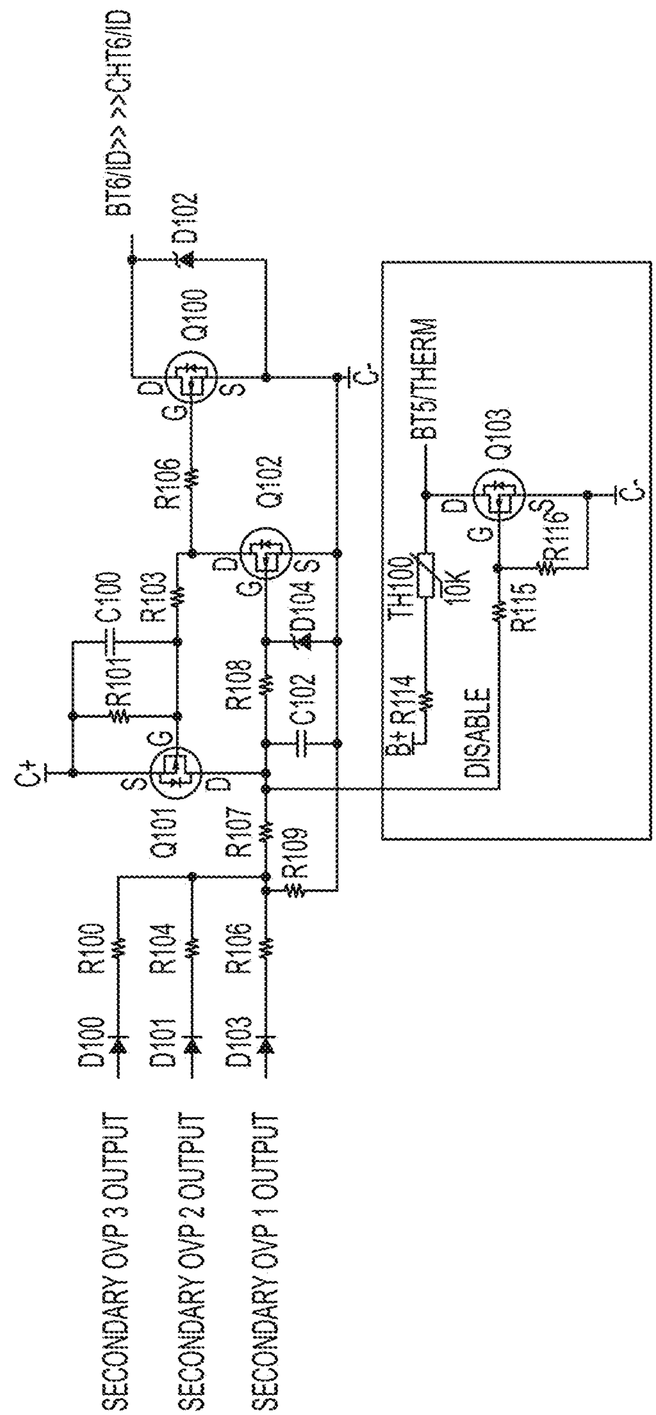

FIG. 123 illustrates a partial circuit diagram of an exemplary embodiment of a monitoring and control circuit of the electronics module of the convertible battery of FIG. 121.

Figure 124A:
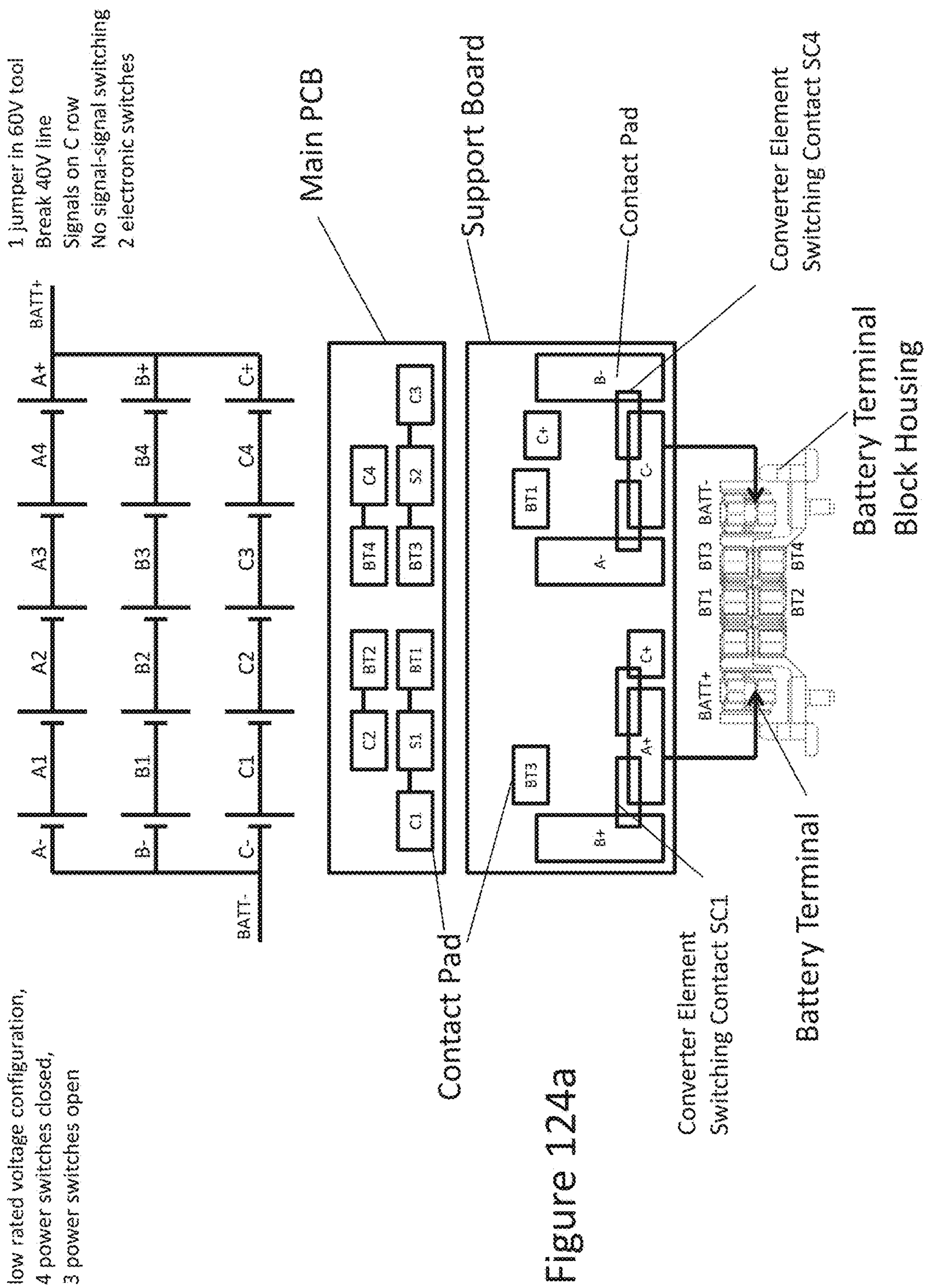
Figure 124B:
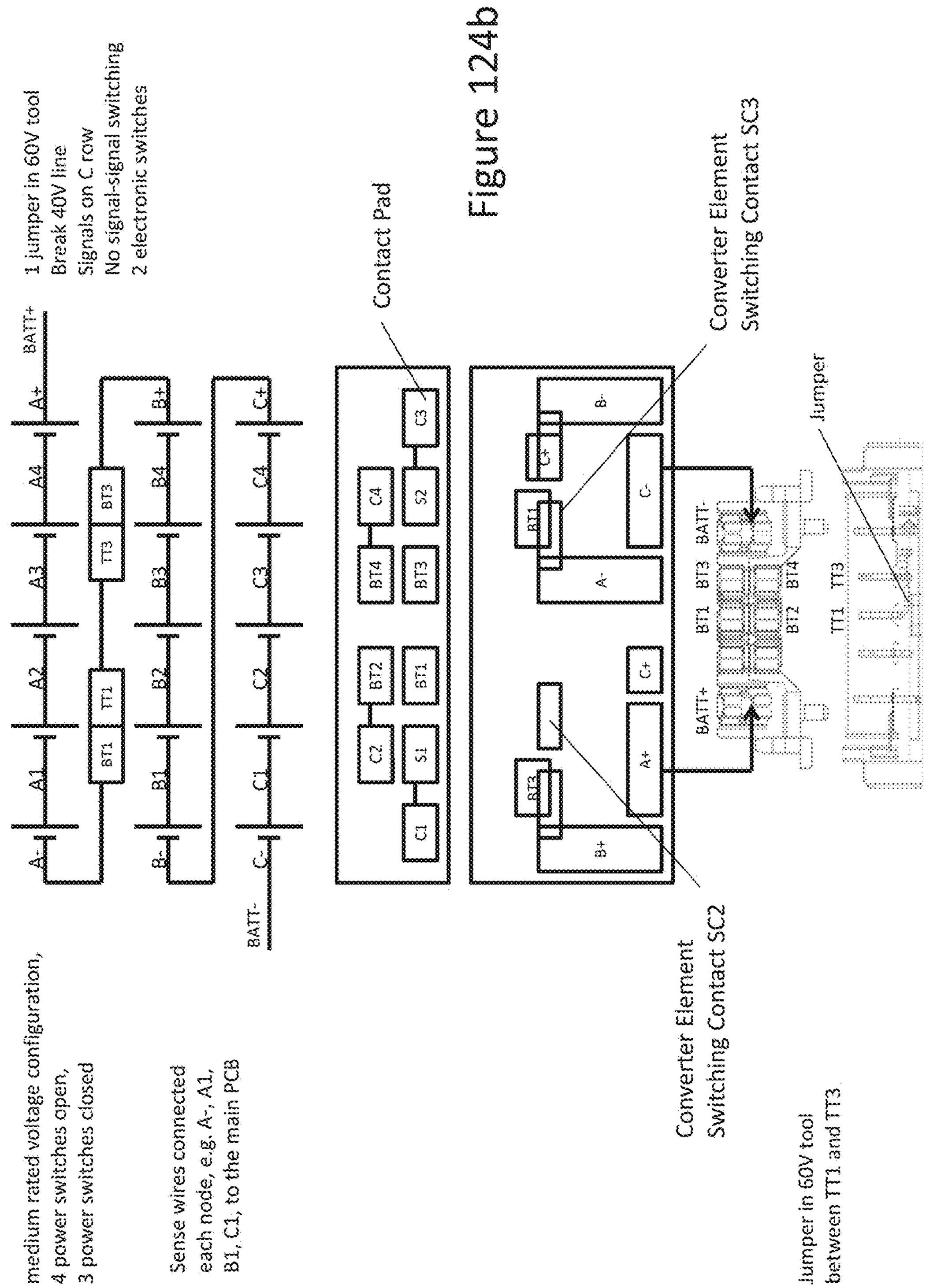

FIGS. 124*a-b* illustrate an exemplary embodiment of a converting subsystem of an exemplary convertible battery pack.

FIG. 124*c* illustrates an exemplary embodiment of a cell switch for a convertible battery pack.

FIG. 125 illustrates a partial circuit diagram of an exemplary embodiment of a cell switch of the present invention.

FIG. 126 illustrates a partial circuit diagram of an alternate exemplary embodiment of a cell switch of the present invention.

Figure 127A:
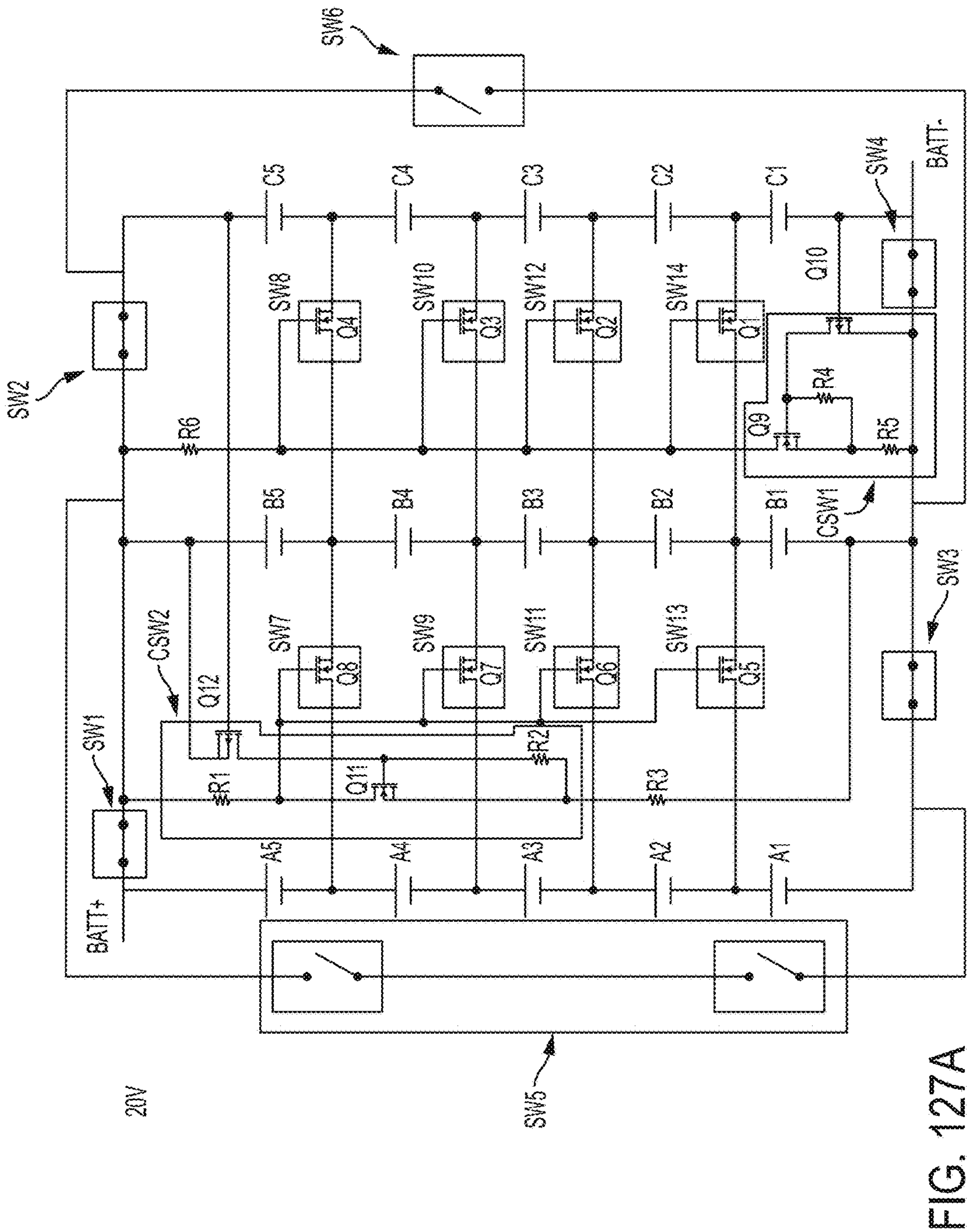
Figure 127B:
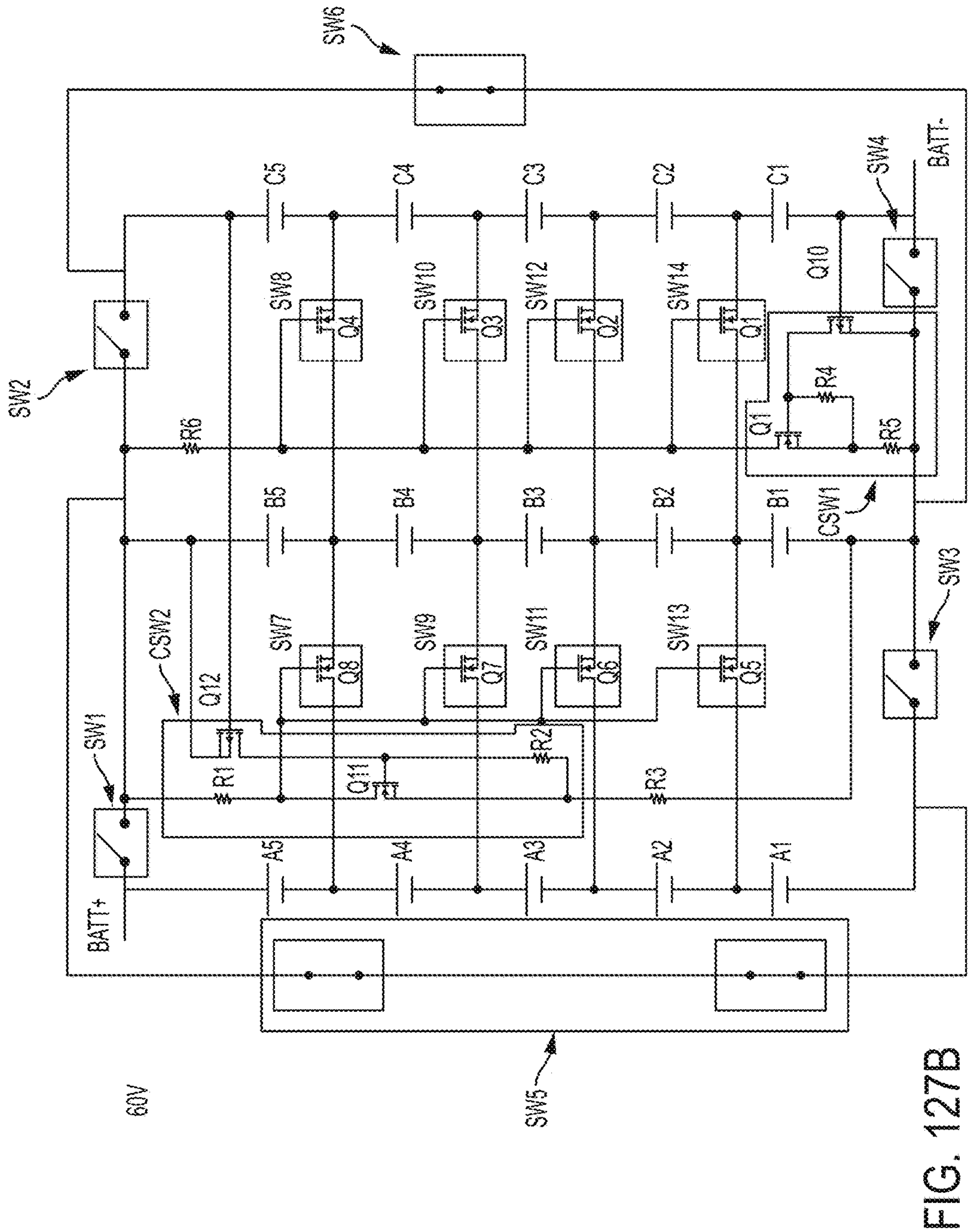

FIG. 127*a* illustrates an exemplary embodiment of a switching network of a convertible battery of a convertible battery pack of the present invention in a first condition and FIG. 127*b* illustrates the exemplary embodiment of FIG. 127*a* in a second condition.

FIG. 128 illustrates a method of charging a battery pack when in a 60V configuration.

Figure 129:
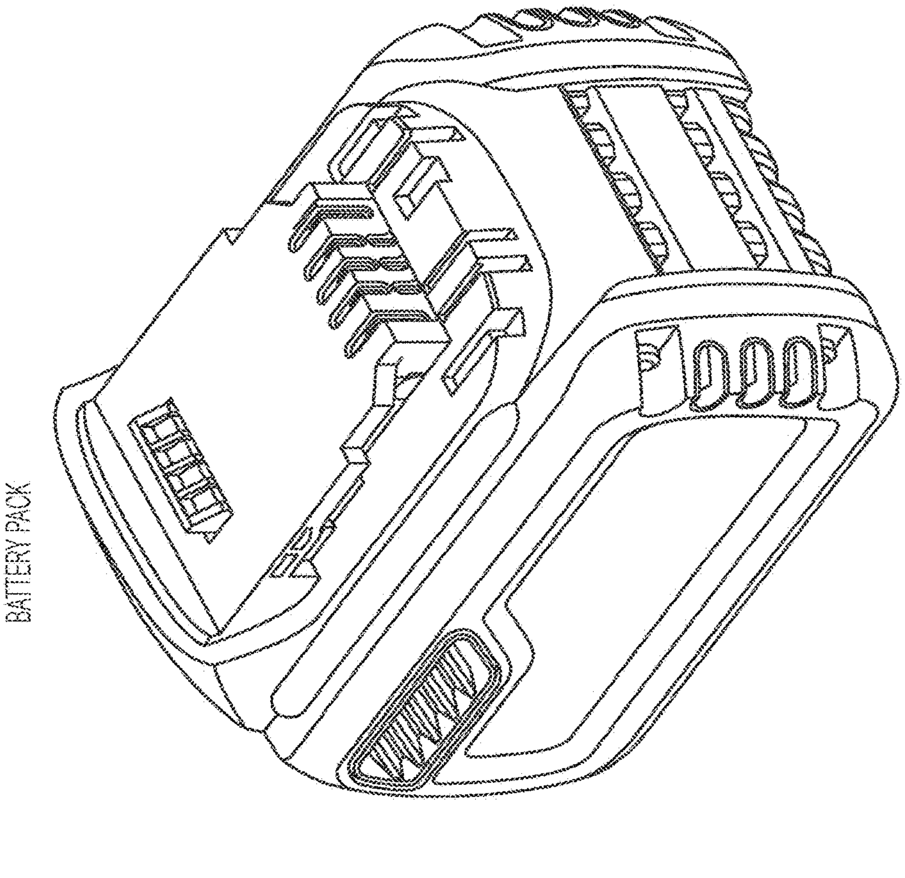

FIG. 129 illustrates an alternate, exemplary embodiment of a convertible battery pack.

Figure 130:
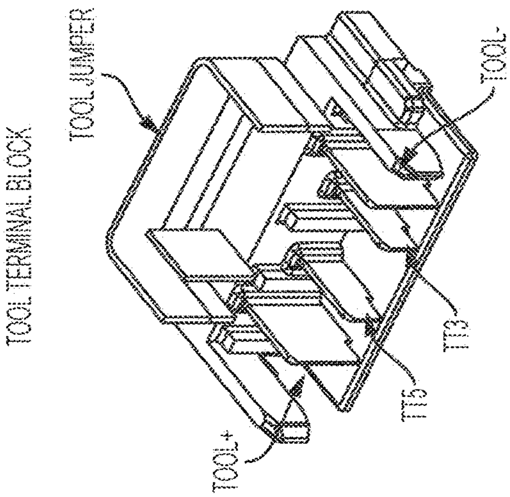

FIG. 130 illustrates an alternate, exemplary embodiment of a terminal block of a medium rated voltage tool configured to mate with the battery pack of FIG. 129.

Figure 131:
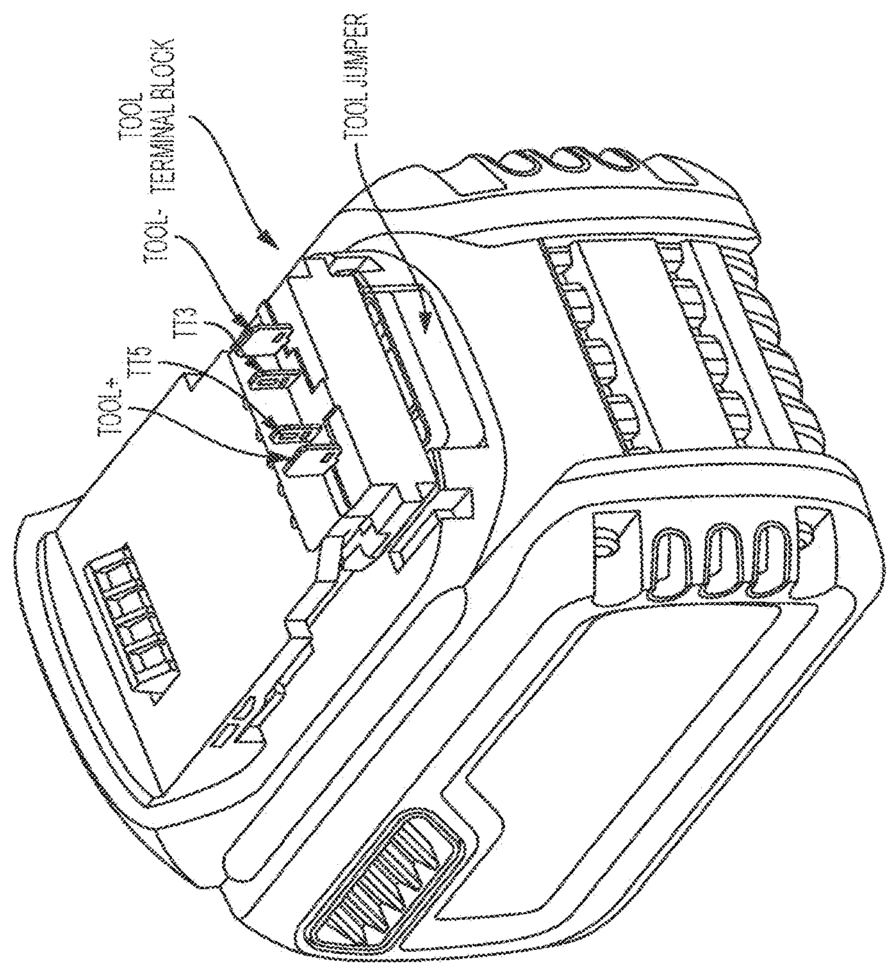

FIG. 131 illustrates the terminal block of FIG. 130 mated with the battery pack of FIG. 129.

Figure 132:
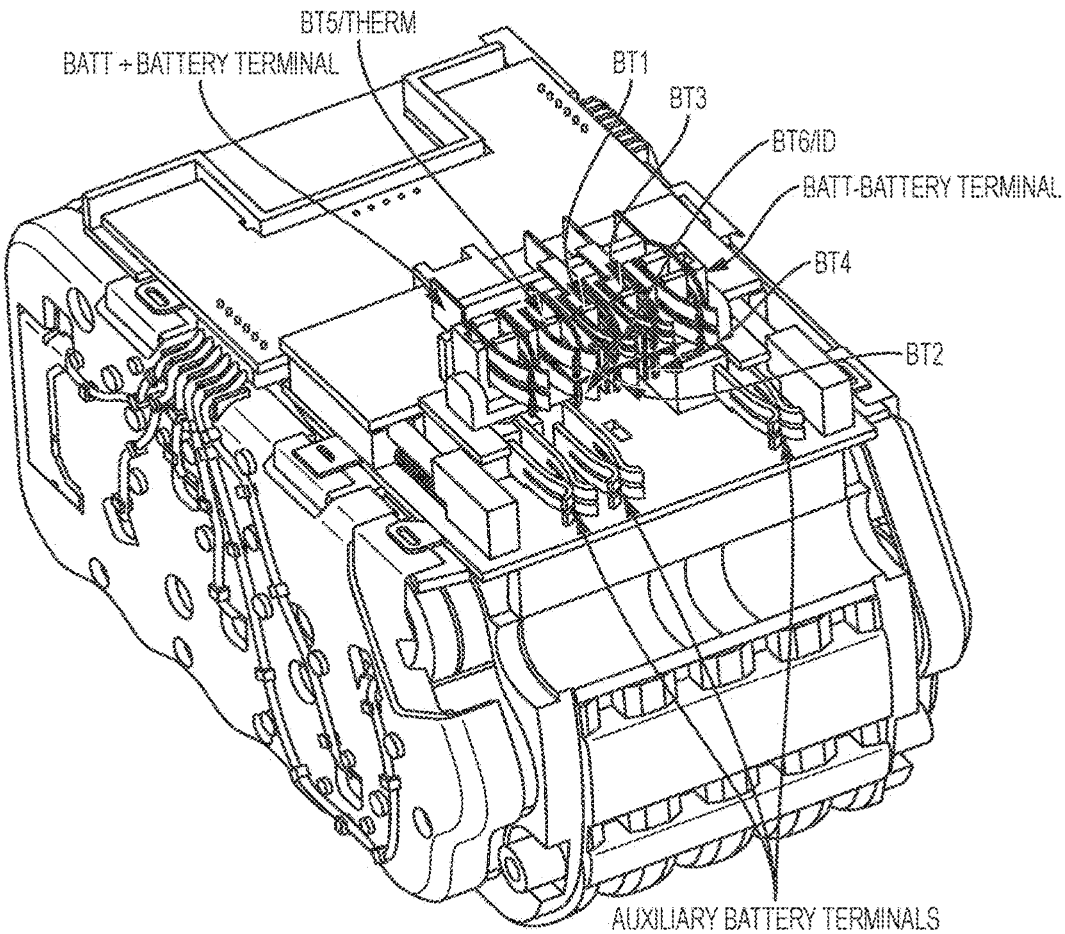

FIG. 132 illustrates an exemplary embodiment of a battery including a terminal block of the convertible battery pack of FIG. 129.

Figure 133B:
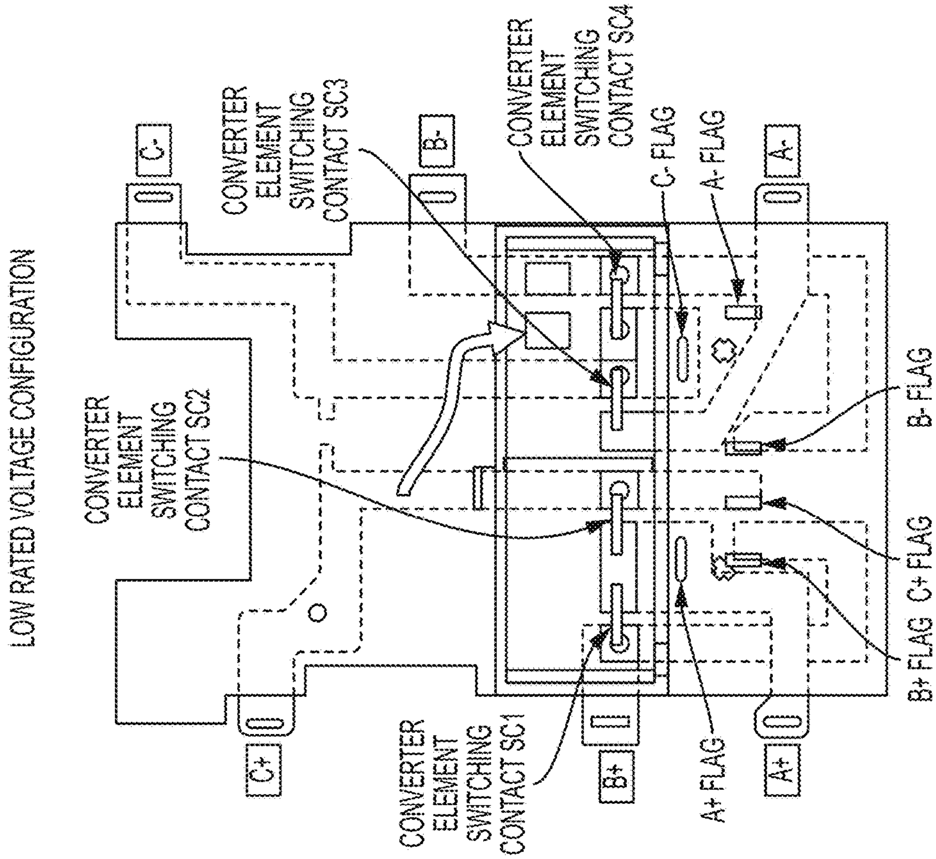
Figure 133A:
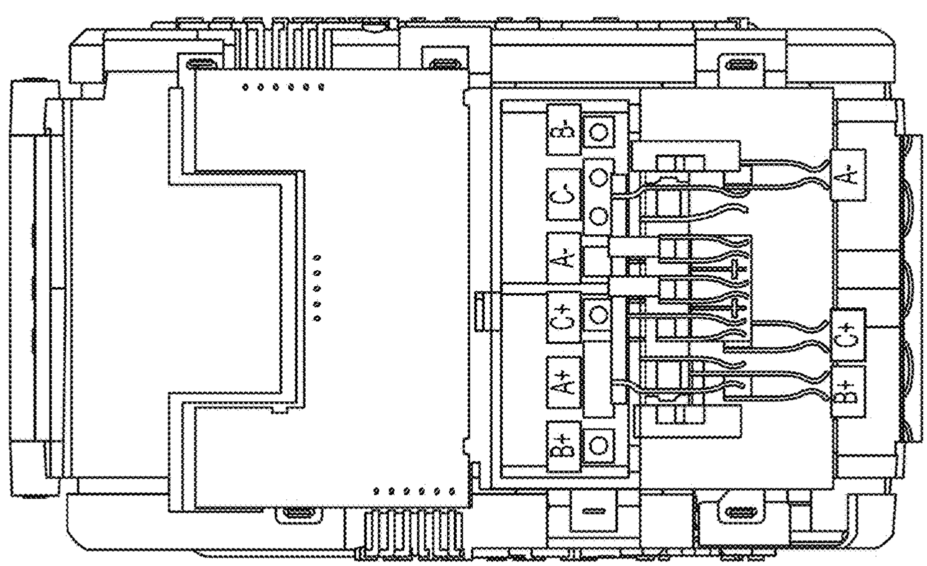

FIG. 133*a* illustrates a top view of the battery of FIG. 132 and FIG. 133*b* illustrates an exemplary embodiment of an electromechanical switching network of the convertible battery of FIG. 132 in the first condition.

Figure 134B:
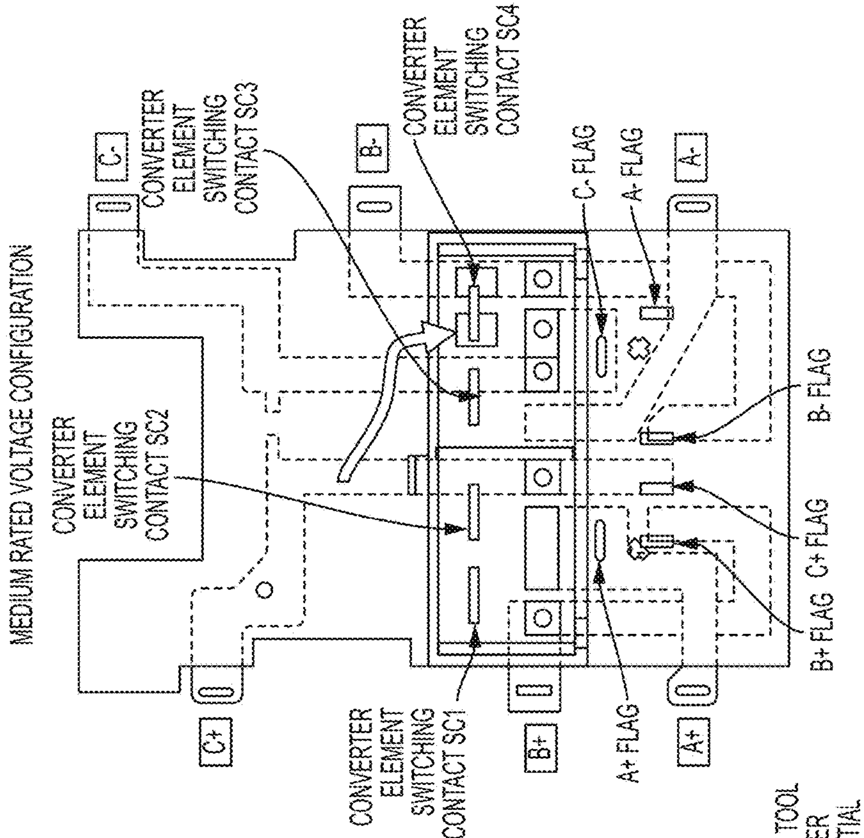
Figure 134A:
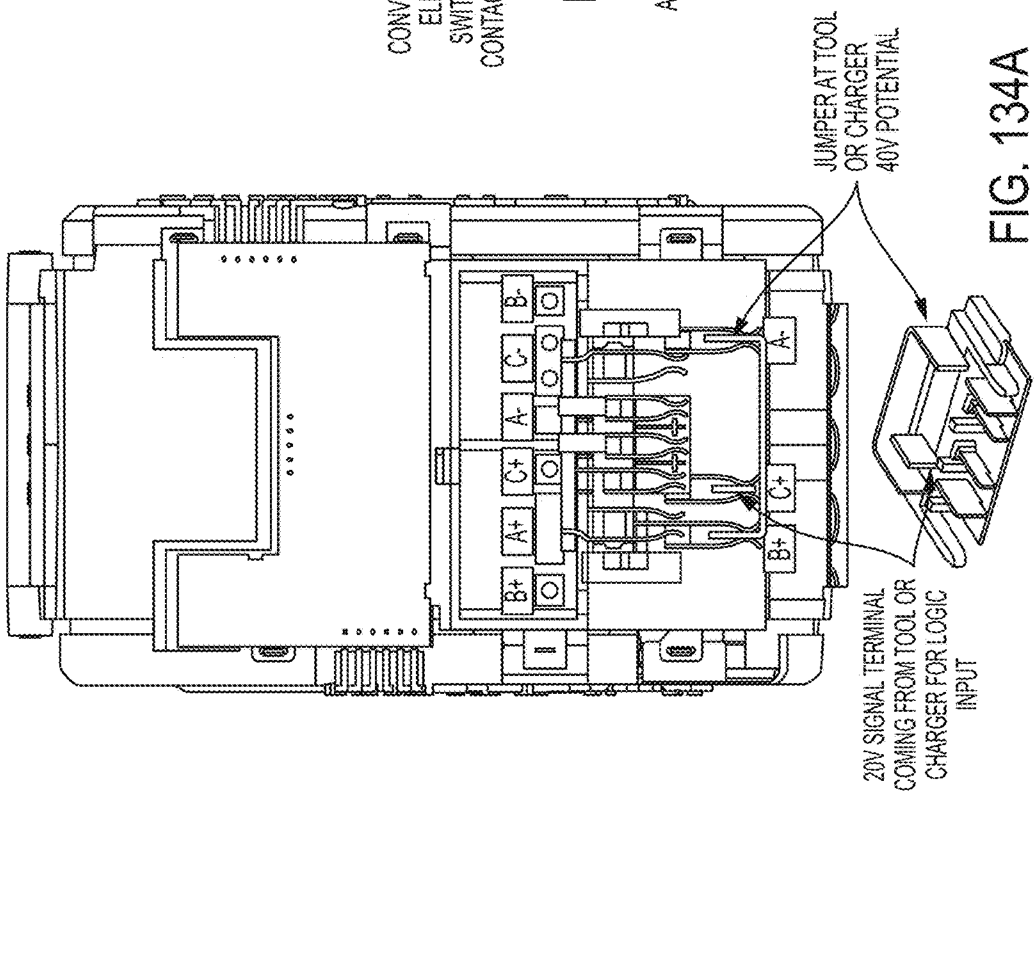

FIG. 134*a* illustrates a top view of the battery of FIG. 132 and FIG. 134*b* illustrates the exemplary embodiment of the electromechanical switching network of the convertible battery of FIG. 132 in the second condition when battery is mated to the power tool.

Figure 135:
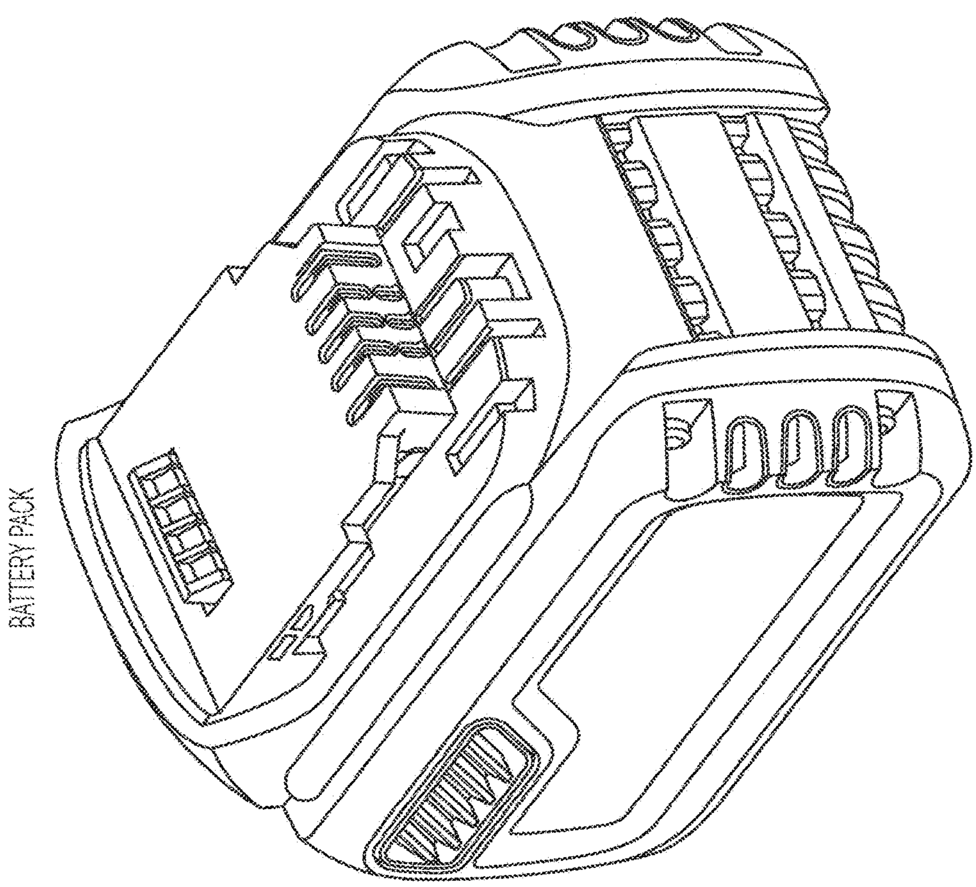

FIG. 135 illustrates another alternate, exemplary embodiment of a convertible battery pack.

Figure 136:
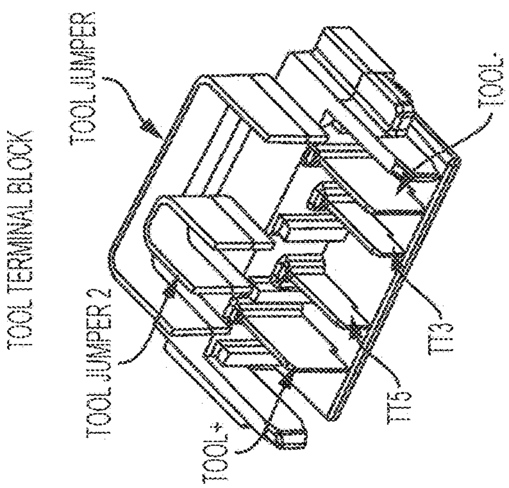

FIG. 136 illustrates another alternate, exemplary embodiment of a terminal block of a medium rated voltage tool configured to mate with the battery pack of FIG. 135.

Figure 137:
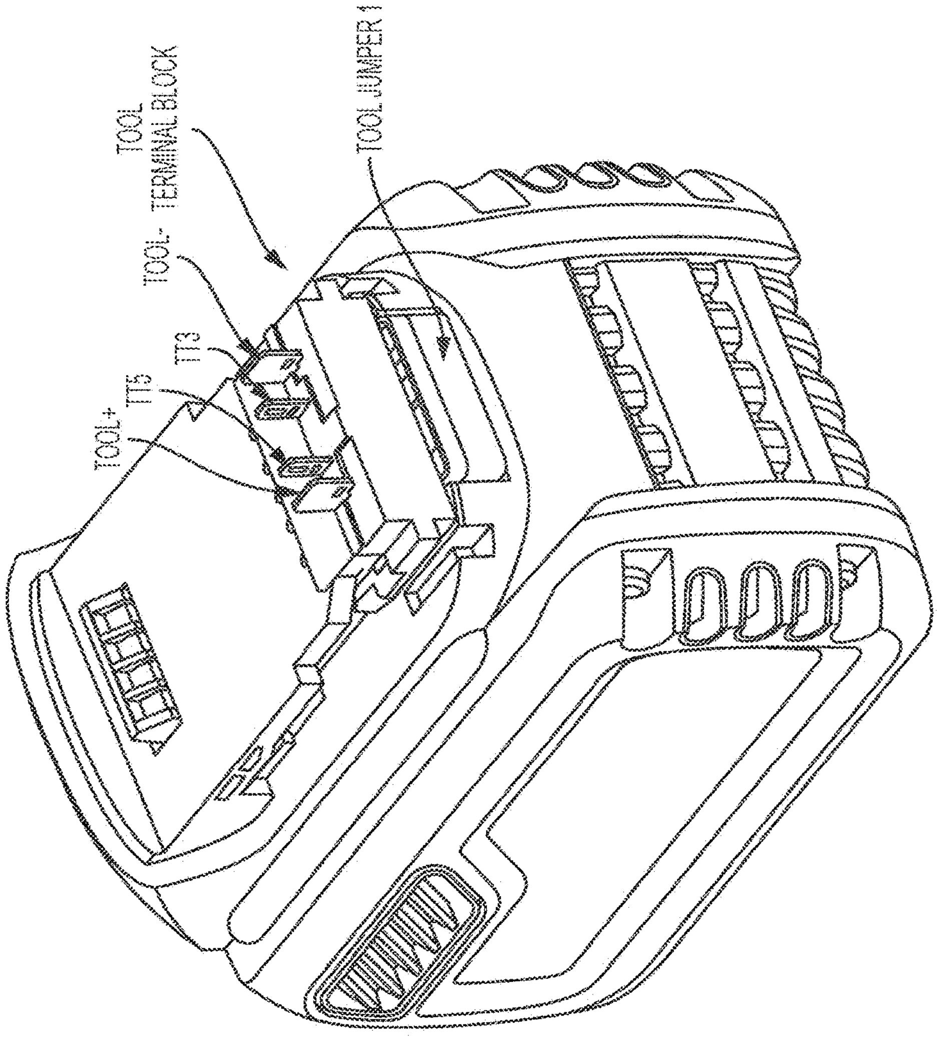

FIG. 137 illustrates the terminal block of FIG. 136 mated with the battery pack of FIG. 135.

Figure 138:
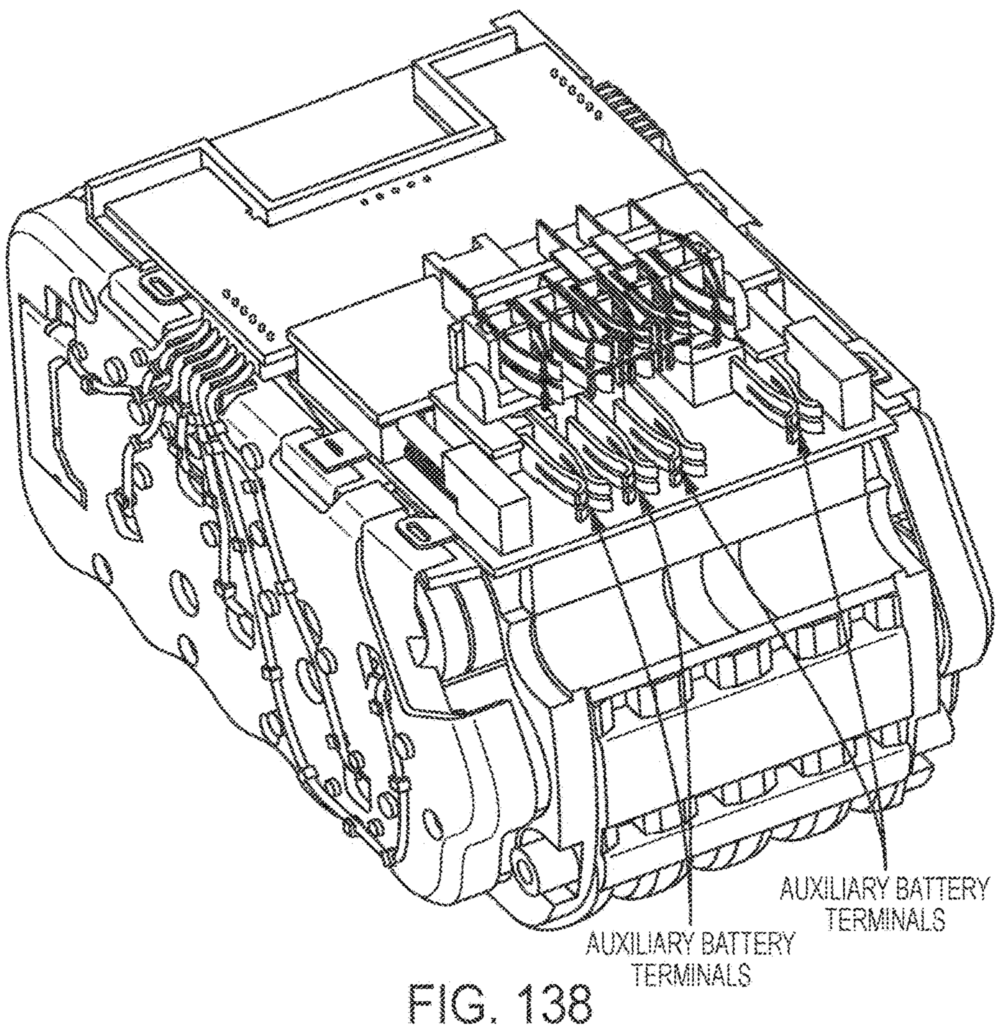

FIG. 138 illustrates an exemplary embodiment of a battery including a terminal block of the convertible battery pack of FIG. 135.

Figure 139A:
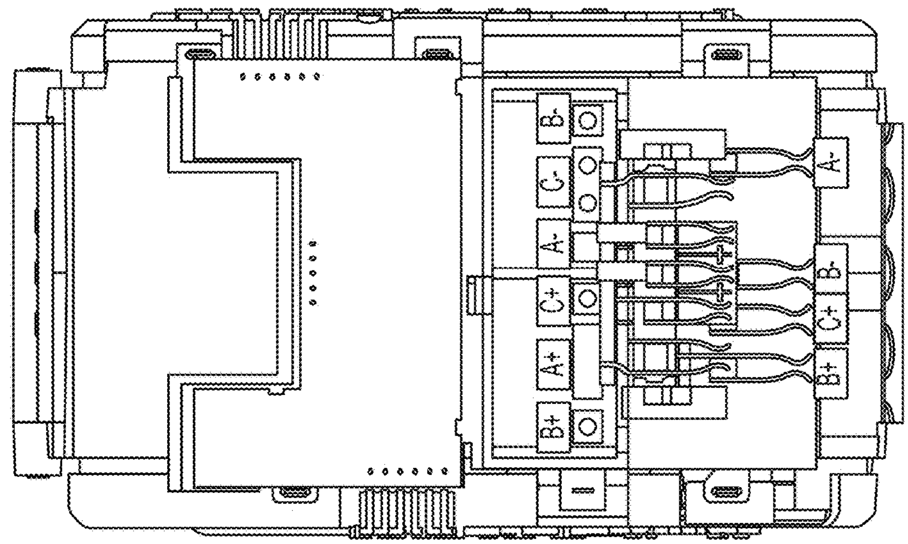
Figure 139B:
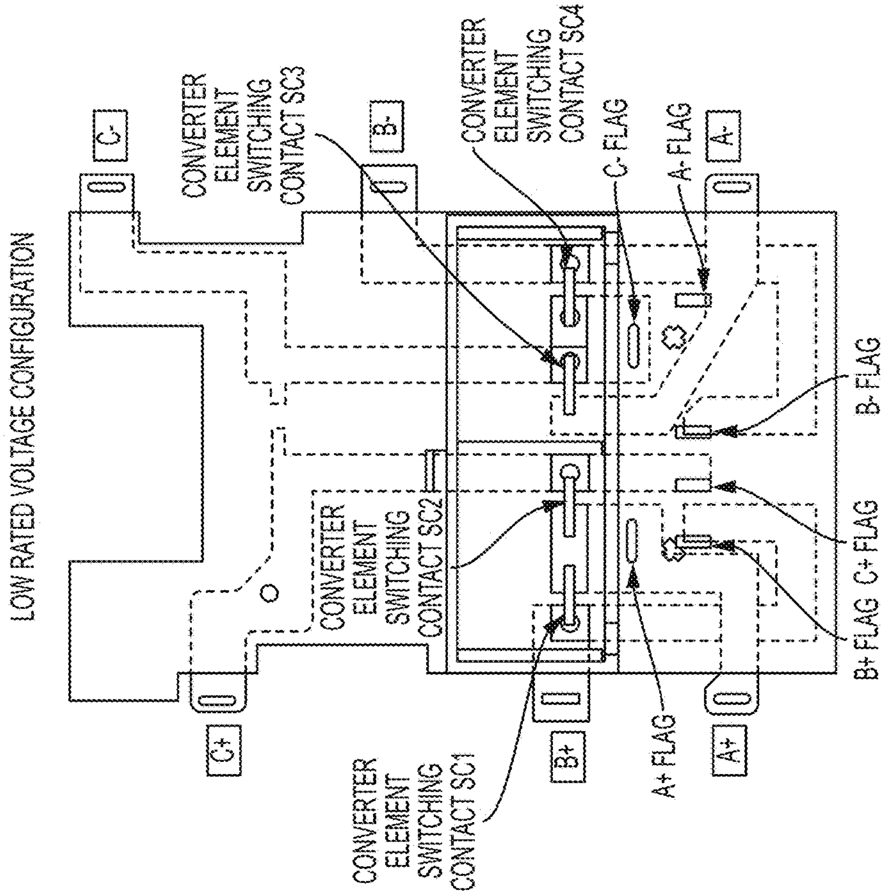

FIG. 139*a* illustrates a top view of the battery of FIG. 138 and FIG. 139*b* illustrates an exemplary embodiment of an electromechanical switching network of the convertible battery of FIG. 138 in the first condition.

Figure 140B:
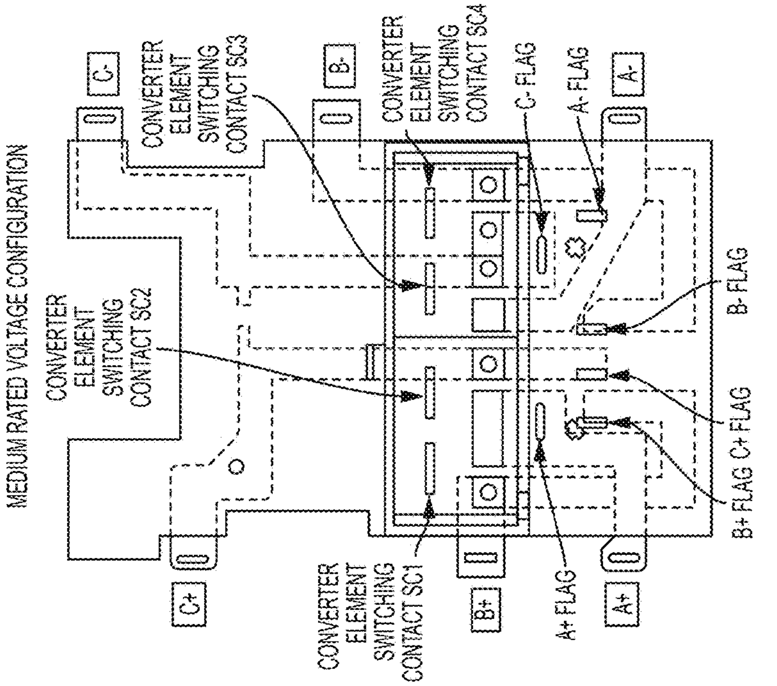
Figure 140A:
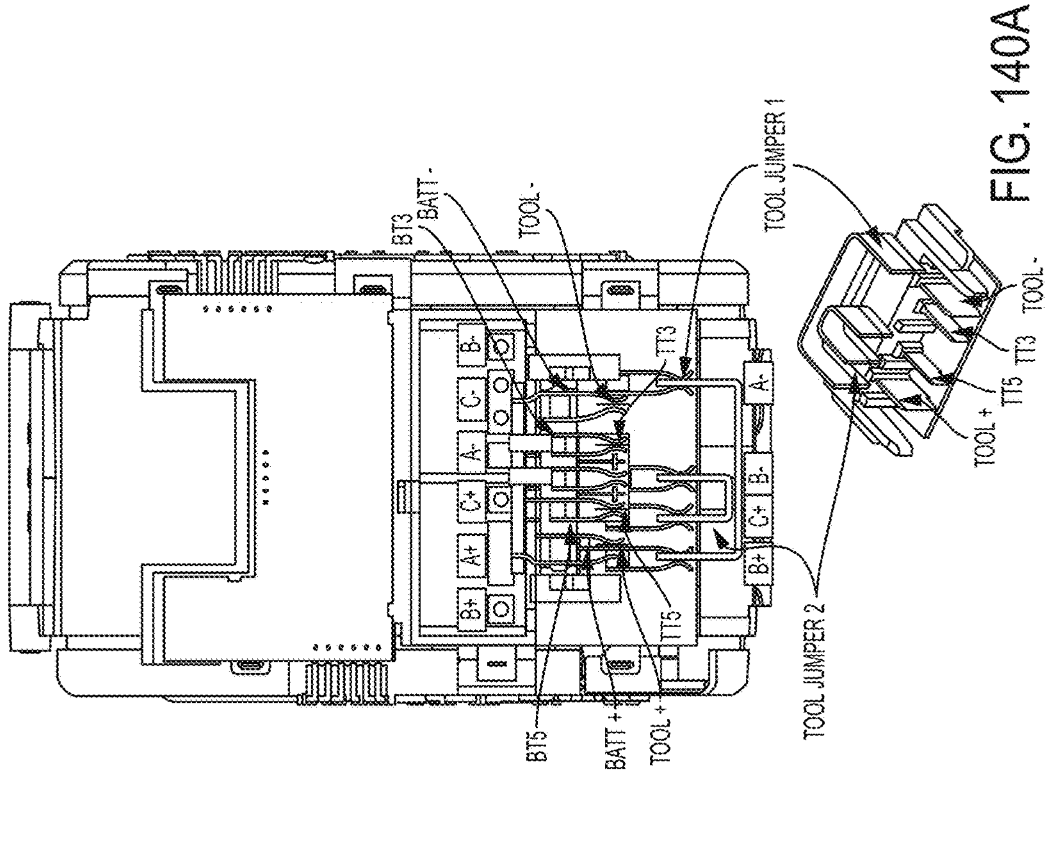

FIG. 140*a* illustrates a top view of the battery of FIG. 138 and FIG. 140*b* illustrates the exemplary embodiment of the electromechanical switching network of the convertible battery of FIG. 138 in the second condition when battery is mated to the power tool.

Figure 141:
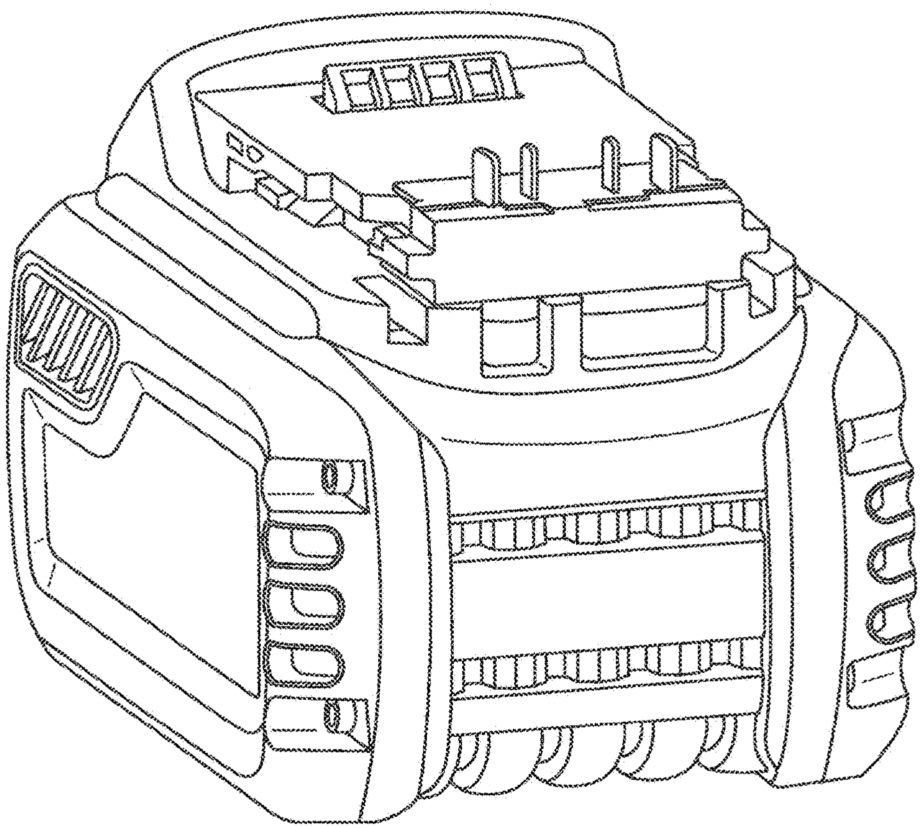

FIG. 141 illustrates another alternate, exemplary embodiment of a convertible battery pack mated with another alternate, exemplary embodiment of a terminal block of a medium rated voltage tool.

Figure 142B:
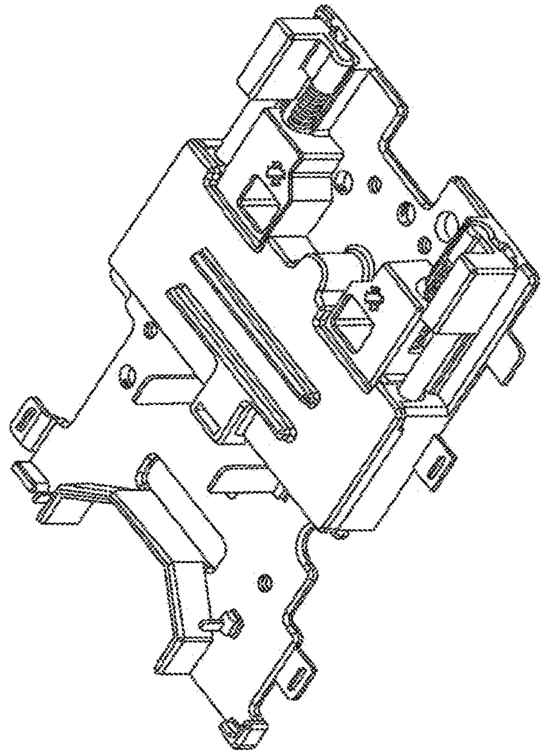
Figure 142A:
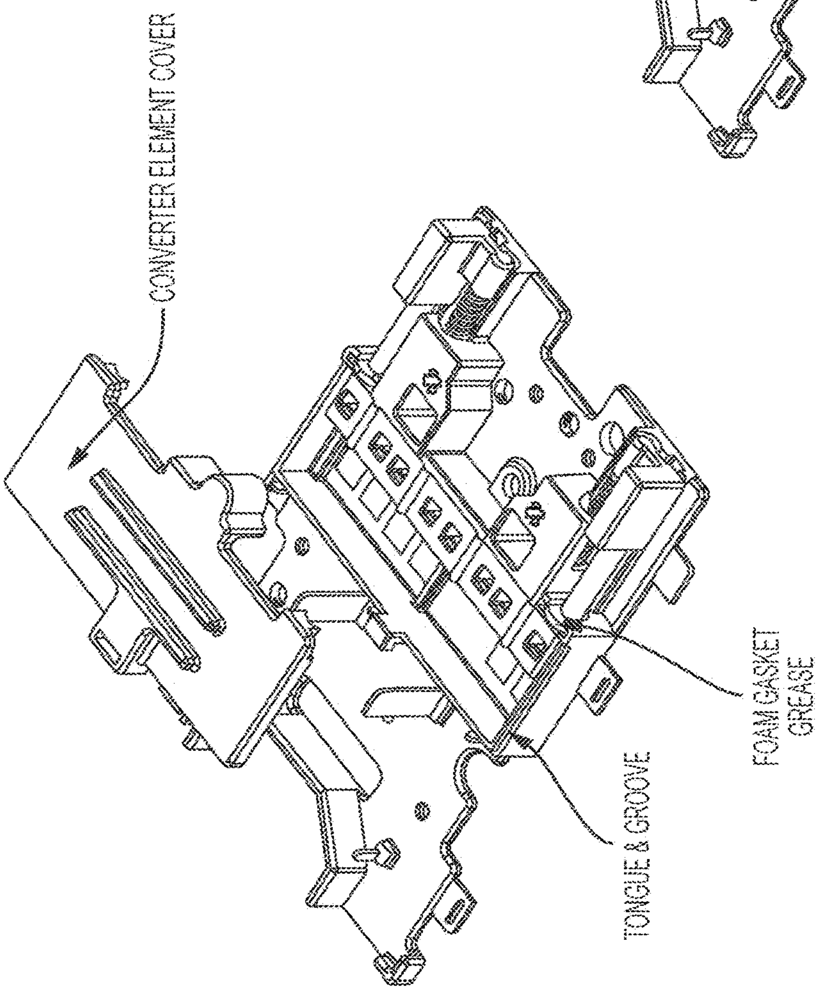

FIG. 142*a* illustrates an exploded view of an exemplary embodiment of a converter element and FIG. 142*b* illustrates the converter element of FIG. 142*a* in place.

DETAILED DESCRIPTION

I. Power Tool System

Figure 1A:
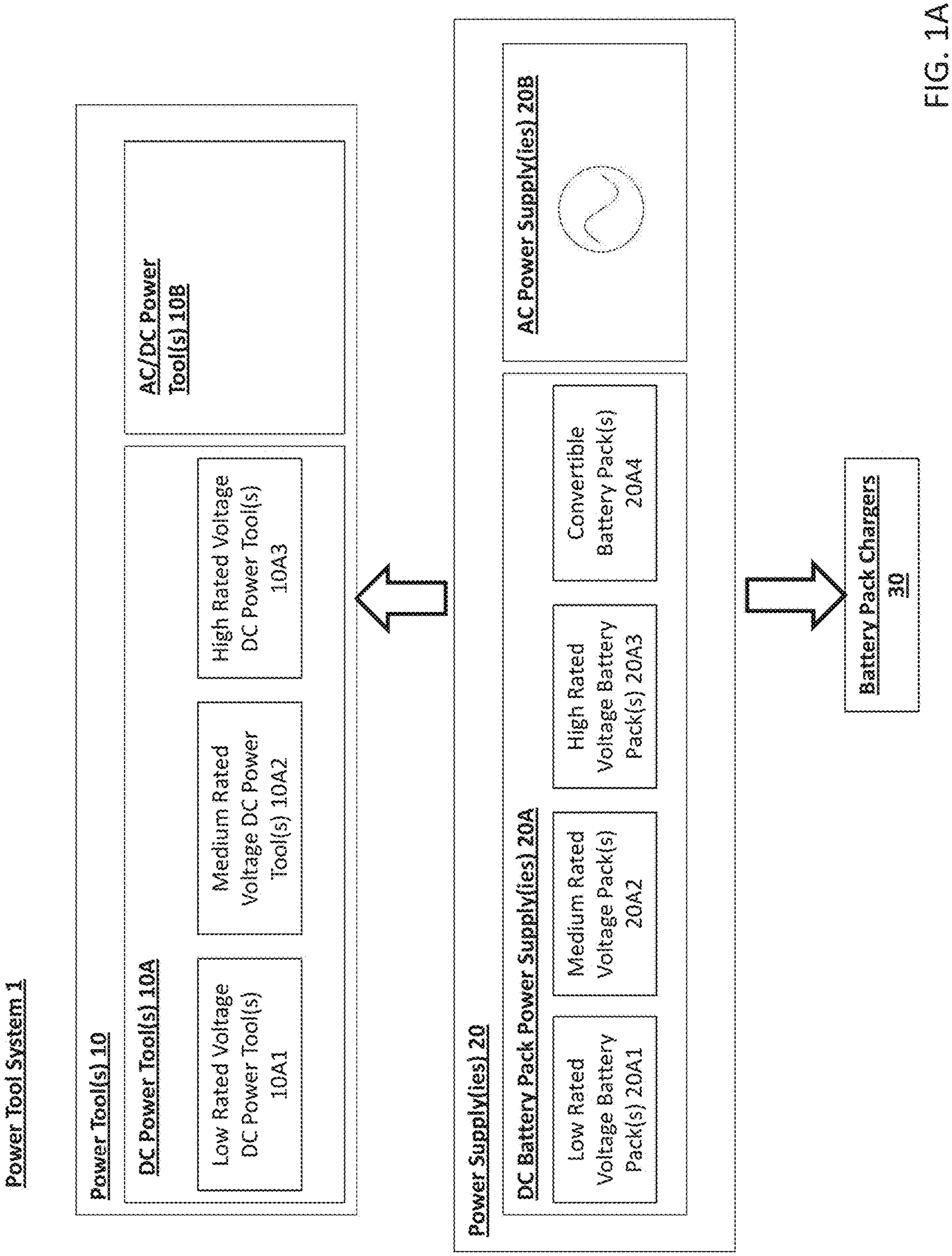
FIG. 1A is a schematic diagram of a power tool system.

Referring to FIG. 1A, in one embodiment, a power tool system 1 includes a set of power tools 10 (which include DC power tools 10A and AC/DC power tools 10B), a set of power supplies 20 (which include DC battery pack power supplies 20A and AC power supplies 20B), and a set of battery pack chargers 30. Each of the power tools, power supplies, and battery pack chargers may be said to have a rated voltage. As used in this application, rated voltage may refer to one or more of the advertised voltage, the operating voltage, the nominal voltage, or the maximum voltage, depending on the context. The rated voltage may also encompass a single voltage, several discrete voltages, or one or more ranges of voltages. As used in the application, rated voltage may refer to any of these types of voltages or a range of any of these types of voltages.

Advertised Voltage.

With respect to power tools, battery packs, and chargers, the advertised voltage generally refers to a voltage that is designated on labels, packaging, user manuals, instructions, advertising, marketing, or other supporting documents for these products by a manufacturer or seller so that a user is informed which power tools, battery packs, and chargers will operate with one another. The advertised voltage may include a numeric voltage value, or another word, phrase, alphanumeric character combination, icon, or logo that indicates to the user which power tools, battery packs, and chargers will work with one another. In some embodiments, as discussed below, a power tool, battery pack, or charger may have a single advertised voltage (e.g., 20V), a range of advertised voltages (e.g., 20V-60V), or a plurality of discrete advertised voltages (e.g., 20V/60V). As discussed further below, a power tool may also be advertised or labeled with a designation that indicates that it will operate with both a DC power supply and an AC power supply (e.g., AC/DC or AC/60V). An AC power supply may also be said to have an advertised voltage, which is the voltage that is generally known in common parlance to be the AC mains voltage in a given country (e.g., 120 VAC in the United States and 220 VAC-240 VAC in Europe).

Operating Voltage.

For a power tool, the operating voltage generally refers to a voltage or a range of voltages of AC and/or DC power supply(ies) with which the power tool, its motor, and its electronic components are designed to operate. For example, a power tool advertised as a 120V AC/DC tool may have an operating voltage range of 92V-132V. The power tool operating voltage may also refer to the aggregate of the operating voltages of a plurality of power supplies that are coupled to the power tool (e.g., a 120V power tool may be operable using two 60V battery packs connected in series). For a battery pack and a charger, the operating voltage refers to the DC voltage or range of DC voltages at which the battery pack or charger is designed to operate. For example, a battery pack or charger advertised as a 20V battery pack or charger may have an operating voltage range of 17V-19V. For an AC power supply, the operating voltage may refer either to the root-mean-square (RMS) of the voltage value of the AC waveform and/or to the average voltage within each positive half-cycle of the AC waveform. For example, a 120 VAC mains power supply may be said to have an RMS operating voltage of 120V and an average positive operating voltage of 108V.

Nominal Voltage.

For a battery pack, the nominal voltage generally refers to the average DC voltage output from the battery pack. For example, a battery pack advertised as a 20V battery pack, with an operating voltage of 17V-19V, may have a nominal voltage of 18V. For an AC power supply, the operating voltage may refer either to the root-mean-square (RMS) of the voltage value of the AC waveform and/or to the average voltage within each positive half-cycle of the AC waveform. For example, a 120 VAC mains power supply may be said to have an RMS nominal voltage of 120V and an average positive nominal voltage of 108V.

Maximum Voltage.

For a battery pack, the maximum voltage may refer to the fully charged voltage of the battery pack. For example, a battery pack advertised as a 20V battery pack may have a maximum fully charged voltage of 20V. For a charger, the maximum voltage may refer to the maximum voltage to which a battery pack can be recharged by the charger. For example, a 20V charger may have a maximum charging voltage of 20V.

It should also be noted that certain components of the power tools, battery packs, and chargers may themselves be said to have a voltage rating, each of which may refer to one or more of the advertised voltage, the operating voltage, the nominal or voltage, or the maximum voltage. The rated voltages for each of these components may encompass a single voltage, several discrete voltages, or one or more ranges of voltages. These voltage ratings may be the same as or different from the rated voltage of power tools, battery packs and chargers. For example, a power tool motor may be said to have its own an operating voltage or range of voltages at which the motor is designed to operate. The motor rated voltage may be the same as or different from the operating voltage or voltage range of the power tool. For example, a power tool having a voltage rating of 60V-120V may have a motor that has an operating voltage of 60V-120V or a motor that has an operating voltage of 90V-100V.

The power tools, power supplies, and chargers also may have ratings for features other than voltage. For example, the power tools may have ratings for motor performance, such as an output power (e.g., maximum watts out (MWO) as described in U.S. Pat. No. 7,497,275, which is incorporated by reference) or motor speed under a given load condition. In another example, the battery packs may have a rated capacity, which refers to the total energy stored in a battery pack. The battery pack rated capacity may depend on the rated capacity of the individual cells and the manner in which the cells are electrically connected.

This application also refers to the ratings for voltage (and other features) using relative terms such as low, medium, high, and very high. The terms low rated, medium rated, high rated, and very high rated are relative terms used to indicate relative relationships between the various ratings of the power tools, battery packs, AC power supplies, chargers, and components thereof, and are not intended to be limited to any particular numerical values or ranges. For example, it should be understood that a low rated voltage is generally lower than a medium rated voltage, which is generally lower than a high rated voltage, which is generally lower than a very high rated voltage. In one particular implementation, the different rated voltages may be whole number multiples or factors of each other. For example, the medium rated voltage may be a whole number multiple of the low rated voltage, and the high rated voltage may be a whole number multiple of the medium rated voltage. For example, the low rated voltage may be 20V, the medium rated voltage may be 60V (3×20V), and the high rated voltage may be 120V (2×60V and 6×20V). In this application, the designation "XY" may sometimes be used as a generic designation for the terms low, medium, high, and very high.

In some instances, a power tool, power supply, or charger may be said to have multiple rated voltages. For example, a power tool or a battery pack may have a low/medium rated voltage or a medium/high rated voltage. As discussed in more detail below, this multiple rating refers to the power tool, power supply, or charger having more than one maximum, nominal or actual voltage, more than one advertised voltage, or being configured to operate with two or more power tools, battery packs, AC power supplies, or chargers, having different rated voltages from each other. For example, a medium/high rated voltage power tool may labeled with a medium and a high voltage, and may be configured to operate with a medium rated voltage battery pack or a high rated voltage AC power supply. It should be understood that a multiply rated voltage may mean that the rated voltage comprises a range that spans two different rated voltages or that the rated voltage has two discrete different rated values.

This application also sometimes refers to a first one of a power tool, power supply, charger, or components thereof as having a first rated voltage that corresponds to, matches, or is equivalent to a second rated voltage of a second one of a power tool, power supply, charger, or components thereof. This comparison generally refers to the first rated voltage having one or more value(s) or range(s) of values that are substantially equal to, overlap with, or fall within one or more value(s) or range(s) of values of the second rated voltage, or that the first one of the power tool, power supply, charger, or components, is configured to operate with the second one of the power tool, power supply, charger, or components thereof. For example, an AC/DC power tool having a rated voltage of 120V (advertised) or 90V-132V (operating) may correspond to a pair of battery packs having a total rated voltage of 120V (advertised and maximum), 108V (nominal) or 102V-120V (operating), and to several AC power supplies having a rated voltages ranging from of 100 VAC-120 VAC.

Conversely, this application sometimes refers to a first one of a power tool, power supply, charger, or components thereof as having a first rated voltage that does not correspond to, that is different from, or that is not equivalent to a second rated voltage of a second one of a power tool, power supply, charger, or components thereof. These comparisons generally refer to the first rated voltage having one or more value(s) or range(s) of values that are not equal to, do not overlap with, or fall outside one or more value(s) or range(s) of values of the second rated voltage, or that the first one of the power tool, power supply, charger, or components thereof are not configured to operate with the second one of the power tool, power supply, chargers, or components thereof. For example, an AC/DC power tool having the rated voltage of 120V (advertised) or 90V-132V (operating) may not correspond to a battery packs having a total rated voltage of 60V (advertised and maximum), 54V (nominal) or 51V-60V (operating), or to AC power supplies having a rated voltages ranging from of 220 VAC-240 VAC.

Referring again to FIG. 1A, the power tools 10 include a set of cordless-only or DC power tools 10A and a set of corded/cordless or AC/DC power tools 10B. The set of DC power tools 10A may include a set of low rated voltage DC power tools 10A1 (e.g., under 40V, such as 4V, 8V, 12V, 18V, 20V, 24V and/or 36V), a set of medium rated voltage DC power tools 10A2 (e.g., 40V to 80V, such as 40V, 54V, 60V, 72V, and/or 80V), and a set of high rated voltage DC power tools 10A3 (e.g., 100V to 240V, such as 100V, 110V, 120V, 220V, 230V and/or 240V). It may also be said that the high rated voltage DC power tools include a subset of high rated voltage DC power tools (e.g., 100V to 120V, such as 100V, 110V, or 120V for, e.g., the United States, Canada, Mexico, and Japan) and a subset of very high rated voltage DC power tools (e.g., 220V to 240V, such as 220V, 230V, or 240V for, e.g., most countries in Europe, South America, Africa, and Asia). For convenience, the high rated and very high rated voltage DC power tools are referred to collectively as a set of high rated voltage DC power tools 10A3.

The AC/DC power tools 10B generally have a rated voltage that corresponds to the rated voltage for an AC mains supply in the countries in which the tool will operate or is sold (e.g., 100V to 120V, such as 100V, 110V, or 120V in countries such as the United States, Canada, Mexico, and Japan, and 220V to 240V, such as 220V, 230V and/or 240V in most countries in Europe, South America, Asia and Africa). In some instances, these high rated voltage AC/DC power tools 10B are alternatively referred to as AC-rated AC/DC power tools, where AC rated refers to the fact that the high voltage rating of the AC/DC power tools correspond to the voltage rating of the AC mains power supply in a country where the power tool is operable and/or sold. For convenience, the high rated and very high rated voltage AC/DC power tools are referred to collectively as a set of high rated voltage AC/DC power tools 10B.

A. Power Supplies

The set of power supplies 20 may include a set of DC battery pack power supplies 20A and a set of AC power supplies 20B. The set of DC battery pack power supplies 20A may include one or more of the following: a set of low rated voltage battery packs 20A1 (e.g., under 40V, such as 4V, 8V, 12V, 18V, 20V, 24V and/or 36V), a set of medium rated voltage battery packs 20A2 (e.g., 40V to 80V, such as 40V, 54V, 60V, 72V and/or 80V), a set of high rated voltage battery packs 20A3 (e.g., 100V to 120V and 220V to 240V, such as 100V, 110V, 120V, 220V, 230V and/or 240V), and a set of convertible voltage range battery packs 20A4 (discussed in greater detail below). The AC power supplies 20B may include power supplies that have a high voltage rating that correspond to the voltage rating of an AC power supply in the countries in which the tool is operable and/or sold (e.g., 100V to 120V, such as 100V, 110V, or 120V, in countries such as the United States, Canada, Mexico, and Japan, and 220V to 240V, such as 220V, 230V and/or 240V in most countries in Europe, South America, Asia and Africa). The AC power supplies may comprise an AC mains power supply or an alternative power supply with a similar rated voltage, such as an AC generator or another portable AC power supply.

One or more of the DC battery pack power supplies 20A are configured to power one or more of the set of low rated voltage DC power tools 10A1, the set of medium rated voltage DC power tools 10A2, and the set of high rated voltage DC power tools 10A3, as described further below. The AC/DC power tools 10B may be powered by one or more of the DC battery pack power supplies 20A or by one or more of the AC power supplies 20B. FIGS. 111-114 illustrate an exemplary embodiment of an AC/DC power tool interface 22B for providing AC power from the AC power supply 20B to the AC/DC power tool 10B. The AC/DC power tool interface 22B includes a housing 23 and a cord 25 including a two or three pronged plug (not shown) at a first end and a coupled to the housing 23 at a second end. The housing 23 includes a pair of DC power tool interfaces 27 that are substantially equivalent in shape and size as the DC power tool interface 22A of the DC battery pack power supply 20A. The housing 23 also includes a three pronged receptacle 29 (or alternatively a two pronged receptacle) positioned between the pair of DC power tool interfaces 27. The illustrated AC/DC power tool interface 22B of the AC power supply 20B is received in an exemplary power supply interface 16 of an AC/DC power tool illustrated and described below in FIGS. 114 and 115. As illustrated in FIG. 113, the AC/DC power tool interface 22B may include a circuit 31 for receiving "dirty" AC signals from certain AC power supplies, for example, gas powered generators. The set of battery pack chargers 30 includes one or more battery pack chargers 30 configured to charge one or more of the DC battery pack power supplies 20A. Below is a more detailed description of the power supplies 20, the battery pack chargers 30, and the power tools 10.

1. DC Battery Pack Power Supplies

Referring to FIG. 1, as noted above, the DC battery pack power supplies 20A include a set of low rated voltage battery packs 20A1, a set of medium rated voltage battery packs 20A2, a set of high rated voltage battery packs 20A3, and a set of convertible battery packs 20A4. Each battery pack may include a housing, a plurality of cells, and a power tool interface that is configured to couple the battery pack to a power tool or to a charger. Each cell has a rated voltage, usually expressed in volts (V), and a rated capacity (referring to the energy stored in a cell), usually expressed in amp-hours (Ah). As is well known by those of ordinary skill in the art, when cells in a battery pack are connected to each other in series the voltage of the cells is additive. When the cells are connected to each other in parallel the capacity of the cells is additive. The battery pack may include several strings of cells. Within each string, the cells may be connected to each other in series, and each string may be connected to the other cells in parallel. The arrangement, voltage and capacity of the cells and the cell strings determine the overall rated voltage and rated capacity of the battery pack. Within each set of DC battery pack power supplies 20A, there may be battery packs having the same voltage but multiple different rated capacities, for example, 1.5 Amp-Hours (Ah), 2 Ah, 3 Ah, or 4 Ah.

Figure 2C:
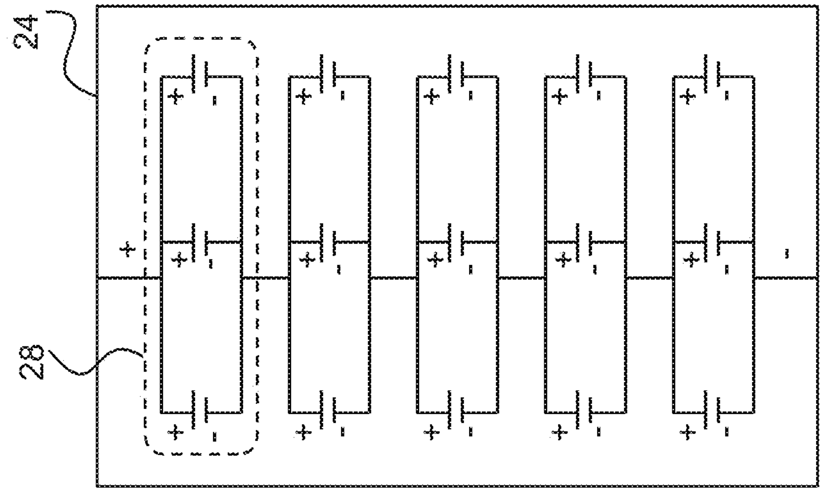
FIGS. 2A-2C are exemplary simplified circuit diagrams of battery cell configurations of a battery.
Figure 2B:
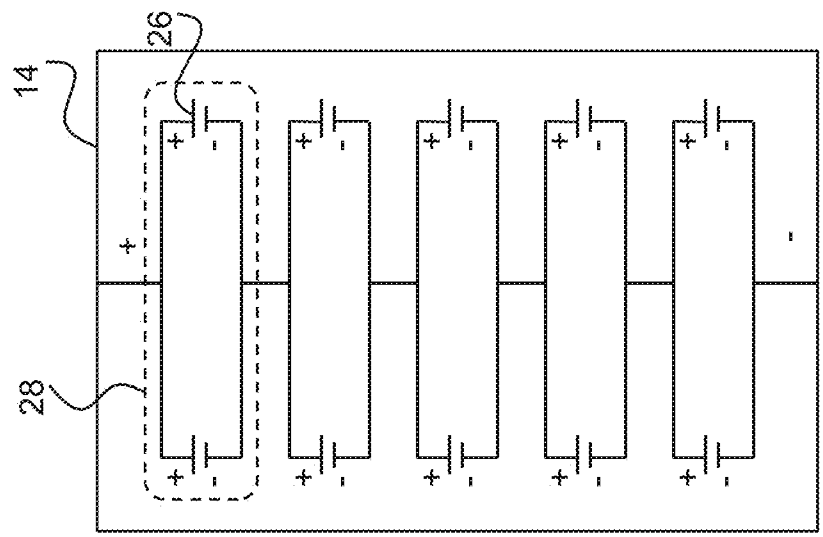
Figure 2A:
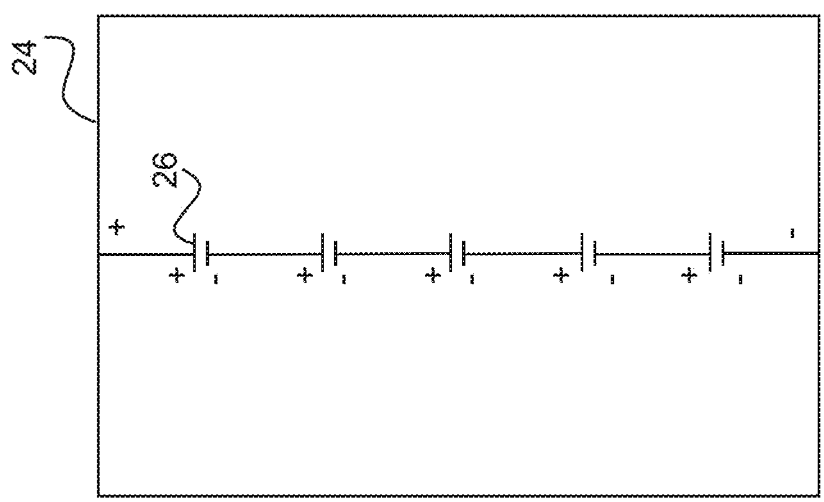

FIGS. 2A-2C illustrate exemplary battery cell configurations for a battery 24 that is part of the set of DC battery pack power supplies 20A. These examples are not intended to limit the possible cell configurations of the batteries 24 in each set of DC battery pack power supplies 20A. FIG. 2A illustrates a battery 24 having five battery cells 26 connected in series. In this example, if each of the cells 26 has a rated voltage of 4V and a rated capacity of 1.5 Ah this battery 24 would have a rated voltage of 20V and a rated capacity of 1.5 Ah. FIG. 2B illustrates a battery 24 having ten cells. The battery 24 includes five subsets 28 of cells 26 with each subset 28 including two cells 26. The cells 26 of each subset 28 are connected in parallel and the subsets 28 are connected in series. In this example, if each of the cells 26 has a rated voltage of 4V and a rated capacity of 1.5 Ah this battery 24 would have a rated voltage of 20V and a rated capacity of 3 Ah. FIG. 2C illustrates a battery 24 having fifteen cells 120. The battery 24 includes five subsets 28 of cells 26 with each subset 28 including three cells 26. The cells 26 of each subset 28 are connected in parallel and the subsets 28 are connected in series. In this example, if each of the cells 26 has a rated voltage of 4V and a rated capacity of 1.5 Ah this battery 24 would have a rated voltage of 20V and a rated capacity of 4.5 Ah.

a. Low Rated Voltage Battery Packs

Figure 3A:
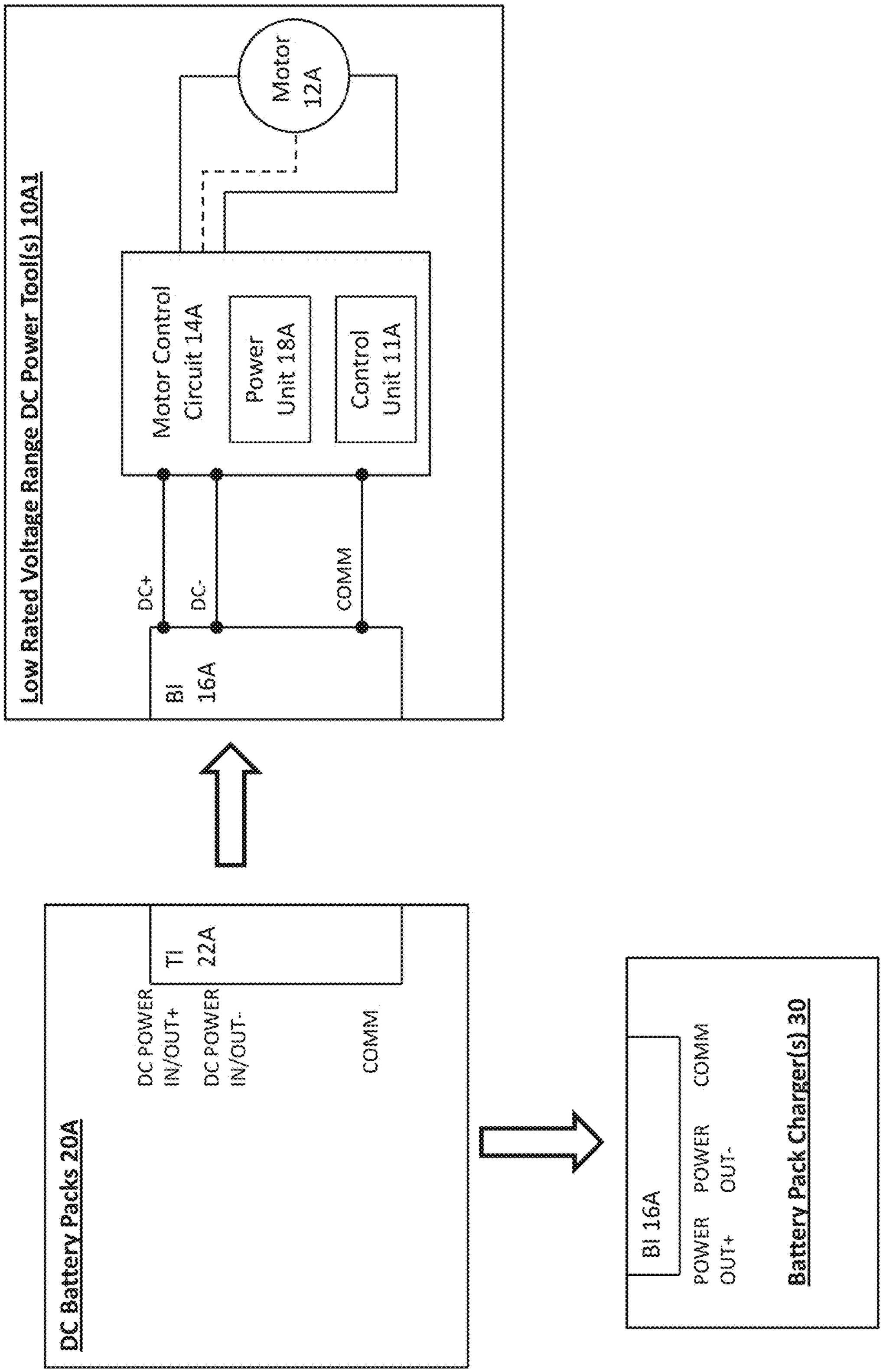
FIG. 3A is a schematic diagram of a set of low rated voltage DC power tool(s), a set of DC battery pack power supply(ies), and a set of battery pack charger(s) of the power tool system of FIG. 1A.

Referring to FIGS. 1A and 3A, each of the low rated voltage battery packs 20A1 includes a DC power tool interface 22A configured to be coupled to a battery pack interface 16A on a corresponding low rated voltage power tool 10A1 and to a battery pack interface 16A on a corresponding low rated voltage battery pack charger 30. The DC power tool interface 22A may include a DC power in/out+ terminal, a DC power in/out− terminal, and a communications (COMM) terminal. The set of low rated voltage battery packs 20A1 may include one or more battery packs having a first rated voltage and a first rated capacity. The first rated voltage is, relatively speaking, a low rated voltage, as compared to the other battery packs in the DC battery pack power supplies 20A. For example, the low rated voltage battery packs 20A1 may include battery packs having a rated voltage of 17V-20V (which may encompass an advertised voltage of 20V, an operating voltage of 17V-19V, a nominal voltage of 18V, and a maximum voltage of 20V). However, the set of low rated voltage battery packs 20A1 is not limited to a rated voltage of 20V. The set of low rated voltage battery packs 20A1 may have other relatively low rated voltages such as 4V, 8V, 12V, 18V, 24V, or 36V. Within the set of low rated voltage battery packs 20A1 there may be battery packs having the same rated voltage but with different rated capacities. For example, the set of low rated voltage battery packs 20A1 may include a 20V/1.5 Ah battery pack, a 20V/2 Ah battery pack, a 20V/3 Ah battery pack and/or a 20V/4 Ah battery pack. When referring to the low rated voltage of the set of low rated voltage battery packs 20A1, it is meant that the rated voltage of the set of low rated voltage battery packs 20A1 is lower than the rated voltage of the set of medium rated voltage battery packs 20A2 and the set of high rated voltage battery packs 20A3.

Examples of battery packs in the set of low rated voltage battery packs 120A may include the DEWALT 20V MAX set of battery packs, sold by DEWALT Industrial Tool Co. of Towson, Md. Other examples of battery packs that may be included in the first set of battery packs 110 are described in U.S. Pat. No. 8,653,787 and U.S. patent application Ser. Nos. 13/079,158; 13/475,002; and Ser. No. 13/080,887, which are incorporated by reference.

The rated voltage of the set of low rated voltage battery packs 20A1 generally corresponds to the rated voltage of the set of low rated voltage DC power tools 10A1 so that the set of low rated voltage battery packs 20A1 may supply power to and operate with the low rated voltage DC power tools 10A1. As described in further detail below, the set of low rated voltage battery packs 20A1 may also be able to supply power to one or more of the medium rated voltage DC power tools 10A2, the high rated voltage DC power tools 10A3, or the high rated voltage AC/DC power tools 10B, for example, by coupling more than one of the low rated voltage battery packs 20A1 to these tools in series so that the voltage of the low rated voltage battery packs 20A1 is additive and corresponds to the rated voltage of the power tool to which the battery packs are coupled. The low rated voltage battery packs 20A1 may additionally or alternatively be coupled in series with one or more of the medium rated voltage battery packs 20A2, the high rated voltage battery packs 20A3, or the convertible battery packs 20A4 to output the desired voltage level for any of the medium and high rated voltage DC power tools 10A2, 10A3, and/or the AC/DC power tools 10B.

b. Medium Rated Voltage Battery Packs

Figure 3B:
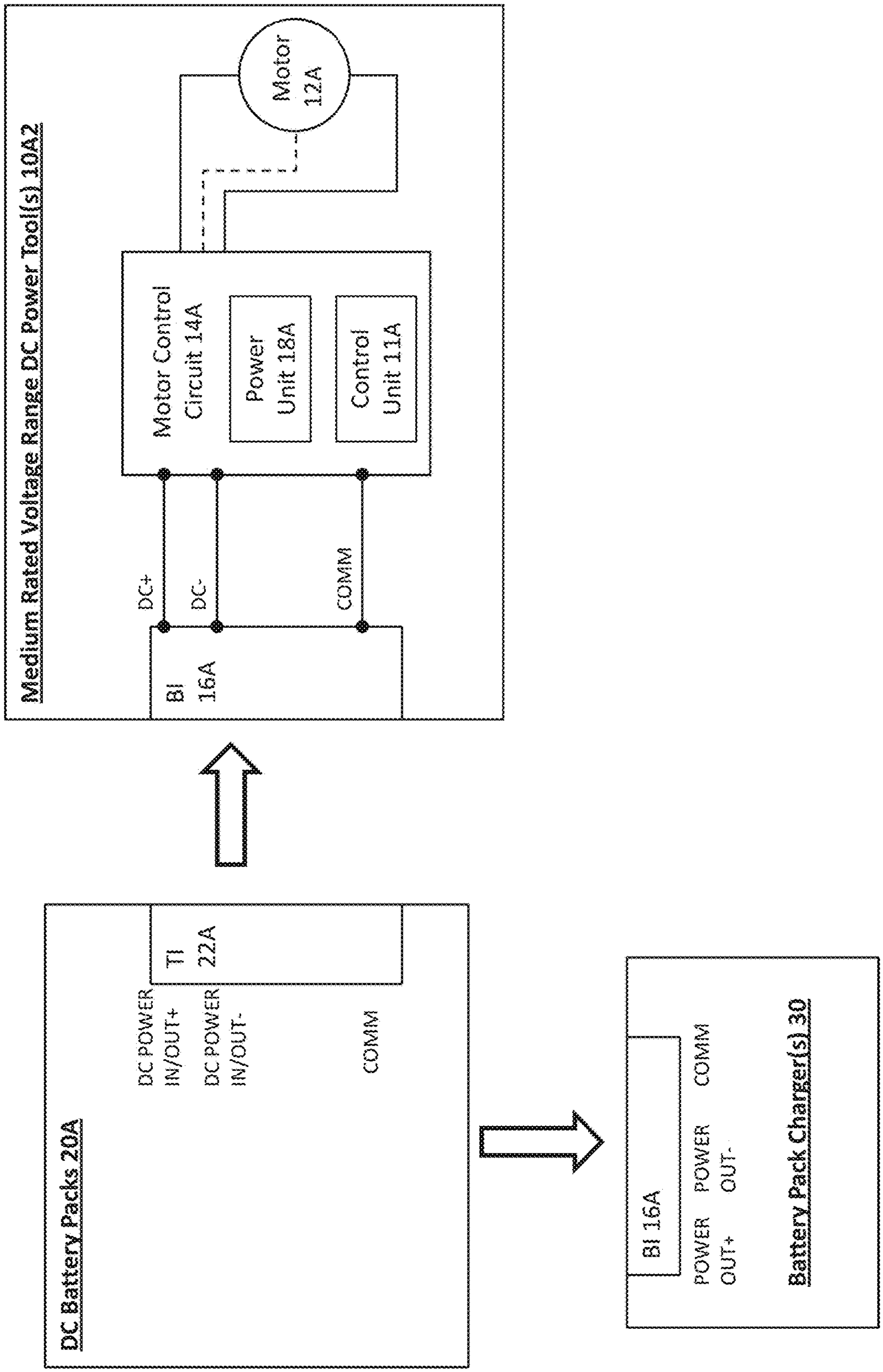
FIG. 3B is a schematic diagram of a set of medium rated voltage DC power tool(s), a set of DC battery pack power supply(ies), and a set of battery pack charger(s) of the power tool system of FIG. 1A.

Referring to FIGS. 1A and 3B, each of the medium rated voltage battery packs 20A2 includes a DC power tool interface 22A configured to be coupled to a battery pack interface 16A on a corresponding medium rated voltage DC power tool 10A2 and to a battery pack interface 16A on a corresponding medium rated voltage battery pack charger 30. The DC power tool interface 22A may include a DC power in/out+ terminal, a DC power in/out− terminal, and a communications (COMM) terminal. The set of medium rated voltage battery packs 20A2 may include one or more battery packs having a second rated voltage and a second rated capacity. The second rated voltage is, relatively speaking, a medium rated voltage, as compared to other battery packs in the set of DC battery packs power supplies 20A. For example, the set of medium rated voltage battery packs 20A2 may include battery packs having a rated voltage of 51V-60V (which may encompass an advertised voltage of 60V, an operating voltage of 51V-57V a nominal voltage of 54V, and a maximum voltage of 60V). However, the set of medium rated voltage battery packs 20A2 is not limited to a rated voltage of 60V. The set of medium rated voltage battery packs 20A2 may have other relatively medium rated voltages such as 40V, 54V, 72V or 80V. Within the set of medium rated voltage battery packs 20A2, there may be battery packs having the same rated voltage but with different rated capacities. For example, the set of medium rated voltage battery packs 20A2 may include a 60V/1.5 Ah battery pack, a 60V/2 Ah battery pack, a 60V/3 Ah battery pack, and/or 60V/4 Ah battery pack. When referring to the medium rated voltage of the set of medium rated voltage battery packs 20A2, it is meant that the rated voltage of the set of medium rated voltage battery packs 20A2 is higher than the rated voltage of the set of low rated voltage battery packs 20A1 but lower than the rated voltage of the set of high rated voltage battery packs 20A3.

The rated voltage of the set of medium rated voltage battery packs 20A2 generally corresponds to the rated voltage of the medium rated voltage DC power tools 10A2 so that the set of medium rated voltage battery packs 20A2 may supply power to and operated with the medium rated voltage DC power tools 10A2. As described in further detail below, the set of medium rated voltage battery packs 20A2 may also be able to supply power to the high rated voltage DC power tools 10A3 or the AC/DC power tools 10B, for example, by coupling more than one of the medium rated voltage battery packs 20A2 to these tools other in series so that the voltage of the medium rated voltage battery packs 20A2 is additive and corresponds to the rated voltage of the power tool to which the battery packs are coupled. The medium rated voltage battery packs 20A2 may additionally or alternatively be coupled in series with any of the low rated voltage battery packs 20A1, the high rated voltage battery packs 20A3, or the convertible battery packs 20A4 to output the desired voltage level for any of the high rated voltage DC power tools 10A or the AC/DC power tools 10B.

c. High Rated Voltage Battery Packs

Figure 3C:
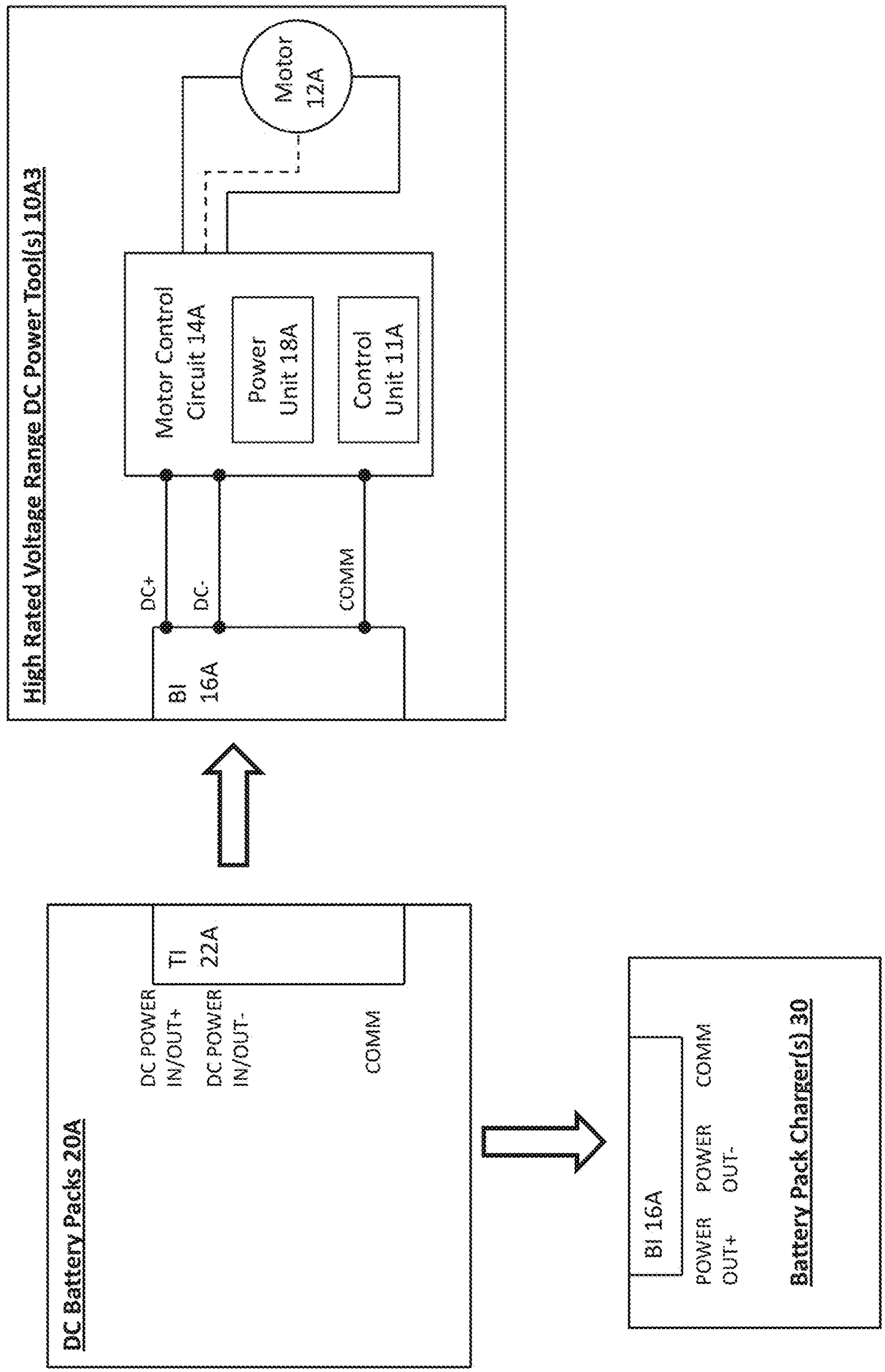
FIG. 3C is a schematic diagram of a set of high rated voltage DC power tool(s), a set of DC battery pack power supply(ies), and a set of battery pack charger(s) of the power tool system of FIG. 1A.

Referring to FIGS. 1A and 3C, each of the high rated voltage battery packs 20A3 includes a DC power tool interface 22A configured to be coupled to a battery pack interface 16A on a corresponding high rated voltage DC power tool 10A3 and to a battery pack interface 16A on a corresponding medium rated voltage battery pack charger 30. The DC power tool interface 22A may include a DC power in/out+ terminal, a DC power in/out− terminal, and a communications (COMM) terminal. The set of high rated voltage battery packs 20A3 may include one or more battery packs having a third rated voltage and a third rated capacity. The third rated voltage is, relatively speaking, a high rated voltage, as compared to other battery packs in the set of DC battery pack power supplies 220A. For example, the set of high rated voltage battery packs 20A3 may include battery packs having a rated voltage of 102V-120V (which may encompass an advertised voltage of 120V, an operating voltage of 102V-114V a nominal voltage of 108V, and maximum voltage of 120V). However, the set of high rated voltage battery packs 20A3 is not limited to a rated voltage of 120V. The set of high rated voltage battery packs 20A3 may have other relatively high rated voltages such as 90V, 100V, 110V, or 120V. The high rated voltage of the set of high rated voltage battery packs 20A3 may alternatively be referred to as an AC rated voltage since the high rated voltage may correspond to a rated voltage of an AC mains power supply in the country in which the power tool is operable and/or sold. Within the set of high rated voltage battery packs 20A3, there may be battery packs having the same rated voltage but with different rated capacities. For example, the set of high rated voltage battery packs 20A3 may include a 120V/1.5 Ah battery pack, a 120V/2 Ah battery pack, a 120V/3 Ah battery pack, and/or a 120V/4 Ah battery pack. When referring to the high rated voltage of the set of high rated voltage battery packs 20A3, it is meant that the rated voltage of the set of high rated voltage battery packs 20A3 is higher than the rated voltage of the set of low rated voltage battery packs 20A1 and the rated voltage of the set of medium rated voltage battery packs 20A2.

The rated voltage of the set of high rated voltage battery packs 20A3 generally corresponds to the rated voltage of the high rated voltage DC power tools 10A3 and the AC/DC power tools 10E3 so that the set of high rated voltage battery packs 20A3 may supply power to and operate with the high rated voltage DC power tools 10A3 and the AC/DC power tools 10B. As described in further detail below, the set of high rated voltage battery packs 20A3 may also be able to supply power to the very high rated voltage AC/DC power tools 128, for example, by coupling more than one of the high rated voltage battery packs 20A3 to the tools in series so that the voltage of the high rated voltage battery packs 20A3 is additive. The high rated voltage battery packs 20A3 may additionally or alternatively be coupled in series with any of the low rated voltage battery packs 20A1, the medium rated voltage battery packs 20A2, or the convertible battery packs 20A4 to output the desired voltage level for any of the AC/DC power tools 10B.

d. Convertible Battery Packs

Referring to FIG. 1A and as discussed in greater detail below, the set of convertible battery packs 20A4 are convertible battery packs, each of which may be converted between (1) a first rated voltage and a first rated capacity and (2) a second rated voltage and a second rated capacity that are different than the first rated voltage and the first rated capacity. For example, the configuration of the cells residing in the battery pack 20A4 may be changed between a first cell configuration that places the convertible battery pack 20A4 in a first battery pack configuration and a second cell configuration that places the convertible battery pack 20A4 in a second battery pack configuration. In one implementation, in the first battery pack configuration, the convertible battery pack 20A4 has a low rated voltage and a high rated capacity, and in the second battery pack configuration, the battery pack has a medium rated voltage and a low rated capacity. In other words, the battery packs of the set of convertible battery packs 20A4 are capable of having at least two different rated voltages, e.g., a lower rated voltage and a higher rated voltage, and at least two different capacities, e.g., a higher rated capacity and a lower rated capacity.

As noted above, low, medium and high ratings are relative terms and are not intended to limit the battery packs of the set of convertible battery packs 20A4 to specific ratings. Instead, the convertible battery packs of the set of convertible battery packs 20A4 may be able to operate with the low rated voltage power tools 10A1 and with the medium rated voltage power tools 20A2, where the medium rated voltage is greater than the low rated voltage. In one particular embodiment, the convertible battery packs 20A4 are convertible between a low rated voltage (e.g., 17V-20V, which may encompass an advertised voltage of 20V, an operating voltage of 17V-19V a nominal voltage of 18V, and a maximum voltage of 20V) that corresponds to the low rated voltage of the low rated voltage DC power tools 10A1, and a medium rated voltage (e.g., 60V, which may encompass an advertised voltage of 60V, an operating voltage of 51V-57V, a nominal voltage of 54V, and a maximum voltage of 60V) that corresponds to the medium rated voltage of the medium rated voltage DC power tools 10A2. In addition, as described further below, the convertible battery packs 20A4 may be able to supply power to the high rated voltage DC power tools 10A3 and the high voltage AC/DC power tools 10B, e.g., with the convertible battery packs 20A4 operating at their medium rated voltage and connected to each other in series so that their voltage is additive to correspond to the rated voltage of the high rated voltage DC power tools 10A3 or the AC/DC power tools 10B.

In other embodiments, the convertible battery packs may be backwards compatible with a first pre-existing set of power tools having a first rated voltage when in a first rated voltage configuration and forwards compatible with a second new set of power tools having a second rated voltage. For example, the convertible battery packs may be coupleable to a first set of power tools when in a first rated voltage configuration, where the first set of power tools is an existing power tool that was on sale prior to May 18, 2014, and to a second set of power tools when in a second rated voltage configuration, where the second set of power tools was not on sale prior to May 18, 2014. For example, in one possible implementation a low/medium rated convertible battery pack may be coupleable in a 20V rated voltage configuration to one or more of DeWALT® 20V MAX cordless power tools sold by DeWALT Industrial Tool Co. of Towson, Md., that were on sale prior to May 18, 2014, and in a 60V rated voltage configuration to one or more 60V rated power tools that were not on sale prior to May 18, 2014. Thus, the convertible battery packs facilitate compatibility in a power tool system having both pre-existing and new sets of power tools.

Referring to FIGS. 1A and 3A-3C, the convertible battery packs 20A4 each include a plurality of cells and a DC power tool interface 22A configured to be coupled to a battery pack interface 16A on a corresponding low, medium, or high rated voltage DC power tool 10A1, 10A2, or 10A3. The DC power tool interface 22A is also configured to be coupled the battery pack interface 16A on a corresponding battery pack charger 30. As discussed in greater detail below, the convertible battery pack 20A4 may be coupled to one or more rated voltage battery pack chargers 30 where the convertible battery pack 20A4 is placed in the voltage rating configuration that corresponds to that battery pack charger 30 when it is coupled to that battery pack charger 30. For example, the DC power tool interface 22A may include a DC power in/out+ terminal, a DC power in/out− terminal, and a communications (COMM) terminal. Several possible embodiments of convertible battery packs and their interfaces are described in further detail below.

B. Battery Pack Chargers

Referring to FIGS. 1A, and 3A-3C, the set of battery pack chargers 30 contains one more battery pack chargers that are able to mechanically and electrically connect to the battery packs of one or more of the low rated voltage battery packs 20A1, medium rated voltage battery packs 20A2, high rated voltage battery packs 20A3, and convertible battery packs 20A4. The set of battery pack chargers 30 are able to charge any of the battery packs 20A1, 20A2, 20A3, 20A4. The battery pack chargers 30 may have different rated voltages. For example, the battery pack chargers 30 may have one or more rated voltages, such as a low rated voltage, a medium rated voltage, and/or a high rated voltage to match the rated voltages of the sets of battery packs in the system. The battery pack chargers 30 may also have multiple or a range of rated voltages (e.g., a low-medium rated voltage) to enable the battery pack chargers 30 to charge battery packs having different rated voltages. The battery pack chargers 30 may also have a battery pack interface 16A configured to be coupled to a DC power tool interface 22A on the battery packs. The battery pack interface 16A may include a DC power in/out+ terminal, a DC power in/out− terminal, and a communications (COMM) terminal. In certain embodiments, the battery pack interface 16A may include a converter configured to cause one of the convertible battery packs to be placed in a desired rated voltage configuration for charging the battery pack, as discussed in greater detail below.

C. Power Tools

1. Low Rated Voltage DC Power Tools

Referring to FIGS. 1A and 3A, the set of low rated voltage power tools 10A1 includes one or more different types of cordless or DC-only power tools that utilize DC power supplied from one or more of the DC battery pack power supplies 20A that have a low rated voltage (such as removable and rechargeable battery packs). The rated voltage of the low rated voltage DC power tools 10A1 generally correspond to the rated voltage of the low rated voltage battery packs 20A1 or to the rated voltage of the convertible battery packs 20A4 when placed in a low rated voltage configuration. For example, the low rated voltage DC power tools 10A1 having a rated voltage of 20V may be powered using 20V battery pack(s) 20A1 or by 20V/60V convertible battery packs 20A4 in a 20V configuration. The power tool rated voltage of 20V may itself be shorthand for a broader rated voltage of 17-20V, which may encompass an operating voltage range of, e.g., 17V-20V that encompasses the rated voltage range of the low rated voltage battery packs.

The low rated voltage DC power tools 10A1 each include a motor 12A that can be powered by a DC-only power supply. The motor 12A may be any brushed or brushless DC electric motor, including, but not limited to, a permanent magnet brushless DC motor (BLDC), a permanent magnet brushed motor, a universal motor, etc. The low rated voltage DC power tools 10A1 may also include a motor control circuit 14A configured to receive DC power from a battery pack interface 16A via a DC line input DC+/− and to control power delivery from the DC power supply to the motor 12A. In an exemplary embodiment, the motor control circuit 14A may include a power unit 18A having one or more power switches (not shown) disposed between the power supply and the motor 12A. The power switch may be an electromechanical on/off switch, a power semiconductor device (e.g., diode, FET, BJT, IGBT, etc.), or a combination thereof. In an exemplary embodiment, the motor control circuit 14A may further include a control unit 11. The control unit 11 may be arranged to control a switching operation of the power switches in the power unit 18A. In an exemplary embodiment, the control unit 11 may include a microcontroller or similar programmable module configured to control gates of power switches. Additionally or alternatively, the control unit 11 may be configured to monitor and manage the operation of the DC battery pack power supplies 20A. Additionally or alternatively, the control unit 11 may be configured to monitor and manage various tool operations and conditions, such as temperature control, over-speed control, braking control, etc.

In an exemplary embodiment, as discussed in greater detail below, the low rated voltage DC power tool 10A1 may be a constant-speed tool (e.g., a hand-held light, saw, grinder, etc.). In such a power tool, the power unit 18A may simply include an electro-mechanical on/off switch engageable by a tool user. Alternatively, the power unit 18A may include one or more semi-conductor devices controlled by the control unit 11 at fixed no-load speed to turn the tool motor 12A on or off.

In another embodiment, as discussed in greater detail below, a low rated voltage DC power tool 10A1 may be a variable-speed tool (e.g., a hand-held drill, impact driver, reciprocating saw, etc.). In such a power tool, the power switches of the power unit 18A may include one or more semiconductor devices arranged in various configurations (e.g., a FET and a diode, an H-bridge, etc.), and the control unit 11 may control a pulse-width modulation of the power switches to control a speed of the motor 12A.

The low rated voltage DC power tools 10A1 may include hand-held cordless tools such as drills, circular saws, screwdrivers, reciprocating saws, oscillating tools, impact drivers, and flashlights, among others. The low rated voltage power tools may include existing cordless power tools that were on sale prior to May 18, 2014. Examples of such low rated voltage DC power tools 10A1 may include one or more of the DeWALT® 20V MAX set of cordless power tools sold by DeWALT Industrial Tool Co. of Towson, Md. The low rated voltage DC power tools 10A1 may alternatively include cordless power tools that were not on sale prior to May 18, 2014. In other examples, U.S. Pat. Nos. 8,381,830, 8,317,350, 8,267,192, D646,947, and D644,494, which are incorporated by reference, disclose tools comprising or similar to the low rated voltage cordless power tools 10A1.

2. Medium Rated Voltage DC Power Tools

Referring to FIGS. 1A and 3B, the set of medium rated voltage DC power tools 10A2 may include one or more different types of cordless or DC-only power tools that utilize DC power supplied from one or more of the DC battery pack power supplies 20A that alone or together have a medium rated voltage (such as removable and rechargeable battery packs. The rated voltage of the medium rated voltage DC power tools 10A2 will generally correspond to the rated voltage of the medium rated voltage battery packs 20A2 or to the rated voltage of the convertible battery packs 20A4 when placed in a medium rated voltage configuration. For example, the medium rated voltage DC power tools 10A2 may have a rated voltage of 60V and may be powered by a 60V medium rated voltage battery pack 20A2 or by a 20V/60V convertible battery pack 20A4 in a 60V configuration. The power tool rated voltage of 60V may be shorthand for a broader rated voltage of 17-20V, which may encompass an operating range of, e.g., 51V-60V that encompasses the rated voltage of the medium rated voltage battery packs. In an exemplary embodiment, the medium rated voltage DC power tool 10A2 may include multiple battery interfaces configured to receive two or more low rated voltage battery packs 20A1. In an exemplary embodiment, the medium rated voltage DC power tool 10A2 may additionally include circuitry to couple the DC battery pack power supplies 20A in series to produce a desired medium rated voltage corresponding to the rated voltage of the medium rated voltage DC power tool 10A2.

Similar to low rated voltage DC power tools 10A1 discussed above, the medium rated voltage DC power tools 10A2 each include a motor 12A that can be powered by a DC battery pack power supply 20A. The motor 12A may be any brushed or brushless DC electric motor, including, but not limited to, a permanent magnet brushless DC motor (BLDC), a permanent magnet brushed motor, a universal motor, etc. The medium rated voltage DC power tools 10A2 also include a motor control circuit 14A configured to receive DC power from the battery pack interface 16A via a DC line input DC+/− and to control power delivery from the DC power supply to the motor 12A. In an exemplary embodiment, the motor control circuit 14A may include a power unit 18A having one or more power switches (not shown) disposed between the power supply and the motor 12A. The power switch may be an electro-mechanical on/off switch, a power semiconductor device (e.g., diode, FET, BJT, IGBT, etc.), or a combination thereof. In an exemplary embodiment, the motor control circuit 14A may further include a control unit 11. The control unit 11 may be arranged to control a switching operation of the power switches in the power unit 18A. Similarly to the motor control circuit 14A described above for low rated voltage DC power tools 10A1, the motor control circuit 14A may control the motor 12A in fixed or variable speed. In an exemplary embodiment, the control unit 11 may include a micro-controller or similar programmable module configured to control gates of power switches. Additionally or alternatively, the control unit 11 may be configured to monitor and manage the operation of the DC battery pack power supplies 20A. Additionally or alternatively, the control unit 11 may be configured to monitor and manage various tool operations and conditions, such as temperature control, over-speed control, braking control, etc.

The medium rated voltage DC power tools 10A2 may include similar types of tools as the low rated voltage DC power tools 10A1 that have relatively higher power output requirements, such as drills, a circular saws, screwdrivers, reciprocating saws, oscillating tools, impact drivers and flashlights. The medium rated voltage DC power tools 10A2 may also or alternatively have other types of tools that require higher power or capacity than the low rated voltage DC power tools 10A1, such as chainsaws, string trimmers, hedge trimmers, lawn mowers, nailers and/or rotary hammers.

In yet another and/or a further embodiment, as discussed in more detail below, the motor control circuit 14A of a medium rated voltage DC power tool 10A2 enables the motor 12A to be powered using DC battery pack power supplies 20A having rated voltages that are different from each other and that are less than a medium rated voltage. In other words, medium rated voltage DC power tool 10A2 may be configured to operate at more than one rated voltage (e.g., at a low rated voltage or at a medium rated voltage). Such a medium rated voltage DC power tool 10A2 may be said to have more than one voltage rating corresponding to each of the voltage ratings of the DC power supplies that can power the tool. For example, the medium rated voltage DC power tool 10A2 of FIG. 3B may have a low/medium rated voltage (e.g., a 20V/60V rated voltage, 40V/60V rated voltage) that is capable of being alternatively powered by one of the low rated voltage battery packs 20A1 (e.g., a 20V battery pack), by one of the medium rated voltage battery packs 20A2 (e.g., a 60V battery pack), or by a convertible battery pack 20A4 in either a low rated voltage configuration or a medium rated voltage configuration. In alternative implementations, the medium rated voltage DC power tool 10A2 may operate using a pair of low rated voltage battery packs 20A1 connected in series to operate at yet another low or medium rated voltage that is different than the medium rated voltage of the motor 12A in the medium rated voltage DC power tool 10A2 (e.g., two low rated voltage 18V battery packs 20A1 connected in series to generate a combined low rated voltage of 36V).

Operating the power tool motor 12A at significantly different voltage levels will yield significant differences in power tool performance, in particular the rotational speed of the motor, which may be noticeable and in some cases unsatisfactory to the users. Thus, in an embodiment of the invention herein described, the motor control circuit 14A is configured to optimize the motor 12A performance based on the rated voltage of the power supply, i.e., based on whether the medium rated voltage DC power tool 10A2 is coupled with either a low rated voltage DC power supply (e.g., low rated voltage battery pack 20A1) or a medium rated voltage power supply (e.g., medium rated voltage battery pack 20A2 for which the motor 212A in the medium rated voltage DC power tools 10A2 is optimized or rated). In doing so, the difference in the tool's output performance is minimized, or at least reduced to a level that is satisfactory to the end user.

In this embodiment, the motor control circuit 14A is configured to either boost or reduce an effective motor performance from the power supply to a level that corresponds to the operating voltage range (or voltage rating) of the medium rated voltage DC power tool 10A2. In particular, the motor control circuit 14A may reduce the power output of the tool 10A when used with a medium rated voltage battery pack 20A2 to match (or come reasonably close to) the output level of the tool 10A when used with a low rated voltage battery pack 20A1 in a manner that is satisfactory to an end user. Alternatively or additionally, motor control circuit 14A may boost the power output of the medium rated voltage DC power tool 10A2 when used with a low rated voltage battery pack 20A1 to match (or come reasonably close to) the output level of the medium rated voltage DC power tool 10A2 when used with a medium rated voltage battery pack 20A2 in a manner that is satisfactory to an end user. In an embodiment, the low/medium rated voltage DC power tool 10A2 may be configured to identify the rated voltage of the power supply via, for example, a battery ID, and optimize motor performance accordingly. These methods for optimizing (i.e., boosting or reducing) the effective motor performance are discussed later in this disclosure in detail.

3. High Rated Voltage DC Power Tools

Referring to FIGS. 1A and 3C, the set of high rated voltage DC power tools 10A3 may include cordless (DC only) high rated (or AC rated) voltage power tools with motors configured to operate at a high rated voltage and high output power (e.g., approximately 1000 to 1500 Watts). Similar to the low and medium rated voltage DC power tools 10A1, 10A2, the high rated voltage DC power tools 10A3 may include various cordless tools (i.e., power tools, outdoor tools, etc.) for high power output applications. The high rated voltage DC power tools 10A3 may include for example, similar types of tools as the low rated voltage and medium rated voltage DC power tools, such as drills, circular saws, screwdrivers, reciprocating saws, oscillating tools, impact drivers, flashlights, string trimmers, hedge trimmers, lawn mowers, nailers and/or rotary hammers. The high rated voltage DC power tools may also or alternatively include other types of tools that require higher power or capacity such as miter saws, chain saws, hammer drills, grinders, and compressors.

Similar to the low and medium rated voltage DC power tools 10A1, 10A2, the high rated voltage DC power tools 10A3 each include a motor 12A, a motor control circuit 14A, and a battery pack interface 16A that are configured to enable operation from one or more DC battery pack power supplies 20A that together have a high rated voltage that corresponds to the rated voltage of the power tool 10A. Similarly to motors 12A described above with reference to FIG. 3A, the motor 12A may be any brushed or brushless DC electric motor, including, but not limited to, a permanent magnet brushless DC motor (BLDC), a permanent magnet DC brushed motor (PMDC), a universal motor, etc. Similarly to motor control circuits 14A may include a power unit 18A having one or more power switches (not shown) disposed between the power supply and the motor 12A. The power switch may be an electro-mechanical on/off switch, a power semiconductor device (e.g., diode, FET, BJT, IGBT, etc.), or a combination thereof. In an embodiment, the motor control circuit 14A may further include a control unit 11. The control unit 11 may be arranged to control a switching operation of the power switches in the power unit 18A. The motor control circuit 14A may control the motor 12A in fixed or variable speed. In an embodiment, the control unit 11 may include a micro-controller or similar programmable module configured to control gates of power switches. Additionally or alternatively, the control unit 11 may be configured to monitor and manage the operation of the DC battery pack power supplies 20A. Additionally or alternatively, the control unit 11 may be configured to monitor and manage various tool operations and conditions.

Referring to FIG. 3C, the high rated voltage DC power tools 10A3 may be powered by a single DC battery pack power supply 20A received in a battery pack interface (or battery receptacle) 16A. In an embodiment, the DC battery pack power supply 20A may be a high rated voltage battery pack 20A3 having a high rated voltage (e.g., 120V) that corresponds to the rated voltage of the high rated voltage DC power tool 10A3.

Referring to FIG. 3C, in an alternative embodiment, the battery pack interface 16A of the high rated voltage DC power tools 10A3 may include two or more battery receptacles 16A1, 16A2 that receive two or more DC battery pack power supplies 20A at a given time. In an embodiment, the high rated voltage DC power tools 10A3 may be powered by a pair of DC battery pack power supplies 20A received together in the battery receptacles 216A1, 216A2. In this embodiment, the battery pack interface 16A also may include a switching unit (not shown) configured to connect the two DC battery pack power supplies 20A in series. The switching unit may for example include a circuit provided within the battery pack interface 16A, or within the motor control circuit 14A. Alternatively, the DC battery pack power supplies 20A may be medium rated voltage battery packs 20A2 connected in series via the switching unit 120-10 to similarly output a high rated voltage (e.g., two 60V battery packs connected in series for a combined rated voltage of 120V). In yet another embodiment, a single high rated voltage battery pack 20A3 may be coupled to one of the battery receptacles to provide a rated voltage of 120V. For example, the high rated voltage DC power tools 10A2 may have a rated voltage of 60V and may be powered by two 60V medium rated voltage battery packs 20A2 or by two 20V/60V convertible battery packs 20A4 in their 60V configuration. The power tool rated voltage of 120V may itself be shorthand for a broader rated voltage range of 102V-120V, which may encompass an operating range of, e.g., 102V-120V that encompasses the operating range of the two medium rated voltage battery packs.

In an embodiment, the total rated voltage of the battery packs received in the cordless power tool battery receptacle(s) 16A may correspond to the rated voltage of the cordless DC power tool 10A itself. However, in other embodiments, the high rated voltage cordless DC power tool 10A3 may additionally be operable using one or more DC battery pack power supplies 20A that together have a rated voltage that is lower than the rated voltage of the motor 12A and the motor control circuit 14A in the high rated cordless DC power tool 10A3. In this latter case, the cordless DC power tool 10A may be said to have multiple rated voltages corresponding to the rated voltages of the DC battery pack power supplies 20A that the high rated voltage DC power tool 10A3 will accept. For example, the high rated voltage DC power tool 10A3 may be a medium/high rated voltage DC power tool if it is able to operate using either a high rated voltage battery pack 20A3 or a medium rated voltage battery pack 20A2 (e.g., a 60V/120V, a 60-120V power tool, a 80V/120V, or a 80-120V power tool) that is capable of being alternatively powered by a plurality of low rated voltage battery packs 20A1 (e.g., a 20V battery packs), one or more medium rated voltage battery packs 20A2 (e.g., a 60V battery pack), one high rated voltage battery pack 20A3, or one or more convertible battery packs 20A4. The user may mix and match any of the DC battery pack power supplies 20A for use with the high rated voltage DC power tool 10A3.

In order for the motor in the high rated voltage DC power tool 10A3 (which as discussed may be optimized to work at a high power and a high voltage rating) to work acceptably with DC power supplies having a total voltage rating that is less than the voltage rating of the motor), the motor control circuit 14A may be configured to optimize the motor performance based on the rated voltage of the low rated voltage DC battery packs 20A1. As discussed briefly above and in detail later in this disclosure, this may be done by optimizing (i.e., booting or reducing) an effective motor performance from the power supply to a level that corresponds to the operating voltage range (or voltage rating) of the high rated voltage DC power tool 10A3.

In an alternative or additional embodiment (not shown), an AC/DC adaptor may be provided that couples an AC power supply to the battery pack interface 16A and converts the AC power from the AC power supply to a DC signal of comparable rated voltage to supply a high rated voltage DC power supply to the high rated voltage DC power tool 10A3 via the battery pack interface 16A.

4. High (AC) Rated Voltage AC/DC Power Tools

Figure 4:
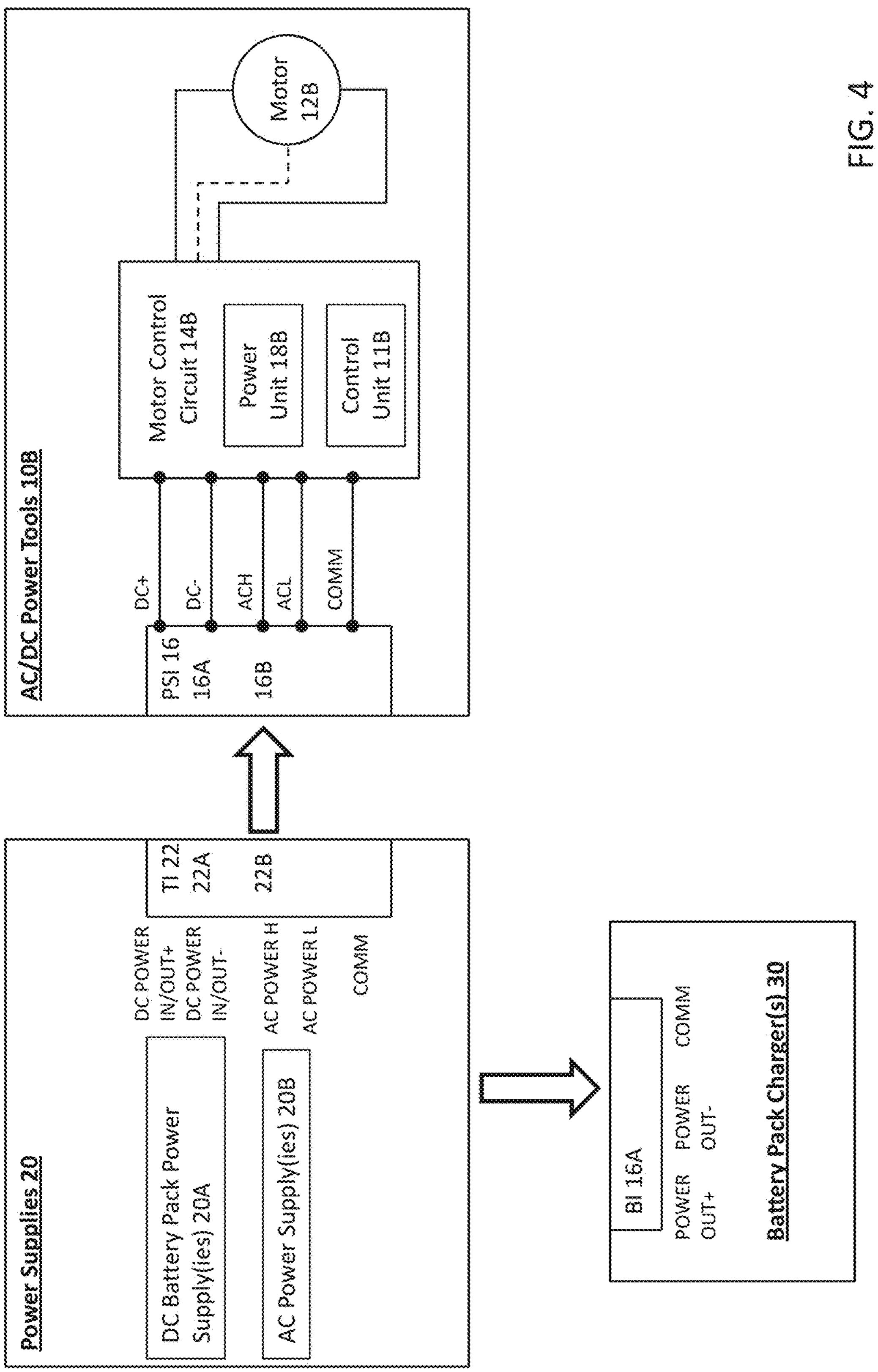
FIG. 4 is a schematic diagram of a set of high rated voltage AC/DC power tool(s), a set of DC battery pack power supply(ies), a set of AC power supply(ies), and a set of battery pack charger(s) of the power tool system of FIG. 1A.

Referring to FIGS. 1A and 4, the corded/cordless (AC/DC) power tools 10B each have an AC/DC power supply interface 16 with DC line inputs DC+/−(16A), AC line inputs ACH, ACL (16B), and a communications line (COMM) coupled to a motor control circuit 14B. The AC/DC power supply interface 16 is configured to be coupled to a tool interface of one or more of the DC battery pack power supplies 20A and the AC power supplies 20B. The DC battery pack power supplies 20A may have a DC power in/out+ terminal, a DC power in/out− terminal, and a communications (COMM) terminal that can be coupled to the DC+/− line inputs and the communications line (COMM) in the AC/DC power supply interface 16 in the AC/DC power tool 10B. The DC power in/out+ terminal, the DC power in/out− terminal, and the communications (COMM) terminals of the DC battery pack power supplies 20A may also be able to couple the DC battery pack power supplies 20A to the battery pack interfaces 16A of the battery pack chargers 30, as described above. The AC power supplies 20B may be coupled to the ACH, ACL, and/or the communications (COMM) terminals of the power supply interface 16B in the AC/DC power tool 10B by AC power H and AC power L terminals or lines and by a communications (COMM) terminal or line. In each AC/DC power tool 10B, the motor control circuit 14B and the motor 12B are designed to optimize performance of the motor for a given rated voltage of the power tool and of the power supplies.

As discussed further below, the motors 12B may be brushed motors or brushless motors, such as a permanent magnet brushless DC motor (BLDC), a permanent magnet DC brushed motor (PMDC), or a universal motor. The motor control circuit 14B may enable either constant-speed operation or variable-speed operation, and depending on the type of motor and speed control, may include different power switching and control circuitry, as described in greater detail below.

In an exemplary embodiment, the AC/DC power supply interface 16 may be configured to include a single battery pack interface (e.g. a battery pack receptacle) 16A and an AC power interface 16B (e.g. AC power cable received in the tool housing). The motor control circuit 14B in this embodiment may be configured to selectively switch between the AC power supply 20B and DC battery pack power supply 20A. In this embodiment, the DC battery pack power supply 20A may be a high rated voltage battery pack 20A3 having a high rated voltage (e.g., 120V) that corresponds to the rated voltage of the AC/DC power tool 10B and/or the rated voltage of the AC power supply 20B. The motor control unit 14B may be configured to, for example, supply AC power from the AC supply 20B by default when it senses a current from the AC supply 20B, and otherwise supply power from the DC battery pack power supply 20A.

Referring to FIGS. 114-117, in another exemplary embodiment, the AC/DC power supply interface 16 may be configured to include, in addition to the AC supply interface 16B, a pair of battery interfaces 16A such as two battery receptacles 16A1, 16A2. This arrangement allows the AC/DC power tool 10B to be powered by more than one DC battery pack power supply 20A that, when connected in series, together have a high rated voltage that corresponds to the AC rated voltage of the mains power supply. In this embodiment, the AC/DC power tools 10B may be powered by a pair of the DC battery pack power supplies 20A received in the battery receptacles 16A1, 16A2. In an embodiment, a switching unit may be provided and configured to connect the two DC battery pack power supplies 20A in series. Such a switching unit may for example include a simple wire connection provided in AC/DC power supply interface 16 connecting the battery receptacles 16A1, 16A2. Alternatively, such a switching unit may be provided as a part of the motor control circuit 14B.

In this embodiment, the DC battery pack power supplies 20A may be two of the medium rated voltage battery packs 20A2 connected in series via a switching unit to similarly output a high rated voltage (e.g., two 60V battery packs connected in series for a combined rated voltage of 120V). Referring to FIG. 116, in yet another exemplary embodiment, a single high rated voltage battery pack 20A3 may be coupled to one of the battery receptacles 16A2 to provide a rated voltage of 120V, and the other battery receptacle 16A1 may be left unused. In this embodiment, motor control circuit 14B may be configured to select one of the AC power supply 20B or the combined DC battery pack power supplies 20A for supplying power to the motor 12B.

In these embodiments, the total rated voltage of the DC battery pack power supplies 20A received in the AC/DC power tool battery pack receptacle(s) 16A may correspond to the rated voltage level of the AC/DC power tool 10B, which generally corresponds to the rated voltage of the AC mains power supply 20B. As previously discussed, the power supply 20 used for the high rated voltage DC power tools 10A3 or the AC/DC power tools 10B is a high rated voltage mains AC power supply 20B. For example, the AC/DC power tools 10A2 may have a rated voltage of 120V and may be able to be powered by a 120 VAC AC mains power supply or by two 20V/60V convertible battery packs 20A4 in their 60V configuration and connected in series. The power tool rated voltage of 120V may be shorthand for a broader rated voltage of, e.g., 100V-120V that encompasses the operating range of the power tool and the operating range of the two medium rated voltage battery packs. In one implementation, the power tool rated voltage of 120V may be shorthand for an even broader operating range of 90V-132V which encompasses the entire operating range of the two medium rated voltage battery packs (e.g., 102 VDC-120 VDC) and the all of the AC power supplies available in North America and Japan (e.g., 100 VAC, 110 VAC, 120 VAC) with a ±10% error factor to account for variances in the voltage of the AC mains power supplies).

In other embodiments, the AC/DC power tools 10B may additionally be operable using one or more of the DC battery pack power supplies 20A that together have a rated voltage that is lower than the AC rated voltage of the AC mains power supply, and that is less than the voltage rating of the motor 12A and motor control circuit 14A. In this embodiment, the AC/DC power tool 10B may be said to have multiple rated voltages corresponding to the rated voltages of the DC battery pack power supplies 20A and the AC power supply 20B that the AC/DC power tool 10B will accept. For example, the AC/DC power tool 10B is be a medium/high rated power tool if it is able to operate using either a medium rated voltage battery pack 20A2 or a high rated voltage AC power supply 20B (e.g., a 60V/120V or a 60-120V or 60 VDC/120 VAC). According to this embodiment, the user may be given the ability to mix and match any of the DC battery pack power supplies 20A for use with AC/DC power tool 10B. For example, AC/DC power tool 10B may be able to be used with two low rated voltage packs 20A1 (e.g., 20V, 30V, or 40V packs) connected in series via a switching unit to output a rated voltage of between 40V to 80V. In another example, the AC/DC power tool 10B may be used with a low rated voltage battery pack 20A1 and a medium rated voltage battery pack 20A2 for a total rated voltage of between 80V to 100V.

In order for the motor 12B in the AC/DC power tool 10B (which as discussed above is optimized to work at a high output power and a high voltage rating) to work acceptably with DC battery pack power supplies having a total voltage rating that is less than the high voltage rating of the tool (e.g., in the range of 40V to 100V as discussed above), the motor control circuit 14B may be configured to optimize the motor performance based on the rated voltage of the DC battery pack power supplies 20A. As discussed briefly above and in detail later in this disclosure, this may be done by optimizing (i.e., boosting or reducing) an effective motor performance from the power supply to a level that corresponds to the operating voltage range (or voltage rating) of the high rated voltage DC power tool 10A3.

II. Ac/Dc Power Tools and Motor Controls

Figure 5A:
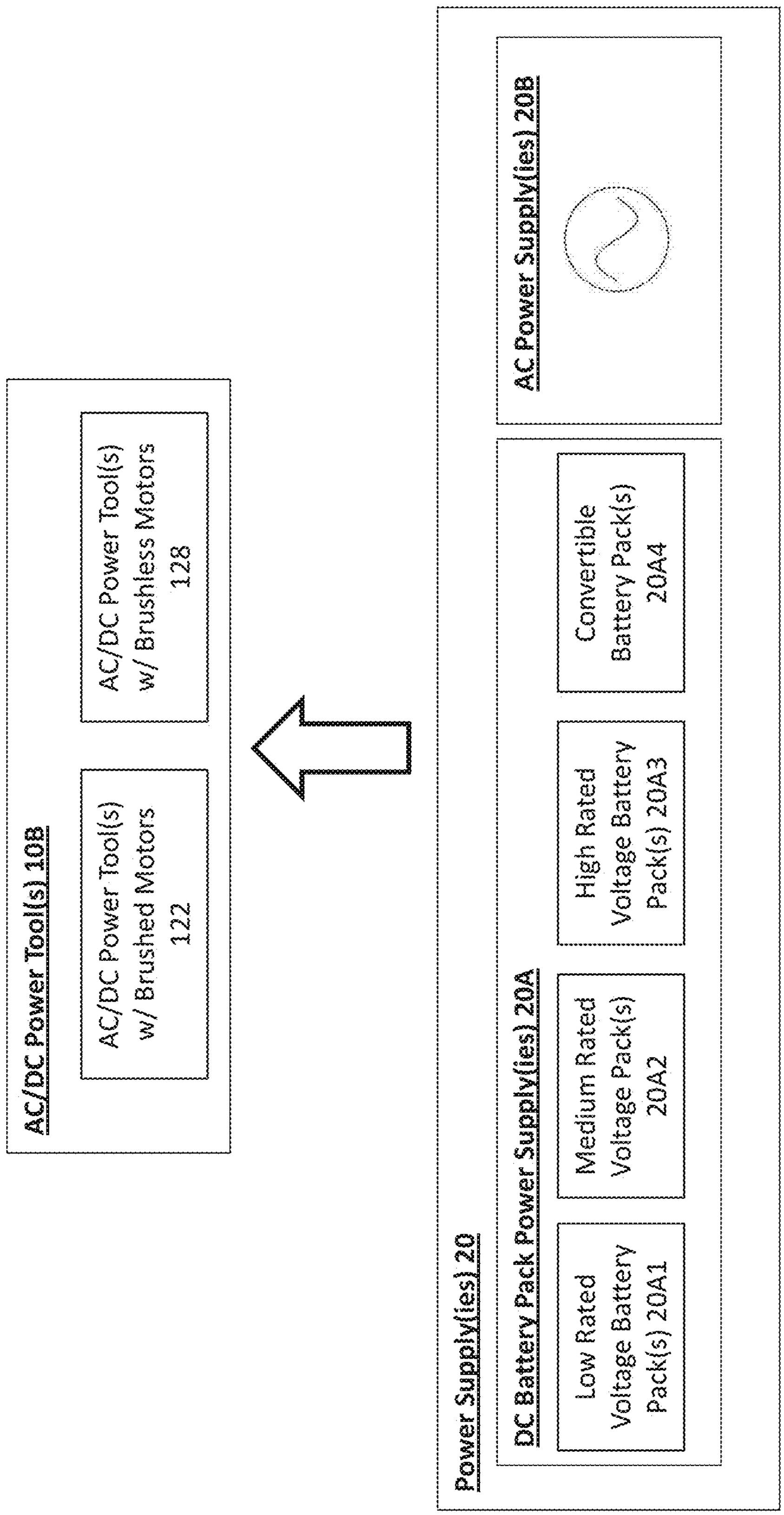
FIGS. 5A-5B are schematic diagrams of classifications of AC/DC power tools of the power tool system of FIG. 1A.
Figure 5B:
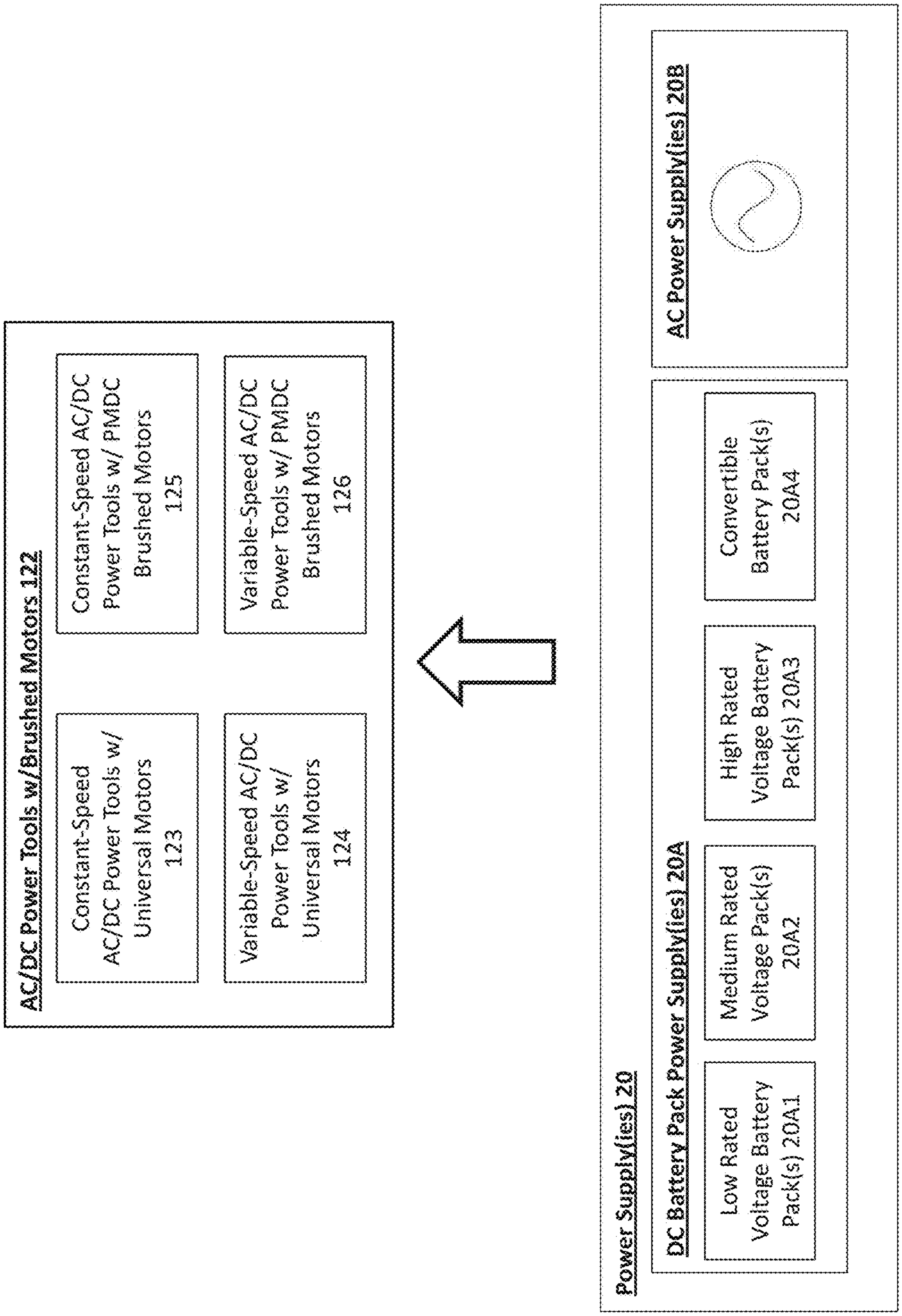

Referring to FIGS. 1A and 5A, the high rated voltage AC/DC power tools 10B may be classified based on the type of motor, i.e., high rated voltage AC/DC power tools with brushed motors 122 and high rated voltage AC/DC power tools with brushless motors 128. Referring also to FIG. 5B, the AC rated voltage AC/DC power tools with brushed motors 122 may be further classified into four subsets based on speed control and motor type: constant-speed AC/DC power tools with universal motors 123, variable-speed AC/DC power tools with universal motors 124, constant-speed AC/DC power tools with DC brushed motors 125, and variable-speed AC/DC power tools with universal motors 126. These various sets and subsets of high rated voltage AC/DC power tools are discussed in greater detail below.

In the ensuing FIGS. 5A-15E, power tools 123, 124, 125, 126 and 128 may each correspond to power tool 10B depicted in FIG. 4. Similarly, in the ensuing FIGS. 5A-15E, motors 123-2, 124-2, 125-2, 126-2, and 202 may each correspond to motor 12B in FIG. 4; motor control circuits 123-4, 124-4, 125-4, 126-4, and 204 may each correspond to motor control circuit 14B in FIG. 4; power units 123-6, 124-6, 125-6, 126-6, and 206 may each correspond to power unit 18B in FIG. 4; control unit 123-8, 124-8, 125-8, 126-8, and 208 may each correspond to control unit 11B in FIG. 4; and power supply interfaces 123-5, 124-5, 125-5, 126-5, and 128-5 may each correspond to power supply interface 16B in FIG. 4.

A. Constant-Speed AC/DC Power Tools with Universal Motors

Turning now to FIGS. 6A-6D, the first subset of AC/DC power tools with brushed motors 122 includes the constant-speed AC/DC power tools 123 with universal motors (herein referred to as constant-speed universal-motor tools 123). These include corded/cordless (AC/DC) power tools that operate at constant speed at no load (or constant load) and include brushed universal motors 123-2 configured to operate at a high rated voltage (e.g., 100V to 120V, or more broadly 90V to 132V) and high power (e.g., 1500 to 2500 Watts). A universal motor is a series-wound motor having stator field coils and a commutator connected to the field coils in series. A universal motor in this manner can work with a DC power supply as well as an AC power supply. In an embodiment, constant-speed universal motor tools 123 may include high powered tools for high power applications such as concrete hammers, miter saws, table saws, vacuums, blowers, and lawn mowers, etc.

In an embodiment, a constant-speed universal motor tool 123 includes a motor control circuit 123-4 that operates the universal motor 123-2 at a constant speed under no load. The power tool 123 further includes power supply interface 123-5 arranged to receive power from one or more of the aforementioned DC power supplies and/or AC power supplies. The power supply interface 123-5 is electrically coupled to the motor control circuit 123-4 by DC power lines DC+ and DC− (for delivering power from a DC power supply) and by AC power lines ACH and ACL (for delivering power from an AC power supply).

In an embodiment, motor control circuit 123-4 may include a power unit 123-6. In an embodiment, power unit 123-6 includes an electro-mechanical ON/OFF switch 123-12. In an embodiment, the tool 123 includes an ON/OFF trigger or actuator (not shown) coupled to ON/OFF switch 123-12 enabling the user to turn the motor 123-2 ON or OFF. The ON/OFF switch 123-12 is provided in series with the power supply to electrically connect or disconnect supply of power from power supply interface 123-5 to the motor 123-2.

Figure 6A:
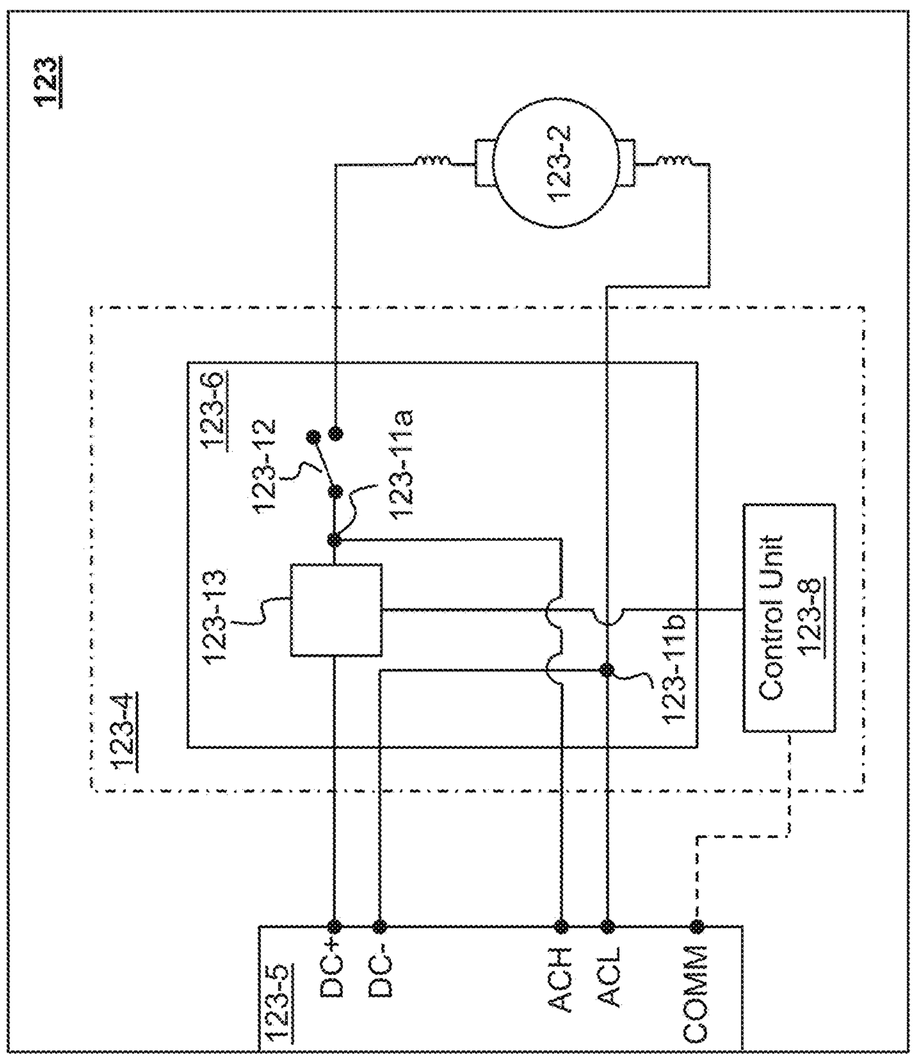
FIG. 6A depicts an exemplary system block diagram of a constant-speed AC/DC power tool with a universal motor, according to an embodiment.

Referring to FIG. 6A, constant-speed universal motor tool 123 is depicted according to one embodiment, where the ACH and DC+ power lines are coupled together at common positive node 123-11*a*, and the ACL and DC− power lines are coupled together at a common negative node 123-11*b*. In this embodiment, ON/OFF switch 123-12 is arranged between the positive common node 123-11*a* and the motor 123-2. To ensure that only one of the AC or DC power supplies are utilized at any given time, in an embodiment, a mechanical lockout may be utilized. In an exemplary embodiment, the mechanical lockout may physically block access to the one of the AC or DC power supplies at any given time.

In addition, as depicted in FIG. 6A, constant-speed universal motor tool 123 may be further provided with a control unit 123-8. In an embodiment, control unit 123-8 may be coupled to a power switch 123-13 that is arranged inside power unit 123-6 between the DC+ power line of power supply interface 123-5 and the ON/OFF switch 123-12. In an embodiment, control unit 123-8 may be provided to monitor the power tool 123 and/or battery conditions. In an embodiment, control unit 123-8 may be coupled to tool 123 elements such as a thermistor inside a tool. In an embodiment, control unit 123-8 may also be coupled to the battery pack(s) via a communication signal line COMM provided from power supply interface 123-5. The COMM signal line may provide a control or informational signal relating to the operation or condition of the battery pack(s) to the control unit 123-8. In an embodiment, control unit 123-8 may be configured to cut off power from the DC+ power line from power supply interface 123-5 using the power switch 123-13 if tool fault conditions (e.g., tool over-temperature, tool over-current, etc.) or battery fault conditions (e.g., battery over-temperature, battery over-current, battery over-voltage, battery under-voltage, etc.) are detected. In an embodiment, power switch 123-13 may include a FET or other controllable switch that is controlled by control unit 123-8.

Figure 6B:
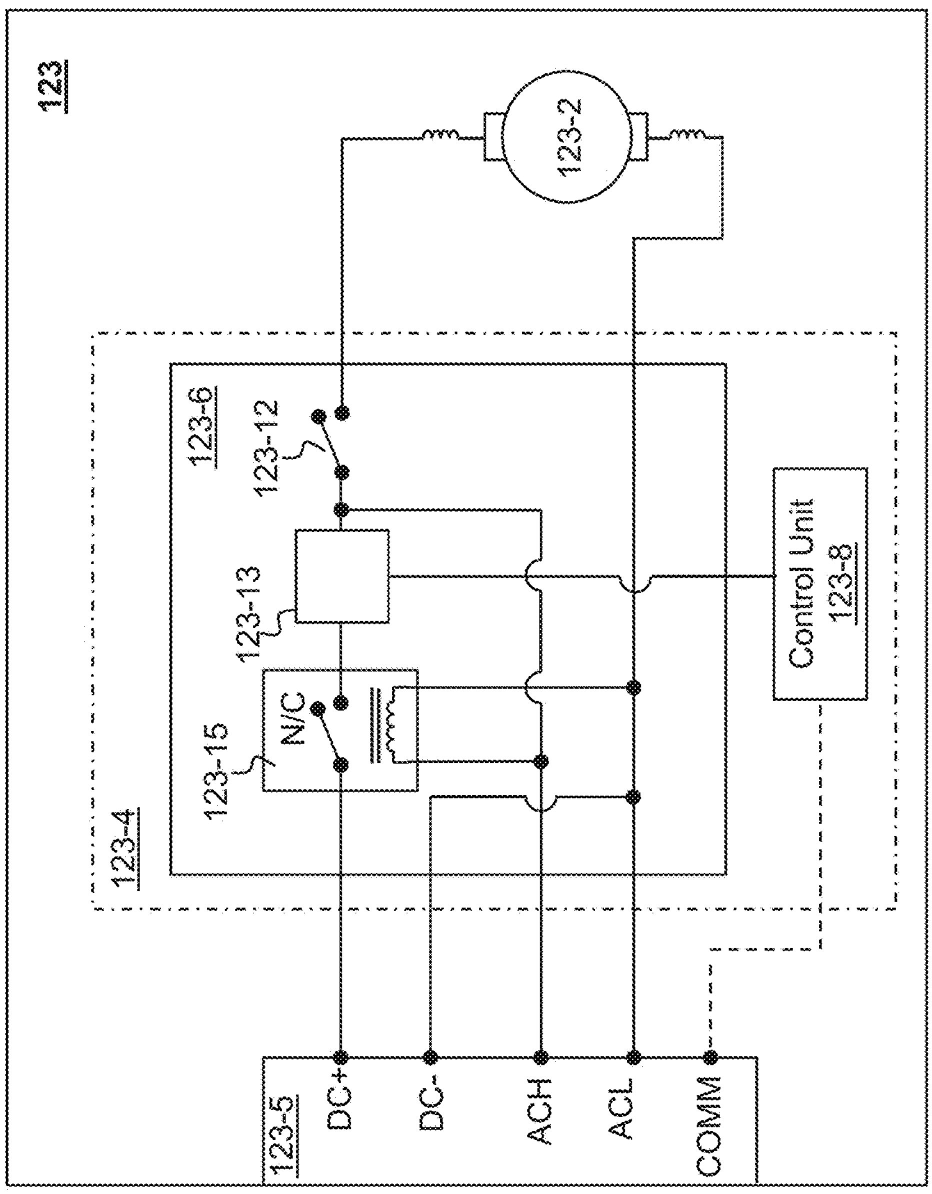
FIG. 6B depicts an exemplary system block diagram of the constant-speed AC/DC power tool of FIG. 6A additionally provided with an exemplary power supply switching unit, according to an embodiment.
Figure 6C:
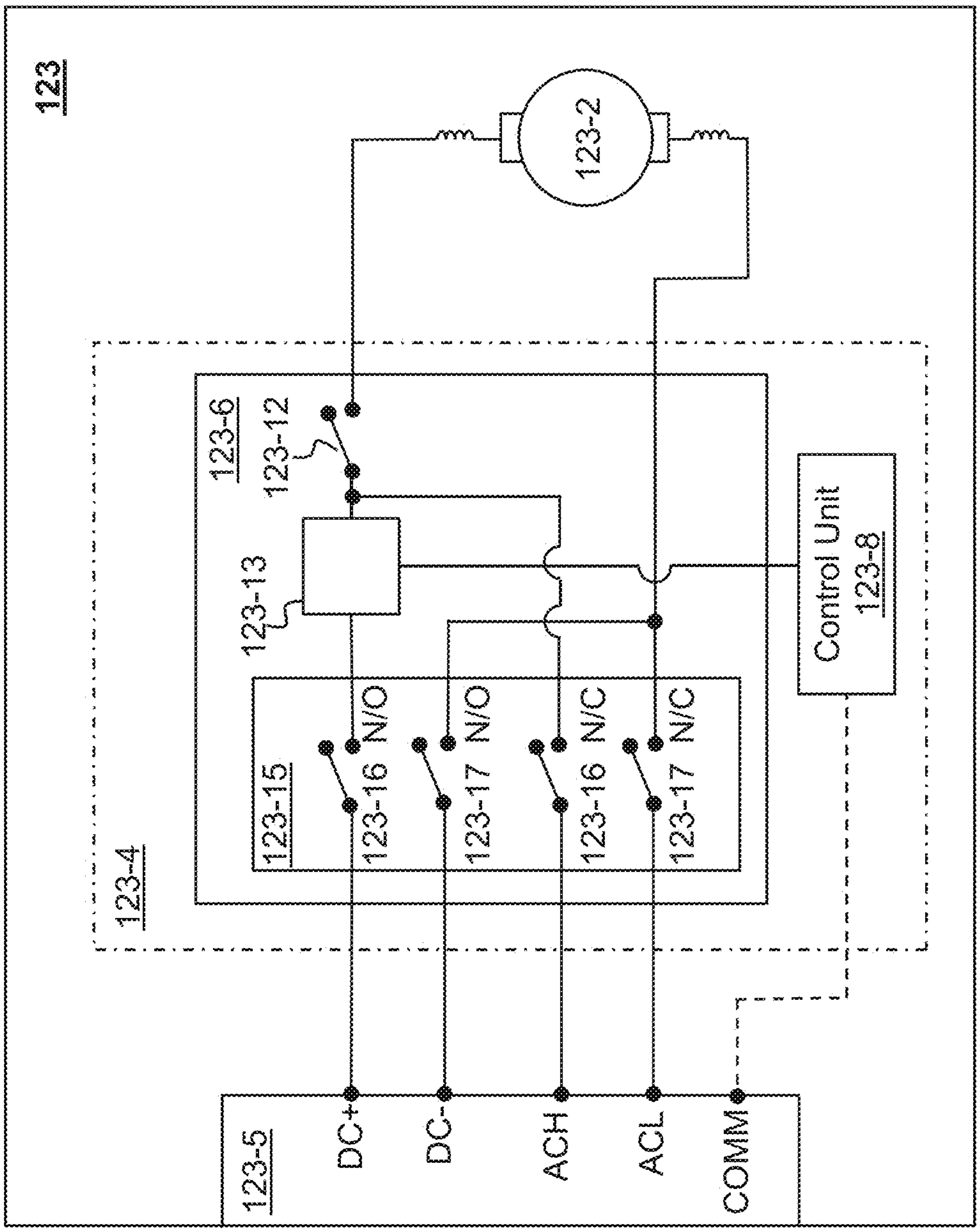
FIG. 6C depicts an exemplary system block diagram of the constant-speed AC/DC power tool of FIG. 6A additionally provided with an alternative exemplary power supply switching unit, according to an embodiment.
Figure 6D:
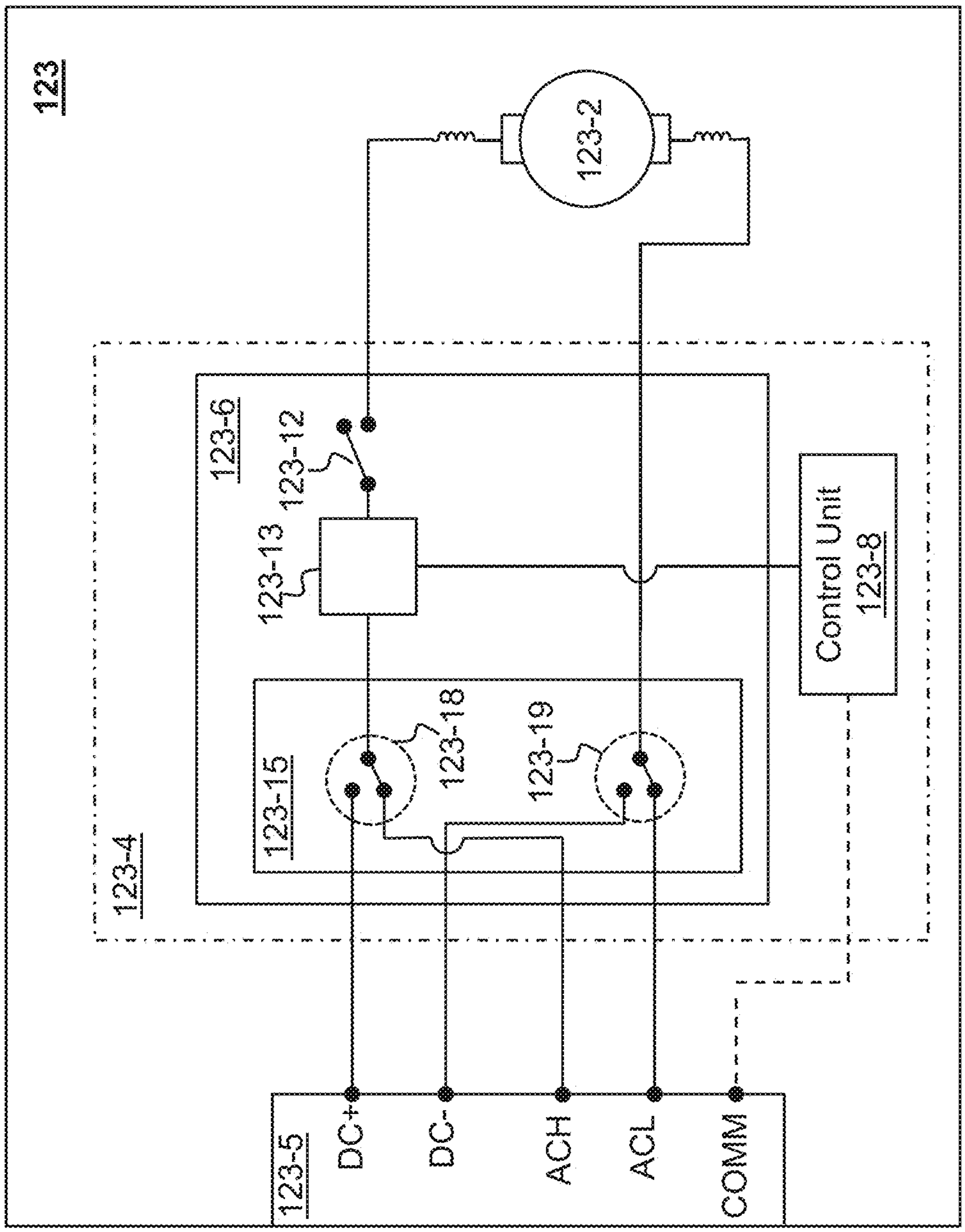
FIG. 6D depicts an exemplary system block diagram of the constant-speed AC/DC power tool of FIG. 6A additionally provided with yet another exemplary power supply switching unit, according to an embodiment.

FIG. 6B-6D depict the constant-speed universal motor tool 123 according to an alternative embodiment, where the DC power lines DC+/DC− and AC power lines ACH/ACL are isolated via a power supply switching unit 123-15 to ensure that power cannot be supplied from both the AC power supply and the DC power supply at the same time (even if the power supply interface 123-5 is coupled to both AC and DC power supplies).

In one embodiment, as shown in FIG. 6B, the power supply switching unit 123-15 may include a normally-closed single-pole, single-throw relay arranged between the DC power line DC+ and the ON/OFF switch 123-12, with a coil coupled to the AC power line ACH and ACL. The output of the power supply switching unit 123-15 and the ACH power line are jointly coupled to the power switch 123-13. When no AC power is being supplied, the relay is inactive, and DC power line DC+ is coupled to the power switch 123-13. When AC power is being supplied, the coil is energized and the relay becomes active, thus disconnecting the DC power line DC+ from the power switch 123-13.

In an alternative or additional embodiment, as shown in FIG. 6C, the power supply switching unit 123-15 may include a double-pole, double-throw switch 123-16 having input terminals coupled to the DC+ and ACH power lines of the power supply interface 123-5, and output terminals jointly coupled to the power switch 123-13. In an embodiment, a second double-pole, double-throw switch 123-17 is provided having input terminals coupled to negative DC− and ACL power lines of the power supply interface 123-5, and output terminals jointly coupled to a negative terminal of the motor 123-2. In an embodiment, switches 123-16 and 123-17 may be controlled via a relay coil similar to FIG. 6B. Alternatively, switches 123-16 and 123-17 may be controlled via a mechanical switching mechanism (e.g., a moving contact provided on the battery receptacle that closes the switches when a battery pack is inserted into the battery receptacle).

In another embodiment, as shown in FIG. 6D, the power supply switching unit 123-15 may include a single-pole, double-throw switch 123-18 having input terminals coupled to DC+ and ACH power lines of the power supply interface 123-5, and an output terminal coupled to the power switch 123-13. In an embodiment, a second single-pole, double-throw switch 123-19 is provided having input terminals coupled to negative DC− and ACL power lines of the power supply interface 123-5, and an output terminal coupled to a negative terminal of the motor 123-2. In an embodiment, switches 123-18 and 123-19 may be controlled via a relay coil similar to FIG. 6B. Alternatively, switches 123-18 and 123-19 may be controlled via a mechanical switching mechanism (e.g., a moving contact provided on the battery receptacle that closes the switches when a battery pack is inserted into the battery receptacle).

It must be understood that while tool 123 in FIGS. 6A-6D is provided with a control unit 123-8 and power switch 123-13 to cut off supply of power in an event of a tool or battery fault condition, tool 123 may be provided without a control unit 123-8 and a power switch 123-13. For example, the battery pack(s) may be provided with its own controller to monitor its fault conditions and manage its operations.

1. Constant-Speed Universal Motor Tools with Power Supplies Having Comparable Voltage Ratings In FIGS. 6A-6D described above, power tools 123 are designed to operate at a high-rated voltage range of, for example, 100V to 120V (which corresponds to the AC power voltage range of 100 VAC to 120 VAC in North America and Japan), or more broadly, 90V to 132V (which is ±10% of the AC power voltage range of 100 to 120 VAC), and at high power (e.g., 1500 to 2500 Watts). Specifically, the motor 123-2 and power unit 123-6 components of power tools 123 are designed and optimized to handle high-rated voltage of 100 to 120V, or more broadly 90V to 132V. This may be done by selecting voltage-compatible power devices, and designing the motor with the appropriate size and winding configuration to handle the high-rated voltage range. The motor 123-2 also has an operating voltage or operating voltage range that may be equivalent to, fall within, or correspond to the operating voltage or the operating voltage range of the tool 123.

In an embodiment, the power supply interface 123-5 is arranged to provide AC power line having a nominal voltage in the range of 100 to 120V (e.g., 120 VAC at 50-60 Hz in the US, or 100 VAC in Japan) from an AC power supply, or a DC power line having a nominal voltage in the range of 100 to 120V (e.g., 108 VDC) from a DC power supply. In other words, the DC nominal voltage and the AC nominal voltage provided through the power supply interface 123-5 both correspond to (e.g., match, overlap with, or fall within) the operating voltage range of the motor 123-2 (i.e., high-rated voltage 100V to 120V, or more broadly approximately 90V to 132V). It is noted that a nominal voltage of 120 VAC corresponds to an average voltage of approximately 108V when measured over the positive half cycles of the AC sinusoidal waveform, which provides an equivalent speed performance as 108 VDC power.

Figure 6E:
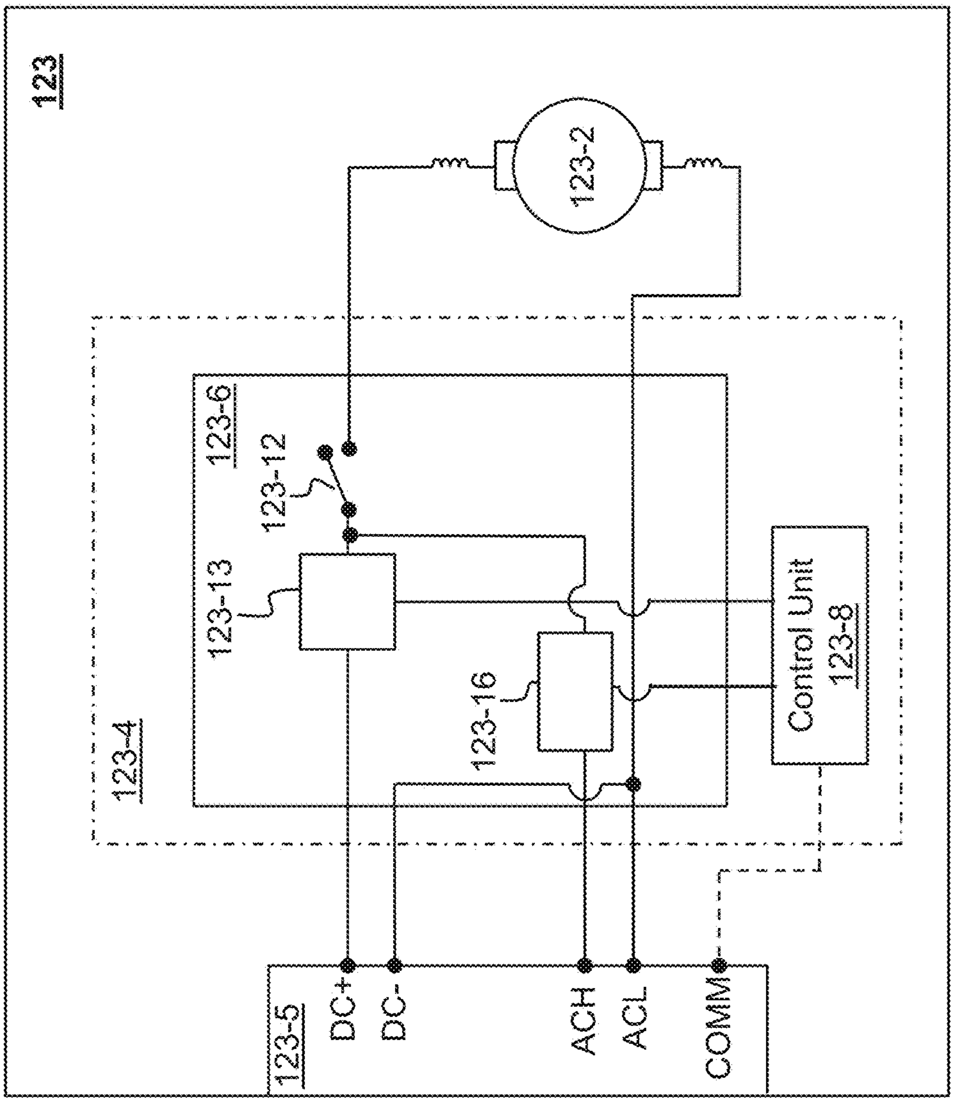
FIG. 6E depicts an exemplary system block diagram of a constant-speed AC/DC power tool with a universal motor where power supplied from an AC power supply has a nominal voltage significantly different from nominal voltage provided from a DC power supply, according to an embodiment.

2. Constant-Speed Universal Motor Tools with Power Supplies Having Disparate Voltage Ratings FIG. 6E depicts a power tool 123, according to another embodiment of the invention, where supply of power provided by the AC power supply has a nominal voltage that is significantly different from a nominal voltage provided from the DC power supply. For example, the AC power line of the power supply interface 123-5 may provide a nominal voltage in the range of 100 to 120V, and the DC power line may provide a nominal voltage in the range of 60V-100V (e.g., 72 VDC or 90 VDC). In another example, the AC power line may provide a nominal voltage in the range of 220 to 240V (e.g., 230V in many European countries or 220V in many African countries), and the DC power line may provide a nominal voltage in the range of 100-120V (e.g., 108 VDC).

Operating the power tool motor 123-2 at significantly different voltage levels may yield significant differences in power tool performance, in particular the rotational speed of the motor, which may be noticeable and in some cases unsatisfactory to the users. Also supplying voltage levels outside the operating voltage range of the motor 123-2 may damage the motor and the associated switching components. Thus, in an embodiment of the invention herein described, the motor control circuit 123-4 is configured to optimize a supply of power to the motor (and thus motor performance) 123-2 depending on the nominal voltage of the AC or DC power lines such that motor 123-2 yields substantially uniform speed and power performance in a manner satisfactory to the end user, regardless of the nominal voltage provided on the AC or DC power lines.

In this embodiment, motor 123-2 may be designed and configured to operate at a voltage range that encompasses the nominal voltage of the DC power line. In an exemplary embodiment, power tool 123 may be designed to operate at a voltage range of for example 60V to 90V (or more broadly ±10% at 54V to 99V) encompassing the nominal voltage of the DC power line of the power supply interface 123-5 (e.g., 72 VDC or 90 VDC), but lower than the nominal voltage of the AC power line (e.g., 220V-240V). In another exemplary embodiment, the motor 123-2 may be designed to operate at a voltage range of 100V to 120V (or more broadly ±10% at 90V to 132V), encompassing the nominal voltage of the DC power line of the power supply interface 123-5 (e.g., 108 VDC), but lower than the nominal voltage range of 220-240V of the AC power line.

In an embodiment, in order for tool 123 to operate with the higher nominal voltage of the AC power line, tool 123 is further provided with a phase-controlled AC switch 123-16. In an embodiment, AC switch 123-16 may include a triac or an SRC switch controlled by the control unit 123-8. In an embodiment, the control unit 123-8 may be configured to set a fixed conduction band (or firing angle) of the AC switch 123-16 corresponding to the operating voltage of the tool 123.

For example, for a tool 123 having a motor 123-2 with an operating voltage range of 60V to 100V but receiving AC power having a nominal voltage of 100V-120V, the conduction band of the AC switch 123-16 may be set to a value in the range of 100 to 140 degrees, e.g., approximately 120 degrees. In this example, the firing angle of the AC switch 123-16 may be set to 60 degrees. By setting the firing angle to approximately 60 degrees, the AC voltage supplied to the motor will be approximately in the range of 70-90V, which corresponds to the operating voltage of the tool 123. In this manner, the control unit 123-8 optimizing the supply of power to the motor 123-2.

In another example, for a tool 123 having a motor 123-2 with an operating voltage range of 100 to 120V but receiving AC power having a nominal voltage of 220-240V, the conduction band of the AC switch 123-16 may be set to a value in the range of 70 to 110 degrees, e.g., approximately 90 degrees. In this example, the firing angle of the AC switch 123-16 may be set to 90 degrees. By setting the firing angle to 90 degrees, the AC voltage supplied to the motor will be approximately in the range of 100-120V, which corresponds to the operating voltage of the tool 123.

In this manner, motor control circuit 123-4 optimizes a supply of power to the motor 123-2 depending on the nominal voltage of the AC or DC power lines such that motor 123-2 yields substantially uniform speed and power performance in a manner satisfactory to the end user, regardless of the nominal voltage provided on the AC or DC power lines.

B. Variable-Speed AC/DC Power Tools with Universal Motors

Turning now to FIG. 7A-7H, the second subset of AC/DC power tools with brushed motors 122 includes variable-speed AC/DC power tools 124 with universal motors (herein also referred to as variable-speed universal-motor tools 124). These include corded/cordless (AC/DC) power tools that operate at variable speed at no load and include brushed universal motors 124-2 configured to operate at a high rated voltage (e.g., 100V to 120V, more broadly 90V to 132V) and high power (e.g., 1500 to 2500 Watts). As discussed above, a universal motor is series-wound motor having stator field coils and a commutator connected to the field coils in series. A universal motor in this manner can work with a DC power supply as well as an AC power supply. In an embodiment, variable-speed universal-motor tools 124 may include high-power tools having variable speed control, such as concrete drills, hammers, grinders, saws, etc.

In an embodiment, variable-speed universal-motor tool 124 is provided with a variable-speed actuator (not shown), e.g., a trigger switch, a touch-sense switch, a capacitive switch, a gyroscope, or other variable-speed input mechanism (not shown) engageable by a user. In an embodiment, the variable-speed actuator is coupled to or includes a potentiometer or other circuitry for generating a variable-speed signal (e.g., variable voltage signal, variable current signal, etc.) indicative of the desired speed of the motor 124-2. In an embodiment, variable-speed universal-motor tool 124 may be additionally provided with an ON/OFF trigger or actuator (not shown) enabling the user to start the motor 124-2. Alternatively, the ON/OFF trigger functionally may be incorporated into the variable-speed actuator (i.e., no separate ON/OFF actuator) such that an initial actuation of the variable-speed trigger by the user acts to start the motor 124-2.

In an embodiment, a variable-speed universal motor tool 124 includes a motor control circuit 124-4 that operates the universal motor 124-2 at a variable speed under no load or constant load. The power tool 124 further includes power supply interface 124-5 arranged to receive power from one or more of the aforementioned DC power supplies and/or AC power supplies. The power supply interface 124-5 is electrically coupled to the motor control circuit 124-4 by DC power lines DC+ and DC− (for delivering power from a DC power supply) and by AC power lines ACH and ACL (for delivering power from an AC power supply).

In an embodiment, motor control circuit 124-4 may include a power unit 124-6. In an embodiment, power unit 124-6 may include a DC switch circuit 124-14 arranged between the DC power lines DC+/DC− and the motor 124-2, and an AC switch 124-16 arranged between the AC power lines ACH/ACL and the motor 124-2. In an embodiment, DC switch circuit 124-14 may include a combination of one or more power semiconductor devices (e.g., diode, FET, BJT, IGBT, etc.) arranged to switchably provide power from the DC power lines DC+/DC− to the motor 124-2. In an embodiment, AC switch 124-16 may include a phase-controlled AC switch (e.g., triac, SCR, thyristor, etc.) arranged to switchably provide power from the AC power lines ACH/ACL to the motor 124-2.

In an embodiment, motor control circuit 124-4 may further include a control unit 124-8. Control unit 124-8 may be arranged to control a switching operation of the DC switch circuit 124-14 and AC switch 124-16. In an embodiment, control unit 124-8 may include a micro-controller or similar programmable module configured to control gates of power switches. In an embodiment, the control unit 124-8 is configured to control a PWM duty cycle of one or more semiconductor switches in the DC switch circuit 124-14 in order to control the speed of the motor 124-2 based on the speed signal from the variable-speed actuator when power is being supplied from one or more battery packs through the DC power lines DC+/DC−. Similarly, the control unit 124-8 is configured to control a firing angle (or conduction angle) of AC switch 124-16 in order to control the speed of the motor 124-2 based on the speed signal from the variable-speed actuator when power is being supplied from the AC power supply through the AC power lines ACH/ACL.

In an embodiment, control unit 124-8 may also be coupled to the battery pack(s) via a communication signal line COMM provided from power supply interface 124-5. The COMM signal line may provide a control or informational signal relating to the operation or condition of the battery pack(s) to the control unit 124-8. In an embodiment, control unit 124-8 may be configured to cut off power from the DC output line of power supply interface 124-5 using DC switch circuit 124-14 if battery fault conditions (e.g., battery over-temperature, battery over-current, battery over-voltage, battery under-voltage, etc.) are detected. Control unit 124-8 may further be configured to cut off power from either the AC or DC output lines of power supply interface 124-5 using DC switch circuit 124-14 and/or AC switch 124-16 if tool fault conditions (e.g., tool over-temperature, tool over-current, etc.) are detected.

In an embodiment, power unit 124-6 may be further provided with an electro-mechanical ON/OFF switch 124-12 coupled to the ON/OFF trigger or actuator discussed above. The ON/OFF switch simply connects or disconnects supply of power from the power supply interface 124-5 to the motor 124-2. Alternatively, the control unit 124-8 may be configured to deactivate DC switch circuit 124-14 and AC switch 124-16 until it detects a user actuation of the ON/OFF trigger or actuator (or initial actuator of the variable-speed actuator if ON/OFF trigger functionally is be incorporated into the variable-speed actuator). The control unit 124-8 may then begin operating the motor 124-2 via either the DC switch circuit 124-14 or AC switch 124-16. In this manner, power unit 124-6 may be operable without an electro-mechanical ON/OFF switch 124-12.

Figure 7A:
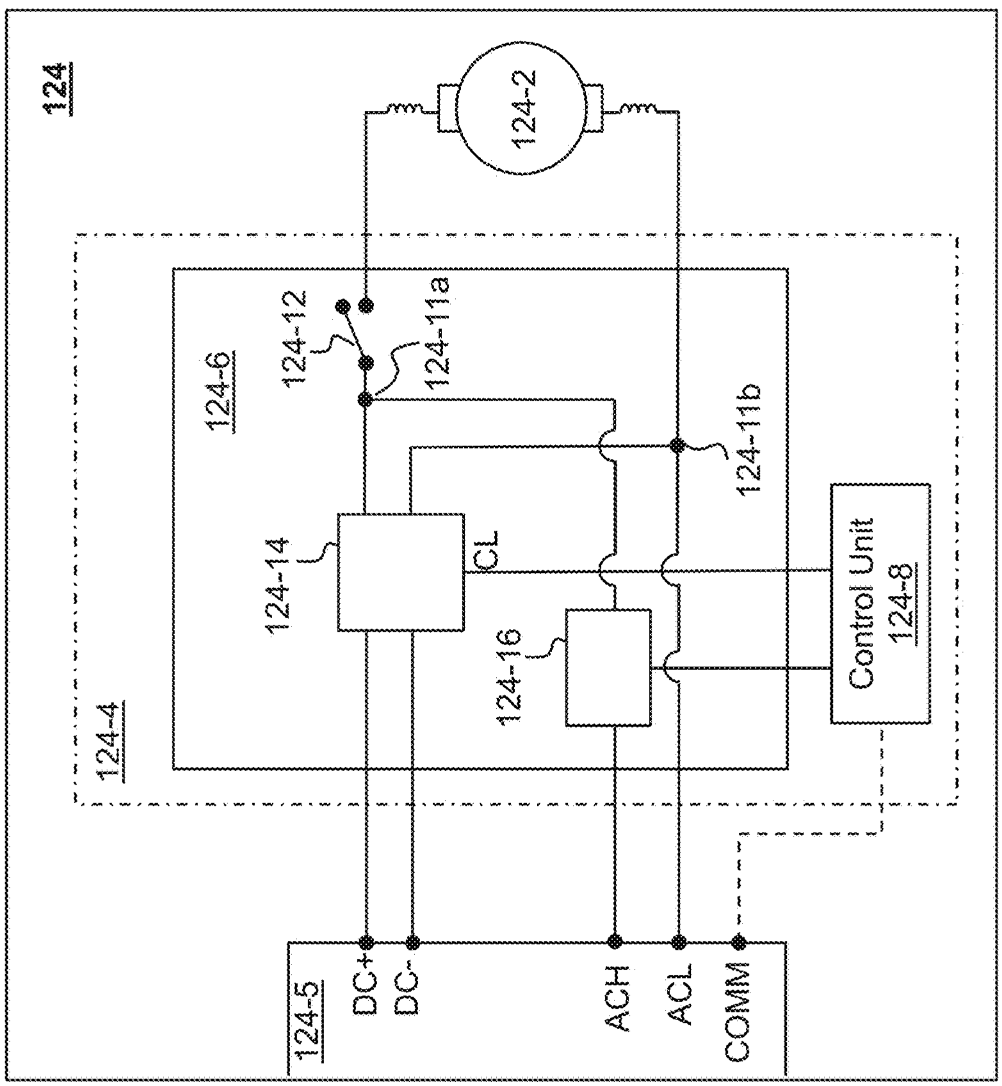
FIG. 7A depicts an exemplary system block diagram of a variable-speed AC/DC power tool with a universal motor, according to an embodiment.

Referring to FIG. 7A, the variable-speed universal motor tool 124 is depicted according to one embodiment, where the ACH and DC+ power lines are coupled together at common positive node 124-11*a*, and the ACL and DC− power lines are coupled together at a common negative node 124-11*b*. In this embodiment, ON/OFF switch 124-12 is arranged between the positive common node 124-11*a* and the motor 124-2. To ensure that only one of the AC or DC power supplies are utilized at any given time, in an embodiment, the control unit 124-8 may be configured to activate only one of the DC switch circuit 124-14 and AC switch 124-16 at any given time.

In a further embodiment, as a redundancy measure and to minimize electrical leakage, a mechanical lockout may be utilized. In an exemplary embodiment, the mechanical lockout may physically block access to the AC or DC power supplies at any given time.

Figure 7B:
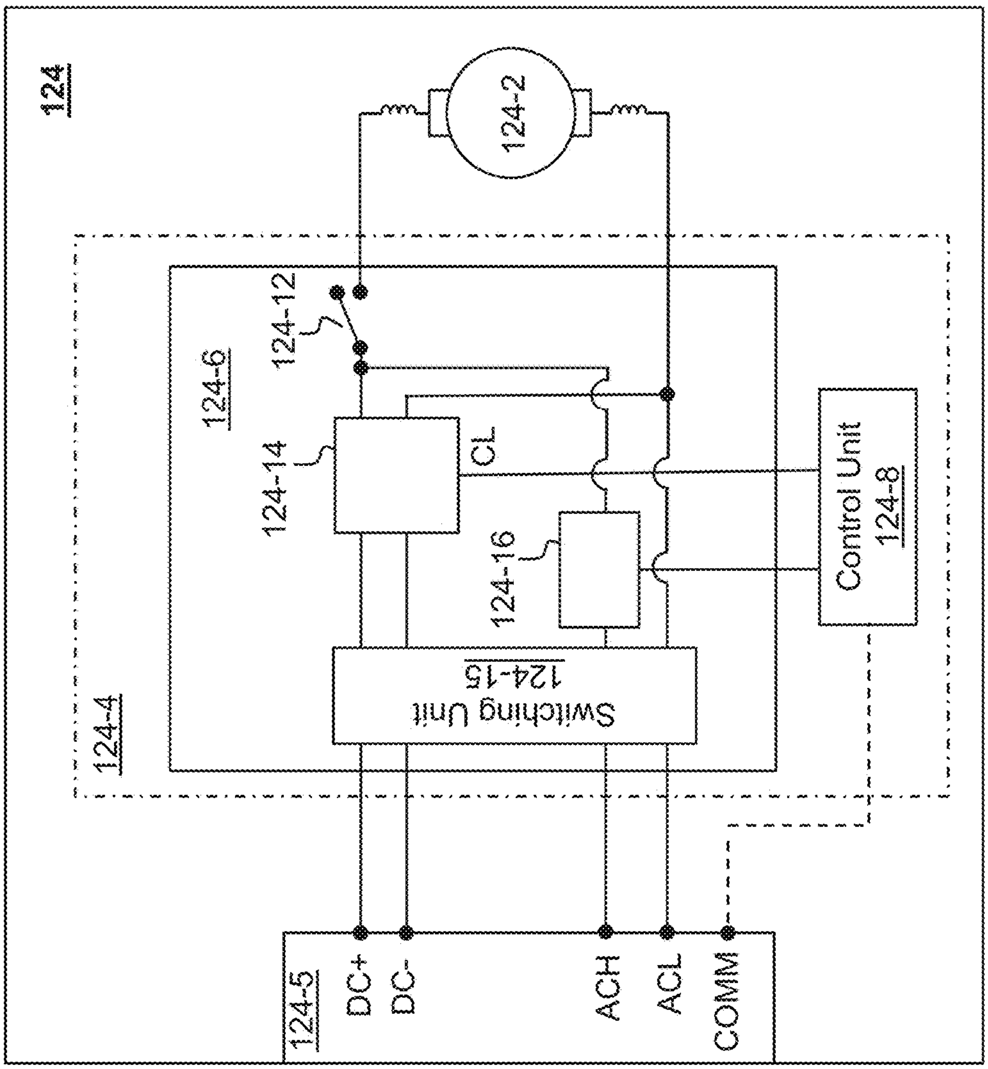
FIG. 7B depicts an exemplary system block diagram of the constant-speed AC/DC power tool of FIG. 7A additionally provided with a power supply switching unit, according to an embodiment.

FIG. 7B depicts the variable-speed universal motor tool 124 is depicted according to an alternative embodiment, where DC power lines DC+/DC− and AC power lines ACH/ACL are isolated via a power supply switching unit 124-15 to ensure that power cannot be supplied from both the AC power supply and the DC power supply at the same time (even if the power supply interface 124-5 is coupled to both AC and DC power supplies). Switching unit 124-15 may be configured to include relays, single-pole double-throw switches, double-pole double-throw switches, or a combination thereof, as shown and described with reference to FIGS. 6B to 6D. It should be understood that while the power supply switching unit 124-15 in FIG. 7B is depicted between the power supply interface 124-5 on one side, and the DC switch circuit 124-14 and AC switch 124-16 on the other side, the power supply switching unit 124-15 may alternatively be provided between the DC switch circuit 124-14 and AC switch 124-16 on one side, and the motor 124-2 on the other side, depending on the switching arrangement utilized in the power supply switching unit 124-15.

Figure 7D:
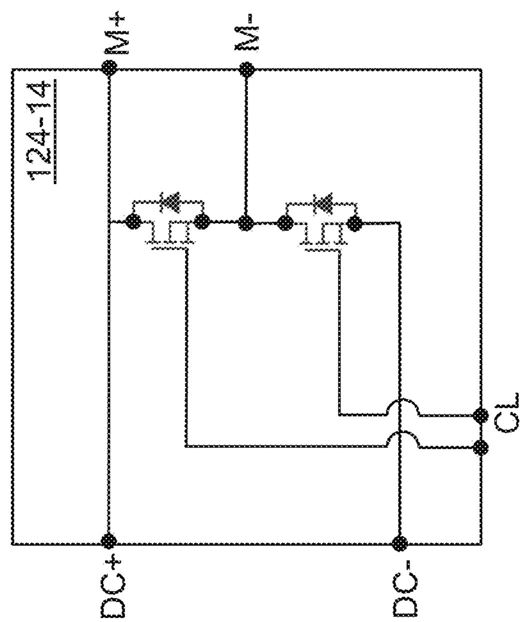
FIGS. 7C-7E depict exemplary circuit diagrams of various embodiments of a DC switch circuit.
Figure 7C:
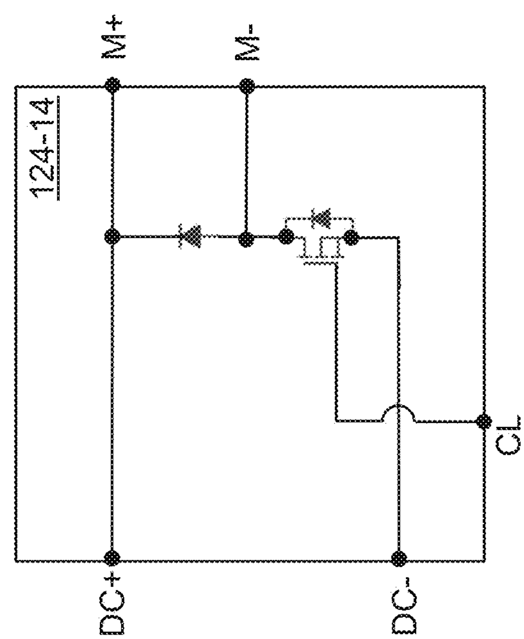
Figure 7E:
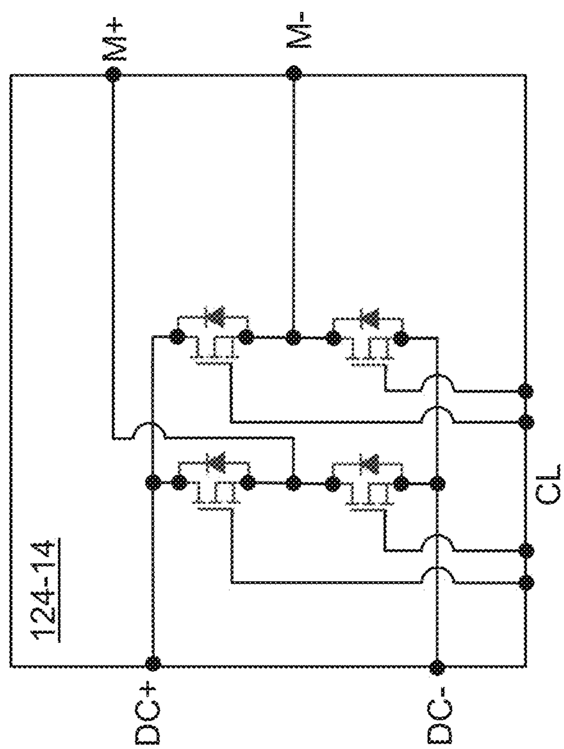

As discussed above, DC switch circuit 124-14 may include a combination of one or more semiconductor devices. FIGS. 7C to 7E depict various arrangements and embodiments of the DC switch circuit 124-14. In one embodiment shown in FIG. 7C, a combination of a FET and a diode is used in what is known as a chopper circuit, and the control unit 124-8 drives the gate of the FET (via a gate driver that is not shown) to control a PWM duty cycle of the motor 124-2. In another embodiment, as shown in FIG. 7D, a combination of two FETs is used in series (i.e., a half-bridge). The control unit 124-8 may in this case drive the gates or one or both FETs (i.e., single-switch PWM control or PWM control with synchronous rectification). In yet another embodiment, as shown in FIG. 7E, a combination of four FETs is used as an H-bridge (full-bridge). The control unit 124-8 may in this case drive the gates or two or four FETs (i.e., without or with synchronous rectification) from 0% to 100% PWM duty cycle correlating to the desired speed of the motor from zero to full speed. It is noted that any type of controllable semiconductor device such as a BJT, IGBT, etc. may be used in place of the FETs shown in these figures. For a detailed description of these circuits and the associated PWM control mechanisms, reference is made to U.S. Pat. No. 8,446,120 titled: "Electronic Switch Module for a Power Tool," which is incorporated herein by reference in its entirety.

Referring again to FIGS. 7A and 7B, AC switch 124-16 may include a phase-controlled AC power switch such as a triac, a SCR, a thyristor, etc. arranged in series on AC power line ACH and/or AC power line ACL. In an embodiment, the control unit 124-8 controls the speed of the motor by switching the motor current on and off at periodic intervals in relation to the zero crossing of the AC current or voltage waveform. The control unit 124-8 may fire the AC switch 124-16 at a conduction angle of between 0 to 180 degrees within each AC half cycle correlating to the desired speed of the motor from zero to full speed. For example, if the desired motor speed is 50% of the full speed, control unit 124-8 may fire the AC switch 124-16 at 90 degrees, which is the medium point of the half cycle. Preferably such periodic intervals are caused to occur in synchronism with the original AC waveform. The conduction angle determines the point within the AC waveform at which the AC switch 124-16 is fired, i.e. turned on, thereby delivering electrical energy to the motor 124-2. The AC switch 124-16 turns off at the conclusion of the selected period, i.e., at the zero-crossing of the AC waveform. Thus, the conduction angle is measured from the point of firing of AC switch 124-16 to the zero-crossing. For a detailed description of phase control of a triac or other phase controlled AC switch in a power tool, reference is made to U.S. Pat. No. 8,657,031, titled "Universal Control Module," U.S. Pat. No. 7,834,566, titled: "Generic Motor Control," and U.S. Pat. No. 5,986,417, titled: "Sensorless Universal Motor Speed Controller," each of which are incorporated herein by reference in its entirety.

As discussed, control unit 124-8 controls the switching operation of both DC switch circuit 124-14 and AC switch 124-16. When tool 124 is coupled to an AC power supply, the control unit 124-8 may sense current through the AC power lines ACH/ACL and set its mode of operation to control the AC switch 124-16. In an embodiment, when tool 124 is coupled to a DC power supply, the control unit 124-8 may sense lack of zero crossing on the AC power lines ACH/ACL and change its mode of operation to control the DC switch circuit 124-14. It is noted that control unit 124-8 may set its mode of operation in a variety of ways, e.g., by sensing a signal from the COMM signal line, by sensing voltage on the DC power lines DC+/DC−, etc.

1. Integrated Power Switch/Diode Bridge

Figure 7F:
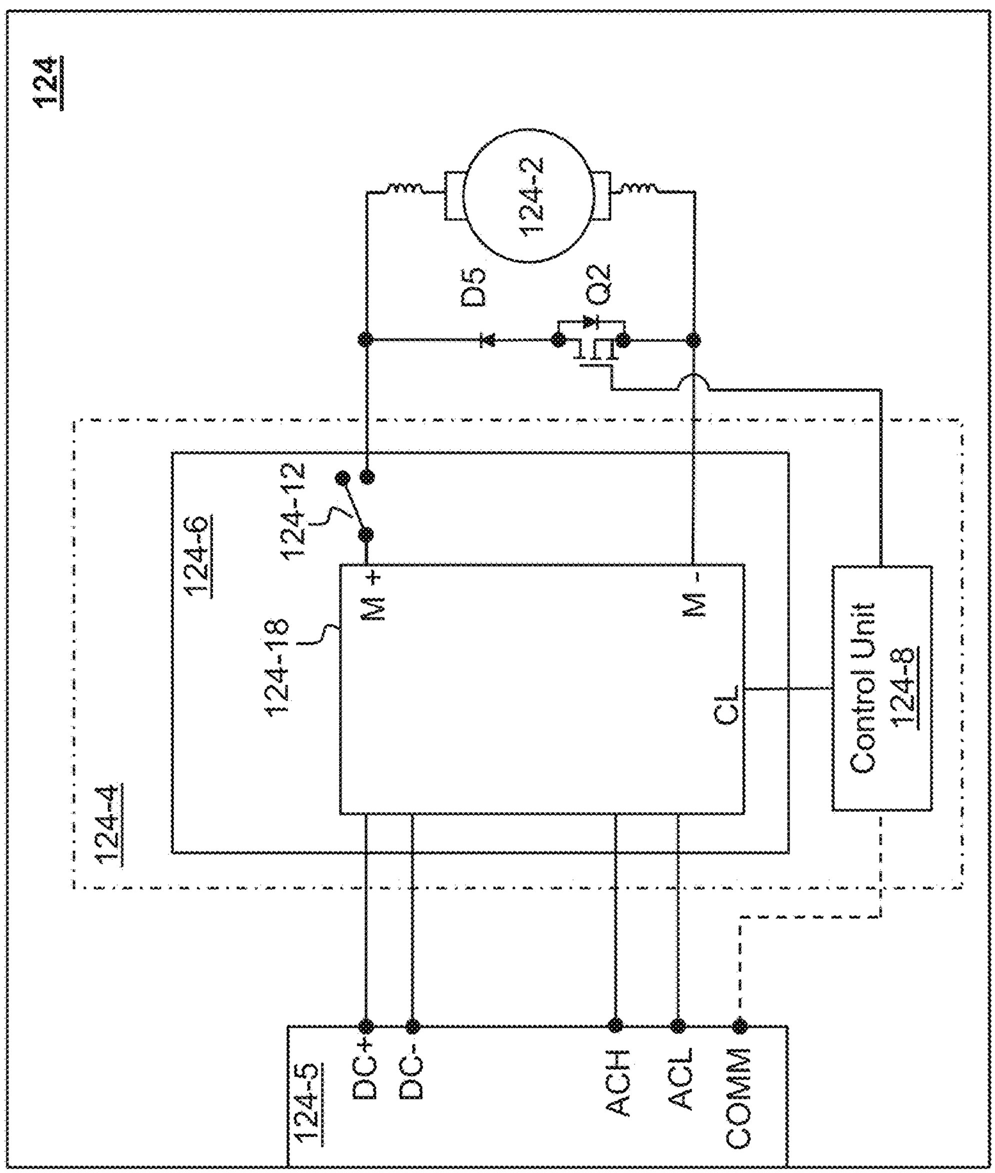
FIG. 7F depicts an exemplary system block diagram of a variable-speed AC/DC power tool with a universal motor having an integrated AC/DC power switching circuit, according to an alternative embodiment.
Figure 7H:
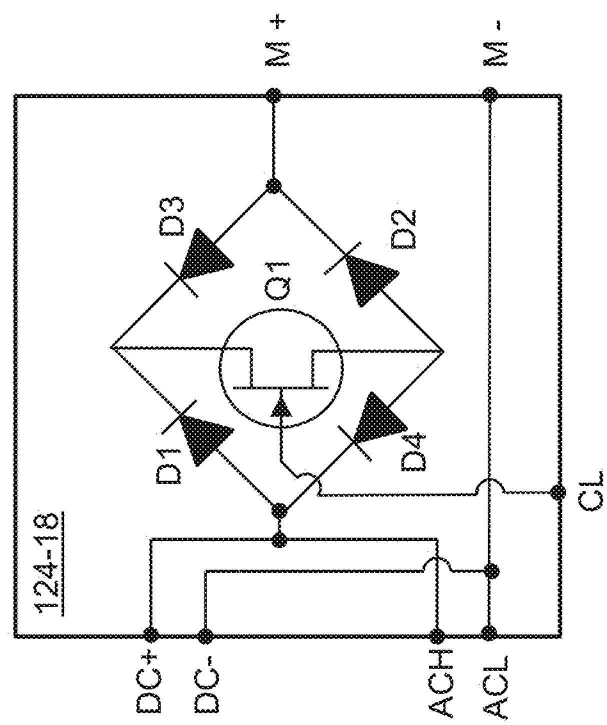
FIGS. 7G and 7H depict exemplary circuit diagrams of various embodiments of the integrated AC/DC power switching circuit.
Figure 7G:
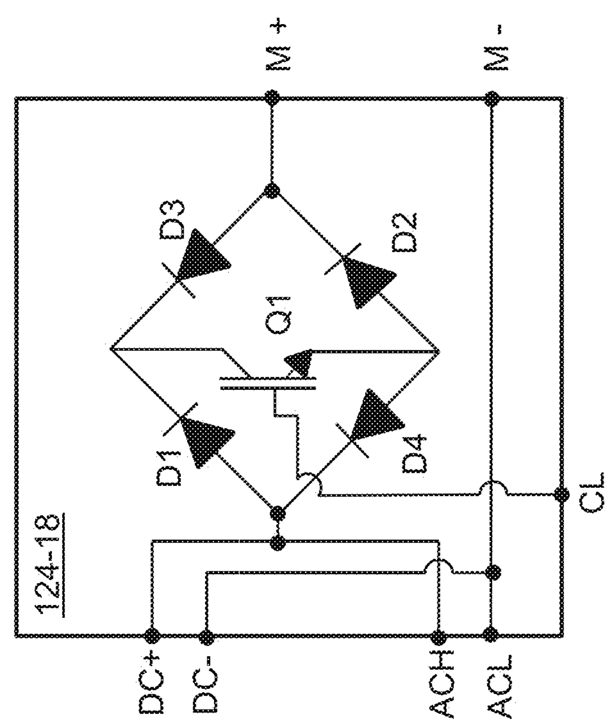

Referring now to FIGS. 7F-7H, variable-speed universal-motor tool 124 is depicted according to an alternative embodiment, where the AC and DC power lines of the power supply interface 124-5 are coupled to an integrated AC/DC power switching circuit 124-18.

As shown in FIGS. 7G and 7H, integrated AC/DC power switching circuit 124-18 includes a semiconductor switch Q1 nested within a diode bridge configured out of diodes D1-D4. Semiconductor switch Q1 may be a field effect transistor (FET) as shown in FIG. 7H, or an insulated gate bipolar transistor (IGBT) as shown in FIG. 7G. The semiconductor switch Q1 is arranged between D1 and D3 on one end and between D2 and D4 on the other end. Line inputs DC+ and ACH are jointly coupled to a node of the diode bridge between D1 and D4. The positive motor terminal M+ is coupled to a node of the diode bridge between D2 and D3.

When tool 124 is coupled to a DC power supply, in an embodiment, the control unit 124-8 sets its mode of operation to DC mode, as discussed above. In this mode, control unit 124-8 controls the semiconductor switch Q1 via a PWM technique to control motor speed, i.e., by turning switch Q1 ON and OFF to provide a pulse voltage. The PWM duty cycle, or ratio of the ON and OFF periods in the PWM signal, is selected according to the desired speed of the motor.

When tool 124 is coupled to an AC power supply, in an embodiment, the control unit 124-8 sets its mode of operation to AC, as discussed above. In this mode, control unit 124-8 controls the semiconductor switch Q1 in a manner to resemble a switching operation of a phase controlled switch such as a triac. Specifically, the switch Q1 is turned ON by the control unit 124-8 correspondingly to a point of the AC half cycle where a triac would normally be fired. The control unit 124-8 continued to keep the switch Q1 ON until a zero-crossing has been reached, which indicates the end of the AC half cycle. At that point, control unit 124-8 turns switch Q1 OFF correspondingly to the point of current zero crossing. In this manner the control unit 124-8 controls the speed of the motor by turning switch Q1 ON within each half cycle to control the conduction angle of each AC half cycle according to the desired speed of the motor.

When power is supplied via DC power lines DC+/DC−, current flows through D1-Q1-D2 into the motor 124-2. As mentioned above, control unit 124-8 controls the speed of the motor by controlling a PWM duty cycle of switch Q1. When power is supplied via AC power lines ACH/ACL, current flows through D1-Q1-D2 during every positive half-cycle, and through D3-Q1-D4 through every negative half-cycle. Thus, the diode bridge D1-D4 acts to rectify the AC power passing through the switch Q1, but it does not rectify the AC power passing through the motor terminals M+/M−. As mentioned above, control unit 124-8 controls the speed of the motor by controlling a conduction band of each half cycle via switch Q1.

It is noted that in an embodiment, control unit 124-8 may perform PWM control on switch Q1 in both the AC and DC modes of operation. Specifically, instead of controlling a conduction band of the AC line within each half-cycle, control unit 124-8 may select a PWM duty cycle and using the PWM technique discussed above to control the speed of the motor.

Depending on the motor 124-2 size and property, motor 124-2 may have an inductive current that is slightly delayed with respect to the AC line current. In the AC mode of operation, this current is allowed to decay down to zero at the end of each AC half cycle, i.e., after every voltage zero crossing. However, in the DC mode of operation, it is desirable to provide a current path for the inductive current of the motor 124-2. Thus, according to an embodiment, a freewheeling switch Q2 and a freewheeling diode D5 are further provided parallel to the motor 124-2 to provide a path for the inductive current flowing through the motor 124-2 when Q1 has been turned OFF. In an embodiment, in the AC mode of operation, control unit 124-8 is configured to keep Q2 OFF at all times. However, in the DC mode of operation, control unit 124-8 is configured to keep freewheeling switch Q2 ON.

In a further embodiment, control unit 124-8 is configured to turn Q2 ON when switch Q1 is turned OFF, and vice versa. In other words, when Q1 is being pulse-width modulated, the ON and OFF periods of switch Q1 will synchronously coincide with the OFF and ON periods of switch Q2. This ensures that the freewheeling current path of Q2/D5 does not short the motor 124-8 during any Q1 ON cycle.

With such arrangement, the speed of motor 124-2 can be controlled regardless of whether power tool 124 is connected to an AC or a DC power supply.

2. Variable-Speed Universal Motor Tools with Power Supplies Having Comparable Voltage Ratings In FIGS. 7A, 7B, and 7F described above, power tools 124 are designed to operate at a high-rated voltage range of, for example, 100V to 120V (which corresponds to the AC power voltage range of 100V to 120 VAC), or more broadly, 90V to 132V (which corresponds to ±10% of the AC power voltage range of 100 to 120 VAC), and at high power (e.g., 1500 to 2500 Watts). The motor 124-2 also has an operating voltage or operating voltage range that may be equivalent to, fall within, or correspond to the operating voltage or the operating voltage range of the tool 124.

In an embodiment, the power supply interface 124-5 is arranged to provide an AC voltage having a nominal voltage that is significantly different from a nominal voltage provided from the DC power supply. For example, the AC power line of the power supply interface 124-5 may provide a nominal voltage in the range of 100 to 120V, and the DC power line may provide a nominal voltage in the range of 60V-100V (e.g., 72 VDC or 90 VDC). In another example, the AC power line may provide a nominal voltage in the range of 220 to 240V (e.g., 230V in many European countries or 220V in many African countries), and the DC power line may provide a nominal voltage in the range of 100-120V (e.g., 108 VDC).

3. Variable-Speed Universal Motor Tools with Power Supplies Having Disparate Voltage Ratings According to an alternative embodiment of the invention, voltage provided by the AC power supply has a nominal voltage that is significantly different from a nominal voltage provided from the DC power supply. For example, the AC power line of the power supply interface 124-5 may provide a nominal voltage in the range of 100 to 120V, and the DC power line may provide a nominal voltage in the range of 60V-100V (e.g., 72 VDC or 90 VDC). In another example, the AC power line may provide a nominal voltage in the range of 220 to 240V (e.g., 230V in many European countries or 220V in many African countries), and the DC power line may provide a nominal voltage in the range of 100-120V (e.g., 108 VDC).

Operating the power tool motor 124-2 at significantly different voltage levels may yield significant differences in power tool performance, in particular the rotational speed of the motor, which may be noticeable and in some cases unsatisfactory to the users. Also supplying voltage levels outside the operating voltage range of the motor 124-2 may damage the motor and the associated switching components. Thus, in an embodiment of the invention herein described, the motor control circuit 124-4 is configured to optimize a supply of power to the motor (and thus motor performance) 124-2 depending on the nominal voltage of the AC or DC power lines such that motor 124-2 yields substantially uniform speed and power performance in a manner satisfactory to the end user, regardless of the nominal voltage provided on the AC or DC power lines.

In this embodiment, motor 124-2 may be designed and configured to operate at a voltage range that encompasses the nominal voltage of the DC power line. In an exemplary embodiment, motor 124-2 may be designed to operate at a voltage range of for example 60V to 90V (or more broadly ±10% at 54V to 99V) encompassing the nominal voltage of the DC power line of the power supply interface 124-5 (e.g., 72 VDC or 90 VDC), but lower than the nominal voltage of the AC power line (e.g., 220V-240V). In another exemplary embodiment, motor 124-2 may be designed to operate at a voltage range of 100V to 120V (or more broadly ±10% at 90V to 132V), encompassing the nominal voltage of the DC power line of the power supply interface 124-5 (e.g., 108 VDC), but lower than the nominal voltage range of 220-240V of the AC power line.

In an embodiment, in order for motor 124-2 to operate to operate with the higher nominal voltage of the AC power line, control unit 124-8 may be configured to set a fixed maximum conduction band for the phase-controlled AC switch 124-16 corresponding to the operating voltage of the tool 124. Specifically, the control unit 124-8 may be configured to set a fixed firing angle corresponding to the maximum speed of the tool (e.g., at 100% trigger displacement) resulting in a conduction band of less than 180 degrees within each AC half-cycle at maximum no-load speed. This allows the control unit 124-8 to optimize the supply of power to the motor by effectively reducing the total voltage provided to the motor 124-2 from the AC power supply.

For example, for a motor 124-2 having an operating voltage range of 60 to 100V but receiving AC power having a nominal voltage of 100-120V, the conduction band of the AC switch 124-16 may be set to a maximum of approximately 120 degrees. In other words, the firing angle of the AC switch 124-16 may be varied from 60 degrees (corresponding to 120 degrees conduction angle) at full desired speed to 180 degrees (corresponding to 0 degree conduction angle) at no-speed. By setting the maximum firing angle to approximately 60 degrees, the AC voltage supplied to the motor at full desired speed will be approximately in the range of 70-90V, which corresponds to the operating voltage of the tool 124.

In this manner, motor control circuit 124-4 optimizes a supply of power to the motor 124-2 depending on the nominal voltage of the AC or DC power lines such that motor 124-2 yields substantially uniform speed and power performance in a manner satisfactory to the end user, regardless of the nominal voltage provided on the AC or DC power lines.

C. Constant-Speed AC/DC Power Tools with Brushed PMDC Motors

Figure 8A:
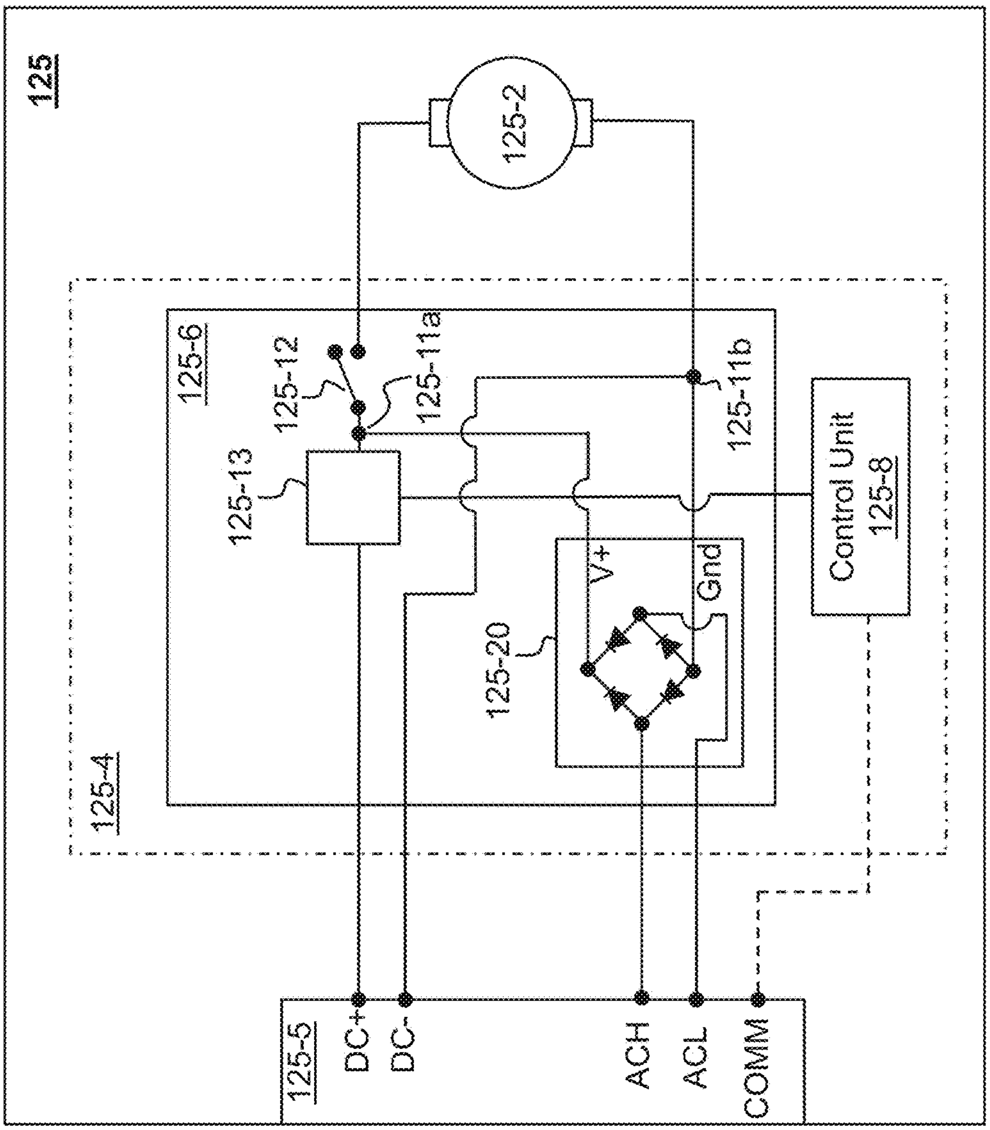
FIG. 8A depicts an exemplary system block diagram of a constant-speed AC/DC power tool with a brushed direct-current (DC) motor, according to an embodiment.
Figure 8B:
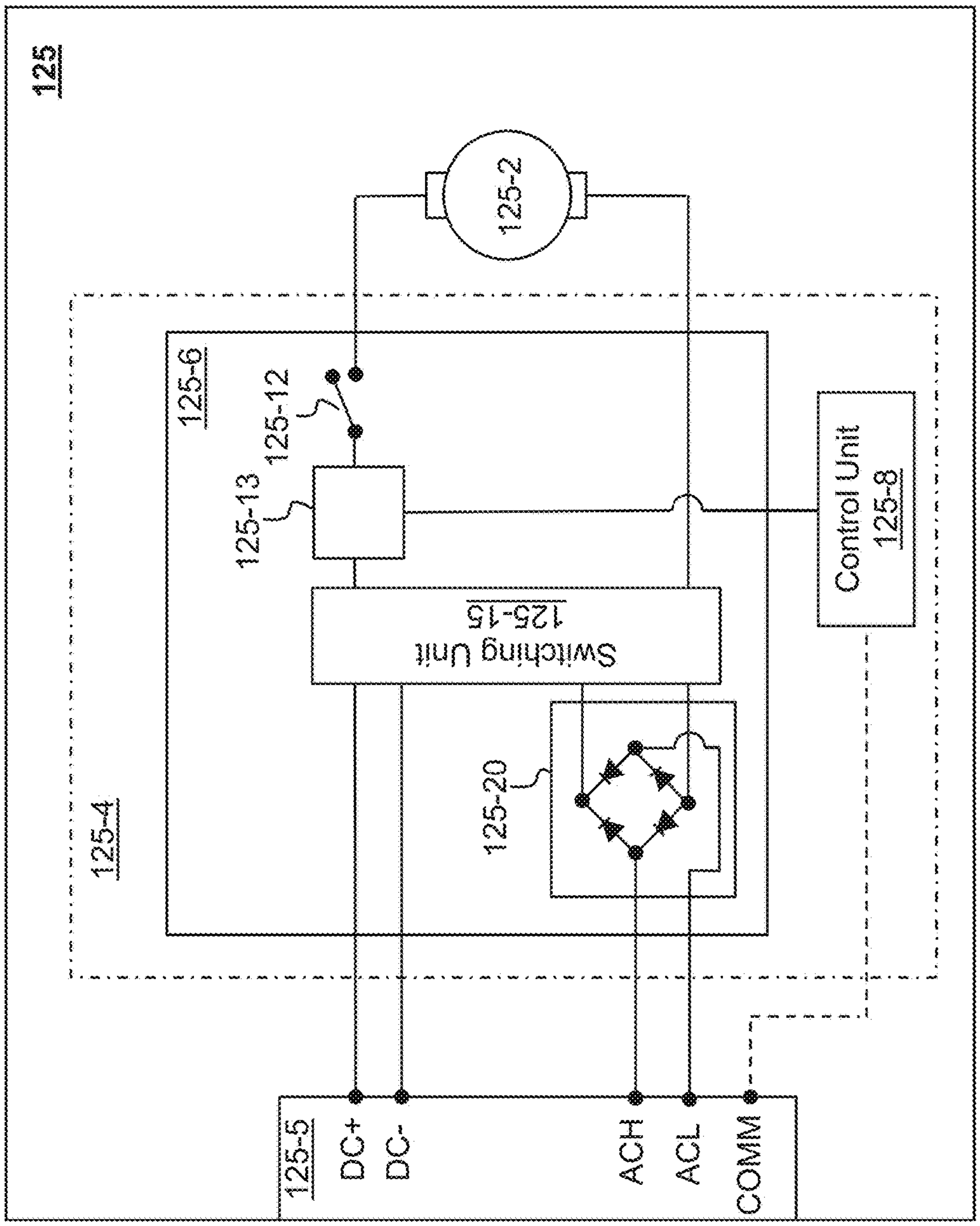
FIG. 8B depicts an exemplary system block diagram of the constant-speed AC/DC power tool of FIG. 8A additionally provided with an exemplary power supply switching unit, according to an embodiment.

Turning now to FIGS. 8A and 8B, the third subset of AC/DC power tools with brushed motors 122 includes constant-speed AC/DC power tools 125 with permanent magnet DC (PMDC) brushed motors (herein referred to as constant-speed PMDC tools 125), which tend to be more efficient than universal motors. These include corded/cordless (AC/DC) power tools that operate at constant speed at no load (or constant load) and include PMDC brushed motors 125-2 configured to operate at a high rated voltage (e.g., 100V to 120V) and high power (e.g., 1500 to 2500 Watts). A PMDC brushed motor generally includes a wound rotor coupled to a commutator, and a stator having permanent magnets affixed therein. A PMDC motor, as the name implies, works with DC power only. This is because the permanent magnets on the stator do not change polarity, and as the AC power changes from a positive half-cycle to a negative half-cycle, the polarity change in the brushes brings the motor to a stand-still. For this reason, in an embodiment, as shown in FIGS. 8A and 8B, power from the AC power supply is passed through a rectifier circuit 125-20 to convert or remove the negative half-cycles of the AC power. In an embodiment, rectifier circuit 125-20 may be a full-wave rectifier arranged to rectify the AC voltage waveform by converting the negative half-cycles of the AC power to positive half-cycles. Alternatively, in an embodiment, rectifier circuit 125-20 may be a half-wave rectifier circuit to eliminate the half-cycles of the AC power. In an embodiment, the rectifier circuit 125-20 may be additionally provided with a link capacitor or a smoothing capacitor (not shown). In an embodiment, constant-speed PMDC motor tools 125 may include high powered tools for high power applications such as concrete hammers, miter saws, table saws, vacuums, blowers, and lawn mowers, etc.

Many aspects of the constant-speed PMDC motor tool 125 are similar to those of the constant-speed universal motor tool 123 previously discussed with reference to FIGS. 6A-6E. In an embodiment, a constant-speed PMDC motor tool 125 includes a motor control circuit 125-4 that operates the PMDC motor 125-2 at a constant speed under no load. The power tool 125 further includes power supply interface 125-5 arranged to receive power from one or more of the aforementioned DC power supplies and/or AC power supplies. The power supply interface 125-5 is electrically coupled to the motor control circuit 125-4 by DC power lines DC+ and DC− (for delivering power from a DC power supply) and by AC power lines ACH and ACL (for delivering power from an AC power supply).

In an embodiment, motor control circuit 125-4 includes a power unit 125-6. Power unit 125-6 may include an electromechanical ON/OFF switch 125-12 provided in series with the motor 125-2 and coupled to an ON/OFF trigger or actuator (not shown). Additionally and/or alternatively, power unit 125 may include a power switch 125-13 coupled to the DC power lines DC+/DC− and to a control unit 125-8. In an embodiment, control unit 125-8 may be provided to monitor the power tool 125 and/or battery conditions. In an embodiment, control unit 125-8 may be coupled to tool 125 elements such as a thermistor inside a tool. In an embodiment, control unit 125-8 may also be coupled to the battery pack(s) via a communication signal line COMM provided from power supply interface 125-5. The COMM signal line may provide a control or informational signal relating to the operation or condition of the battery pack(s) to the control unit 125-8. In an embodiment, control unit 125-8 may be configured to cut off power from the DC+ output line of power supply interface 125-5 using the power switch 125-13 if tool fault conditions (e.g., tool over-temperature, tool over-current, etc.) or battery fault conditions (e.g., battery over-temperature, battery over-current, battery over-voltage, battery under-voltage, etc.) are detected. In an embodiment, power switch 125-13 may include a FET or other controllable switch that is controlled by control unit 125-8. It is noted that power switch 125-13 in an alternative embodiment may be provided between both AC power lines ACH/ACL and DC power lines DC+/DC− on one side and the motor 125-2 on the other side to allow the control unit 125-8 to cut off power from either the AC power supply or the DC power supply in the event of a tool fault condition. Also in another embodiment, constant-speed PMDC motor tool 125 may be provided without an ON/OFF switch 125-12, and the control unit 125-8 may be configured to begin activating the power switch 125-13 when the ON/OFF trigger or actuator is actuated by a user. In other words, power switch 125-13 may be used for ON/OFF and fault condition control. It is noted that power switch 125-13 is not used to control a variable-speed control (e.g., PWM control) of the motor 125-2 in this embodiment.

Referring to FIG. 8A, constant-speed PMDC motor tool 125 is depicted according to one embodiment, where the DC+ power line and V+ output of the rectifier circuit 125-20 (which carries the rectified ACH power line) are coupled together at common positive node 125-11*a*, and the DC− power line and Gnd output (corresponding to ACL power line) from the rectifier circuit 125-20 are coupled together at a common negative node 125-11*b*. In this embodiment, ON/OFF switch 125-12 is arranged between the positive common node 125-11*a* and the motor 125-2. To ensure that only one of the AC or DC power supplies are utilized at any given time, in an embodiment, a mechanical lockout may be utilized. In an exemplary embodiment, the mechanical lockout may physically block access to the one of the AC or DC power supplies at any given time.

In FIG. 8B, constant-speed PMDC motor tool 125 is depicted according to an alternative embodiment, where the DC power lines DC+/DC− and the AC power lines ACH/ACL are isolated via a power supply switching unit 125-15 to ensure that power cannot be supplied from both the AC power supply and the DC power supply at the same time (even if the power supply interface 125-5 is coupled to both AC and DC power supplies). The power supply switching unit 125-15 may be configured similarly to any of the configurations of power supply switching unit 123-15 in FIGS. 6B-6D. It is noted that power supply switching unit 125-15 may be arranged between the AC power lines ACH/ACL and the rectifier circuit 125-20 in an alternative embodiment. In yet another embodiment, power supply switching unit 125-15 may be arranged between the power switch 125-13 and the ON/OFF switch 125-12.

It should be understood that while tool 125 in FIGS. 8A and 8B is provided with a control unit 125-8 and power switch 125-13 to cut off supply of power in an event of a tool or battery fault condition, tool 125 may be provided without a control unit 125-8 and a power switch 125-13. For example, the battery pack(s) may be provided with its own controller to monitor its fault conditions and manage its operations.

1. Constant Speed PMDC Tools with Power Supplies Having Comparable Voltage Ratings In FIGS. 8A and 8B described above, power tools 125 are designed to operate at a high-rated voltage range of, for example, 100V to 120V (which corresponds to the AC power voltage range of 100V to 120 VAC), more broadly 90V to 132V (which corresponds to ±10% of the AC power voltage range of 100 to 120 VAC), and at high power (e.g., 1500 to 2500 Watts). The motor 125-2 also has an operating voltage or operating voltage range that may be equivalent to, fall within, or correspond to the operating voltage or the operating voltage range of the tool 125.

In an embodiment, the power supply interface 125-5 is arranged to provide AC power line having a nominal voltage in the range of 100 to 120V (e.g., 120 VAC at 50-60 Hz in the US, or 100 VAC in Japan) from an AC power supply, or a DC power line having a nominal voltage in the range of 100 to 120V (e.g., 108 VDC) from a DC power supply. In other words, the DC nominal voltage and the AC nominal voltage provided through the power supply interface 125-5 both correspond to (e.g., match, overlap with, or fall within) the operating voltage range of the power tool 125 (i.e., high-rated voltage 100V to 120V, or more broadly approximately 90V to 132V). It is noted that a nominal voltage of 120 VAC corresponds to an average voltage of approximately 108V when measured over the positive half cycles of the AC sinusoidal waveform, which provides an equivalent speed performance as 108 VDC power.

2. Constant Speed PMDC Tools with Power Supplies Having Disparate Voltage Ratings According to another embodiment of the invention, voltage provided by the AC power supply has a nominal voltage that is significantly different from a nominal voltage provided from the DC power supply. For example, the AC power line of the power supply interface 125-5 may provide a nominal voltage in the range of 100 to 120V, and the DC power line may provide a nominal voltage in the range of 60V-100V (e.g., 72 VDC or 90 VDC). In another example, the AC power line may provide a nominal voltage in the range of 220 to 240V, and the DC power line may provide a nominal voltage in the range of 100-120V (e.g., 108 VDC).

Operating the power tool motor 125-2 at significantly different voltage levels may yield significant differences in power tool performance, in particular the rotational speed of the motor, which may be noticeable and in some cases unsatisfactory to the users. Also supplying voltage levels outside the operating voltage range of the motor 125-2 may damage the motor and the associated switching components. Thus, in an embodiment of the invention herein described, the motor control circuit 125-4 is configured to optimize a supply of power to the motor (and thus motor performance) 125-2 depending on the nominal voltage of the AC or DC power lines such that motor 125-2 yields substantially uniform speed and power performance in a manner satisfactory to the end user, regardless of the nominal voltage provided on the AC or DC power lines.

In this embodiment, power tool motor 125-2 may be designed and configured to operate at a voltage range that encompasses the nominal voltage of the DC power line. In an exemplary embodiment, motor 125-2 may be designed to operate at a voltage range of for example 60V to 90V (or more broadly ±10% at 54V to 99V) encompassing the nominal voltage of the DC power line of the power supply interface 125-5 (e.g., 72 VDC or 90 VDC), but lower than the nominal voltage of the AC power line (e.g., 220V-240V). In another exemplary embodiment, motor 125-2 may be designed to operate at a voltage range of 100V to 120V (or more broadly ±10% at 90V to 132V), encompassing the nominal voltage of the DC power line of the power supply interface 125-5 (e.g., 108 VDC), but lower than the nominal voltage range of 220-240V of the AC power line.

In an embodiment, in order for motor 125-2 to operate with the higher nominal voltage of the AC power line, motor control circuit 125-4 may be designed to optimize supply of power to the motor 125-2 according to various implementations discussed herein.

In one implementation, rectifier circuit 125-20 may be provided as a half-wave diode bridge rectifier. As persons skilled in the art shall recognize, a half-wave rectified waveform will have about approximately half the average nominal voltage of the input AC waveform. Thus, in a scenario where the nominal voltage of the AC power line is in the range of 220-240V and the motor 125-2 is designed to operate at a voltage range of 100V to 120V, the rectifier circuit 125-20 may be configured as a half-wave rectifier to provide an average nominal AC voltage of 110V to 120V to the motor 125-2, which is within the operating voltage range of the power tool 125.

Figure 8C:
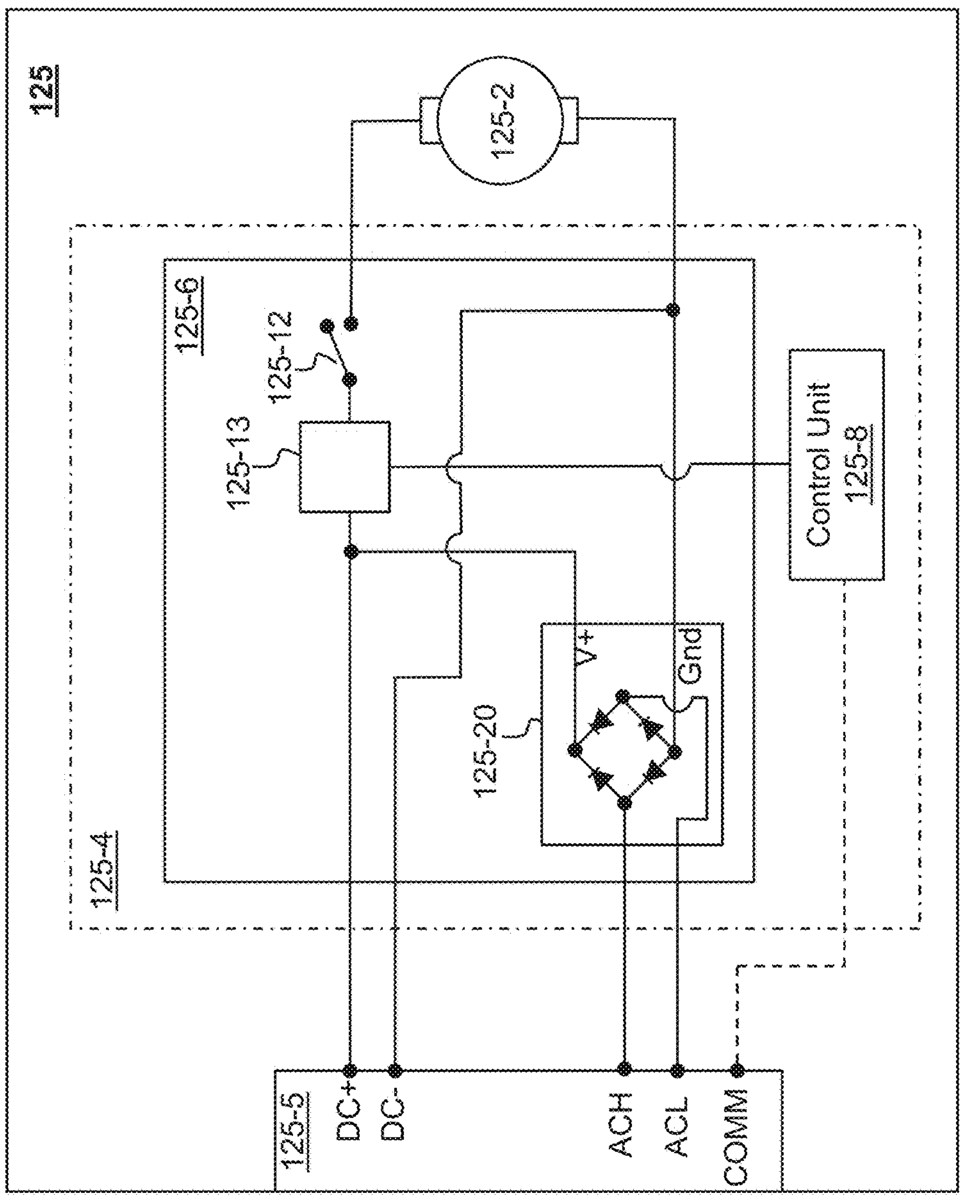
FIG. 8C depicts an exemplary system block diagram of a constant-speed AC/DC power tool with a brushed DC motor where power supplied from an AC power supply has a nominal voltage significantly different from nominal voltage provided from a DC power supply, according to an embodiment.

In another implementation, as shown in FIG. 8C, the V+ output of the rectifier circuit 125-20 may be provided as an input to power switch 125-13, and control unit 125-8 may be configured to pulse width modulate (PWM) the V+ signal at a fixed duty cycle corresponding to the operating voltage of the tool 125. For example, for a tool 125 having an operating voltage range of 60 to 100V but receiving AC power having a nominal voltage of 100-120V, when control unit 125-8 senses AC current on the AC power line of power supply interface 125-5, it controls a PWM switching operation of power switch 125-13 at fixed duty cycle in the range of 60% to 80% (e.g., 70%). This results in a voltage level of approximately 70-90V being supplied to the motor 125-2 when operating from an AC power supply, which corresponds to the operating voltage of the tool 125.

Figure 8D:
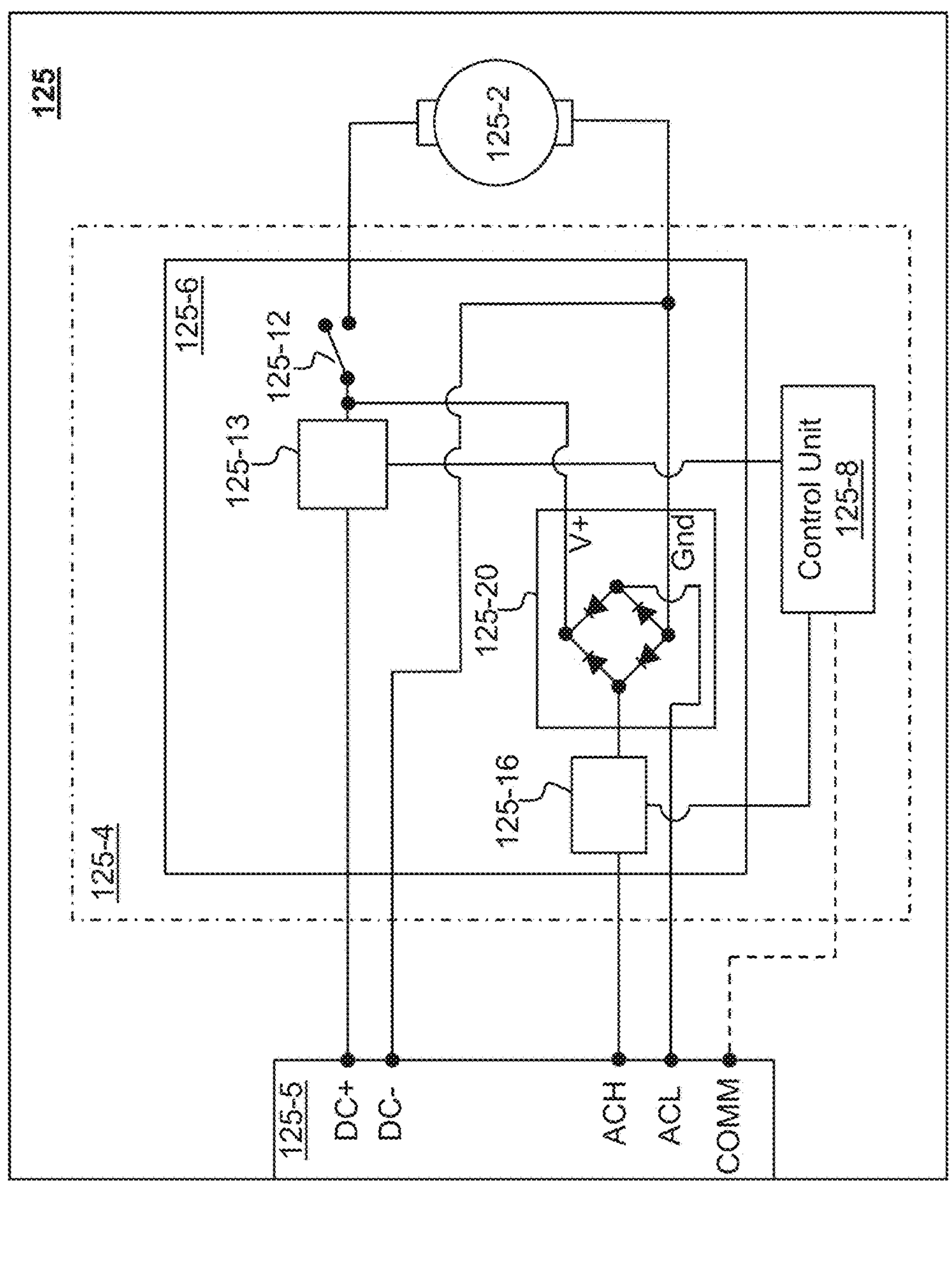
FIG. 8D depicts another exemplary system block diagram of a constant-speed AC/DC power tool with a brushed DC motor where power supplied from an AC power supply has a nominal voltage significantly different from nominal voltage provided from a DC power supply, according to an alternative embodiment.

In yet another implementation, as shown in FIG. 8D, tool 125 may be further provided with a phase-controlled AC switch 125-16. In an embodiment, AC switch 125-16 is arranged in series with the V+ output of the rectifier circuit 125-20. In an embodiment, AC switch 125-16 may include a triac or an SRC switch controlled by the control unit 125-8. In an embodiment, the control unit 125-8 may be configured to set a fixed conduction band (or firing angle) of the AC switch 125-16 corresponding to the operating voltage of the tool 125. For example, for a motor 125-2 having an operating voltage range of 60 to 100V but receiving AC power having a nominal voltage of 100-120V, the conduction band of the AC switch 125-16 may be fixedly set to approximately 120 degrees. In other words, the firing angle of the AC switch 125-16 may be set to 60 degrees. By setting the firing angle to approximately 60 degrees, the AC voltage supplied to the motor 125-2 will be approximately in the range of 70-90V, which corresponds to the operating voltage of the motor 125-2. In another example, for a motor 125-2 having an operating voltage range of 100 to 120V but receiving AC power having a nominal voltage of 220-240V, the conduction band of the AC switch 125-16 may be fixedly set to approximately 90 degrees. In other words, the firing angle of the AC switch 125-16 may be set to 90 degrees. By setting the firing angle to 90 degrees, the AC voltage supplied to the motor 125-2 will be approximately in the range of 100-120V, which corresponds to the operating voltage of the motor 125-2. In this manner, control unit 125-8 optimizes the supply of power to the motor 125-2.

In this manner, motor control circuit 125-4 optimizes a supply of power to the motor 125-2 depending on the nominal voltage of the AC or DC power lines such that motor 125-2 yields substantially uniform speed and power performance in a manner satisfactory to the end user, regardless of the nominal voltage provided on the AC or DC power lines.

D. Variable-Speed AC/DC Power Tools with Brushed DC Motors

Figure 9A:
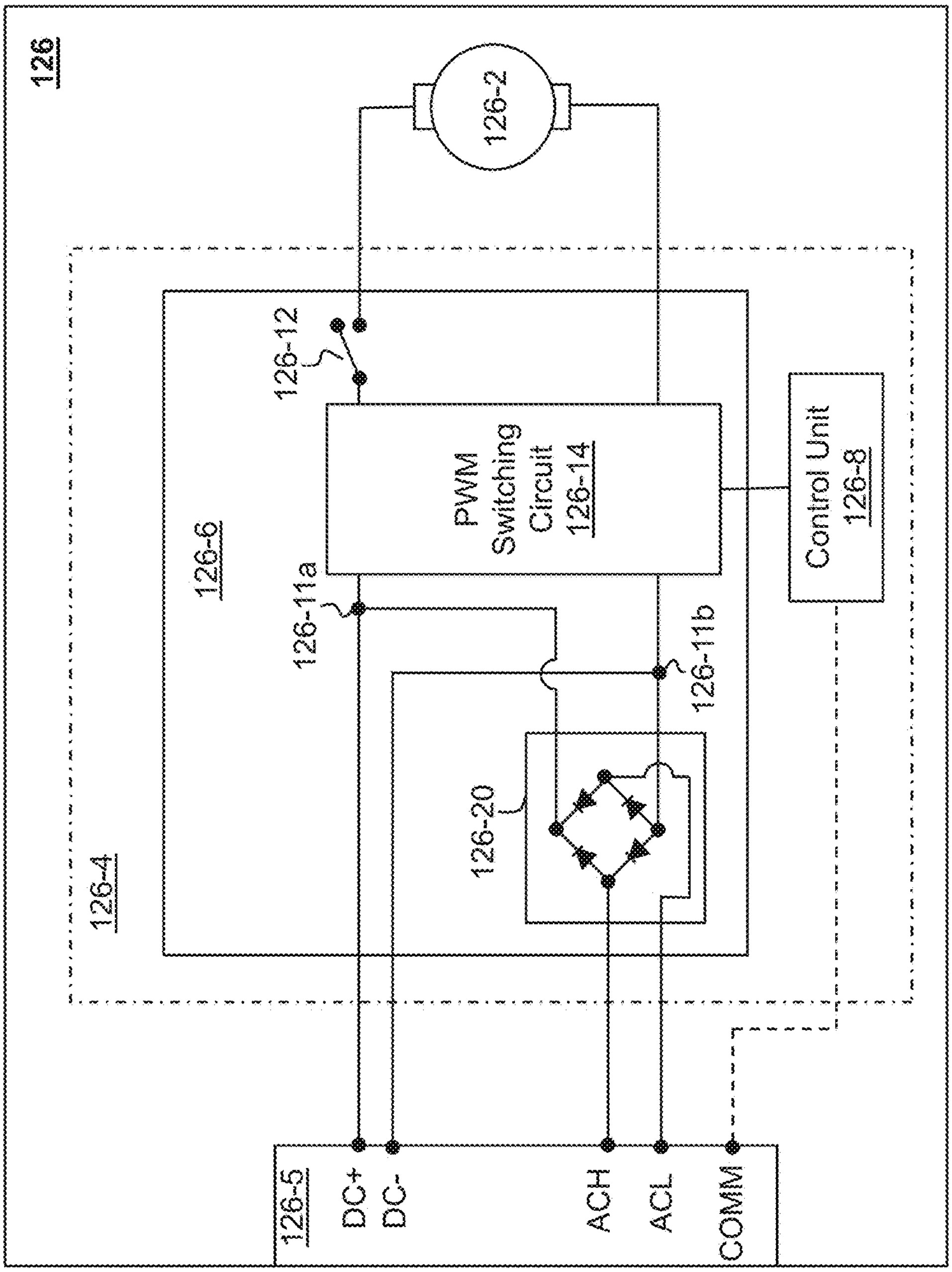
FIG. 9A depicts an exemplary system block diagram of a variable-speed AC/DC power tool with a brushed DC motor, according to an embodiment.
Figure 9B:
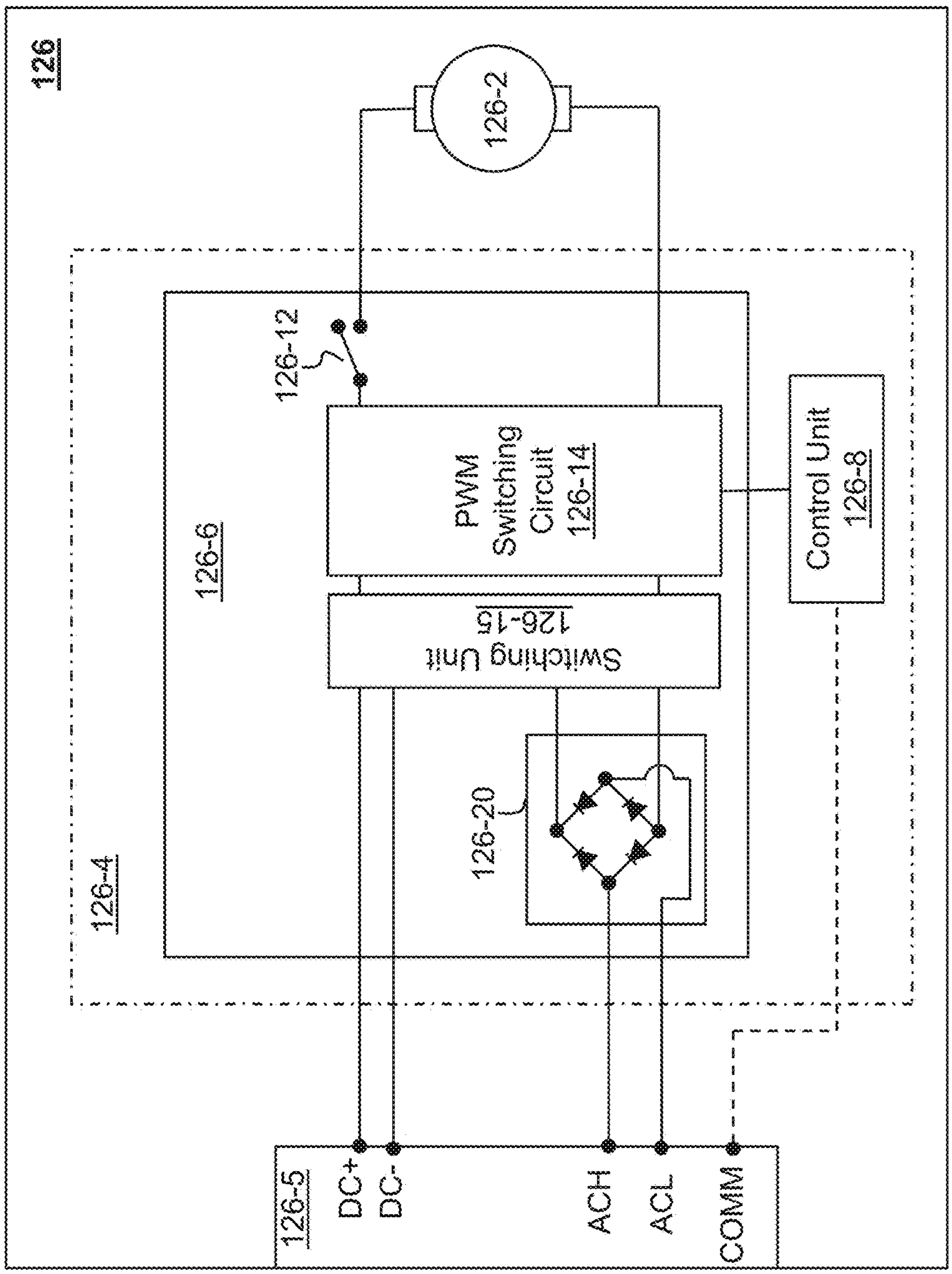
FIG. 9B depicts an exemplary system block diagram of the constant-speed AC/DC power tool of FIG. 9A additionally provided with a power supply switching unit, according to an embodiment.

Turning now to FIG. 9A-9B, the fourth subset of AC/DC power tools with brushed motors 122 includes variable-speed AC/DC power tools 126 with PMDC motors (herein also referred to as variable-speed PMDC motor tools 126). These include corded/cordless (AC/DC) power tools that operate at variable speed at no load and include brushed permanent magnet DC (PMDC) motors 126-2 configured to operate at a high rated voltage (e.g., 100 to 120V) and high power (e.g., 1500 to 2500 Watts). As discussed above, a PMDC brushed motor generally includes a wound rotor coupled to a commutator, and a stator having permanent magnets affixed therein. A PMDC motor, as the name implies, works with DC power only. This is because the permanent magnets on the stator do not change polarity, and as the AC power changes from a positive half-cycle to a negative half-cycle, the polarity change in the brushes brings the motor to a stand-still. For this reason, in an embodiment, as shown in FIGS. 9A and 9B, power from the AC power supply is passed through a rectifier circuit 126-20 to convert or remove the negative half-cycles of the AC power. In an embodiment, rectifier circuit 126-20 may be a full-wave rectifier to convert the negative half-cycles of the AC power to positive half-cycles. Alternatively, in an embodiment, rectifier circuit 126-20 may be a half-wave rectifier circuit to eliminate the half-cycles of the AC power. In an embodiment, variable-speed PMDC motor tools 126 may include high-power tools having variable speed control, such as concrete drills, hammers, grinders, saws, etc.

Many aspects of the variable-speed PMDC motor tool 126 are similar to those of variable-speed universal motor tool 124 previously discussed with reference to FIGS. 7A-7E. In an embodiment, variable-speed PMDC motor tool 126 is provided with a variable-speed actuator (not shown, e.g., a trigger switch, a touch-sense switch, a capacitive switch, a gyroscope, or other variable-speed input mechanism) engageable by a user. In an embodiment, the variable-speed actuator is coupled to or includes a potentiometer or other circuitry for generating a variable-speed signal (e.g., variable voltage signal, variable current signal, etc.) indicative of the desired speed of the motor 126-2. In an embodiment, variable-speed PMDC motor tool 126 may be additionally provided with an ON/OFF trigger or actuator (not shown) enabling the user to start the motor 126-2. Alternatively, the ON/OFF trigger functionally may be incorporated into the variable-speed actuator (i.e., no separate ON/OFF actuator) such that an initial actuation of the variable-speed trigger by the user acts to start the motor 126-2.

In an embodiment, a variable-speed PMDC motor tool 126 includes a motor control circuit 126-4 that operates the PMDC motor 126-2 at variable speed under no load or constant load. The power tool 126 further includes power supply interface 126-5 arranged to receive power from one or more of the aforementioned DC power supplies and/or AC power supplies. The power supply interface 126-5 is electrically coupled to the motor control circuit 126-4 by DC power lines DC+ and DC− (for delivering power from a DC power supply) and by AC power lines ACH and ACL (for delivering power from an AC power supply). The AC power lines ACH and ACL are inputted into the rectifier circuit 126-20.

Since the AC line is passed through the rectifier circuit 126-20, it no longer includes a negative component and thus, in an embodiment, does not work with a phase controlled switch for variable-speed control. Thus, in an embodiment, instead of separate DC and AC switch circuits as shown in FIGS. 7A and 7B, motor control circuit 126-4 is provided with a PWM switching circuit 126-14. PWM switching circuit may include a combination of one or more power semiconductor devices (e.g., diode, FET, BJT, IGBT, etc.) arranged as a chopper circuit, a half-bridge, or an H-bridge, e.g., as shown in FIGS. 7C-7E.

In an embodiment, motor control circuit 126-4 further includes a control unit 126-8. Control unit 126-8 may be arranged to control a switching operation of the PWM switching circuit 126-14. In an embodiment, control unit 126-8 may include a micro-controller or similar programmable module configured to control gates of power switches. In an embodiment, the control unit 126-8 is configured to control a PWM duty cycle of one or more semiconductor switches in the PWM switching circuit 126-14 in order to control the speed of the motor 126-2. In addition, control unit 126-8 may be configured to monitor and manage the operation of the power tool or battery packs coupled to the power supply interface 126-5 and interrupt power to the motor 126-2 in the event of a tool or battery fault condition (such as, battery over-temperature, tool over-temperature, battery over-current, tool over-current, battery over-voltage, battery under-voltage, etc.). In an embodiment, control unit 126-8 may be coupled to the battery pack(s) via a communication signal line COMM provided from power supply interface 126-5. The COMM signal line may provide a control or informational signal relating to the operation or condition of the battery pack(s) to the control unit 126-6. In an embodiment, control unit 126-6 may be configured to cut off power from the DC output line of power supply interface 126-5 if the COMM line indicates a battery failure or fault condition.

Similar to variable-speed universal motor tool 124 previously discussed with reference to FIGS. 7A-7E, variable-speed PMDC motor tool 126 may be further provided with an electro-mechanical ON/OFF switch 126-12 coupled to the ON/OFF trigger or actuator discussed above. The ON/OFF switch 126-12 simply connects or disconnects supply of power from the power supply to the motor 126-2. Alternatively, tool 126 may be provided without an ON/OFF switch 126-12. In that case, control unit 126-8 may be configured to deactivate PWM switching circuit 126-14 until it detects a user actuation of the ON/OFF trigger or actuator (or initial actuator of the variable-speed actuator if ON/OFF trigger functionally is be incorporated into the variable-speed actuator). The control unit 126-8 may then begin operating the motor 126-2 by activating one or more of the switches in PWM switching circuit 126-14.

Referring to FIG. 9A, the tool 126 is depicted according to one embodiment, where the ACH and DC+ power lines are coupled together at common positive node 126-11*a*, and the ACL and DC− power lines are coupled together at a common negative node 126-11*b*. In this embodiment, ON/OFF switch 126-12 and PWM switching circuit 126-14 are arranged between the positive common node 126-11*a* and the motor 126-2. To ensure that only one of the AC or DC power supplies are utilized at any given time and to minimize leakage, in an embodiment, a mechanical lockout (embodiments of which are discussed in more detail below) may be utilized. In an exemplary embodiment, the mechanical lockout may physically block access to the AC or DC power supplies at any given time.

In FIG. 9B, variable-speed PMDC motor tool 126 is depicted according to an alternative embodiment, where the DC power lines DC+/DC− and the AC power lines ACH/ACL are isolated from each other via a power supply switching unit 126-15 to ensure that power cannot be supplied from both the AC power supply and battery pack(s) at the same time (even if the power supply interface is coupled to both AC and DC power supplies). The power supply switching unit 126-15 may be configured similarly to any of the configurations of power supply switching unit 123-15 in FIGS. 6B-6D, i.e., relays, single-pole double-throw switches, double-pole double-throw switches, or a combination thereof. It must be understood that while the power supply switching unit 126-15 in FIG. 9B is depicted between the rectifier circuit 126-20 and the PWM switching circuit 126-14, the power supply switching unit 126-15 may alternatively be provided directly on the AC and DC line outputs of the power supply interface 126-5.

1. Variable-Speed Brushed DC Tools with Power Supplies Having Comparable Voltage Ratings In FIGS. 9A and 9B described above, power tools 126 are designed to operate at a high-rated voltage range of, for example, 100V to 120V (which corresponds to the AC power voltage range of 100V to 120 VAC), more broadly 90V to 132V (which corresponds to ±10% of the AC power voltage range of 100 to 120 VAC), and at high power (e.g., 1500 to 2500 Watts). Specifically, the motor 126-2 and power unit 126-6 components of power tools 126 are designed and optimized to handle high-rated voltage of 100 to 120V, preferably 90V to 132V. The motor 126-2 also has an operating voltage or operating voltage range that may be equivalent to, fall within, or correspond to the operating voltage or the operating voltage range of the tool 126.

In an embodiment, the power supply interface 126-5 is arranged to provide AC power line having a nominal voltage in the range of 100 to 120V (e.g., 120 VAC at 50-60 Hz in the US, or 100 VAC in Japan) from an AC power supply, or a DC power line having a nominal voltage in the range of 100 to 120V (e.g., 108 VDC) from a DC power supply. In other words, the DC nominal voltage and the AC nominal voltage provided through the power supply interface 126-5 both correspond to (e.g., match, overlap with, or fall within) the operating voltage range of the power tool 125 (i.e., high-rated voltage 100V to 120V, or more broadly approximately 90V to 132V). It is noted that a nominal voltage of 120 VAC corresponds to an average voltage of approximately 108V when measured over the positive half cycles of the AC sinusoidal waveform, which provides an equivalent speed performance as 108 VDC power.

2. Variable-Speed Brushed DC Tools with Power Supplies Having Disparate Voltage Ratings According to another embodiment of the invention, voltage provided by the AC power supply has a nominal voltage that is significantly different from a nominal voltage provided from the DC power supply. For example, the AC power line of the power supply interface 126-5 may provide a nominal voltage in the range of 100 to 120V, and the DC power line may provide a nominal voltage in the range of 60V-100V (e.g., 72 VDC or 90 VDC). In another example, the AC power line may provide a nominal voltage in the range of 220 to 240V, and the DC power line may provide a nominal voltage in the range of 100-120V (e.g., 108 VDC).

Operating the power tool motor 126-2 at significantly different voltage levels may yield significant differences in power tool performance, in particular the rotational speed of the motor, which may be noticeable and in some cases unsatisfactory to the users. Also supplying voltage levels outside the operating voltage range of the motor 126-2 may damage the motor and the associated switching components. Thus, in an embodiment of the invention herein described, the motor control circuit 126-4 is configured to optimize a supply of power to the motor (and thus motor performance) 126-2 depending on the nominal voltage of the AC or DC power lines such that motor 126-2 yields substantially uniform speed and power performance in a manner satisfactory to the end user, regardless of the nominal voltage provided on the AC or DC power lines.

In this embodiment, motor 126-2 may be designed and configured to operate at a voltage range that encompasses the nominal voltage of the DC power line. In an exemplary embodiment, motor 126-2 may be designed to operate at a voltage range of for example 60V to 90V (or more broadly ±10% at 54V to 99V) encompassing the nominal voltage of the DC power line of the power supply interface 126-5 (e.g., 72 VDC or 90 VDC), but lower than the nominal voltage of the AC power line (e.g., 220V-240V). In another exemplary embodiment, motor 126-2 may be designed to operate at a voltage range of 100V to 120V (or more broadly ±10% at 90V to 132V), encompassing the nominal voltage of the DC power line of the power supply interface 126-5 (e.g., 108 VDC), but lower than the nominal voltage range of 220-240V of the AC power line.

In order for motor 126-2 to operate with the higher nominal voltage of the AC power line, the motor control circuit 126-4 may be design to optimize supply of power to the motor 126-2 according to various implementations discussed herein.

In one implementation, rectifier circuit 126-20 may be provided as a half-wave diode bridge rectifier. As persons skilled in the art shall recognize, a half-wave rectified waveform will have about approximately half the average nominal voltage of the input AC waveform. Thus, in a scenario where the nominal voltage of the AC power line is in the range of 220-240V and the motor 126-2 is designed to operate at a voltage range of 100V to 120V, the rectifier circuit 126-20 configured as a half-wave rectifier will provide an average nominal AC voltage of 110-120V to the motor 126-2, which is within the operating voltage range of the motor 126-2.

In another implementation, control unit 126-8 may be configured to control the PWM switching circuit 126-14 differently based on the input voltage being provided. Specifically, control unit 126-8 may be configured to perform PWM on the PWM switching circuit 126-14 switches at a normal duty cycle range of 0 to 100% in DC mode (i.e., when power is being supplied via DC+/DC− lines), and perform PWM on the switches at a duty cycle range from 0 to a maximum threshold value corresponding to the operating voltage of the motor 126-2 in AC mode (i.e., when power is being supplied via ACH/ACL lines).

For example, for a motor 126-2 having an operating voltage range of 60 to 100V but receiving AC power having a nominal voltage of 100-120V, when control unit 126-8 senses AC current on the AC power line of power supply interface 126-5, it controls a PWM switching operation of PWM switching circuit 126-14 at duty cycle in the range of from 0 up to a maximum threshold value, e.g., 70%. In this embodiment, running at variable speed, the duty cycle will be adjusted according to the maximum threshold duty cycle. Thus, for example, when running at half-speed, the PWM switching circuit 126-14 may be run at 35% duty cycle. This results in a voltage level of approximately 70-90V being supplied to the motor 126-2 when operating from an AC power supply, which corresponds to the operating voltage of the motor 126-2.

In this manner, motor control circuit 126-4 optimizes a supply of power to the motor 126-2 depending on the nominal voltage of the AC or DC power lines such that motor 126-2 yields substantially uniform speed and power performance in a manner satisfactory to the end user, regardless of the nominal voltage provided on the AC or DC power lines.

E. AC/DC Power Tools with Brushless Motors

Figure 10A:
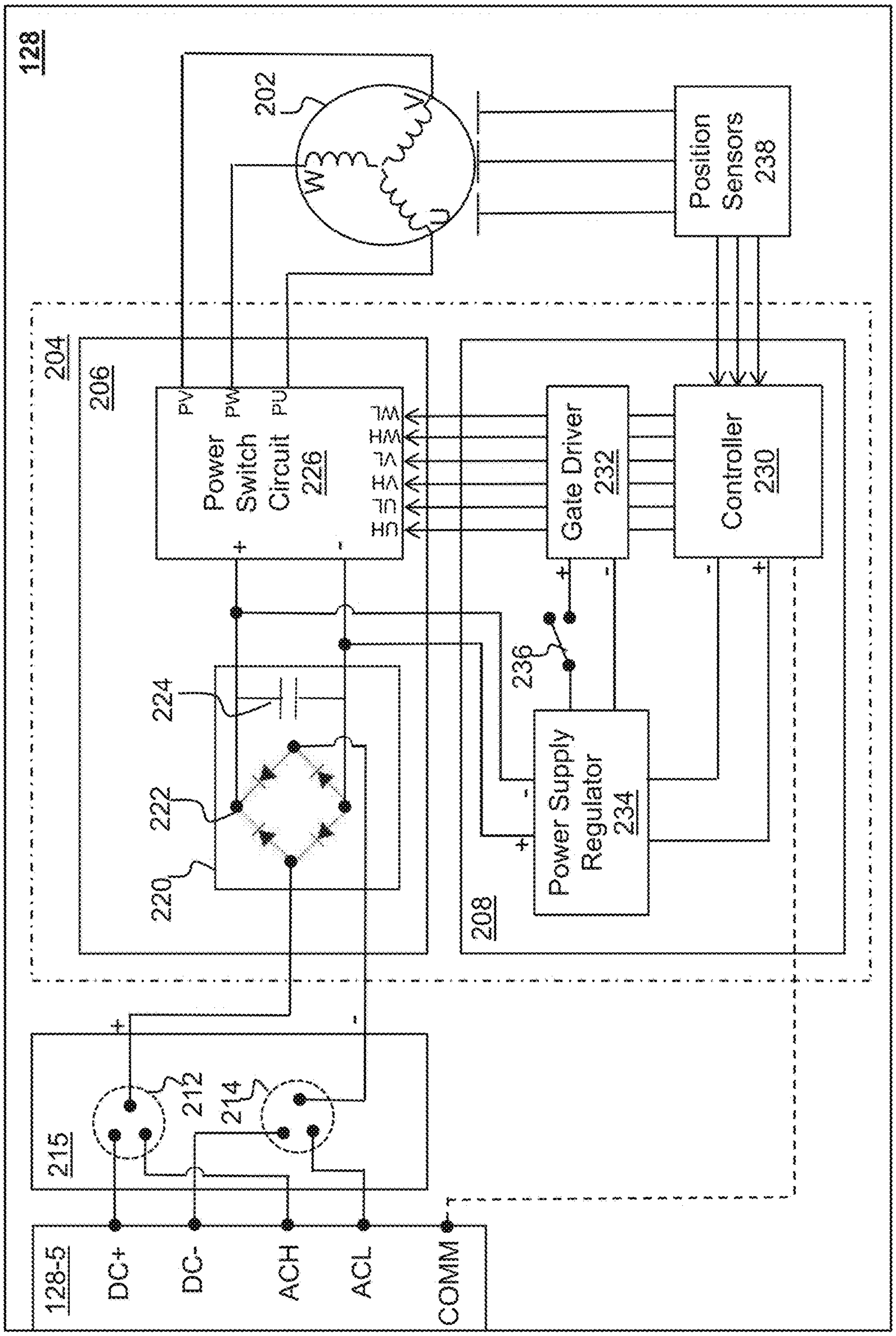
FIG. 10A depicts an exemplary system block diagram of an AC/DC power tool with a three-phase brushless DC motor having a power supply switching unit and a motor control circuit, according to an embodiment.
Figure 10B:
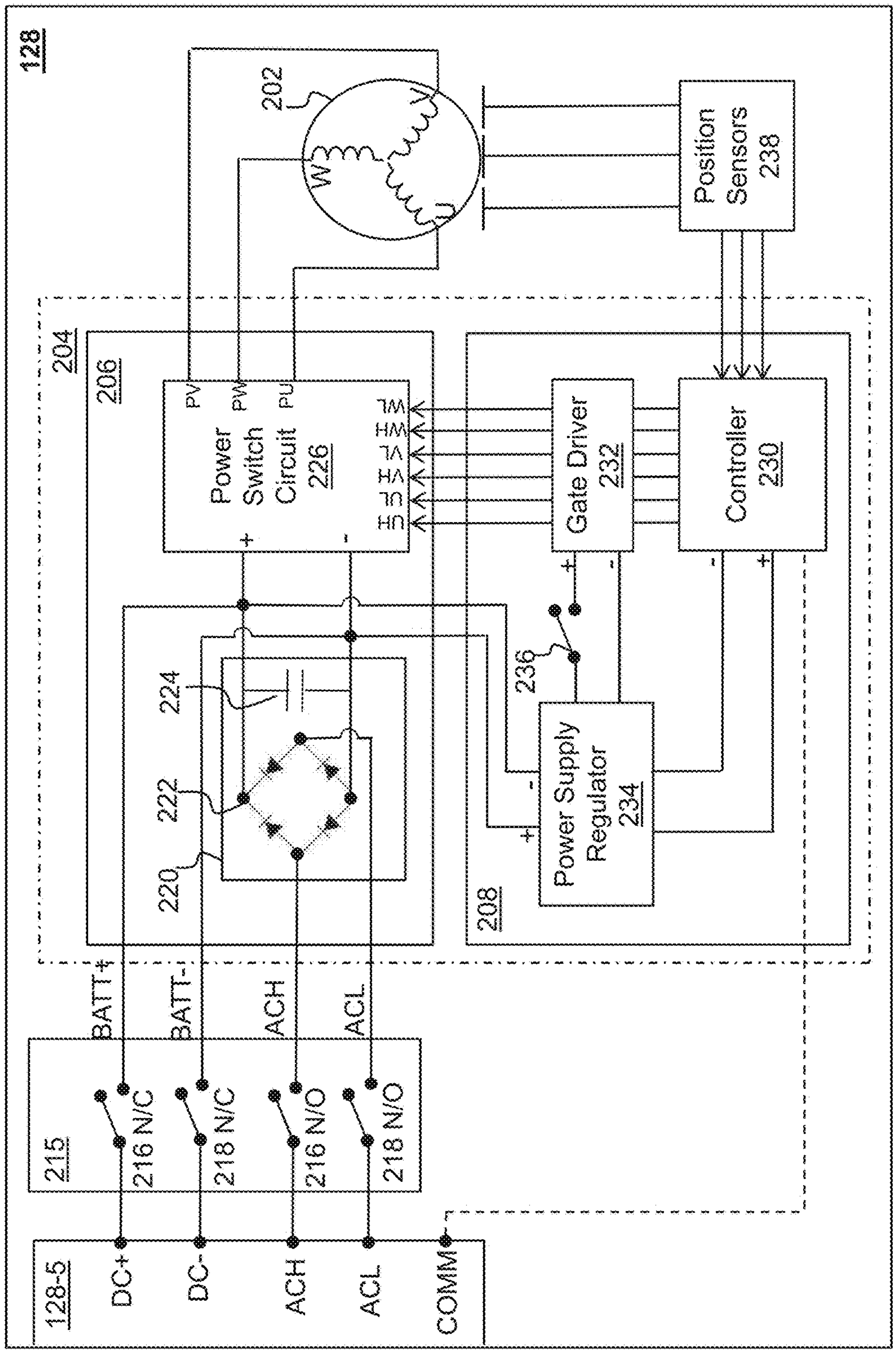
FIG. 10B depicts an exemplary system block diagram of the AC/DC power tool of FIG. 10A having an alternative power supply switching unit, according to an embodiment.
Figure 10C:
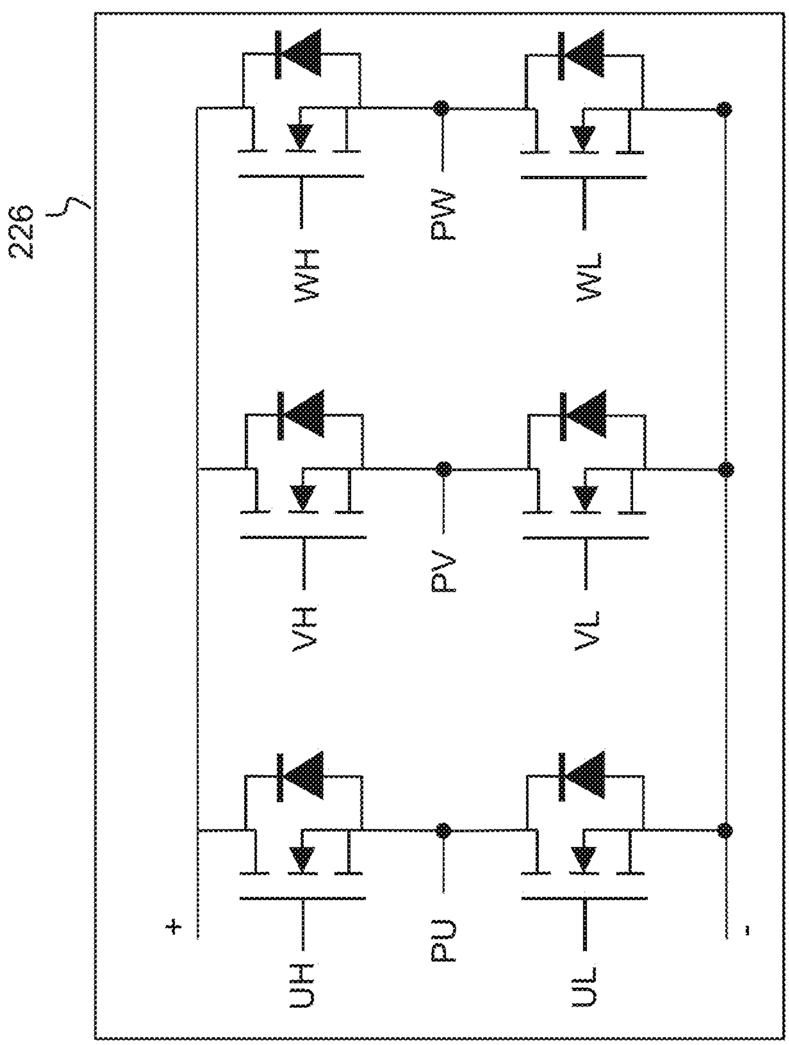
FIG. 10C depicts an exemplary power switch circuit having a three-phase inverter bridge, according to an embodiment.

Referring now to FIGS. 10A-10C, the set of AC/DC power tools 128 with brushless motors (herein referred to as brushless tools 128) is described herein. In an embodiment, these include constant speed or variable speed AC/DC power tools with brushless DC (BLDC) motors 202 that are electronically commutated (i.e., are not commutated via brushes) and are configured to operate at a high rated voltage (e.g., 100-120V, preferably 90V to 132V) and high power (e.g., 1500 to 2500 Watts). A brushless motor described herein may be a three-phase permanent magnet synchronous motor including a rotor having permanent magnets and a wound stator that is commutated electronically as described below. The stator windings are designated herein as U, V, and W windings corresponding to the three phases of the motor 202. The rotor is rotationally moveable with respect to the stator when the phases of the motor 202 (i.e., the stator windings) are appropriately energized. It should be understood, however, that other types of brushless motors, such as switched reluctance motors and induction motors, are within the scope of this disclosure. It should also be understood that the BLDC motor 202 may include fewer than or more than three phases. For details of a BLDC motor construction and control, reference is made to U.S. Pat. No. 6,538,403, U.S. Pat. No. 6,975,050, U.S. Patent Publication No. 2013/0270934, all of which are assigned to Black & Decker Inc. and each of which is incorporated herein by reference in its entirety.

In an embodiment, brushless tools 128 may include high powered tools for variable speed applications such as concrete drills, hammers, grinders, and reciprocating saws, etc. Brushless tools 128 may also include high powered tools for constant speed applications such as concrete hammers, miter saws, table saws, vacuums, blowers, and lawn mowers, etc.

In an embodiment, a brushless tool 128 can be operated at constant speed at no load (or constant load), or at variable speed at no load (or constant load) based on an input from a variable-speed actuator (not shown, e.g., a trigger switch, a touch-sense switch, a capacitive switch, a gyroscope, or other variable-speed input mechanism engageable by a user) arranged to provide a variable analog signal (e.g., variable voltage signal, variable current signal, etc.) indicative of the desired speed of the BLDC motor 202. In an embodiment, brushless tool 128 may be additionally provided with an ON/OFF trigger or actuator (not shown) enabling the user to start the motor 202. Alternatively, the ON/OFF trigger functionally may be incorporated into the variable-speed actuator (i.e., no separate ON/OFF actuator) such that an initial actuation of the variable-speed trigger by the user acts to start the motor 202.

In an embodiment, brushless tool 128 includes a power supply interface 128-5 able to receive power from one or more of the aforementioned DC power supplies and/or AC power supplies. The power supply interface 128-5 is electrically coupled to the motor control circuit 204 by DC power lines DC+ and DC− (for delivering power from a DC power supply) and by AC power lines ACH and ACL (for delivering power from an AC power supply).

In an embodiment, brushless tool 128 further includes a motor control circuit 204 disposed to control supply of power from the power supply interface 128-5 to BLDC motor 202. In an embodiment, motor control circuit 204 includes a power unit 206 and a control unit 208, discussed below.

As the name implies, BLDC motors are designed to work with DC power. Thus, in an embodiment, as shown in FIGS. 10A and 10B, in an embodiment, power unit 206 is provided with a rectifier circuit 220. In an embodiment, power from the AC power lines ACH and ACL is passed through the rectifier circuit 220 to convert or remove the negative half-cycles of the AC power. In an embodiment, rectifier circuit 220 may include a full-wave bridge diode rectifier 222 to convert the negative half-cycles of the AC power to positive half-cycles. Alternatively, in an embodiment, rectifier circuit 220 may include a half-wave rectifier to eliminate the half-cycles of the AC power. In an embodiment, rectifier circuit 220 may further include a link capacitor 224. As discussed later in this disclosure, in an embodiment, link capacitor 224 has a relatively small value and does not smooth the full-wave rectified AC voltage, as discussed below. In an embodiment, capacitor 224 is a bypass capacitor that removes the high frequency noise from the bus voltage.

Power unit 206, in an embodiment, may further include a power switch circuit 226 coupled between the power supply interface 128-5 and motor windings to drive BLDC motor 202. In an embodiment, power switch circuit 226 may be a three-phase bridge driver circuit including six controllable semiconductor power devices (e.g. FETs, BJTs, IGBTs, etc.).

FIG. 10C depicts an exemplary power switch circuit 226 having a three-phase inverter bridge circuit, according to an embodiment. As shown herein, the three-phase inverter bridge circuit includes three high-side FETs and three low-side FETs. The gates of the high-side FETs driven via drive signals UH, VH, and WH, and the gates of the low-side FETs are driven via drive signals UL, VL, and WL, as discussed below. In an embodiment, the drains of the high-side FETs are coupled to the sources of the low-side FETs to output power signals PU, PV, and PW for driving the BLDC motor 202.

Referring back to FIGS. 10A and 10B, control unit 208 includes a controller 230, a gate driver 232, a power supply regulator 234, and a power switch 236. In an embodiment, controller 230 is a programmable device arranged to control a switching operation of the power devices in power switching circuit 226. In an embodiment, controller 230 receives rotor rotational position signals from a set of position sensors 238 provided in close proximity to the motor 202 rotor. In an embodiment, position sensors 238 may be Hall sensors. It should be noted, however, that other types of positional sensors may be alternatively utilized. It should also be noted that controller 230 may be configured to calculate or detect rotational positional information relating to the motor 202 rotor without any positional sensors (in what is known in the art as sensorless brushless motor control). Controller 230 also receives a variable-speed signal from variable-speed actuator (not shown) discussed above. Based on the rotor rotational position signals from the position sensors 238 and the variable-speed signal from the variable-speed actuator, controller 230 outputs drive signals UH, VH, WH, UL, VL, and WL through the gate driver 232, which provides a voltage level needed to drive the gates of the semiconductor switches within the power switch circuit 226 in order to control a PWM switching operation of the power switch circuit 226.

In an embodiment, power supply regulator 234 may include one or more voltage regulators to step down the power supply from power supply interface 128-5 to a voltage level compatible for operating the controller 230 and/or the gate driver 232. In an embodiment, power supply regulator 234 may include a buck converter and/or a linear regulator to reduce the power voltage of power supply interface 128-5 down to, for example, 15V for powering the gate driver 232, and down to, for example, 3.2V for powering the controller 230.

In an embodiment, power switch 236 may be provided between the power supply regulator 234 and the gate driver 232. Power switch 236 may be an ON/OFF switch coupled to the ON/OFF trigger or the variable-speed actuator to allow the user to begin operating the motor 202, as discussed above. Power switch 236 in this embodiment disables supply of power to the motor 202 by cutting power to the gate drivers 232. It is noted, however, that power switch 236 may be provided at a different location, for example, within the power unit 206 between the rectifier circuit 220 and the power switch circuit 226. It is further noted that in an embodiment, power tool 128 may be provided without an ON/OFF switch 236, and the controller 230 may be configured to activate the power devices in power switch circuit 226 when the ON/OFF trigger (or variable-speed actuator) is actuated by the user.

In an embodiment of the invention, in order to minimize leakage and to isolate the DC power lines DC+/DC− from the AC power lines ACH/ACL, a power supply switching unit 215 may be provided between the power supply interface 128-5 and the motor control circuit 204. The power supply switching unit 215 may be utilized to selectively couple the motor 202 to only one of AC or DC power supplies. Switching unit 215 may be configured to include relays, single-pole double-throw switches, double-pole double-throw switches, or a combination thereof.

In the embodiment of FIG. 10A, power supply switching unit 215 includes two double-pole single-throw switches 212, 214 coupled to the DC power lines DC+/DC− and the AC power lines ACH/ACL. Switch 212 includes two input terminals coupled to DC+ and ACH terminals of the DC and AC lines, respectively. Similarly, switch 214 includes two input terminals coupled to DC− and ACL terminals of the DC and AC lines, respectively. Each switch 212, 214 includes a single output terminal, which is coupled to the rectifier 222.

In an alternative embodiment shown in FIG. 10B, power supply switching unit 215 two double-pole double-throw switches 216, 218 coupled to the DC power lines DC+/DC− and the AC power lines ACH/ACL. Switches switch 216, 218 include two output terminals instead of one, which allow the DC power line DC+/DC− to bypass rectifier 222 and be coupled directly to the +/− terminals of the power switch circuit 226.

1. Brushless Tools with Power Supplies Having Comparable Voltage Ratings

In an embodiment, power tools 128 described above may be designed to operate at a high-rated voltage range of, for example, 100V to 120V (which corresponds to the AC power voltage range of 100V to 120 VAC), more broadly 90V to 132V (which corresponds to ±10% of the AC power voltage range of 100 to 120 VAC), and at high power (e.g., 1500 to 2500 Watts). Specifically, the BLDC motor 202, as well as power unit 206 and control unit 208 components, are designed and optimized to handle high-rated voltage of 100 to 120V, preferably 90V to 132V. The motor 202 also has an operating voltage or operating voltage range that may be equivalent to, fall within, or correspond to the operating voltage or the operating voltage range of the tool 128.

In an embodiment, the power supply interface 128-5 is arranged to provide AC power line having a nominal voltage in the range of 100V to 120V (e.g., 120 VAC at 50-60 Hz in the US, or 100 VAC in Japan) from an AC power supply, or a DC power line having a nominal voltage in the range of 100 to 120V (e.g., 108 VDC) from a DC power supply. In other words, the DC nominal voltage and the AC nominal voltage provided through the power supply interface 128-5 both correspond to (e.g., match, overlap with, or fall within) each other and the operating voltage range of the power tool 128 (i.e., high-rated voltage 100V to 120V, or more broadly approximately 90V to 132V). It is noted that a nominal voltage of 120 VAC corresponds to an average voltage of approximately 108V when measured over the positive half cycles of the AC sinusoidal waveform, which provides an equivalent speed performance as 108 VDC power. In an embodiment, as discussed in detail below, the link capacitor 224 is selected to have an optimal value that provides less than approximately 110V on the DC bus line from the 1210 VAC power supply. In an embodiment, the link capacitor 224 may be less than or equal to 50 μF in one embodiment, less than or equal to 20 μF in one embodiment, or less than or equal to 10 μF in one embodiment.

2. Brushless Tools with Power Supplies Having Disparate Voltage Ratings

According to an alternative embodiment of the invention, voltage provided by the AC power supply has a nominal voltage that is significantly different from a nominal voltage provided from the DC power supply. For example, the AC power line of the power supply interface 128-5 may provide a nominal voltage in the range of 100 to 120V, and the DC power line may provide a nominal voltage in the range of 60V-100V (e.g., 72 VDC or 90 VDC). In another example, the AC power line may provide a nominal voltage in the range of 220 to 240V, and the DC power line may provide a nominal voltage in the range of 100-120V (e.g., 108 VDC).

Operating the BLDC motor 202 at significantly different voltage levels may yield significant differences in power tool performance, in particular the rotational speed of the motor, which may be noticeable and in some cases unsatisfactory to the users. Also supplying voltage levels outside the operating voltage range of the motor 202 may damage the motor and the associated switching components. Thus, in an embodiment of the invention herein described, the motor control circuit 204 is configured to optimize a supply of power to the motor (and thus motor performance) 202 depending on the nominal voltage of the AC or DC power lines such that motor 202 yields substantially uniform speed and power performance in a manner satisfactory to the end user, regardless of the nominal voltage provided on the AC or DC power lines.

Accordingly, in an embodiment, while the motor 202 may be designed and configured to operate at one or more operating voltage ranges that correspond to both the nominal or rated voltages of the AC power supply line and the DC power supply line, the motor 202 may be designed and configured to operate at a more limited operating voltage range that may correspond to (e.g., match, overlap and/or encompass) one or neither of the AC and DC power supply rated (or nominal) voltages.

For example, in one implementation, motor 202 may be designed and configured to operate at a voltage range that corresponds to the nominal voltage of the DC power line. In an exemplary embodiment, motor 202 may be designed to operate at a voltage range of, for example, 60V to 100V, that corresponds to the nominal voltage of the DC power supply (e.g., 72 VDC or 90 VDC), but that is lower than the nominal voltage of the AC power supply (100V-120V). In another exemplary embodiment, motor 202 may be designed to operate at a voltage range of, for example, 100V to 120V, or more broadly 90 to 132V, that corresponds to the nominal voltage of the DC power supply (e.g., 108 VDC), but lower than the nominal voltage range of 220-240V of the AC power supply. In this implementation, control unit 208 may be configured to reduce the effective motor performance associated with the AC power line of the power supply interface 128-5 to correspond to the operating voltage range of the motor 202, as described below in detail.

In another implementation, motor 202 may be designed and configured to operate at a voltage range that corresponds to the nominal voltage of the AC power supply. For example, motor 202 may be designed to operate at a voltage range of, for example 120V to 120V that corresponds to the nominal voltage of the AC power supply (e.g., 100 VAC to 120 VAC), but higher than the nominal voltage of the DC power supply (e.g., 72 VDC or 90 VDC). In this implementation, control unit 208 may be configured to boost the effective motor performance associated with the DC power line to a level that corresponds to the operating voltage range of the motor 202, as described below in detail.

In yet another implementation, motor 202 may be designed to operate at a voltage range of that does not correspond to either the AC or the DC nominal voltages. For example, motor 202 may be designed to operate at a voltage range of 150V to 170V, or more broadly 135V to 187V (which is ±10% of the voltage range of 150 to 170 VAC), which may be higher than the nominal voltage of the DC power line of the power supply interface 128-5 (e.g., 108 VDC), but lower than the nominal voltage range (e.g., 220-240V) of the AC power line. In this implementation, control unit 208 may be configured to reduce the effective motor performance associated with the AC power line and boost the effective motor performance associated with the DC power line, as described below in detail.

In yet another implementation, motor 202 may be designed to operate at a voltage range that may or may not correspond to the DC nominal voltages depending on the type and rating of the battery pack(s) being used. For example, motor 202 may be designed to operate at a voltage range of, for example 90V to 132V. This voltage range may correspond to the combined nominal voltage of some combination of battery packs previously discussed (e.g. two medium-rated voltage packs for a combined nominal voltage of 108 VDC), but higher than the nominal voltage of other battery pack(s) (e.g., a medium-rated voltage pack and a low-rated voltage pack used together for a combined nominal voltage of 72 VDC). In this implementation, control unit 208 may be configured to sense the voltage received from the one or more battery pack(s) and optimize the supply of power to the motor 202 accordingly. Alternatively, control unit 208 may receive a signal from the coupled battery pack(s) or the battery supply interface 128-5, indicating the type or rated voltage of battery pack(s) being used. In this implementation, control unit 208 may be configured to reduce or boost the effective motor performance associated with the DC power line, as described below in detail, depending on the nominal voltage or the voltage rating of the battery pack(s) being used. Specifically, in an embodiment, control unit 208 may be configured to reduce the effective motor performance associated with the DC power line when the DC power supply has a higher nominal voltage than the operating voltage range of the motor 202, and boost the effective motor performance associated with the DC power line when the DC power supply has a lower nominal voltage than the operating voltage range of the motor 202, as described below in detail.

Hereinafter, in the detailed discussion of techniques used to optimize (i.e., boost or lower) the effective performance of the motor 202 relative to the nominal voltage levels of the AC and/or DC power supplies and corresponding to the operating voltage range of the motor 202, references are made to "lower rated voltage power supply" and "higher rated voltage power supply," in an embodiment.

It is initially noted that while the embodiments below are described with reference to an AC/DC power tool operable to receive power supplies having disparate nominal (or rated) voltage levels, the principles discloses here may apply to a cordless-only power tool and/or an corded-only power tool as well. For example, in order for high rated voltage DC power tool 10A3 previously discussed (which may be optimized to work at a high power and a high voltage rating) to work acceptably with DC power supplies having a total voltage rating that is less than the voltage rating of the motor), the motor control circuit 14A may be configured to optimize the motor performance (i.e., speed and/or power output performance of the motor) based on the rated voltage of the low rated voltage DC battery packs 20A1. As discussed briefly above and in detail later in this disclosure, this may be done by optimizing (i.e., booting or reducing) an effective motor performance from the power supply to a level that corresponds to the operating voltage range (or voltage rating) of the high rated voltage DC power tool 10A3.

3. Optimization of Physical Motor Characteristics Based on Power Supply

In the above-described embodiments, reference was made to a motor 202 being designed to operate at a given operating voltage range in accordance to a desired operating voltage range of the tool. According to an embodiment, the physical design of the motor 202 may be optimized for the desired operating voltage range. In an embodiment, optimizing the motor typically involves increasing or decreasing the stack length, the thickness of the stator windings (i.e., field windings), and length of the stator windings. More speed may be provided as the number of turns of the stator windings is proportionally decreased, though motor torque suffers as a result. To make up for the torque, motor stack length may be proportionally increased. Also, as the number of turns of the stator windings is decreased more space is left in stator slots to proportionally provide thicker stator wires. In other words, thickness of stator windings may be increased as the number of turns of the field winding is decreased, and vice versa. As the thickness of the stator windings is increased, motor resistance also decreases. Motor power (i.e., maximum cold power output) is a function of the resistance and the motor voltage (i.e., back EMF of the motor). Thus, as thickness of the stack length and winding thickness is increased and the number of turns is decreased, motor power is increased for a given input voltage.

In an embodiment, these changes in motor characteristics may be utilized to improve the performance of the power tool 128 with a lower rated power supply to match a desired tool performance. In other words, the voltage ranging range of the motor 202 is increased in this manner to correspond to an operating voltage range of the power tool 128. In an exemplary embodiment, where the DC power supply has a lower nominal voltage than the AC power supply, modifying these design characteristics of the motor may be used to double the maximum cold power output of the power tool operating with a 60V DC power supply, for example, from 850 W to approximately 1700 W. In an embodiment, motor control unit 208 may then be configured to reduce the optimal performance of the power tool 128 with AC power to match the desired tool performance. This may be done via any of the techniques described in the next section below.

4. PWM Control Technique for Optimizing Motor Performance Based on Power Supply

Figure 11A:
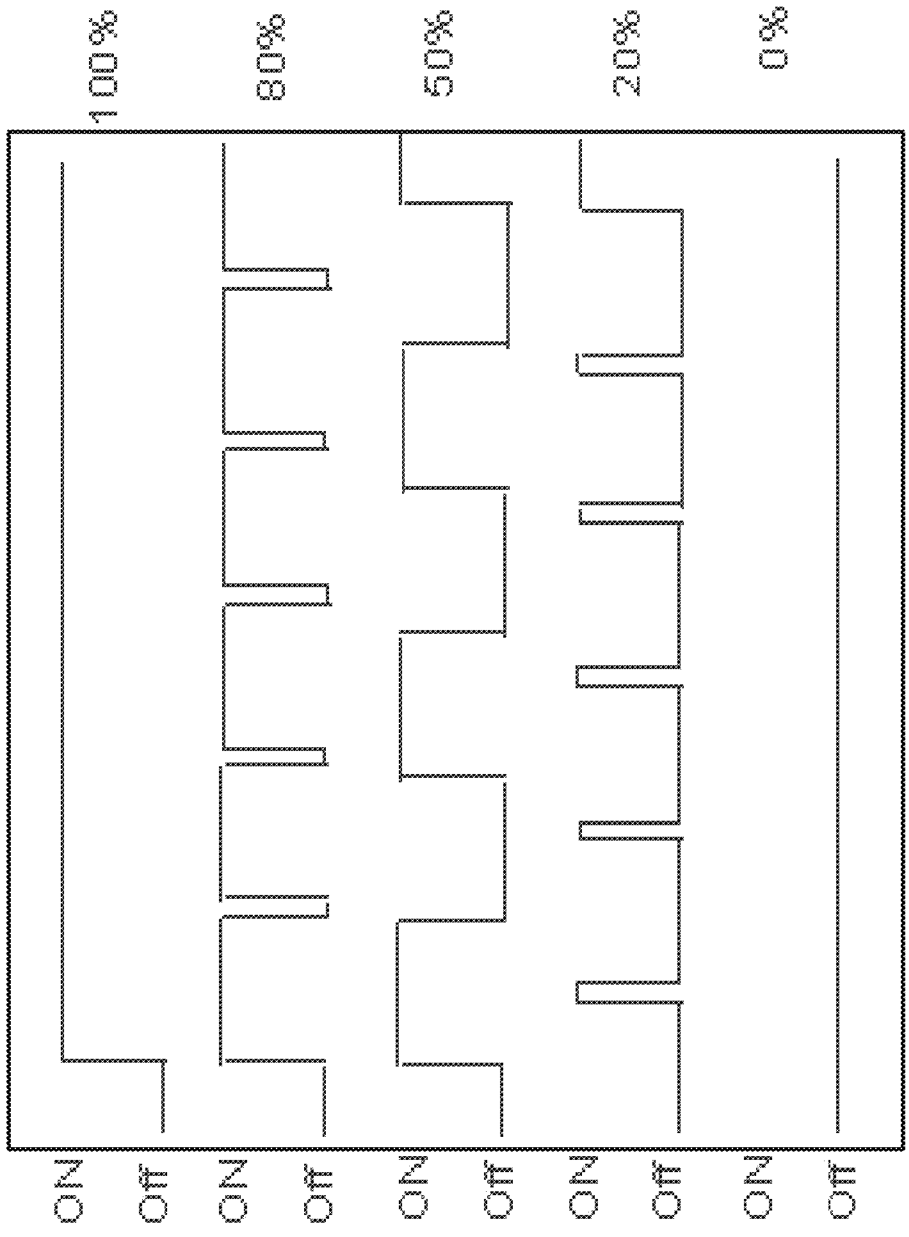
FIG. 11A depicts an exemplary waveform diagram of a drive signal for the power switch circuit within a single conduction band of a phase of the motor at various pulse-width modulation (PWM) duty cycle levels for variable-speed operation of the brushless motor, according to an embodiment.

FIG. 11A depicts an exemplary waveform diagram for a drive signal (i.e., any of UH, VH, or WH drive signals associated with the high-side switches) outputted by the controller 230 within a single conduction band of a corresponding phase (i.e., U, V, or H) of the motor. In the illustrated example, the drive signal is being modulated at 100% duty cycle, 80% duty cycle, 50% duty cycle, 20% duty cycle, and 0% duty cycle, for illustration. In this manner, controller 230 controls a speed of the motor 202 based on the variable-speed signal it receives from the variable-speed actuator (as previously discussed) to enable variable-speed operation of the motor 202 at constant load.

In order to optimize (i.e., lower) the effective performance of the motor 202 when powered by a higher rated voltage power supply, in an embodiment of the invention, the effective nominal voltage (and thus supply of power to the motor) of the higher rated voltage power supply may be reduced via a PWM control technique. In an embodiment, the control unit 208 may be configured to control a switching operation of power switch circuit 226 at a lower PWM duty cycle when receiving power from a high rated voltage power supply, as previously discussed with reference to FIGS. 7A, 7B, 9A and 9B.

For example, in an embodiment where motor 202 is designed to operate at a voltage range of 60V to 90V but receives AC power from a power supply having a nominal voltage in the range of 100-120V, the control unit 208 may be configured to set a maximum PWM duty cycle of the PWM switch circuit 226 components at a value in the range of 60% to 80% (e.g., 70%) when operating from motor 202 from the AC power line. In another example where motor 202 is designed to operate at a voltage range of 100V to 120V, or more broadly 90V to 130V, but receive AC power from a power supply having a nominal voltage in the range of 220V to 240V, the control unit 208 may be configured to set a maximum PWM duty cycle of the PWM switch circuit 226 components at a value in the range of 40% to 60% (e.g., 50%) when operating the motor 202 from the AC power line. The control unit 208 accordingly performs PWM control on the modulated AC supply (hereinafter referred to as the DC bus voltage, which is the voltage measured across the capacitor 224) proportionally from 0% up to the maximum PWM duty cycle.

In an exemplary embodiment, if the maximum duty cycle is set to 50%, the control unit 208 turns the drive signal UH, VH, or WH on the DC bus line ON at 0% duty cycle at no speed, to 25% duty cycle at half speed, and up to 50% duty cycle at full speed.

It is noted that any of the other method previously discussed with reference to power tools 123-126 (e.g., use of a half-wave diode rectifier bridge) may be additionally or alternatively utilized to lower the effective nominal voltage provided by the AC power supply to the power switch circuit 226.

It is further noted that the PWM control technique for motor performance optimization discussed above may be used in combination with the other techniques discussed later in this disclosure in order to obtain somewhat comparable speed and power performance from the motor 202 irrespective of the power supply voltage rating.

It is further noted that in some power tool applications, the PWM control scheme discussed herein may be applicable to both power supplies. Specifically, for power tool applications such as small angle grinders with a maximum power output of 1500 W, it may be desirable to optimize (i.e., lower) the effective performance of the motor 202 when power by either a 120V AC power supply (wherein the maximum PWM duty cycle may be set to, e.g., 50%), or a 72V DC power supply (wherein the maximum PWM duty cycle may be set to, e.g., 75%).

5. Current Limit for Optimization of Motor Performance Based on Power Supply

According to an embodiment of the invention, in order to optimize (i.e., lower) the effective performance of the motor 202 when powered by a higher voltage power supply, the motor control unit 208 may be configured to use a current limiting technique discussed herein.

Figure 11B:
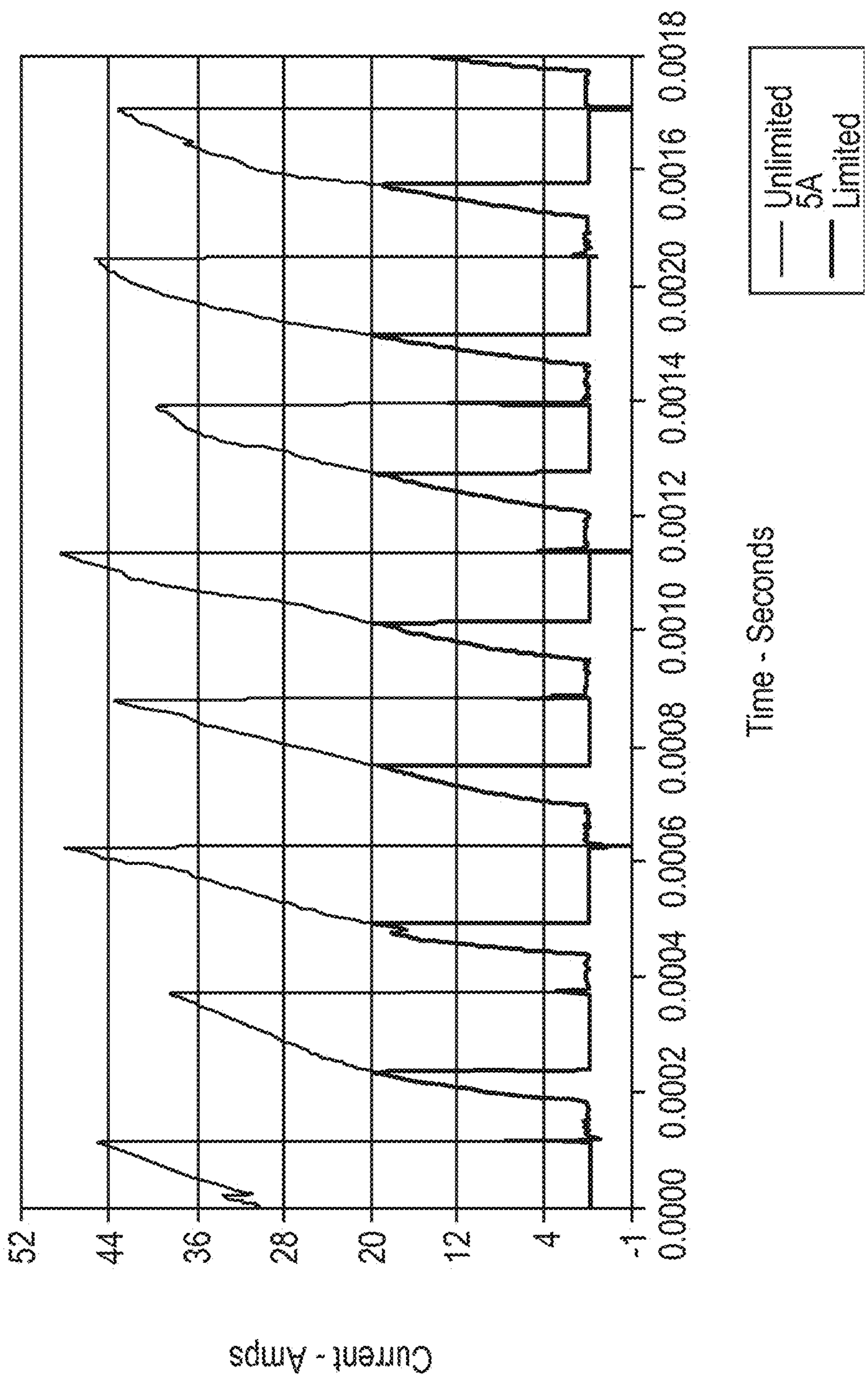
FIG. 11B depicts an exemplary current-time waveform implementing an exemplary 20 amp cycle-by-cycle current limit, according to an embodiment.

In an embodiment, control unit 208 may impose a cycle-by-cycle current limit to limit the maximum watts out of the motor 202 when operating a higher rated voltage power supply to match or fall within the performance of associated with the operating voltage range of the motor 202. When the instantaneous bus current in a given cycle exceeds a prescribed current limit, the drive signals to the switches in the PWM switch circuit 226 are turned off from the remainder of the cycle. At the beginning of the next cycle, the drive signals are restored. For each cycle, the instantaneous current continues to be evaluated in a similar manner. This principle is illustrated in FIG. 11B, where the solid line indicates the instantaneous current without a limit and the dash line indicates the instantaneous current with a 20 amp limit. Cycle-by-cycle current limit enables the power tool to achieve similar performance across different types of power supplies and under varying operating conditions as will be further described below.

Cycle-by-cycle current limiting can be implemented via a current sensor (not shown) disposed on the DC bus line and coupled to the controller 230. Specifically, a current sensor is configured to sense the current through the DC bus and provide a signal indicative of the sensed current to the controller 230. In an exemplary embodiment, the current sensor is implemented using a shunt resistor disposed in series between the rectifier 222 and the PWM switch circuit 226. Although not limited thereto, the shunt resistor may be positioned on the low voltage side of the DC bus. In this way, the controller 230 is able to detect the instantaneous current passing through the DC bus.

Figure 11C:
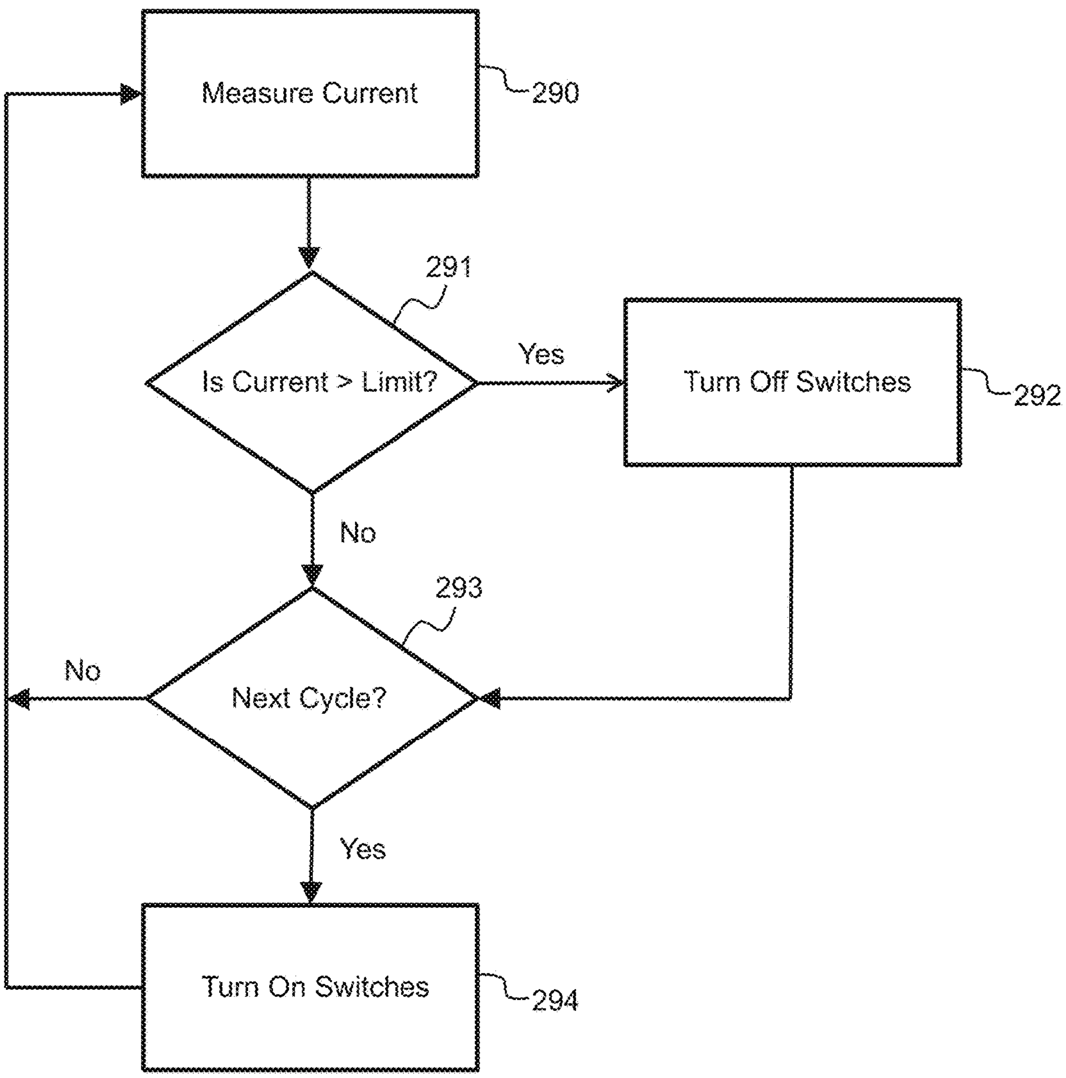
FIG. 11C depicts an exemplary flowchart for implementing cycle-by-cycle current limits.

The controller 230 is configured to receive a measure of instantaneous current passing from the rectifier to the switching arrangement operates over periodic time intervals (i.e., cycle-by-cycle) to enforce a current limit. With reference to FIG. 11C, the controller 230 enforces the current limit by measuring current periodically (e.g., every 5 microseconds) at 290 and comparing instantaneous current measures to the current limit at 291. If the instantaneous current measure exceeds the current limit, the controller 230 deactivates power switch circuit 226 switches at 292 for remainder of present time interval and thereby interrupts current flowing to the electric motor. If the instantaneous current measure is less than or equal to the current limit, the controller 230 continues to compare the instantaneous current measures to the current limit periodically for the remainder of the present time interval as indicated at 293. In an embodiment, such comparisons occur numerous times during each time interval (i.e. cycle). When the end of the present time interval is reached, the controller 230 reactivates power switch circuit 226 switches at 294 and thereby resumes current flow to the motor for the next cycle. In one embodiment, the duration of each time interval is fixed as a function of the given frequency at which the electric motor is controlled by the controller 230. For example, the duration of each time interval is set at approximately ten times an inverse of the frequency at which the electric motor is controlled by the controller. In the case the motor is controlled at a frequency of 10 kilohertz, the time interval is set at 100 microseconds. In other embodiments, the duration of each time interval may have a fixed value and no correlation with the frequency at which the electric motor is controlled by the controller.

In the example embodiment, the each time interval equals period of the PWM signals. In a constant speed tool under a no load (or constant load) condition, the duty cycle of the PWM drive signals is set, for example at 60%. In an embodiment, under load, the controller 230 operates to maintain a constant speed by increasing the duty cycle. If the current through the DC bus line increases above the current limit, the controller 230 interrupts current flow as described above which in effect reduces the duty cycle of the PWM signals. For a variable speed tool under a no load condition, the duty cycle of the PWM drive signals ranges for example from 15% to 60%, in accordance with user controlled input, such as a speed dial or a trigger switch. The controller 230 can increase or decrease the duty cycle of the PWM signals during a load condition or an over current limit condition in the same manner as described above. In one embodiment, speed control and current limiting may be implemented independently from each other by using three upper high-side power switches for speed control and the three low-side power switches for current limiting. It is envisioned that the two functions may be swapped between the upper and lower switches or combined together into one set of switches.

In the examples set forth above, the time interval remained fixed. When this period (time interval) remains fixed, then the electronic noise generated by this switching will have a well-defined fundamental frequency as well as harmonics thereof. For certain frequencies, the peak value of noise may be undesirable. By modulating the period over time, the noise is distributed more evenly across the frequency spectrum, thereby diminishing the noise amplitude at any one frequency. In some embodiment, it is envisioned that the direction of the time interval may be modulated (i.e., varied) over time to help distribute any noise over a broader frequency range.

In another embodiment, controller 230 enforces the cycle-by-cycle current limit by setting or adjusting the duty cycle of the PWM drive signals output from the gate driver circuit 232 to the power switch circuit 226. In an embodiment, the duty cycle of the PWM drive signals may be adjusted in this manner following the instant current cycle (i.e., at the beginning of the next cycle). In a fixed speed tool, the controller 230 will initially set the duty cycle of the drive signals to a fixed value (e.g., duty cycle of 75%). The duty cycle of the drive signals will remain fixed so long as the current through the DC bus remains below the cycle-by-cycle current limit. The controller 230 will independently monitor the current through the DC bus and adjust the duty cycle of the motor drive signals if the current through the DC bus exceeds the cycle-by-cycle current limit. For example, the controller 230 may lower the duty cycle to 27% to enforce the 20 amp current limit. In one embodiment, the duty cycle value may be correlated to a particular current limit by way of a look-up table although other methods for deriving the duty cycle value are contemplated by this disclosure. For variable speed tool, the controller 230 controls the duty cycle of the motor drive signals in a conventional manner in accordance with the variable-speed signal from the variable-speed actuator. The cycle-by-cycle current limit is enforced independently by the controller 230. That is, the controller will independently monitor the current through the DC bus and adjust the duty cycle of the drive signals only if the current through the DC bus exceeds the cycle-by-cycle current limit as described above.

In one embodiment, the cycle-by-cycle current limit is dependent upon the type and/or nominal voltage of the power supply. In an embodiment, depending on the nominal voltage of the AC or DC power supply, the controller 230 selects a current limit to enforce during operation of the power tool. In one embodiment, the current limit is retrieved by the controller 230 from a look-up table. An example look-up table is as follows:

| Source type | Nominal voltage | Current limit |
|---|---|---|
| AC | 120 V | 40 A |
| AC | 230 V | 20 A |
| DC | 120 V | 35 A |
| DC | 108 V | 40 A |
| DC | 60 V | 70 A |
| DC | 54 V | 80 A |

That is, in this exemplary embodiment, in a motor 202 having an operating voltage range of 100V to 120V, the controller 230 will enforce a 40 amp current limit when the tool is coupled to a 120V AC power supply but will enforce a 20 amp current limit when the tool is coupled to a 230V AC power supply. As a result, the effective output power of the tool is substantially the same. In an alternative embodiment where the power tool has an operating voltage range of 150V to 170V, controller 230 may enforce a 30 A current limit in order to reduce the effective performance of the motor 202 when powered by the 230V AC power supply.

Further, controller 230 is configured to enforce a 40 am current limit when the tool is coupled to a 108V DC power supply, but will enforce a slightly lower current limit (e.g., 35 amps) when the tool is coupled to a 120V DC power supply (e.g., when the tool is being supplied DC power from a generator or a welder). Similarly, controller 230 is configured to enforce a 80 am current limit when the tool is coupled to a 54V DC power supply, but will enforce a slightly lower current limit (e.g., 70 amps) when the tool is coupled to a 60V DC power supply. These current limits result in output power levels from the AC or DC power supplies to all be compatible with a motor 202 having an operating voltage range of 100V to 120V.

Further details for cycle-by-cycle current limiting and its applications are discussed in U.S. Provisional Application No. 62/000,307, filed May 19, 2014, titled "Cycle-By-Cycle Current Limit For Power Tools Having A Brushless Motor," and related U.S. Utility patent application Ser. No. 14/715,079 filed May 18, 2015 having the same title filed concurrently herewith, each of which is incorporated herein by reference in its entirety.

It is noted that the cycle-by-cycle current limiting technique for optimization of motor performance discussed above may be used in combination any other motor performance optimization technique discussed in this disclosure in order to obtain somewhat comparable speed and power performance from the motor 202 irrespective of the power supply voltage rating.

6. Conduction Band and/or Advance Angle Control for Adjusting Motor Performance Based on Power Supply According to an embodiment of the invention, in order to optimize (i.e., boost or enhance) the effective performance of the motor 202 when powered by a higher rated voltage power supply, the control unit 208 may be configured to use a technique involving the conduction band and/or the advance angle (herein referred to as "CB/AA technique") described herein.

Figure 12A:
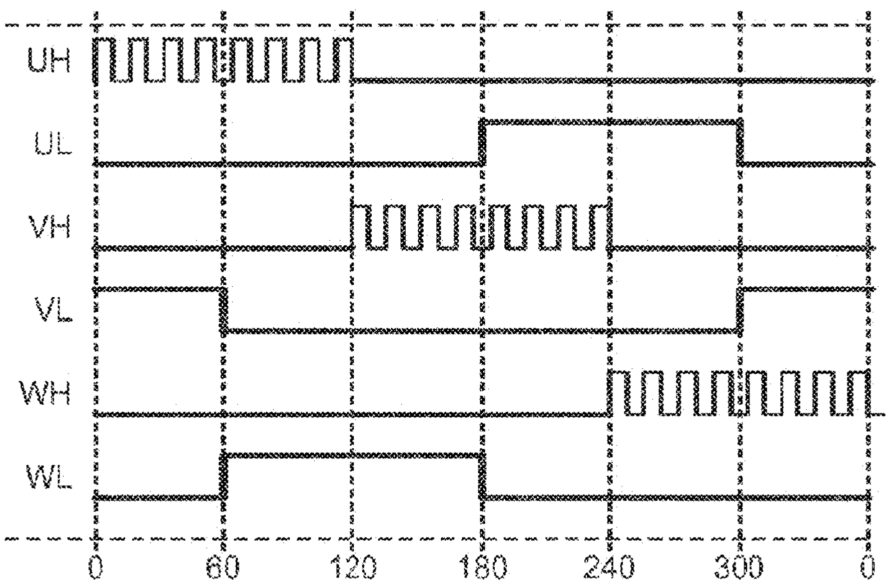
FIG. 12A depicts an exemplary waveform diagram of a pulse-width modulation (PWM) drive sequence of the three-phase inventor bridge circuit FIG. 10C within a full 360 degree conduction cycle, where each phase is being driven at a 120 degree conduction band (CB), according to an embodiment.

FIG. 12A depicts an exemplary waveform diagram of a pulse-width modulation (PWM) drive sequence of the three-phase inventor bridge circuit FIG. 10C within a full 360 degree conduction cycle. As shown in this figure, within a full 360° cycle, each of the drive signals associated with the high-side and low-side power switches is activated during a 120° conduction band ("CB"). In this manner, each associated phase of the BLDC 202 motor is energized within a 120° CB by a pulse-width modulated voltage waveform that is controlled by the control unit 208 as a function of the desired motor 202 rotational speed. For each phase, UH is pulse-width modulated by the control unit 208 within a 120° CB. During the CB of the high-side switch, the corresponding UL is kept low. The UL signal is then activated for a full 120° CB within a half cycle (180°) after the CB associated with the UL signal. The control unit 208 controls the amount of voltage provided to the motor, and thus the speed of the motor, via PWM control of the high-side switches.

It is noted that while the waveform diagram of FIG. 12A depicts one exemplary PWM technique at 120° CB, other PWM methods may also be utilized. One such example is PWM control with synchronous rectification, in which the high-side and low-side switch drive signals (e.g., UH and UL) of each phase are PWM-controlled with synchronous rectification within the same 120° CB.

Figure 12B:
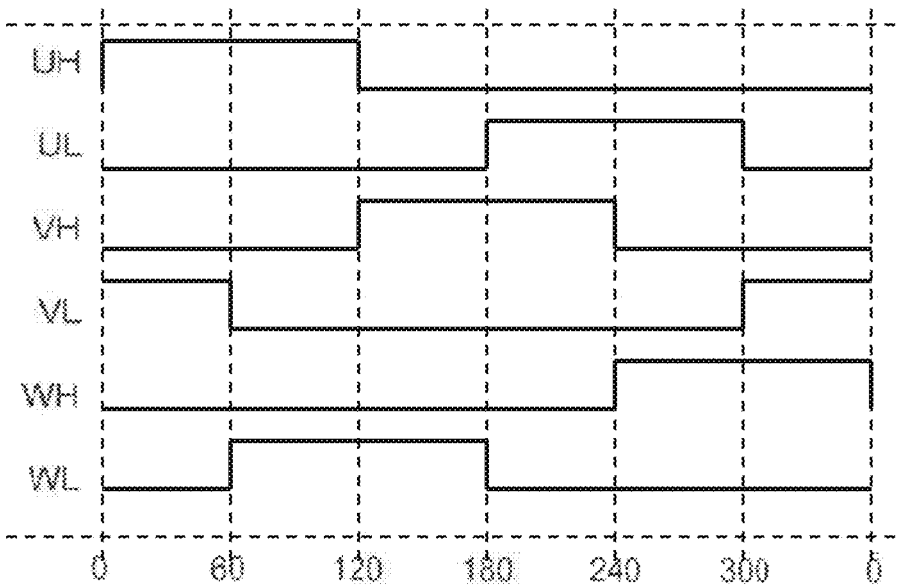
FIG. 12B depicts an exemplary waveform diagram of the drive sequence of FIG. 12A operating at full-speed, according to an embodiment.

FIG. 12B depicts an exemplary waveform diagram of the drive sequence of the three-phase inventor bridge discussed above operating at full-speed (i.e., maximum speed under constant-load condition). In this figure, the three high-side switches conduct at 100% PWM duty cycle during their respective 120° CBs, providing maximum power to the motor to operate at full-speed.

In a BLDC motor, due to imperfections in the commutation of the power switches and the inductance of the motor itself, current will slightly lag behind the back-EMF of the motor. This causes inefficiencies in the motor torque output. Therefore, in practice, the phase of the motor is shifted by an advance angle ("AA") of several degrees so the current supplied to the motor no longer lags the back-EMF of the motor. AA refers to a shifted angle Y of the applied phase voltage leading ahead a rotational EMF of the corresponding phase.

In addition, in an embodiment, the motor 202 may be an interior-permanent magnet (IPM) motor or other salient magnet motor. Salient magnet motors can be more efficient than surface-mount permanent magnet motors. Specifically, in addition to the magnet torque, a salient magnet motor includes a reluctance torque that varies as a function of the motor current (specifically, as a function of the square of the motor current), and therefore lags behind the magnet torque. In order to take advantage of this reluctance torque, in an embodiment, the AA shifted angle Y is increased to encompass the lag of the reluctance torque. The added reluctance torque enables the salient magnet motor to produce 15 percent or more torque per amp than it would without the further shift in angle Y.

In an embodiment, AA may be implemented in hardware, where positional sensors are physically shifted at an angle with respect to the phase of the motor. Alternatively or additional, AA may be implanted in software, where the controller 230 is configured to advance the conduction band of each phase of the motor by the angle Y, as discussed herein.

Figure 12C:
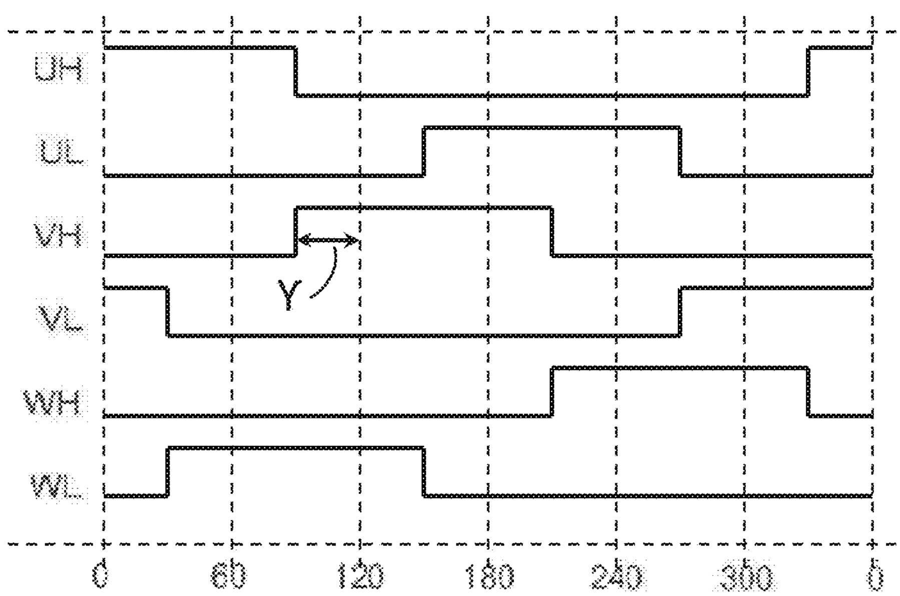
FIG. 12C depicts an exemplary waveform diagram corresponding to the drive sequence of FIG. 12B with an advance angle (AA) of Y=30°, according to an embodiment.

FIG. 12C depicts the waveform diagram of the drive sequence of FIG. 12B, shown with an AA of Y=30°, according to an embodiment. In an embodiment, AA of 30 degrees is sufficient (and is commonly used by those skilled in the art) in BLDC applications to account for the current lag with respect to the back-EMP of the motor and take advantage of the reluctance torque of salient magnet motors.

Figure 12D:
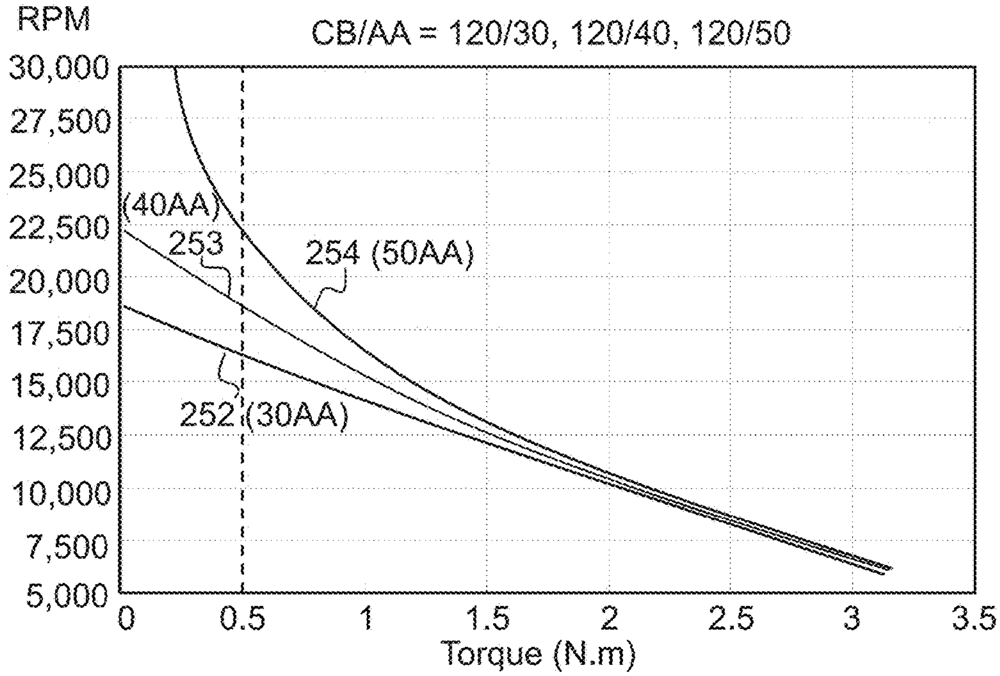
FIG. 12D depicts an exemplary speed-torque waveform diagram of an exemplary high powered tool showing the effect of increasing AA at a fixed CB of 120° on the speed/torque profile, according to an embodiment.

According to an embodiment, increasing the AA to a value greater than Y=30° can result in increased motor speed performance. FIG. 12D depicts a speed/torque waveform diagram of an exemplary power tool 128, where increasing the AA at a fixed CB of 120° results in an upward shift in the speed/torque profile, i.e., from 252 (Y=30°), to 253 (Y=40°), to 254 (Y=50°. This shift is particularly significant at a low torque range (e.g., 0 to 1 N.m.), where motor speed can increase by approximately 20% from 252 to 253, and even more from 253 to 254 (particularly at very low torque range of, e.g., 0.2 N.m. where the speed can more than double). At a medium torque range (e.g., 1 to 2 N.m.), the increase in motor speed is noticeable, but not significant. At a high torque range (e.g., 2 N.m. and above), the increase in motor speed is minimal.

Figure 12E:
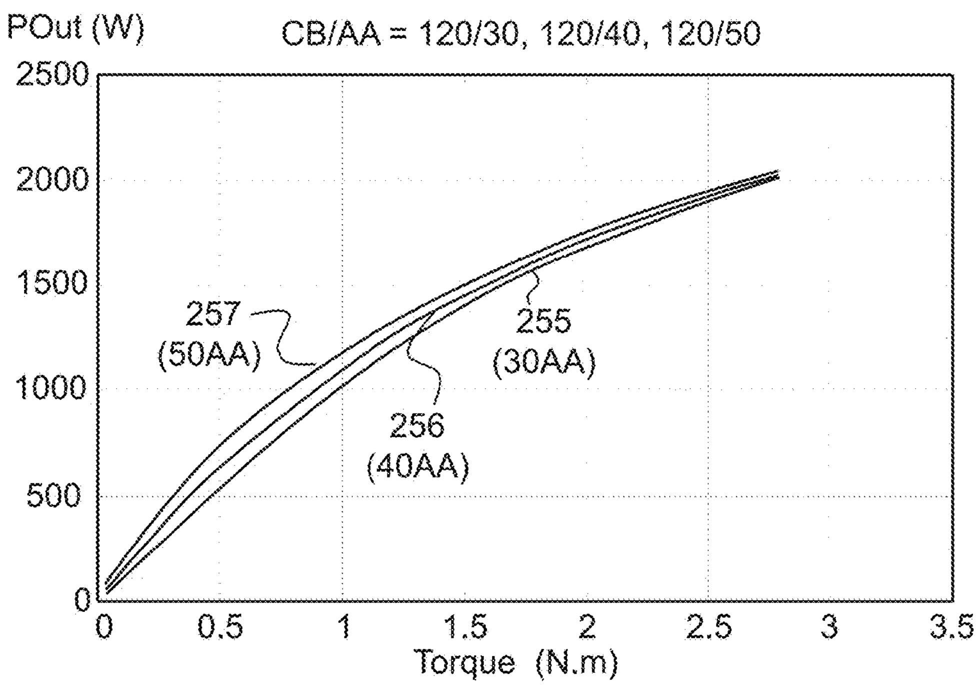
FIG. 12E depicts an exemplary power-torque waveform diagram of the same high powered tool showing the effect of increasing AA at a fixed CB of 120° on the power/torque profile, according to an embodiment.

Similarly, increasing the AA to a value greater than Y=30° can result in increased power output. FIG. 12E depicts a power-out/torque waveform diagram of exemplary tool 128, where increasing the AA at fixed CB of 120° results in an upward shift in the power-out/torque profile, i.e., from 255 (AA=30°), to 256 (AA=40°), to 257 (AA=50°). This shift is somewhat significant at the low and medium torque range of, for example, up to 20% at approximately 1 N.m., but does not have a considerable effect on power output at the high torque range.

While not depicted in these figures, it should be understood that within the scope of this disclosure and consistent with the figures discussed above, power output and speed performance may similarly be reduced if AA is set to a value lower than Y=30° (e.g., Y=10° or 20°).

According to an embodiment of the invention, in order to optimize the effective performance of the motor 202 when tool 128 is powered by a power supply that has a nominal (or rated) voltage that is higher or lower than the operating voltage of the motor 202, the AA for the phases of the motor 202 may be set according to the voltage rating or nominal voltage of the power supply. Specifically, AA may be set to a higher value in order to boost the performance of the motor 202 when powered by a lower rated voltage power supply, and set to a lower value in order to reduce the performance of the motor 202 when powered by a higher rated voltage power supply, so that somewhat equivalent or comparable speed and power performance is obtained from the motor 202 irrespective of the power supply voltage rating. For example, in an embodiment, control unit 208 may be configured to set AA of Y=30° when power supply has a nominal voltage that falls within or matches the operating voltage range of the motor 202 (e.g., 70-90V), but set AA to a higher value (e.g., Y=50°) when power tool 128 is coupled to a lower rated voltage power supply (e.g., 54 VDC), and/or set AA to a lower value (e.g., Y=20°) when power tool 128 is coupled to a higher rated voltage power supply (e.g., 120 VAC). In an embodiment, control unit 208 may be provided with a look-up table or an equation defining a functional relationship between AA and the power supply voltage rating.

Figure 12F:
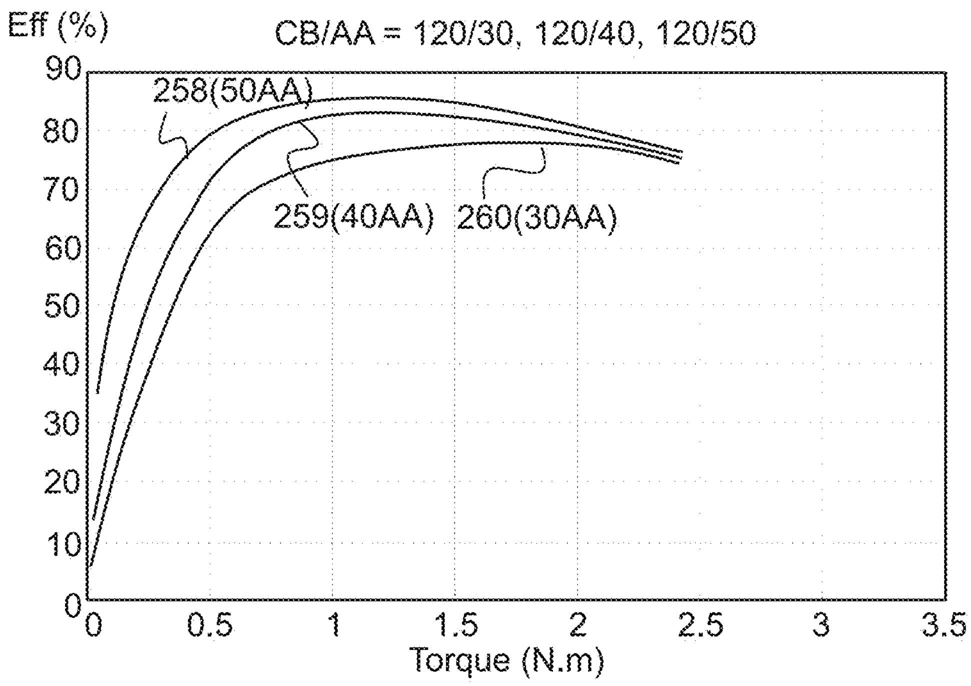
FIG. 12F depicts an exemplary efficiency-torque waveform diagram of the same high powered tool showing the effect of increasing AA at a fixed CB of 120° on the efficiency/torque profile, according to an embodiment.

While increasing AA to a value greater than Y=30° may be used to boost motor speed and power performance, increasing the AA alone at a fixed CB can result in diminished efficiency. As will be understood by those skilled in the art, efficiency is measured as a function of (power-out/power-in). FIG. 12F depicts an exemplary efficiency/torque waveform diagram of tool 128, where increasing the AA at fixed CB of 120° results in a downward shift in the efficiency/torque profile, i.e., from 258 (Y=30°), to 259 (Y=40°), to 265 (Y=50°). This shift is particularly significant at low torque range, where efficiency can decrease by, for example, approximately 20% at around 0.5 N.m., and even more at lower torque. In other words, while increasing the AA alone (at fixed CB) to a value greater than Y=30° can increase speed and power output at low and medium torque ranges, it does so by significantly sacrificing tool efficiency.

It was found by the inventors of this application that increasing the CB for each phase of a BLDC motor increases total power output and speed of the motor 208, particularly when performed in tandem with AA, as discussed herein.

Figure 13A:
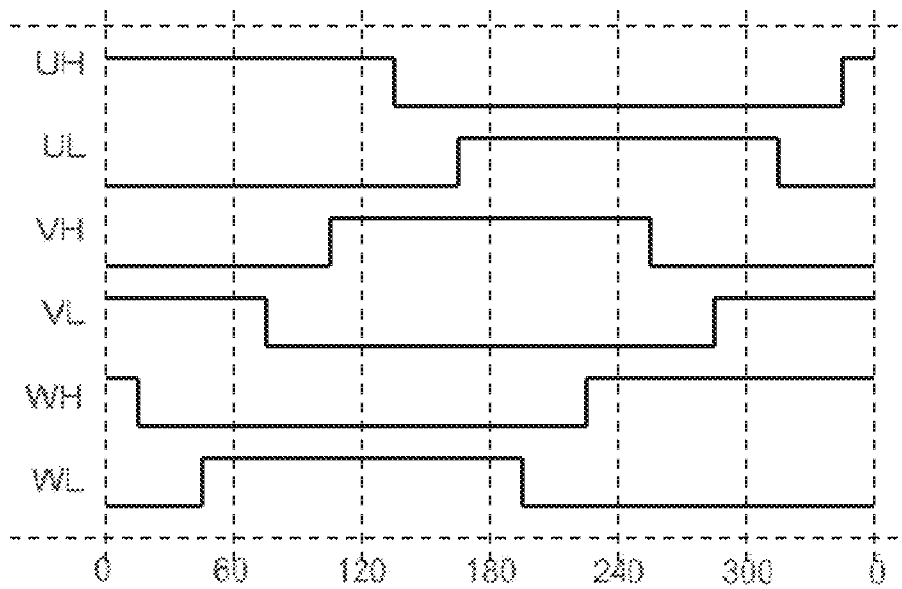
FIG. 13A depicts an exemplary waveform diagram of the drive sequence of the three-phase inventor bridge circuit, where each phase is being driven at CB of 150°, according to an embodiment.

Turning to FIG. 13A, a waveform diagram of the drive sequence of the three-phase inventor bridge of the power switch circuit 226 previously discussed is depicted, with a CB value greater than 120°, according to an embodiment of the invention. In an embodiment, the CB of each phase of the brushless motor may be increased from 120°, which is the CB value conventionally used by those skilled in the art, to, for example, 150° as shown in this illustrative example. As compared to a CB of 120° shown in FIG. 12A, the CB may be expanded by 15° on each end to obtain a CB of 150°. Increasing the CB to a value greater than 120° allows three of the switches in the three-phase inventor bridge to be ON simultaneously (e.g., between 45° to 75° and 105° to 135° in the illustrative example) and for voltage to be supplied to each phase of the motor during a larger conduction period. This, in effect, increases the total voltage amount being supplied to the motor 202 from the DC bus line, which consequently increases the motor speed and power output performance, as discussed below.

Figure 13B:
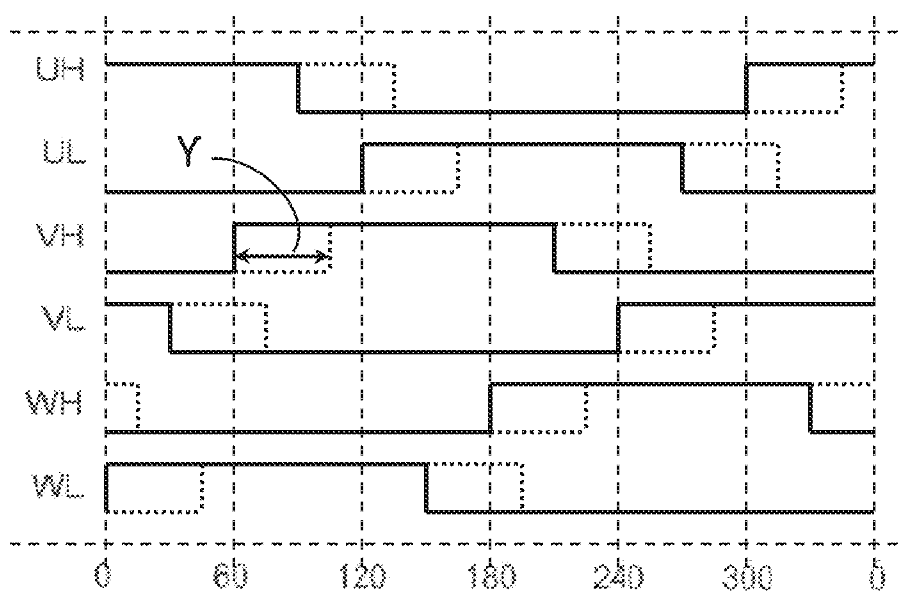
FIG. 13B depicts an exemplary waveform diagram of the drive sequence of the three-phase inventor bridge circuit, where each phase is being driven at CB of 150° with an AA of Y=30°, according to an embodiment.

FIG. 13B depicts an embodiment of the invention where the AA of each phase of the brushless motor is also varied in tandem with and corresponding to the CB. In the illustrative example, where the CB is at 150°, the AA is set to an angle of Y=45°. In an embodiment, various CB and AA correlations may be implemented in controller 230 as a look-up table or an equation defining a functional relationship between CB and the associated AA.

An exemplary table showing various CB and associated AA values is as follows:

| CB | AA (Y) |
|---|---|
| 120° | 30° |
| 130° | 35° |
| 140° | 40° |

-continued

| CB | AA (Y) |
|---|---|
| 150° | 45° |
| 160° | 50° |
| 170° | 55° |

It is noted that while these exemplary embodiments are made with reference to CB/AA levels of 120°/30°, 140°/40°, 160°/50°, these values are merely exemplary and any CB/AA value (e.g., 162°/50.6°, etc.) may be alternatively used. Also, the correlation between AA and CB provides in this table and throughout this disclosure is merely exemplary and not in any way limiting. Specifically, while the relationship between CB and AA in the table above is linear, the relationship may alternatively be non-linear. Also, the AA values given here for each CB are by no means fixed and can be selected from a range. For example, in an embodiment, CB of 150° may be combined with any AA in the range of 35° to 55°, preferably in the range of 40° to 50°, preferably in the range of 43° to 47°, and CB of 160° may be combined with any AA in the range of 40° to 60°, preferably in the range of 45° to 55°, preferably in the range of 48° to 52°, etc. Moreover, optimal combinations of CB and AA may vary widely from the exemplary values provided in the table above in some power tool applications.

Figure 13C:
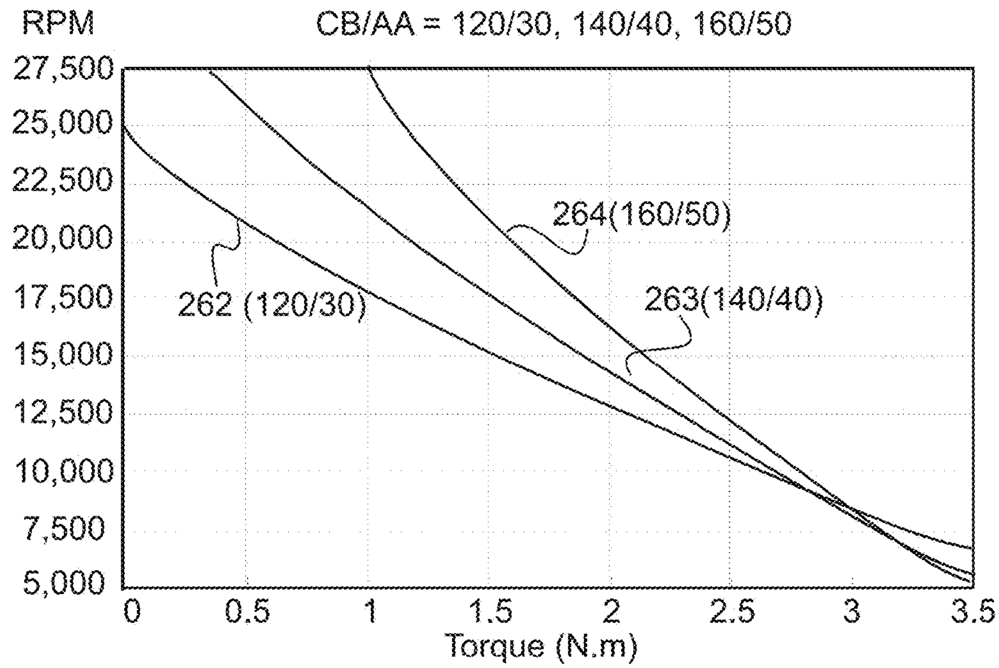
FIG. 13C depicts an exemplary speed-torque waveform diagram of an exemplary high powered tool showing the effect of increasing CB and AA in tandem on the speed/torque profile, according to an embodiment.
Figure 13D:
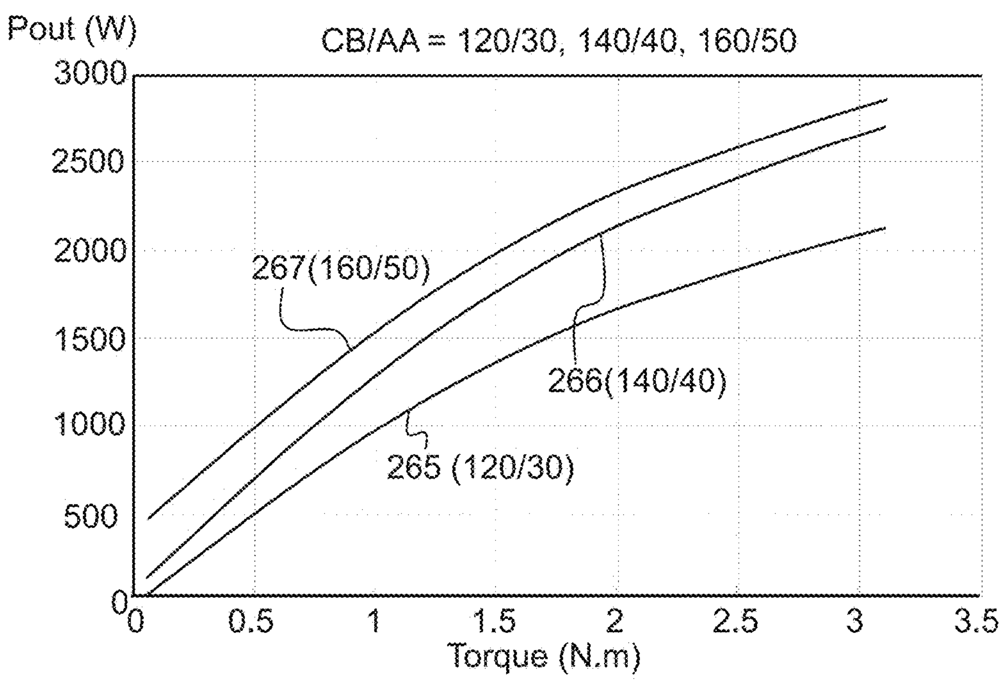
FIG. 13D depicts an exemplary power-torque waveform diagram of the same high powered tool showing the effect of increasing CB and AA in tandem on the power/torque profile, according to an embodiment.

Referring now to FIGS. 13C and 13D, increasing the CB and AA in tandem (hereinafter referred to as "CB/AA") as described above to a level greater than the CB/AA of 120°/30° can result in better speed and power output performance over a wider torque range as compared to the waveform diagrams of FIGS. 12D and 12E, according to an embodiment.

As shown in the exemplary speed/torque waveform diagram of FIG. 13C for tool 128, increasing CB/AA results in a significant upward shift in the speed/torque profile, i.e., from 262 (CB/AA=120°/30°), to 263 (CB/AA=140°/40°), to 264 (CB/AA=160°/50°), according to an embodiment. This increase is the greatest at the low torque range (where speed performance can improve by at least approximately 60%), but still significant at the medium torque range (where speed performance can improve by approximately 20% to 60%). It is noted that in an embodiment, the speed/torque profiles 262, 263, 264 begin to converge at a very low speed/very high torque range (e.g., between 7,000 rpm to 10,000 rpm), after which point increasing CB/AA no longer results in better speed performance.

Similarly, as shown in the exemplary power-out/torque waveform diagram of FIG. 13D for tool 128, increasing CB/AA results in a significant upward shift in the power-out/torque profile, i.e., from 265 (CB/AA=120°/30°), to 266 (CB/AA=140°/40°), to 267 (CB/AA=160°/50°), according to an embodiment. In an embodiment, this increase is the greatest from 266 (CB/AA=140°/40°) to 267 (CB/AA=160°/50°) at the low torque range and from 265 (CB/AA=120°/30°) to 266 (CB/AA=140°/40°) at medium and high torque ranges. It is noted that in this figure the increase in CB/AA from 120°/30° to 160°/50° may yield an increase of up to 50% for some torque conditions, though the motor maximum power output (measured at very high load at max speed) may be increased by 10-30%.

While not depicted in these figures, it should be understood that within the scope of this disclosure and consistent with the figures discussed above, power output and speed performance may similarly be reduced if CB/AA is set to a lower level (e.g., 80°/10° or 100°/20°) than 120°/30°.

According to an embodiment of the invention, in order to optimize the effective performance of the motor 202 when tool 128 is powered by a power supply that has a nominal (or rate) voltage that is higher or lower than the operating voltage of the power tool 128, the CB/AA for the phases of the motor 202 may be set according to the voltage rating or nominal voltage of the power supply. Specifically, CB/AA may be set to a higher value in order to boost the performance of the motor 202 when powered by a lower rated voltage power supply, and set to a lower value in order to reduce the performance of the motor 202 when powered by a higher rated voltage power supply, so that somewhat comparable speed and power performance is obtained from the motor 202 irrespective of the power supply voltage rating.

In an embodiment, control unit 208 may be configured to set CB/AA to 120°/30° when power supply has a nominal voltage that corresponds to the operating voltage range of the motor 202, but set CB/AA to a higher level when coupled to a lower rated voltage power supply. Similarly, control unit 208 sets CB/AA to a lower level when coupled to a higher rated voltage power supply. For example, for a motor 202 having an operating voltage range of 70V-90V, control unit 208 may be configured to set CB/AA to 120°/30° for a 72 VDC or 90 VDC power supply, but to, e.g., 140°/40° for a 54 VDC power supply and to 100°/20° for a 120 VAC power supply. In another example, for a motor 202 having an operating voltage range of 90V to 132V, control unit 208 may be configured to set CB/AA to 120°/30° for a 120 VAC power supply, but to proportionally higher values, e.g., 160°/50° and 140°/40° respectively for a 54 VDC power supply and a 72 VDC power supply. In yet another example, for a motor 202 having an operating voltage range of 135V to 187V, control unit 208 may be configured to set CB/AA to, e.g., 140°/40° for a 108 VDC power supply or a 120 VAC power supply, and to 100°/20° for a 220 VAC power supply. In an embodiment, control unit 208 may be provided with a look-up table or an equation defining a functional relationship between CB/AA and the power supply voltage rating.

In an embodiment, the CB/AA control technique described herein may be used in combination with any of the other motor optimization techniques disclosed in this disclosure. For example, the CB/AA control technique may be used to boost the performance of the motor 202 when powered by a lower rated voltage power supply, and the PWM control technique discussed above, or the cycle-by-cycle current limiting technique discussed above, or a combination of both, may be used to lower the performance of the motor 202 when powered by a higher rated voltage power supply, so that somewhat comparable speed and power performance is obtained from the motor 202 irrespective of the power supply voltage rating. However, in an embodiment, it may be advantageous to utilize the CB/AA technique described above over the PWM control technique to lower performance of the motor for a higher rated voltage power supply, particularly for constant-speed power tool applications. This is because PWM switching of the power switches generates heat and increases the voltage harmonic factor. Use of the CB/AA technique described mitigates those effects on heat and voltage harmonics.

It is noted that while the description above is directed to adjusting CB in tandem with AA based on power supply rated voltage, adjusting CB alone (i.e., at a fixed AA level) according to the power supply rated voltage is also within the scope of this disclosure. Specifically, just as varying the AA level at constant CB has an effect on power and speed performance at certain torque ranges (as described above with reference to FIGS. 12D-12F), varying the CB level above and below 120 degrees at constant AA can also increase or decrease total voltage supplied to the motor, and therefore enhance or decrease motor speed and power output, tool efficiency may be sacrificed in certain torque ranges. Accordingly, in an embodiment of the invention, where tool 128 is powered by a power supply that has a nominal (or rated) voltage that is higher or lower than the operating voltage of the motor 202, the effective motor performance may be optimized by adjusting the CB (at constant AA) for the phases of the motor 202 according to the voltage rating or nominal voltage of the power supply. Specifically, CB may be set to a higher value than 120 degrees in order to boost the performance of the motor 202 when powered by a lower rated voltage power supply, and set to a lower value in order to reduce the performance of the motor 202 when powered by a higher rated voltage power supply, so that somewhat equivalent speed and power performance is obtained.

It is also once again reiterated that CB/AA levels of 120 /30°, 140°/40°, 160°/50° mentioned in any of these embodiments (as well as the embodiments discussed below) are merely by way of example and any other CB/AA level or combination that result in increased power and/or speed performance in accordance with the teachings of this disclosure are within the scope of this disclosure.

It is also noted that all the speed, torque, and power parameters and ranges shown in any of these figures and discussed above (as we as the figures and embodiments discussed below) are exemplary by nature and are not limiting on the scope of this disclosure. While some power tools may exhibit similar performance characteristics shown in these figures, other tools may have substantially different operational ranges.

7. Improved Torque-Speed Profile

Figure 13E:
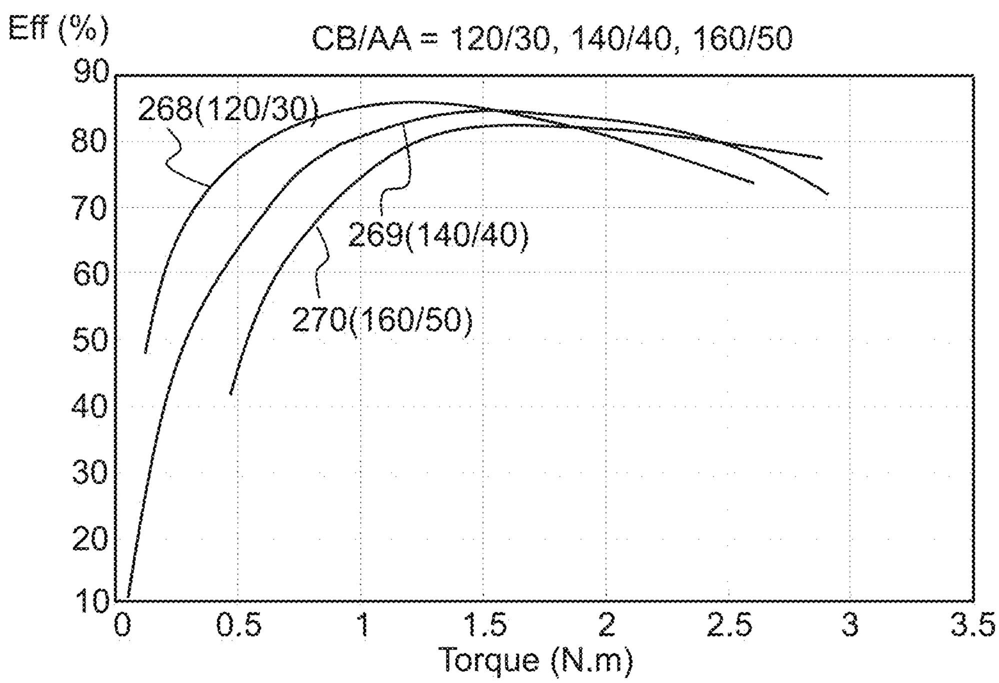
FIG. 13E depicts an exemplary efficiency-torque waveform diagram of the same high powered tool showing the effect of increasing CB and AA in tandem on the efficiency/torque profile, according to an embodiment.

Referring now to FIG. 13E, an exemplary efficiency/torque diagram of tool 128 is depicted with various CB/AA values at 268 (CB/AA=120°/30°), 269 (CB/AA=140°/40°) and 270 (CB/AA=160°/50°), according to an embodiment. As can be seen in this figure, CB/AA of 120°/30° yields the best efficiency at approximately a low to medium range (e.g., 0 to approximately 1.5 N.m. in the illustrative example), CB/AA of 140°/40° yields the best efficiency at approximately a medium to high torque range (approximately 1.5 N.m. to approximately 2.5 N.m. in the illustrative example), and CB/AA of 160°/50° yields the best efficiency at approximately a high torque range (approximately above 2.5 N.m. in the illustrative example). Accordingly, while increasing CB/AA beyond 120°/30° level greatly improves speed and power performance at all torque ranges, it may do so to the detriment of efficiency in some operating conditions, particularly at relative low torque ranges.

In addition, power tools applications generally have a top rated speed, which refers to the maximum speed of the power tool motor at no load. In variable-speed tools, the maximum speed typically corresponds to a desired speed that the motor is designed to produce at full trigger pull. Also, the rated voltage or operating voltage (or voltage range) of the motor previously discussed corresponds to the power tool's desired top rated speed. The motor's physical characteristics previously discussed (e.g., size, number of windings, windings configuration, etc.) are also generally designed to be compatible with the power tool's torque and maximum speed requirements. In fact, it is often necessary to protect the motor and the power tool transmission from exceeding the top rated speed. In a tool where the motor has the capability to output more speed than the tool's top rated speed, the speed of the motor is typically capped at its top rated speed. Thus, while increasing speed performance via the above-described CB/AA technique is certainly desirable within some torque/speed ranges, it is impractical in certain operating conditions if the increased CB/AA causes the motor speed to exceed the top rated speed of the tool. This is particularly true in the low torque range, where, as previously shown in FIG. 13C, increasing CB/AA creates a very large shift in the speed profile.

In an exemplary embodiment, where tool 128 of FIG. 13C has a top rated speed of 25,000 rpm, operating the motor 202 at CB/AA of 120°/30° allows the tool to operate within its top rated speed, but operating the tool at a higher CB/AA exceeds the top rated speed at the low torque range (e.g., speed exceeds 25,000 rpm with CB/AA of 160°/50° at under 1 N.m. torque, or with CB/AA of 140°/40° at under 0.6 N.m torque).

Figure 13F:
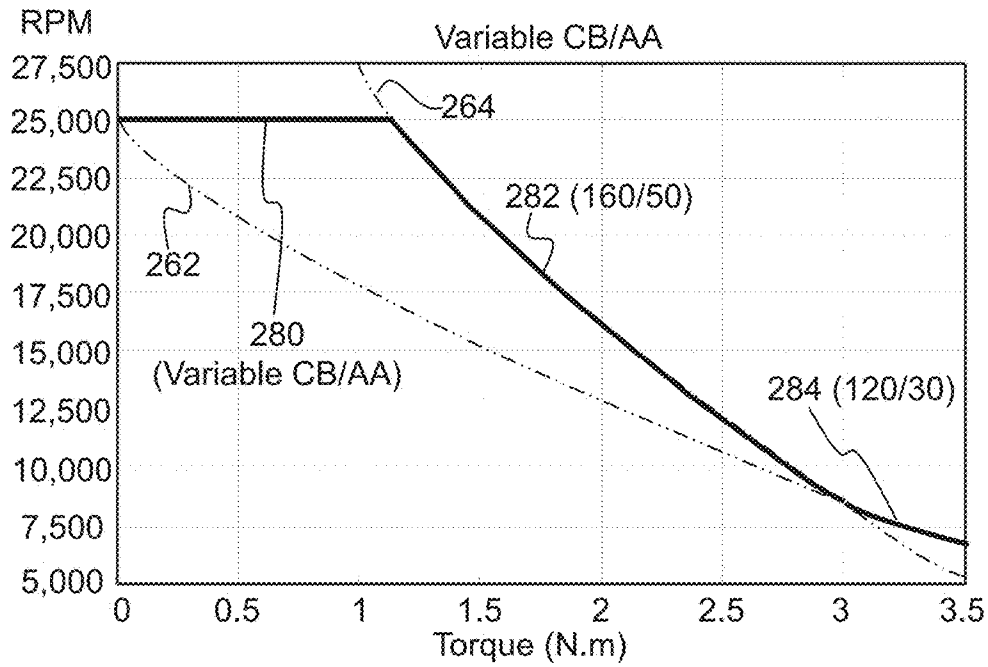
FIG. 13F depicts an exemplary improved speed-torque waveform diagram of an exemplary high powered tool using variable CB/AA, according to an embodiment.

Accordingly, in an embodiment of the invention, as shown in FIG. 13F, an improved speed-torque profile is provided, wherein at the top rated speed of the tool, the motor speed is held at a constant rate (i.e., includes a substantially flat profile 280) within a first torque range, e.g., 0 to approximately 1.2 N.m., and at a variable rate within a second torque range, e.g., above 1.2 N.m. In an embodiment, during the first torque range, CB/AA is gradually increased as a function of the torque from its base value (e.g., 120/30°) to a threshold value (e.g., 160/50°). Once that CB/AA threshold is reached, the speed-torque profile follows a curved profile 282 of the normal speed-torque profile operating at a CB/AA corresponding to the threshold value (e.g., profile 264 operating at 160/50°). In other words, the speed-torque curve at CB/AA of 160/50° is "clipped" below the tool's maximum speed, which in this example is 25,000 RPM.

The tool's performance according to this improved speed-torque profile is improved in several regards. First, it avoids operating the motor at high CB/AA levels of, for example, 160/50° at the low torque range, in particular at very low torque of under 0.5 N.m. in the exemplary embodiment where efficiency suffers the most from operating at a high CB/AA (see FIG. 13E above). This dramatically increases motor efficiency at the low torque range. Also, it gives the users the ability to operate the tool at maximum speed for a wide range of the operating torque (0 to 1.2 N.m. in the exemplary embodiment), which is beneficial to the users. Moreover, the tool operates according to a speed-torque curve at medium and high torque ranges, which the users generally expect, but at a higher power output and higher efficiency as described with reference to FIGS. 13D and 13E above. This arrangement thus increases overall tool efficiency and power output.

In order to maintain constant speed at flat portion 280 of the speed/torque profile, control unit 208 may be configured to operate the motor at variable CB/AA calculated or determined as a function of the torque from a base CB/AA value (e.g., 120/30°, which corresponds to a torque of slightly above to zero) to a threshold CB/AA value (e.g., 160/50°), as described above. In an embodiment, control unit 208 may utilize a look-up table or an algorithm to calculate and gradually increase the CB/AA as required to achieve the desired constant speed as a function of torque, according to an embodiment. Thereafter, control unit 208 is configured to operate the motor at constant CB/AA corresponding to the CB/AA threshold value (e.g., 160/50°), according to an embodiment.

According to an alternative embodiment, the control unit 208 may be configured to operate the motor at variable CB/AA calculated as a function of the torque from a low torque threshold (e.g., zero or slightly above zero, which corresponds to, e.g., CB/AA of 120/30°) to a high torque threshold (e.g., 1.2 N.m., which corresponds to, e.g., CB/AA of 160/50°). Again, the control unit 208 may utilize a look-up table or an algorithm to calculate and gradually increase the CB/AA that is required to achieve the desired constant speed as a function of the torque, according to an embodiment. Thereafter, control unit 208 is configured to operate the motor at constant CB/AA corresponding to the high torque threshold (e.g., 160/50° corresponding to 1.2 N.m.), according to an embodiment.

As discussed with reference to FIG. 13C above, the speed/torque profiles 262, 263, 264 begin to converge at a very low speed/very high torque range (e.g., between 7,000 rpm to 10,000 rpm and around 3 N.m.), after which point increasing CB/AA no longer results in better speed performance. After that point, speed/torque profiles 262 (120/30° yields higher speed performance than higher CB/AA levels. Thus, according to an embodiment, above a high threshold torque value (e.g., 3 N.m. in this example) or below a low threshold speed (e.g., approximately 8,500 rpm in this example), the speed/torque profile may revert back from profile 282 corresponding to a CB/AA of 160/50° to another profile 284 corresponding to a CB/AA of 120/30°, in order to obtain higher performance at high torque and low speed levels. The control unit 208 in this embodiment may be configured to reduce the CB/AA from the high threshold of 160/50° back down to 120/30° once the high threshold torque (or low threshold speed) is reached. This reversion may be done instantaneously or gradually to obtain a smooth transition.

Figure 13G:
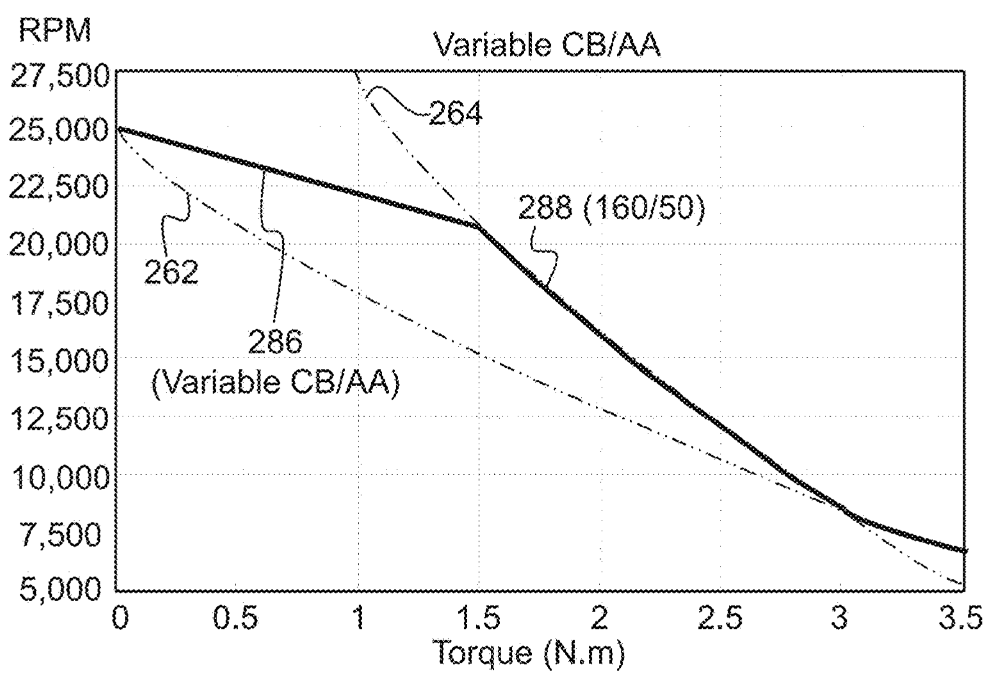
FIG. 13G depicts another improved speed-torque waveform diagram of the same high powered tool using variable CB/AA, according to an alternative embodiment.

FIG. 13G depicts a further improvement to the speed-torque profile of FIG. 13F, where instead of holding motor speed constant at low torque, motor speed is controlled at a variable rate according to a first profile 286 within a first torque range, in this case e.g., 0 to approximately 1.5 N.m., and according to a second profile 288 within a second torque range, e.g., above 1.5 N.m. In an embodiment, similar to the embodiment of FIG. 13F, CB/AA is gradually increased as a function of the torque from its base value (e.g., 120/30°) to a threshold value (e.g., 160/50°) during the first torque range. Once that CB/AA threshold is reached, the speed-torque profile follows a curved profile 288 of the normal speed-torque profile operating at a CB/AA corresponding to the threshold value (e.g., profile 264 operating at 160/50°). In contrast to the embodiment of FIG. 13F, however, the increase in CB/AA is designed to gradually reduce speed from the top rated speed down to a second speed value, e.g., 12,000 rpm, within the first torque range. This configuration allows the transition to higher CB/AA levels to occur at a slower rate, which results in further increases in efficiency within the first torque range.

It is noted that while the first profile 286 in this embodiment is linear, any other non-linear profile, or any combination of flat, linear, and non-linear profile, may be alternatively employed within the first torque range in order to increase efficiency. For example, in an embodiment, first profile 286 may include a steep portion along profile 262 (wherein CB/AA is maintained at or around the 120/30° level) for an entire duration of a very small torque range (e.g., 0 to 0.5 N.m.), followed by a flat or semi-flat portion that connects the steep portion to the second profile 282.

According to an embodiment of the invention, the improved speed-torque profile described herein may be utilized to optimize the effective performance of the motor 202 with high efficiency when tool 128 is powered by a power supply that has a nominal (or rate) voltage that is higher or lower than the operating voltage of the motor 202. Specifically, in an embodiment, instead of operating the motor at a constant CB/AA level set according to the voltage rating or nominal voltage of the power supply, CB/AA may be varied at described above to maximize the motor efficiency. Specifically, in an embodiment, in order to boost the performance of the motor 202 when powered by a lower rated voltage power supply, instead of fixedly setting CB/AA to a higher level (e.g., 160°/50°) to obtain a torque-speed profile as shown in FIG. 13C, variable CB/AA may be partially adapted (e.g., for a low torque range) to obtain a torque-speed profile according to FIG. 13C or FIG. 13D.

In an embodiment, control unit 208 may be configured to set CB/AA to 120°/30° when power supply has a nominal voltage that corresponds to the operating voltage range of the motor 202, but set variable CB/AA as described above for a low torque when coupled to a lower rated voltage power supply. For example, in a power tool 128 with a motor 202 having an operating voltage range of 70V-90V, control unit 208 may be configured to set CB/AA to 120°/30° for a 72 VDC or 90 VDC power supply, but to variable CB/AA, e.g., 120°/30° up to 140°/40° for a 54 VDC power supply. In another example, in a power tool 128 having a motor 202 with an operating voltage range of 90V to 132V, control unit 208 may be configured to set CB/AA to 120°/30° for a 120 VAC power supply, but to variable CB/AA, e.g. from 120°/30° up to 160°/50° (or 140°/40° up to 160°/50°) for a 54 VDC power supply.

8. Optimization of Conduction Band and Advance Angle for Increased Efficiency

Figure 14A:
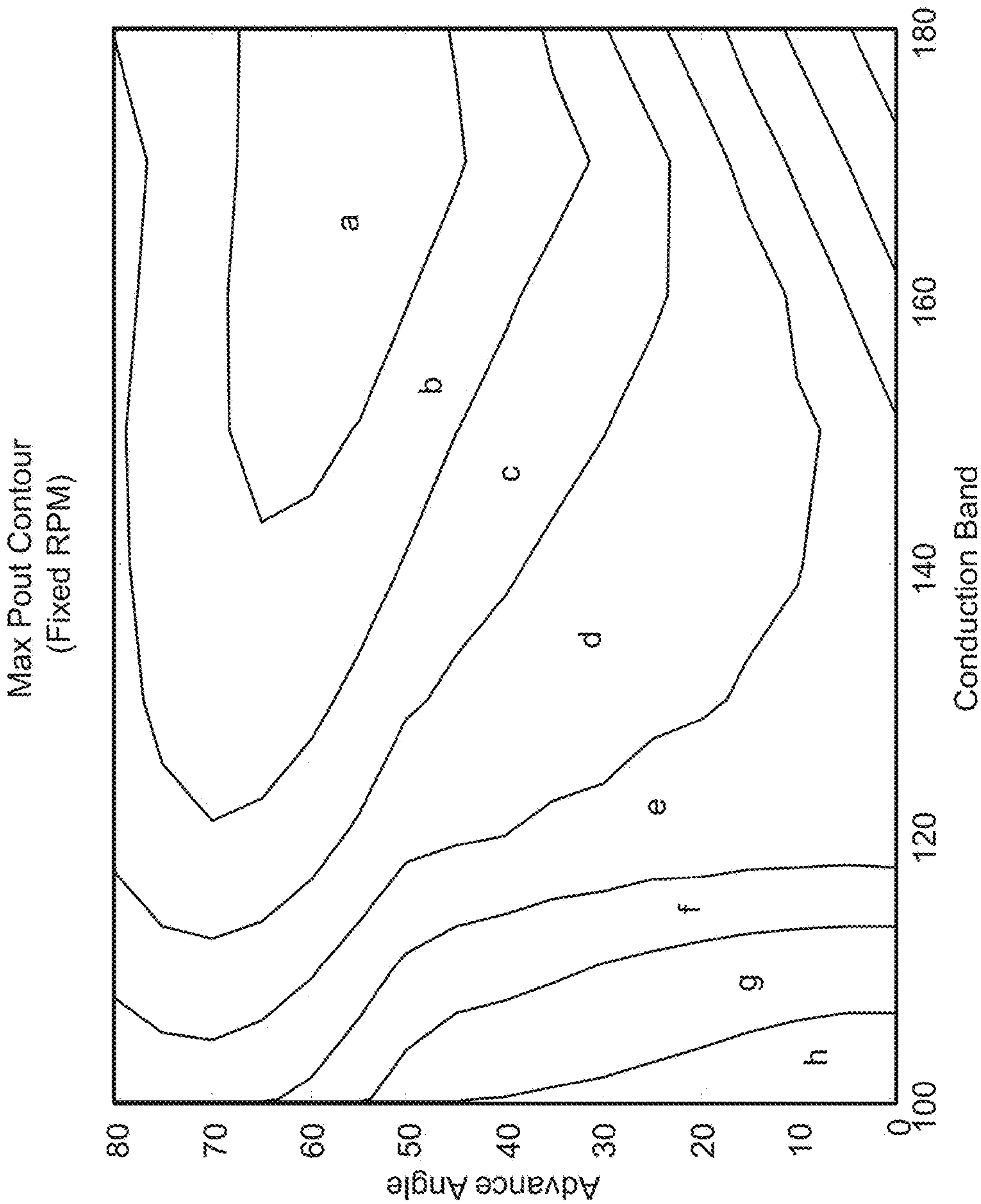
FIG. 14A depicts an exemplary maximum power output contour map for an exemplary power tool based on various CB and AA values, according to an alternative embodiment.

FIG. 14A depicts an exemplary maximum power output contour map for power tool 128 based on various CB and AA values measured at a constant medium speed of, e.g., approximately 15,000 rpm, according to an embodiment. It is noted that this medium speed value corresponds to a medium to high torque values depending on the CB/AA level (e.g., approximately 1.5 N.m. at CB/AA=120°/30°, approximately 1.85 N.m. at CB/AA=140°/40°, and approximately 2.2 N.m. at CB/AA=160°/50° per FIG. 13C). In this figure, maximum power output gradually decreases from zone 'a' (representing max power output of approximately 3,500 W or more) to zone 'h' (representing maximum power output of approximately of 200 W or less). It can be seen based on this exemplary figure that the highest max power output amount for power tool 128 at medium tool speed (and medium torque) can be obtained at a CB in the optimal range of approximately 150°-180° and AA in the optimal range of approximately 50°-70°.

Figure 14B:
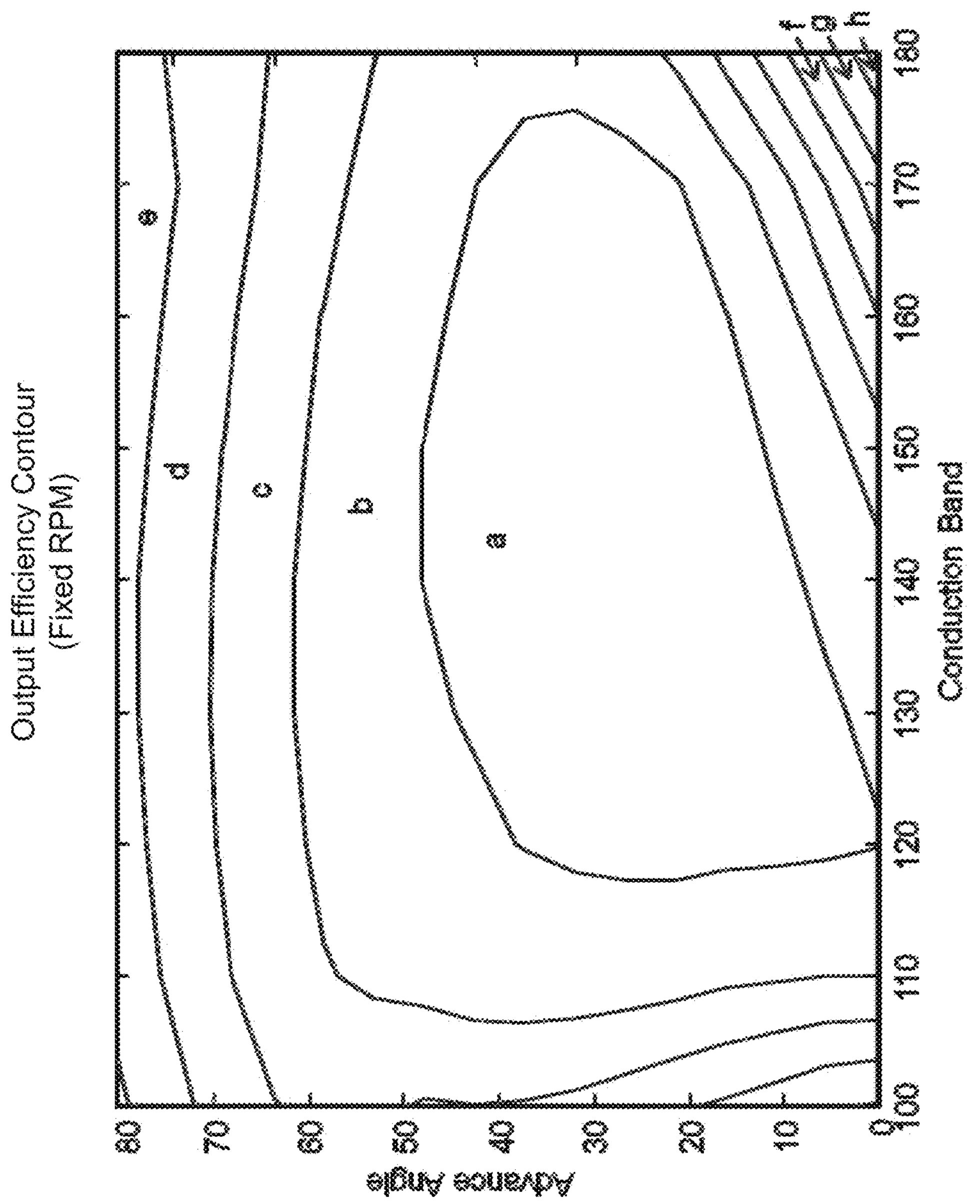
FIG. 14B depicts an exemplary efficiency contour map for the same power tool based on various CB and AA values, according to an alternative embodiment.

FIG. 14B depicts an exemplary output efficiency contour map for power tool 128 based on various CB and AA values measured at the same speed, according to an embodiment. In this figure, calculated efficiency gradually decreases from zone 'a' (representing ≥90% efficiency) to zone 'h' (representing ≤10% efficiency). It can be seen based on this exemplary figure that the highest efficiency for power tool 128 at medium tool speed (and medium torque) can be obtained at a CB in the optimal range of approximately 120°-170° and AA in the optimal range of approximately 10°-50°.

Figure 14C:
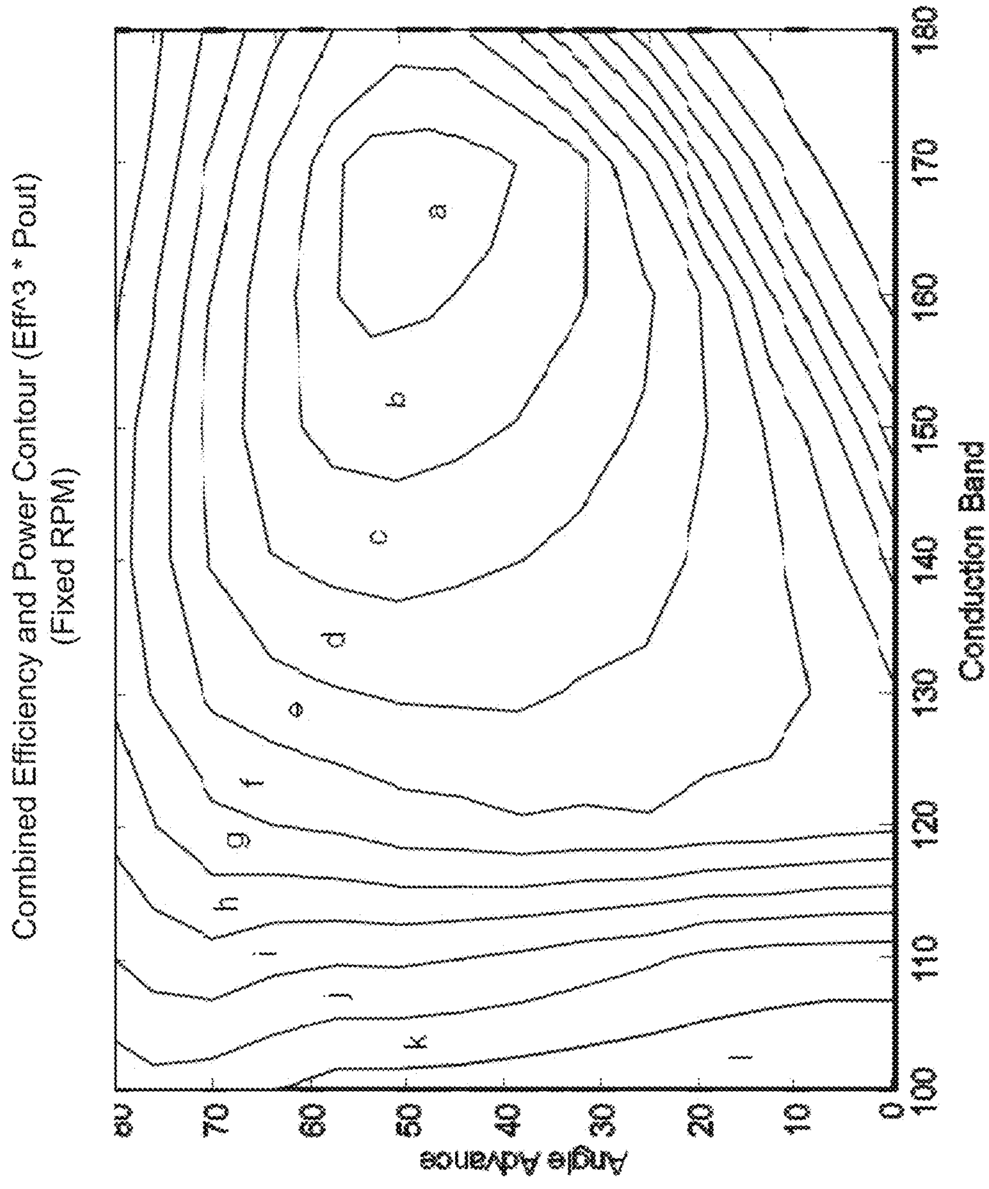
FIG. 14C depicts an exemplary combined efficiency and maximum power output contour map for the same power tool based on various CB and AA values, according to an alternative embodiment.

FIG. 14C an exemplary combined efficiency and max power output contour map for power tool 128 based on various CB and AA values measured at the same speed, according to an embodiment. This contour is obtained based on an exemplary function of ((Efficiency^3)*Power, where the goal is maximize power output while keeping efficiency at a high level. The calculated combined contour in this figure gradually decreases from zone 'a' to zone 'I'. It can be seen based on this exemplary contour map that the highest combination of efficiency and power output for power tool 128 at medium tool speed (and medium torque) can be obtained at a CB in the range of approximately 158°-172° combined with AA in the range of approximately 40°-58° within zone 'a'.

This figure illustrates that while increasing the CB and AA in tandem as previously described provides a simple way to increase speed and power performance levels, such increase need not be in tandem. For example, the CB/AA level of 160°/50° provides substantially equivalent combined efficiency and max power output performance as other CB/AA combinations that fall within zone 'a' contour, e.g., 170°/40°.

As mentioned above, the optimal CB/AA contour (zone 'a') obtained in this figure correspond to a constant medium speed, e.g., approximately 15,000 rpm, and a constant toque, e.g., approximately 2.2 N.m. per FIG. 13C. This constant medium speed is proportional to the rated or nominal voltage of the input power supply. In this particular example, the combined efficiency and maximum power output contour map was constructed at an input voltage of 120V. Modifying the input voltage to above and below 120V results in different optimal CB and AA contours.

Figure 14D:
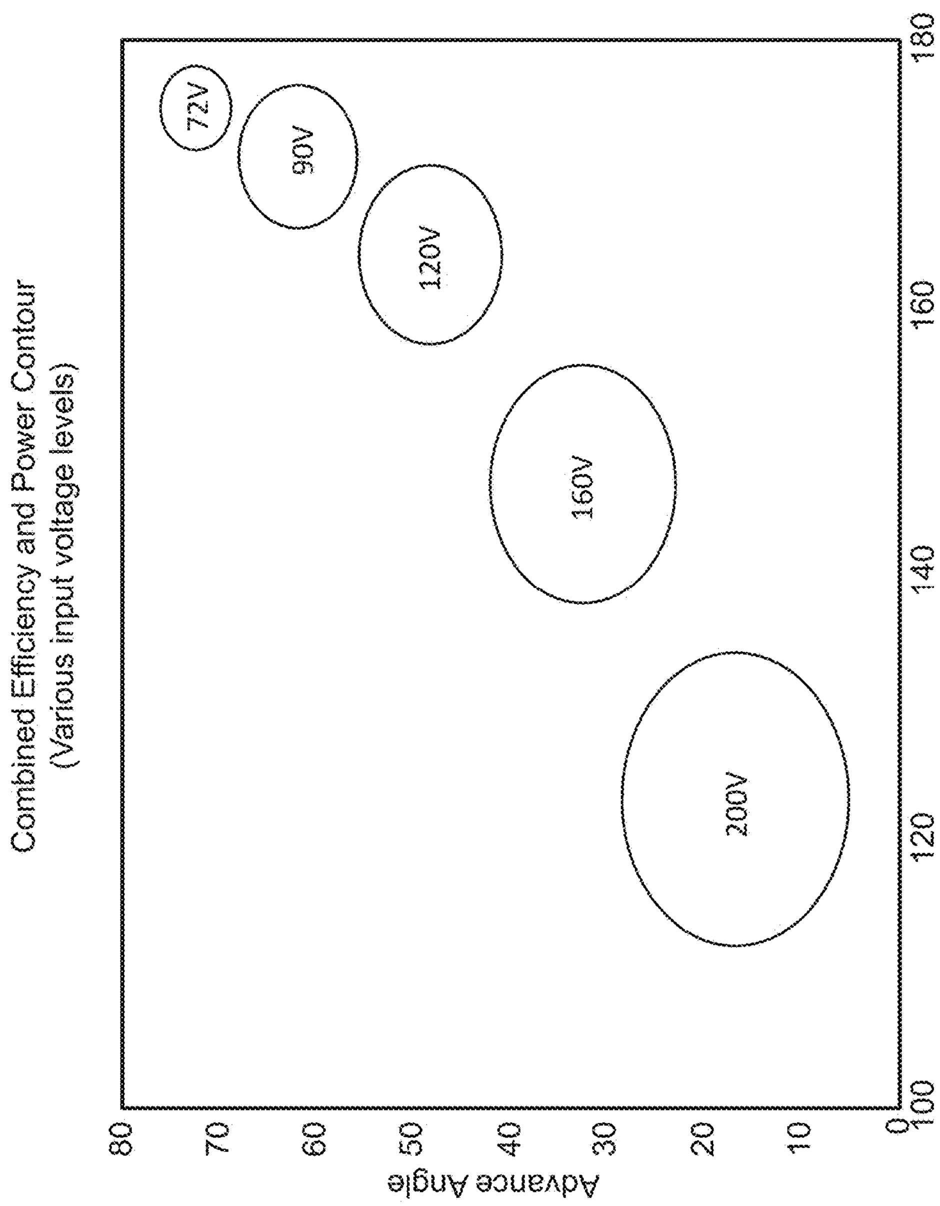
FIG. 14D depicts an exemplary contour map showing optimal combined efficiency and maximum power output contours at various input voltage levels, according to an alternative embodiment.

FIG. 14D depicts an exemplary diagram showing the optimal CB/AA contours based on the various input voltage levels. As shown in this figure, an optimal CB and AA is approximately in the range of 115° to 135° and 5° to 30° respectively at an input voltage level of approximately 200V; approximately in the range of 140° to 155° and 25° to 40° respectively at an input voltage level of approximately 160V; approximately in the range of 165° to 175° and 60° to 70° respectively at an input voltage level of approximately 90V; and approximately in the range of 170° to 178° and 70° to 76° respectively at an input voltage level of approximately 72V. In other words, the optimal CB/AA contours get smaller (thus providing a narrower combination range) as the input voltage decreases from 200V down to 72V. Also, the optimal CB ranges and AA ranges both increase as the input voltages decreases. It is noted that the contours herein are optimized to output substantially equivalent levels of maximum power output at optimal efficiency.

Accordingly, in an embodiment of the invention, the combined efficiency and power contours described herein may be utilized to optimize the effective performance of the motor 202 with high maximum power output at optimal efficiency based on the nominal (or rated) voltage level of the power supply. Specifically, in an embodiment, the CB/AA values may be selected from a first range (e.g., CB in the range of 158°-172° and AA in the range of 40°-58°) when powered by a 120V power supply, but from a second range (e.g., CB in the range of 170°-178° and AA in the range of 70°-76°) when powered by a 90V power supply to yield optimal efficiency and power performance at each voltage input level in a manner satisfactory to the end user, regardless of the nominal voltage provided on the AC or DC power lines.

In an embodiment, control unit 208 may be configured to set CB/AA to 120°/30° when power supply has a nominal voltage that corresponds to the operating voltage range of the motor 202, but set variable CB/AA as described above for a low torque when coupled to a lower rated voltage power supply. For example, in a power tool 128 with a motor 202 having an operating voltage range of 70V-90V, control unit 208 may be configured to set CB/AA to 120°/30° for a 72 VDC or 90 VDC power supply, but to variable CB/AA, e.g., 120°/30° up to 140°/40° for a 54 VDC power supply. In another example, in a power tool 128 having a motor 202 with an operating voltage range of 90V to 132V, control unit 208 may be configured to set CB/AA to 120°/30° for a 120 VAC power supply, but to variable CB/AA, e.g. from 120°/30° up to 160°/50° (or 140°/40° up to 160°/50°) for a 54 VDC power supply.

9. Optimization of Motor Performance Using the Link Capacitor

Figure 15A:
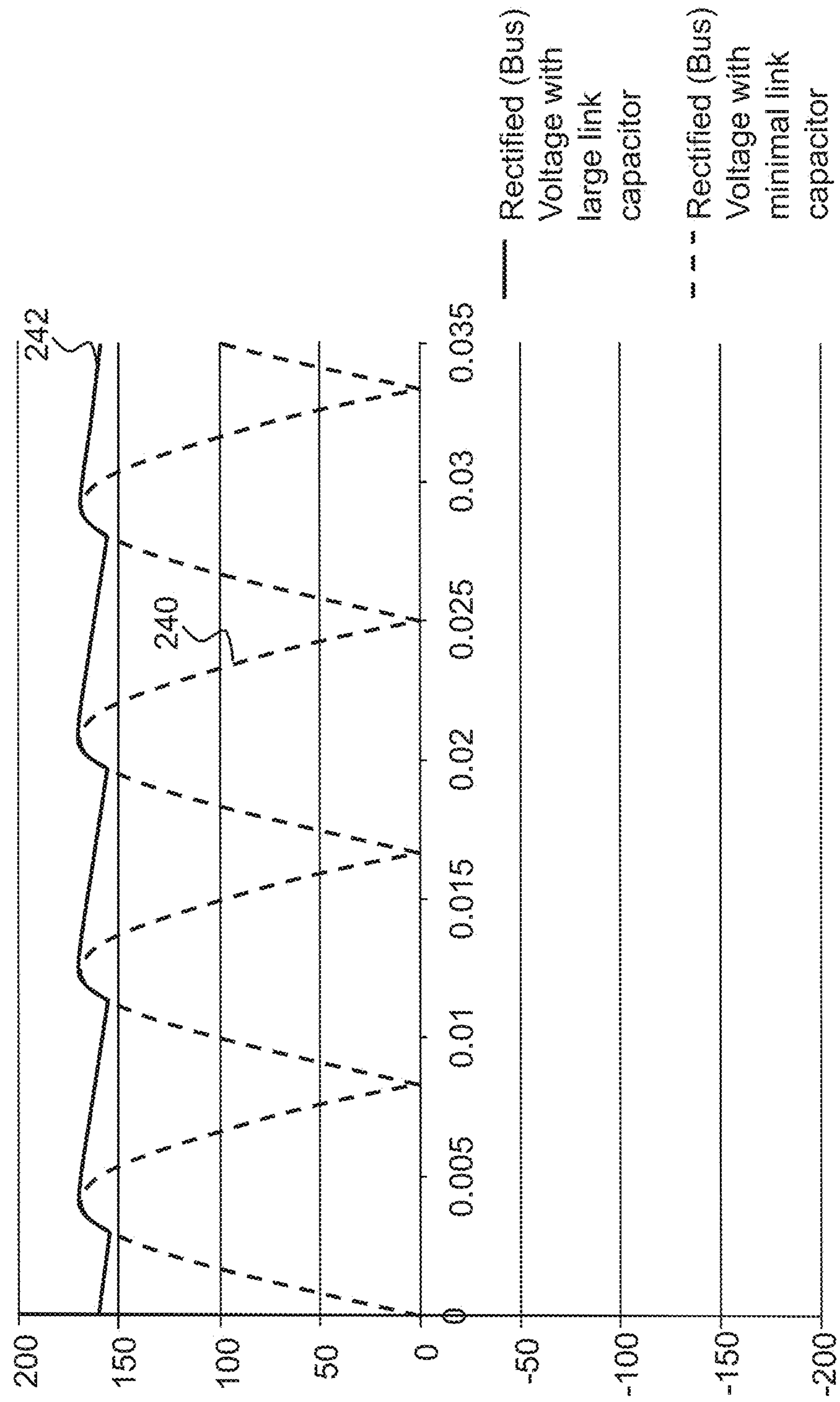
FIG. 15A depicts an exemplary waveform diagram of the rectified AC waveform supplied to the motor control circuit under a loaded condition, according to an embodiment.

FIG. 15A depicts an exemplary waveform diagram of the rectified AC waveform supplied to the motor control circuit 206 under a loaded condition, according to an embodiment. References 240 and 242 designate the full-wave rectified AC waveform as measured across the capacitor 224 (hereinafter referred to as the "DC bus voltage"). It is noted that in this diagram, it is assumed that the tool is operating under a maximum heavy load that the tool is rated to handle.

Reference 240 designates the DC bus voltage waveform under a loaded condition where capacitor 224 has a small value of, for example 0 to 50 microF. In this embodiment, the effect of the capacitor 224 on the DC bus is negligible. In this embodiment, the average voltage supplied from the DC bus line to the motor control circuit 206 under a loaded condition is:

$$V(avg) = \frac{120 * 2 * \sqrt{2}}{\pi} = 108VDC$$

Reference 204 designates DC bus voltage waveform under a loaded condition where capacitor 224 has a relatively large value of, for example, 1000 microF or higher. In this embodiment, the average voltage supplied from the DC bus line to the motor control circuit 206 is approaching a straight line, which is:

$$V(\text{avg})=120*\sqrt{2}=170VD$$

It can be seen that by selecting the size of the capacitor 224 appropriately, an average DC bus voltage can be optimized to a desired level. Thus, for a brushless AC/DC power tool system designed to receive a nominal DC voltage of approximately 108 VDC, a small capacitor 224 for the rectifier circuit 220 to produce an average voltage of 108V under a loaded condition from an AC power supply having a nominal voltage of 120 VAC.

Figure 15B:
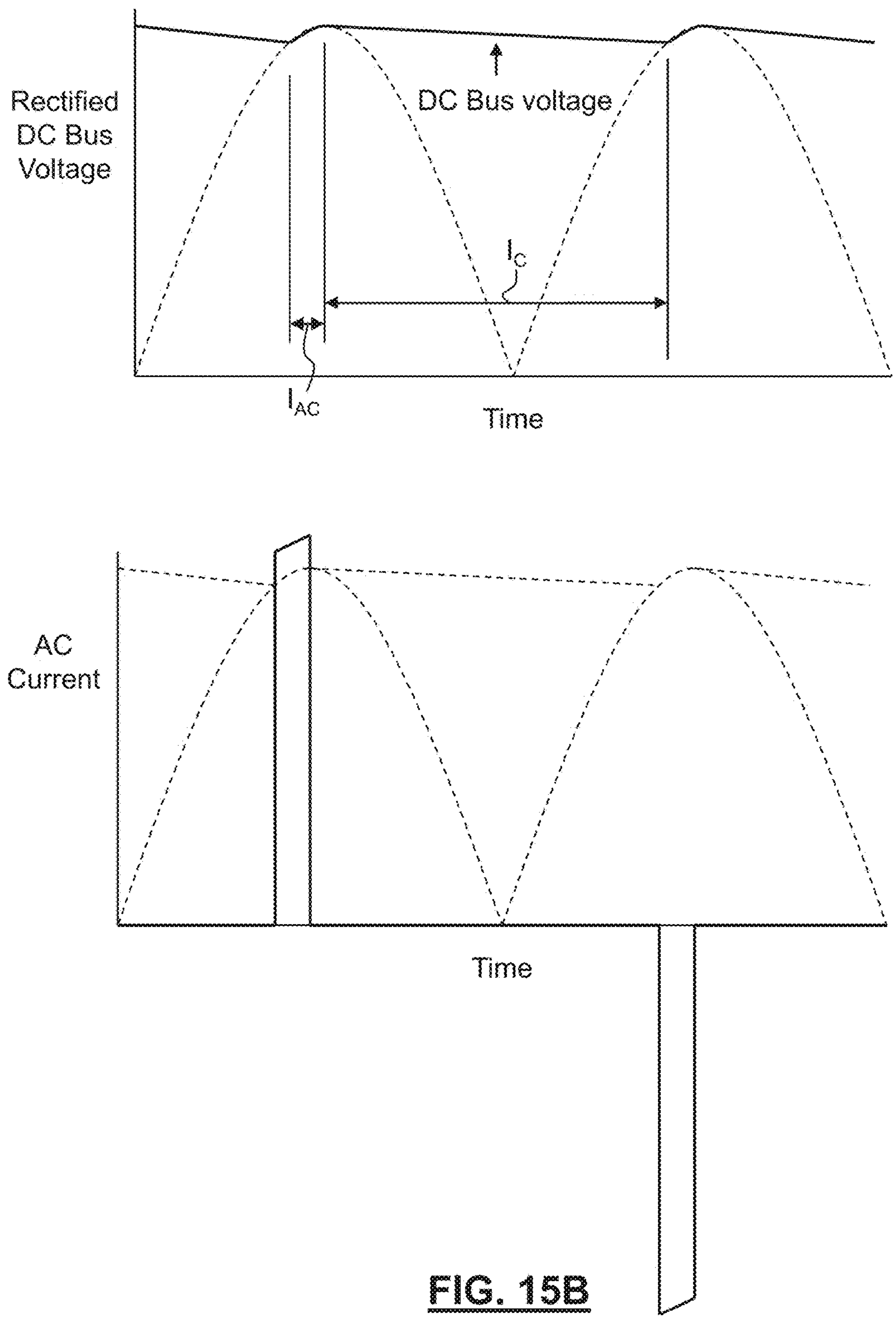
FIG. 15B depicts an exemplary rectified voltage waveform diagram and a corresponding current waveform diagram using a relatively large capacitor on a rectified AC power line (herein referred to as DC bus line), according to an embodiment.
Figure 15C:
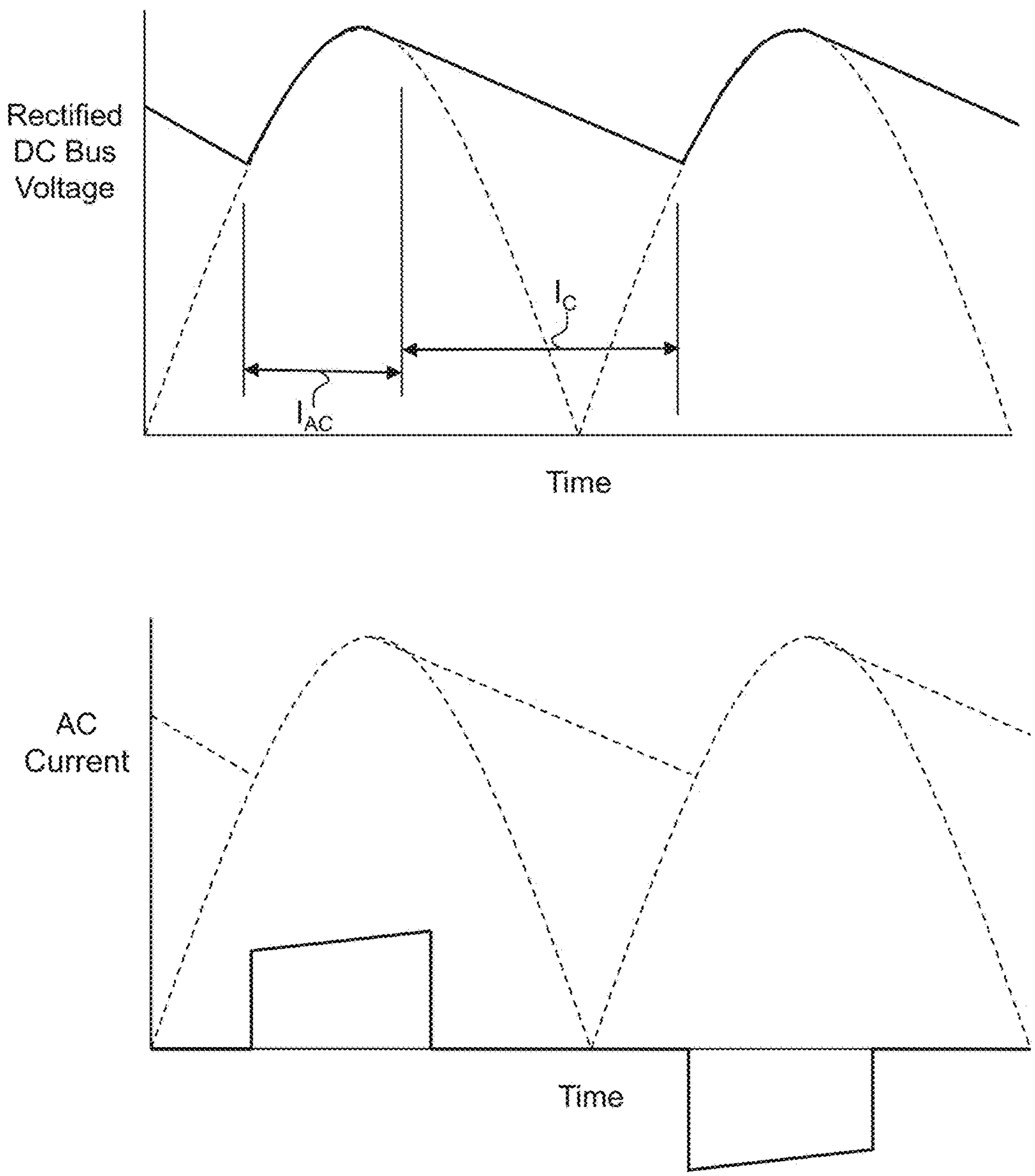
FIG. 15C depicts an exemplary rectified voltage waveform diagram and a corresponding current waveform diagram using a relatively medium-sized capacitor on the DC bus line, according to an embodiment.
Figure 15D:
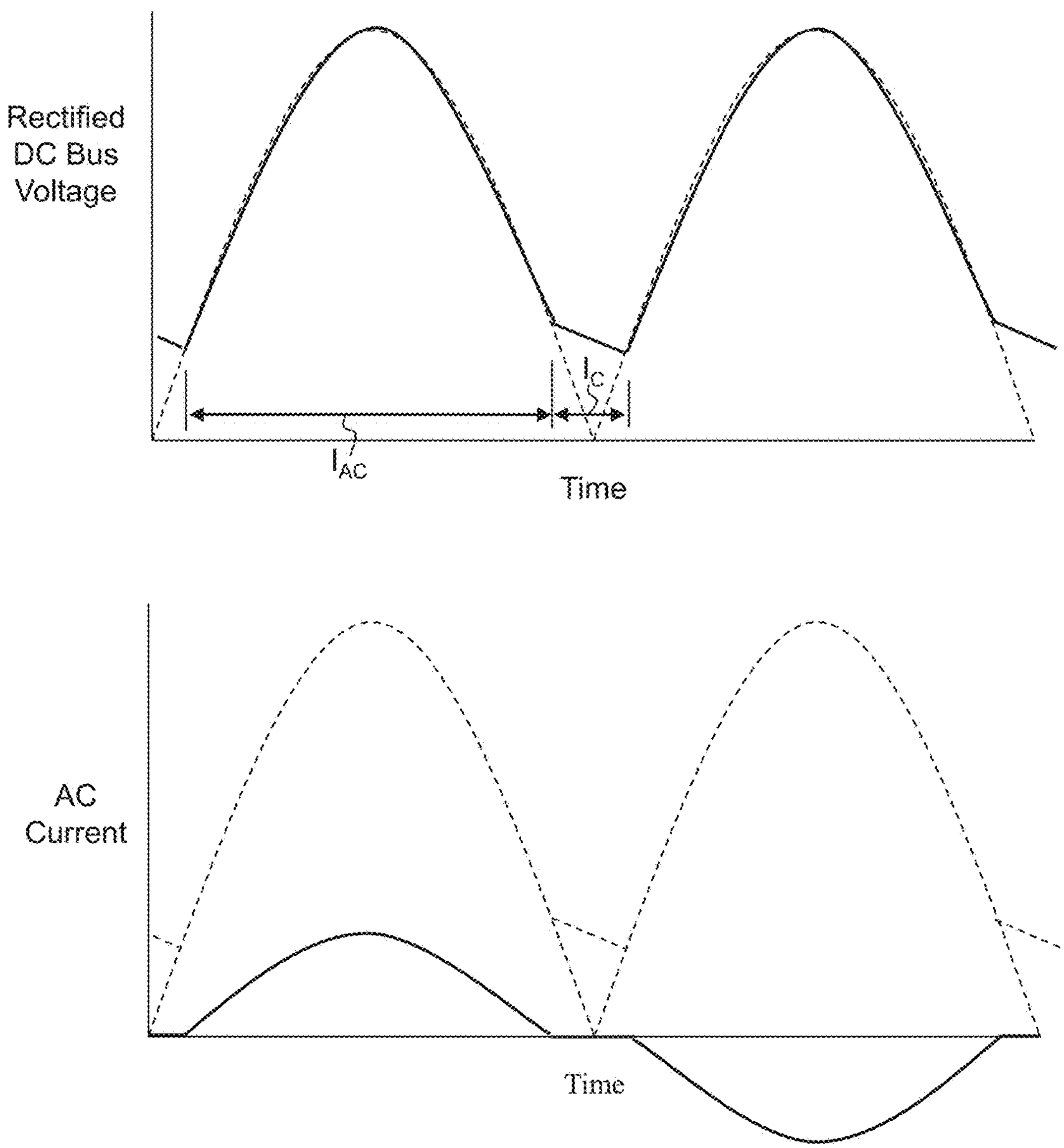
FIG. 15D depicts an exemplary rectified voltage waveform diagram and a corresponding current waveform diagram using a relatively small capacitor on the DC bus line, according to an embodiment.

FIGS. 15B-15D highlight yet another advantage of using a small capacitor. FIG. 15B, in an embodiment, depicts the voltage waveform using a large capacitor (e.g., approximately 4,000 microF) and the associated current waveform under heavy load. FIG. 15C depicts the voltage waveform using a medium sized capacitor (e.g., approximately 1000 microF) and the associated current waveform under heavy load. FIG. 15D depicts the voltage waveform using a small capacitor (e.g., approximately 200 microF) and the associated current waveform under heavy load.

When using a large capacitor as shown in the exemplary waveform diagram of FIG. 15B, the current supplied to the motor is drawn from the capacitor for a large portion of each cycle. This in effect shrinks the portion of each cycle during which current is drawn from the AC power supply, which results in large current spikes to occur within each cycle. For example, to obtain a constant RMS current of 10 A from the AC power supply, the current level within the small time window increases substantially. This increase often results in large current spikes. Such current spikes are undesirable for two reasons. First, the power factor of the tool becomes low, and the harmonic content of the AC current becomes high. Second, for a given amount of energy transferred from the AC source to the tool, the RMS value of the current will be high. The practical result of this arrangement is that an unnecessarily large AC circuit breaker is required to handle the current spikes for a given amount of work.

By comparison, when using a medium-sized capacitor as shown in FIG. 15C, the current is drawn from AC power supply within each cycle within a broader time window, which provides a lower harmonic content and higher power factor. Similarly, when using a small capacitor as shown in FIG. 15D, current drawn from the capacitor is very small (almost negligible) within each cycle, providing a larger window for current to be drawn from the AC power supply. This provides an even lower harmonic content and a much higher power factor in comparison to FIGS. 15C and 15D. As will be discussed later (see FIG. 12 below), through the small capacitors provide a lower average voltage to the motor control circuit 204, it is indeed possible to obtain a higher power output from a small capacitor 224 due to the lower harmonic context and higher power factor.

Another advantage of using a small capacitor is size. Capacitors available in the market have a typical size to capacitance ratio of 1 $cm^3$ to 1 uF. Thus, while it is practical to fit a small capacitor (e.g., 10-200 uF) into a power tool housing depending on the power tool size and application, using a larger capacitor may create challenges from an ergonomics standpoint. For example, a 1000 uF capacitor is approximately 1000 $cm^3$ in size. Conventional power tool applications that require large capacitors typically use external adaptors to house the capacitor. In embodiments of the invention, capacitor 224 is small enough to be disposed within the tool housing, e.g., inside the tool handle.

According to an embodiment of the invention, the power tool 128 of the invention may be powered by a DC power supply, e.g., a DC generator such as a welder having a DC output power line, having a DC output voltage of 120V. Using a small capacitor 224 value of approximately 0-50 microF, power tool 128 may provide a higher max power out from a DC power supply having an average voltage of 120V, than it would from a 120V AC mains power supply, which has an average voltage of 108V. As discussed above, using a small capacitor of 0-50 microF, the DC bus voltage resulting from a 120V AC mains power supply remains at an average of approximately 108V. An exemplary power tool may provide a maximum cold power output of approximately 1600 W from the 108V DC bus. By comparison, the same power tool provides a maximum cold power output of more than 2200 W from the DC bus when power is being supplied by the 120V DC power supply. This improvement represents a ratio of 2200/1600=1.37 (which corresponds to the voltage ratio ^3, i.e., (120/108)^3).

Figure 15E:
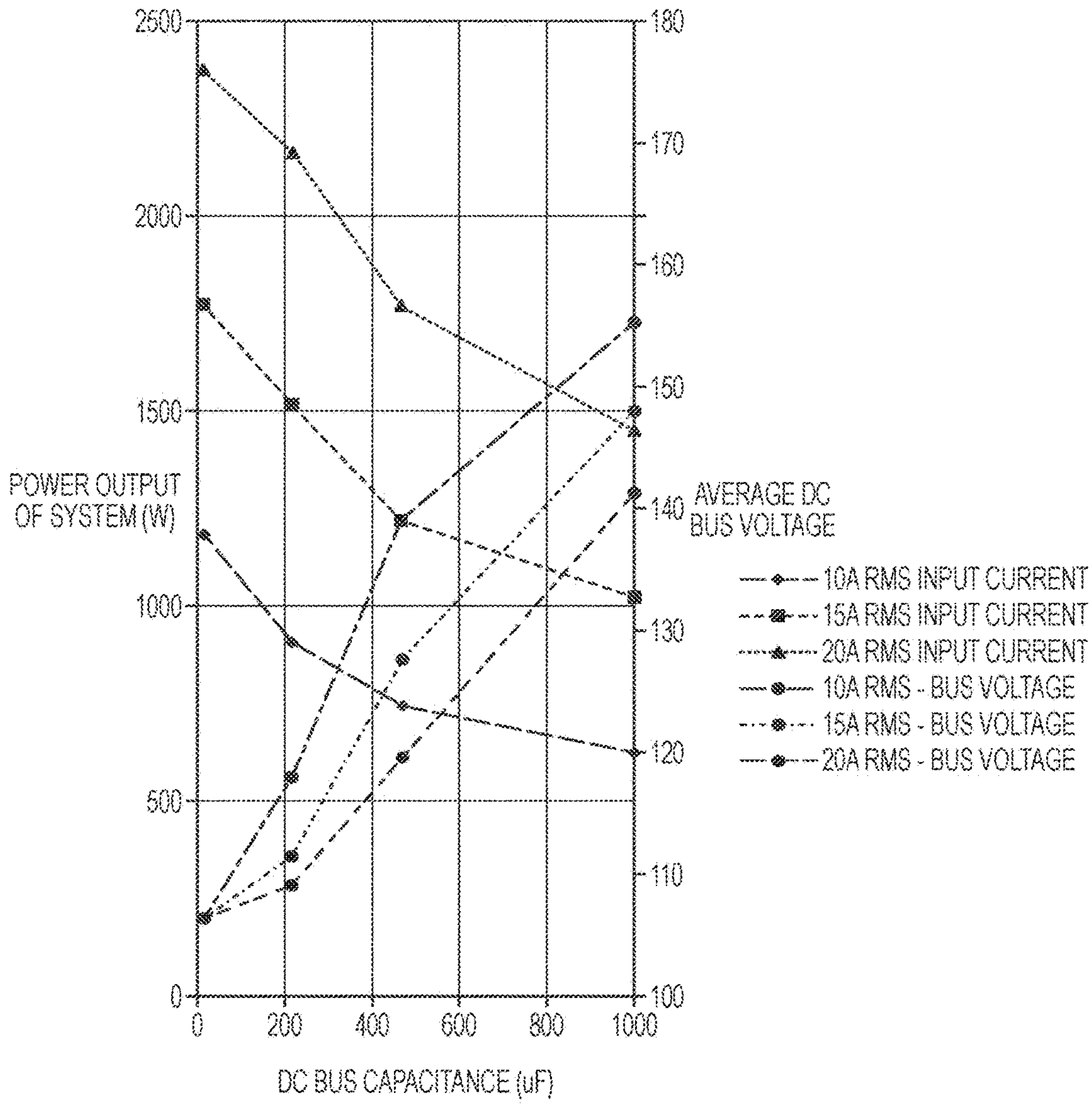
FIG. 15E depicts an exemplary combined diagram showing power output/capacitance, and average DC bus voltage/capacitance waveforms at various RMS current ratings, according to an embodiment.

According to an embodiment of the invention, it is possible to provide comparable power outputs from the AC and DC power supplies by adjusting the value of the capacitor 224. FIG. 15E depicts an exemplary combined diagram showing power output/capacitance, and average DC bus voltage/capacitance waveforms. The x axis in this diagram depicts varying capacitor value from 0 to 1000 uF. The Y axes respectively represent the maximum power watts-out (W) of the power tool ranging from 0-2500 W, and the average DC bus voltage (V) ranging from 100-180V represented by dotted lines. The three RMS current values represent the rated RMS current of the AC power supply. For example, in the US, the wall socket may be protected by a 15 A RMS current circuit breaker. In this example, it is assumed that the power tool is operating under heavy load close to its maximum current rating.

As shown in this diagram, for a power tool configured to be powered by a 10 A RMS current power supply (i.e., the tool having a current rating of approximately 10 A RMS current, or a power supply having a current rating of 10 A RMS current), the average DC bus voltage under heavy load is in the range of approximately 108-118V for the capacitor range of 0-200 uF; approximately 118-133V for capacitor range of 200 to 400 uF; approximately 133-144V for capacitor range of 400-600 uF, etc.

Similarly, for a power tool configured to be powered by a 15 A RMS current power supply (i.e., the tool having a current rating of approximately 15 A RMS current, or a power supply having a current rating of 15 A RMS current), the average DC bus voltage under heavy load is in the range of approximately 108-112V for the capacitor range of 0-200 uF; approximately 112-123V for capacitor range of 200 to 400 uF; approximately 123-133V for capacitor range of 400-600 uF, etc.

Similarly, for a power tool configured to be powered by a 20 A RMS current power supply (i.e., the tool having a current rating of approximately 20 A RMS current, or a power supply having a current rating of 20 A RMS current), the average DC bus voltage under heavy load is in the range of approximately 108-110V for the capacitor range of 0-200 uF; approximately 110-117V for capacitor range of 200 to 400 uF; approximately 117-124V for capacitor range of 400-600 uF, etc.

In an embodiment, in order to provide an average DC bus voltage from the AC mains power supply (e.g., a 108V nominal RSM voltage) that is comparable to the nominal voltage received from the DC power supply (120 VDC), the capacitor value may be adjusted based on the current rating of the power tool and the target DC bus voltage. For example, a capacitor value of approximately 230 uF may be used for a tool powered by a 10 A RMS current power supply (i.e., the tool having a current rating of approximately 10 A RMS current, or configured to be powered by a power supply having a current rating of 10 A RMS current) to provide an average DC bus voltage of approximately 120V from the AC mains. This allows for the power tool to provide a substantially similar output levels for 120V AC power supply as it would from a 120V DC power supply.

Similarly, a capacitor value of approximately 350 uF may be used for a tool powered by a 15 A RMS current power supply (i.e., the tool having a current rating of approximately 15 A RMS current, or configured to be powered by a power supply having a current rating of 15 A RMS current) to provide an average DC bus voltage of approximately 120V from the AC mains. More generally, capacitor may have a value in the range of 290-410 uF for a tool powered by a 15 A RMS current power supply to provide an average voltage substantially close to 120V on the DC bus from the AC mains. This allows for the power tool to provide a substantially similar output levels for 120V AC power supply as it would from a 120V DC power supply.

Finally, a capacitor value of approximately 500 uF may be used for a tool powered by a 20 A RMS current power supply (i.e., the tool having a current rating of approximately 20 A RMS current, or configured to be powered by a power supply having a current rating of 20 A RMS current) to provide an average DC bus voltage of approximately 120V from the AC mains. More generally, the capacitor may have a value in the range of 430-570 uF for a tool powered by a 20 A RMS current power supply to provide an average voltage substantially close to 120V on the DC bus from the AC mains. This allows for the power tool to provide a substantially similar output levels for 120V AC power supply as it would from a 120V DC power supply.

III. Convertible Battery Packs and Power Supply Interfaces

Figure 16:
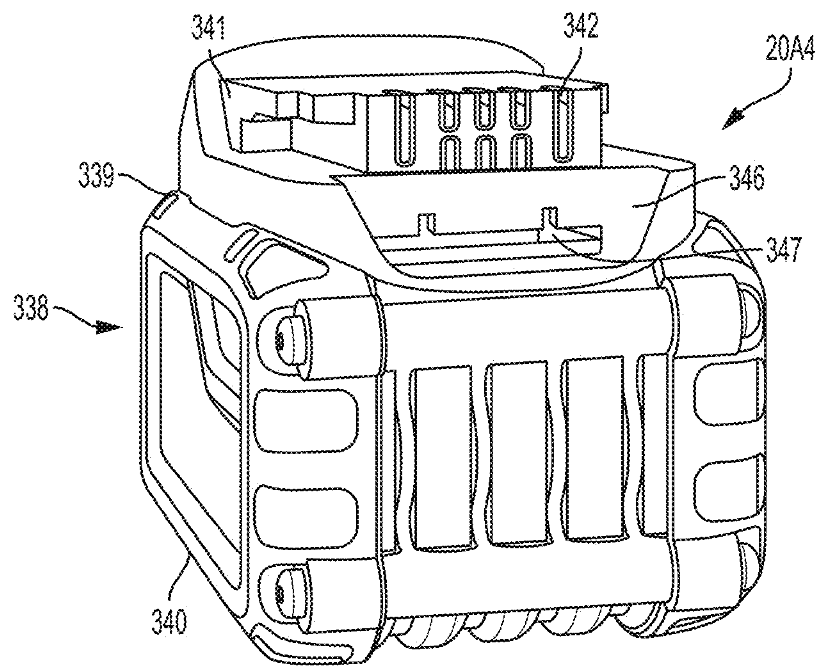
FIG. 16 is a perspective view of an exemplary embodiment of a convertible battery pack.

FIG. 16 illustrates an exemplary embodiment of a battery pack of the set of convertible battery packs 20A4. The set of convertible battery packs 20A4 may include one or more battery packs. Similar to the battery packs of the set of low rated voltage battery packs 20A1, each battery pack of the set of convertible battery packs 20A4 includes a housing 338. The housing 338 includes a top portion 339 and a bottom portion 340. The top portion 339 includes a first tool interface 341 for connecting to a power tool. The top portion 339 also includes a plurality of openings 342.

These openings 342 correspond to a plurality of terminals 343—also referred to as a first set of terminals—of a first terminal block 344. The tool interface 341 enables the convertible battery packs 20A4 to electrically and mechanically connect to the low rated voltage DC power tools 101A, the medium rated voltage DC power tools 10A2, the high rated voltage DC power tools 10A3 and the AC/DC power tools 10B. Also similar to the set of low rated voltage battery packs 20A1, each battery pack of the set of convertible battery packs 20A4 includes a battery 330 residing in the housing 338. Also similar to the battery packs of the set of low rated voltage battery packs 120A, each battery 330 includes, among other elements not illustrated for purposes of simplicity, a plurality of battery cells 332. The first terminal block 344 includes a plurality of terminals 343 and a plastic housing 145 for holding the terminals 343 in a relatively fixed position. The terminals 343 include a pair of power terminals ("+" and "−") and may include a plurality of cell tap terminals and a least one data terminal. There are electrical connections connecting the "+" power terminal to the positive side of the plurality of battery cells 332 and the "−" power terminal to the negative side of the plurality of battery cells 332.

Upon connecting the convertible battery pack 322A to a tool the "+" and "−" power terminals are electrically coupled to corresponding "+" and "−" power terminals of the power tool. The "+" and "−" power terminals of the power tool are electrically connected to the power tool motor for supplying power to the motor.

Unlike the battery packs of the set of low rated voltage battery packs 20A1, the battery packs of the set of convertible battery packs 20A4 are convertible battery packs. In a convertible battery pack, the configuration of the battery cells 330 residing in the battery pack housing 338 may be changed back and forth from a first cell configuration which places the battery 330 in a first battery configuration to a second cell configuration which places the battery 330 in a second battery configuration. In the first battery configuration the battery is a low rated voltage/high capacity battery 330 and in the second battery configuration the battery is a medium rated voltage/low capacity battery. In other words, the battery packs of the set of convertible battery packs 20A4 are capable of having two rated voltages—a low rated voltage and a medium rated voltage. As noted above, low and medium are relative terms and are not intended to limit the battery packs of the set of convertible battery packs to specific voltages. The intent is simply to indicate that the convertible battery pack of the set of convertible battery packs 20A4 is able to operate with a first power tool having a low rated voltage and a second power tool have a medium rated voltage, where medium is simply greater than low. In the exemplary embodiment of FIG. 16, the top portion also includes a second tool interface 346 including a secondary opening or slot 347. The secondary opening 347 corresponds to a second terminal block 348, described in more detail below.

Figure 17:
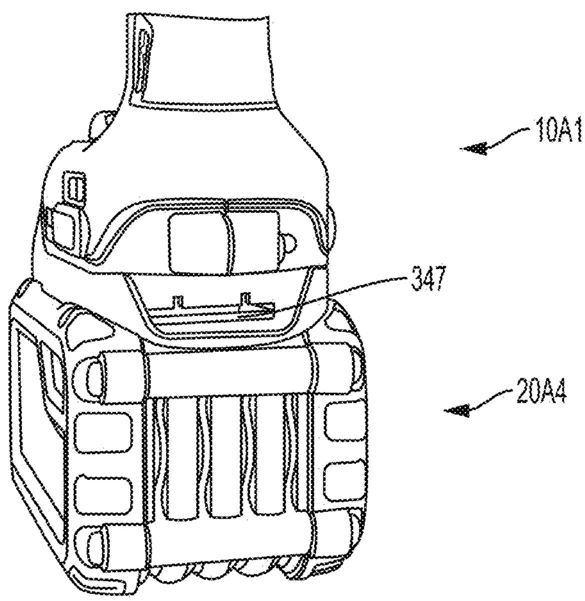
FIG. 17 is a perspective view of an exemplary embodiment of a low rated voltage tool connected to the convertible battery pack of FIG. 16.

FIG. 17 illustrates a low rated voltage tool 10A1 connected to a convertible battery pack 20A4. As is illustrated, the low rated voltage tool 10A1 does not include a converter element 350 and the slot 347 remains empty. In this illustrated embodiment the low rated voltage tool allows the slot 347 to remain exposed to the elements. In alternate embodiments the low rated voltage tool may include a plastic portion that covers the slot 347 to protect it from the elements.

Figure 18:
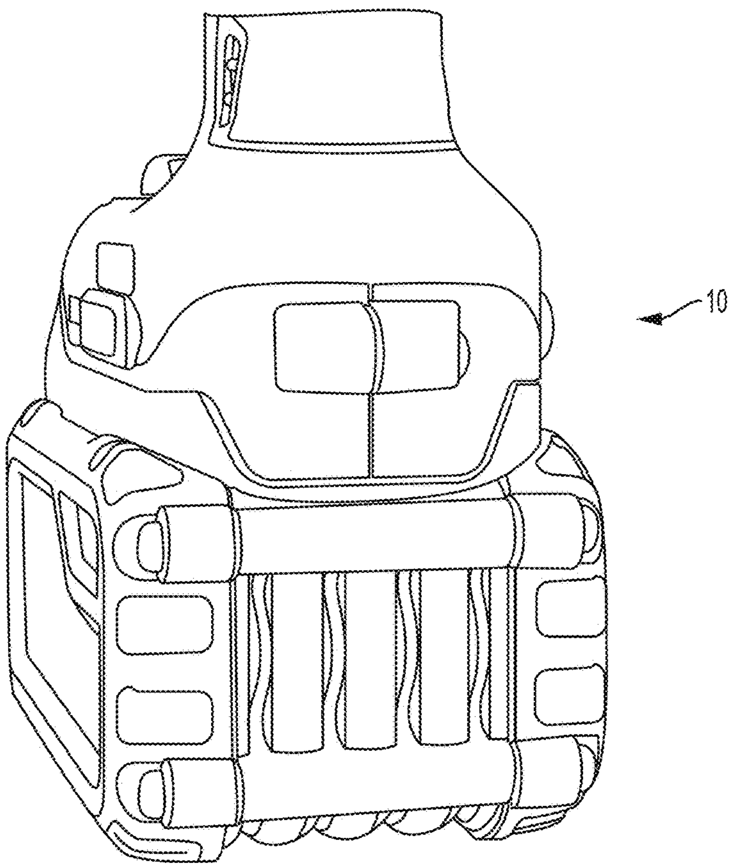
FIG. 18 is a perspective view of an exemplary embodiment of a medium rated voltage tool connected to an exemplary embodiment of a convertible battery pack.

FIG. 18 illustrates a medium rated voltage tool 10A2 connected to a convertible battery pack 20A4. The convertible pack 20A4 connects in a similar fashion to high rated voltage power tools 10A3, 10B.

Figure 19B:
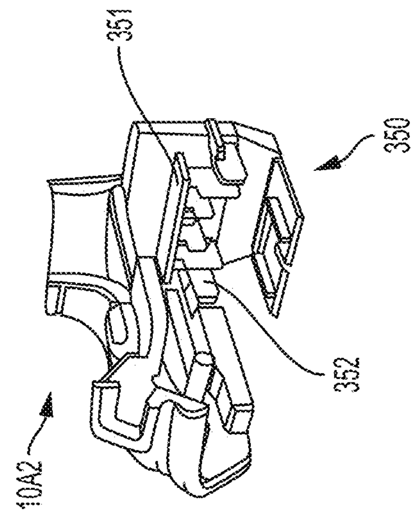
Figure 19A:
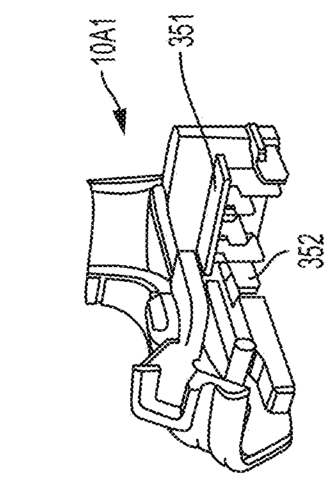

FIG. 19*a* illustrates a partial cutaway of a foot of a low rated voltage tool 10A1 illustrating the battery interface of the tool which includes the tool terminal block 351 which includes a plurality of terminals 352 that engage the first battery terminal block 344 to supply power from the battery pack 20A1 or 20A4 to the low rated voltage tool 10A1.

FIG. 19*b* illustrates a partial cutaway of a foot of a medium rated voltage tool 110B illustrating the battery interface of the tool which includes the tool terminal block 351 which includes a plurality of terminals 352 that engage the first battery terminal block 344 to supply power from the battery pack 322A to the medium rated voltage tool 10A2. FIG. 18*b* also illustrates the converter element 350 of a medium rated voltage tool 10A2. In this exemplary embodiment, the converter element 350 is positioned below the tool terminal block 351. The converter element 350 is connected to a wall of the tool foot and extends towards a side of the tool that receives the battery pack 322A. The high rated voltage power tools and the very high rated voltage power tools will include similar battery interfaces, tool terminal blocks and terminals.

FIG. 20 illustrates a partial cutaway of the foot of the medium rated voltage tool 10A2 in which the battery interface of the tool is engaged with the tool interface of the battery. While it cannot be seen from this view, the converter element 350 is received in the slot 347 of the battery.

FIG. 21 illustrates exemplary battery cell configurations for the batteries 330 of the set of convertible battery packs 20A4. The default cell configuration is the configuration of the battery cells when a converter element, described in greater detail below, is not inserted into the battery pack. In this exemplary embodiment, the default cell configuration is the configuration to the left of the horizontal arrows in FIG. 20. In alternate embodiments of the convertible battery packs, the default cell configuration could be the cell configuration to the right of the horizontal arrows. These examples are not intended to limit the possible cell configurations of the batteries of the set of convertible battery packs 20A4.

As illustrated in FIG. 21*a*, a first exemplary battery 330 includes 2 cells 332. In this example, each cell 332 has a voltage of 4V and a capacity of 1.5 Ah. In the default configuration there are 2 subsets of 1 cell 332. The two subsets are connected in parallel providing a battery voltage of 4V and a capacity of 3 Ah. As illustrated in FIG. 21*b*, a second exemplary battery includes 3 cells 332. In this example, each cell 332 has a voltage of 4V and a capacity of 1.5 Ah. In the default configuration there are 3 subsets of 1 cell 332. The subsets 334 are connected in parallel providing a battery voltage of 4V and a capacity of 4.5 Ah.

As illustrated in FIG. 21*c*, a third exemplary battery 330 includes 10 cells 332. In this example, each cell 332 has a voltage of 4V and a capacity of 1.5 Ah. In the default configuration there are 2 subsets 334 of 5 cells. The cells of each subset of cells are connected in series and the subsets of cells are connected in parallel providing a battery voltage of 20V and a capacity of 3 Ah. As illustrated in FIG. 21*d*, a fourth exemplary pack includes 15 cells. In this example, each cell has a voltage of 4V and a capacity of 1.5 Ah. In the default configuration there are 3 subsets of 5 cells. The cells of each subset of cells are connected in series and the subsets of the cells are connected in parallel providing a battery voltage of 20V and a capacity of 4.5 Ah. FIG. 21*e* illustrates a generalization of the cell configuration of the batteries of the second set of battery packs. In general, the battery may include N subsets of cells and M cells in each subset for a total of M×N cells in the battery. Each cell has a voltage of X volts and capacity of Y Ah. As such, the battery will have a default configuration in which the M cells of each subset are connected in series and the N subsets are connected in parallel. As such, the default configuration provides a battery voltage of X×M Volts and a capacity of Y×N Amp-hours.

As noted above, each battery pack in the set of convertible battery packs 322A includes a second tool interface 346 and a second terminal block 348. FIGS. 16 and 22 illustrate the second tool interface 346. The second tool interface 346 includes the slot 347 for receiving the converter element 350, discussed in more detail below. The slot 347 is positioned open to an end of the battery pack 20A4 that is coupled to a power tool—similar to the first tool interface and first terminal block.

In the illustrated exemplary embodiments, each battery 330 of the battery packs of the set of convertible battery packs 20A4 includes a switching network 353. In addition, each battery 330 includes a second terminal block 348. In the illustrated exemplary embodiments, the terminal block 348 includes a second plurality of terminals 349—also referred to as a second set of terminals. In this embodiment, the second set of terminals 349 are configured so as to serve as the switching network 353. In other embodiments the switches may be other types of mechanical switches such as single pole single throw switches or electronic switches such as transistors and may be located in other parts of the battery pack or in the tool or a combination of both the tool and the battery pack. In alternate embodiments, the first set of terminals and the second set of terminals may be housed in a single terminal block.

Referring to FIGS. 22, 23, 24, an exemplary embodiment of a convertible battery pack 20A4 and battery 330 of the set of convertible battery packs 20A4 is illustrated. This exemplary battery 330 has 10 cells and has a default configuration as illustrated in FIG. 21*c*. The battery 330 includes a first terminal block 344 including a + and a − terminal 343 for providing power to a connected power tool. The + terminal 343 is connected to a node A. The node A is the positive terminal of a first subset of the battery cells 332. The − terminal 343 is connected to a node D. The node D is the negative terminal of a last subset of the battery cells 332. The battery 330 may also include a second terminal block 348 including four terminals—the second set of terminals 349 in this embodiment. There is an A terminal 349*a* coupled to the node A, a B terminal 349*b* coupled to a node B, a C terminal 349*c* coupled to a node C and a D terminal 349*d* coupled to the node D. In this exemplary embodiment, the C terminal 349*c* is positioned above the A terminal 349*a* and the B terminal 349*b* is positioned above and the D terminal 349*d*.

FIG. 24 illustrates a partial schematic/partial block diagram of the convertible battery pack 20A4 in multiple configurations. While FIG. 24 only illustrates a single cell 332 in each subset 334 there could be any number of cells 332 in the subset 334. More particularly the number of cells 332 in the subset 334 between the positive nodes A, C and the corresponding negative nodes B, D could be any number greater than or equal to 1. In this example of the battery 330 there are five cells 332 in the subset 334 between the node A and the node B and five cells in the subset 334 between the node C and the node D. The number of terminals 349 in the second terminal block 348 is related to the number of subsets 334 of cells 332. In this exemplary battery, the second set of terminals includes four terminals 349. As indicated in FIG. 24, the A terminal 349*a* corresponds to and is electrically coupled to the node A and the B terminal 349*b* corresponds to and is electrically coupled to the node B, the C terminal 349*c* corresponds to and is electrically coupled to the node C and a D terminal 349*d* corresponds to and is electrically coupled to the node D.

Referring to FIGS. 23*a* and 24*a*, in the default configuration—when the converter element 350 is not positioned in the slot 347—the A and C terminals 349*a*, 349*c* are electrically coupled to each other and the B and D terminals 349*b*, 349*d* are electrically coupled to each other. By having the A and C terminals 349*a*, 349*c* electrically coupled to each other this effectively forms a closed switch 1. By having the B and D terminals 349*b*, 349*d* electrically coupled to each other this effectively forms a closed switch 2. As the B and C terminals 349*b*, 349*c* are not coupled to each other this effectively forms an open switch 3. In this configuration, also illustrated in FIG. 21*c*—to the left of the arrow, the battery pack 20A4 is in its low rated voltage/high capacity configuration.

As illustrated in FIGS. 22, 23 and 24, the system includes a converter element 350. In FIGS. 22 and 23 the converter element 350 is shown as a standalone element—unattached to any tool. The converter element 350 may be a standalone element or may be fixedly connected to a power tool, as illustrated in FIGS. 19*b* and 24. As illustrated in FIGS. 19*b* and 24, the converter element may be housed in the tool (one of the tools of the second set, third set or fourth set of tools). While FIG. 22 illustrates the converter element 350 in its standalone embodiment, the following applies to the in-tool embodiment as well. The converter element 350 includes a base portion 354 of plastic or other electrically insulating material. Attached to an upper surface of the base portion 354 is an electrically conductive material, such as copper, hereinafter referred to as a jumper 355. The base portion 354 includes a leading edge 356. The leading edge 356 is an edge of the converter element 350 that initially engages the terminals of the second set of terminals 349 when the converter element 350 is inserted into the slot 347.

As illustrated in FIG. 23, as the converter element 350 is inserted into the slot 347, the leading edge 356 engages all of the terminals of the second set of terminals 349. As illustrated in FIGS. 23*b* and 24*b*, as this occurs the A terminal 349*a* is separated from the C terminal 349*c* thereby opening switch 1 and the B terminal 349*b* is separated from the D terminal 349*d* thereby opening switch 2. This configuration places the subsets 334 of battery cells 332 in an open configuration. When switching back and forth from the first cell configuration—parallel—to the second cell configuration—series—it is generally very desirable to enter the third, open configuration—or open circuit—as the cells will otherwise be placed in a shorted condition.

Placing the cells in the shorted condition could have serious, deleterious effects on the battery. For example, if all or some of the cells are placed in the shorted condition, a large amount of unsafe discharge could occur.

As illustrated in FIGS. 23*c* and 24*c*, as the converter element 350 is further inserted into the slot 347 the C and B terminals 349*c*, 349*b* engage the jumper 355. This electrically couples the B and C terminals 349*b*, 349*c*, connects nodes B and C and effectively closes switch 3. This places the subsets 334 into a series configuration—illustrated in FIG. 21*c* to the right of the arrow—and the battery pack 20A4 into the medium rated voltage/low capacity configuration. To be clear, the bottom side of the base portion of the converter element 350—opposed to the side attached to the jumper 355—is an insulating surface and as such, the A terminal 349*a* is electrically insulated from the C terminal 349*c*—effectively keeping switch 1 open and the B terminal 349*b* is electrically insulated from the D terminal 349*d*—effectively keeping switch 2 open.

Referring to FIG. 21*e*, upon insertion of the converter element 350 into the slot 347 a battery pack of the set of convertible battery packs 20A4 will convert from its low rated voltage/high capacity configuration to its medium rated voltage/low capacity configuration. In the medium rated voltage/low capacity configuration the convertible battery pack 20A4 will have a rated voltage of X×M×N volts and a capacity of Y amp-hours.

Referring to FIGS. 25, 26, and 27, another exemplary embodiment of the convertible battery pack 20A4 and the battery 330 of the set of convertible battery packs 20A4 is illustrated. This exemplary battery 330 has 15 cells and has a default configuration as illustrated in FIG. 21*d*. The battery 330 includes a first terminal block 344 including a + and a − terminal 343 for providing power to a connected power tool. The + terminal 343 is connected to a node A. The node A is the positive terminal of a first subset of the battery cells 332. The − terminal 343 is connected to a node F. The node F is the negative terminal of a last subset of the battery cells 332. The battery 330 may also include a second terminal block 348 including six terminals—the second set of terminals 349 in this embodiment. There is an A terminal 349*a* coupled to the node A, a B terminal 349*b* coupled to a node B, a C terminal 349*c* coupled to a node C, a D terminal 349*d* coupled to a node D, an E terminal 349*e* coupled to a node E and an F terminal 349*f* coupled to the node F. In this exemplary embodiment, the C and E terminals 349*c*, 349*e* are positioned above the A terminal 349*a* and the B and D terminals 349*b*, 349*d* are positioned above the F terminal 349*f*.

FIG. 27 illustrates a partial schematic/partial block diagram of the battery pack 20A4 in multiple configurations. While FIG. 27 only illustrates a single cell 332 in each subset 334 there could be any number of cells 332 in the subset 334. More particularly the number of cells 332 in the subset 334 between the positive nodes A, C, E and the corresponding negative nodes B, D, F could be any number greater than or equal to 1. In this example of the battery 330 there are five cells 332 in the subset 334*a* between the node A and the node B and five cells 332 in the subset 334*b* between the node C and the node D and five cells 332 in the subset 334*c* between the node E and the node F. The number of terminals 349 in the second terminal block 348 is related to the number of subsets 334 of cells 332. In this exemplary battery, the second set of terminals includes six terminals 349. As indicated in FIG. 27, the A terminal 349*a* corresponds to and is electrically coupled to the node A, the B terminal 349*b* corresponds to and is electrically coupled to the node B, the C terminal 349*c* corresponds to and is electrically coupled to the node C, the D terminal 349*d* corresponds to and is electrically coupled to the node D, the E terminal 349*e* corresponds to and is electrically coupled to node E and the F terminal 349*f* corresponds to and is electrically coupled to node F.

Referring to FIGS. 26*a* and 27*a*, in the default configuration—when the converter element 350 is not positioned in the slot 347—the A, C and E terminals 349*a*, 349*c*, 349*e* are electrically coupled to each other and the B, D and F terminals 349*b*, 349*d*, 349*f* are electrically coupled to each other. By having the A and C terminals 349*a*, 349*c* electrically coupled to each other this effectively forms a closed switch 1 and by having the C and E terminals 349*c*, 349*e* electrically coupled to each other—through the A terminal 349*a*—this effectively forms a closed switch 4. By having the B and D terminals 349*b*, 349*d* electrically coupled to each other—through the F terminal 349*f*—this effectively forms a closed switch 2 and by having the D and F terminals 349*d*, 349*f* electrically coupled to each other this effectively forms a closed switch 5. As the B and C terminals 349*b*, 349*c* are not coupled to each other this effectively forms an open switch 3 and as the D and E terminals 349*d*, 349*e* are not coupled to each other this effectively forms an open switch 6. In this configuration, also illustrated in FIG. 21*d*—to the left of the arrow, the convertible battery pack 20A4 is in its low rated voltage/high capacity configuration.

As illustrated in FIGS. 25, 26, and 27, the system includes a converter element 350. In FIGS. 25 and 26 the converter element 350 is shown as a standalone element—unattached to any tool. The converter element 350 may be a standalone element or may be fixedly connected to a power tool, as illustrated in FIGS. 19*b* and 27. As illustrated in FIGS. 19*b* and 27, the converter element 350 may be housed in the tool (each of the tools of the second set, third set and fourth set of tools). While FIGS. 25 and 26 illustrate the converter element in its standalone embodiment, the following applies to the in-tool embodiment as well. The converter element 350 includes a base portion 354 of plastic or other electrically insulating material. Attached to an upper surface of the base portion 354 is an electrically conductive material, such as copper, hereinafter referred to as the jumper 355. In this embodiment there are two jumpers 355*a*, 355*b*. The base portion 354 includes a leading edge 356. The leading edge 356 is an edge of the converter element 350 that initially engages the terminals of the second set of terminals 349 when the converter element 350 is inserted into the slot 347. As illustrated in FIG. 26*a*, as the converter element 350 is inserted into the slot 347, the leading edge 356 engages all of the terminals of the second set of terminals 349. As illustrated in FIGS. 26*b* and 27*b*, as this occurs the A terminal 349*a* is separated from the C and E terminals 349*c*, 349*e* thereby opening switches 1 and 4 and the F terminal 349*f* is separated from the B and D terminals 349*b*, 349*d* thereby opening switches 2 and 5. This configuration places the subsets 334 cells 332 in an open configuration, which has the advantages described above.

As illustrated in FIGS. 26*c* and 27*c*, as the converter element 350 is further inserted into the slot 347 the C and B terminals 349*c*, 349*b* engage a first jumper 355*a*. This electrically couples the B and C terminals 349*b*, 349*c*, connects nodes B and C and effectively closes switch 3. Simultaneously, the D and E terminals 349*d*, 349*e* engage a second jumper 355*b*. This electrically couples the D and E terminals 349*d*, 349*e*, connects nodes D and E and effectively closes switch 6. This places the subsets 334 of cells 332 into a series configuration—illustrated in FIG. 22*d* to the right of the arrow—and the battery pack into the medium rated voltage/low capacity configuration. To be clear, the bottom side of the base portion of the converter element 350—opposed to the side attached to the jumpers 355—is an insulating surface and as such, the A terminal 349*a* is electrically insulated from the C and E terminals 349*c*, 349*e*—effectively keeping switches 1 and 4 open and the F terminal 349*f* is electrically insulated from the B and D terminals 349*b*, 349*d*—effectively keeping switches 2 and 5 open.

The battery pack charger 30 is able to mechanically and electrically connect to the battery packs of both the set of low rated voltage battery packs 20A1 and the set of convertible battery packs 20A4. The battery pack charger 30 is able to charge the battery packs of both the set of low rated voltage battery packs 20A1 and the set of convertible battery packs 20A4. As the battery packs of both the low rated voltage battery packs 20A1 and the convertible battery packs 20A4 have the same tool interface 16A for connecting the battery packs to the low rated voltage DC power tools, the battery packs of both the set of low rated voltage battery packs 20A1 and the set of convertible battery packs 20A4 will both interface with a low rated voltage battery charger 30, which includes a battery interface 16A generally identical to the battery interface 16A of the low rated voltage DC power tools 10A1.

Referring to FIG. 20*b*, in an alternate embodiment, the converter element 350 may be implemented as part of the convertible battery pack 20A4. Referring to FIG. 20*c*, in another alternate embodiment, the converter element 350 may be implemented as part of the converting medium rated voltage DC power tools 10A2. Similarly, the converter element 350 may be implemented as part of the converting high rated voltage DC power tool 10A3 and the converting AC/DC power tools 10B. Referring to FIG. 20*d*, in yet another alternate embodiment, the converter element 350 may be implemented as a separate component that may interface with the convertible battery pack 20A4, the medium rated voltage DC power tool 10A2, or both. Similarly, the converter element 350 may be implemented as a separate component that may interface with the high rated voltage DC power tools 10A3 and the AC/DC power tools 10B.

Referring to FIG. 3*b*, a low rated voltage/medium rated voltage DC power tool 10A2 (e.g., a 60V DC power tool) is capable of being alternatively powered by a low rated voltage battery pack 20A1 (e.g., a 20V battery pack), a medium rated voltage battery pack 20A2 (e.g., a 60V battery pack) and/or a convertible low rated voltage/medium rated voltage battery pack 20A4—with or without the converter element 350 (in the example of a convertible battery pack 20A4 and a tool 10 with the converter element 350 the tool would be considered a converting tool 10). In an alternate embodiment, the low rated voltage/medium rated voltage DC power tool 10A2 may operate on a pair of such low rated voltage battery packs 20A1 connected in series. For example, placing two 20V battery packs 20A1 in series generates a combined rated voltage of 40V DC. The low rated voltage battery pack 20A1 or the convertible low rated voltage/medium rated voltage battery pack 20A4 in the low rated voltage configuration may not provide the equivalent power output of a 60V medium rated voltage battery pack 20A2 for which the medium rated voltage DC power tool 10A2 is rated. In order for the motor 12A in the low rated voltage/medium rated voltage DC power tool 10A2 (e.g., rated at 20V/60V or 40V/60V) to work with the low rated voltage battery pack 20A1 (which generates a voltage of, for example, 20V or 40V), the low rated voltage/medium rated voltage DC power tool 10A2 includes a motor control circuit 14A that is configured to optimize the motor performance based on the battery rated voltage, as discussed in more detail in this application.

Referring to FIG. 3*c*, the medium rated voltage/high rated voltage power tool 10A3 may be alternatively powered by a medium rated voltage battery pack 20A2 (e.g., a pair of 20V, 30V, or 40V battery packs or a single 40V, 60V or 90V battery pack). For example, the medium rated voltage/high rated voltage DC power tool 10A3 may operate using a pair of 40V batteries connected in series to generate a combined rated voltage of 80V. In order for the motor 12A in the high rated voltage DC power tool 10A3 (which as discussed above is optimized to work at a higher power and voltage rate of, for example, 120V) to work with the medium rated voltage battery pack 20A2, the high rated voltage DC power tool 10A3 includes a motor control circuit 14A (similar to previously described motor control circuit 14A) that is configured to optimize the motor performance based on the battery input voltage.

Referring to FIG. 28, an alternative embodiment of a system including an alternative convertible battery pack 20A4' and an alternative one of the tools from the medium rated voltage DC power tools 10A2', or the high rated voltage DC power tools 10A3', or the AC/DC power tools 10B' may include an alternative switching network 359. The alternative switching network 359 may be partly in the battery pack 20A4' and partly in the tools 10A2', 10A3', 10B'. As illustrated in FIG. 28*a*, the battery pack 20A4' includes a battery 330' similar to the battery 330. However, the battery 330' includes two switches 1, 2. These are the parallel switches. Similar to the battery 330 described above, when the switches 1, 2 are closed, the cells 332 of the alternative battery 330' are in a parallel configuration providing a low rated voltage/high rated capacity battery pack 20A4'. The second terminal block 346 includes a B terminal 349*b* and a C terminal 349*c*. As illustrated in FIGS. 28*b* and 28*c*, the power tools 10A2', 10A3', 10B' includes a switch 3. As illustrated in FIG. 28*b*, the power tools 10A2', 10A3', 10B' are coupled to the battery pack 20A4' and the tool switch 3 is in an open state and the battery switches 1, 2 are in a closed state. As such, the battery pack 20A4' is in a low rated voltage configuration. As illustrated in FIG. 28*c*, the power tool 10A2', 10A3', 10B' is coupled to the battery pack 20A4' and the tool switch 3 is in a closed state and the battery switches 1, 2 are in an open state. As such, the battery pack 20A4' is in a medium rated voltage configuration. Similar to the embodiment described above with regard to FIG. 3*b*, the power tool 10A2', 10A3', 10B' can operate as a either a low rated voltage DC power tool—when combined with a low rated voltage battery pack—or a medium rated voltage DC power tool—when combined with a medium rated voltage battery pack. The tool switch 3 may be, for example, a transistor. The tool switch 3 may be controlled by a tool trigger or a separate user control switch 360 on the tool 10A2', 10A3', 10B'.

Referring to FIG. 29, another alternative embodiment of a system including an alternative convertible pack 20A4" and an alternative one of the tools from the medium rated voltage DC power tools 10A2" or the high rated voltage DC power tools 10A3" or the AC/DC power tools 10B" may include an alternative switching network 359' similar to the one described above with regard to FIG. 28. In this embodiment, the battery 330" includes three subsets of cells and four battery switches 1, 2, 3, 4 and the tool include two switches 5, 6.

Referring to FIGS. 30 and 31, the converter element 350 and the switching network may be implemented using transistors as the switches and a controller 362. Referring to FIG. 30, an embodiment is illustrated in which a control switch 360 on the tool controls the conversion of the convertible battery pack 20A4 back and forth between the low rated voltage/high capacity configuration and the medium rated voltage/low capacity configuration. The convertible battery pack 20A4 includes a plurality of cells, as described above, a switch network 361 and a controller 362. The controller 362 is coupled to the switch network 361 and the switch network 361 is coupled to the battery 330. The switch network 361, while implemented using transistors, is equivalent to the switch network described above with respect to FIGS. 24 and/or 27. The convertible battery pack 20A4 also includes a first terminal block 363 and a second terminal block 364. The first battery terminal block 363 is connected to the plurality of cells for providing power to the power tool 10. The second battery terminal block 364 is connected to the controller 362 for receiving a control signal from the tool 10. The tool 10 includes a first terminal block 365 connected to the motor 12 and connectable to the first battery terminal block 363 for receiving power from the convertible battery pack 20A4. The tool 10 also includes a second terminal block 366 connected to the control switch 360 and connectable to the second battery terminal block 364. When the convertible battery pack 20A4 is connected to the tool 10, the first battery terminal block 363 electrically connects to the first tool terminal block 365 and the second battery terminal block 364 electrically connects to the second tool terminal block 366. As such, the tool control switch 360 is able to send a signal to the controller 362 directing the controller to manage the switch network 361 to place the battery cells in a first configuration providing a low rated voltage/high capacity pack configuration or a second configuration providing a medium rated voltage/low capacity pack configuration. The tool control switch 360 may be any type of two position switch. The first and second battery terminal blocks 363, 364 may be implemented as a single terminal block. The first and second tool terminal blocks 364, 366 may also be implemented as a single terminal block Referring to FIG. 31, another embodiment is illustrated similar to the embodiment of FIG. 30 except that the control switch 360' is part of the convertible battery pack 20A4 instead of the power tool 10. As such, neither the convertible battery pack 20A4 nor the power tool 10 requires a second terminal block.

The high rated voltage tools may not only receive and operate using the high rated voltage rechargeable battery packs but the high rated voltage tools may also incorporate a battery charger capable of charging the high rated voltage battery packs. The battery charger may charge the high rated voltage battery pack whether or not the power tool is discharging the battery pack.

FIGS. 32*a*, 32*b* and 32*c* illustrate alternate cell configurations for a convertible battery pack 20A4.

Referring to FIG. 1, the set of high rated voltage power tools may include one or more different types of high-power AC/DC (i.e., corded/cordless) power tools 10B. Unlike the low rated voltage power tools 10A1 and the medium rated voltage power tools 10A2, the high rated voltage AC/DC power tools 10B may be alternately powered by an AC rated voltage AC power supply 20B (e.g., 100 VAC to 130 VAC mains AC power in countries such as the US, Canada, Mexico, Japan, etc., supplied via an AC power cord) or one or more of the DC power sources 20A (e.g., supplied from a removable and rechargeable battery pack).

The set of very high rated voltage power tools may include one or more different types of AC/DC or corded/cordless power tools. Similar to the high rated voltage AC/DC power tools 10B, the very high rated voltage AC/DC power tools may be alternately powered by a very high rated AC power supply 20B (e.g., 200 VAC to 240 VAC mains AC power in most countries in Europe, South America, Asia and Africa, etc., supplied via an AC power cord) or one or more of the DC power supplies 20A (e.g., supplied from a removable and rechargeable battery pack) that together have a very high voltage rating. In other words, the very high rated voltage power tools are designed to operate using a very high rated voltage AC or DC power supply.

Where the set of medium rated voltage DC power tools 10A2 is configured to be powered by the medium rated voltage battery packs 20A2, if the battery pack interface 16A is appropriately configured the medium rated voltage DC power tool 10A2 may also be powered by the convertible battery packs 20A4 that are placed in their medium rated voltage configuration, or by a plurality of low rated voltage battery packs 20A1 connected to one another in series to have a total medium rated voltage. For example, the low rated voltage DC power tools 10A1 having a rated voltage of 20V may be powered with 20V battery packs 20A1 or convertible battery packs 20A4 placed in their low rated voltage configuration of 20V.

The medium rated voltage DC power tools 10A2 having a rated voltage of 60V may be powered by a 60V medium rated voltage battery pack 20A2, or if the battery pack interface 16A is appropriately configured by a convertible battery pack 20A4 configured in its medium rated voltage configuration of 60V, or if the battery pack interface 16A is appropriately configured by three 20V low rated battery packs connected in series to have a total rated voltage of 60V.

FIG. 33 illustrates an exemplary alternate embodiment of a power tool system of the present invention. The power tool system of this embodiment may include one or more of the sets of power tools 10A3, 10B, as described above. The power tool system of this embodiment may also include two of the convertible battery packs 20A4 as described above. The power tool system of this embodiment may also include a converter box 394. The converter box 394 may include a pair of battery pack receptacles 396. The battery pack receptacles 396 each receive one of the convertible battery packs 20A4. The power tool system of this embodiment may also include a pair of converter elements 350. The converter elements 350 may be a standalone device, or included as part of the battery packs 20A4 or included as part of the converter box 396. Regardless of the implementation of the converter element 350, when the convertible battery pack 20A4 resides in the battery pack receptacle 396, the pack is in its medium rated voltage/low capacity configuration (e.g., each 20V/60V battery pack 20A4 is in the 60V configuration). The converter box 394 places the two battery packs 20A4 in a series combination configuration thereby providing a high rated voltage converter box 396 (e.g., the two 60V battery packs are connected in series to provide a 120V DC output). Using the cordset associated with the AC/DC power tools 122, 126, 128, any of these AC/DC power tools may be plugged into the converter box 396 to operate at a high rated voltage using a rechargeable DC battery supply. Alternatively, using the same cordset, these AC/DC power tools may be plugged into a high rated voltage AC power supply 20B. In this embodiment, the AC/DC power tools 122, 126, 128 may utilize any appropriate rechargeable DC battery pack power supply 20A without incorporating a converter element 350.

FIGS. 34 and 35 illustrate an alternate exemplary embodiment of a convertible battery pack 20A4. The battery pack includes a housing 412. The housing may include alternate configurations for creating the housing for example, a top portion and a bottom portion coupled together to form the housing or two side portions coupled together to form the housing. Regardless of the structure, the housing will form an interior cavity 414. Other configurations for forming the housing are contemplated and encompassed by the present invention. The housing 412 includes a power tool interface 416 for mechanically coupling with a corresponding battery pack interface 418 of an electrical device, for example, a power tool 20 or a battery charger 30. In the illustrated exemplary embodiment, the power tool interface 416 includes a rail and groove system including a pair of rails 422 and a pair of grooves 424. Other types of interfaces are contemplated and encompassed by the present invention. The power tool interface 416 may also include a latching system 426 for fixing the battery pack 10 to the electrical device 20.

The housing 412 also includes a plurality of slots 428 in a top portion 430 of the housing 412. The slots 428 may be positioned in other portions of the housing 412. The plurality of slots 428 forms a set of slots 428. The plurality of slots 428 corresponds to a plurality of battery terminals 432. The plurality of battery terminals 432 forms a set of battery terminals 432. The plurality of slots 428 also correspond to a plurality of terminals 434 of the electrical device 20. The plurality of electrical device terminals 434 forms a set of electrical device terminals 434. The electrical device terminals 434 are received by the battery terminal slots 428 and engage and mate with the battery terminals 432, as will be discussed in more detail below. The housing 412 also includes a pair of conversion slots or raceways 436 extending along the top portion 430 of the housing 412 on opposing sides of the battery terminal slots 428. In the illustrated exemplary embodiment, the raceways 436 extend from an edge 438 of the housing 412 to a central portion 440 of the top portion 430 of the housing 412. Each raceway 436 ends at a through hole 442 in the top portion 430 of the housing 412. The through holes 442 extend from an exterior surface 44 of the housing 412 to the interior cavity 414. In the illustrated embodiment, the through holes 442 are positioned below the rails 422 of the power tool interface 416. The conversion slots 436 and through holes 442 may be positioned in other portions of the housing 412. Alternate embodiments may include more or less conversion slots.

FIGS. 36A and 36B illustrate exemplary simplified circuit diagrams of an exemplary embodiment of a convertible battery 446 in a first cell configuration and a second cell configuration. The battery 446 includes, among other elements that are not illustrated for purposes of simplicity, a plurality of rechargeable battery cells 448—also referred to as cells. The plurality of cells 448 forms a set of cells 448. In the illustrated circuit diagram, the exemplary battery 446 includes a set of fifteen (15) cells 448. Alternate exemplary embodiments of the battery may include a larger or a smaller number of cells, as will be understood by one of ordinary skill in the art and are contemplated and encompassed by the present disclosure. In the illustrated exemplary embodiment, the battery includes a first subset A of five (5) cells A1, A2, A3, A4, A5; a second subset B of five (5) cells B1, B2, B3, B4, B5; and a third subset C of five (5) cells C1, C2, C3, C4, C5. The cells 448 in each subset of cells 448 are electrically connected in series. More specifically, cell A1 is connected in series with cell A2 which is connected in series with cell A3 which is connected in series with cell A4 which is connected in series with cell A5. Subsets B and C are connected in the same fashion. As is clearly understood by one of ordinary skill in the art, each cell 448 includes a positive (+) terminal or cathode and a negative (−) terminal or anode. Each subset of cells 448 includes a positive terminal (A+, B+, C+) and a negative terminal (A−, B−, C−). And the battery 446 includes a positive terminal (BATT+) and a negative terminal (BATT−).

Between adjacent cells 448 in a subset of cells 448 is a node 449. The nodes will be referred to by the positive side of the associated cell. For example, the node between cell A1 and cell A2 will be referred to as A1+ and the node between cell A2 and A3 will be referred to as A2+. This convention will be used throughout the application. It should be understood that the node between A1 and A2 could also be referred to as A2−.

As is clearly understood by one of ordinary skill in the art, a battery cell 448 has a maximum voltage potential—the voltage of the cell 448 when it is fully charged. For purposes of this application, unless otherwise specifically stated, when referring to the voltage of a cell 448 the reference will be to the cell's maximum voltage. For example, a cell 448 may have a voltage of 4 volts when fully charged. In this example, the cell will be referred to as a 4V cell. While the cell 448 may discharge to a lesser voltage during discharge it will still be referred to as a 4V cell. In the illustrated exemplary embodiment, the cells 448 are all 4V cells. As such, the voltage potential of each subset of cells 448 will be denoted as 20V. Of course, one or more of the cells of alternate exemplary embodiments may have a larger or a smaller maximum voltage potential and are contemplated and encompassed by the present disclosure.

As is clearly understood by one of ordinary skill in the art, a battery cell 448 has a maximum capacity—the amp-hours of the cell 448 when it is fully charged. For purposes of this application, unless otherwise specifically stated, when referring to the capacity of a cell 448 the reference will be to the cell's maximum capacity. For example, a cell 448 may have a capacity of 3 amp-hours when fully charged. In this example, the cell 448 will be referred to as a 3 Ah cell. While the cell 448 may discharge to a lesser capacity during discharge it will still be referred to as a 3 Ah cell. In the illustrated exemplary embodiment, the cells 448 are all 3 Ah cells. As such, the capacity of each subset of cells will be denoted as 3 Ah. Of course, one or more of the cells of alternate exemplary embodiments may have a larger or a smaller maximum capacity and are contemplated and encompassed by the present disclosure.

The battery 446 also includes a plurality of switching elements 450—which may also be referred to as switches 450. The plurality of switches 450 forms a set of switches 450. In the illustrated circuit diagram, the exemplary battery 446 includes a set of fourteen (14) switches S1-S14. Alternate exemplary embodiments of the battery 446 may include a larger or a smaller number of switches 450 and are contemplated and encompassed by the present disclosure. In the illustrated exemplary embodiment, the battery 446 includes a first subset of six (6) switches 450*a*—also referred to as power switches—and a second subset of eight (8) switches 450*b*—also referred to as signal switches. In the exemplary embodiment, a first subset of the power switches 450*a* is electrically connected between the positive terminals of the subsets of cells 448 and the negative terminals of the subsets of cells 448. Specifically, power switch S1 connects terminal A+ and terminal B+, power switch S2 connects terminal B+ and terminal C+, power switch S3 connects terminal A− and terminal B−, and power switch S4 connects terminal B− and terminal C−. In the exemplary embodiment, a second subset of the power switches 450*b* is between the negative terminal of a subset of cells and the positive terminal of a subset of cells. Specifically, power switch S5 connects terminal A− and terminal B+ and power switch S4 connects terminal B− and terminal C+. The power switches 450*a* may be implemented as simple single throw switches, terminal/contact switches or as other electromechanical, electrical, or electronic switches, as would be understood by one of ordinary skill in the art.

In the exemplary embodiment, the signal switches 450*b* are is electrically connected between corresponding nodes 449 of each subset of cells 448. More particularly, signal switch S7 is between node A4+ and node B4+, signal switch S8 is between node B4+ and C4+, signal switch S9 is between node A3+ and B3+, signal switch S10 is between node B3+ and C3+, signal switch S11 is between node A2+ and B2+, signal switch S12 is between B2+ and C2+, signal switch S13 is between node A1+ and B1+ and signal switch S14 is between B1+ and C1+. The signal switches 450*b* may be implemented as simple single throw switches, as terminal/contact switches or as other electromechanical, electrical or electronic switches, as would be understood by one of ordinary skill in the art.

In a first battery configuration, illustrated in FIG. 36A, the first subset of power switches S1, S2, S3, S4 are closed, the second subset of power switches S5, S6 are open and the signal switches S7, S8, S9, S10, S11, S12, S13, S14 are closed. In this configuration, the subsets of cells A, B, C are in connected in parallel. In addition, the corresponding cells 448 of each subset of cells 448 are connected in parallel. More specifically, cells A5, B5, C5 are connected in parallel; cells A4, B4, C4 are connected in parallel; cells A3, B3, C3 are connected in parallel; cells A2, B2, C2 are connected in parallel; and cells A1, B1, C1 are connected in parallel. In this configuration, the battery 446 is referred to as in a low rated voltage configuration. The battery 446 may also be referred to as in a high capacity configuration. As would be understood by one of ordinary skill in the art, as the subsets of cells 448 are connected in parallel, the voltage of this configuration would be the voltage across each subset of cells 448, and because there are multiple subsets of cells, the capacity of the battery would be the sum of the capacity of each subset of cells 448. In this exemplary embodiment, if each cell 448 is a 4V, 3 Ah cell, then each subset of five cells 448 would be a 20V, 3 Ah subset and the battery 446 comprising three subsets of five cells 448 would be a 20V, 9 Ah battery. In alternate embodiments, less than all of the signal switches may be closed.

In a second battery configuration, illustrated in FIG. 36*b*, the first subset of power switches S1, S2, S3, S4 are open, the second subset of power switches S5, S6 are closed and the signal switches S7, S8, S9, S10, S11, S12, S13, S14 are open. In this configuration, the subsets of cells A, B, C are in series. In this configuration, the battery 446 is referred to as in a medium rated voltage configuration. The battery 446 may also be referred to as in a low capacity configuration. As would be understood by one of ordinary skill in the art, as the subsets of cells 448 are connected in series the voltage of this configuration would be the voltage across all of the subsets of cells 448, and because there is effectively one superset of cells in parallel in this configuration, the capacity of the battery would be the capacity of a single cell 448 within the superset of cells 448. In this exemplary embodiment, if each cell 448 is a 4V, 3 Ah cell, then each subset of five cells 448 would be a 20V, 3 Ah subset and the battery 446 comprising three subsets of cells 448 would be a 60V, 3 Ah battery.

The manner in which the battery converts from the low voltage configuration to the medium voltage configuration will be described in more detail below. It should be understood that the terms “low” and “medium” are simply intended to be relative terms in that the low rated voltage configuration has a voltage less than the medium rated voltage configuration and the medium rated voltage configuration has a voltage greater than the low rated voltage configuration.

FIGS. 37A and 37B illustrate a simplified circuit diagram of an alternate exemplary battery 446' of the exemplary embodiment of the convertible battery pack 20A4. The battery 446' of FIGS. 37A and 37B is similar to the battery 446 of FIGS. 36A and 36B. One difference between the battery 446 of FIGS. 36A and 36B and the battery 446' of FIGS. 37A and 37B is that the battery 446' does not include the signal switches 450*b*.

In the present invention, the battery pack 20A4 is convertible between the low rated voltage configuration and the medium rated voltage configuration. As illustrated in FIGS. 33-47, a mechanism makes and breaks connections between the battery terminals 432 to effectively open and close the switches 450 illustrated in FIGS. 36 and 37 and described above. FIG. 40 illustrates a detailed view of the exemplary convertible battery pack 20A4. As described above, the battery pack 20A4 includes a raceway 436 and a through hole 442. As illustrated in FIG. 38, a converter element 452—also referred to as a conversion card, a slider or a slider card and described in more detail below—includes a pair of projections 454; each projection 454 extends through one of the through holes 442 and above the raceway 436. When the converter element 452 is in a first position, as described below, the projections 454 are positioned at a first end of the corresponding through hole 442. When the converter element 452 is in a second position, as described below, the projections 454 are positioned at a second end of the corresponding through hole 442. The housing 412 may also includes an ejection port 456. The ejection port 456 allows dust or other debris to be pushed out of the through hole 442 when the converter element 452 and the converter element projection 454 move to a second position, as described below.

FIGS. 39*a*, 39*b*, and 39*c* illustrate an exemplary battery pack interface 418, in this instance that of a medium rated voltage power tool 10A2, that mates with the convertible battery pack 20A4. The battery pack interface 418 includes a pair of rails 458 and grooves 460 that mechanically mate with the power tool interface 416, described above. The battery pack interface 418 also includes a terminal block 462 and the electrical device terminals 434. The battery pack interface 418 also includes a pair of conversion elements 466. Alternate exemplary embodiments of the electrical device/medium rated voltage power tool 10A2 may include more or less conversion elements 466 and are contemplated and encompassed by the present disclosure. In the exemplary embodiment, the conversion elements 466 may be simple projections or protrusions that may extend down from the rails 458. The conversion elements 466 are sized and positioned to be received in corresponding battery pack conversion slots 436. As the battery pack interface 418 slides into mating engagement with the power tool interface 416 in a mating direction—as indicated by arrow A—the conversion elements 466 are received in and slide along corresponding conversion slots 436. At a certain point in the mating process, as described in more detail below, the conversion projections 466 will engage the converter projections 454. As the mating process continues in the mating direction, the conversion elements 466 will force the converter projections 454 to move in the mating direction. As such, the converter element 452 is forced to move or slide in the mating direction.

As illustrated in FIG. 40, the exemplary embodiment of the battery 446 includes the plurality of battery cells 448. The battery 446 also includes a plurality of cell interconnects 468, such as straps or wires, electrically connecting a cell terminal of one cell 448 to a cell terminal of another cell 448 and/or connect a terminal of a cell 448 to a printed circuit board 470 (PCB) or to a flexible printed circuit which in turn connects to the PCB 470. Also illustrated is the latch system 426 for coupling to the electrical device 10A2. The battery 446 also includes a terminal block 472 and the battery terminals 432. At one end, the battery terminals 432 are configured to electrically couple to the electrical device terminals 434 and at another end the battery terminals 432 are electrically coupled to the battery cells 448, as described in more detail below. As noted above, the battery 446 includes the converter element 452. The converter element 452 includes a support structure or housing 474. As also noted above, the converter element 452 includes the pair of converter projections 454. The converter element projections extend from a top surface 476 of the converter element support structure 474. In the illustrated exemplary embodiment the converter element support structure 474 is in the shape of an H. More specifically, the converter element support structure 474 includes two parallel legs 478 and a cross bar 480. The converter element projections 454 extend from the parallel legs 478. The battery 446 also includes a pair of compression springs 482. Alternate exemplary embodiments may include more or less springs and other types of springs and are contemplated and encompassed by the present disclosure. A first end 484 of each parallel leg 478 includes a spring connection projection 486. A first end of each compression spring 482 is attached to a corresponding spring connection projection 486. A second end of each compression spring 482 is attached to a cell holder 488. The compression springs 482 are configured to force the converter element 452 into the first position, as illustrated in FIGS. 40 and 41*a*. As the electrical device/medium rated voltage power tool 10A2 mates with the battery pack 20A4 in the mating direction and the electrical device conversion elements 466 engage the converter element projections 454, the converter element 452 is moved from its first position (illustrated in FIG. 40*a*) and forced to act against the spring 482 thereby compressing the spring 482. When the power tool 10A2 is fully mated with the battery pack 20A4, the converter element 452 will have moved from the first position to the second position and the spring 482 will be at its full compression (illustrated in FIG. 41*b*). When the electrical device 10A2 is detached from the battery pack 20A4, the spring 482 forces the converter element 452 to move from the second position (illustrated in FIG. 41*b*) to the first position (illustrated in FIG. 41*a*). The battery 446 may also include, for example, the PCB 470 and/or some other type of insulating board 490 between the converter element 452 and the cells 448, as described in more detail below.

As illustrated in FIGS. 41*a* and 41*b*, the battery PCB 470 and/or insulating board 490 includes a plurality of contact pads 492. The plurality of contact pads 492 form a set of contact pads 492. The plurality of contact pads 492 are electrically conductive elements. The plurality of contact pads 492 is electrically connectable to the battery cell terminals or nodes by wires or PCB traces or some other type of electrically conductive connection element—not illustrated for purposes of simplicity. In the exemplary embodiment, the plurality of contact pads 492 allow for contacts to slide along the contact pads 492 to make and break connections therewith—effectively opening and closing the power and/or signal switches 450 described above. This process is described in more detail below.

As illustrated in more detail in FIGS. 42, 43*a* and 43*b*—which illustrate the exemplary battery 446 without the converter element 452, the battery 446 includes the plurality of contact pads 492. As noted above, the exemplary battery 446 includes a first subset of contact pads 492*a*—also referred to as power contact pads 492*a*—on the separate insulating board 490 and a second subset of contact pads 492*b*—also referred to as signal contact pads 492*b*—on the PCB 470. In alternate embodiments, the first and second subsets of contact pads 492 may all be placed on a single PCB, a single insulating board or some other support element. The contact pad configuration illustrated in FIGS. 42, 43*a*, and 43*b* is an exemplary configuration. Alternate exemplary embodiments may include other contact pad configurations and are contemplated and encompassed by the present disclosure.

As illustrated in FIGS. 42, 43*a* and 43*b*, a subset of the battery straps 468 wrap around the cell holder 488 and extend to the PCB 470 and/or the insulating card 490. Each of the straps 468 in this subset of straps 468 is electrically coupled to a single terminal of a particular subset of cells 448. Specifically, a first strap 468*a* is coupled to terminal A+, a second strap 468*b* is coupled to terminal B+, a third strap 468*c* is coupled to terminal C+, a fourth strap 468*d* is coupled to terminal A−, a fifth strap 468*e* is coupled to terminal B−, and a sixth strap 468*f* is coupled to terminal C−.

As illustrated in FIGS. 43*a* and 43*b*, each of the contact pads 492 of the first subset of contact pads 492*a* is also electrically coupled to a single terminal of a particular subset of cells 448. Specifically, a first contact pad 492*a*1 is coupled to terminal A+, a second contact pad 492*a*2 is coupled to terminal B+, a third contact pad 492*a*3 is coupled to terminal C+, a fourth contact pad 492*a*4 is coupled to terminal B−, a fifth contact pad 492*a*5 is coupled to terminal A−, a sixth contact pad 492*a*6 is also coupled to terminal B−, a seventh contact pad 492*a*7 is coupled to terminal C−, and an eighth contact pad 492*a*8 is also coupled to terminal B+. Also, each of the contact pads 492 of the second subset of contact pads 492*b* is electrically coupled to a single node of the battery 446. Specifically, a ninth contact pad 492*b*1 is coupled to node B1+, a tenth contact pad 492*b*2 is coupled to node C1+, an eleventh contact pad 492*b*3 is coupled to node A1+, a twelfth contact pad 492*b*4 is coupled to node C2+, a thirteenth contact pad 492*b*5 is coupled to node B2+, a fourteenth contact pad 492*b*6 is coupled to node A2+, a fifteenth contact pad 492*b*7 is coupled to node A3+, a sixteenth contact pad 492*b*8 is coupled to node B3+, a seventeenth contact pad 492*b*9 is coupled to node C3+, an eighteenth contact pad 492*b*10 is coupled to node B4+, a nineteenth contact pad 492*b*11 is coupled to node C4+ and a twentieth contact pad 492*b*12 is coupled to A4+.

FIG. 44 illustrates side view of the exemplary convertible battery 446. The particular cell placement within the cell holder 488 allows for easy strap connections to allow the positive and negative terminals of the cells 448 at the most negative and most positive positions of the string of cells 448 in the subsets of cells 448 to be placed closest to the PCB 470 and insulating board 490 which allows for easy connections between the positive and negative terminals of the subsets of cells to the PCB 470 and insulating board 490. Specifically, as illustrated in FIG. 44*a*, terminals A1− (which corresponds to terminal A−), B1− (which corresponds to terminal B−), and C1− (which corresponds to terminal C−) are physically positioned in the cell holder 488 at or near the PCB 470 and insulating board 490. With regard to terminals A1− and B1−, these terminals are at the top of the cluster and the associated straps can be very short and direct to the PCB 470 or insulating board 490. With regard to C1−, this terminal is close to the top of the cluster and the associated strap runs past a single cell terminal (C5−) and connects to the PCB 470 or insulating board 490. As illustrated in FIG. 44*b*, terminals A5+(which corresponds to terminal A+), B5+(which corresponds to terminal B+), and C1+(which corresponds to terminal C+) are physically positioned in the cell holder 488 at or near the PCB 470 and insulating board 490. With regard to terminals A5+, B5+, and C5+, these terminals are at the top of the cluster and the associated straps can be very short and direct to the PCB 470 or insulating board 490. With this configuration, the connections between these battery cell terminals and the first subset of contact pads can be made more easily than in other configurations.

Figure 45A:
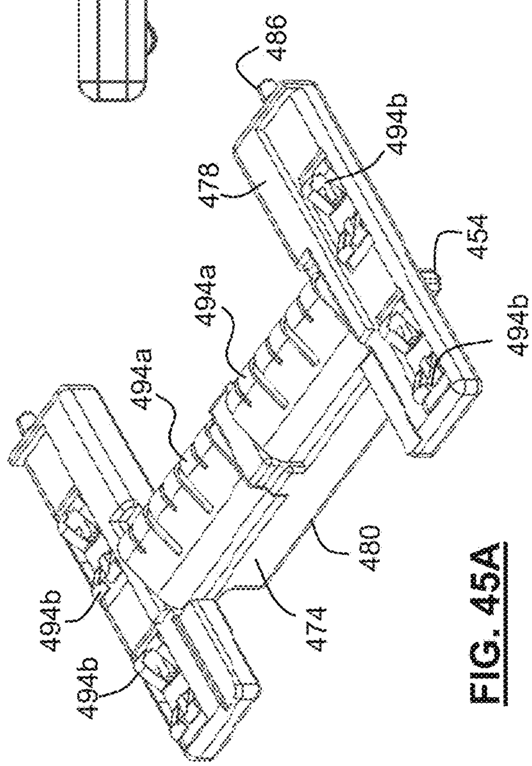
Figure 45B:
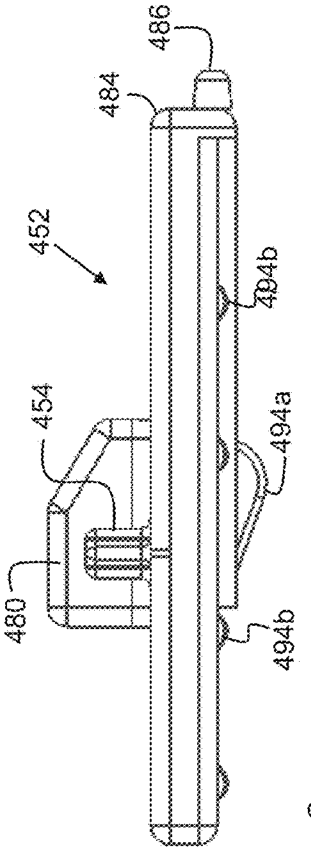
Figure 45C:
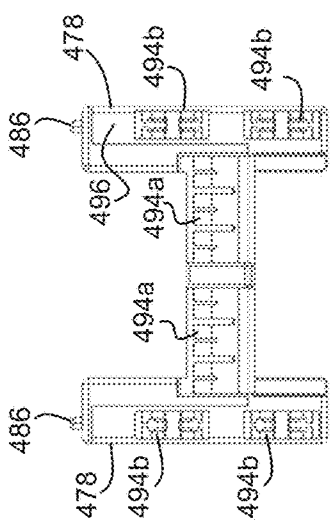
Figure 45D:
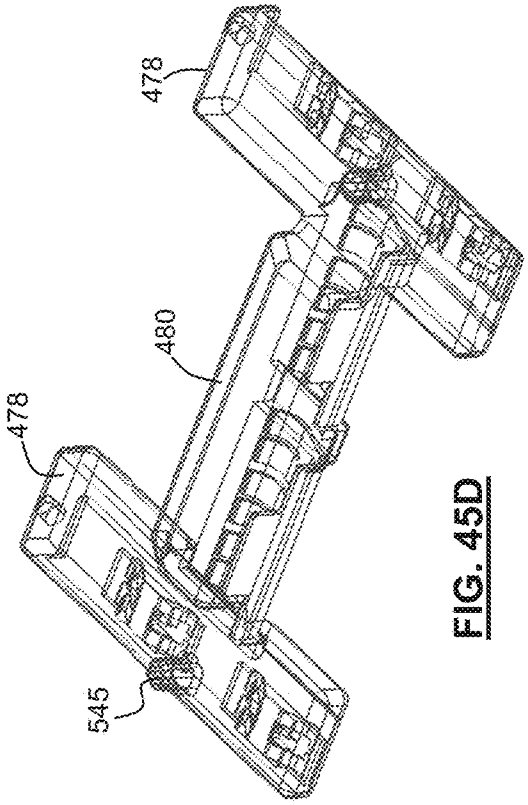

FIGS. 45*a*, 45*b*, 45*c* and 45*d* illustrate an exemplary embodiment of the converter element 452 of the exemplary embodiment of the convertible battery pack 20A4. As noted above, the converter element 452 includes the support structure 474. The support structure 474 may be of a plastic material or any other material that will serve the functions described below. In the illustrated embodiment the support structure 474 is in the form of an H, having two parallel legs 478 and a cross bar 480. The converter element 452 may take other shapes. As noted above, the converter element 452 includes two projections 454. One of the projections extends from the surface 476 of each of the legs 478 on a first side of the support structure 474. The converter element 452 may include more or less projections. The converter element 452 also includes a plurality of contacts 494. The plurality of contacts 494 form a set of contacts 494. The set of contacts 494 includes a first subset of contacts 494*a* and a second subset of contacts 494*b*. In the illustrated, exemplary embodiment of the converter element 452, the first subset of contacts 494*a* is power contacts 494*a* and the second subset of contacts 494*b* is signal contacts 494*b*. The support structure 474 also includes a bottom surface 496. The first subset of contacts 494*a* is fixed to the bottom surface 496 of the cross bar 480. The second subset of contacts 494*b* is fixed to the bottom surface 496 of the parallel legs 478. The converter element 452 also includes the spring connection projection 486 at an end 484 of each of the parallel legs 478 to connect to the compression spring 482. FIGS. 45*a* and 45*c* illustrate the second—or underside—of the converter element 452. FIG. 45*b* illustrates a side view of the converter element 452 and FIG. 45*d* illustrates a top, isometric view of the converter element 452 wherein the support structure 474 is shown as transparent such that the plurality of contacts 494 is visible.

FIGS. 46*a*-46*e* illustrate the various stages or configurations of the exemplary convertible battery 446 as the pack converts from a low rated voltage configuration to an open state configuration to a medium rated voltage configuration. These figures also illustrate a battery terminal block 472 and the plurality of battery terminals 432. The set of battery terminals 432 includes a first subset of battery terminals 432*a*—also referred to as battery power terminals 432*a*—and a second subset of battery terminals b—also referred to as battery signal terminals 432*b*. The battery power terminals 432*a*—also referred to as BATT+, BATT− output the current from the battery 446. The battery power terminals BATT+, BATT− are electrically coupled to the A+ terminal and C− terminal, respectively. The battery signal terminals B1+, A2+, C3+, B4+ output the signal from the nodes in the battery 446. The battery signal terminals B1+, A2+, C3+, B4+ are electrically coupled to the B1+, A2+, C3+, B4+ nodes, respectively. Alternate exemplary embodiments may include the battery signal terminals electrically coupled to other nodes and are contemplated and encompassed by the present disclosure.

The contact pad layout illustrated in FIGS. 46*a*-46*e* is similar to the contact pad layout illustrated in FIGS. 43*a* and 43*b*. These contact pad layouts are interchangeable. Alternate exemplary embodiments may include other contact pad layouts and are contemplated and encompassed by the present disclosure. As noted above, this exemplary pad layout may be supported on a PCB 470, an insulating board 490 or some other support structure. The contact pad layout includes the set of contact pads 492. As noted above, the set of contact pads 492 includes the set of power contact pads 492*a* and the set of signal contact pads 492*b*. With additional reference to FIG. 36, the plurality of contact pads 492 is electrically coupled to the noted terminals or nodes, as the case may be. Specifically, a first power contact pad 492*a*1 is coupled to terminal A+, a second power contact pad 492*a*2 is coupled to terminal B+, a third power contact pad 492*a*3 is coupled to terminal C+, a fourth power contact pad 492*a*4 is coupled to terminal B−, a fifth power contact pad 492*a*5 is also coupled to A−, a sixth power contact pad 492*a*6 is also coupled to B−, a seventh power contact pad 492*a*7 is coupled to C−, and an eighth power contact pad 492*a*8 is also coupled to B+. Also, a first signal contact pad 492*b*1 is coupled to node B1+, a second signal contact pad 492*b*2 is coupled to node C1+, a third signal contact pad 492*b*3 is coupled to node A1+, a fourth signal contact pad 492*b*4 is coupled to node C2+, a fifth signal contact pad 492*b*5 is coupled to node B2+, a sixth signal contact pad 492*b*6 is coupled to node A2+, a seventh signal contact pad 492*b*7 is coupled to node A3+, an eighth signal contact pad 492*b*8 is coupled to node B3+, a ninth signal contact pad 492*b*9 is coupled node C3+, a tenth signal contact pad 492*b*10 is coupled to node B4+, an eleventh signal contact pad 492*b*11 is coupled to node C4+ and a twelfth signal contact pad 492*b*12 is coupled to node A4+.

FIGS. 46*a*-46*e* also illustrate the converter element power contacts 494*a* and the signal contacts 494*b*. The contact pads 492 and the converter element contacts 494 together effectively serve as the switches S1-S14 between the cell subset terminals and the cell nodes illustrated in FIG. 36. As the electrical device 10A2 mates with the convertible battery pack 20A4 in the mating direction and the converter element 452 moves from the first position—illustrated in FIG. 41*a*—to the second position—illustrated in FIG. 41*b*—the converter element contacts 494 also move from a first position—illustrated in FIGS. 43*a* and 46*a*—to a second position—illustrated in FIGS. 43*b* and 46*e*. As the converter element contacts 494 move from the first position to the second position the contacts 494 disconnect and connect from and to the contact pads 492. As the disconnections and connections occur the switches 450 between the cell subset terminals and the cell nodes are opened and closed. As the switches 450 are opened and closed, the battery 446 converts from the low rated voltage configuration to an open configuration to the medium rated voltage configuration. Conversely, as the converter element 452 moves from the second position to the first position, the battery 446 converts from the medium rated voltage configuration to the open state configuration to the low rated voltage configuration.

Figure 46A:
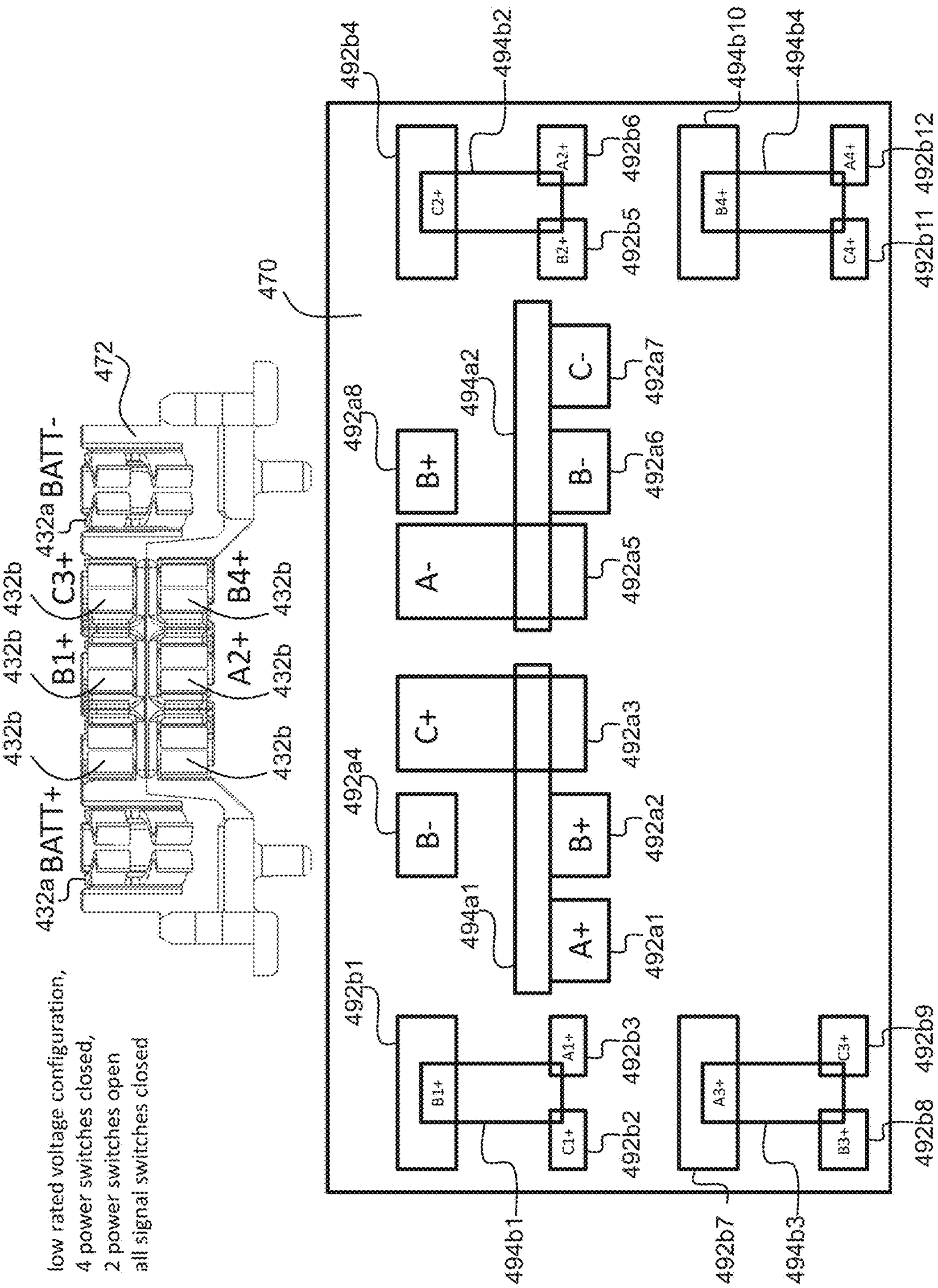

FIG. 46*a* illustrates the state of the converter element contacts 494 and the contact pads 492 when the converter element 452 is in the first position—the low rated voltage configuration. Again, the location of the particular contact pads is exemplary and other configurations are contemplated by this disclosure. In this configuration, the first power contact 494*a*1 is electrically coupled to the A+, B+, C+ contact pads 492*a*1, 492*a*2, 492*a*3 and the second power contact 494*a*2 is electrically coupled to the A−, B−, C− contact pads 492*a*5, 492*a*6, 492*a*7. When the first and second power contacts 494*a*1, 494*a*2 are in this position, the converter switches S1, S2, S3, S4 are closed and the converter switches S5, S6 are open. This places the A subset of cells and the B subset of cells and the C subset of cells in parallel. Furthermore, the first signal contact 494*b*1 is electrically coupled to the A1+, B1+, C1+ contact pads 492*b*3, 492*b*1,492*b*2, the second signal contact 494*b*2 is electrically coupled to the A2+, B2+, C2+ contact pads 492*b*6, 492*b*5, 492*b*4, the third signal contact 494*b*3 is electrically coupled to the A3+, B3+, C3+ contact pads 492*b*7, 492*b*8, 492*b*9 and the fourth signal contact 494*b*4 is electrically coupled to the A4+, B4+, C4+ contact pads 492*b*12, 492*b*10, 492*b*11. When the first, second, third and fourth signal contacts 494*b*1, 494*b*2, 494*b*3, 494*b*4 are in this position, switches S7-S14 are closed. This places the corresponding cells 448 of the three subsets of cells 448 in parallel. In other words, cells A1, B1, C1 are connected in parallel, cells A2, B2, C2 are connected in parallel, cells A3, B3, C3 are connected in parallel, cells A4, B4, C4 are connected in parallel, and cells A5, B5, C5 are connected in parallel.

Figure 46B:
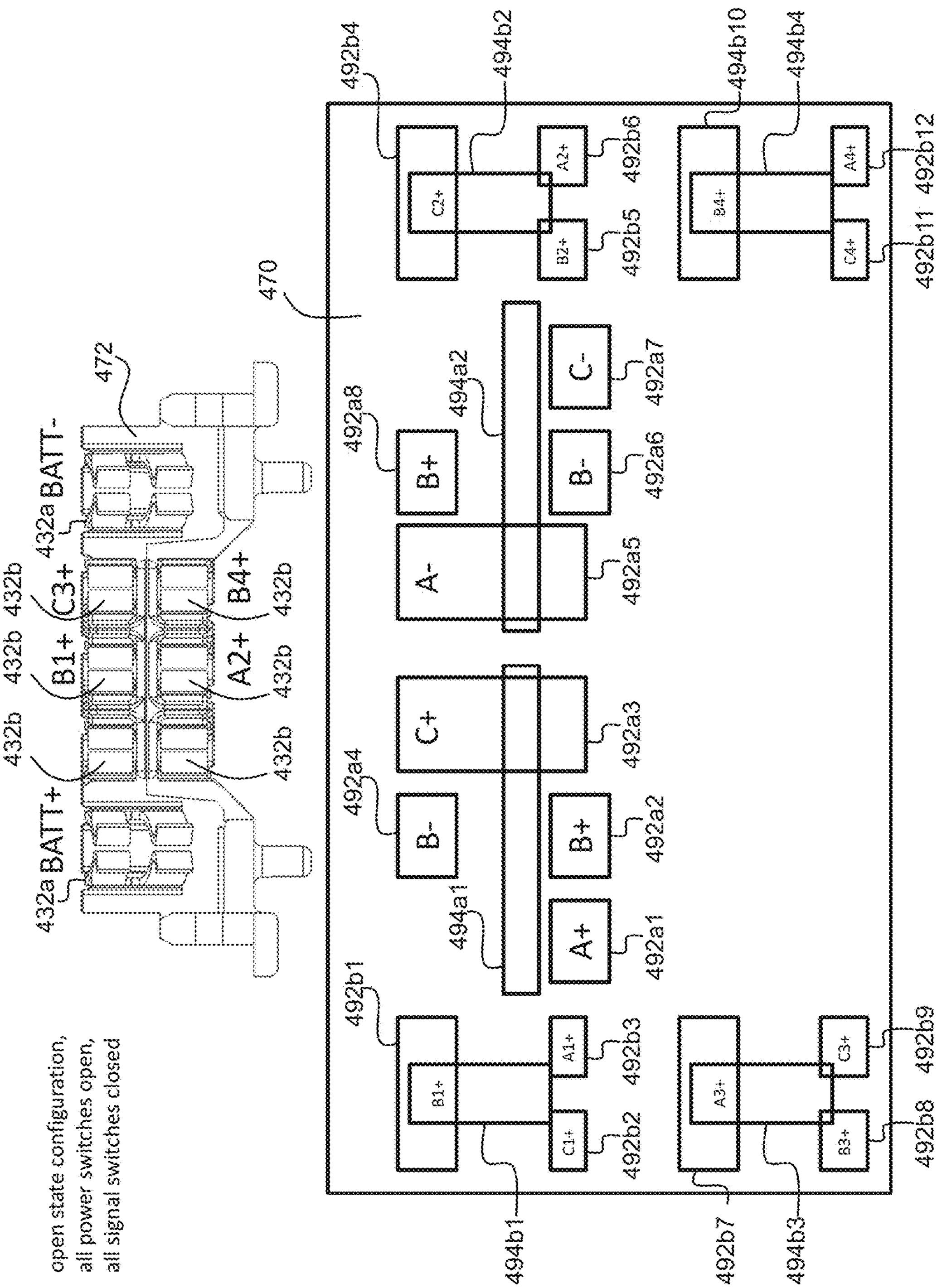
Figure 46C:
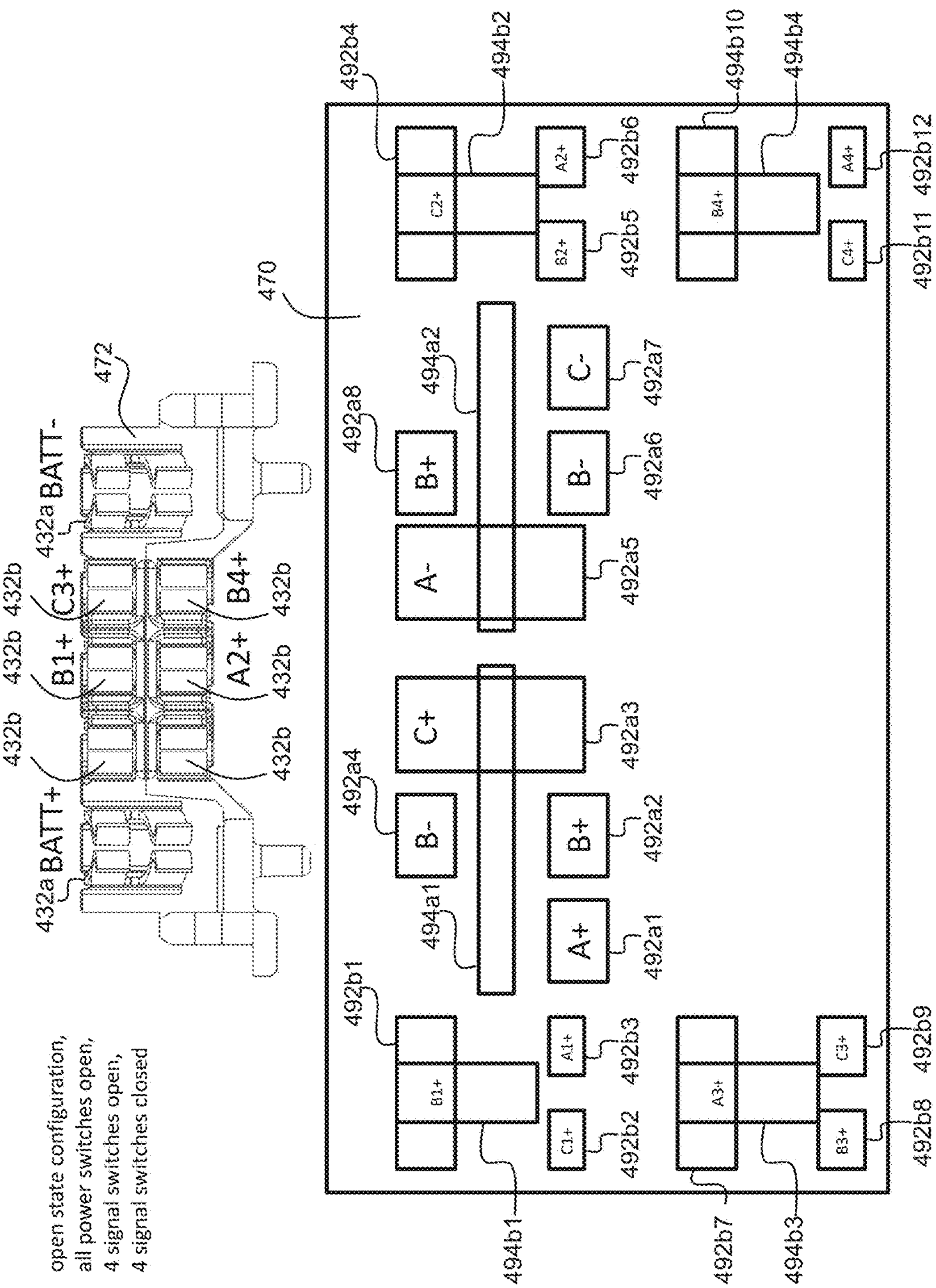
Figure 46D:
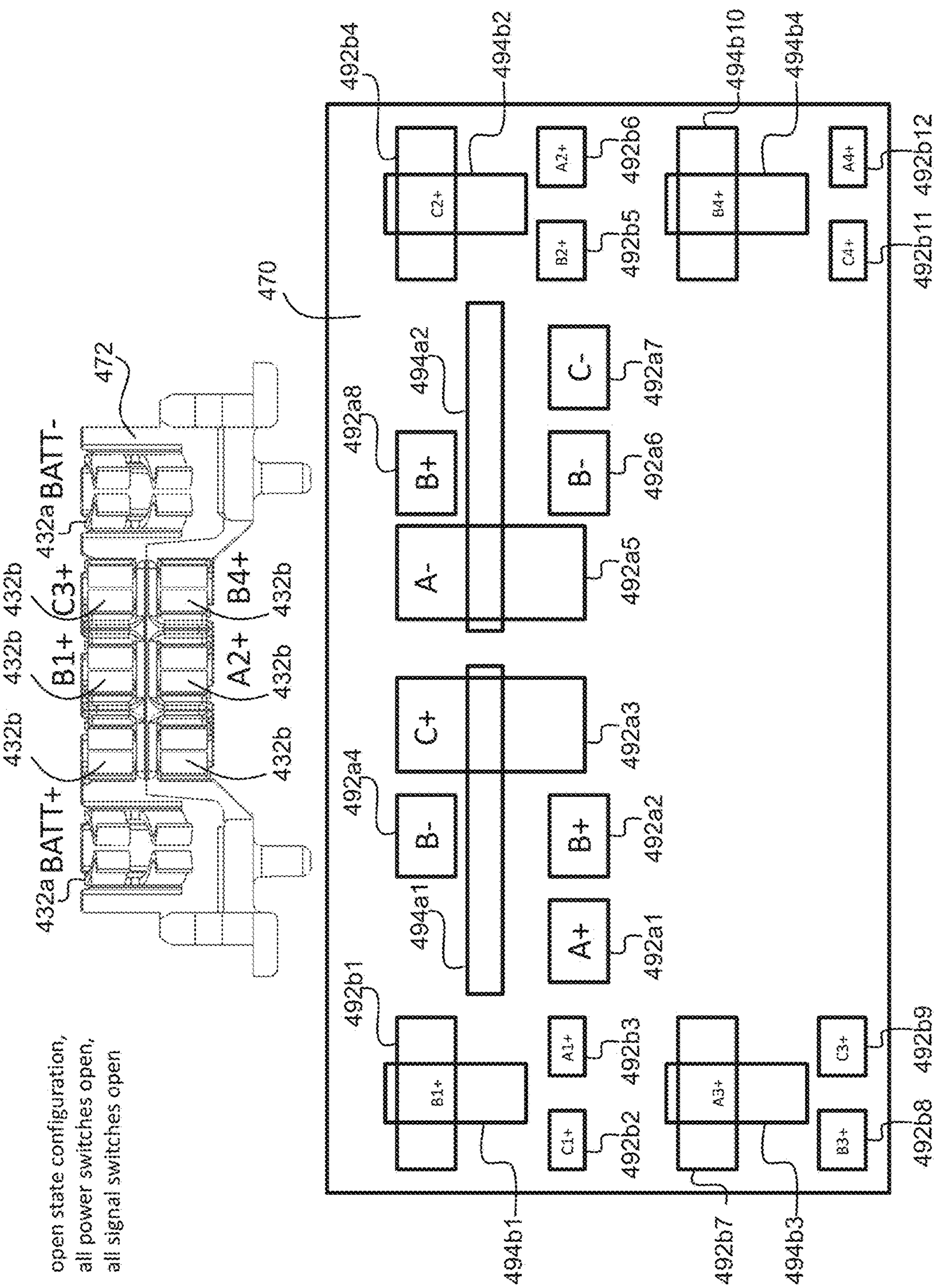
Figure 46E:
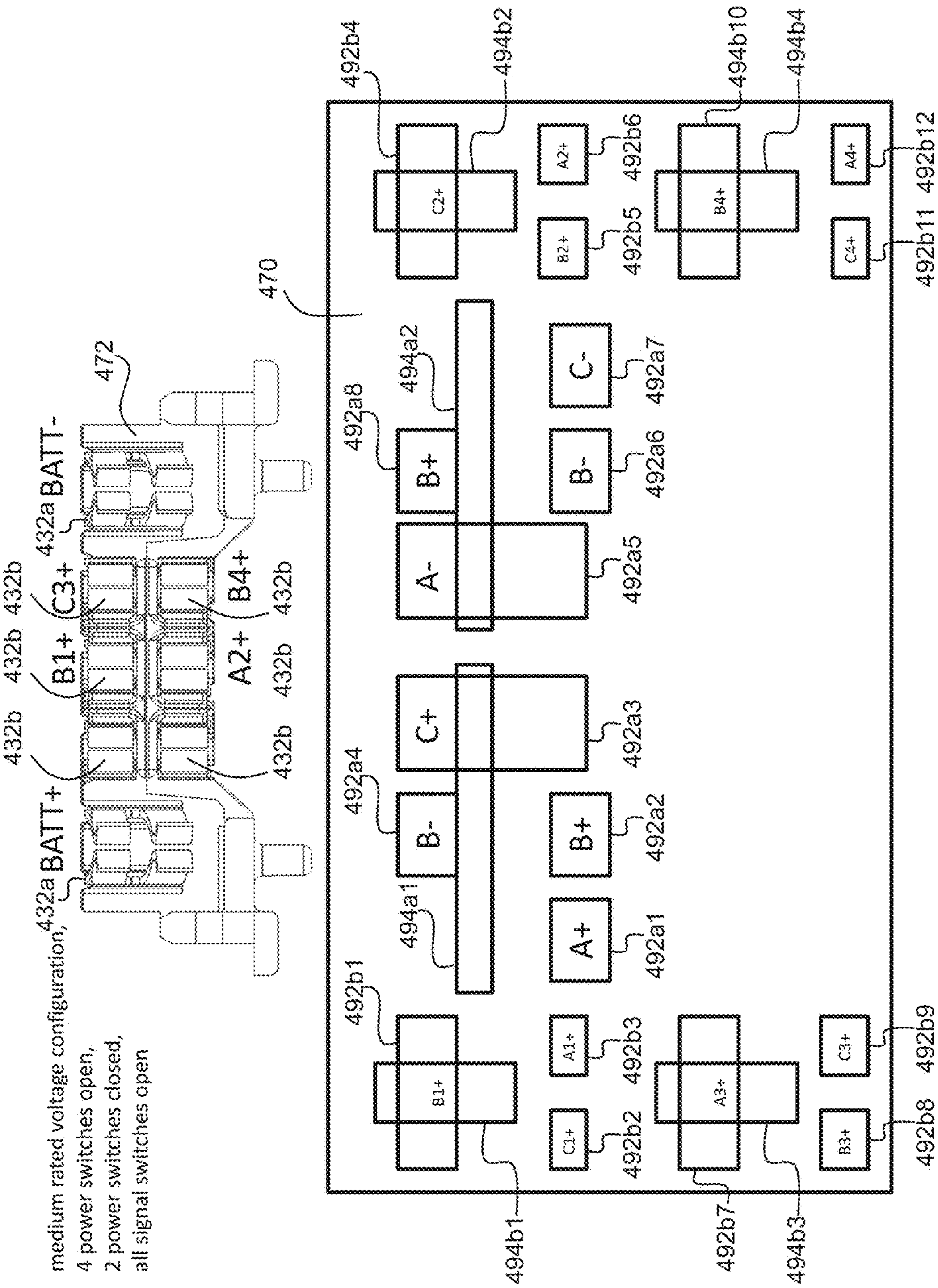

FIG. 46*e* illustrates the state of the converter element contacts 494 and the contact pads 492 when the converter element 452 is in the second position—the medium rated voltage configuration. In this configuration, the first power contact 494*a*1 is electrically coupled to the B−, C+ contact pads 492*a*4, 492*a*3 and the second power contact 494*a*2 is electrically coupled to the A−, B+ contact pads 492*a*5, 492*a*8. When the first and second power contacts 494*a*1, 494*a*2 are in this position, the converter switches S1, S2, S3, S4 are open and the converter switches S5, S6 are closed. This places the A subset of cells and the B subset of cells and the C subset of cells in series. Furthermore, the first signal contact 494*b*1 is electrically coupled only to the B1+ contact pad 492*b*1, the second signal contact 494*b*2 is electrically coupled only to the C2+ contacts pad 492*b*4, the third signal contact 494*b*3 is electrically coupled only to the A3+ contact pad 492*b*7 and the fourth signal contact 494*b*4 is electrically coupled only to the B4+ contact pad 492*b*10. When the first, second, third and fourth signal contacts 494*b*1, 494*b*2, 494*b*3, 494*b*4 are in this position, the converter switches S7-S14 are open. This disconnects corresponding cells 448 of the three subsets of cells 448 from each other. In other words, cells A1, B1, C1 are not connected to each other, cells A2, B2, C2 are not connected to each other, cells A3, B3, C3 are not connected to each other, cells A4, B4, C4 are not connected to each other, and cells A5, B5, C5 are not connected to each other.

In an exemplary embodiment, FIGS. 46*b*, 46*c*, and 46*d* illustrate the state of the switches 450 as the converter element 452 moves between the first position—the low rated voltage configuration—and the second position—the medium rated voltage configuration. Generally speaking, the switches 450 open and close unwanted voltages/currents may build up on and/or move between the cells. To address these unwanted voltages/currents, the battery may be placed in intermediate stages or phases. As such, the switches 450 may be opened and closed in a particular order. As illustrated in FIG. 46*b* and with reference to the exemplary table of FIG. 47, as the converter element 452 travels in the mating direction, initially the power contacts 494*a*1, 494*a*2 will disconnect from the contact pads 492*a*1, 492*a*2, 492*a*6, 492*a*7 but remain connected to contact pads 492*a*3, 492*a*5. This effectively opens all power switches S1-S6 while all of the signal switches S7-S14 remain closed. As illustrated in FIG. 46*c* and with reference to the exemplary table of FIG. 47, as the converter element 452 travels further in the mating direction, a first subset of signal contacts 494*b*1, 494*b*4 will disconnect from contact pads A1+, C1+, A4+, C4+. This in effect opens signal switches S7, S8, S13, S14. As illustrated in FIG. 46*d* and with reference to the exemplary table of FIG. 47, as the converter element 452 travels further in the mating direction, a second subset of signal contacts 494*b*2, 494*b*3 will disconnect from contact pads A2+, B2+, B3+, C3+. This in effect opens signal switches S9, S10, S11, S12. Of course, as the electrical device 10A2 disconnects from the convertible battery pack 20A4 in a direction opposite the mating direction—also referred to as the unmating direction—the converter element 452 will move from the second position to the first position and the converter element contacts 94 will connect and disconnect to the contact pads 492 in a reverse order described above. In addition, it is contemplated that the convertible battery pack 20A4 could be configured such that when the battery pack 20A4 is not mated with the electrical device 10A2 and the converter element 452 is in the first position the battery pack is in the medium rated voltage configuration and when the battery pack is mated with the electrical device the battery pack 20A4 is in the low rated voltage configuration. Of course, the various connections and switches would be adjusted accordingly.

The table illustrated in FIG. 47 shows the various stages of the switching network as the converter element travels between a first position and a second position. The first stage corresponds to the first position of the converter element ($1^{st}$/low rated voltage configuration) and the fifth stage corresponds to the second position of the converter element ($2^{nd}$/medium rated voltage configuration). The second, third and fourth stages are intermediate stages/phases and correspond to the open state configuration.

When the converter element 452 moves from the first position to the second position and switches 450 open and close, the voltages on the various terminal block terminals will change. More particularly, in the embodiment illustrated in FIG. 36 and in which the cells are 4V cells and the battery is fully charged, when the converter element 452 is in the first position BATT+=20V, BATT−=0V, B1+=4V, A2+=8V, C3+=12V, B4+=16V. When the converter is in the second position, BATT+=60V, BATT−=0V, B1+=24V, A2+=48V, C3+=12V, B4+=36V. Using the battery signal terminals, regardless of which nodes the terminal block signal terminals are connected to, the battery cells can be monitored for overcharge, overdischarge and imbalance. The particular configuration noted above and in the figures allows for even numbered groups of cells 448 to be monitored. Alternate exemplary embodiments may include other configurations for connecting the terminal block signal terminals to the nodes and are contemplated and encompassed by this disclosure.

In addition, in an alternate embodiment of the convertible battery pack 20A4 a battery configuration illustrated in FIG.

37 may be implemented. In such an embodiment, the set of contact pads 492 would not include the signal contact pads 492*b* and the converter element 452 would not include the set of signal contacts 94*b*.

FIGS. 48 and 49 illustrate an alternate exemplary embodiment of a convertible battery pack 20A4. Similar to the convertible battery pack 20A4 described above, the convertible battery pack 20A4 includes a housing 512. The housing 512 includes a top portion and a bottom portion. The housing 512 includes a power tool interface 516 for mechanically coupling with a corresponding battery pack interface 518 of an electrical device, for example, a power tool 10 or a battery charger 30. In the illustrated exemplary embodiment, the power tool interface includes a rail and groove system including a pair of rails 522 and a pair of grooves 524. Other types of interfaces are contemplated and encompassed by the present invention. The power tool interface 516 may also include a latching system 526 for fixing the convertible battery pack 20A4 to the electrical device 10.

The housing 512 also includes a plurality of slots 528 in a top portion 530 of the housing 512. The slots 528 may be positioned in other portions of the housing 512. The plurality of slots 528 forms a set of slots 528. The set of slots 528 includes a first subset of slots 528*a* and a second subset of slots 528*b*. The set of slots 528 corresponds to a plurality of battery terminals 532. The plurality of battery terminals 532 forms a set of battery terminals 532. The set of battery terminals includes a first subset of battery terminals 532*a* and a second subset of battery terminals 532*b*. The second subset of battery terminals 532*b* is also referred to as conversion terminals 532*b*. The plurality of slots 528 also correspond to a plurality of terminals 534 of the electrical device 10. The plurality of electrical device terminals 534 forms a set of electrical device terminals 534. The set of electrical device terminals 534 includes a first subset of electrical device terminals 534*a* and a second subset of electrical device terminals 534*b*. The first subset of electrical device terminals 534*a* is also referred to as power/signal terminals 534*a* and the second subset of electrical device terminals 534*b* is also referred to as converter terminals 534*b*. The electrical device terminals 534 are received by the battery terminal slots 528 and engage and mate with the battery terminals 532, as will be discussed in more detail below.

FIG. 37 illustrates an exemplary configuration of battery cells of the battery of this exemplary embodiment. The default cell configuration is the configuration of the battery cells when a converter element, described in greater detail below, is not inserted into the battery pack. In this exemplary embodiment, the default cell configuration is the configuration to the left of the horizontal arrows in FIG. 37. In alternate embodiments of the convertible battery packs, the default cell configuration could be the cell configuration to the right of the horizontal arrows. These examples are not intended to limit the possible cell configurations of the battery 546.

As illustrated in FIG. 37, an exemplary pack includes 15 cells. In this example, each cell 448 has a voltage of 4V and a capacity of 3 Ah. In the default configuration there are 3 subsets of 5 cells. The cells of each subset of cells are connected in series and the subsets of the cells are connected in parallel providing a battery voltage of 20V and a capacity of 9 Ah. In general, the battery may include N subsets of cells and M cells in each subset for a total of M×N cells in the battery. Each cell has a voltage of X volts and capacity of Y Ah. As such, the battery will have a default configuration in which the M cells of each subset are connected in series and the N subsets are connected in parallel. As such, the low rated voltage configuration provides a battery voltage of X×M Volts and a capacity of Y×N Amp-hours.

FIG. 48 illustrates the power tool interface 516. The power tool interface 516 includes the second subset of slots 528*b* for receiving the converter terminals 534*b*, discussed in more detail below. The second subset of slots 528*a* is positioned open to an end of the battery pack 110 that is coupled to the electrical device 10.

Figures 49A, 49B, 49C, 49D:
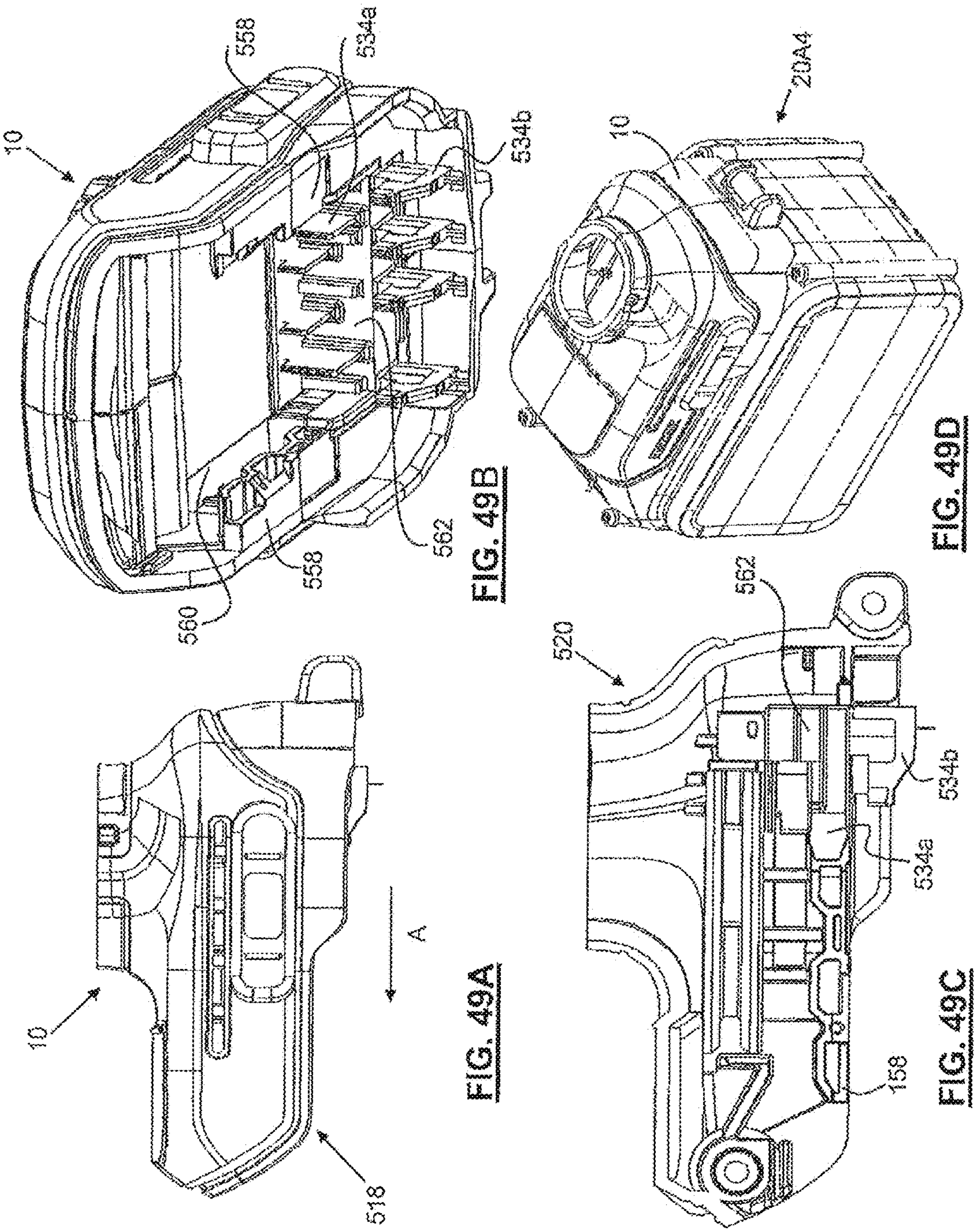

FIGS. 49*a*, 49*b*, and 49*c* illustrate a partial housing of an exemplary electrical device 10, in this instance a foot housing of a power tool of a medium rated voltage tool 10*a*2. The electrical device 10 includes an exemplary battery pack interface 518 that mates with the convertible battery pack 20A4. The battery pack interface 518 includes a pair of rails 558 and grooves 560 that mechanically mate with the power tool interface 516, described above. The battery pack interface 518 also includes a terminal block 562 and the electrical device terminals 534. As noted above, the set of electrical device terminals 534 includes the subset of power/signal terminals 534*a* and the subset of converter terminals 534*b*. FIG. 49*c* illustrates a section view the foot of the medium rated voltage tool 10A2 illustrating the battery pack interface 518 which includes the tool terminal block 562 which includes the plurality of tool terminals 534. FIG. 49*b* also illustrates the set of converter terminals 534*b*—also referred to collectively as a converter element 552. In this exemplary embodiment, the converter terminals 534*b* are positioned below the tool power/signal terminals 534*a*. The converter terminals 534*b* are held in the tool terminal block 562 and extend in the mating direction—arrow A. High rated voltage power tools and very high rated voltage power tools will include similar battery pack interfaces, tool terminal blocks and terminals.

In the illustrated exemplary embodiments, each convertible battery 546 includes a switching network. In this embodiment, the set of conversion terminals 532*b* is configured so as to serve as the switching network. Alternate exemplary embodiments may include other types of switches such as simple single pole, single throw switches, or other electromechanical, electrical, or electronic switches, and may be located in other parts of the battery pack or in the tool or a combination of both the tool and the battery pack as would be understood by one of ordinary skill in the art and are contemplated and encompassed by the present disclosure.

Referring to FIGS. 50*a*, 50*b*, 50*c*, an exemplary embodiment of a battery 546 of the exemplary embodiment of the convertible battery pack 20A4 is illustrated. This exemplary battery 546 has 15 cells 568. A cell holder 574 may maintain the cells 568 in a fixed cluster. Alternate exemplary embodiments of the battery may have a larger or a smaller number of cells 568. The cells 568 are physically configured such that a first subset of cells 568 are in a first plane, a second subset of cells 568 are in a second plane adjacent and parallel to the first plane and a third subset of cells 568 are in a third plane adjacent and parallel to the second plane. The cells 568 in a subset of cells 568 are positioned such that the positive terminal of one cell 568 is next to the negative terminal of an adjacent cell 568. For example, A5− is adjacent to A4+. The terminal of one cell 568 is connected to an adjacent cell 568 by a cell interconnect or strap 568. This is an exemplary physical configuration and other physical configurations are contemplated by the present disclosure.

The plurality of cells 568 has a first electrical connection configuration, as illustrated in FIG. 37*a*. This configuration is merely exemplary and other configurations are contemplated by this disclosure. The battery 546 includes a terminal block 572. The terminal block holds the plurality of battery terminals 532. The first subset of battery terminals 532*a* includes a pair of power terminals (BATT+ and BATT−) for providing power to or receiving power from a connected electrical device 10A2 and signal terminals 532*a* for providing battery information, including but not limited to cell information, to the electrical device. The BATT+ power terminal 532*a*1 is connected to node A+, which is the positive terminal of the first subset A of battery cells 568. The BATT− power terminal 532*a*2 is connected to node C−, which is the negative terminal of the third subset C of battery cells 568. The battery 546 may also include electrical connections—also referred to as cell taps—from one or more of the individual cell terminals to a PCB 170. These cell taps may connect to a controller, processor, or other electronic component on the PCB 170.

FIG. 51 illustrates an exemplary embodiment of the battery terminal block 572 and the plurality of battery terminals 532 of this exemplary convertible battery pack 546. The terminal block 572 includes a first portion 572*a* holding the first subset of terminals 532*a* and a second portion 572*b* holding the second subset of terminals 532*b*. In alternate embodiments, the terminal block may include a discrete terminal block for each subset of terminals. As noted above and with reference to FIG. 37, the first subset of terminals 532*a* includes a pair of power terminals 532*a*1, 532*a*2 and a plurality of signal terminals 532*a*3, 532*a*4, 532*a*5, 532*a*6, 532*a*7, 532*a*8. The first power terminal 532*a*1 is electrically coupled to node A+ and the second power terminal 532*a*2 is electrically coupled to node C−. A first signal terminal 532*a*3 is electrically coupled to node A1+, a second signal terminal 532*a*4 is electrically coupled to node A2+, a third signal terminal 532*a*5 is electrically coupled to node A3+ and a fourth signal terminal 532*a*6 is electrically coupled to node A4+.

The set of conversion terminals 532*b* includes a terminal that electrically couples to each of the terminals of each subset of cells. More specifically, a first A+ conversion terminal 532*b*1 couples to the node A+, a second B+ conversion terminal 532*b*2 couples to the node B+, a third C+ conversion terminal 532*b*3 couples to the node C+, a fourth A− conversion terminal 532*b*4 couples to the node A−, a fifth B− conversion terminal 532*b*5 couples to the node B− and a sixth C− conversion terminal 532*b*6 couples to the node C−. Each of the conversion terminals 532*b* includes a mating end that receives an electrical device converter terminal 534*b*, as described in more detail below.

In addition, as illustrated in FIG. 52, when the battery pack 20A4 is not mated to an electrical device 10 and in the low rated voltage configuration, the A+ conversion terminal 532*b*1 is electrically coupled to the B+ conversion terminal 532*b*1 and the C+ conversion terminal 532*b*3 at their mating ends. With reference to FIG. 37*a*, the connection between the A+ conversion terminal 532*b*1 and the B+ conversion terminal 532*b*2 acts as the closed switch S1 and the connection between the B+ conversion terminal 532*b*2 and the C+ conversion terminal 532*b*3—through the A+ conversion terminal 532*b*1—acts as the closed switch S2. Also, the C− conversion terminal 532*b*6 is electrically coupled to the B− conversion terminal 532*b*5 and the A− conversion terminal 532*b*4 at their mating ends. Again, with reference to FIG. 37*a*, the connection between A− conversion terminal 532*b*4 and the B− conversion terminal 532*b*5—through the C− conversion terminal 532*b*6—acts as the closed switch S3 and the connection between the B− conversion terminal 532*b*5 and the C− conversion terminal 532*b*6 acts as the closed switch S4. For each flat conversion terminal 532*b*1, 532*b*6, there is an associated backer spring 598 that forces the flat portion of the conversion terminal 532*b*1, 532*b* towards the tulip section of the associated conversion terminal 532*b*2, 532*b*3, 532*b*5, 532*b*4.

FIGS. 53*a*, 53*b*, 53*c* and 53*d* illustrate an exemplary embodiment of the electrical device terminal block 562 that is capable of converting the convertible battery pack 20A4 from the low rated voltage configuration to the medium rated voltage configuration. The electrical device terminal block 562 holds the plurality of electrical device terminals 534. In this exemplary embodiment, in which the electrical device is a power tool, the power tool would be rated at the medium rated voltage.

The electrical device terminal block 562 includes a first portion 578 that holds the first subset of electrical device terminals 534*a*, described above, and a second portion 580 that holds the second subset of electrical device terminals 534*b*—the converter terminals. The terminal block 562 also includes a support structure 582 for supporting a wiping/breaking feature of the converter terminal 534 described in more detail below.

FIGS. 54*a*, 54*b*, and 54*c* illustrate the electrical device terminals 534 without the terminal block 562 and the support structure 582. The converter terminals 534*b* include an inner converter terminal 534*b*1 and an outer converter terminal 534*b*2. The inner converter terminal 534*b*1 will mate with and electrically couple a pair of inner conversion terminals 532*b*3, 532*b*5 and the outer converter terminal 534*b*2 will mate with and electrically couple a pair of outer conversion terminals 532*b*2, 532*b*4. The converter terminals 534*b* include a wiping/breaking feature 584, a mating portion 586 and a jumper portion 588. The converter terminals 534*b* serve two purposes. First, they must break the connections of the first configuration between conversion terminals 532*b* and they must make alternate connections (jumps/shunts) between conversion terminals 532*b* to form the second configuration.

The wiping/breaking feature 584 serves the first purpose. The wiping/breaking feature 584 is at the forward end of the converter terminal 534 and is comprised of a non-conducting material. The wiping/breaking feature 584 may be a separate element from the converter terminal 532 and the terminal block 562 or may be part of the terminal block 562 or may be part of the converter terminal 534. A wiping portion 590 of the wiping/breaking feature 584 will separate the tulip sections 592 of the conversion terminals 532*b* such that they wipe across a contact portion 594 of an associated conversion terminal 532*b*. This action will be described in more detail below. A breaking portion 596 of the wiping/breaking feature 584 includes a ramp that will force the associated conversion terminal 532 to separate from the tulip sections 592 of the conversion terminal 532 to which it is electrically coupled.

The mating portion 586 is comprised of an electrically conductive material and will electrically couple to the tulip section 592 of the conversion terminal 532 with which it is mating. The jumper portion 588 electrically couples two mating sections 586 to effectively connect the conversion terminals 532 that mate with the particular converter terminal 534. For example, the jumper portion 588 of the inner converter terminal 534*b*1 will electrically couple the C+ conversion terminal 532*b*3 and the B− conversion terminal 532*b*5 and the jumper portion of the outer converter terminal 534*b*2 will electrically couple the B+ conversion terminal 532*b*2 and the A− conversion terminal 532*b*4.

Figure 55A:
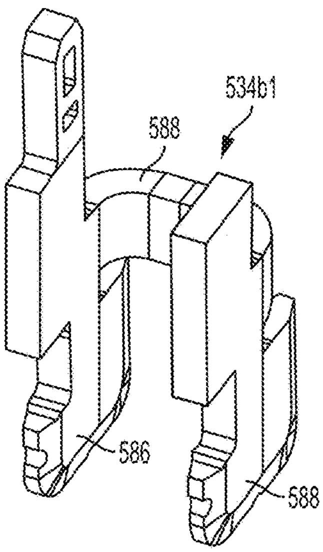
Figure 55B:
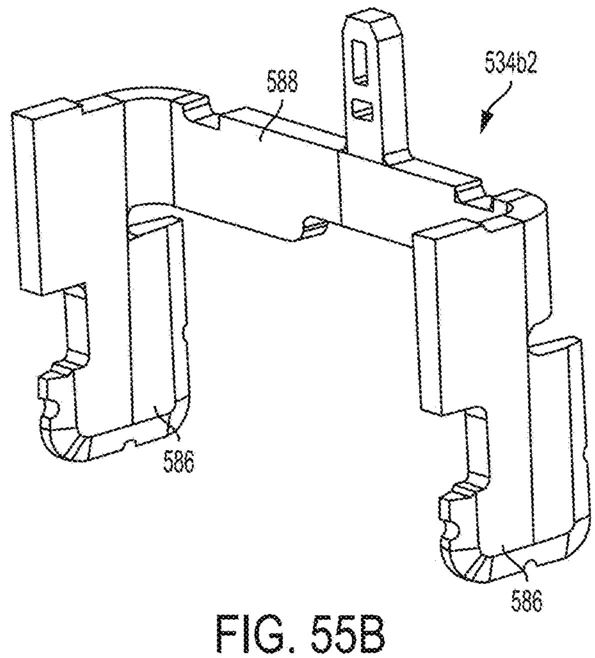
Figure 55C:
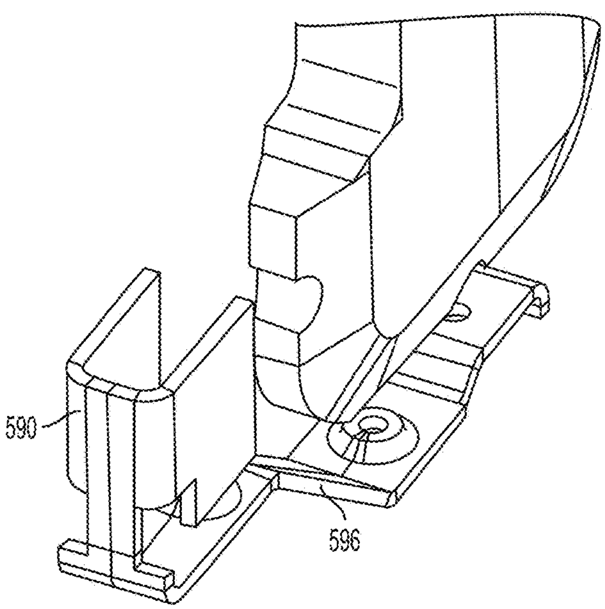
Figure 55D:
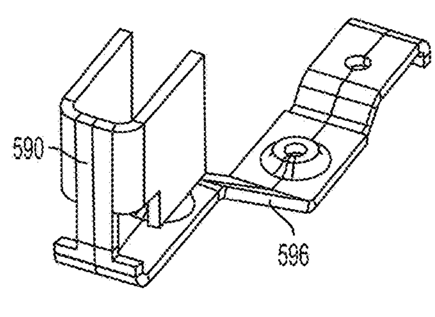

FIGS. 55*a*, 55*b*, and 55*c* illustrate the two different converter terminals and wiping/breaking feature in more detail.

FIGS. 56-58 illustrate the mating process of the battery conversion terminal 532*b* and the electrical device converter terminal 534*b*. Specifically, FIGS. 56*a* and 56*b* illustrate a first mating phase when the converter terminal 534*b* first engages the conversion terminal 532*b*—for example, converter terminal 534*b*1 engages conversion terminal 532*b*3. In this phase of the mating, the wiping portion 590 of a converter terminal 534*b*—for example, converter terminal 534*b*2—engages the tulip section 592 of an associated conversion terminal 532*b*—for example, conversion terminal 532*b*2. As the wiping portion 590 engages the conversion terminal 532*b*, the tulip section 592 is spread apart and a lower section of the tulip section 592, which may be curved, slides or wipes across the flat, contact portion 594 of the associated conversion terminal 532*b*, for example the A+ conversion terminal 532*b*1. In this phase the tulip section 592 of the conversion terminal 532*b* is still electrically coupled to the associated conversion terminal 532*b* and therefore the associated switch is still closed—in the case of the B+ conversion terminal 532*b*2 and the A+ conversion terminal 532*b*1 this would be the switch S1. The same is true for all of the conversion terminals 532*b* during this phase. Specifically, the C+ conversion terminal 532*b*3 wipes across another contact portion 594 of the A+ conversion terminal 532*b*1, the B− conversion terminal 532*b*5 wipes across a contact portion 594 of the C− conversion terminal 532*b*6 and the A− conversion terminal 532*b*4 wipes across another contact portion 594 of the C− conversion terminal 532*b*6.

FIGS. 57*a* and 57*b* illustrate a second mating phase when the converter terminal 534 progresses past the wiping phase. In this phase of the mating, a ramp feature of the breaking portion 596 of the wiping/breaking feature 584 engages the wiping section 590 of the associated conversion terminal 532, for example the A+ conversion terminal 532*b*1 and thereby separates the tulip section 592 of the conversion terminal 532, for example the B+ conversion terminal 532*b*2, from the associated conversion terminal 532, in this example, the A+ conversion terminal 532*b*1. At the same time, the tulip section 592 of the B+ conversion terminal 532*b*2 is moving across an insulating portion 200 of the breaking portion 596. As noted in FIG. 57*b*, on the battery side of a dashed line is the insulating portion 200 and on the device side of the dashed line is a conductive or mating portion of the converter terminal 534*b*. In this phase, when the B+ conversion terminal 532*b*2 and the C+ conversion terminal 532*b*3 separate from the A+ conversion terminal 532*b*1, switches S1 and S2 open and when the A− conversion terminal 532*b*4 and the B− conversion terminal 532*b*5 separate from the C− conversion terminal 532*b*6 switches S3 and S4 open. In this phase the battery 546 is in an open state configuration.

By including an open state configuration, the battery avoids placing the cells in a shorted condition. Placing the cells in the shorted condition could have serious, deleterious effects on the battery. For example, if all or some of the cells are placed in the shorted condition, a large amount of discharge could occur.

FIGS. 58*a* and 58*b* illustrate a third mating phase when the converter terminal 534*b* progresses past the breaking phase and into the jumping phase. In this phase of the mating, the mating portion 586 of the converter terminal 534*b* engages the tulip section 592 of the conversion terminal 532*b*. As this occurs, one of the conversion terminals 532*b* is connected to another of the conversion terminals 532*b* through the jumper portion 588 of the converter terminal 534*b*. This acts to close the series switches. In the illustrated exemplary embodiment, the B+ conversion terminal 532*b*2 is connected to the A− conversion terminal 532*b*4 through the outer converter terminal 534*b*2 and the associated jumper portion 588 and the C+ conversion terminal 532*b*3 is connected to the B− conversion terminal 532*b*5 through the inner converter terminal 534*b*1 and the associated jumper portion 588. This phase closes switches S5 and S6.

Once the electrical device and the battery pack are fully mated and the third mating phase is complete, the cells will be configured in a series, medium rated voltage configuration as illustrated in FIG. 37*b*.

FIGS. 59-67 illustrate another alternate embodiment of a convertible battery pack 20A4. This embodiment is similar to the previous embodiment of FIGS. 50-58. A difference between the two embodiments is the battery terminals 632, particularly the conversion terminals 632*b*, and the electrical device terminal 634, particular the converter terminals 634*b*. As illustrated in FIG. 37 and FIG. 59, the battery cell physical and electrical configuration is the same as the previous embodiment and will not be described again.

As illustrated in FIG. 60, the battery terminal block 672 is similar to the previous embodiment and will not be described again. Furthermore, the first subset of battery terminals 632*a*—which include the power terminals and the signal terminals—is the same as the previous embodiment and will not be described again. As illustrated in FIGS. 60 and 61, the second subset of battery terminals 632*b*—which include the conversion terminals—are different than the previous embodiment and will be described in detail.

As illustrated in FIG. 61, the set of conversion terminals 632*b* include a terminal electrically coupled to the positive terminal of each subset of cells and a terminal electrically coupled to the negative terminal of each subset of cells. Specifically, a first A+ conversion terminal 632*b*1 couples to the node A+, a second B+ conversion terminal 632*b*2 couples to the node B+, a third C+ conversion terminal 632*b*3 couples to the node C+, a fourth A− conversion terminal 632*b*4 couples to the node A−, a fifth B− conversion terminal 632*b*5 couples to the node B− and a sixth C− conversion terminal 632*b*6 couples to the node C−. As illustrated in FIG. 28, the conversion terminals 632*b* include three types of terminals: a full terminal 632*b*3, 632*b*5, a partial terminal 632*b*1, 632*b*6 and an assembly terminal 632*b*2, 632*b*4. The full terminals 632*b*3, 632*b*5 include a single terminal element and extend from beyond the battery side of the terminal block 672 to beyond the device side of the terminal block 672. The partial terminals 632*b*1, 632*b*6 extend from beyond the battery side of the terminal block 672 only to an interior location of the terminal block 672. The assembly terminals 632*b*2, 632*b*4 include a first assembly terminal element 680 that extends from beyond the battery side of the terminal block 672 to an interior location of the terminal block 672, a second assembly terminal element 682 that extends from an interior location of the terminal block 672 to beyond the device side of the terminal block 672, a third assembly terminal element 684 that extends from an interior location of the terminal block 672 to beyond the device side of the terminal block 672 and a spring element 686 positioned between the second assembly terminal element 682 and the third assembly terminal element 684. The assembly terminal 632*b*2, 632*b*4 forms a spring and fulcrum design, described in more detail below. This terminal configuration is merely exemplary and other terminal configurations and connections schemes are contemplated and encompassed by the present disclosure.

This exemplary conversion terminal configuration utilizes a spring and fulcrum design. The second and third assembly terminal elements 682, 684 are also referred to as levers 682*a*, 682*b*, 684*a*, 684*b*. Each of the levers 682, 684 include a mating end 688 and a connection end 690. In the first terminal configuration—the low rated voltage configuration, the mating end 688 of one lever 682*a* is electrically coupled to the mating end 688 of the other lever 684*a*. The terminal configuration also includes a fulcrum 692 for each lever 682, 684. The end of the first assembly terminal element at the interior location of the terminal block serves as the fulcrum 692 for the second assembly terminal element 682 and a discrete fulcrum is formed in the terminal block to serves as the fulcrum 692 for the third assembly terminal element 684. The spring element 686 may be, for example a compression spring. The compression spring 686 keeps the connection ends 690 of each lever 682, 684 in contact with an associated full terminal 674 or partial terminal 676, as is described in more detail below.

In its first state—the low voltage configuration in this exemplary embodiment—the A+ conversion terminal 632*b*1 is electrically coupled to the B+ conversion terminal 632*b*2 through an associated first lever 682*a*. This forms the power switch S1. In addition, the B+ conversion terminal 632*b*2 is electrically coupled to the C+ conversion terminal 632*b*3 through the associated first lever 682*a* and an associated second lever 684*a*. This forms the power switch S2. In addition, the A− conversion terminal 632*b*4 is electrically coupled to the B− conversion terminal 632*b*5 through an associated first lever 682*b* and an associated second lever 684*b*. This forms the power switch S3. In addition, the B− conversion terminal 632*b*5 is electrically coupled to the C− conversion terminal 632*b*6 through the associated first lever 682*b* and the associated second lever 684*b*. This forms the power switch S4.

FIGS. 62-64 illustrate the electrical device terminal block 662 and the electrical device terminals 634. The device terminal block 662 is similar to the terminal block 562 in the previous embodiment and will not be described again. The device power and signal terminals 634*a* are similar to the power and signal terminals 634*a* of the previous embodiment and will not be described again. The converter terminals 634*b* include a breaking feature 694, a mating section 696 and a jumper section 698. The converter terminals 634*b* include an inner terminal 634*b*1 and an outer terminal 634*b*2.

FIG. 65 illustrates the conversion terminals 632*b* in a first configuration—in this instance in the low rated voltage configuration and the converter terminals 634*b* just prior to mating with the conversion terminals 632*b*. In this configuration, the A+ conversion terminal 632*b*1 is electrically coupled to the B+ conversion terminal 632*b*2 and the B+ conversion terminal 632*b*2 is electrically coupled to the C+ conversion terminal 632*b*3. As such, power switches S1 and S2 are in a closed state. In addition, the A− conversion terminal 632*b*4 is electrically coupled to the B− conversion terminal 632*b*5 and the B− conversion terminal 632*b*5 is electrically coupled to the C− conversion terminal 632*b*6. As such, the power switches S3 and S4 are in a closed state. Furthermore, the power switches S5 and S6 are effectively in an open state. In this configuration, the A, B, C subsets of cells 648 are electrically coupled in parallel.

As illustrated in FIG. 66, in a first mating phase the converter terminals 634*b*2 move in the mating direction (arrow A) and first engage the levers 682, 684 and break the connections between the conversion terminals 632*b*. Specifically, when the breaking feature 694—which is electrically isolated from the mating section and may be an insulating material or a conductive material—on the outer converter terminals 634*b*2 engages the levers 682, 684, the mating ends 688 of the levers 682, 684 are forced apart. As the mating ends 688 are forced apart the fulcrums 692 associated with each lever 682, 684 enable the connection ends 690 of the levers 682, 684 to move towards each other against the force of the compression spring 686. As the connection ends 690 of the levers 682, 684 move towards each other the electrical connection between the connection ends 690 of the levers 682, 684 and the partial conversion terminals 632*b*1, 632*b*6 and full conversion terminals 632*b*3*m* 632*b*5 is broken. Specifically, when the breaking feature 294*a* of the outer converter terminal 634*b*2 engages the first pair of levers 682*a*, 684*a* the connection between the connection end 690 of the first lever 682*a* separates from the A+ conversion terminal 632*b*1 and the connection end 690 of the second lever 684*a* separates from the C+ conversion terminal 632*b*3. This acts to open power switches S1 and S2. Also, when the breaking feature 694*b* of the outer converting terminal 634*b*2 engages the second pair of levers 682*b*, 684*b* the connection between the connection end 690 of the third lever 682*b* separates from the C− conversion terminal 632*b*6 and the fourth lever 684*b* separates from the B− conversion terminal 632*b*5. This acts to open power switches S3 and S4. In this phase the battery is in an open state configuration.

As illustrated in FIG. 67, in a second mating phase the converter terminals 634*b* continue to move in the matting direction (arrow A) and further engage the levers 682, 684 until the electrically conductive mating section 296 of the outer converter terminal 634*b*2 engages the mating end 688 of the levers 682, 684 and the electrically conductive mating section 296 of the inner converter terminal 634*b*1 engages the mating end 674 of the full terminals 632*b*3, 632*b*5. In this phase, the two assembly terminals 632*b*2, 632*b*4 are electrically connected and the two full terminals 632*b*3, 632*b*5 are electrically connected. In other words, the A− conversion terminal 632*b*4 is electrically connected to the B+ conversion terminal 632*b*2 and the B-conversion terminal 632*b*5 is electrically connected to the C+ conversion terminal 632*b*3. This acts to close the power switches S5 and S6. This places the A, B, C subsets of cells in series and the battery in the medium rated voltage configuration.

The previously described configurations of the battery cells residing in the battery pack housing may be changed back and forth from a first cell configuration which places the battery in a first battery configuration to a second cell configuration which places the battery in a second battery configuration. In the first battery configuration the battery is a low rated voltage/high capacity battery and in the second battery configuration the battery is a medium rated voltage/low capacity battery. In other words, the convertible battery pack is capable of having multiple rated voltages, for example a low rated voltage and a medium rated voltage. As noted above, low and medium are relative terms and are not intended to limit the convertible battery pack to specific voltages. The intent is simply to indicate that the convertible battery pack is able to operate with a first power tool having a low rated voltage and a second power tool have a medium rated voltage, where medium is simply greater than low. In addition, a plurality of the convertible battery packs are able to operate with a third power tool having a high rated voltage—a high rated voltage simply being a rated voltage greater than a medium rated voltage.

FIG. 68 illustrates another exemplary embodiment of a convertible battery pack 20A4. The convertible battery pack 20A4 includes a housing 712. The convertible battery pack 20A4 may include a variety of alternate configurations for creating the battery pack housing 712 for example, a top portion 714 and a bottom portion 716 coupled together to form the battery pack housing 712 or two side portions 713 coupled with a top portion 715 to form the battery pack housing 712. Regardless of the structure, the battery pack housing 712 will form an interior cavity 718. Other configurations for forming the battery pack housing 712 are contemplated and encompassed by the present disclosure. The battery pack housing 712 includes an electrical device interface 720 for mechanically coupling with a corresponding battery pack interface 722 of an electrical device, for example, a power tool 10 or a battery charger 30. In the illustrated exemplary embodiment, the electrical device interface 720 includes a rail and groove system including a pair of rails 724 and a pair of grooves 726. Other types of interfaces are contemplated and encompassed by the present disclosure. The electrical device interface 720 may also include a latching system 728 for affixing the convertible battery pack 20A4 to the electrical device 10/30.

The battery pack housing 712 also includes a plurality of slots 730 in the top portion 714 of the battery pack housing 712. The slots 730 may be positioned in other portions of the battery pack housing 712. The plurality of slots 730 forms a set of slots 730. The plurality of slots 730 corresponds to a plurality of battery terminals 732. The plurality of battery terminals 732 forms a set of battery terminals 732. The plurality of slots 730 also corresponds to a plurality of terminals 734 of the electrical device. The plurality of electrical device terminals 734 forms a set of electrical device terminals 734. The electrical device terminals 734 are received by the battery terminal slots 730 and engage and mate with the battery terminals 732, as will be discussed in more detail below.

Conventional battery packs and electrical devices include power terminals and signal terminals. The power terminals transfer power level voltage and current between the battery pack and the electrical device. These levels may range from about 9V to about 240V and 100 mA to 200 A, depending upon the device and the application. These terminals are typically referred to as the B+ and B− terminals. In addition, these terminals are typically of a higher conductivity grade material to handle the power (W) requirements associated with the aforementioned voltage and current levels. The signal terminals transfer signal level voltage and current between the battery pack and the electrical device. These levels are typically in the range of 0V to 30V and OA to 10 mA, depending upon the device and the application. These terminals may be of a lower conductivity grade material as they do not require handling high power (W) levels.

In this embodiment of the present invention, the battery pack housing 712 also includes a pair of conversion slots or raceways 736 extending along the top portion 714 of the battery pack housing 712 on opposing sides of the battery terminal slots 730. In the illustrated exemplary embodiment, the raceways 736 extend from a forward (in the orientation illustrated in FIG. 1) edge or surface 738 of the battery pack housing 712 to a central portion 740 of the top portion 714 of the battery pack housing 712. Each raceway 736 ends at a through hole 742 in the top portion 714 of the battery pack housing 712. The through holes 742 extend from an exterior surface of the battery pack housing 712 to the interior cavity 718. In the illustrated embodiment, the through holes 742 are positioned in front of the rails 724 of the power tool interface and adjacent to the battery pack housing slots 730. The conversion slots 730 and through holes 742 may be positioned in other portions of the battery pack housing 712. Alternate embodiments may include more or less conversion slots 730.

FIGS. 69, 70, and 71 illustrate an exemplary battery pack interface 722, in this instance that of a power tool 10, that mates with the convertible battery pack 20A4. The battery pack interface 722 includes a pair of rails and grooves that mechanically mate with the power tool interface, described above. The battery pack interface 722 also includes an electrical device terminal block 723. The electrical device terminal block 723 holds the electrical device terminals 734. The battery pack interface 722 also includes a pair of conversion elements or projections 746. Alternate exemplary embodiments of the electrical device may include more or less conversion elements 746 and are contemplated and encompassed by the present disclosure. In the exemplary embodiment, the conversion elements 746 may be simple projections or protrusions that may extend down from the battery pack interface 722. The conversion elements 746 are sized and positioned to be received in corresponding battery pack conversion slots 730. The convertible battery pack 20A4 includes a converter element 750. The converter element includes a pair of converter element projections 748 extending from the converter element 750. As the battery pack interface 722 slides into mating engagement with the electrical device interface 720 in a mating direction—as indicated by arrow A—the conversion elements 746 are received in and slide along corresponding conversion slots 730. At a certain point in the mating process, as described in more detail below, the conversion projections 746 will engage the converter element projections 748. As the mating process continues in the mating direction, the conversion elements 746 will force the converter element projections 748, and consequently the entire converter element 750, to move or slide in the mating direction.

As illustrated in FIGS. 72-74, the exemplary embodiment of the battery 752 includes the plurality of battery cells 754. The battery 752 also includes a plurality of cell interconnects 756, such as straps or wires, electrically connecting a cell terminal 758 of one cell to a cell terminal 758 of another cell and/or providing an electrical coupler for connecting a terminal of a cell to a main printed circuit board (PCB) 760 or to a flexible printed circuit which in turn connects to a PCB or to some other type of support board 761 housing electrical connections. Also illustrated is the latch system for coupling to the electrical device(s). The battery 752 also includes a terminal block 762 and the battery terminals 732. At one end, the battery terminals 732 are configured to electrically couple to the electrical device terminals 734 and at another end the battery terminals 732 are electrically coupled to the battery cells 754, as described in more detail below, in part by a connector such as a ribbon cable 763.

FIGS. 75*a* and 75*b* illustrate side views of the exemplary convertible battery 20A4. The particular cell placement within a cell holder 764 allows for easy strap connections to allow the positive and negative terminals of the cells at the most negative and most positive positions of the string of cells in the subsets of cells to be placed closest to the PCB 760 and the support board 761 which allows for easy connections between the positive and negative terminals of the subsets of cells to the PCB 760 and the support board 761. Specifically, as illustrated in FIG. 75*a*, terminals A1− (which corresponds to the A− terminal of the A string of cells), B1− (which corresponds to the B− terminal of the B string of cells), and C1− (which corresponds to the C− terminal of the C string of cells) are physically positioned in the cell holder 764 at or near the PCB 760 or the support board 761. With regard to terminals A1−, B1−, and C1− these terminals are at the top of the cluster and the associated straps can be very short and direct to the PCB 760 or the support board 761. As illustrated in FIG. 75*b*, terminals A5+(which corresponds to the A+ terminal of the A string of cells), B5+(which corresponds to the B+ terminal of the B string of cells), and C1+(which corresponds to the C+ terminal of the C string of cells) are physically positioned in the cell holder 764 at or near the PCB 760 and the support board 761. With regard to terminals B5+ and C5+, these terminals are at the top of the cluster and the associated straps can be very short and direct to the PCB 760 or the support board 761. With regard to A5+, this terminal is close to the top of the cluster and the associated strap runs past a single cell terminal 758 (A1+) and connects to the PCB 760 or the support board 761. With this configuration, the connections between these battery cell terminals 758 and a set of contact pads 766 can be made more easily than in other configurations. Conventional cell layouts place the cells that are in a discrete string of cells in a single plane (typically in a horizontal plane when the pack is places on a horizontal surface) and adjacent strings of cells are next to each other along a generally vertical direction. The cell layout of the present disclosure is unconventional in that the cells of a discrete string of cells in a generally vertical grouping and adjacent strings of cell are next to each other along a generally horizontal direction.

The manner in which the battery 752 converts from the low rated voltage configuration to the medium rated voltage configuration will be described in more detail below. It should be understood that the terms “low” and “medium” are simply intended to be relative terms in that the low rated voltage configuration has a rated voltage less than the medium rated voltage configuration and the medium rated voltage configuration has a rated voltage greater than the low rated voltage configuration.

FIGS. 76*a* and 76*b* illustrate a simplified circuit diagram of an exemplary battery 752 of the exemplary embodiment of the convertible battery pack 20A4.

In the present invention, the convertible battery pack 20A4 is convertible between the low rated voltage configuration and the medium rated voltage configuration. Solely for purposes of example, the low rated voltage may be 20 Volts and the medium rated voltage may be 60 Volts. Other voltages are contemplated and encompassed by the present disclosure. As illustrated in FIG. 76*a*, the battery 752 includes three strings of cells—an A string, a B string and a C string—each string including 5 battery cells 754. Other exemplary, alternate embodiments may include fewer or more strings and/or fewer or more cells per string. Each string of cells includes a positive terminal, e.g., A+, B+, C+ and a negative terminal, e.g., A−, B−, C−. Each cell is denoted by the string and its position in the string, e.g., $C_{A1}$ is the first cell in the A string when moving from negative to positive in the string and C5 is the fifth cell in the C string when moving from negative to positive. This denotation is merely exemplary and other denotations may be used to the same effect. A battery cell node (or simply cell node) between adjacent cells is denoted by the string and its position in the string, e.g., A2 is a cell node in the A string between cell $C_{A2}$ and cell $C_{A3}$. And B3 is a cell node in the B string between cell $C_{B3}$ and cell $C_{B4}$. The battery 752 also includes a plurality of switches—also referred to as a switching network. The plurality of switches may be mechanical switches, electronic switches or electromechanical switches or any combination thereof. The battery 752 also includes connections for transferring power through terminals that are typically signal terminals. These special terminals and/or the connections to these special terminals are denoted by the blocks labeled BT1 and BT3 in the schematic of FIGS. 76*a* and 76*b*. These connections and terminals will be described in more detail below.

When the convertible battery pack 20A4 is in the low rated voltage state—not connected to any electrical device or connected to a low rated voltage electrical device, switches SW1, SW2, SW3 and SW4 are in a closed state and switches SW5, SW6 and SW7 are in an opened state. When the convertible battery pack 20A4 is in the medium rated voltage state—connected to a medium rated voltage electrical device, switches SW1, SW2, SW3 and SW4 are in an opened state and switches SW5, SW6 and SW7 are in a closed state. The medium rated voltage electrical device 10A2 will also include a second set of terminals (or a subset of the electrical device terminals 734) 734*b* for transferring power in addition to a first set of conventional terminals (or a subset of the electrical device terminals 734) 734*a* that are configured for transferring power from the convertible battery pack 20A4 to the power load of the electrical device. The conventional electrical device power terminals are typically referred to a TOOL+ and TOOL− terminals and couple to the battery power terminals that are typically referred to as BATT+ and BATT− terminals, respectively. The second set of tool power terminals and/or the connections to the second set of power tool terminals are denoted by the blocks labeled TT1 and TT3 and the connection between these blocks may be a simple electrical connection such as a conductive wire. These switches and the special terminals will be discussed in more detail below.

As illustrated in FIGS. 77-85, a converting subsystem 772 makes and breaks connections between the cell string terminals to effectively open and close the switches SW1-SW7 illustrated in FIGS. 76*a* and 76*b* and described above. The converting subsystem 772 includes a converting mechanism cover 765 and the converter element 750. FIGS. 77-79 illustrate an exemplary embodiment of the converter element 750—also referred to as a conversion card, a slider or a slider card—of the exemplary embodiment of the convertible battery pack 20A4 of FIGS. 68-71.

The converter element 750 includes a support structure, board or housing 774. The support structure 774 may be of a plastic material or any other material that will serve the functions described below. In the illustrated exemplary embodiment the converter element support structure is in the shape of a U. More specifically, the converter element support structure includes two parallel legs 776 and a crossbar 778 connecting the parallel legs 776. The converter element 750 may take other shapes. The converter element 750 includes a pair of projections 780. The converter element projections 748 extend from a top surface 782 of the converter element support structure. One of the projections may extend from a surface of each of the parallel legs 776. The converter element 750 may include more or less projections. Each projection extends through one of the through holes 742 and into the associated raceway 736. When the converter element 750 is in a first position, as illustrated in FIG. 77*a* and described below, the projections are positioned at a first end of the corresponding through hole. When the converter element 750 is in a second position, as illustrated in FIG. 77*b* and described below, the projections are positioned at a second end of the corresponding through hole.

The converter element 750 also includes a plurality of switching contacts (SC) 784. The plurality of switching contacts 784 forms a set of switching contacts 784. In the illustrated exemplary embodiment of the converter element 750, the set of contacts is power contacts in that they will transfer relatively high power currents. The support structure also includes a bottom surface. The set of power contacts extend from the bottom surface of the cross bar.

The converting subsystem 772 also includes a pair of compression springs 786. Alternate exemplary embodiments may include more or less springs 786, other types of springs and/or springs positioned in different locations and are contemplated and encompassed by the present disclosure. Each parallel leg includes a spring connection projection 788. A first end of each compression spring is attached to a corresponding spring connection projection 788. A second end of each compression spring is coupled to the support board. The compression springs 786 are configured to force the converter element 750 into the first position, as illustrated in FIG. 77*a*. As the electrical device 10A2/10A3/10B mates with the convertible battery pack 20A4 in the mating direction and the electrical device conversion elements 746 engage the converter element projections 748, the converter element 750 is moved from its first position (illustrated in FIG. 77*a*) and forced to act against the springs 786 thereby compressing the springs 786. When the electrical device 10A2/10A3/10B is fully mated with the convertible battery pack 20A4, the converter element 750 will have moved from the first position to the second position and the springs 786 will be at their full compression (illustrated in FIG. 77*b*). When the electrical device 10A2/10A3/10B is detached from the convertible battery pack 20A4, the springs 786 force the converter element 750 to move from the second position (illustrated in FIG. 77*b*) to the first position (illustrated in FIG. 77*a*). The battery 752 may also include, for example, the PCB 760 and/or some other type of insulating support board between the conversion subsystem and the cells and/or adjacent to the conversion subsystem, as described in more detail below.

Figure 79B:
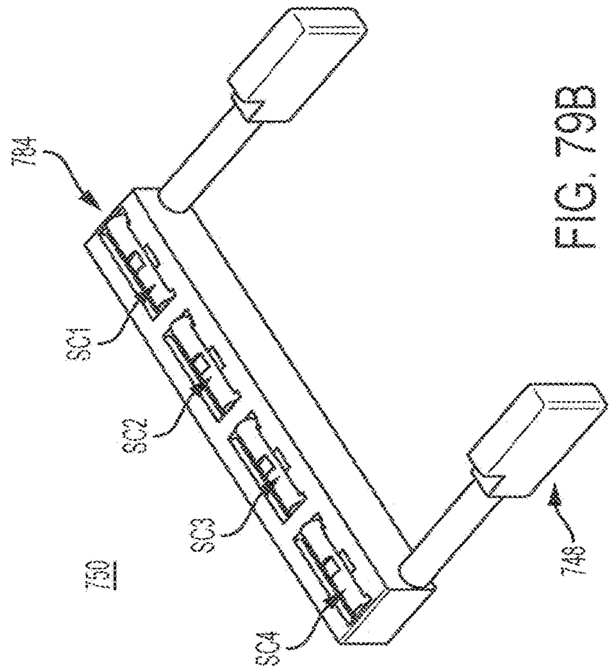
Figure 79E:
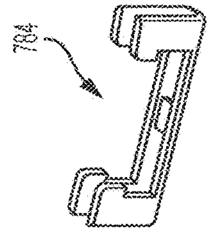
Figure 79D:
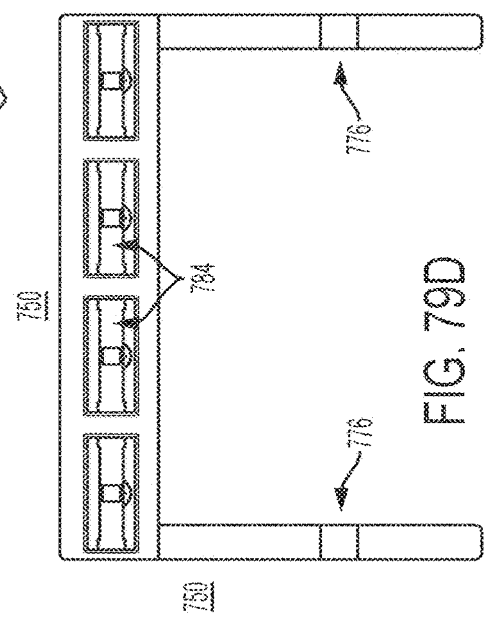
Figure 79A:
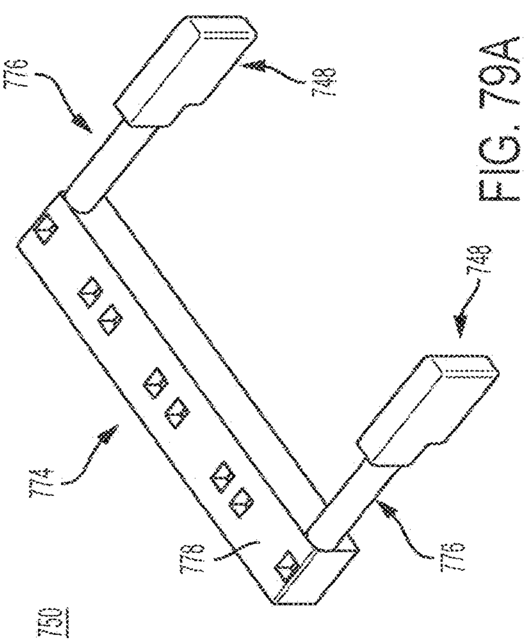
Figure 79C:
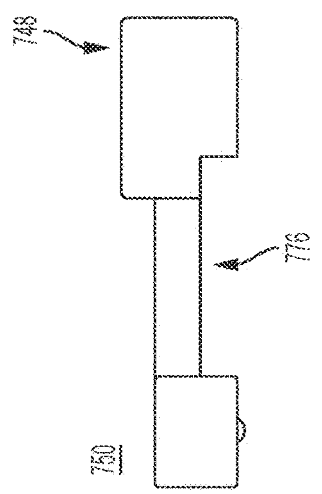
Figure 80A:
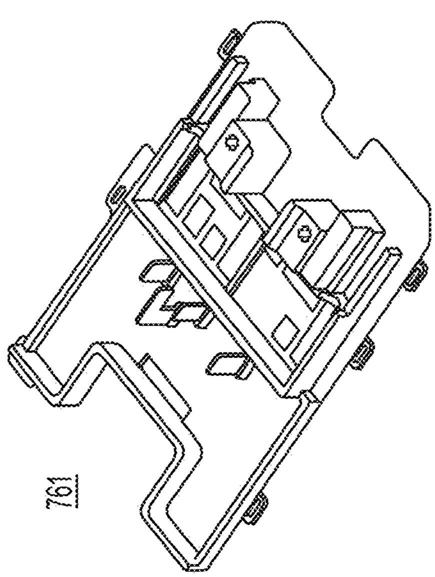
Figure 80B:
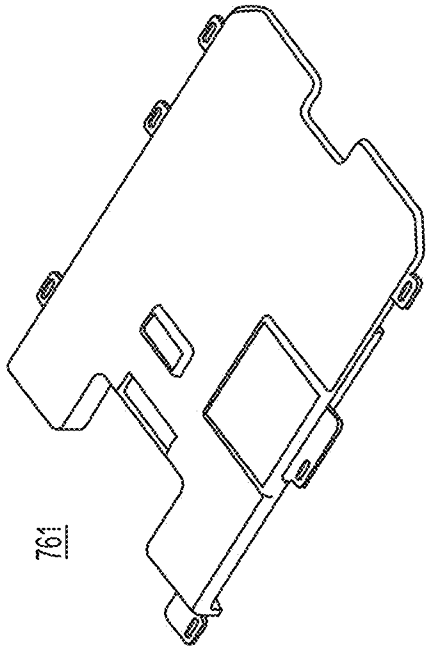
Figure 80C:
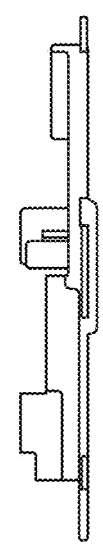
Figure 80D:
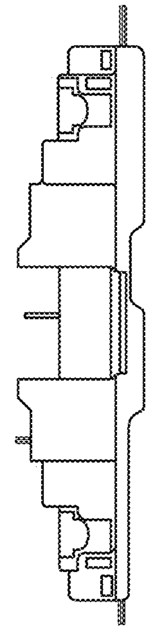
Figure 81A:
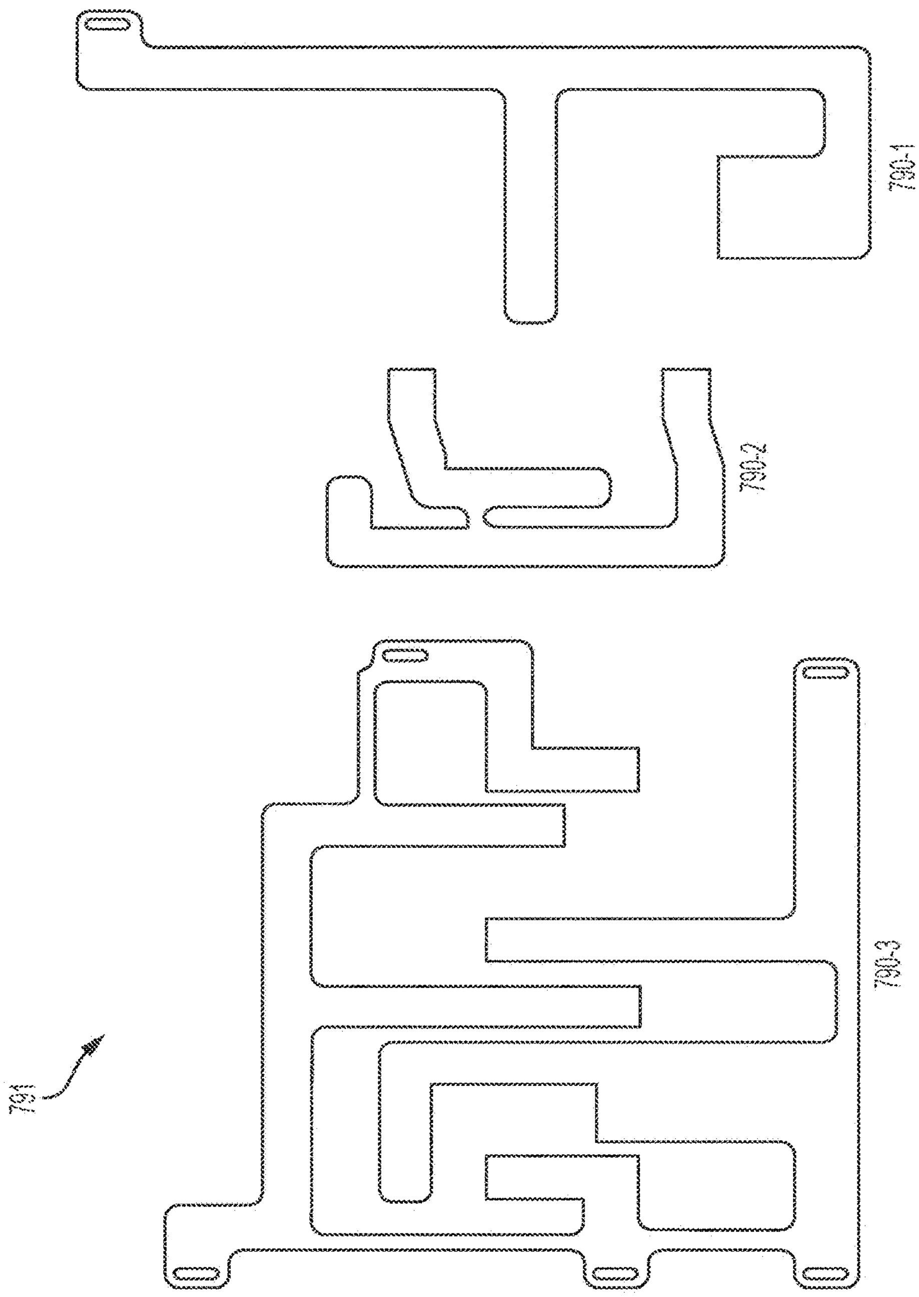
Figure 81B:
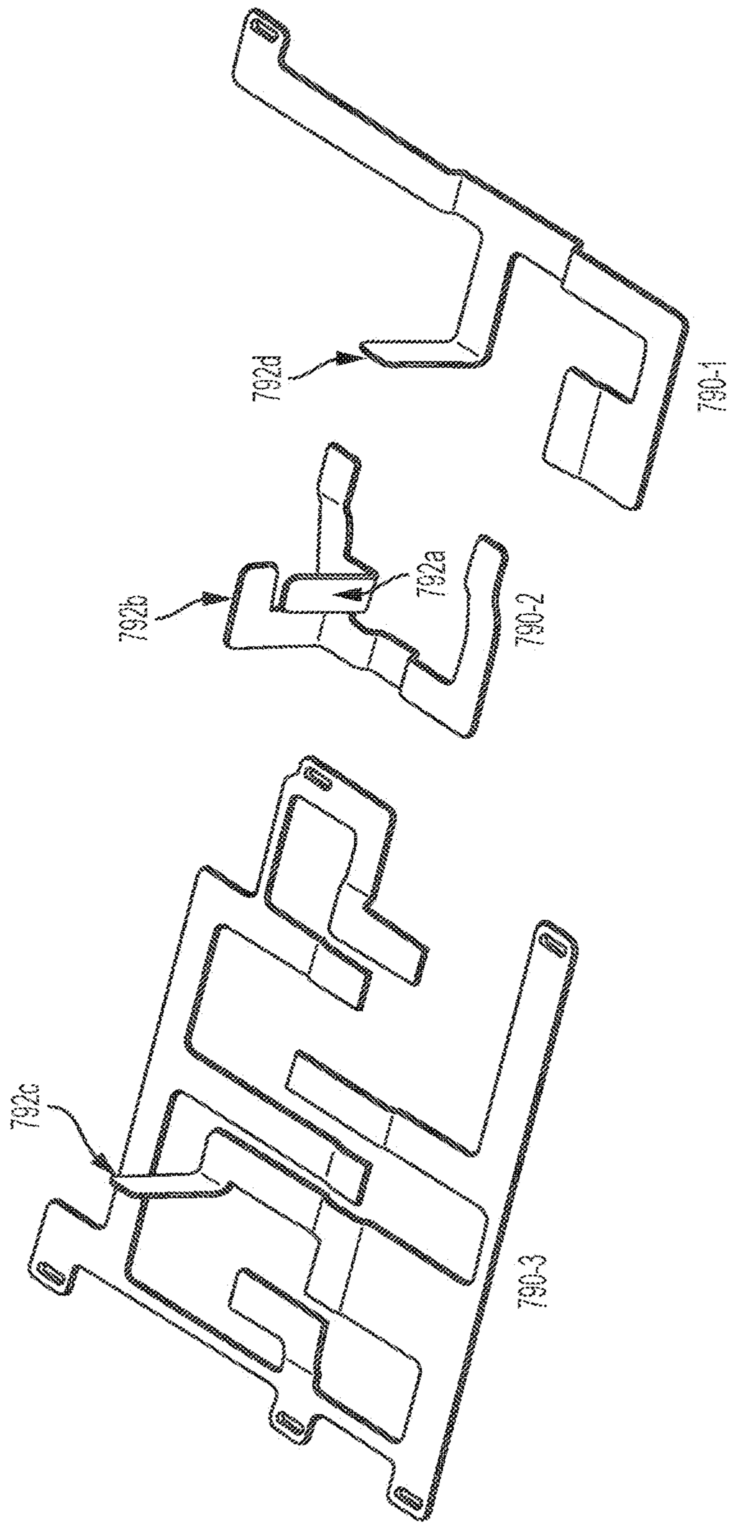
Figure 81C:
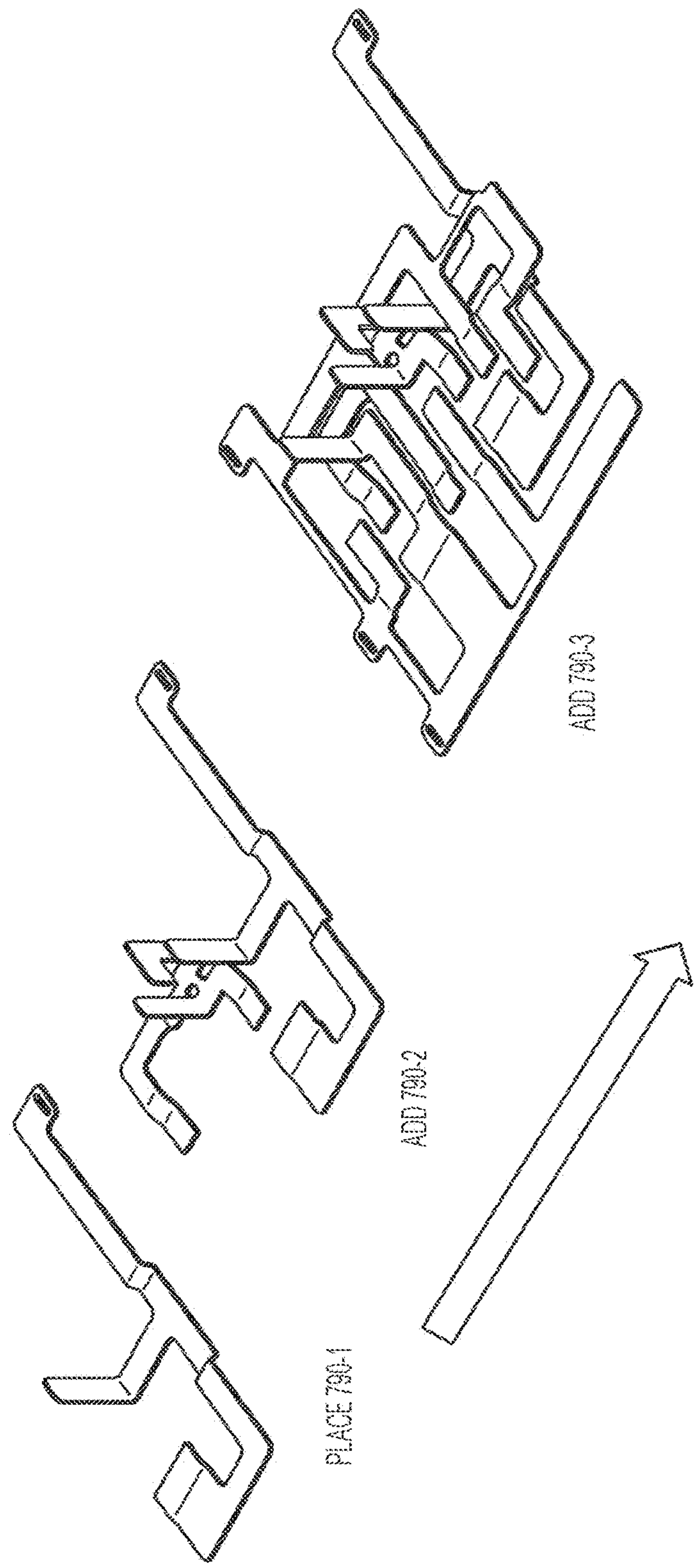
Figure 81D:
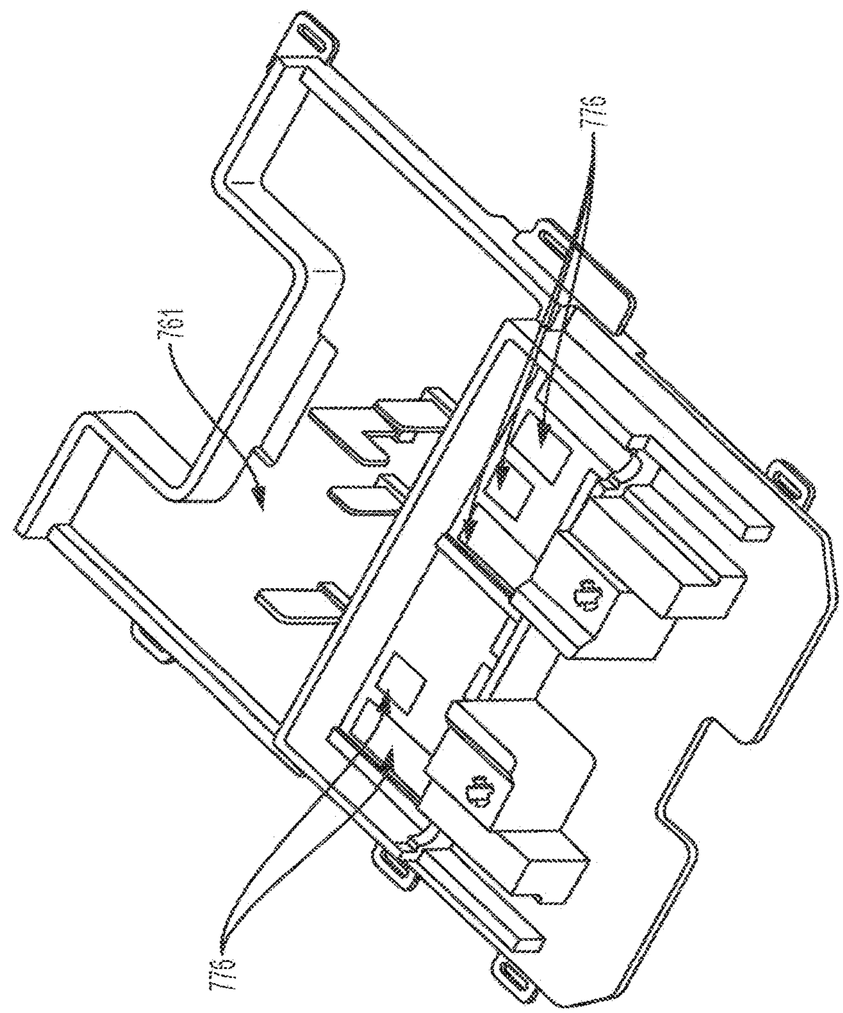

FIGS. 79*b* and 79*d* illustrate the second—or underside—of the converter element 750. FIG. 79*c* illustrates a side view of the converter element 750 and FIG. 79*a* illustrates a top, isometric view of the converter element 750.

FIGS. 81 and 82 illustrate the process for manufacturing an exemplary support board 761 including a plurality of power traces 790 and resulting contact pads 766. As illustrated in FIG. 81*a*, a specific trace layout 791 is cut from a sheet of material, e.g., 0.5 mm thick C18080 copper. FIG. 81*a* illustrates three traces 790 that are cut from the sheet of material. An alternate number of traces—smaller or greater—having an alternate layout may be cut from the material depending upon a particular desired layout of the contact pads and terminal flags. The alternate number of layouts and configuration of the layouts are contemplated and encompassed by the present disclosure. As illustrated in FIG. 81*b*, once the traces 790 are cut the material is bent to provide a group of terminal flags. As illustrated in FIG. 81*c*, once the traces 790 are bent they are placed in an injection mold (not illustrated for purposes of simplicity). Specifically, trace 1 is placed in the mold, then trace 2 is added to the mold and then trace 3 is added to the mold. As illustrated in FIG. 81*d*, thereafter plastic is injected into the mold, e.g. to a thickness of approximately 1.5 mm. As illustrated in FIG. 81*d*, as a result of the injection mold configuration, a portion of the power traces 790 remains exposed in the form of the plurality of contact pads 766. Other manufacturing processes may be used to manufacture the support. Providing the support board 761 by any manufacturing process is contemplated and encompassed by this disclosure.

FIG. 82 illustrates the support board 761 after the support board 761 is removed from the injection mold with the outer surface of the support board 761 shown as transparent so as to see the embedded power traces 790. Once the support board 761 is removed from the injection mold support board holes 794 are punched at predefined locations to create multiple power traces 790 from a single trace layout 791 so that a single power trace 790 is connected to a single power trace coupler 796 for coupling to a corresponding battery strap 798. For example, the A+ power trace 792*a* leaves an exposed A+ contact pad 766 and includes an A+ cell power trace coupler 796*a* for coupling to the A+ battery strap coupler 800*a*—which is connected to the $C_{A5}$ positive terminal. FIG. 82 also illustrates a BT1 power trace 790*g* and exposed contact pad 766 and BT1 flag 792*a* and a BT3 power trace 790*h* and exposed contact pad 766 and BT3 flag 792*b*. These will be described in more detail below. Where one trace 790 overlaps another trace 790, the layout is configured such that the traces 790 are at different heights (relative to the support board 761) which allows the injection molded material to be positioned between the traces 790 and thereby electrically isolating the traces 790 where they overlap. Other manufacturing processes may be used to create the contact pads 766. For example, the contact pads 766 could be created on a PCB. The support board 761 includes a slot 793 to accommodate the ribbon cable 763.

FIG. 83 illustrates the support board 761 and the plurality of contact pads 766. The plurality of contact pads 766 forms a set of contact pads 766. The plurality of contact pads 766 are electrically conductive elements. Each of the plurality of contact pads 766 is electrically connectable to a specific terminal of a particular battery cell string by the power traces 790—embedded in the support board 761 material and described in more detail below—and the cell couplers. The support board 761 is placed on the cell holder 764 such that each power trace coupler 796 is aligned with and couples to a corresponding battery strap coupler 800. The power trace coupler 796 is connected to the battery strap coupler 800 by welding or some other connection technique. FIG. 83 also clearly illustrates the exemplary contact pad layout. Each of the contact pads 766 of the first set of contact pads 766 (A+, B+, C+, A−, B−, C−) is electrically coupled to a denoted cell string terminal, specifically the A+ contact pad 766 is electrically coupled to the A+ terminal of the A string of cells, the B+ contact pad 766 is electrically coupled to the B+ terminal of the B string of cells, the C+ contact pads 766 are electrically coupled to the C+ terminal of the C string of cells, the A− contact pad 766 is electrically coupled to the A− terminal of the A string of cells, the B− contact pad 766 is electrically coupled to the B− terminal of the B string of cells and the C− contact pad 766 is electrically coupled to the C− terminal of the C string of cells.

Furthermore, additionally referring to FIG. 73, the A+ contact pad 766 is electrically coupled to the BATT+ battery terminal via the BATT+/A+ flag and the associated power trace and the C− contact pad 766 is electrically coupled to the BATT− battery terminal via the BATT−/C− flag and the associated power trace. Each contact pad 766 of a second set of contact pads 766 (BT1, BT3) is electrically coupled via the associated power trace to a denoted battery terminal flag, and as illustrated in FIG. 73, each battery terminal flag is electrically coupled to a corresponding battery terminal—BT1 flag is coupled to battery terminal BT1 and BT3 flag is coupled to battery terminal BT3. As such, the BT1 contact pad 766 is electrically coupled to the BT1 battery terminal and the BT3 contact pad 766 is electrically coupled to the BT3 battery terminal.

In the exemplary embodiment, the plurality of contact pads 766 allow for the converter element switching contacts 784 to slide along the support board 761 and the switching contacts 784 to break and make connections between the discrete contact pads 766—effectively opening and closing the power switches SW1-SW7, described above with reference to FIGS. 76*a* and 76*b*. This process is described in more detail below.

FIG. 84 illustrates, in more detail, the exemplary battery 752. The battery 752 includes the converting subsystem 772. The converting subsystem 772 includes the support board 761 and the converter element 750. FIG. 84 illustrates the plurality of contact pads 766 and the converter element switching contacts 784 but without the converter element housing. As noted above, the exemplary battery 752 includes a first subset of contact pads 766 on the support board 761. The contact pad configuration illustrated in FIGS. 84*a* and 84*b* is an exemplary configuration. Alternate exemplary embodiments may include other contact pad configurations and are contemplated and encompassed by the present disclosure.

Referring to FIGS. 84*a* and 84*b*, in this exemplary embodiment the main PCB 760 may also include a plurality of contact pads 766. These contact pads 766 couple the battery signal terminals to the battery cell nodes. Specifically, the main PCB 760 includes a BT1, BT2, BT3 and BT4 contact pad 766. The battery 752 also includes a plurality of sense wires 806 (illustrated in FIGS. 73 and 74) that connect the battery cell nodes, e.g., C1, C2, C3 and C4, to corresponding contact pads 766 on the main PCB 760. The cell node contact pads 766 are electrically coupled, either directly or indirectly to the corresponding battery terminal contact pads 766. Specifically, (1) a sense wire couples the C2 battery cell node to the C2 cell node contact pad 766 on the main PCB 760 and the C2 cell node contact pad 766 on the main PCB 760 is coupled to the BT2 battery terminal contact pad 766 and the BT2 battery terminal contact pad 766 is coupled to the BT2 battery terminal, for example, through a ribbon cable and (2) a sense wire couples the C4 battery cell node to the C4 cell node contact pad 766 on the main PCB 760 and the C4 cell node contact pad 766 on the main PCB 760 is coupled to the BT4 battery terminal contact pad 766 and the BT4 battery terminal contact pad 766 is coupled to the BT4 battery terminal through the ribbon cable. And, (1) a sense wire couples the C1 battery cell node to the C1 cell node contact pad 766 on the main PCB 760 and the C1 cell node contact pad 766 on the main PCB 760 is coupled to a switch S1 and depending upon the state of the switch S1, as will be discussed in more detail below, the C1 cell node contact pad 766 may be coupled to the BT1 battery terminal contact pad 766 and the BT1 battery terminal contact pad 766 is coupled to the BT1 battery terminal by the BT1 flag and (2) a sense wire couples the C3 battery cell node to the C3 cell node contact pad 766 on the main PCB 760 and the C3 cell node contact pad 766 on the main PCB 760 is coupled to a switch S2 and depending upon the state of the switch S2, as will be discussed in more detail below, the C3 cell node contact pad 766 may be coupled to the BT3 battery terminal contact pad 766 and the BT3 battery terminal contact pad 766 is coupled to the BT3 battery terminal by the BT3 flag. In alternate embodiments, the contact pads 766 on the main PCB 760 may simply be electrical connections. For example, the cell node contact pad 766 may simply be a location where the sense wire connects to the main PCB 760 and the battery terminal contact pad 766 may simply be a connection location on the main PCB 760 for connecting to the ribbon cable (in the case of the BT2 and BT4 battery terminal contact pads 766) and the connection between the cell node connection location and the battery terminal connection location may simply be a trace on the main PCB 760.

A very important quality of a convertible battery pack 20A4 such as the convertible battery packs described in this disclosure is that the battery pack is in the appropriate operational configuration at the correct time. In other words, if the convertible battery pack 20A4 were to remain in the medium rated voltage configuration after it was removed from the medium rated voltage electrical device and then placed in a low rated voltage electrical device or in a low rated voltage charger, the battery pack 20A4, the electrical device and/or the charger could be damaged or some other type of undesirable event could occur. In order to ensure that the convertible battery pack 20A4 is not able to transfer medium rated voltage to low rated voltage electrical devices 10A1, the convertible battery pack 20A4 includes a feature which prevents medium rated voltage from being transferred to devices that are not designed to operate using the medium rated voltage. Specifically, when placed in the medium rated voltage configuration, the convertible battery pack 20A4, in addition to transferring power to the electrical device through the battery power terminals (BATT+ and BATT−) and the tool power terminals (TOOL+ and TOOL−), will also transfer power to the electrical device through at least a pair of the battery signal terminals and a second pair of tool power terminals in which the second pair of tool power terminals are coupled to each other in the tool terminal block 723 through a jumper 812 (also referred to as a shorting bar).

FIGS. 84*a* and 84*b* illustrate the low rated voltage configuration and the medium rated voltage configuration, respectively. FIG. 84*c* illustrates a simplified circuit diagram of the battery terminal contact pads 766 on the main PCB 760 and the switches S1 and S2.

Referring to FIGS. 84*a* and 84*c*, the low rated voltage configuration will be described. When the exemplary convertible battery pack 20A4 of FIG. 67 is not coupled to an electrical device or when it is coupled to a low rated voltage power tool 10A1 or charger 30, it is in the low rated voltage configuration. When in this low rated voltage configuration, a first converter element switching contact (SC1) electrically couples the A+ contact pad 766 and the B+ contact, a second converter element switching contact (SC2) electrically couples the A+ contact pad 766 and the C+ contact pad 766, a third converter element switching contact (SC3) electrically couples the C− contact pad 766 and the A− contact pad 766 and a fourth converter element switching contact (SC4) electrically couples the C− contact pad 766 and the B− contact pad 766. This effectively places switches SW1, SW2, SW3 and SW4 (illustrated in FIGS. 76*a* and 76*b*) in the closed state and as there is no connection between the BT1 contact pad 766 and the A− contact pad 766 or the BT3 contact pad 766 and the B+ contact pad 766 this effectively places switches SW5, SW6 and SW7 (illustrated in FIGS. 76*a* and 76*b*) in the opened state. As such, the positive terminals of the A string of cells, the B string of cells and the C strings of cells are all electrically connected and coupled to the BATT+ battery terminal and the negative terminals of the A string of cells, the B string of cells and the C string of cells are all electrically connected and coupled to the BATT− battery terminal. Therefore the strings of cells are all in parallel.

Referring to FIG. 84*c*, the electronic switches S1 and S2 will be explained. First, it is noted that Q11 and Q21 are p-channel MOSFET transistors and Q12 and Q22 are n-channel MOSFET transistors. Generally speaking, for the p-channel MOSFET transistors, when the gate voltage is less than the source voltage the transistor will turn on (closed state) otherwise the transistor will turn off (open state) and for the n-channel MOSFET transistors, when the gate voltage is greater than the source voltage the transistor will turn on (closed state) otherwise the transistor will turn off (open state). When the battery 752 is in the low rated voltage state, the voltage at the C+ terminal of the C string of cells is greater than the voltage at the B-terminal of the B string of cells and the voltage at the C1 cell node is less than the voltage at the C+ terminal of the C string of cells but greater than ground and the voltage at the C3 cell node is less than the voltage at the C+ terminal of the C string of cells but greater than ground. As such, when the battery 752 is in the low rated voltage configuration, Q11 will be on and Q12 will be on and the BT1 battery terminal will be coupled to the C1 cell node and Q21 will be on and Q22 will be on and the BT3 battery terminal will be coupled to the C3 cell node.

When the convertible battery pack 20A4 mates with a medium rated voltage power tool 10A2, the power tool conversion element projections will engage the converter element projections 748 and force the converter element 750 to move to its second position. In addition, the tool terminals TT1 and TT3 will engage battery terminals BT1 and BT3, respectively. As illustrated in FIGS. 76-89, the tool terminals TT1 and TT3 in the medium rated voltage power tools 10A2 are coupled together by a jumper 812 (shorting bar). As such, when the medium rated voltage power tool 10A2 engages the convertible battery pack 20A4 the battery terminals BT1 and BT3 become electrically coupled through the tool terminals TT1 and TT3 and the jumper 812 between the tool terminals TT1 and TT3 and will complete the circuit between the BATT+ and BATT− battery terminals 732. A low rated voltage power tool 10A1 that would otherwise couple to the convertible battery pack 20A4 will not include the coupled tool terminals TT1 and TT3 and as such, will not complete the circuit between the BATT+ and BATT− battery terminals 732, as explained in more detail below. As such, if the convertible battery pack 20A4 were to remain in its medium rated voltage configuration after being removed from the medium rated voltage power tool 10A2 it would not operate with the low rated voltage tools 10A1.

Figure 85A:
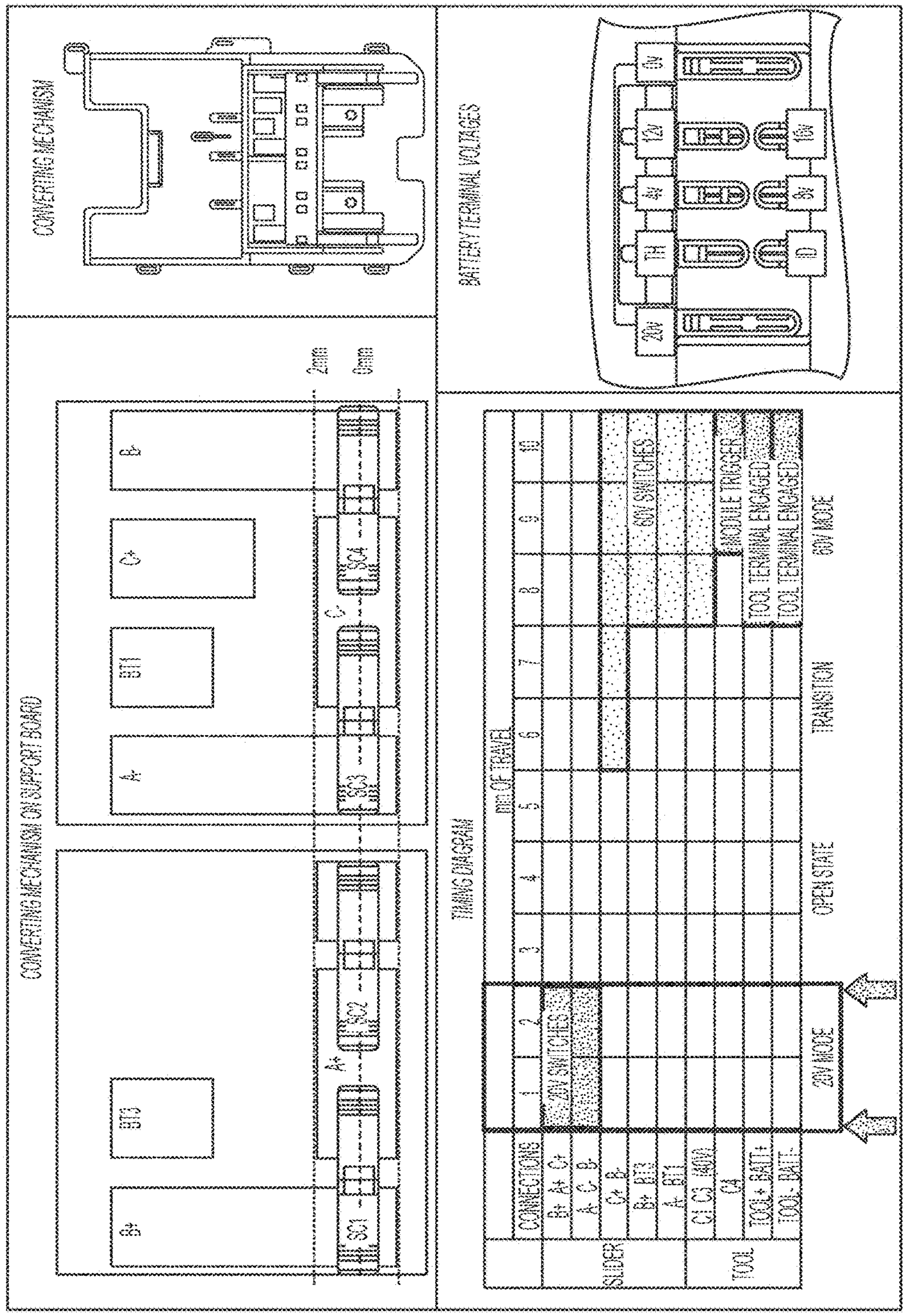
Figure 85B:
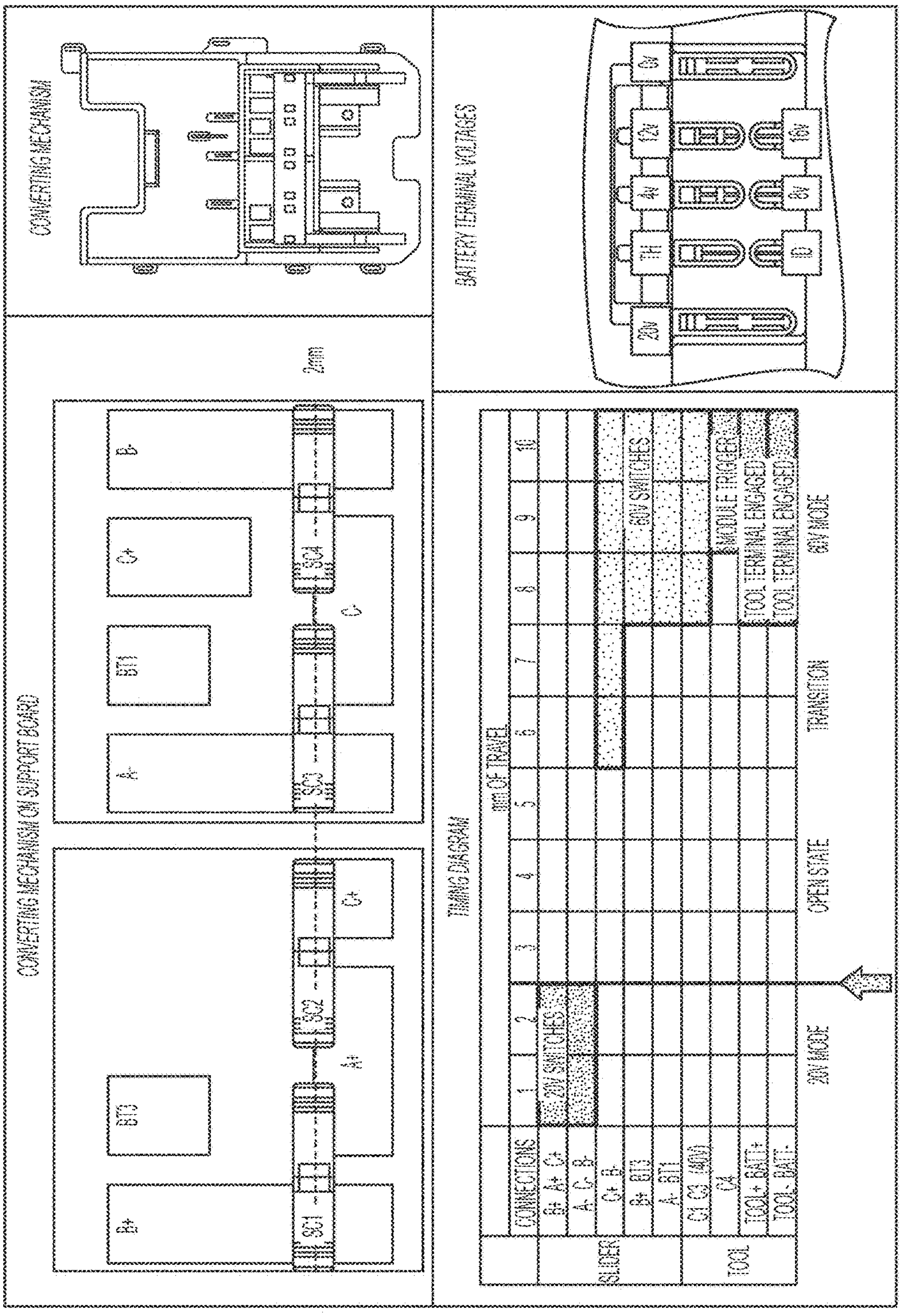
Figure 85C:
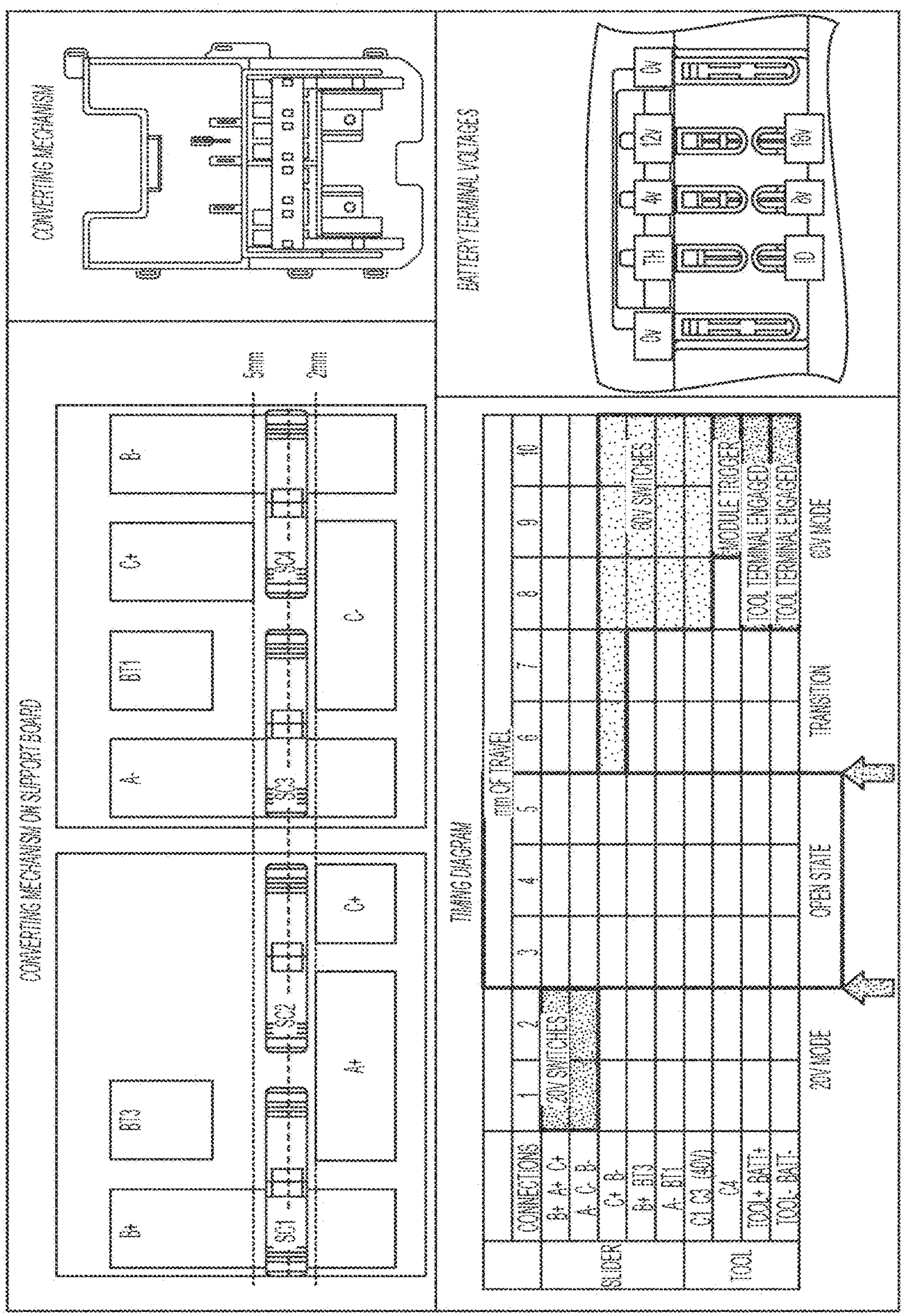
Figure 85D:
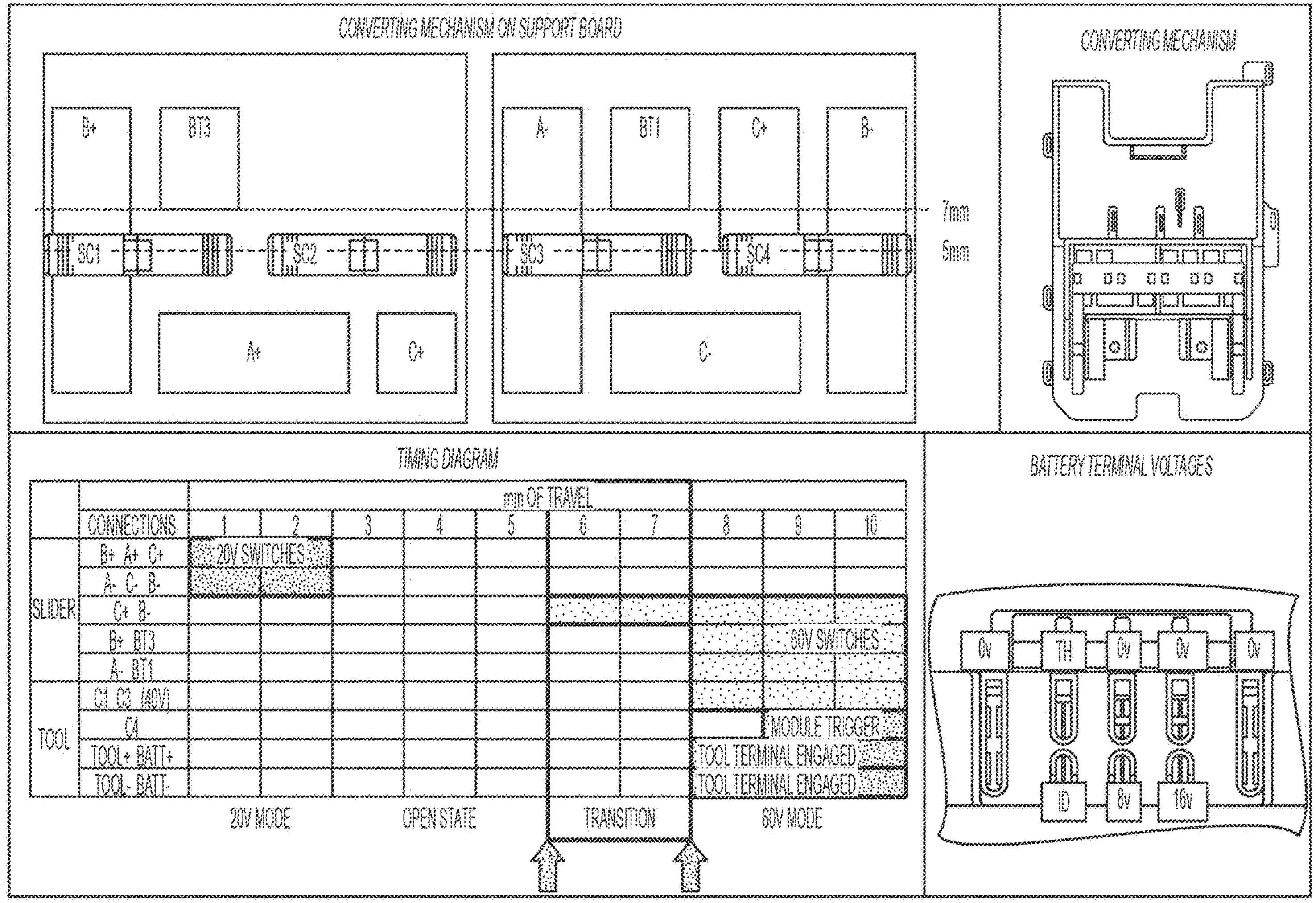
Figure 85E:
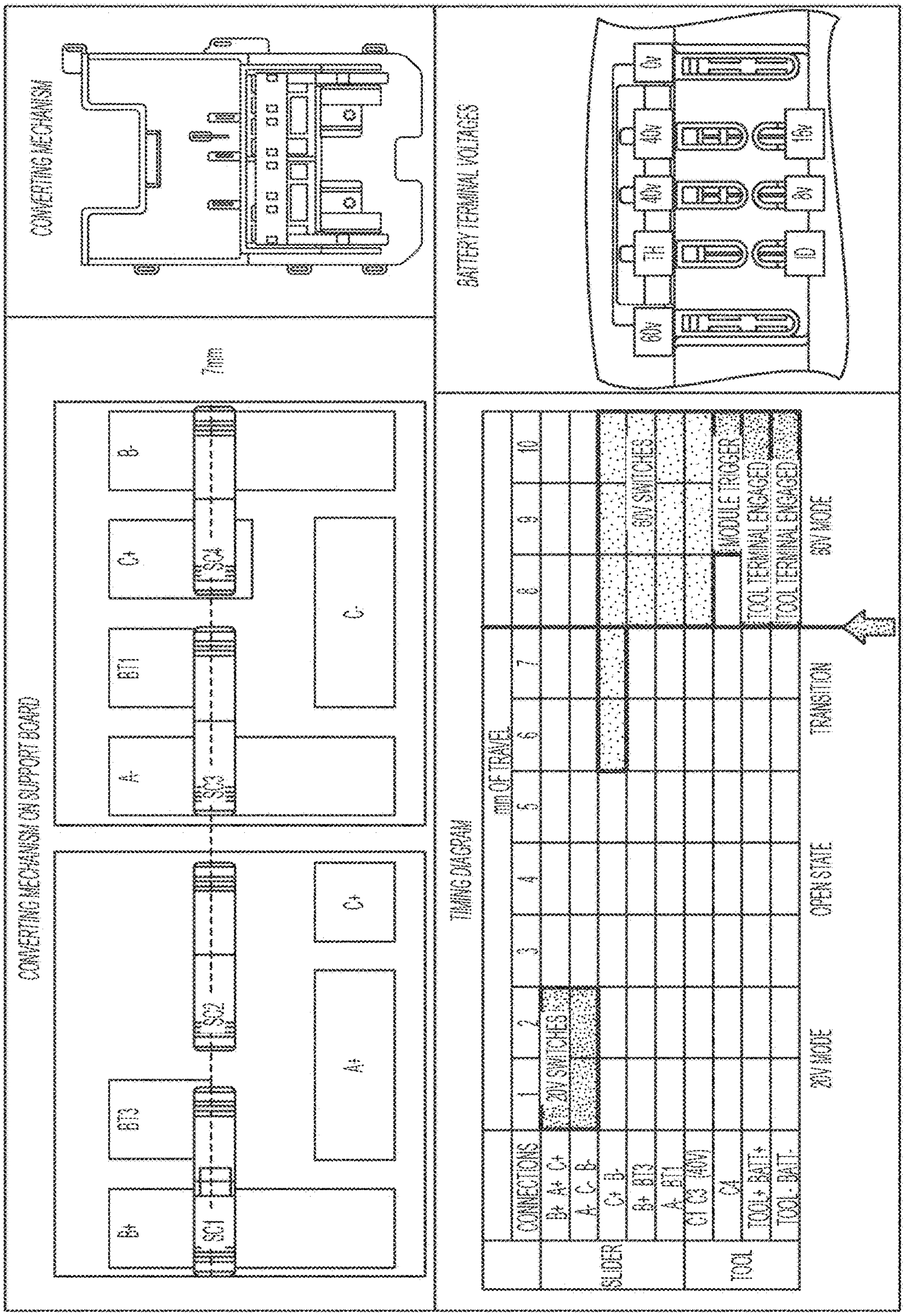
Figure 85F:
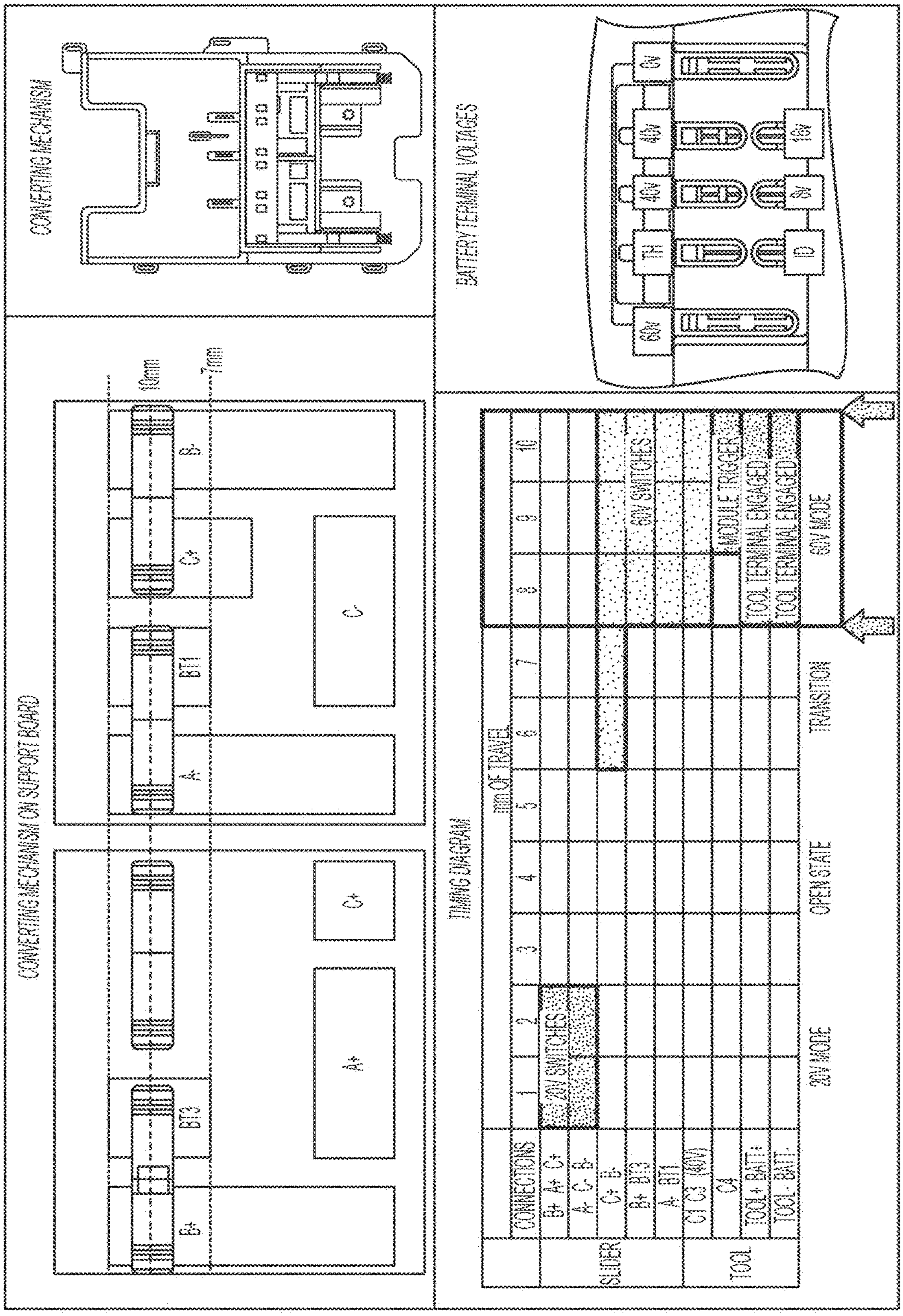

Referring to FIGS. 84*b* and 85*f*, when the converter element 750 moves to the medium rated voltage position, the first converter element switching contact SC1 will decouple from the A+ and B+ contact pads 766 and couple the B+ and BT3 contact pads 766, the second converter element switching contact SC2 will decouple from the A+ and the C+ contact pads 766, the third converter element switching contact SC3 will decouple from the A− and C− contact pads 766 and couple the A− and BT1 contact pads 766 and the fourth converter element switching contact SC4 will decouple from the C− and B− contact pads 766 and couple the B− and C+ contact pads 766. This effectively places switches SW1, SW2, SW3 and SW4 in the opened state and effectively places switches SW5, SW6 and SW7 in the closed state (illustrated in FIG. 76*b*). As such, the BATT− battery terminal is coupled to the C− terminal of the C string of cells, the C+ terminal of the C string of cells is coupled to the B− terminal of the B string of cells, the B+ terminal of the B string of cells is coupled to the BT3 battery terminal which is coupled to the TT3 tool terminal which is coupled to the TT1 tool terminal (via the jumper 812) which is coupled to the BT1 battery terminal which is coupled to the A− terminal of the A string of cells and the A+ terminal of the A string of cells is coupled to the BATT+ battery terminal. Therefore the A, B, and C strings of cells are all in series. In this configuration, the power (voltage and current) for operating the tool load is provided through the BATT+ and BATT− battery terminals 732, the BT1 and BT3 battery terminals 732, the TOOL+ and TOOL− tool terminals and the TT1 and TT3 tool terminals.

Referring again to FIG. 84*c*, when the battery 752 is in the medium rated voltage state, the voltage at the C+ terminal of the C string of cells is equal to the voltage at the B− terminal of the B string of cells and the voltage at the C1 cell node is less than the voltage at the C+ terminal of the C string of cells but greater than ground and the voltage at the C3 cell node is less than the voltage at the C+ terminal of the C string of cells but greater than ground. As such, when the battery 752 is in the medium rated voltage state, Q11 will be off and Q12 will be off and the BT1 battery terminal will not be coupled to the C1 cell node and Q21 will be off and Q22 will be off and the BT3 battery terminal will not be coupled to the C3 cell node. Instead, as noted above, the BT1 battery terminal will be coupled to the BT3 battery terminal through the TT1 and TT3 tool terminals.

FIGS. 85*a*-85*f* illustrate the various stages or configurations of the exemplary convertible battery 752 as the pack converts from a low rated voltage configuration to an open state configuration to a medium rated voltage configuration. These figures also illustrate a battery terminal block 762 and the plurality of battery terminals 732. These figures illustrate the voltages at these battery terminals 732 as the battery 752 converts from the low rated voltage state to the medium rated voltage state.

FIGS. 85*a*-85*f* also illustrate (1) the converter element 750 as it moves along the support board 761 as the convertible battery pack 20A4 mates with a medium rated voltage tool 10A2 (e.g., 60V), (2) the converter element switching contacts 784 SC1-SC4 as they move along the support board 761 and (3) a table denoting the state of the various connections between the various contact pads 766. As noted above, the contact pads 766 and the converter element switching contacts 784 together effectively serve as the switches SW1-SW7 between the cell string terminals. As the electrical device 10A2 mates with the convertible battery pack 20A4 in the mating direction—illustrated in FIGS. 69-71, and the converter element 750 moves from the first position—illustrated in FIG. 77*a*—to the second position—illustrated in FIG. 77*b*—the converter element switching contacts 784 also move from a first position—illustrated in FIGS. 84*a* and 85*a*—to a second position—illustrated in FIGS. 84*b* and 85*f*. As the converter element switching contacts 784 move from the first position to the second position the switching contacts 784 disconnect and connect from and to the contact pads 766. As the disconnections and connections occur the switches SW1-SW7 between the cell string terminals are opened and closed, respectively. As the switches are opened and closed, the battery 752 converts from the low rated voltage configuration to an open configuration to the medium rated voltage configuration. Conversely, as the converter element 750 moves from the second position to the first position, the battery 752 converts from the medium rated voltage configuration to the open state configuration to the low rated voltage configuration.

FIG. 85*a* illustrates the state of the converter element switching contacts 784 SC1-SC4 and the contact pads 766 when the converter element 750 is in the first position—the low rated voltage configuration. Again, the location of the particular contact pads 766 is exemplary and other configurations are contemplated by this disclosure. In this configuration, the first converter element switching contact SC1 electrically couples the A+ and B+ contact pads 766, the second converter element switching contact SC2 electrically couples the A+ and C+ contact pads 766, the third converter element switching contact SC3 electrically couples the C− and A− contact pads 766 and the fourth converter element switching contact SC4 electrically couples the C− and B− contact pads 766. When the four converter element switching contacts 784 are in this position, the network switches SW1, SW2, SW3, SW4 are in a closed stated and the network switches SW5, SW6 and SW7 are in an opened state. This places the A string of cells and the B string of cells and the C string of cells in parallel.

FIG. 85*f* illustrates the state of the converter element switching contacts 784 SC1-SC4 and the contact pads 766 when the converter element 750 is in the second position—the medium rated voltage configuration when the convertible battery pack 20A4 is coupled to a medium rated voltage power tool 10A2 having the jumper 812 between tool terminals TT1 and TT3. In this configuration, the first converter element switching contact SC1 electrically couples the B+ and BT3 contact pads 766, the second converter element switching contact SC2 is not coupled to any contact pads 766, the third converter element switching contact SC3 electrically couples the A− and BT1 contact pads 766 and the fourth converter element contact SC4 electrically couples the C+ and B− contact pads 766. When the four converter element switching contacts 784 are in this position, the network switches SW1, SW2, SW3, SW4 are in an opened state and the network switches SW5, SW6 and SW7 are in a closed state. This places the A string of cells and the B string of cells and the C string of cells in series.

In an exemplary embodiment, FIGS. 85*c*, 85*d*, and 85*e* illustrate the state of the network switches as the converter element 750 moves between the first position—the low rated voltage configuration—and the second position—the medium rated voltage configuration. Generally speaking, as the switches open and close unwanted voltages/currents may build up on and/or move between the cells. To address these unwanted voltages/currents, the battery 752 may be placed in intermediate stages or phases. As such, the network switches may be opened and closed in a particular order. As illustrated in FIG. 85*c* and with reference to the exemplary table of FIG. 85*c*, as the converter element 750 travels in the mating direction, initially the converter element switching contacts 784 will disconnect from the contact pads 766. This effectively opens all network switches SW1-SW7.

The tables illustrated in FIGS. 85*a*-85*f* show the various stages of the switching network as the converter element 750 travels between a first position and a second position. The first stage corresponds to the first position of the converter element 750 ($1^{st}$/low rated voltage configuration) and the sixth stage corresponds to the second position of the converter element 750 ($2^{nd}$/medium rated voltage configuration). The third and fourth stages are intermediate stages/phases and correspond to the open state configuration.

When the converter element 750 moves from the first position to the second position and network switches open and close, the voltages on the various battery terminals 732 will change. More particularly, in the exemplary embodiment illustrated in FIGS. 76 and 84 and in which the cells are 4V cells and the battery 752 is fully charged, when the converter element 750 is in the first position BATT+=20V, BATT−=0V, C1=4V, C2=8V, C3=12V, C4=16V. When the converter element 750 is in the second position, BATT+=60V, BATT−=0V, BT1=40V, BT2=8V, BT3=40V, BT4=16V. Using the battery signal terminals BT2 and BT4, regardless of which cell nodes the battery signal terminals are connected, the battery cells 754 can be monitored for overcharge, overdischarge and imbalance. Alternate exemplary embodiments may include other configurations for connecting the battery signal terminals to the cell nodes and are contemplated and encompassed by this disclosure.

Of course, as the electrical device 10A2 disconnects from the convertible battery pack 20A4 in a direction opposite the mating direction—also referred to as the unmating direction—the converter element 750 will move from the second position to the first position and the converter element switching contacts 784 will connect and disconnect to the contact pads 766 in a reverse order described above.

In addition, it is contemplated that in alternate exemplary embodiments the convertible battery pack 20A4 and the battery converting subsystem 772 could be configured such that when the convertible battery pack 20A4 is not mated with any electrical device 10A or mated to a medium rated voltage electrical device 10A2 the converter element 750 is in the first position which places the convertible battery pack 20A4 in the medium rated voltage configuration and when the convertible battery pack 20A4 is mated with a low rated voltage electrical device 10A1 the converter element 750 is in the second position which places the convertible battery pack 20A4 in the low rated voltage configuration. In such an embodiment, as described above, the convertible battery pack 20A4 may also be placed in a third configuration (state) between the first position and the second position in which the convertible battery pack 20A4 is in an "open" state. In this position, all of the network switches SW1-SW7 are in an open state and there is no voltage potential between the BATT+ and BATT− battery terminals 732. The converter element 750 could be placed in this position, for example for transportation purposes.

In addition, it is contemplated that in alternate exemplary embodiments the convertible battery pack 20A4 and the battery converting subsystem 772 could be configured such that when the convertible battery pack 20A4 is not mated with any electrical device 10A the converter element 750 is in the first position which places the convertible battery pack 20A4 in the open state and when the convertible battery pack 20A4 is mated with a low rated voltage electrical device 10A the converter element 750 is in the second position which places the convertible battery pack 20A4 in the low rated voltage configuration and when the convertible battery pack 20A4 is mated with a medium rated voltage electrical device 10A2 the converter element 750 is in the third position which places the convertible battery pack 20A4 in the medium rated voltage configuration.

In addition, it is contemplated that in alternate exemplary embodiments the convertible battery pack 20A4 and the battery converting subsystem 772 could be configured such that when the convertible battery pack 20A4 is not mated with any electrical device 10A the converter element 750 is in the first position which places the convertible battery pack 20A4 in the open state and when the convertible battery pack 20A4 is mated with a low rated voltage electrical device 10A1 the converter element 750 is in the third position which places the convertible battery pack 20A4 in the low rated voltage configuration and when the convertible battery pack 20A4 is mated with a medium rated voltage electrical device 20A2 the converter element 750 is in the second position which places the convertible battery pack 20A4 in the medium rated voltage configuration.

Still further, the convertible battery pack 20A4 could be configured such that is it capable of being place into four states: an open state, a low rated voltage configuration, a medium rated voltage configuration and a high rated voltage configuration. Of course, the various contact pads 766 and contact switches would be adjusted accordingly.

FIGS. 86-89 illustrate an exemplary tool terminal block 723 and tool terminals of a medium rated voltage electrical device 10A2, e.g., a 60V power tool. The tool terminal block 723 of the medium rated voltage electrical device 10A2 is sized the same as a tool terminal block 723 of a low rated voltage electrical device 10A1, e.g., a 20V power tool. The tool terminal block 723 is configured to mate with the convertible battery pack terminal block 762. The tool terminal block 723 includes a housing 801. The housing 801 is comprised of a non-conductive material, e.g., plastic. The housing 801 holds the tool terminals 734. The tool terminals 734 include a TOOL+ terminal 734 and a TOOL− terminal 734. These tool terminals 734 are positioned to mate with the BATT+ terminal and the BATT− terminal, respectively. These tool terminals 734 provide power to the tool load, e.g. a motor 12. The tool terminals 734 may also include an ID terminal. This terminal may be a thermistor terminal. The thermistor terminal is positioned to mate with a battery pack terminal, for example BT5, which would be electrically coupled to a thermistor in the convertible battery pack 20A4. The thermistor terminal would be electrically coupled to a tool controller for monitoring the temperature of the convertible battery pack 20A4 or other battery management purposes. This terminal could also be used to identify the convertible battery pack 20A4 to the tool 10A2 and/or the tool 10A2 to the convertible battery pack 20A4. The tool terminals 734 may also include a cell voltage terminal. The tool terminal 734 TT4 could be the cell voltage terminal. The TT4 tool terminal 734 is positioned to mate with the BT4 battery terminal 732*b*. When the medium rated voltage tool 10A2 is mated to the exemplary convertible battery pack 20A4 illustrated in FIGS. 68-85, the BT4 battery terminal 732 will be electrically coupled to the C4 cell node. As such, the TT4 tool terminal 734 will be electrically coupled to the C4 cell node. The TT4 tool terminal 734 may also be electrically coupled to the tool controller 816 for monitoring the voltage of the battery cells 754 or other battery management purposes. The TT3 tool terminal 734 may also be electrically coupled to the tool controller 816 for tool and battery management purposes.

As noted above, the tool terminals 734 include a jumper 812 that electrically couples the TT1 tool terminal 734 and the TT3 tool terminal 734. As such, when the medium rated voltage electrical device 10A2 is coupled to the convertible battery pack 20A4, the BT1 and BT3 battery terminals 732 are electrically coupled through the TT1 and TT3 tool terminals 734. When this occurs the battery power supply is conducted through the TT1 and TT3 tool terminals 734 in addition to through the TOOL+ and TOOL− terminals 734.

Alternate exemplary embodiments may include other contact pad layouts and are contemplated and encompassed by the present disclosure. FIGS. 90 through 95 illustrate alternate exemplary battery pad layouts. As noted above, these exemplary pad layouts may be supported on a PCB, a support board or some other support structure.

Alternate Conversion Mechanisms and Subsystems: These embodiments are illustrated and described in the context of a removable battery pack and a tool. However, the convertible battery pack may operate with any electrical device that requires electrical energy, including but not limited to appliances such as televisions and refrigerators; electric bicycles; wheelchairs and light sources. The convertible battery pack may also be coupled to a charging device that places the convertible battery pack in either its low rated voltage configuration or its medium rated voltage configuration.

FIGS. 96-98 illustrate an alternate exemplary embodiment of a convertible battery pack 20A4 and a converting subsystem 772. FIG. 96 illustrates an exemplary convertible battery pack 20A4. The battery pack housing 712 includes a pair of raceways 736. The raceways 736 are configured to receive corresponding protrusions incorporated into a medium rated voltage tool foot. When the tool 10A2 mates with the convertible battery pack 20A4 the tool protrusions are received in the raceways 736 and engage projections extending through a hole in the battery pack housing 712. The projections extend from the converter element 750 from inside the battery pack housing 712 to outside the battery pack housing 712.

As illustrated in FIGS. 97*a*-97*g*, the converting subsystem 772 includes a support board 761' similar to the support board 761 described above. The support board 761' includes a plurality of power traces 790—a trace for each cell string terminal. Specifically, there is an A+ trace, a B+ trace, a C+ trace, an A− trace, a B− trace and a C− trace that couple to respective cell string terminals. The support board 761' also includes a plurality of contact pads 766. However, distinct from the embodiment described above, the contact pads 766 of this embodiment are configured vertically (generally perpendicular to the support board 761'). The converting subsystem 772 also includes a converter element 750. The converter element 750 includes a crossbar 778 and a pair of parallel legs 776. The converter element 750 is configured such that one of the projections extends from each of the parallel legs 776. The converter element 750 also includes a plurality of shorting contacts 818 (also referred to as jumpers). However, distinct from the embodiment described above, the converter element 750 of this embodiment is configured vertically (generally perpendicular to the support board 761'), similar to a wall and the wall includes the shorting contacts on each side of the wall. The converter element 750 illustrated in FIGS. 98*a* and 98*b* does not illustrate the legs 776 and converter projection illustrated in the converter element 750 of FIGS. 97*a*-97*g*. The converter element 750 is composed of a non-conductive material. A first side of the converter element 750—shown in FIG. 98*a*—includes two shorting contacts. The shorting contacts may include a raised portion for better engagement with the contact pads 766 extending from the support board 761'. The first shorting contact is a positive contact and includes a contact portion for each of the A+, B+ and C+ contact pads 766. The second shorting contact is a negative contact and includes a contact portion for each of the A−, B− and C− contact pads 766. A second side of the converter element 750—shown in FIG. 98*b*—also includes two shorting contacts. The third shorting contact includes a contact portion for the A− contact pad 766 and a contact portion for the B+ contact pad 766. The fourth shorting contact includes a contact portion for the B-contact pad 766 and a contact portion for the C+ contact pad 766.

Figure 97B:
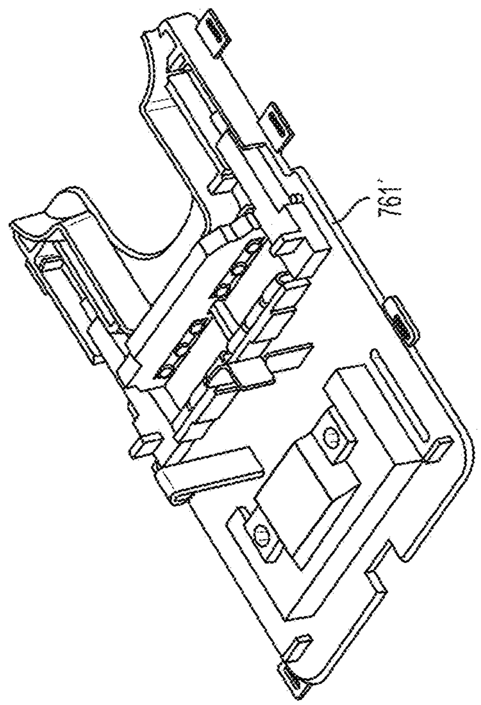
Figure 97A:
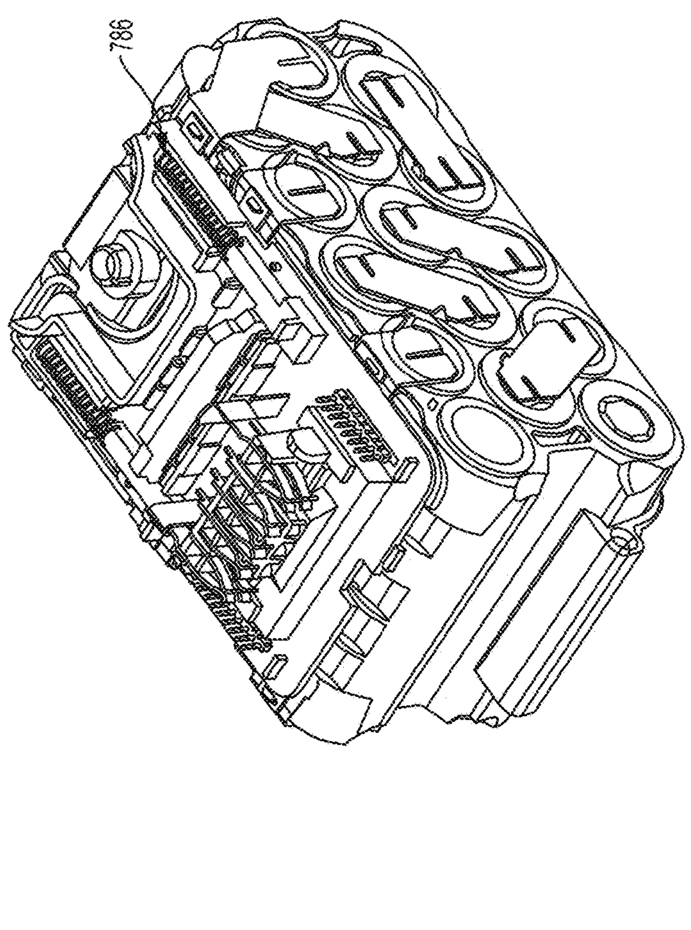
Figure 97D:
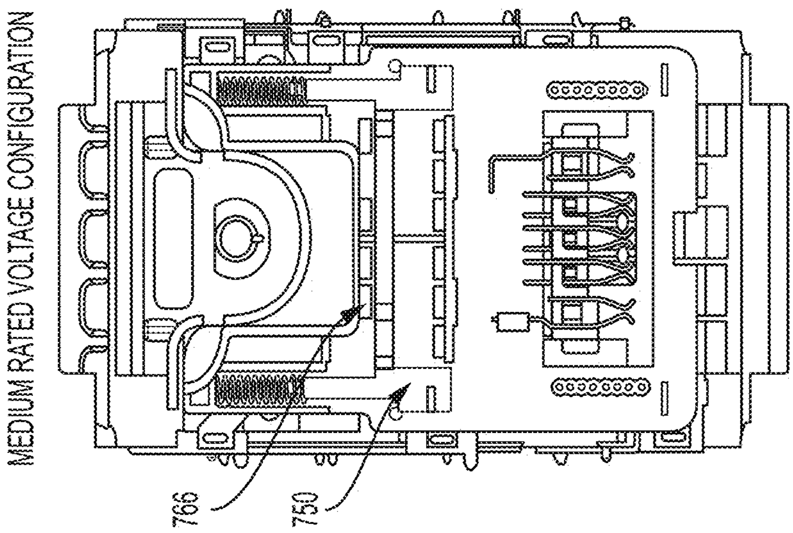
Figure 97C:
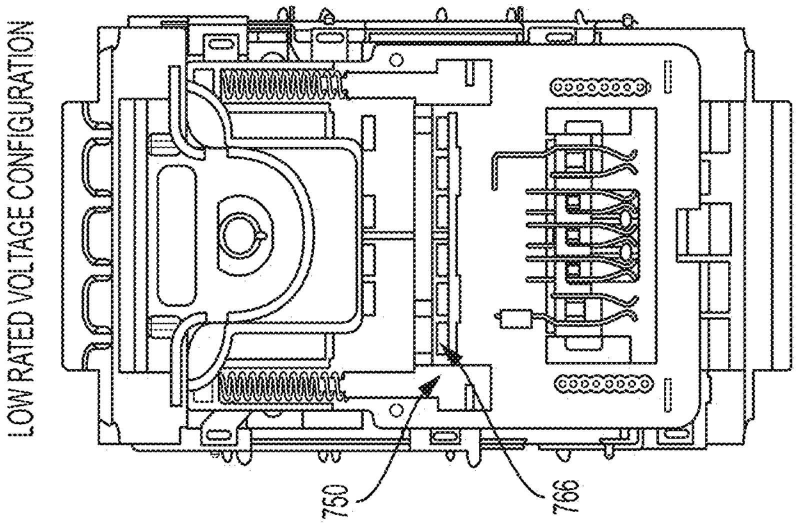
Figure 97F:
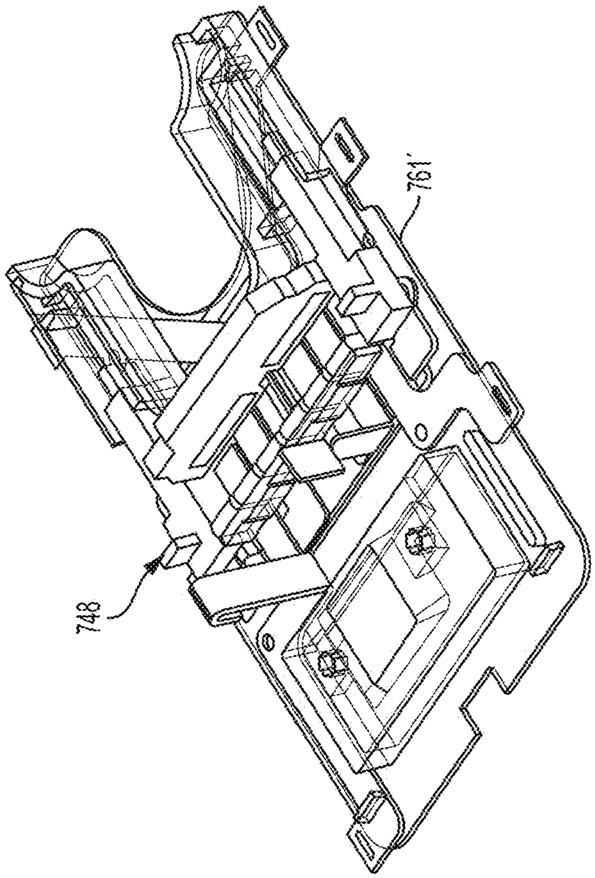
Figure 97E:
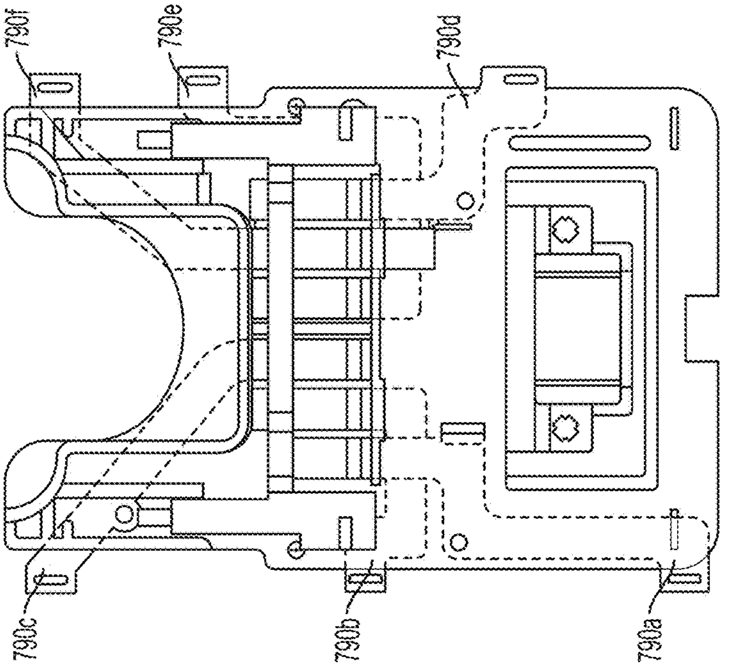

As illustrated in FIGS. 97*a* and 97*c*, when the convertible battery pack 20A4 is not attached to any electrical device 10A or attached to a low rated voltage power tool 10A1, e.g., 20V, the compression springs 786 force the converter element 750 to a forward (first) position. By pressing the sliding wall converter element 750 forward into the first position (low rated voltage configuration), the springs 786 provide a contact force between the shorting contacts of the sliding wall and the forward vertical contact pads 766 extending from the support board 761'. As such, the first and second shorting contacts are electrically coupled to the A+, B+, C+ and A−, B−, C− contact pads 766, respectively. In this position, the A+, B+ and C+ terminals of the A, B, and C strings of cells are electrically coupled and the A−, B− and C− terminals of the A, B, and C strings of cells are electrically coupled. In this configuration, the convertible battery pack 20A4 is in the low rated voltage configuration.

As illustrated in FIGS. 97*b* and 97*d*, when the convertible battery pack 20A4 is attached to a medium rated voltage power tool 10A2, e.g., 60V, the tool conversion element forces the converter element 750 to a rearward (second) position and the compression springs 786 to compress. This provides a contact force between the shorting contacts of the sliding wall and the rearward vertical contact pads 766 extending from the support board 761'. As such, the first and second shorting contacts are electrically decoupled from the A+, B+, C+ and A−, B−, C− contact pads 766, respectively. And the third shorting contact electrically couples the A− contact pad 766 and the B+ contact pad 766 and the fourth shorting contact electrically couples the B− contact pad 766 and the C+ contact pad 766. In this position, the A− terminal of the A string of cells is electrically coupled to the B+ terminal of the B string of cells and the B− terminal of the B string of cells is electrically coupled to the C+ terminal of the C+ string of cells. In this configuration, the convertible battery pack 20A4 is in the medium rated voltage configuration.

Figure 99A:
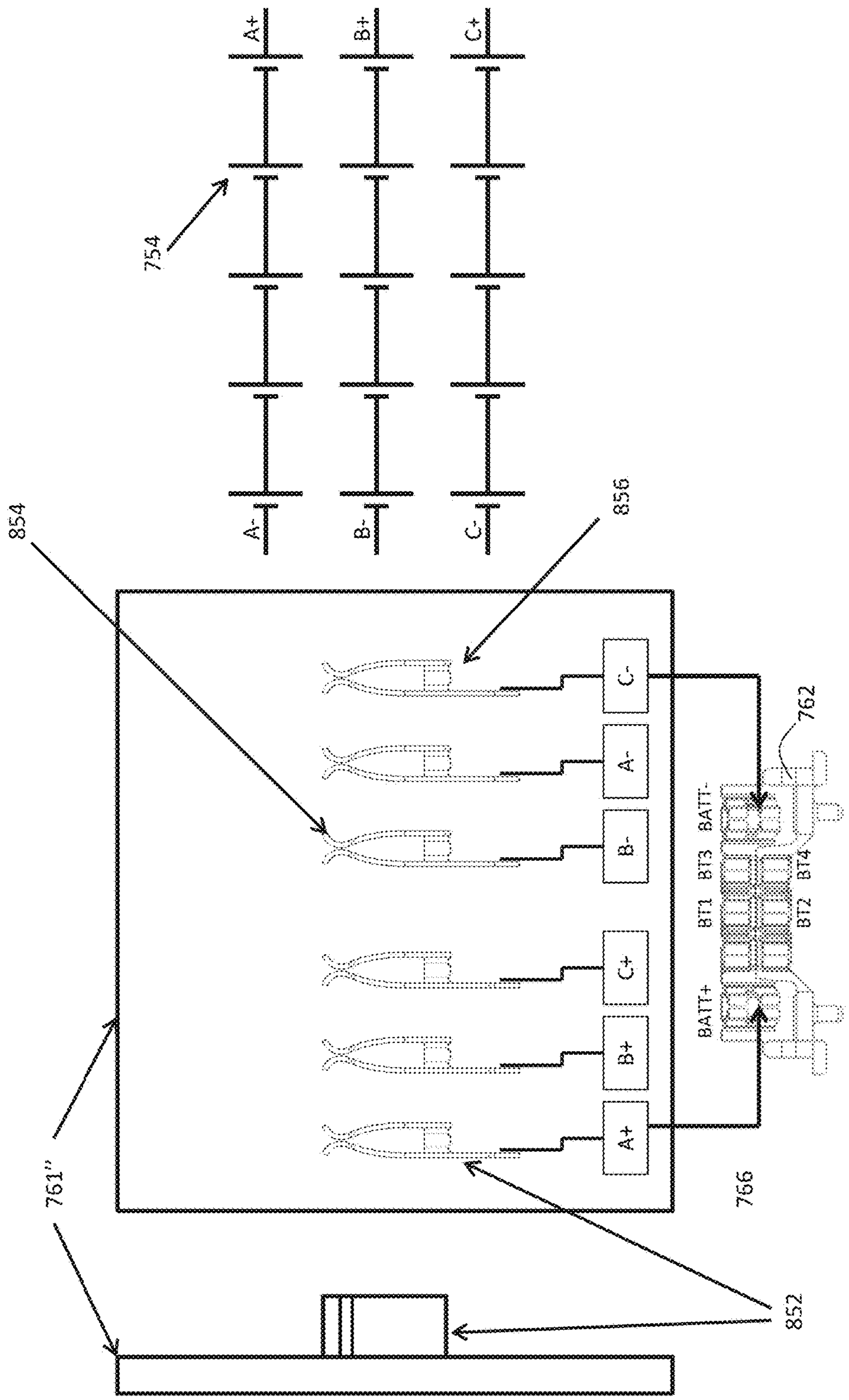

FIGS. 99*a*-99*d* illustrate an alternate, exemplary embodiment for a converting subsystem 772. Similar to the subsystem described above, this subsystem provides a system for converting a convertible battery pack 20A4 from a low rated voltage battery pack, e.g. 20V to a medium rated voltage battery pack, e.g., 60V. As illustrated in FIG. 99*a*, the subsystem includes a non-conductive support board 761" (also referred to as a stationary power routing card assembly). In this embodiment, the battery 752 includes three strings (or sets) of battery cells 754 (an A string, a B string and a C string). As such, there are six conductive power terminals 852—also referred to as contacts, one for each most positive and one for each most negative node of each string of cells 754. As such, there is an A+, A−, B+, B−, C+, and C− power terminal 852. Alternate embodiments may include two strings of cells or more than three strings of cells. If there are two strings of cells there would only be four power terminals and if there were four strings of cells there would be eight power terminals. In this embodiment, each string includes five battery cells 754. Alternate embodiments may include less or more cells. For example, a string may include as few as one cell and as many cells as one may consider practical. But regardless of the number of cells in each string there will be two power terminals for each string.

In this embodiment, the power terminals 852 are tulip-type terminals. In this embodiment, the power terminals 852 are placed in a row. However, alternate power terminal configurations are contemplated and included within the scope of this disclosure. Each of the power terminals 852 includes a mating end 854 and a non-mating end 856. The non-mating end 854 of each terminal 852 is electrically coupled to a specific node of a specific string of battery cells 754. In this embodiment, the non-mating end 856 of the power terminal 852 is coupled to a contact pad 766 and the contact pad 766 is coupled to the string of battery cells 754. Specifically, a first power terminal 852*a* is coupled to an A+ contact pad 766*a* which is coupled to the most positive terminal of the A string of cells, referred to as A+, a second power terminal 852*b* is coupled to a B+ contact pad 766*b* which is coupled to the most positive terminal of the B string of cells, referred to as B+, a third power terminal 852 is coupled to a C+ contact pad 766*c* which is coupled to the most positive terminal of the C string of cells, referred to as C+, a fourth power terminal 852*d* is coupled to a B− contact pad 766*d* which is coupled to the most negative terminal of the B string of cells, referred to as B−, a fifth power terminal 852*d* is coupled to an A− contact pad 766*e* which is coupled to the most negative terminal of the A string of cells, referred to as A− and a sixth power terminal 852*f* is coupled to a C− contact pad 766*f* which is coupled to the most negative terminal of the C string of cells, referred to as C−. In addition, the A+ contact pad 766*a* is electrically coupled to a first battery terminal 734, referred to as BATT+ and the C− contact pad 766*f* is electrically coupled to a second battery terminal 734, referred to as BATT−.

The mating end 854 of the power terminals 852 are configured to mate with corresponding insertion terminals 860 (also referred to as shorting terminals) described below. When the convertible battery pack 20A4 is in this state—without a converter element 750" in place or with a converter element 750" in an intermediate state, as described below, the convertible battery pack 20A4 is in an open state. In the open state the strings of cells 754 are not connected to each other, as noted in the illustrated schematic of FIG. 99*a*. As such, the convertible battery pack 20A4 will not provide a voltage to the outside world. In other words, there will be no voltage potential between BATT+ and BATT−.

Figure 99B:
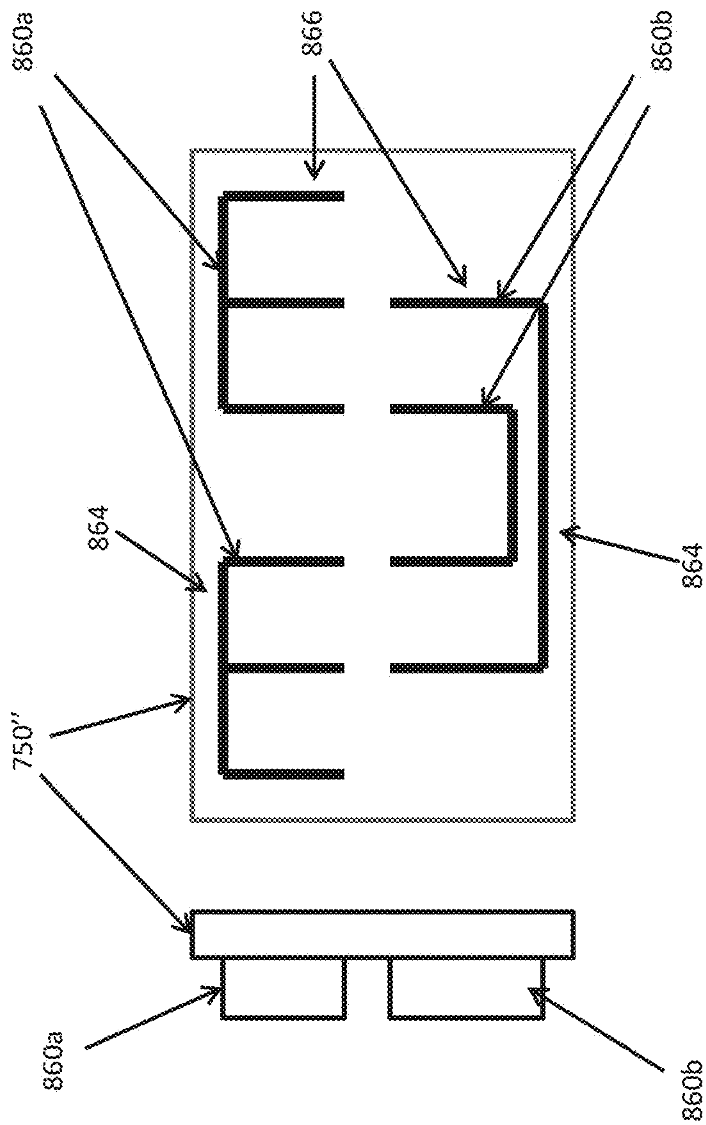

Referring to FIG. 99*b*, there is illustrated a sliding converter element 750". The converter element 750" includes the plurality of conductive insertion or shorting terminals 860 and a non-conductive support structure for holding the shorting terminals. There are two types of shorting terminals 860. The first type of shorting terminal 860*a* includes a jumper portion 864 and three insertion portions 866. The second type of shorting terminal 860*b* includes a jumper portion 864 and two insertion portions 866. In this embodiment, the number of the first type of shorting terminals 860*a* will be two while the number of insertion portions 866 of the first type shorting terminal 860*a* is based on the number of strings of cells in the battery 752 and the number of the second type shorting terminals 860*b* is based on the number of strings of cells in the battery 752 while the number of insertion portions 866 of the second type of shorting terminal 860*b* will be two. Alternate configurations for the shorting terminals 860 are contemplated and included in the scope of this disclosure.

Figure 99C:
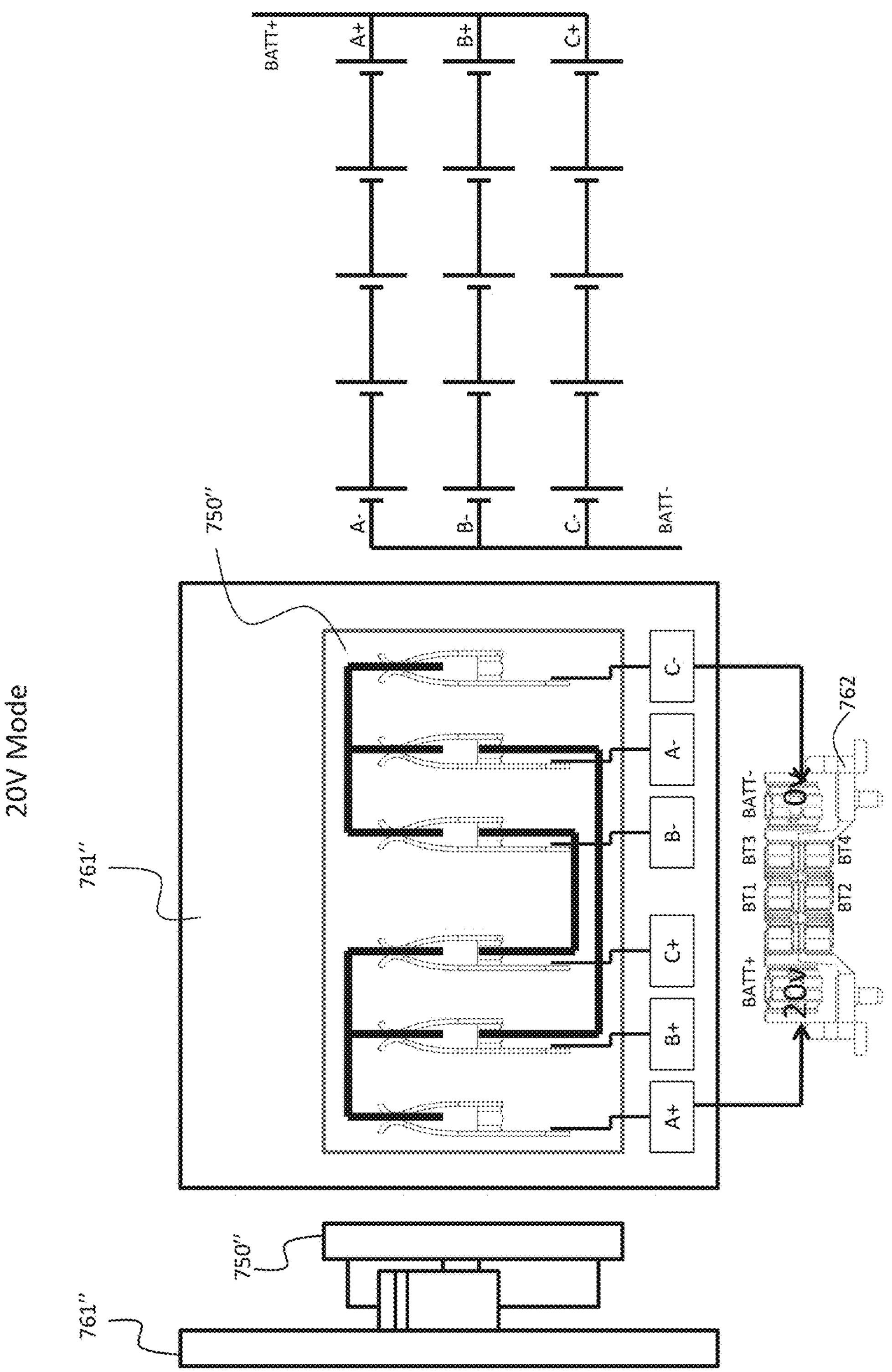

As illustrated in FIG. 99*c*, when the converter element 750" is placed in a first position, referred to as the low rated voltage position, the first-type shorting terminals 860*a* are engaged and electrically coupled to the power terminals 852. In other words, each insertion portion 866 of the two first-type shorting terminals 860*a* are engaged and electrically coupled to the mating end 854 of a specific power terminal 852. Specifically, the three insertion portions 866 of the first first-type shorting terminal 860*a* are inserted into the three positive power terminals 852*a*, 852*b*, 852*c* and the three insertion portions 866 of the second first-type of shorting terminals 860*a* are inserted in the three negative power terminals 852*d*, 852*e*, 852*f*. In this configuration, the positive terminals of all three strings are connected to each other and the negative terminals of all three strings are connected to each other. Furthermore, in this configuration, the BATT− battery terminal 734 is electrically coupled to the C− contact pad 858*f* which is electrically coupled to the C− power terminal 852*f* which is electrically coupled to the A− power terminal 852*d* and the B− power terminal 852*e* which are electrically coupled to the C−, A− and B− terminals of the respective strings of cells. The BATT− battery terminal 734 is a ground reference for the BATT+ battery terminal 734. And, the BATT+ battery terminal 734 is electrically coupled to the A+ contact pad 858*a* which is electrically coupled to the A+ power terminal 852*a* which is electrically coupled to the B+ power terminal 852*b* and the C+ power terminal 852*c* which are electrically coupled to the A+, B+ and C+ terminals of the respective strings of cells. This places a low rated voltage (whatever that low rated voltage may be based on the number of cells in a string and the rated voltage of the cell, e.g. the low rated voltage for a 4 v rated cell with five cells per string would be 20V) on BATT+. When the converter element 750" is in this position, the second-type shorting terminals 860*b* are positioned at the non-mating end 856 of the power terminals 852 and are not electrically coupled to the power terminals 852. This places the strings of cells and consequently the battery 752 in a parallel configuration, as illustrated by the circuit diagram.

Figure 99D:
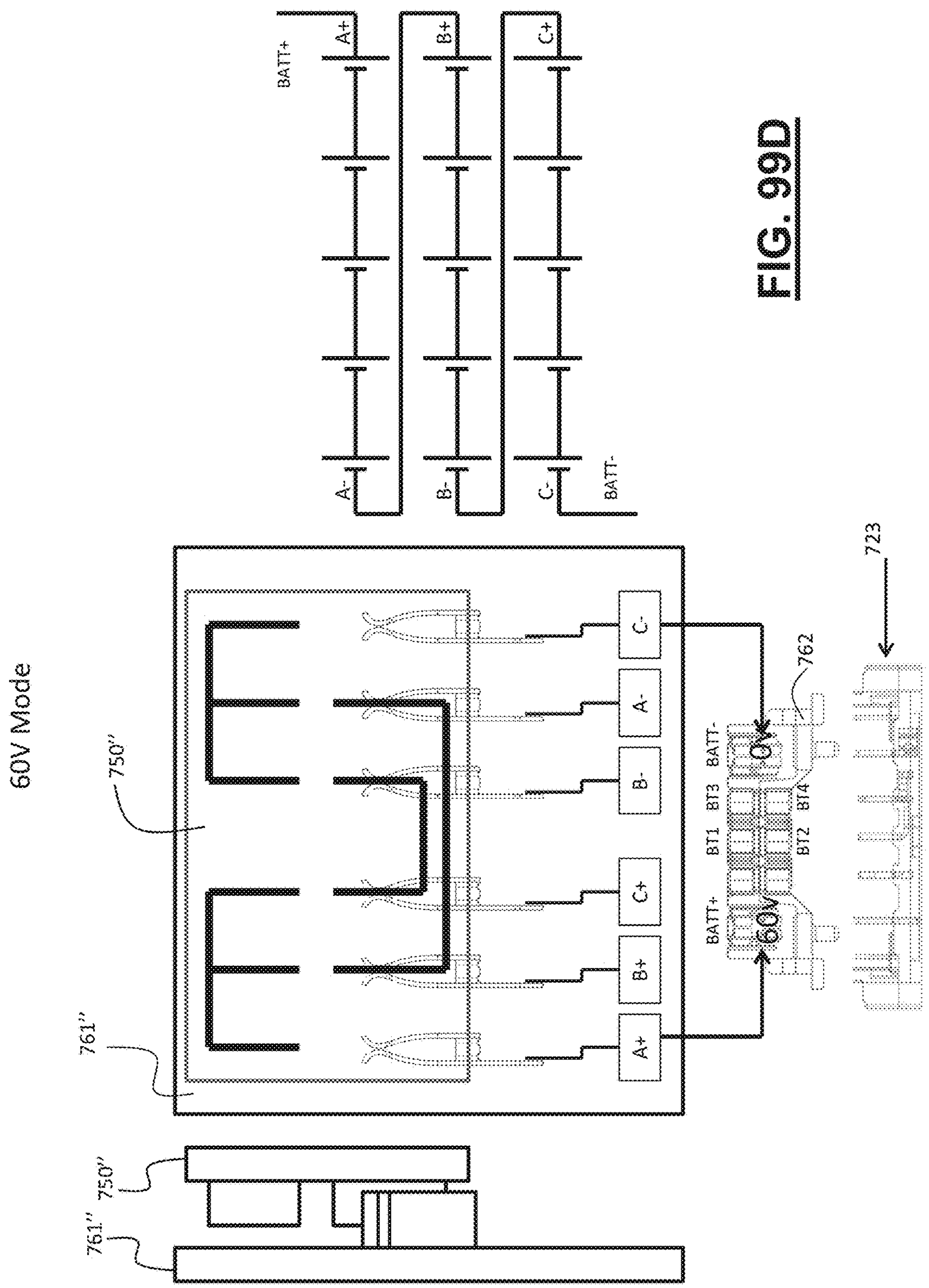

As illustrated in FIG. 99*d*, when the converter element 750" is placed in a second position, referred to as the medium rated voltage position, the first-type shorting terminals 860*a* are not engaged and not electrically coupled to the power terminals 852 and the second-type shorting terminals 860*b* are engaged and electrically coupled to the power terminals 852. In other words, each insertion portion 866 of the two second-type shorting terminals 860*b* are engaged and electrically coupled to the mating end 854 of a specific power terminal 852. Specifically, the first insertion portion 866 of the first second-type shorting terminal 860*b* is inserted into the B+ power terminal 852*b* and the second insertion portion 866 of the first second-type shorting terminal 860*b* is inserted into the A− power terminal 852*e* (thereby electrically coupling the B+ power terminal 852*b* to the A− power terminal 852*e* through the jumper portion 864 of the first second-type shorting terminal 860*b* and therein coupling the B+ terminal of the B string of cells to the A− terminal of the A string of cells) and the first insertion portion 866 of the second second-type shorting terminal 860*b* is inserted into the C+ power terminal 852*c* and the second insertion portion 866 of the second second-type shorting terminal 860*b* is inserted into the B− power terminal 852*d* (thereby electrically coupling the C+ power terminal 852*c* to the B− power terminal 852*d* through the jumper portion 864 of the second second-type shorting terminal 860*b* and therein coupling the C+ terminal of the C string of cells to the B− terminal of the B string of cells). This places the strings of cells and consequently the battery 752 in a series configuration, as illustrated by the circuit diagram.

Figure 100A:
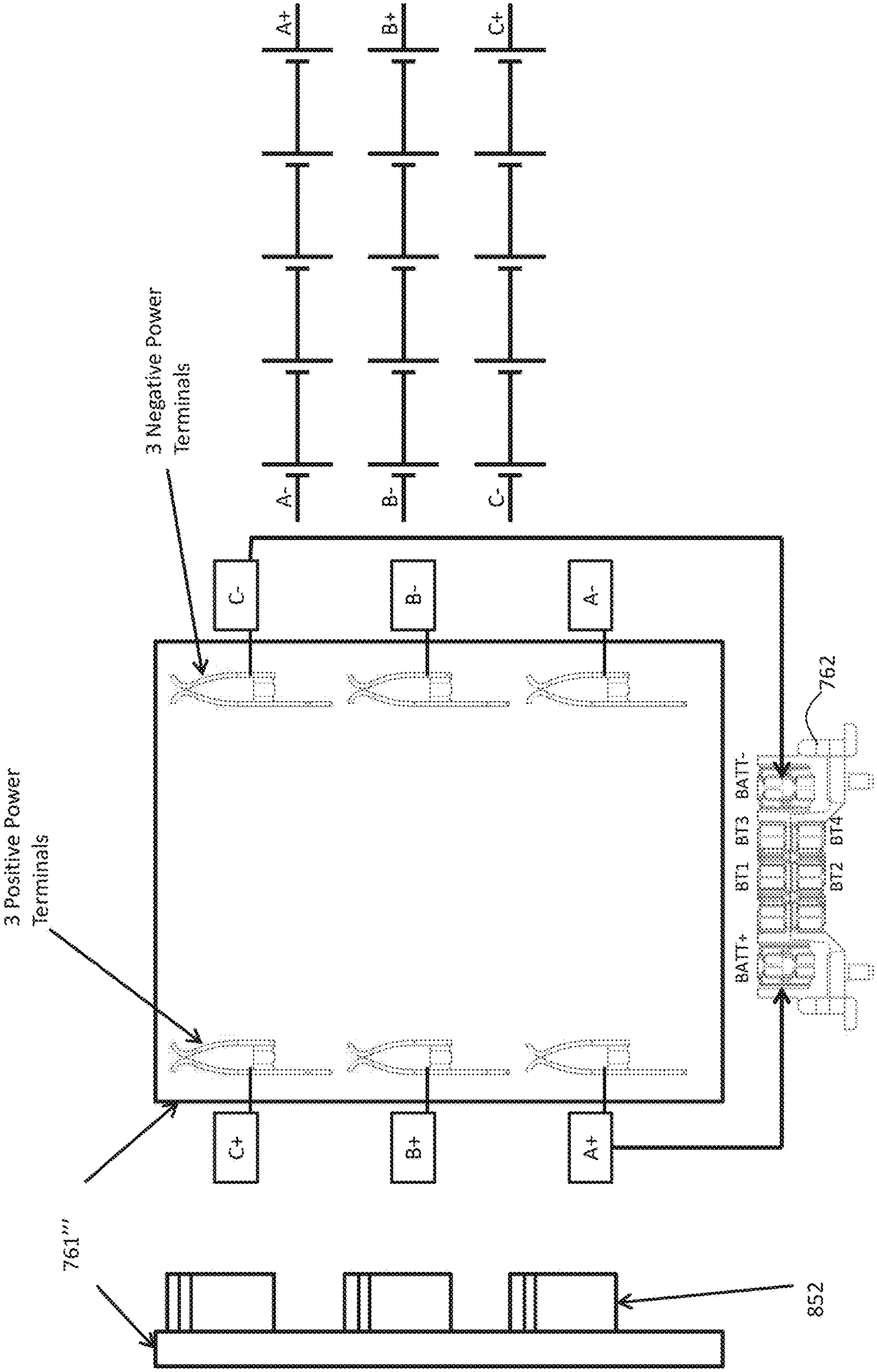
Figure 100B:
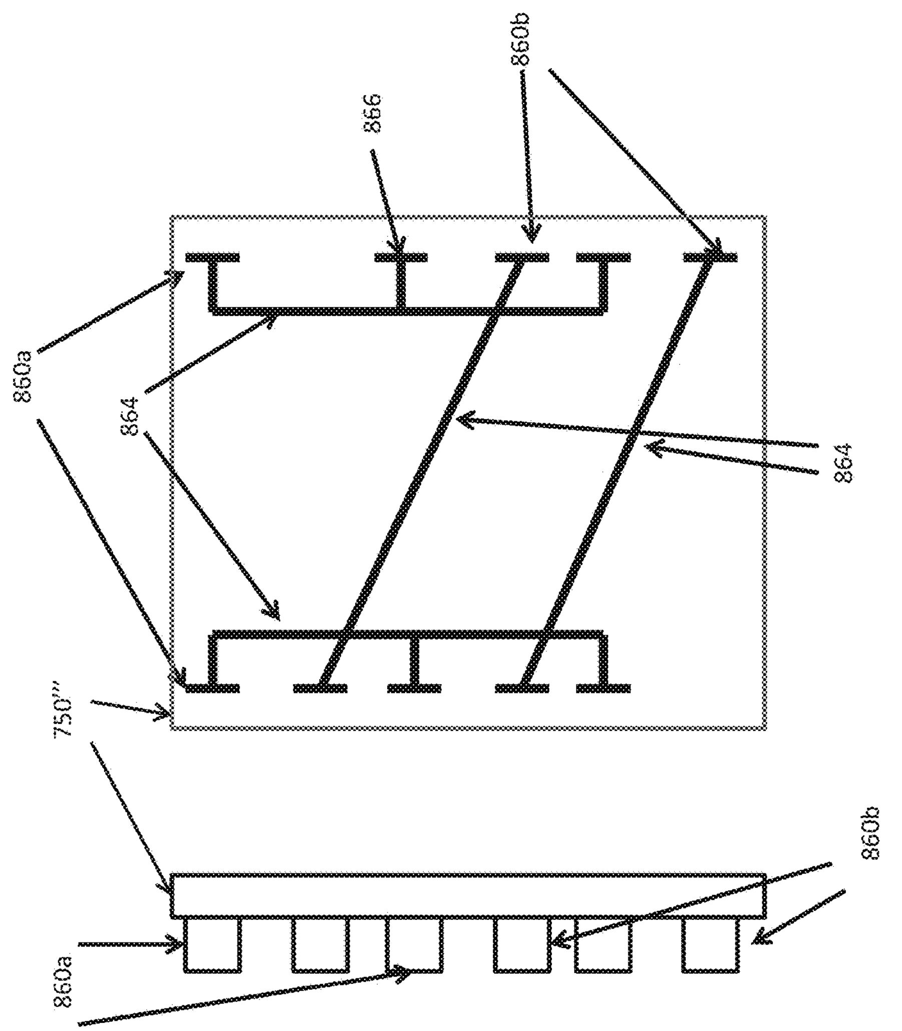
Figure 100C:
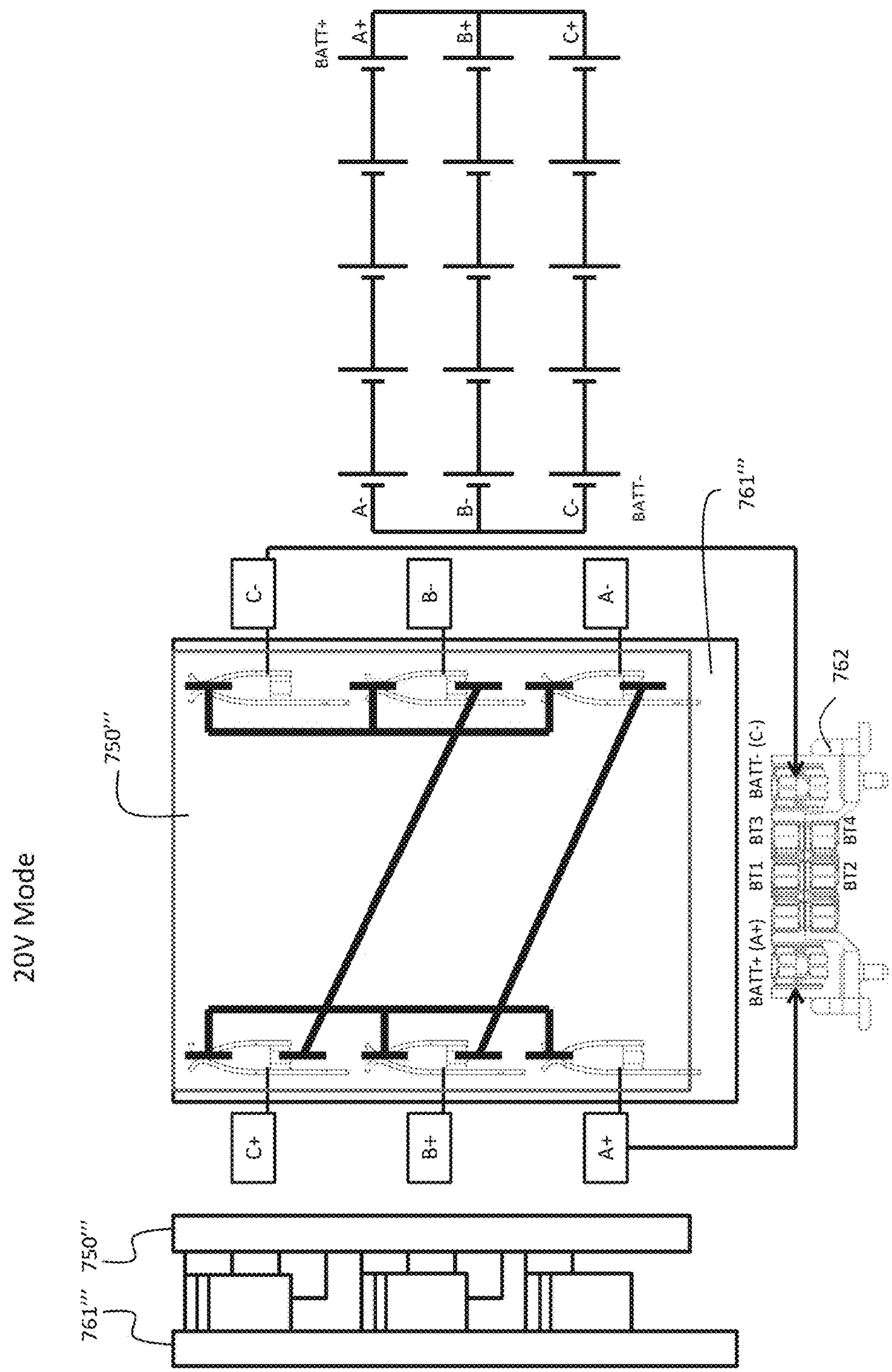
Figure 100D:
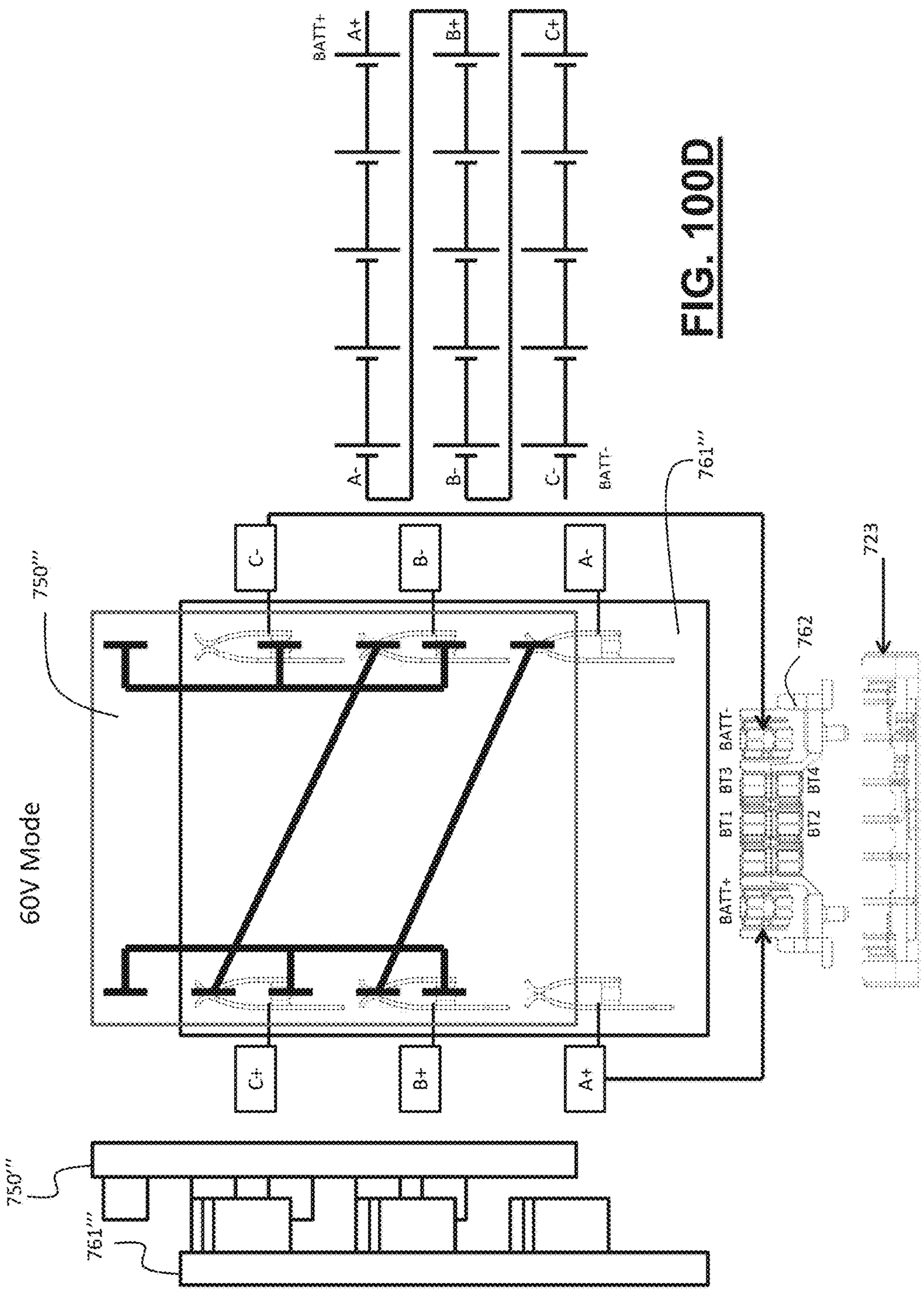

FIGS. 100*a*-100*d* illustrate an alternate, exemplary embodiment for a converting subsystem 772. Similar to the subsystem described above, this subsystem provides a system for converting a convertible battery pack 20A4 from a low rated voltage battery pack to a medium rated voltage battery pack. This embodiment is very similar to the embodiment illustrated in FIG. 99. This embodiment also includes tulip power terminals 852 however, the power terminals 852 are positioned in a different configuration. The power terminal configuration is illustrated in FIG. 100*a*. The converter element 750'" illustrated in FIG. 100*b* is also similar but different to the converter element 750" illustrated in FIG. 99*b* and described above. As noted above, the jumper portion 864 of the shorting terminals 860—the portion that connects the insertion portions 866—may be embedded in the converter element housing and as such, does not extend from the housing towards the support board 760'". From the side view of the converter element 750'" the jumper portion 864 will not be readily visible while the insertion portions 866 of both the 20 v shorting terminals 860*a* and the 60 v shorting terminals 860*b* are visible. In this embodiment, the jumper portions 864 of both shorting terminals 860*a*, 860*b* may be embedded in a PCB on different levels such that they are electrically isolated from each other.

In other respects, the embodiment illustrated in FIGS. 100*a*-100*d* operates in the same manner as the embodiment illustrated in FIGS. 99*a*-99*d* as described above.

FIGS. 101*a*1-101*b*2 illustrate an alternate, exemplary embodiment for a converting subsystem 772'. Similar to the subsystems described above, this subsystem provides a system for converting a convertible battery pack 20A4 from a low rated voltage battery pack to a medium rated voltage battery pack. FIGS. 101*a*1 and 101*a*2 illustrate the exemplary embodiment in a low rated voltage configuration, e.g., 20V from two different perspectives. FIGS. 101*b*1 and 101*b*2 illustrate the exemplary embodiment in a medium rated voltage configuration, e.g., 60V from two different perspectives. The converting subsystem 772' includes two converter elements 900. Each converter element 900 includes a support structure 902, in this embodiment a triangular wall. There is a first converter element 900*a* for coupling the positive terminals of the strings of cells and a second converter element 900*b* for coupling the negative terminals of the strings of cells. In each converting element 900 there is a shorting bar 904 sits atop the support structure 902 and on both vertical walls of the support structure 902. Each converter element 900 includes a support arm system for each support structure 902 wherein each support arm system includes three pairs of support arms 906. The support arm system also includes a compression spring 908 for each support arm 906 that keeps the support arms 906 in an extended position. The system also includes an actuator 910. The actuator 910 includes an engagement end 912 and an engaging leg 914. The actuator 910 is configured such that the engaging leg 914 is configured to engage an engaging arm 916 attached to each support arms 906. A subset of the support arms 906 also includes a contact spring 918, for example a leaf type spring. A first end of the contact spring 918 is coupled to an end of the support arm 906 and a second end of the contact spring 918 is pressed against the support structure 902. Each contact spring 918 is electrically coupled to a respective terminal of a string of cells. Specifically, the A+ contact spring 918 is electrically coupled to the A+ terminal of the A string of cells, the B+ contact spring 918 is electrically coupled to the B+ terminal of the B string of cells, the C+ contact spring 918 is electrically coupled to the C+ terminal of the C string of cells, the A− contact spring 918 is electrically coupled to the A− terminal of the A string of cells, the B− contact spring 918 is electrically coupled to the B− terminal of the B string of cells, and the C− contact spring 918 is electrically coupled to the C− terminal of the C string of cells. The first converter element 900*a* also includes a B− contact spring 918 and a second C+ contact spring 918. The B− contact spring 918 is electrically coupled to the B− terminal of the B string of cells and the second C+ contact spring 918 is electrically coupled to the C+ terminal of the C string of cells. The second converter element 900*b* also includes a second A− contact spring 918 and a B+ contact spring 918. The second A− contact spring 918 is electrically coupled to the A− terminal of the A string of cells and the B+ contact spring 918 is electrically coupled to the B+ terminal of the B string of cells.

As illustrated in FIGS. 101$a$1 and 101$a$2, when convertible battery pack 20A4 is not connected to any tool 10A or is mated to a low rated voltage tool 10A or to a low rated voltage charger 30, the converting subsystem 772' is in the low rated voltage configuration, the actuators 910$a$, $b$ are not engaged with the support arm systems, the compression springs 908 are in their uncompressed state and the support arm systems are in a first position. In this first position, the A+ contact spring 918, B+ contact spring 918 and first C+ contact spring 918 of the first converter element 900$a$ are forced in an upward position such that they couple with the shorting bar 904$a$ and the B− contact spring 918 and second C+ contact spring 918 of the first converter element 900$a$ are in a relaxed, downward position such that they are not coupled with the shorting bar 904$a$. Also, the first A− contact spring 918, the B− contact spring 918 and the C− contact spring 918 of the second converter element 900$b$ are forced in an upward position such that they couple with the shorting bar 904$b$ and the second A− contact spring 918 and the B+ contact spring 918 of the second converter element 900$b$ are in a relaxed, downward position such that they are not coupled with the shorting bar 904$b$. The shorting bar 904$b$ acts as a closed switch between the contact springs 918. In this first position, the A+ contact spring 918, the B+ contact spring 918 and the first C+ contact spring 918 are electrically coupled to each other and the first A− contact spring 918, the B− contact spring 918 and the C− contact spring 918 are electrically coupled to each other. As such, A+, B+ and C+ terminals are electrically coupled to each other and the A−, B− and C− terminals are electrically coupled to each other. When the converter elements 900 are in this first position, the strings of battery cells 754 are connected in parallel and the convertible battery pack 20A4 is in the low rated voltage configuration.

As illustrated in FIGS. 101$b$1 and 101$b$2, when the convertible battery pack 20A4 mates with a medium rated voltage power tool or other medium rated voltage electrical device 10A2, the converting subsystem 772' is place into the medium rated voltage configuration. The medium rated voltage tool 10A2 will include a conversion feature that engages the engagement end of the actuators 910$a$, 910$b$. As the actuator 910 moves (to the right of the page in the orientation of the FIGS.) the engaging end of the actuator 910 will engage with the engaging arm of each support arm. The engaging arm will force the compression springs 908 to compress and the support arm systems are place into a second position. In this second position, the A+ contact spring 918, B+ contact spring 918 and first C+ contact spring 918 of the first converting element 900$a$ are allowed to move into a relaxed, downward position such that they decouple with the shorting bar 904$a$ and the B− contact spring 918 and second C+ contact spring 918 of the first converting element 900$a$ are forced into an upward position such that they are electrically coupled with the shorting bar 904$a$. Also, the first A− contact spring 918, the B− contact spring 918 and the C− contact spring 918 of the second converting element 900$b$ are allowed to move into a relaxed, downward position such that they decouple with the shorting bar 904$b$ and the second A− contact spring 918 and the B+ contact spring 918 of the second converting element 900$b$ are forced into an upward position such that they are electrically coupled with the shorting bar 904$b$. Again, the shorting bar 904 acts as a closed switch between the contact springs 918. In this second position, the B− contact spring 918 and the second C+ contact spring 918 are electrically coupled to each other and the second A− contact spring 918 and the B+ contact spring 918 are electrically coupled to each other. As such, A− and B+ terminals are electrically coupled to each other and the B− and C+ terminals are electrically coupled to each other. When the converting elements 900 are in this second position, the strings of battery cells 754 are connected in series and the convertible battery pack 20A4 is in the medium rated voltage configuration.

FIGS. 102$a$1-102$b$2 illustrate an alternate, exemplary embodiment for a converting subsystem 772". Similar to the subsystems described above, this subsystem provides a system for converting a convertible battery pack 20A4 from a low rated voltage battery pack to a medium rated voltage battery pack. FIGS. 102$a$1 and 102$a$2 illustrate the exemplary embodiment in a low rated voltage configuration, e.g., 20V from two different perspectives. FIGS. 102$b$1 and 102$b$2 illustrate the exemplary embodiment in a medium rated voltage configuration, e.g., 60V from two different perspectives. The converting subsystem 772" includes two converter elements 921$a$, 921$b$. Each converter element 921 includes a support structure 922, in this embodiment a rectangular wall. There is a first converter element 921$a$ for coupling the positive terminals of the strings of cells and a second converter element 921$b$ for coupling the negative terminals of the strings of cells. In this embodiment, the support structure 922 is a shorting bar. Each converter element 921 includes a support arm system. Each support arm system includes three pairs of support arms 923. The support arm system also includes a first compression spring 924 for each pair of support arms that keeps the pair of support arms 923 in a first position and a second compression spring 925 for each pair of support arms that keeps the pair of support arms in a second position. The support arm system also includes an actuator 926. The actuator 926 includes an engagement end 928 and an engaging leg 929. The actuator 926 is configured such that the engaging leg 929 is configured to engage one of the support arms 923 of each pair of support arms 923. A contact 930 is coupled to an end of a subset of support arms 923 and a portion of the contact 930 is configured to press against the shorting bar 922. Each contact 930 is electrically coupled to a respective terminal of a string of cells. Specifically, the A+ contact 930$a$1 is electrically coupled to the A+ terminal of the A string of cells, the B+ contact 930$a$2 is electrically coupled to the B+ terminal of the B string of cells, the C+ contact 930$a$3 is electrically coupled to the C+ terminal of the C string of cells, the A− contact 930$b$1 is electrically coupled to the A− terminal of the A string of cells, the B− contact 930$b$2 is electrically coupled to the B− terminal of the B string of cells, and the C− contact 930$b$3 is electrically coupled to the C− terminal of the C string of cells. The first converter element 921$a$ also includes a B− contact 930$a$4 and a second C+ contact 930$a$5. The B− contact 930$a$4 is electrically coupled to the B− terminal of the B string of cells and the second C+ contact 930$a$5 is electrically coupled to the C+ terminal of the C string of cells. The second converter element 921$b$ also includes a second A− contact 930$b$4 and a B+ contact 930$b$5. The second A− contact 930$b$4 is electrically coupled to the A− terminal of the A string of cells and the B+ contact 930$b$5 is electrically coupled to the B+ terminal of the B string of cells.

As illustrated in FIGS. 102$a$1 and 102$a$2, when the convertible battery pack 20A4 is not connected to any power tool 10A or is mated to a low rated voltage power tool 10A2 or to a low rated voltage charger 30, the converting subsystem 772" is in the low rated voltage configuration, the actuators 926 are not engaged with the support arms 923, the set of first compression springs 924 are in their uncompressed state and the support arms 923 are in a first position.

In this first position, the A+ contact 930*a*1, B+ contact 930*a*2 and first C+ contact 930*a*3 of the first converter element 921*a* are forced in an engaging position such that they couple with the shorting bar 922*a* and the B− contact 930*a*4 and second C+ contact 930*a*5 of the first converter element 921*a* are in an non-engaging position such that they are not coupled with the shorting bar 922*a*. Also, the first A− contact 930*b*1, the B− contact 930*b*2 and the C− contact 930*b*3 of the second converter element 921*b* are forced in an engaging position such that they couple with the shorting bar 922*b* and the second A− contact 930*b*4 and the B+ contact 930*b*5 of the second converter element 921*b* are in a non-engaging position such that they are not coupled with the shorting bar 922*b*. The shorting bar 922 acts as a closed switch between the contact 930. In this first position, the A+ contact 930*a*1, the B+ contact 930*a*2 and the first C+ contact 930*a*3 are electrically coupled to each other through the shorting bar 922*a* and the first A− contact 930*b*1, the B− contact 930*b*2 and the C− contact 930*b*3 are electrically coupled to each other through the shorting bar 922*b*. As such, A+, B+ and C+ terminals are electrically coupled to each other and the A−, B− and C− terminals are electrically coupled to each other. When the converter elements 921 are in this first position, the strings of battery cells 754 are connected in parallel and the battery 752 is in the low rated voltage configuration.

As illustrated in FIGS. 102*b*1 and 102*b*2, when the convertible battery pack 20A4 mates with a medium rated voltage power tool or other medium rated voltage electrical device 10A2, the converting subsystem 772" is placed into the medium rated voltage configuration. The medium rated voltage power tool 10A2 will include a conversion feature that engages the engagement end 928 of the actuators 926. As the actuator 926 moves (to the right of the page in the orientation of the FIGS.) the engaging leg 929 of the actuator 926 will engage with one of the support arms 923 of each pair of support arms 923. The engaged support arm 923 will pivot about a corner of the support structure/ shorting bar 922 and will force the set of first compression springs 924 to compress and allow the set of second compressions springs 925 to expand and the support arm systems are therein placed into a second position. In this second position, the A+ contact 930*a*1, B+ contact 930*a*2 and first C+ contact 930*a*3 of the first converter element 921*a* are allowed to move away from the shorting bar 922*a* such that they decouple with the shorting bar 922*a* and the B− contact 930*a*4 and second C+ contact 930*a*5 of the first converter element 921*a* are forced into contact with the shorting bar 922*a* such that they electrically couple with the shorting bar 922*a*. Also, the first A− contact 930*b*1, the B-contact 930*b*2 and the C− contact 930*b*3 of the second converter element 921*b* are allowed to move away from the shorting bar 922*b* such that they decouple with the shorting bar 922*b* and the second A− contact 930*b*4 and the B+ contact 930*b*5 of the second converter element 921*b* are forced into contact with the shorting bar 922*b* such that they electrically couple with the shorting bar 922*b*. Again, the shorting bar 922 acts as a closed switch between the contacts 930. In this second position, the B− contact 930*a*4 and the second C+ contact 930*a*5 are electrically coupled to each other through the shorting bar 922*a* and the second A− contact 930*b*4 and the B+ contact 930*b*5 are electrically coupled to each other through the shorting bar 922*b*. As such, A− and B+ terminals are electrically coupled to each other and the B− and C+ terminals are electrically coupled to each other. When the converter elements 921 are in this second position, the strings of battery cells 754 are connected in series and the battery 752 is in the medium rated voltage configuration.

FIGS. 103*a*, 103*b*, and 103*c* illustrate another alternate exemplary embodiment of a converting subsystem 772''' of a convertible battery pack 20A4. This subsystem uses a rack and pinion configuration. Similar to aforementioned configuration, this converter element 941 includes a support housing 942. The support housing 942 includes two converter element projections 943 that extend from the support housing 942 through a hole in the battery pack housing 712 and extend from the battery pack housing 712. A mating power tool 10A2 would include corresponding projection to engage the converter element projections 943 and force the converter element 941 to move in a mating direction A. The converter element 941 also includes a rack gear 945. The rack gear 945 is fixedly coupled to the support housing 942 such that the rack gear 945 will move in synchronization with the support housing 942. The converting subsystem 772''' also includes a pinion gear 946. The pinion gear 946 is rotatably coupled to a support board (not shown for simplicity). The converting subsystem 772''' also includes a torsion spring 947 favoring a clockwise (in the orientation of the figure) direction. In this embodiment the clockwise direction is the low rated voltage configuration, as explained below. The pinion gear 946 includes a pair of low voltage, e.g., 20 v, shorting bars 948 and a pair of medium voltage, e.g., 60 v, shorting bars 950. The low voltage shorting bars 948 include three legs and the medium voltage shorting bars 950 include two legs. The converting subsystem 772''' also includes a plurality of contacts 952 electrically coupled to the specific terminals of the strings of cells. The contacts 952 will remain stationary relative to the pinion gear 946 as the pinion gear 946 rotates. Specifically, beginning at approximately 9 o'clock when considering FIG. 103*a* and moving in the clockwise direction, there is a B+ contact 952*a* coupled to the B+ terminal, an A− contact 952*b* coupled to the A− terminal, a B− contact 952*c* coupled to the B− terminal, a C+ contact 952*d* coupled to the C+ terminal, a C− contact 952*e* coupled to the C− terminal, a B− contact 952*f* coupled to the B− terminal, an A− contact 952*g* coupled to the A− terminal, a C+ contact 952*h* coupled to the C+ terminal and an A+ contact 952*i* coupled to the A+ terminal. This configuration assumes three strings of cells as described above. Embodiments which include the converting subsystem 772''' rotating in an opposing direction, other cell configurations, contact configurations and shorting bar configurations are contemplated by and included in the scope of this disclosure.

As illustrated in FIG. 103*a*, in the low rated voltage configuration a first low voltage shorting bar 948*a* electrically couples a first subset of the contacts—specifically the B+ contact 952*a*, A+ contact 952*i*, and C+ contact 952*h* and a second low voltage shorting bar 948*b* electrically couples a second subset of the contacts—specifically the A− contact 952*g*, B− contact 952*f*, and C− contact 952*d*. This places the strings of cells in a parallel configuration and the convertible battery pack 20A4 in the low rated voltage configuration.

As illustrated in FIG. 103*b*, when the power tool 10A2 engages the convertible battery pack 20A4 and moves further in the mating direction A, the converter element 941 is moved in the mating direction A. This action moves the rack gear 45 in the mating direction A. As the rack gear 945 moves in the mating direction A the pinion gear 946 will be forced to move in a counterclockwise direction. As the pinion gear 946 moves in the counterclockwise direction the first and second low voltage shorting bars 948 will decouple from the first and second subsets of contacts 952, respectively. In this position, the convertible battery pack 20A4 will be in an open state—neither low rated voltage nor medium rated voltage. There will be no voltage potential between the BATT+ and BATT− terminals of the battery 752.

As illustrated in FIG. 103*c*, as the power tool 10A2 further engages the convertible battery pack 20A4 and moves further in the mating direction A, the converter element 941 is moved in the mating direction A. This action moves the rack gear 945 in the mating direction A. As the rack gear 945 moves in the mating direction A the pinion gear 946 will be forced to move further in the counterclockwise direction. As the pinion gear 946 moves in the counterclockwise direction the first medium voltage shorting bar 950*a* will electrically couple a third subset of contacts—specifically the A− contact 952*b* and B+ contact 952*a* and the second medium voltage shorting bar 950*b* will electrically couple a fourth subset of contacts—specifically the B− contact 952*c* and C+ contact 952*d*. This places the strings of cells in a series configuration and the convertible battery pack 20A4 in the medium rated voltage configuration.

When the power tool 10A2 is unmated from the convertible battery pack 20A4 the tool 10A2 will move in a direction opposite to the mating direction A, relative to the convertible battery pack 20A4. As the power tool 10A2 unmates from the convertible battery pack 20A4, the torsion spring 947 will force the pinion gear 946 to move in a clockwise direction. As a result the medium voltage shorting bars 950 will decouple from the third and fourth subsets of the contacts. This will move the convertible battery pack 20A4 into the open state. As the power tool 10A2 further unmates from the convertible battery pack 20A4 the torsion spring 947 will force the pinion gear 946 to move further in the clockwise direction. As a result the low voltage shorting bars 948 will electrically couple to the first and second subsets of the contacts. This will move the convertible battery pack 20A4 into the low rated voltage state.

FIGS. 104 and 105 illustrate an alternate embodiment for actuating a converter element 960 of a convertible battery pack 20A4. In this embodiment, the convertible battery pack 20A4 includes a button 961 centrally located on the top portion 963 of the battery pack housing 962. The button 961 is movable between an unengaged position—illustrated in FIGS. 104*a* and 104*b*—and an engaged position—illustrated in FIGS. 105*a* and 105*b*. The button 961 is moveable along a long axis of the convertible battery pack 20A4 in the direction of attachment and detachment with the electrical device 10A2 to which it will couple. The button 961 is mechanically coupled to a U-shaped actuating member 964. The actuating member 964 includes a crossbar 965 coupled to the button 961 and two parallel legs 966. One of the parallel legs 966 is attached to each end of the crossbar 965. The legs 966 are configured such that each of the legs 966 abuts against one of the parallel legs 967 of a U-shaped converter element 960—similar to a converter element described above. Similar to the convertible battery packs described above, the convertible battery pack 20A4 illustrated in FIGS. 104 and 105 includes a pair of compression springs 968. One end of the compression springs 968 is attached to an end of a converter element crossbar 969 and the other end of the compression springs 968 is attached to the converter element housing.

A medium rated voltage power tool 10A2 that is configured to mate with the convertible battery pack 20A4 would include a projection or extension in the power tool foot (similar to a projection described above) positioned to engage the button 961 when the power tool 10A2 is mated to the convertible battery pack 20A4. When the power tool 10A2 is mated to the convertible battery pack 20A4 the tool foot projection will force the button 961 into the battery pack housing 962 thereby forcing the U-shaped actuating member 964 to force the converter element 960 to move along the mating direction. This will compress the springs 968. As described above, the converter element 960 will convert the convertible battery pack 20A4 from a low rated voltage configuration to medium rated voltage configuration. When the convertible battery pack 20A4 is removed from the power tool 10A2 the springs 968 will force the converter element 960 to its original position. This will convert the convertible battery pack 20A4 back to the low rated voltage configuration.

A concern with a convertible battery pack 20A4 as illustrated and described in this disclosure is that the convertible battery pack 20A4 remains in its medium rated voltage configuration when the convertible battery pack is removed from the medium rated voltage tool or other converting tool. If a convertible battery pack 20A4 were to remain in the medium rated voltage configuration and then mated with a low rated voltage power tool, the low rated voltage power tool could be damaged. FIGS. 106*a*-106*g* illustrate a system and method for addressing this concern.

In certain exemplary embodiments of the convertible battery pack 20A4 described above and in related applications, the convertible battery pack 20A4 includes a converter element similar to the converter elements described above. The converter element includes a converter projection 971. As described above, the converter projection 971 may reside in a raceway (not shown but described above) and may not extend from the top of the convertible battery pack 20A4. In FIG. 106, the converter projection 971 is illustrated extending from the top of the convertible battery pack 20A4 for purposes of illustration and it is not intended to limit the placement of the converter projection 971. Furthermore, in certain exemplary embodiments of a medium voltage rated power tool described above and in related applications, the power tool includes a conversion element 972. The conversion element 972 may extend from the converting tool foot. When the medium rated voltage power tool 10A2 (or other converting power tool 10) is mated with the convertible battery pack 20A4 the conversion element 972 engages the converter projection 971 and forces the converter projection 971 and therefore the converter element to move from a first low voltage position to a second, medium voltage position. When the convertible battery pack 20A4 is removed from the medium voltage rated power tool 10A2 (or other converting power tool 10) a spring mechanism (as described above) in the convertible battery pack 20A4 should force the converter element back to the first, low rated voltage position. However, if the spring mechanism fails or some other fault occurs the converter element could remain in the second, medium voltage position.

Figures 106A, 106B, 106C:
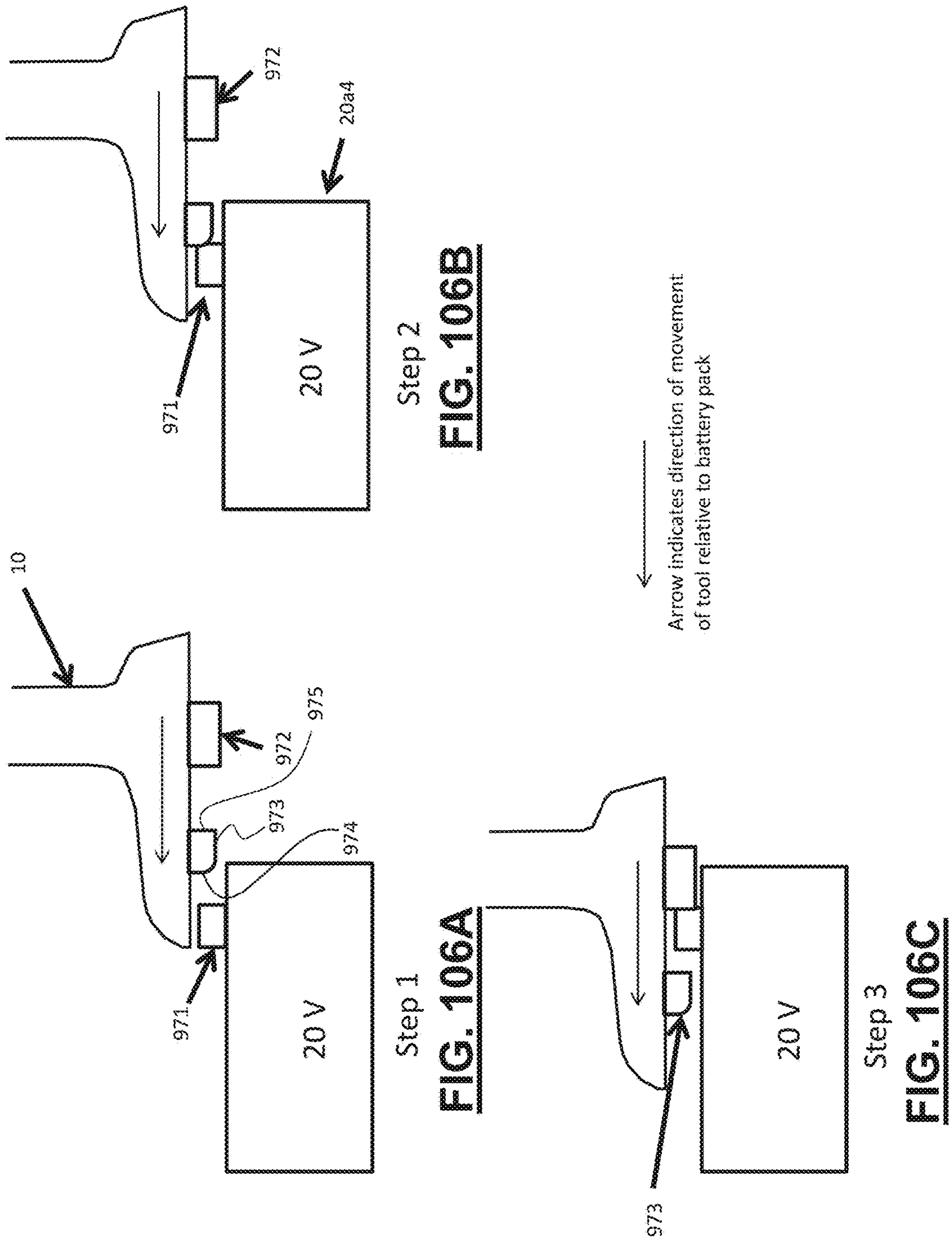
Figure 106D:
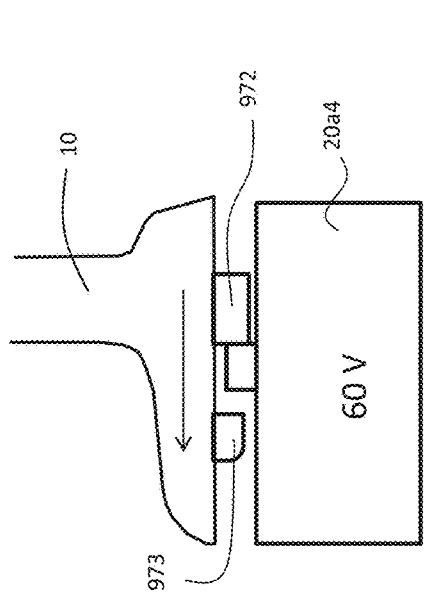

In the exemplary embodiment of the medium rated voltage power tool 10A2 and the convertible battery pack 20A4 illustrated in FIG. 106*a*, the medium rated voltage power tool 10A2 includes an additional feature, referred to as a return element 973. The return element 973 is positioned in front of the conversion element 972 (relative to the convertible battery pack 20A4) and also extends from the tool foot. As noted above, the conversion element 972 has been described as moving in a raceway to engage the converter projection 971. The return element 973 would be positioned in line with the conversion element 972 and would also move in the raceway. Both the conversion element 972 and the return element 973 are illustrated as moving along the top of the convertible battery pack 20A4. This is simply for illustration purposes and is not intended to limit the placement of the conversion element 972 or the return element 973. The return element 973 is configured with a rounded or bullnose forward edge 974 and is made of a deformable rubber material or a spring loaded pin, or other component, material or assembly possessing mechanical properties that allow it to retract or compress. As illustrated in FIG. 106*b*, as the power tool 10A2 engages the convertible battery pack 20A4 the return element 973 will engage the converter projection 971. Due to the shape and material of the return element 973, the return element 973 will ride over the converter projection 971 without moving the converter projection 971 or moving it only slightly. Thereafter, as illustrated in FIGS. 106*c* and 106*d*, the conversion element 972 will engage the converter projection 971 as described above until the battery 752 is converted from the low voltage configuration to the medium voltage configuration.

Figure 106E:
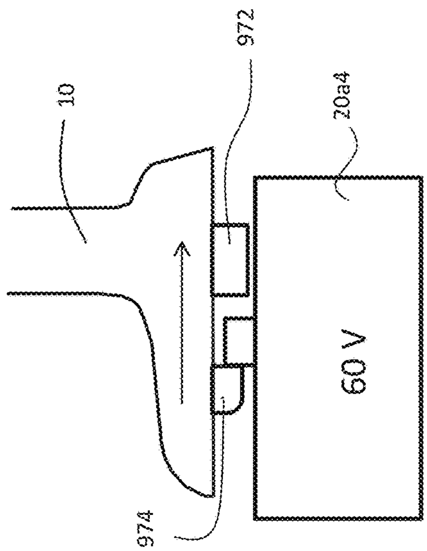
Figure 106F:
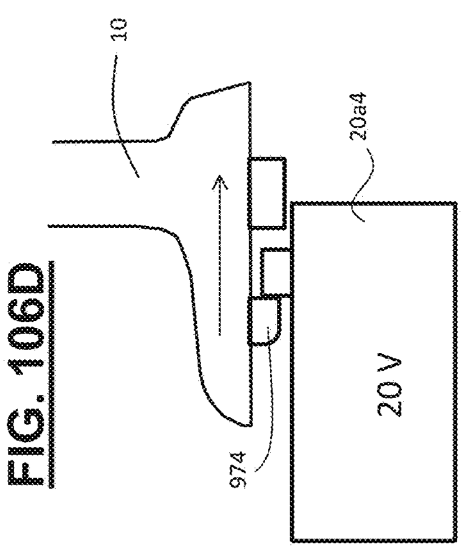
Figure 106G:
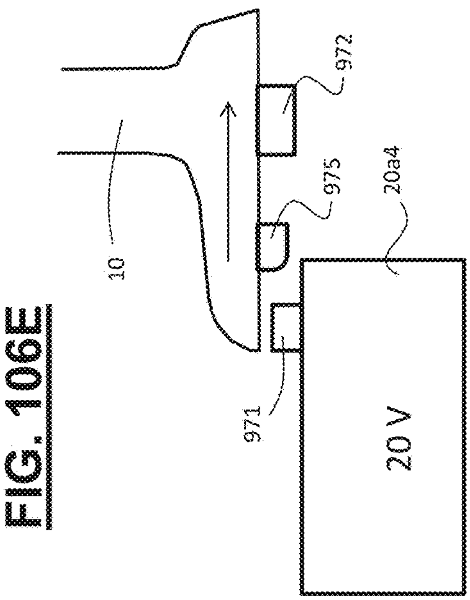

When the convertible battery pack 20A4 is removed from the power tool 10A2, as illustrated in FIG. 106*e*, a rear side 975 of the return element 973 will engage the converter projection 971. Again due to the shape and/or material of the return element 973 it will not ride over the converter projection 971. In the situation where the spring mechanism has failed or some other fault has occurred the return element 973 will force converter projection 971 and therefore the converter element to move from the medium rated voltage configuration to the low rated voltage configuration, as illustrated in FIG. 106*f*. Thereafter, the convertible battery pack 20A4 may be removed from the power tool 10A2 and remain in the low voltage configuration.

FIGS. 108, 109, and 110 illustrate a contact 980 and a method of manufacturing the contact 980. A power tool typically uses a switch with a main on/off contact to make and break current. Robust contacts are made of a high conductivity material or alloy to reduce contact resistance, local heating, and subsequent contact wear. The contact 980 is usually riveted or welded onto a silver plated copper busbar stamping. In certain exemplary convertible battery pack designs, a contact 980 is joined to a complex stamped busbar in order to convert the battery 752 from the low rated voltage configuration, e.g. 20 volts, to the medium rated voltage configuration, e.g. 60 volts. The use of such a stamping increases tooling costs, manufacturing complexity, and unit cost.

The aforementioned complex individual stamped contact is shown in FIG. 110. If the individual stamping were made into two discrete stampings and then joined, the tooling complexity would be reduced and savings could be achieved as less scrap is generated from the single stamping. FIG. 107 illustrates a conventional individual complex stamping (denoted as stamping 1) and associated scrap in lighter shade. FIG. 108 illustrates two discrete stampings (denoted as stamping 2 and 3). The scrap material for the novel discrete stampings is also shown in the lighter shade and is significantly reduced as compared to the conventional stamping method. Once the scrap material is removed the two novel stampings are mechanically joined by a rivet or weld. The rivet then serves as a robust electrical contact for a mating opposing lever arm illustrated in FIG. 43. Scrap material is reduced further if stamping 2 becomes longer.

As discussed below, the set of low rated voltage battery packs 20A1 may also be able to supply power to one or more of the other sets of medium rated voltage DC power tools 10A2, high rated voltage power tools 10A3,10B, for example, by coupling more than one of the low rated voltage battery packs 20A1 to these tools in series so that the voltage of the battery packs is additive. The low voltage battery packs 20A1 may additionally or alternatively be coupled in series with any of the convertible battery packs 20A4 or any of the high voltage packs 20A3 to output the desired voltage level for any of the power tools 10.

In an exemplary embodiment, the medium rated voltage DC power tools 10A2 may configured to couple with and receive electric power from a plurality of low rated voltage battery packs 20A1 that are connected in series to present a medium rated voltage, a medium rated voltage battery pack 20A1, and/or a low/medium rated voltage convertible battery pack 20A4 operating in its medium rated voltage configuration. The medium rated voltage power tools 10A2 have, relatively speaking, a medium rated voltage. In other words, the set of medium rated voltage tools 10A2 are designed to operate using a relatively medium rated voltage DC power supply. Medium rated voltage is a relative term as compared to the low-rated voltage DC power tools 10A1, the high rated voltage power tools 10A3, 10B described above. In an exemplary embodiment, the medium rated voltage power tools 10A2 may have a rated voltage of 40V to 80V, for example 40V, 54V, 72V, and/or 80V.

For example, the high rated voltage power tools 10A3, 10B may be configured to receive electric power from a plurality of low rated voltage battery packs 20A1 or medium rated voltage battery packs 20A2 that are connected to each other in series to have a total high rated voltage, a plurality of low/medium rated voltage convertible battery packs 20A operating in their medium rated voltage configuration and connected to each other in series to have a total high rated voltage, or a single high rated voltage battery pack 20A3. Alternatively, the combined DC voltage of the DC power sources 20A may be in a lower range than the AC voltage level of the AC power source 20B (e.g., 40 VDC to 90 VDC).

For example, the very high rated voltage power tools may be configured to receive electric power from a plurality of low rated voltage battery packs 20A1, medium rated voltage battery packs 20A2, or high rated voltage battery packs 20A3 that are connected to each other in series to have a total very high rated voltage, a plurality of low/medium rated voltage or medium/high rated voltage convertible battery packs 20A4 operating in their medium or high rated voltage configurations and connected to each other in series to have a total very high rated voltage. In one implementation, the power tools 10 include one or more battery pack interface(s) for coupling to any of the removable battery packs 20A, a terminal block for receiving power from the battery pack 20A, and a separate AC power cord or receptacle for coupling the power tool to a source of AC power 20B. In another implementation, the tools 10 may include a power supply interface that can connect the tool 10 to a removable battery pack or to a source of AC power via an adapter. In an embodiment, the battery interfaces are configured to receive low rated voltage battery packs 20A1, medium rated voltage battery packs 20A2, high rated voltage battery packs 20A3, and/or convertible battery packs 20A4.

The very high rated voltage power tools 108 may include, for example, the similar types of tools as the high rated voltage power tools 106, such as drills, circular saws, screwdrivers, reciprocating saws, oscillating tools, impact drivers, flashlights, string trimmers, hedge trimmers, lawn mowers, nailers, rotary hammers, miter saws, chain saws, hammer drills and/or compressors, optimized to work with a very high rated voltage power supply. As described in greater detail below, each of the tools in the very high rated voltage power tools 108 include a power supply interface configured to couple the tools to an AC power supply and/or to a DC power supply.

Referring to FIGS. 118-123, another aspect of the present invention is an electronics module for a convertible battery pack 20A4. In an exemplary embodiment of the convertible battery pack 20A4, the convertible battery pack 20A4 can deliver a low rated voltage, e.g. 20V, or a medium rated voltage, e.g., 60 Volts, at the BATT+/BATT− battery terminals, as described above. In certain embodiments, the convertible battery pack 20A4 may only be charged in the low rated voltage configuration. However, in alternate embodiments, the convertible battery pack 20A4 may be charged in the low rated voltage configuration or medium rated voltage configuration. The electronics module must provide a method to monitor all battery cells during charging in either configuration. The monitoring needs to endure charge termination and over voltage protection (OVP). The electronics module also needs to tolerate both series and parallel operation during discharge. In a preferred embodiment, the convertible battery pack is backwards compatible with existing battery pack chargers. The electronics module must not create cell imbalances.

A battery pack cell voltage monitoring circuit 1500 of this aspect of the present invention provides cell monitoring for charging and/or overvoltage protection when the strings of cells are in a parallel configuration. This same circuit is protected (isolated using diodes) against short circuits and damage when the strings of cells are reconfigured into a series configuration.

A battery pack cell voltage monitoring circuit 1500 which generates an imitation cell voltage(s), that presents itself as an actual cell voltage to the battery pack charger 30 with the purpose of providing backwards compatibility with an existing battery pack charger. This imitation cell voltage is used to signal the battery pack charger 30 to stop charging the convertible battery pack 20A4.

A battery pack cell voltage monitoring circuit 1500 may also monitor the discharge voltages of the individual cells and generate an imitation cell voltage that presents itself as an actual cell voltage with the purpose of providing backwards compatibility with a power tool 10. This imitation cell voltage is used to signal the power tool 10 to stop discharging the convertible battery pack 20A4.

The controlling parameter used to select the imitation cell voltage is a monitored battery pack parameter such as cell voltage, stack voltage, cell or pack temperature, discharge current, state of charge, current, user selectable switch or other forseeable parameter of concern.

With reference to FIG. 118A, the cell nodes/cell taps (CX) from the C string (the most negative string in a medium rated voltage configuration) are connected to the battery terminal block to provide cell voltages to the battery pack charger. Specifically, the C− terminal of the C string of cells is coupled to the BATT− battery terminal, the C1 cell node is coupled to the BT1 battery terminal, the C2 cell node is coupled to the BT2 battery terminals, the C3 cell node is coupled to the BT3 battery terminal, the C4 cell node is coupled to the BT4 battery terminal, the C+ terminal of the C string of cells is coupled to the BATT+ battery terminal. As such, then the convertible battery pack 20A4 is coupled to the battery pack charger 30 the BATT− battery terminal is coupled to the CHT− charger terminal, the BT1 battery terminal is coupled to the CHT1 charger terminal, the BT2 battery terminal is coupled to the CHT2 charger terminal, the BT3 battery terminal is coupled to the CHT3 charger terminal, the BT4 battery terminal is coupled to the CHT4 charger terminal and the BATT+ battery terminal is coupled to the CHT+ charger terminal and CHT−, CHT1, CHT2, CHT3, CHT4, CHT+ charger terminals are coupled to a primary over voltage protection circuit (OVP 1) in the charger. As such, the voltage of each cell in the C string is presented to the primary OVP 1. If the voltage of any cell CC1, CC2, CC3, CC4, CC5 exceeds a primary over voltage threshold, e.g., 4.1 volts, the charger/primary OVP 1 terminates the charging process of the convertible battery pack 20A4. In this configuration, the primary OVP 1 in the charger can monitor the C string of cells.

With reference to FIG. 118B the cells from the B string of cells are monitored using a primary over voltage protection circuit (OVP 2) in the convertible battery pack 20A4. More specifically, the B− terminal and the B+ terminal and the B1, B2, B3 and B4 cell nodes of the B string of cells are coupled to the primary OVP 2 allowing the primary OVP 2 to monitor the B string of cells. With reference to FIG. 118C, the cells from the A string of cells are monitored using a primary over protection circuit (OVP 3) in the convertible battery pack 20A4. More specifically, the A− terminal and the A+ terminal and the A1, A2, A3, A4 cell nodes of the A string of cells are coupled to the primary OVP 3 allowing the primary OVP 3 to monitor the A string of cells.

If the voltage any cell CB1, CB2, CB3, CB4, CB5 exceeds the primary over voltage threshold then the primary OVP 2 will go active and output a "stop charging" signal and if the voltage of any cell CA1, CA2, CA3, CA4, CA5 exceeds the primary over voltage threshold then the primary OVP 3 will go active and output a "stop charging" signal.

With reference to FIG. 118B, in the illustrated exemplary embodiment, when the output of the primary OVP 2 is high the monitored cells are all below the primary voltage threshold and when the output of the primary OVP 2 is low one or more of the monitored cells is at or above the primary voltage threshold. In other words, when all of the cells CB1-CB5 are below the primary over voltage threshold the output of the primary OVP 2 will be normal (high) indicating that charging can continue. When any of the cells CB1-CB5 exceeds the primary over voltage threshold the output of the primary OVP 2 will be active (low) indicating that charging should stop.

With reference to FIG. 118C, in the illustrated exemplary embodiment, the primary OVP 3 operates in the same manner as the primary OVP 2. In other words, when all of the cells CA1-CA5 are below the primary voltage threshold the output of the primary OVP 3 will be normal (high) indicating that charging can continue. When any of the cells CA1-CA5 exceeds the primary over voltage threshold the output of the primary OVP 3 will be active (low) indicating that charging should stop.

With reference to FIG. 119, in an exemplary embodiment of a charge control circuit 1530 of the cell voltage monitoring circuit 1500, the outputs of the battery pack primary OVP of FIGS. 118B and 118C are provided to the charge control circuit 1530. A voltage regulator 1532 is set to an overvoltage threshold, for example 4.3V, to prevent overcharge of cell CC1 in the event of an isolation failure. The current of the charge control circuit 1530 (Icq) is less than 4 uA when the battery is in the low rated voltage configuration and the cell CC1 voltage is below the primary voltage threshold (default state). In this embodiment, the primary OVP 2 and the primary OVP 3 are open drain, active low components. When the primary OVP 2 or primary OVP 3 is pulled low because one of the cells of the A or B strings have reached or exceeded the primary voltage threshold, the battery pack charger 30 will read the voltage of the CC1 cell (which is provided at the BT1 battery terminal from the C1 cell node/cell tap) as 4.3V (above the primary voltage threshold) even though the voltage of the CC1 cell has not exceeded the primary voltage threshold. The current of the charge control circuit 1530 (Icq) is equal to 12 uA when the battery is in the low rated voltage configuration and the cell CC1 voltage is at or above the primary voltage threshold (active state). The diodes D2 and D3 provide isolation when the convertible battery pack 20A4 is medium rated voltage configuration and the strings of cells are in series with each other.

Charge Termination Signal Generation Process

In this embodiment, at the beginning of the charging process, assume that all of the A string cells and all of the B string cells are under the primary voltage threshold. Because all of the A string cells and the all of the B string cells are under the primary voltage threshold, both the primary OVP 2 and the primary OVP 3 are in the low/default state are not active. It could be stated that a stop charging signal is NOT present at the output of the primary OVP 2 and primary OVP 3. Both the primary OVP 2 and the primary OVP 3 are not active. In this condition (when a stop charging signal is NOT present at the output of either of the primary OVP 1 or 20, the diodes D2 and D3 are reverse biased. Also in this state no current flows through either resistor R5 or R6. In this example, when VGS for Q3=0V & VGS Q4+0.1V pulled high via R5, both transistors are OFF and when VGS for Q1 & Q2=−VCT−1≈−4.2V pulled low via R6, both transistors are ON. Therefore, the voltage at the C1 cell tap (the voltage for the CA1 cell) will be presented to the BT1 battery terminal and to the CHT1 charger terminal and to the corresponding input of the primary OVP 1 in the charger. As long as the primary OVP 2 and primary OVP 3 do not have a stop charging signal at their output, the charger primary OVP 1 will monitor the C string of cells and as long as the voltage of none of the C string cells, including the CA1 cell, exceed the primary voltage threshold the primary OVP 1 in the charger will continue to allow charging. As such, the primary OVP 1 will not output a stop charging signal and the charger will continue to charge all of the cells unless and until any of the C string cells, including the CA1 cell, exceed the primary voltage threshold. As such, when any of the cells exceed the primary voltage threshold will the primary OVP 1 output a stop charging signal and will the charger stop charging all of the cells.

At some point in the charging process one or more of the A string cells or the B string cells may be equal to or greater than primary voltage threshold. In this instance, when the signal present at the output of either the primary OVP 2 or primary OVP 3 is a stop charging signal, the corresponding diode D2 and/or D3 will be forward biased. Furthermore, current will flow through resistors R5 and R6. In this example, when VGS for Q1 & Q2≥−0.6V (body diode drop) pulled high via Q3, both transistors are OFF and when VGS for Q3 & Q4≈−3.6V pulled low via D2 and/or D3, both transistors are ON. As such, the voltage output from the voltage regulator, e.g., 4.3V (referred to as the imitation or fake voltage) will be present at the BT1 battery terminal and coupled to the CHT1 charger terminal. Therefore, the primary OVP 1 in the battery pack charger will receive a voltage signal greater than the primary voltage threshold and will consequently send a stop charging signal to the charger controller.

This circuit allows charging in low rated voltage (e.g., 20V) configuration—strings A, B, C connected to each other in parallel, i.e., A+ is connected to B+ which is connected to C+ and A− is connected to B− which is connected to C−—BUT does not allow charging in medium rated voltage (e.g., 60V) configuration—strings A, B, C connected to each other in series, i.e., A− is connected to B+ and B− is connected to C+.

When the output of either of the two primary OVP 2, 3 is a "stop charging" signal, a "fake" or imitation voltage that is higher than the primary over voltage threshold, e.g., 4.2 v for one of the battery cells, e.g. CC1 is presented at the BT1 battery terminal. This fake voltage is presented to the CHT1 charger terminal which provides the fake voltage to the primary OVP 1. The primary OVP 1 sees this as an over voltage situation and outputs a "stop charging" signal which terminates the charging process of the battery pack.

In this embodiment, the OVP chips output a high signal when all of the connected cells are below the primary voltage threshold and output a low signal when any of the connected cells are at or above the primary voltage threshold. If both of the primary OVP 2 and 3 output a high signal (no cells of the A or B strings have reached the primary over voltage threshold) then Q3 and Q4 will be OFF/open and Q1 and Q2 will be ON/closed. As such, the voltage at the C1 cell tap will be presented to the BT1 battery terminal and the CHT1 charger terminal and the charger will monitor the voltage of the C1 cell tap for over voltage protection.

If either the primary OVP 2 or the primary OVP 3 output a low signal (at least one of the A or B strings have reached/exceeded the primary voltage threshold) then Q1 and Q2 will be OFF/open and Q3 and Q4 will be ON/closed. In this configuration, the output of the voltage regulator will be coupled/presented to the BT1 battery terminal and the CHT1 charger terminal. The output of the voltage regulator will be set to some voltage greater than the primary voltage threshold, for example, 4.2 volts. As 4.2 volts are presented to the BT1 battery terminal and the CHT1 charger terminal and therefore to the input of the primary OVP 1 in the charger that would otherwise read the C1 battery tap, the OVP 1 sees this voltage as an over voltage situation and therefore the primary OVP 1 will terminate the charging process of the battery pack.

Again, with reference to FIGS. 118A, 118B and 118C, when the cell voltages monitored by the secondary OVP are below a secondary overvoltage threshold the secondary OVP is in its normal/default state and the output of the secondary OVP is high. When any of the cell voltages monitored by the secondary OVP are at or above the secondary overvoltage threshold the secondary OVP is placed into its active state and the output of the secondary OVP is low. When all of the cells CC1-CC5 are below the secondary overvoltage threshold: the secondary OVP 1 output=normal (high) and when any of the cells CC1-CC5 exceeds the secondary overvoltage threshold: the secondary OVP 1 output=active (low). The secondary OVP 2 operates in the same manner as the secondary OVP 1. In other words, when all of the cells CB1-CB5 are below the secondary voltage threshold: the secondary OVP 2 output=normal (high) and when any of the cells CB1-CB5 exceeds the secondary voltage threshold: the secondary OVP 2 output=active (low). And the secondary OVP 3 operates in the same manner as the secondary OVP 1 and OVP 2. In other words, when all of the cells CA1-CA5 are below the secondary voltage threshold: the secondary OVP 3 output=normal (high) and when any of the cells CA1-CA5 exceeds the secondary voltage threshold: the secondary OVP 3 output=active (low).

With reference to FIG. 120, if the secondary OVP 1 OR the secondary OVP 2 OR the secondary OVP 3 output a signal indicative that the voltage of any cell (CA1-CA5, CB1-CB5, CC1-CC5) has exceeded a predefined secondary overvoltage threshold, e.g., 4.275 volts, than the combiner circuit will output a signal to the battery pack charger 30 to stop charging. In this embodiment, the convertible battery pack 20A4 may only be charged when all three strings (A, B, C) are connected in parallel, i.e., low rated voltage configuration. The diodes D4 and D6 isolate the higher voltage strings when the strings (A, B, C) are connected in series, i.e., medium rated voltage configuration. The secondary OVP 1 does not require a diode because the negative connection of the C string is referenced to ground potential. The output of the combiner circuit presents a signal at the BT6/ID battery terminal which is coupled to the CHT6/ID charger terminal. In this embodiment, the battery terminal block would be configured such that the battery pack may only be charged when all three strings are connected in parallel.

This circuit allows charging in low rated voltage (e.g., 20V) configuration—strings A, B, C connected to each other in parallel, i.e., A+ is connected to B+ which is connected to C+ and A− is connected to B− which is connected to C−—BUT does not allow charging in medium rated voltage (e.g., 60V) configuration—strings A, B, C connected to each other in series, i.e., A− is connected to B+ and B− is connected to C+.

FIGS. 121, 122 and 123 illustrate an alternate embodiment circuit to the circuits illustrated in FIGS. 118, 119 and 120.

Similar to FIG. 118A, in the battery of FIG. 121A the cell nodes/cell taps (CX) from the C string (most negative string in medium rated voltage configuration) are connected to the terminal block to provide cell voltages to the charger. Specifically, the C− terminal of the C string of cells is coupled to the BATT− battery terminal, the C1 cell node is coupled to the BT1 battery terminal, the C2 cell node is coupled to the BT2 battery terminals, the C3 cell node is coupled to the BT3 battery terminal, the C4 cell node is coupled to the BT4 battery terminal, the C+ terminal of the C string of cells is coupled to the BATT+ battery terminal. As such, then the convertible battery pack 20A4 is coupled to the battery pack charger 30 the BATT− battery terminal is coupled to the CHT− charger terminal, the BT1 battery terminal is coupled to the CHT1 charger terminal, the BT2 battery terminal is coupled to the CHT2 charger terminal, the BT3 battery terminal is coupled to the CHT3 charger terminal, the BT4 battery terminal is coupled to the CHT4 charger terminal and the BATT+ battery terminal is coupled to the CHT+ charger terminal and CHT−, CHT1, CHT2, CHT3, CHT4, CHT+ charger terminals are coupled to a primary over voltage protection circuit (OVP 1) in the charger. As such, the voltage of each cell in the C string is presented to the charger/primary OVP 1. If the voltage of any cell CC1, CC2, CC3, CC4, CC5 exceeds a primary over voltage threshold, e.g., 4.1 volts, the charger/primary OVP 1 terminates the charging process of the battery pack. In this configuration, the primary OVP 1 in the charger can monitor the C string of cells.

With reference to FIG. 121B the cells from the B string of cells are monitored using a primary over voltage protection circuit (OVP 2) in the convertible battery pack 20A4. More specifically, the B− terminal and the B+ terminal and the B1, B2, B3 and B4 cell nodes of the B string of cells are coupled to the primary OVP 2 allowing the primary OVP 2 to monitor the B string of cells. With reference to FIG. 1C, the cells from the A string of cells are monitored using a primary over protection circuit (OVP 3) in the convertible battery pack 20A4. More specifically, the A− terminal and the A+ terminal and the A1, A2, A3, A4 cell nodes of the A string of cells are coupled to the primary OVP 3 allowing the primary OVP 3 to monitor the A string of cells.

If the voltage any cell CB1, CB2, CB3, CB4, CB5 exceeds the primary over voltage threshold then the primary OVP 2 will go active and output a "stop charging" signal and if the voltage of any cell CA1, CA2, CA3, CA4, CA5 exceeds the primary over voltage threshold then the primary OVP 3 will go active and output a "stop charging" signal.

With reference to FIG. 121B, in the illustrated exemplary embodiment, when the output of the primary OVP 2 is low the monitored cells are all below the primary voltage threshold and when the output of the primary OVP 2 is high one or more of the monitored cells is at or above the primary voltage threshold. In other words, when all of the cells CB1-CB5 are below the primary overvoltage threshold the Q203 transistor will be in its OPEN/OFF state and the Q202 transistor will be in its OPEN/OFF state and as a result the output of the primary OVP 2 will be normal (low) indicating that charging can continue. When any of the cells CB1-CB5 exceeds the primary overvoltage threshold the Q203 transistor will be in its CLOSED/ON state and the Q202 transistor will be in its CLOSED/ON state and the output of the primary OVP 2 will be active (high) indicating that charging should stop.

With reference to FIG. 121C, in the illustrated exemplary embodiment, the primary OVP 3 operates in the same manner as the primary OVP 2. In other words, when the voltage of all of the cells CA1-CA5 is below the primary overvoltage threshold the Q303 transistor will be in its OPEN/OFF state and the Q302 transistor will be in its OPEN/OFF state and as a result the output of the primary OVP 3 will be normal (low) indicating that charging can continue. When any of the cells CA1-CA5 exceeds the primary overvoltage threshold the Q303 transistor will be in its CLOSED/ON state and the Q302 transistor will be in its CLOSED/ON state and the output of the primary OVP 3 will be active (high) indicating that charging should stop.

With reference to FIG. 122, when all of the cells of strings A and B are below the primary overvoltage threshold the outputs of the primary OVP 2 and the primary OVP3 are low (inactive/high Z) and therefore the gate of the Q109 transistor is drawn to C− and the Q109 transistor is in its OPEN/OFF state. Then the Q108 transistor is OPEN/OFF and voltage regulator is off. The gates of the Q104A transistor and the Q104B transistor are connected to C1 (4V) and the source is connected to C2 (8V) and therefore the Q104A transistor and the Q104B transistor are in their CLOSE/ON state and the BT2 battery terminal is coupled to the C2 cell node and will provide the actual voltage of the C2 cell node to the battery pack charger for charge termination analysis by charger primary OVP 1.

When any of the cells of strings A and B are above the primary threshold the output of the primary OVP 2 or 3 is high (active/low Z) and therefore the gate of Q109 is coupled to a voltage greater than C−/ground and therefore is ON/closed. This causes Q108 to turn on. This provides power (C+) to the voltage regulator and the voltage regulator outputs a voltage to turn Q104A and Q104B OFF/open and provides a voltage at BT2 above the primary threshold. When the charger (which includes a charger terminal CHT2 coupled to BT2) receives the voltage signal above the primary voltage threshold the charger terminates the charge to the battery pack.

This circuit is an improvement on FIG. 119 in that this circuit allows charging in low rated voltage (e.g., 20V) configuration—strings A, B, C connected to each other in parallel, i.e., A+ is connected to B+ which is connected to C+ and A− is connected to B− which is connected to C−—AND allows charging in medium rated voltage (e.g., 60V) configuration—strings A, B, C connected to each other in series, i.e., A− is connected to B+ and B− is connected to C+.

With reference to FIG. 121A, the secondary OVP 1 output: normal=>low, active=>high. When all of the cells CC1-CC5 are below the secondary voltage threshold: Q101=OFF, Q100=OFF and as a result the secondary OVP 1 output=normal (low). When any of the cells CC1-CC5 exceeds the secondary voltage threshold: Q101=ON, Q100=ON and as a result the secondary OVP 1 output=active (high).

With reference to FIG. 121B, the secondary OVP 2 output: normal=>low, active=>high. When all of the cells CB1-CB5 are below the secondary voltage threshold: Q201=OFF, Q200=OFF and as a result the secondary OVP 2 output=normal (low). When any of the cells CB1-CB5 exceeds the secondary voltage threshold: Q201=ON, Q200=ON and as a result the secondary OVP 2 output=active (high).

With reference to FIG. 121C, the secondary OVP 3 output: normal=>low, active=>high. When all of the cells CA1-CA5 are below the secondary voltage threshold: Q301=OFF, Q300=OFF and as a result the secondary OVP 3 output=normal (low). When any of the cells CA1-CA5 exceeds the secondary voltage threshold: Q301=ON, Q300=ON and as a result the secondary OVP 3 output=active (high).

The secondary OVP output signal acts as trigger. In the default/normal condition (okay to charge/discharge): the secondary OVP 1, OVP 2, OVP 3 output=low, (not active—all cell voltages are below the secondary over voltage threshold). As a result Q102 is OFF, Q101 is OFF, Q100 is ON and therefore BT6/ID is low (coupled to C−)=>ok to charge. If the secondary OVP 1 output and/or the secondary OVP 2 output and/or the secondary OVP 3 output=high (active)—any of the cell voltages are equal to or greater than the secondary over voltage threshold) then Q102 turns ON which causes Q101 to turn ON which provides a constant high voltage (from C+) to Q102 (gate). When Q102 turns ON, Q100 turns OFF, and therefore BT6/ID is high Z [how is ID high]. The BT6/ID battery terminal is coupled to VDD through resistor network (not shown)=> and a not okay to charge signal is present on the BT6/ID battery terminal which is presented to the CHT6/ID charger terminal. This signal instructs the charger to stop charging, just as if there were a single string of cells or a plurality of strings of cells connected in parallel.

Improvement on FIG. 120—This circuit allows charging in low rated voltage (e.g., 20V) configuration—strings A, B, C connected to each other in parallel, i.e., A+ is connected to B+ which is connected to C+ and A− is connected to B− which is connected to C−—AND allows charging in medium rated voltage (e.g., 60V) configuration—strings A, B, C connected to each other in series, i.e., A− is connected to B+ and B− is connected to C+.

Referring again to FIG. 123, Because Q102 is provided with a constant high voltage (C+) even if the secondary OVP that went high then drops below the predefined secondary voltage threshold the latch will remain ON/closed (Q102 and Q101 stay ON and Q100 stays OFF) and the battery will not be able to accept a charge.

FIG. 124 illustrates, in more detail, the exemplary battery. The battery includes the converting subsystem. The converting subsystem includes the support board and the converter element. FIG. 124 illustrates the plurality of contact pads and the converter element switching contacts but without the converter element housing. As noted above, the exemplary battery includes a first subset of contact pads on the support board. The contact pad configuration illustrated in FIGS. 124*a* and 124*b* is an exemplary configuration. Alternate exemplary embodiments may include other contact pad configurations and are contemplated and encompassed by the present disclosure.

Referring to FIGS. 124*a* and 124*b*, in this exemplary embodiment the main PCB may also include a plurality of contact pads. These contact pads couple the battery signal terminals to the battery cell nodes. Specifically, the main PCB includes a BT1, BT2, BT3 and BT4 contact pad. The battery also includes a plurality of sense wires (illustrated in FIGS. 73 and 74) that connect the battery cell nodes, e.g., C1, C2, C3 and C4, to corresponding contact pads on the main PCB. The cell node contact pads are electrically coupled, either directly or indirectly to the corresponding battery terminal contact pads. Specifically, (1) a sense wire couples the C2 battery cell node to the C2 cell node contact pad on the main PCB and the C2 cell node contact pad on the main PCB is coupled to the BT2 battery terminal contact pad and the BT2 battery terminal contact pad is coupled to the BT2 battery terminal, for example, through a ribbon cable and (2) a sense wire couples the C4 battery cell node to the C4 cell node contact pad on the main PCB and the C4 cell node contact pad on the main PCB is coupled to the BT4 battery terminal contact pad and the BT4 battery terminal contact pad is coupled to the BT4 battery terminal through the ribbon cable. And, (1) a sense wire couples the C1 battery cell node to the C1 cell node contact pad on the main PCB and the C1 cell node contact pad on the main PCB is coupled to a switch S1 and depending upon the state of the switch S1, as will be discussed in more detail below, the C1 cell node contact pad may be coupled to the BT1 battery terminal contact pad and the BT1 battery terminal contact pad is coupled to the BT1 battery terminal by the BT1 flag and (2) a sense wire couples the C3 battery cell node to the C3 cell node contact pad on the main PCB and the C3 cell node contact pad on the main PCB is coupled to a switch S2 and depending upon the state of the switch S2, as will be discussed in more detail below, the C3 cell node contact pad may be coupled to the BT3 battery terminal contact pad and the BT3 battery terminal contact pad is coupled to the BT3 battery terminal by the BT3 flag. In alternate embodiments, the contact pads on the main PCB may simply be electrical connections. For example, the cell node contact pad may simply be a location where the sense wire connects to the main PCB and the battery terminal contact pad may simply be a connection location on the main PCB for connecting to the ribbon cable (in the case of the BT2 and BT4 battery terminal contact pads) and the connection between the cell node connection location and the battery terminal connection location may simply be a trace on the main PCB.

A very important quality of a convertible battery pack such as the convertible battery packs described in this disclosure is that the battery pack is in the appropriate operational configuration at the correct time. In other words, if the convertible battery pack were to remain in the medium rated voltage configuration after it was removed from the medium rated voltage electrical device and then placed in a low rated voltage electrical device or in a low rated voltage charger, the battery, the electrical device and/or the charger could be damaged or some other type of undesirable event could occur. In order to ensure that the convertible battery pack is not able to transfer medium rated voltage to low rated voltage electrical devices, the battery pack includes a feature which prevents medium rated voltage from being transferred to devices that are not designed to accept the medium rated voltage. Specifically, when placed in the medium rated voltage configuration, the convertible battery pack, in addition to transferring power to the electrical device through the battery power terminals (BATT+ and BATT−) and the tool power terminals (TOOL+ and TOOL−), will also transfer power to the electrical device through at least a pair of the battery signal terminals and a second pair of tool power terminals in which the second pair of tool power terminals are coupled to each other in the tool terminal block through a jumper (also referred to as a shorting bar).

FIGS. 124*a* and 124*b* illustrate the low rated voltage configuration and the medium rated voltage configuration, respectively. FIG. 124*c* illustrates a simplified circuit diagram of a subset of the battery terminal contact pads on the main PCB.

Referring to FIGS. 124*a* and 124*c*, the low rated voltage configuration will be described. When the exemplary battery of FIG. 1 is not coupled to an electrical device or when it is coupled to a low rated voltage tool or charger, it is in the low rated voltage configuration. When in this low rated voltage configuration, a first converter element switching contact (SC1) electrically couples the A+ contact pad and the B+ contact, a second converter element switching contact (SC2) electrically couples the A+ contact pad and the C+ contact pad, a third converter element switching contact (SC3) electrically couples the C− contact pad and the A− contact pad and a fourth converter element switching contact (SC4) electrically couples the C− contact pad and the B− contact pad. This effectively places switches SW1, SW2, SW3 and SW4 (illustrated in FIGS. 125*a* and 125*b*) in the closed state and as there is no connection between the BT1 contact pad and the A− contact pad or the BT3 contact pad and the B+ contact pad this effectively places switches SW5, SW6 and SW7 (illustrated in FIGS. 127*a* and 127*b*) in the opened state. As such, the positive terminals of the A string of cells, the B string of cells and the C strings of cells are all electrically connected and coupled to the BATT+ battery terminal and the negative terminals of the A string of cells, the B string of cells and the C string of cells are all electrically connected and coupled to the BATT− battery terminal. Therefore the strings of cells are all in parallel.

Referring to FIG. 124*c*, the electronic switches will be explained. First, it is noted that Q110 is a p-channel MOSFET transistor and Q105, Q106, and Q107 are n-channel MOSFET transistors. Generally speaking, for the p-channel MOSFET transistors, when the gate voltage is less than the source voltage the transistor will turn on (closed state) otherwise the transistor will turn off (open state) and for the n-channel MOSFET transistors, when the gate voltage is greater than the source voltage the transistor will turn on (closed state) otherwise the transistor will turn off (open state). When the battery is in the low rated voltage configuration, the voltage at the B− terminal of the B string of cells is the same as the voltage at the C− terminal of the C string of cells, the voltage at the C4 cell node is greater than the voltage at the B− terminal of the B string of cells, greater than the voltage at the C3 cell node and the voltage at the C1 cell node. As such, when the battery is in the low rated voltage configuration, Q105 will be OFF, Q110 will be ON, Q106 will be ON and Q107 will be ON. As a result, the BT1 battery terminal will be coupled to the C1 cell node and the BT3 battery terminal will be coupled to the C3 cell node.

When the battery pack mates with a medium rated voltage tool, the tool conversion element projections will engage the converter element projections and force the converter element to move to its second position. In addition, the tool terminals TT1 and TT3 will engage battery terminals BT1 and BT3, respectively. The tool terminals TT1 and TT3 in the medium rated voltage tools are coupled together by a jumper (shorting bar). As such, when the medium rated voltage tool engages the battery pack the battery terminals BT1 and BT3 become electrically coupled through the tool terminals TT1 and TT3 and the jumper between the tool terminals TT1 and TT3 and will complete the circuit between the BATT+ and BATT− battery terminals. A low rated voltage tool that would otherwise couple to the convertible battery pack will not include the coupled tool terminals TT1 and TT3 and as such, will not complete the circuit between the BATT+ and BATT− battery terminals. As such, if the convertible battery pack was to remain in its medium rated voltage configuration after being removed from a medium rated voltage tool it would not operate with low rated voltage tools.

Referring to FIGS. 124B, when the converter element moves to the medium rated voltage position, the first converter element switching contact SC1 will decouple from the A+ and B+ contact pads and couple the B+ and BT3 contact pads, the second converter element switching contact SC2 will decouple from the A+ and the C+ contact pads, the third converter element switching contact SC3 will decouple from the A− and C− contact pads and couple the A− and BT1 contact pads and the fourth converter element switching contact SC4 will decouple from the C− and B− contact pads and couple the B− and C+ contact pads. This effectively places switches SW1, SW2, SW3 and SW4 in the opened state and effectively places switches SW5, SW6 and SW7 in the closed state (illustrated in FIG. 127*b*). As such, the BATT− battery terminal is coupled to the C− terminal of the C string of cells, the C+ terminal of the C string of cells is coupled to the B− terminal of the B string of cells, the B+ terminal of the B string of cells is coupled to the BT3 battery terminal which is coupled to the TT3 tool terminal which is coupled to the TT1 tool terminal (via the jumper) which is coupled to the BT1 battery terminal which is coupled to the A− terminal of the A string of cells and the A+ terminal of the A string of cells is coupled to the BATT+ battery terminal. Therefore the A, B, and C strings of cells are all in series. In this configuration, the power (voltage and current) for operating the tool load is provided through the BATT+ and BATT− battery terminals, the BT1 and BT3 battery terminals, the TOOL+ and TOOL− tool terminals and the TT1 and TT3 tool terminals.

Referring again to FIG. 124C, when the battery is in the medium rated voltage configuration, the voltage at the B− terminal of the B string of cells is greater than the voltage at the C− terminal of the C string of cells, the voltage at the C4 cell node is less than the voltage at the B− terminal of the B string of cells, greater than the voltage at the C3 cell node and the voltage at the C1 cell node. As such, when the battery is in the medium rated voltage configuration, Q105 will be ON, Q110 will be OFF, Q106 will be OFF and Q107 will be OFF. As a result, the BT1 battery terminal will not be coupled to the C1 cell node and the BT3 battery terminal will not be coupled to the C3 cell node. Instead, as noted above, the BT1 battery terminal will be coupled to the BT3 battery terminal through the TT1 and TT3 tool terminals.

Referring to FIG. 125, there is illustrated an alternate cell switch to the cell switch illustrated in FIG. 124C. In this embodiment, the cell switch comprises a opto-electronic switch. In this embodiment, in the low rated voltage configuration LED1 and LED2 are turned on which in turn activates/closes the corresponding electronic switches.

When the electronic switches are closed, BT1 is coupled to C1 and BT3 is coupled to C3. In the medium rated voltage configuration LED1 and LED2 are turned off which in turn deactivates/opens the corresponding electronic switches. When the electronic switches are opened, BT1 is not coupled to C1 and BT3 is not coupled to C3.

Referring to FIG. 126, there is illustrated an alternate design for coupling the BT1 and BT3 battery terminals to the C1 and C3 cell taps, respectively, when the pack is in the low rated voltage configuration and decoupling the BT1 and BT3 battery terminals from the C1 and C3 cell taps. In this embodiment, the battery pack includes a set of auxiliary battery terminals BT7 and BT8. In addition, the medium rated voltage tool includes a set of auxiliary tool terminals TT7 and TT8. When the battery pack is not coupled to any tool or is coupled to a low rated voltage tool (which does not include the auxiliary tool terminals) there will be an open circuit between the auxiliary battery terminals BT7 and BT8. When the battery pack is mechanically coupled to the medium rated voltage tool the auxiliary tool terminals TT7 and TT8 electrically couple to the auxiliary battery terminals BT7 and BT8, respectively.

First, it is noted that Q501 is a p-channel MOSFET transistor and Q502, Q503, and Q504 are n-channel MOSFET transistors. Generally speaking, for the p-channel MOSFET transistors, when the gate voltage is less than the source voltage the transistor will turn ON (closed state) otherwise the transistor will turn OFF (open state) and for the n-channel MOSFET transistors, when the gate voltage is greater than the source voltage the transistor will turn ON (closed state) otherwise the transistor will turn OFF (open state).

When the battery is in the low rated voltage configuration (and there is an open circuit between the BT7 and BT8 terminals), the voltage at the C4 cell node is greater than the voltage at the C− terminal of the C string of cells, greater than the voltage at the C3 cell node and greater than the voltage at the C1 cell node. As such, when the battery is in the low rated voltage configuration, Q501 will be ON, Q502 will be OFF, Q503 will be ON and Q504 will be ON. As a result, the BT1 battery terminal will be coupled to the C1 cell node and the BT3 battery terminal will be coupled to the C3 cell node.

When the battery is mated to a medium rated voltage tool (which does include the auxiliary battery terminals), the voltage at the C+ terminal of the C string of cells is greater than the voltage at the C4 node, greater than the voltage at the C3 node, greater than the voltage at the C1 node and greater than the voltage at the C− terminal of the C string of cells. As such, when the battery is in mated to a medium rated voltage tool having the auxiliary tool terminals as noted and is placed in the medium rated voltage configuration, Q501 will be OFF, Q502 will be ON, Q503 will be OFF and Q504 will be OFF. As a result, the BT1 battery terminal will not be coupled to the C1 cell node and the BT3 battery terminal will not be coupled to the C3 cell node. Instead, as noted above, the BT1 battery terminal will be coupled to the BT3 battery terminal through the TT1 and TT3 tool terminals.

Referring to FIGS. 127A and 127B, these figures illustrate exemplary simplified circuit diagrams of an exemplary embodiment of a convertible battery in a first cell configuration (FIG. 127A) and a second cell configuration (FIG. 127B). The battery includes, among other elements that are not illustrated for purposes of simplicity, a plurality of rechargeable battery cells—also referred to as cells. The plurality of cells forms a set of cells. In the illustrated circuit diagram, the exemplary battery includes a set of fifteen (15) cells. Alternate exemplary embodiments of the battery may include a larger or a smaller number of cells, as will be understood by one of ordinary skill in the art and are contemplated and encompassed by the present disclosure. In the illustrated exemplary embodiment, the battery includes a first subset A of five (5) cells A1, A2, A3, A4, A5; a second subset B of five (5) cells B1, B2, B3, B4, B5; and a third subset C of five (5) cells C1, C2, C3, C4, C5. The cells in each subset of cells are electrically connected in series. More specifically, cell A1 is connected in series with cell A2 which is connected in series with cell A3 which is connected in series with cell A4 which is connected in series with cell A5. Subsets B and C are connected in the same fashion. As is clearly understood by one of ordinary skill in the art, each cell includes a positive (+) terminal or cathode and a negative (−) terminal or anode. Each subset of cells includes a positive terminal (A+, B+, C+) and a negative terminal (A−, B−, C−). And the battery includes a positive terminal (BATT+) and a negative terminal (BATT−).

Between adjacent cells 48 in a subset of cells 48 is a node 49. The nodes will be referred to by the positive side of the associated cell. For example, the node between cell A1 and cell A2 will be referred to as A1+ and the node between cell A2 and A3 will be referred to as A2+. This convention will be used throughout the application. It should be understood that the node between A1 and A2 could also be referred to as A2−.

The battery also includes a plurality of switching elements SW—which may also be referred to as switches SW. The plurality of switches SW forms a set of switches. In the illustrated circuit diagram, the exemplary battery includes a set of fourteen (14) switches SW1-SW14. Alternate exemplary embodiments of the battery may include a larger or a smaller number of switches SW and are contemplated and encompassed by the present disclosure. In the illustrated exemplary embodiment, the battery includes a first subset of six (6) switches SW1-SW6—also referred to as power switches—and a second subset of eight (8) switches SW7-SW14—also referred to as signal switches. In the exemplary embodiment, a first subset of the subset of power switches is electrically connected between the positive terminals of the subsets of cells and the negative terminals of the subsets of cells. Specifically, power switch SW1 connects terminal A+ and terminal B+, power switch SW2 connects terminal B+ and terminal C+, power switch SW3 connects terminal A− and terminal B−, and power switch SW4 connects terminal B− and terminal C−. In the exemplary embodiment, a second subset of the subset of power switches is electrically connected between the negative terminal of a first subset of cells and the positive terminal of a second subset of cells. Specifically, power switch SW5 connects terminal A− and terminal B+ and power switch SW6 connects terminal B− and terminal C+. The power switches may be implemented as simple single throw switches, terminal/contact switches or as other electromechanical, electrical, or electronic switches, as would be understood by one of ordinary skill in the art.

In the exemplary embodiment, the signal switches are is electrically connected between corresponding nodes of each subset of cells. More particularly, signal switch SW7 is between node A4+ and node B4+, signal switch SW8 is between node B4+ and C4+, signal switch SW9 is between node A3+ and B3+, signal switch SW10 is between node B3+ and C3+, signal switch SW11 is between node A2+ and B2+, signal switch SW12 is between B2+ and C2+, signal switch SW13 is between node A1+ and B1+ and signal switch SW14 is between B1+ and C1+. In the illustrated embodiment the signal switches are implemented as electronic switches, for example transistors and more particularly field effect transistors (FETs). In alternate embodiments, the signal switches may be implemented as simple single throw switches, as terminal/contact switches or as other electromechanical or electrical switches, as would be understood by one of ordinary skill in the art.

In addition to the signal switches SW7-SW14, the battery includes a first and a second control switch circuits CSW1 and CSW2. The control switch circuits provide control signals to turn the signal switches on and off.

In a first battery configuration, illustrated in FIG. 127*a*, the first subset of power switches SW1, SW2, SW3, SW4 are closed, the second subset of power switches SW5, SW6 are open (as described in various embodiments in the incorporated applications). Based on this configuration of the power switches the first and second control switch circuits CSW1 and CSW2 will provide control signals to turn the signal switches SW7-SW14 ON and the signal switches SW7, SW8, SW9, SW10, SW11, SW12, SW13, SW14 will be closed. In this configuration, the subsets of cells A, B, C are in connected in parallel. In addition, the corresponding cells of each subset of cells are connected in parallel. More specifically, cells A5, B5, C5 are connected in parallel; cells A4, B4, C4 are connected in parallel; cells A3, B3, C3 are connected in parallel; cells A2, B2, C2 are connected in parallel; and cells A1, B1, C1 are connected in parallel. In this configuration, the battery is referred to as in a low rated voltage configuration. The battery may also be referred to as in a high capacity configuration. As would be understood by one of ordinary skill in the art, as the subsets of cells are connected in parallel, the voltage of this configuration would be the voltage across each subset of cells, and because there are multiple subsets of cells, the capacity of the battery would be the sum of the capacity of each subset of cells. In this exemplary embodiment, if each cell is a 4V, 3 Ah cell, then each subset of five cells would be a 20V, 3 Ah subset and the battery comprising three subsets of five cells would be a 20V, 9 Ah battery. In alternate embodiments, less than all of the signal switches may be closed.

In a second battery configuration, illustrated in FIG. 127*b*, the first subset of power switches SW1, SW2, SW3, SW4 are open, the second subset of power switches SW5, SW6 are closed (as described in various embodiments in the incorporated applications). Based on this configuration of the power switches the first and second control switch circuits CSW1 and CSW2 will provide control signals to turn the signal switches SW7-SW14 OFF and the signal switches SW7, SW8, SW9, SW10, SW11, SW12, SW13, SW14 are open. In this configuration, the subsets of cells A, B, C are in series. In this configuration, the battery is referred to as in a medium rated voltage configuration. The battery may also be referred to as in a low capacity configuration. As would be understood by one of ordinary skill in the art, as the subsets of cells are connected in series the voltage of this configuration would be the voltage across all of the subsets of cells and because there is effectively one superset of cells in parallel in this configuration, the capacity of the battery would be the capacity of a single cell within the superset of cells. In this exemplary embodiment, if each cell is a 4V, 3 Ah cell, then each subset of five cells would be a 20V, 3 Ah subset and the battery comprising three subsets of cells would be a 60V, 3 Ah battery.

FIGS. 129 through 134 illustrate an alternate embodiment for converting the battery pack from the low rated voltage configuration to the medium rated voltage configuration. This embodiment utilizes a set of auxiliary battery terminals to transmit the energy from the battery pack to the electrical device (power tool). Similar to a previously described embodiment which utilized a subset of the primary battery terminals (in addition to the BATT+ and BATT− battery terminals) to transmit energy from the battery pack to the medium rated voltage power tool, this embodiment utilizes the set of auxiliary battery terminals.

This embodiment converts the battery from a low rated voltage configuration to a medium rated voltage configuration in the same manner as described in previous embodiments. For example, the battery pack includes a converter element that, when in a first position, connects the sets of battery cells in a parallel, low rated voltage configuration and when the converter element is moved to a second position by conversion elements in the power tool connects the sets of battery cells in a series, medium rated voltage configuration.

As illustrated in FIG. 132, the battery includes a set of auxiliary battery terminals. In this exemplary embodiment, the auxiliary battery terminals are placed in front of the primary battery terminals (in the orientation of FIG. 132). As illustrated in FIG. 129, the battery pack housing includes a plurality of slots that correspond to the set of auxiliary battery terminals. The slots allow terminals in the tool to enter the pack housing and engage the auxiliary battery terminals, as will be described in more detail below. As illustrated in FIG. 130, the medium rated voltage tool will include a tool terminal block that includes a set of primary tool terminals, e.g., Tool+, TT5, TT3, Tool−, and a set of auxiliary tool terminals, e.g., a tool jumper and a tool signal terminal.

As illustrated in FIGS. 133A and 133B, and as described in alternate embodiments, when the battery pack is not connected to a tool or when it is mated to a low rated voltage tool—that does not include the auxiliary tool terminals—the switching contacts SC of the converter element couple the A+, B+, and C+ terminals to each other and couple the A−, B−, and C− terminals to each other. This places the battery pack in the low rated voltage configuration.

As illustrated in FIGS. 134A and 134B, and as described in alternate embodiments, when the battery pack is mated to a medium rated voltage tool—that does include the auxiliary tool terminals—the switching contacts SC of the converter element decouple the A+, B+ and C+ terminals from each other and decouple the A−, B−, and C− terminals from each other. And, the converter element switching contact SC4 couples the C+ terminal to the B− terminal. In addition, the auxiliary tool terminal/jumper couples to two of the auxiliary battery terminals. One of the two auxiliary battery terminals is electrically coupled to the B+ terminal and the other of the two auxiliary battery terminals is electrically coupled to the A− terminal. As such, the battery is in the medium rated voltage configuration and current will not need to pass through signal terminals, as in previously described embodiments. In this embodiment, if the converter element were to remain in the medium rated voltage configuration position after the battery pack was removed from the medium rated voltage tool the pack could not operate in a low rated voltage tool, thereby preventing damage to the low rated voltage tool.

FIGS. 135-140 illustrate an alternate embodiment of a convertible battery pack similar to the embodiment illustrated in FIGS. 129-134. This embodiment includes a second auxiliary tool terminal/jumper and the set of auxiliary battery terminals includes four battery terminals—BT9, BT10, BT11, BT12 coupled to the B+, A−, C+ and B− terminals, respectively. In this embodiment, the converter element switching contact does not couple the C+ terminal and the B− terminal. When the medium rated voltage tool mates with the battery pack the first tool jumper couples a first subset of the set of auxiliary battery terminals BT9, BT10 and the second tool jumper couples a second subset of the set of auxiliary battery terminals BT11, BT12.

IV. Example Power Tool System

Figure 1B:
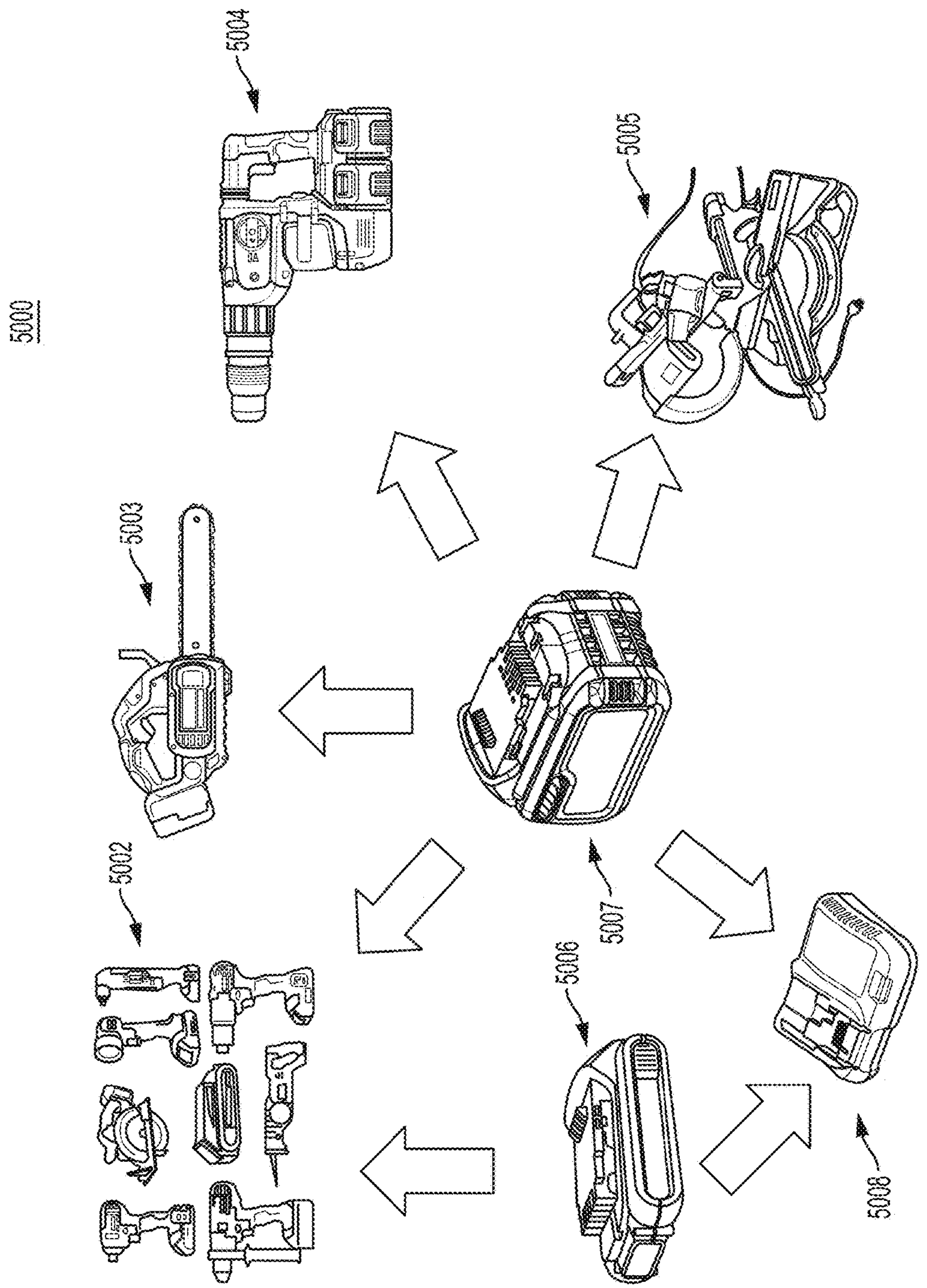
FIG. 1B is a schematic diagram of one particular implementation of a power tool system.

FIG. 1B illustrates one particular implementation of the power tool system 5001, in accordance with the above disclosure, that includes a set of low rated voltage DC power tools 5002, a set of medium rated voltage DC power tools 5003, a set of high rated voltage DC power tools 5004, a set of high or AC rated voltage AC/DC power tools 5005, a set of low rated voltage battery packs 5006, a set of low/medium rated convertible battery packs 5007, a high rated voltage AC power supply 5008, and a low rated voltage battery pack charger 5009.

The low rated voltage battery packs 5006 have a rated voltage range of 17V-20V, with an advertised voltage of 20V, an operating voltage range of 17V-19V, a nominal voltage of 18V, and a maximum voltage of 20V. Each of the low rated voltage battery packs includes a power tool interface or terminal block that enables the battery pack 5006 to be coupled to the low rated voltage power tools 5002 and to the low rated voltage battery chargers 5009. In one implementation, at least some of the low rated voltage battery packs 5006 were on sale prior to May 18, 2014. For example, the low rated voltage battery packs 5006 may include certain ones of DEWALT 20V MAX battery packs, sold by DEWALT Industrial Tool Co. of Towson, Md.

The low/medium rated voltage convertible battery packs 5007 are convertible between a first configuration having a low rated voltage and a higher capacity and a second configuration having a medium rated voltage and a lower capacity. In the first configuration, the low rated voltage is approximately 17V-20V, with an advertised voltage of 20V, an operating voltage range of 17V-19V, a nominal voltage of 18V, and a maximum voltage of 20V. The low rated voltage of the convertible battery packs 5007 corresponds to the low rated voltage of the low rated voltage battery packs 5006. In the second configuration, the medium rated voltage may be approximately 51V-60V, with an advertised voltage of 60V, an operating voltage range of 51V-57V, a nominal voltage of 54V, and a maximum voltage of 60V. For example, the convertible battery packs 5007 may be labeled as 20V/60V MAX battery packs to indicate the multiple voltage ratings of these convertible battery packs 5007.

The convertible battery packs 5007 would not have been available to the public or on sale prior to May 18, 2014. Each of the low/medium rated voltage battery packs 5007 includes a power tool interface or terminal block that enables the battery pack 5007 to be coupled to the low rated voltage power tools 5002 and to the low rated voltage battery chargers 5009 when in the low rated voltage configuration, and to the medium rated voltage DC power tools 5003, the high rated voltage DC power tools 5004, and the AC/DC power tools 5005 when in the medium rated voltage configuration.

The AC power supply 5008 has a high rated voltage that corresponds to the AC mains rated voltage in North America and Japan (e.g., 100V-120V) or to the AC mains rated voltage in Europe, South America, Asia, and Africa (e.g., 220V-240V).

The low rated voltage DC power tools 5002 are cordless only tools. The low rated voltage DC tools 5002 have a rated voltage range of approximately 17V-20V, with an advertised voltage of 20V and an operating voltage range of 17V-20V. The low rated voltage DC power tools include tools that have permanent magnet DC brushed motors, universal motors, and permanent magnet brushless DC motors, and may include constant speed and variable speed tools. The low rated voltage DC power tools may include cordless power tools having relatively low power output requirements, such as drills, circular saws, screwdrivers, reciprocating saws, oscillating tools, impact drivers, and flashlights, among others. The low rated voltage DC rated voltage power tools 5002 may include power tools that were on sale prior to May 18, 2014. Examples of the low rated voltage power tools 5002 may include one or more of the DeWALT® 20V MAX set of cordless power tools sold by DeWALT Industrial Tool Co. of Towson, Md.

Each of the low rated voltage power tools 5002 includes a single battery pack interface or receptacle with a terminal block for coupling to the power tool interface of one of the low rated voltage battery packs 5006, or to the power tool interface of one of the convertible low/medium rated voltage battery packs 5007. The battery pack interface or receptacle is configured to place or retain the convertible battery pack 5007 into its low rated voltage configuration. Thus, the low rated voltage power tools 5002 may operate using either the low rated voltage battery packs 5006 or the convertible low/medium rated voltage battery packs 5007 in their low rated voltage configuration. This is because the 17V-20V rated voltage of the battery packs 5006, 5007 corresponds to the 17V-20V rated voltage of low rated voltage the power tools 5002.

The medium rated voltage DC power tools 5003 are cordless only tools. The medium rated voltage DC power tools 5003 have a rated voltage range of approximately 51V-60V, with an advertised voltage of 60V and an operating voltage range of 51V-60V. The medium rated voltage DC power tools include tools that have permanent magnet DC brushed motors, universal motors, and permanent magnet brushless DC motors, and may include constant speed and variable speed tools. The medium rated voltage DC power tools may include similar types of tools as the low rated voltage DC tools 5002 that have relatively higher power requirements, such as drills, circular saws, screwdrivers, reciprocating saws, oscillating tools, impact drivers and flashlights. The medium rated voltage tools 5003 may also or alternatively have other types of tools that require higher power or capacity than the low rated voltage DC tools 5002, such as chainsaws (as shown in the figure), string trimmers, hedge trimmers, lawn mowers, nailers and/or rotary hammers. The medium rated voltage DC rated voltage power tools 3 do not include power tools that were on sale prior to May 18, 2014.

Each of the medium rated voltage DC power tools 5003 includes a single battery pack interface or receptacle with a terminal block for coupling to the power tool interface of the convertible low/medium rated voltage battery packs 5007. The battery pack interface or receptacle is configured to place or retain the convertible battery pack 5007 in a medium rated voltage configuration. Thus, the medium rated voltage power tools 5003 may operate using the convertible low/medium rated voltage battery packs 5007 in the medium rated voltage configuration. This is because the 51V-60V rated voltage of the battery packs 5007 corresponds to the 51V-60V rated voltage of medium rated voltage power tools 5003.

The high rated voltage DC power tools 4 are cordless only tools. The high rated voltage DC tools 5004 have a rated voltage range of approximately 100V-120V, with an advertised voltage of 120V and an operating voltage range of 100V-120V. The high rated voltage DC power tools include tools that have permanent magnet DC brushed motors, universal motors, and permanent magnet brushless DC motors, and may include constant speed and variable speed tools. The medium rated voltage DC power tools may include tools such as drills, circular saws, screwdrivers, reciprocating saws, oscillating tools, impact drivers, flashlights, string trimmers, hedge trimmers, lawn mowers, nailers and/or rotary hammers. The high rated DC power tools may also or alternatively include other types of tools that require higher power or capacity such as rotary hammers (as shown in the figure), miter saws, chain saws, hammer drills, grinders, and compressors. The high rated voltage DC rated voltage power tools 4 do not include power tools that were on sale prior to May 18, 2014.

Each of the high rated voltage DC power tools 5004 includes a battery pack interface having a pair of receptacles each with a terminal block for coupling to the power tool interface of convertible low/medium rated voltage battery packs 5007. The battery pack receptacles are configured to place or retain the convertible battery packs 5007 into their medium rated voltage configurations. The power tools 5004 also include a switching circuit (not shown) to connect the two battery packs 5007 to one another and to the tool in series, so that the voltages of the battery packs 5007 are additive. The high rated voltage power tools 5004 may be powered by and operate with the convertible low/medium rated voltage battery packs 5007 in their medium rated voltage configuration. This is because the two battery packs 5007, being connected in series, together have a rated voltage of 102V-120V (double that of a single battery pack 7), which corresponds to the 100V-120V rated voltage of high rated voltage power tools 5004.

The high rated voltage AC/DC power tools 5005 are corded/cordless tools, meaning that they can be powered by either the AC power supply 5008 or the convertible low/medium rated voltage battery packs 5007. The high rated voltage AC/DC tools 5005 have a rated voltage range of approximately 100V-120V (and perhaps as large as 90V-132V), with an advertised voltage of 120V and an operating voltage range of 100V-120V (and perhaps as large as 90V-132V). The high rated voltage AC/DC power tools 5005 include tools that have universal motors or brushless motors (e.g., permanent magnet brushless DC motors), and may include constant speed and variable speed tools. The high rated voltage AC/DC power tools 5005 may include tools such as drills, circular saws, screwdrivers, reciprocating saws, oscillating tools, impact drivers, flashlights, string trimmers, hedge trimmers, lawn mowers, nailers and/or rotary hammers. The high rated DC power tools may also or alternatively include other types of tools that require higher power or capacity such as miter saws (as shown in the figure), chain saws, hammer drills, grinders, and compressors. The high rated voltage AC/DC rated voltage power tools 5004 do not include power tools that were on sale prior to May 18, 2014.

Each of the high rated voltage AC/DC power tools 5005 includes a power supply interface having a pair of battery pack receptacles and an AC cord or receptacle. The battery pack receptacles each have a terminal block for coupling to the power tool interface of one of the convertible low/medium rated voltage battery packs. The battery pack receptacles are configured to place or retain the convertible battery packs 5007 in their medium rated voltage configurations. The AC cord or receptacle is configured to receive power from the AC power supply 5008. The power tools 5005 include a switching circuit (not shown) configured to select between being powered by the AC power supply 5008 or the convertible battery packs 5007, and to connect the two convertible battery packs 5007 to one another and to the tool in series, so that the voltages of the battery packs 5007 are additive. The high rated voltage AC/DC power tools 5005 may be powered by and operate with two convertible low/medium rated voltage battery packs 5007 in their medium rated voltage configuration, or with the AC power supply 5008. This is because the two battery packs 5007, being connected in series, together have a rated voltage of 102V-120V (double that of a single battery pack 5007) and the AC power supply may have a rated voltage of 100V-120V (depending on the country), which corresponds to the 100V-120V rated voltage of high rated voltage AC/DC power tools 5005. In countries having AC power supplies with a rating of 220V-240V, the AC/DC power tools may be configured to reduce the voltage from the AC mains power supply voltage to correspond to the rated voltage of the AC/DC power tools (e.g., by using a transformer to convert 220 VAC-240 VAC to 100 VAC-120 VA).

In certain embodiments, the motor control circuits of the power tools 5002, 5003, 5004, and 5005 may be configured to optimize the motor performance based on the rated voltage of the lower rated voltage power supply using the motor control techniques (e.g., conduction band, advance angle, cycle-by-cycle current limiting, etc.) described above.

The battery pack chargers 5009 have a rated voltage range of 17V-20V, with an advertised voltage of 20V, an operating voltage range of 17V-20V, a nominal voltage of 18V, and a maximum voltage of 20V. Each of the low rated voltage battery pack chargers includes a battery pack interface or receptacle that enables the battery pack charger 5009 to be coupled to the power tool interface of one of the low rated voltage battery packs 5006, or to the power tool interface of one of the convertible low/medium rated voltage battery packs 5007. The battery pack interface or receptacle is configured to place or retain the convertible battery pack 5007 into a low rated voltage configuration. Thus, the battery pack charge 5009 may charge both the low rated voltage battery packs 5006 and the low/medium rated voltage battery packs 5007 (in their low rated voltage configuration). This is because the 17V-20V rated voltages of the battery packs 5006, 5007 correspond to the 17V-20V rated voltage of low rated voltage chargers 5009. In one implementation, at least some of the low rated voltage battery pack chargers 5009 were on sale prior to May 18, 2014. For example, the low rated voltage battery pack chargers 5009 may include certain ones of DEWALT 20V MAX battery pack chargers, sold by DEWALT Industrial Tool Co. of Towson, Md.

It is notable that the low/medium rated voltage (e.g., 17V-20V/51V-60V) convertible battery packs 5007 are backwards compatible with preexisting low rated voltage (e.g., 17V-20V) DC power tools 5002 and low rated voltage (e.g., 17V-20V) battery pack chargers 5009, and can also be used to power the medium rated voltage (e.g., 51V-60V) DC power tools 5003, the high rated voltage (e.g., 100V-120V) DC power tools 5004, and the high rated voltage (e.g., 100V-120V) AC/DC power tools 5005. It is also notable that a pair of the low/medium rated voltage (e.g., 17V-20V/51V-60V) convertible battery packs 5007 may be connected in series to produce a high rated voltage (e.g., 100V-120V) that generally corresponds to an AC rated voltage (e.g., 100V-120V) in North America and Japan. Thus, the convertible battery packs 5007 are able to power a wide range of rated voltage power tools ranging from preexisting low rated voltage power tools to the high rated AC/DC voltage power tools.

V. Miscellaneous

Some of the techniques described herein may be implemented by one or more computer programs executed by one or more processors residing, for example on a power tool. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

In this disclosure, a "control unit" refers to a processing circuit. The processing circuit may be a programmable controller, such as a microcontroller, a microprocessor, a computer processor, a signal processor, etc., or an integrated circuit configured and customized for a particular use, such as an Application Specific Integrated Circuit (ASIC), a field-programmable gate array (FPGA), etc., packaged into a chip and operable to manipulate and process data as described above. A "control unit" may further include a computer readable medium as described above for storing processor-executable instructions and data executed, used, and stored by the processing circuit.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. Numerous modifications may be made to the exemplary implementations that have been described above. These and other implementations are within the scope of the following claims.

What is claimed is:

1. A power tool system comprising:

a multi-voltage battery pack for use with a first power tool, wherein the first power tool comprises a first battery pack interface and is configured to operate at a first operating voltage; and a second power tool configured for use with the multi-voltage battery pack such that the system includes both the multi-voltage battery pack and the second power tool, wherein the second power tool comprises a second battery pack interface and is configured to operate at a second operating voltage, wherein the second operating voltage is higher than the first operating voltage, wherein the multi-voltage battery pack comprises a housing, a first string of battery cells arranged in electrical series and disposed inside the housing, the first string having a first positive voltage terminal and a first negative voltage terminal, a second string of battery cells arranged in electrical series and disposed inside the housing, the second string having a second positive voltage terminal and a second negative voltage terminal, and a power tool interface, wherein the power tool interface and second battery pack interface are both shaped and configured to mechanically and electrically couple with each other, wherein, when the power tool interface is coupled with the second battery pack interface, the first positive voltage terminal is electrically connected to the second negative voltage terminal such that the first and second strings are electrically connected to each other in a series configuration so as to provide the second operating voltage to the second power tool, wherein the power tool interface is further configured such that the first battery pack interface to which the power tool interface can be coupled is shaped and configured to mate with a second power tool interface of a single voltage battery pack, the single voltage battery pack being configured to provide the first operating voltage, but not the second operating voltage, wherein the power tool interface is shaped and configured to mechanically and electrically couple with the first battery pack interface, wherein, when the power tool interface is coupled with the first battery pack interface, the first and second positive voltage terminals are electrically connected to each other and the first and second negative voltage terminals are electrically connected to each other such that the first and second strings are electrically connected to each other in a parallel configuration so as to provide the first operating voltage to the first power tool, wherein the power tool interface and the second power tool interface are interchangeably coupleable to the first battery pack interface so that the first power tool is operable with either of the multi-voltage battery pack or the single voltage battery pack.

2. The power tool system of claim 1, wherein:

the second power tool interface of the single voltage battery pack is not mechanically coupleable with the second battery pack interface of the second power tool;

the second power tool interface of the single voltage battery pack is not electrically coupleable with the second battery pack interface of the second power tool;

the power tool interface comprises a slot in the housing; and the second battery pack interface of the second power tool comprises a downwardly extending projection that is shaped and configured to mate with the slot in the housing of the multi-voltage battery pack when power tool interface couples with the second battery pack interface of the second power tool;

the second battery pack interface comprises a plurality of rails and grooves;

the power tool interface of the multi-voltage battery pack comprises a plurality of rails and grooves that are shaped and configured to selectively mechanically couple with (1) a complimentarily shaped plurality of rails and grooves on the first battery pack interface, and (2) the plurality of rails and grooves on the second battery pack interface of the second power tool;

the power tool interface of the multi-voltage battery pack comprises a latch that is shaped and configured to maintain a mechanical and electrical connection between the power tool interface and the first or second battery pack interfaces;

the second power tool interface of the single voltage battery pack comprises a plurality of rails and grooves that are shaped and configured to couple with the complementarily shaped plurality of rails and grooves on the first battery pack interface;

the battery cells of the first string comprises five battery cells that are arranged in a first row within the housing;

the battery cells of the second string comprise five battery cells that are arranged in a second row within the housing;

the second row is positioned on top of the first row;

the battery cells of the first and second strings together are arranged in a 2×5 matrix within the housing;

the battery cells of the first string and battery cells of the second string each define respective longitudinal axes that are parallel to each other;

the multi-voltage battery pack has first and second opposing lateral sides;

each of the battery cells of the first and second strings has positive and negative voltage terminals;

the positive voltage terminals of three of the five battery cells of the first string are disposed on the first lateral side of the battery pack;

the positive voltage terminals of three of the five battery cells of the second string are disposed on the first lateral side of the battery pack;

the negative voltage terminals of two of the five battery cells of the first string are disposed on the first lateral side of the battery pack;

the negative voltage terminals of two of the five battery cells of the second string are disposed on the first lateral side of the battery pack;

the negative voltage terminals of the cells within the first string on the first lateral side are vertically aligned with respective ones of the negative voltage terminals of the cells within the second string on the first lateral side;

the positive voltage terminals of the cells within the first string on the first lateral side are vertically aligned with respective ones of the positive voltage terminals of the cells within the second string on the first lateral side;

the second power tool comprises an electrically conductive jumper having first and second electrically interconnected contacts;

the second battery pack interface of the second power tool includes the first and second electrically interconnected contacts such that coupling the power tool interface to the second battery pack interface causes the first and second contacts of the jumper to electrically contact the first positive voltage terminal and the second negative voltage terminal, respectively, so that first and second strings electrically connect to each other in series by way of the electrically conductive jumper of the second power tool;

the first operating voltage is between approximately 17 to 20 volts and the second operating voltage is between approximately 34 to 40 volts;

the second power tool comprises a power tool housing;

the second battery pack interface is disposed on the power tool housing;

the multi-voltage battery pack has an open circuit configuration in which the first and second strings are not electrically connected to each other in parallel or series;

the power tool interface comprises a first row of electrical terminals that are shaped and configured to physically and electrically contact corresponding electrical contacts of the second power tool when the power tool interface is mechanically and electrically coupled with the second battery pack interface;

the power tool interface comprises a second row of electrical terminals that are shaped and configured to physically and electrically contact corresponding electrical contacts of the second power tool when the power tool interface is mechanically and electrically coupled with the second battery pack interface;

the first row is vertically offset from the second row;

a plurality of the electrical terminals of the first row of electrical terminals comprise signal terminals;

the electrical terminals of the second row of electrical terminals comprise first and second terminals;

the first terminal of the second row is electrically connected to the first positive voltage terminal of the first string of battery cells;

the second terminal of the second row is electrically connected to the second negative voltage terminal of the second string of battery cells;

the electrical terminals of the first row are spaced apart in a horizontal direction; and the electrical terminals of the second row are spaced apart in the horizontal direction.

3. The power tool system of claim 1, wherein the second power tool interface of the single voltage battery pack is not mechanically coupleable with the second battery pack interface of the second power tool.

4. The power tool system of claim 3, wherein the second power tool interface of the single voltage battery pack is not electrically coupleable with the second battery pack interface of the second power tool.

5. The power tool system of claim 4, wherein:

the power tool interface comprises a slot in the housing; and the second battery pack interface of the second power tool comprises a downwardly extending projection that is shaped and configured to mate with the slot in the housing of the multi-voltage battery pack when power tool interface couples with the second battery pack interface of the second power tool.

6. The power tool system of claim 5, wherein the first battery pack interface of the first power tool lacks a projection that would mate with the slot in the housing when the power tool interface mechanically and electrically couples with the first battery pack interface of the first power tool.

7. The power tool system of claim 5, wherein the second power tool interface has a physical structure that occupies a space on the second power tool interface that corresponds to a location of the slot of the power tool interface.

8. The power tool system of claim 1, wherein:

the second battery pack interface comprises a plurality of rails and grooves;

the power tool interface of the multi-voltage battery pack comprises a plurality of rails and grooves that are shaped and configured to selectively mechanically couple with (1) a shaped plurality of rails and grooves on the first battery pack interface, and (2) the plurality of rails and grooves on the second battery pack interface; and the power tool interface of the multi-voltage battery pack comprises a latch that is shaped and configured to maintain a mechanical and electrical connection between the power tool interface and the first or second battery pack interfaces.

9. The power tool system of claim 8, wherein the second power tool interface of the single voltage battery pack comprises a plurality of rails and grooves that are shaped and configured to couple with the complementarily shaped plurality of rails and grooves on the first battery pack interface.

10. The power tool system of claim 1, wherein:

the battery cells of the first string comprise n battery cells that are arranged in a first row within the housing;

the battery cells of the second string comprise n battery cells that are arranged in a second row within the housing;

the second row is positioned on top of the first row; and n is a whole number greater than or equal to 3.

11. The power tool system of claim 10, wherein the battery cells of the first and second strings together are arranged in a 2×n matrix within the housing.

12. The power tool system of claim 1, wherein:

the battery cells of the first string comprise five battery cells; and the battery cells of the second string comprise five battery cells.

13. The power tool system of claim 12, wherein:

the battery cells of the first string and battery cells of the second string each define respective longitudinal axes that are parallel to each other;

the multi-voltage battery pack has first and second opposing lateral sides;

each of the battery cells of the first and second strings has positive and negative voltage terminals;

the positive voltage terminals of three of the five battery cells of the first string are disposed on the first lateral side of the battery pack;

the positive voltage terminals of three of the five battery cells of the second string are disposed on the first lateral side of the battery pack;

the negative voltage terminals of two of the five battery cells of the first string are disposed on the first lateral side of the battery pack;

the negative voltage terminals of two of the five battery cells of the second string are disposed on the first lateral side of the battery pack;

the negative voltage terminals of the cells within the first string on the first lateral side are vertically aligned with respective ones of the negative voltage terminals of the cells within the second string on the first lateral side; and the positive voltage terminals of the cells within the first string on the first lateral side are vertically aligned with respective ones of the positive voltage terminals of the cells within the second string on the first lateral side.

14. The power tool system of claim 1, wherein:

the second power tool comprises an electrically conductive jumper having first and second electrically interconnected contacts;

the second battery pack interface of the second power tool includes the first and second electrically interconnected contacts such that coupling the power tool interface to the second battery pack interface causes the first and second contacts of the jumper to electrically contact the first positive voltage terminal and the second negative voltage terminal, respectively, so that first and second strings electrically connect to each other in series by way of the electrically conductive jumper of the second power tool.

15. The power tool system of claim 1, wherein the first operating voltage is between approximately 17 to 20 volts and the second operating voltage is between approximately 34 to 40 volts.

16. The power tool system of claim 1, wherein the second power tool comprises a power tool housing, and wherein the second battery pack interface is disposed on the power tool housing.

17. The power tool system of claim 1, wherein the multi-voltage battery pack has an open circuit configuration in which the first and second strings are not electrically connected to each other in parallel or series.

18. The power tool system of claim 17, wherein the power tool interface and second battery pack interface are shaped and configured such that decoupling the power tool interface from the second battery pack interface causes the multi-voltage battery pack to change from the series configuration to the open circuit configuration.

19. The power tool system of claim 18, wherein the power tool interface is shaped and configured such that decoupling the power tool interface from the second battery pack interface causes the multi-voltage battery pack to sequentially change from: (1) the series configuration, to (2) the open configuration, to (3) the parallel configuration.

20. The power tool system of claim 1, wherein:

the power tool interface comprises a first row of electrical terminals that are shaped and configured to physically and electrically contact corresponding electrical contacts of the second power tool when the power tool interface is mechanically and electrically coupled with the second battery pack interface;

the power tool interface comprises a second row of electrical terminals that are shaped and configured to physically and electrically contact corresponding electrical contacts of the second power tool when the power tool interface is mechanically and electrically coupled with the second battery pack interface; and a top of the first row is vertically offset from a top of the second row.

21. The power tool system of claim 20, wherein:

a plurality of the electrical terminals of the first row of electrical terminals comprise signal terminals;

the electrical terminals of the second row of electrical terminals comprise first and second terminals;

the first terminal of the second row is electrically connected to the first positive voltage terminal of the first string of battery cells; and the second terminal of the second row is electrically connected to the second negative voltage terminal of the second string of battery cells.

22. The power tool system of claim 20, wherein:

the housing comprises a first row of slots;

the electrical terminals of the first row of electrical terminals are disposed in respective ones of the first row of slots;

the housing comprises a second row of slots;

the electrical terminals of the second row of electrical terminals are disposed in respective ones of the second row of slots; and a top of the first row of slots is vertically offset from a top of the second row of slots.

23. The power tool system of claim 1, wherein:

the power tool interface comprises a first row of electrical contacts that are shaped and configured to physically and electrically contact corresponding electrical contacts of the second power tool when the power tool interface is mechanically and electrically coupled with the second battery pack interface;

the power tool interface comprises a second row of electrical contacts that are shaped and configured to physically and electrically contact corresponding electrical contacts of the second power tool when the power tool interface is mechanically and electrically coupled with the second battery pack interface; and the first row is vertically offset from the second row.

24. A power tool system comprising:

a multi-voltage battery pack; and a second power tool having a plurality of grooves, a plurality of rails, and a plurality of electrical terminals, wherein the multi-voltage battery pack comprises a housing having a bottom wall, a pair of side walls, a pair of end walls, and a top wall that together define a receptacle;

an electromechanical interface coupled to the top wall, the interface having a terminal block with a plurality of slots containing a plurality of electrical terminals, a pair of longitudinal rails extending along the terminal block and defining a pair of longitudinal grooves between the rails and the top wall, and a latch, wherein the electromechanical interface is configured to be coupled to a first power tool operating at a first voltage by sliding the pair of longitudinal rails and grooves of the electromechanical interface into corresponding grooves and rails of the first power tool so that electrical terminals on the first power tool are received in the slots of the electromechanical interface to engage the battery pack electrical terminals and the latch engages the first power tool to maintain coupling between the electromechanical interface and the first power tool, and wherein the electromechanical interface is configured to be coupled to the second power tool operating at a second, different voltage by sliding the pair of longitudinal rails and grooves of the electromechanical interface into the grooves and rails of the second power tool so that the electrical terminals of the second power tool are received in the slots to engage the battery pack electrical terminals and the latch engages the second power tool to maintain coupling between the electromechanical interface and the second power tool; and a plurality of battery cells disposed in the receptacle, the cells configured (1) to be connectable to each other in parallel to provide power at the first operating voltage to the electrical terminals upon coupling the electromechanical interface to the first power tool, and (2) to be connectable to each other in series to provide power at the first operating voltage to the electrical terminals upon coupling the electromechanical interface to the second power tool, wherein the terminal block, the slots, the battery pack terminals, the longitudinal rails, the longitudinal grooves, and the latch of the electromechanical interface have substantially the same configuration as a terminal block, slots, battery pack terminals, longitudinal rails, longitudinal grooves, and a latch of an electromechanical interface of a single-voltage battery pack that is operable at only the first voltage and can be coupled to the first power tool to provide power at the first voltage to the first power tool.

25. The power tool system of claim 24, wherein:

the electromechanical interface of the single-voltage battery pack is not mechanically or electrically coupleable with the second power tool;

the electromechanical interface of the multi-voltage battery pack comprises a slot in the housing; and the second power tool comprises a downwardly extending projection that is shaped and configured to mate with the slot in the housing of the multi-voltage battery pack when the electromechanical interface of the multi-voltage battery pack couples with second power tool.

26. The power tool system of claim 24, wherein:

the plurality of battery cells of the multi-voltage battery pack comprises a first string of five battery cells that are arranged in series with each other, and a second string of five battery cells that are arranged in series with each other;

the battery cells of the first string are arranged in a first row within the housing;

the battery cells of the second string are arranged in a second row within the housing;

the second row is positioned on top of the first row;

the battery cells of the first and second strings together are arranged in a 2×5 matrix within the housing;

the battery cells of the first string and battery cells of the second string each define respective longitudinal axes that are parallel to each other;

the multi-voltage battery pack has first and second opposing lateral sides;

each of the battery cells of the first and second strings has positive and negative voltage terminals;

the positive voltage terminals of three of the five battery cells of the first string are disposed on the first lateral side of the battery pack;

the positive voltage terminals of three of the five battery cells of the second string are disposed on the first lateral side of the battery pack;

the negative voltage terminals of two of the five battery cells of the first string are disposed on the first lateral side of the battery pack;

the negative voltage terminals of two of the five battery cells of the second string are disposed on the first lateral side of the battery pack;

the negative voltage terminals of the cells within the first string on the first lateral side are vertically aligned with respective ones of the negative voltage terminals of the cells within the second string on the first lateral side; and the positive voltage terminals of the cells within the first string on the first lateral side are vertically aligned with respective ones of the positive voltage terminals of the cells within the second string on the first lateral side.

27. The power tool system of claim 24, wherein:

the plurality of battery cells of the multi-voltage battery pack comprises a first string of battery cells that are arranged in series with each other, and a second string of battery cells that are arranged in series with each other;

the plurality of electrical terminals of the electromechanical interface of the multi-voltage battery pack comprise a first electrical contact and a second electrical contact;

the first electrical contact is electrically connected to the first positive voltage terminal of the first string;

the second electrical contact is electrically connected to the second negative voltage terminal of the second string; and the first and second electrical contacts are shaped and configured such that coupling the electromechanical interface of the multi-voltage battery pack to the second power tool causes the first and second electrical contacts to electrically connect to each other by way of an electrical jumper of the second power tool so as to cause the first and second strings to electrically connect to each other in series by way of the jumper when the electromechanical interface of the multi-voltage battery pack couples with the second power tool.

28. The power tool system of claim 24, wherein:

the plurality of battery cells of the multi-voltage battery pack comprises a first string of battery cells that are arranged in series with each other, and a second string of battery cells that are arranged in series with each other;

the multi-voltage battery pack has an open circuit configuration in which the first and second strings are not electrically connected to each other in parallel or series.

29. The power tool system of claim 24, wherein:

the plurality of battery cells of the multi-voltage battery pack comprises a first string of battery cells that are arranged in series with each other such that the first string has a first positive voltage terminal and a first negative voltage terminal, and a second string of battery cells that are arranged in series with each other such that the second string has a second positive voltage terminal and a second negative voltage terminal;

the plurality of electrical terminals of the multi-voltage battery pack comprise a first row of electrical terminals and a second row of electrical terminals;

the first row is vertically offset from the second row;

a plurality of the electrical terminals of the first row of electrical terminals comprise signal terminals;

the electrical terminals of the second row of electrical terminals comprise first and second terminals;

the first terminal of the second row is electrically connected to the first positive voltage terminal of the first string of battery cells;

the second terminal of the second row is electrically connected to the second negative voltage terminal of the second string of battery cells;

the electrical terminals of the first row are spaced apart in a horizontal direction; and the electrical terminals of the second row are spaced apart in the horizontal direction.

* * * * *